US007970164B2

(12) United States Patent
Nakamura et al.

(10) Patent No.: US 7,970,164 B2
(45) Date of Patent: Jun. 28, 2011

(54) DIGITAL WATERMARK PADDING METHOD, DIGITAL WATERMARK PADDING DEVICE, DIGITAL WATERMARK DETECTING METHOD, DIGITAL WATERMARK DETECTING DEVICE, AND PROGRAM

(75) Inventors: Takao Nakamura, Yokohama (JP); Susumu Yamamoto, Yokohama (JP); Ryo Kitahara, Yokohama (JP); Takashi Miyatake, Shinagawa (JP); Atushi Katayama, Setagaya (JP); Hisato Miyachi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1097 days.

(21) Appl. No.: 11/666,311
(22) PCT Filed: Jul. 31, 2006
(86) PCT No.: PCT/JP2006/015126
§ 371 (c)(1), (2), (4) Date: Apr. 26, 2007
(87) PCT Pub. No.: WO2007/015452
PCT Pub. Date: Feb. 8, 2007

(65) Prior Publication Data
US 2008/0089552 A1 Apr. 17, 2008

(30) Foreign Application Priority Data

Aug. 4, 2005 (JP) .................... 2005-226755
Aug. 4, 2005 (JP) .................... 2005-226756
Sep. 22, 2005 (JP) .................... 2005-275965

(51) Int. Cl.
*G06K 9/00* (2006.01)
(52) U.S. Cl. ...................................... 382/100
(58) Field of Classification Search .......... 382/100; 348/460; 713/176, 179; 358/3.28
See application file for complete search history.

(56) References Cited

U.S. PATENT DOCUMENTS
6,614,914 B1 * 9/2003 Rhoads et al. ............... 382/100
(Continued)

FOREIGN PATENT DOCUMENTS
JP 11-164235 6/1999
(Continued)

OTHER PUBLICATIONS

Office Action issued Nov. 16, 2010, in Japanese Patent Application No. 2007-529252.
U.S. Appl. No. 12/282,062, filed Sep. 8, 2008, Yamamoto, et al.
Takao Nakamura, et al., "A Watermark Detection Scheme for the Service Offering System using Camera-equipped Mobile Phone", Forum of Information Technology, 2003, N-020, pp. 409-410 (with English translation).

(Continued)

*Primary Examiner* — Matthew C Bella
*Assistant Examiner* — Shervin Nakhjavan
(74) *Attorney, Agent, or Firm* — Oblon, Spivak, McClelland, Maier & Neustadt, L.L.P.

(57) ABSTRACT

A digital watermark embedding method of the present invention includes: a step of sequentially obtaining each frame image of the moving image data and frame display time; a step of generating a watermark pattern using watermark information, the frame display time and watermark pattern switching information; a step of superimposing the watermark pattern onto the frame image, and combining watermark embedded frame images obtained by sequentially repeating the processes to generate watermark embedded moving image data. A digital watermark detection method includes a step of sequentially obtaining a frame image; a step of generating a difference image between the currently obtained frame image and a previously obtained frame image; and a step of performing digital watermark detection from the difference image to output digital watermark detection status, and when digital watermark detection process is continued, obtaining a new frame again to repeat the above processes.

86 Claims, 199 Drawing Sheets

U.S. PATENT DOCUMENTS

| | | | |
|---|---|---|---|
| 6,785,398 B1 | 8/2004 | Shimizu et al. | |
| 6,971,012 B1 | 11/2005 | Shimizu et al. | |
| 7,114,071 B1* | 9/2006 | Chmounk et al. | 713/164 |
| 7,315,621 B2* | 1/2008 | Noridomi et al. | 380/202 |
| 2002/0015509 A1* | 2/2002 | Nakamura et al. | 382/100 |
| 2003/0068067 A1* | 4/2003 | Fielding et al. | 382/100 |
| 2004/0230802 A1* | 11/2004 | Moon | 713/176 |
| 2004/0250079 A1* | 12/2004 | Kalker et al. | 713/176 |
| 2005/0100671 A1* | 5/2005 | Kawada et al. | 427/256 |
| 2006/0188129 A1* | 8/2006 | Mayboroda et al. | 382/100 |

FOREIGN PATENT DOCUMENTS

| | | |
|---|---|---|
| JP | 11 341452 | 12/1999 |
| JP | 2000-13763 | 1/2000 |
| JP | 2000 175161 | 6/2000 |
| JP | 2000-244726 | 9/2000 |
| JP | 2000 35002 | 12/2000 |
| JP | 2001-53955 | 2/2001 |
| JP | 2001 257865 | 9/2001 |
| JP | 2002-320083 | 10/2002 |
| JP | 2003-174631 | 6/2003 |
| JP | 2003 259319 | 9/2003 |
| JP | 2003 304389 | 10/2003 |
| JP | 2004-15626 | 1/2004 |
| JP | 2004-521570 | 7/2004 |
| JP | 2005-12405 | 1/2005 |
| JP | 2005-252957 | 9/2005 |
| KR | 2000-0006352 | 1/2000 |
| KR | 2001-0006679 | 1/2001 |

OTHER PUBLICATIONS

Takao Nakamura, et al., "Improved Digital Watermark Robustness against Translation and/ or Cropping of an Image Area", IEICE Trans. Fundamentals, vol. E83-A, No. 1, Jan. 2000, pp. 1-8.

Atsushi Katayama, et al., "A New High-Speed Corner Detection Method: Side Trace Algorithm (STA) for i-appli to Detect Watermarks", The IEICE Transactions on Information and Systems, Pt.2, vol. J88-D-II, No. 6, Jun. 2005, with English translation 25 pages and cover sheet and pages 1035-1046.

Jun Rekimoto, et al., "CyberCode: Designing Augmented Reality Environments with Visual Tags", Designing Augmented Reality Environments (DARE 2000), 2000, 10 pages.

Okewatari, "Image engineering handbook", Asakurashoten, ISBN4-254-20033-1, 1986, pp. 10-56.

Takao Nakamura, et al., "Video watermarking scheme for real-time detection on camera phone", IEICE Trans., Fundamentals, FIT2003, Sep. 10, 2003, 4 pages (with English Abstract).

Nakamura, Takao et al., "Real-time Catermark Detection Slcheme from Camera-captured Frames", The Transactions of the Institute of Electronics, Information and Commuication Engineers, vol. J87-D-II, No. 12, pp. 2145 to 2155, 2004.

Nakamura, Takao et al., Fast Watermark Detection Scheme from Analog Image for Camera-Equiped Cellular Phone, Dai 3 Kai Forum on Information Technology Ippan Koen Ronbunshu, J-306, pp. 285 to 286, 2004.

* cited by examiner

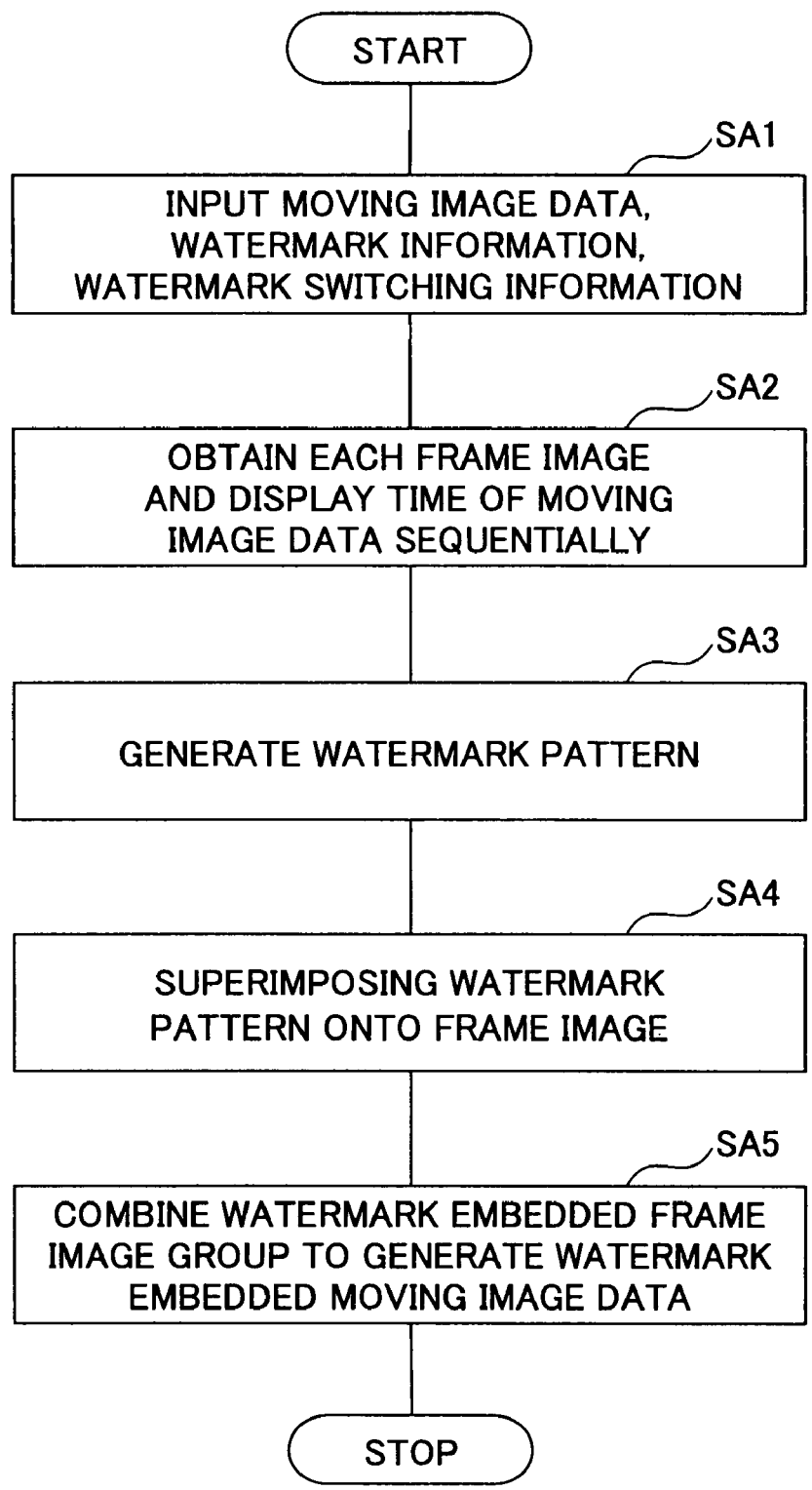

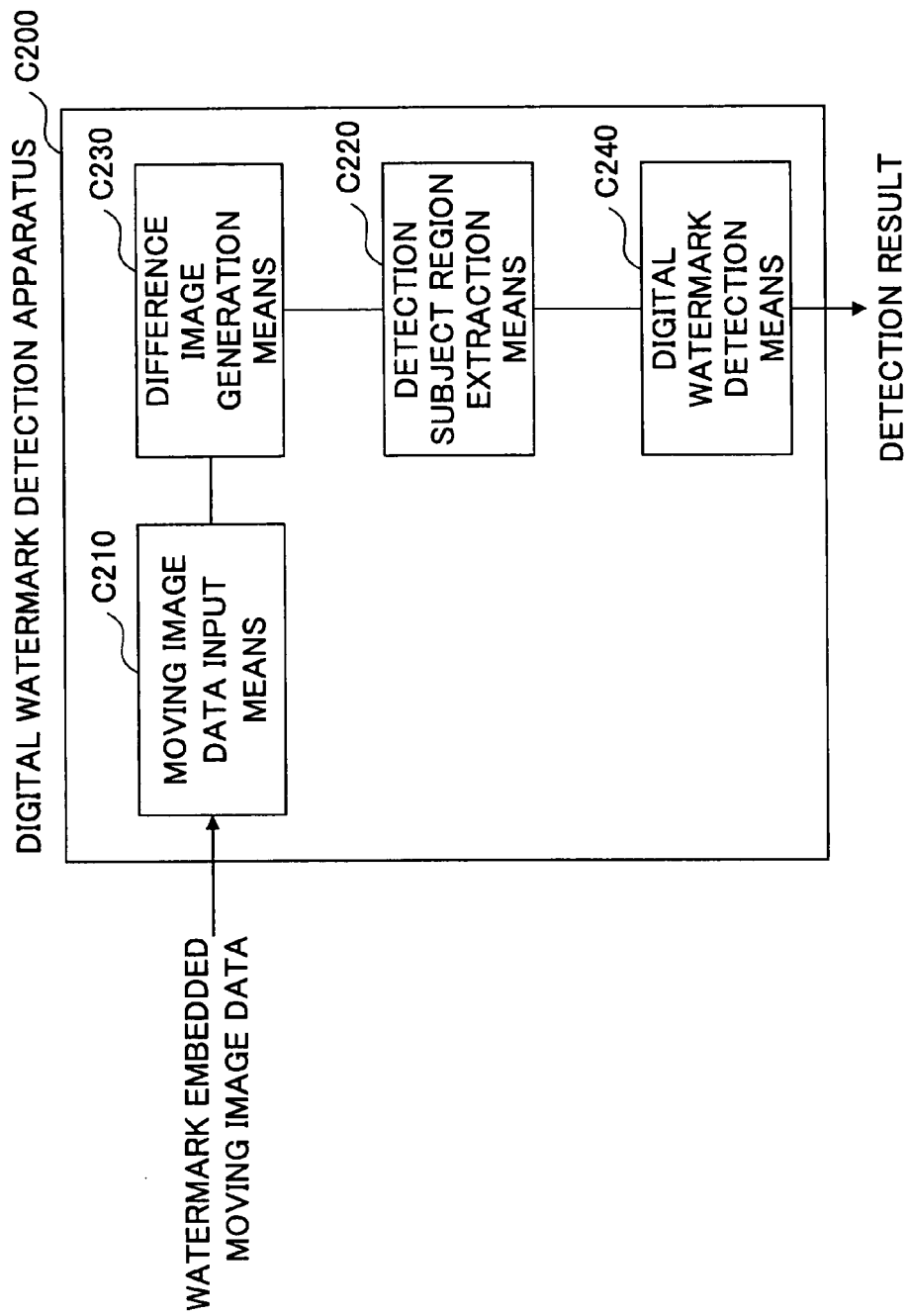

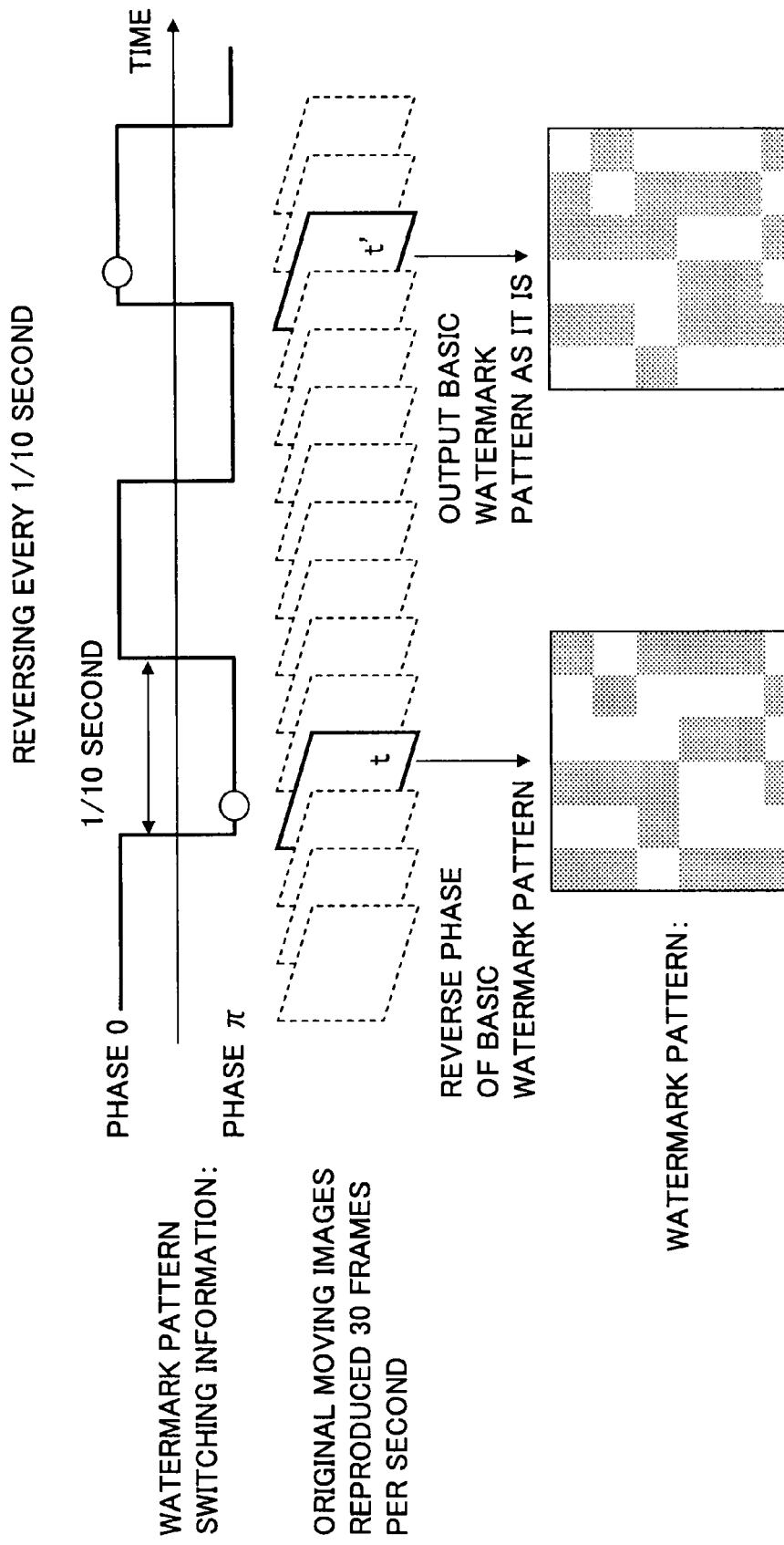

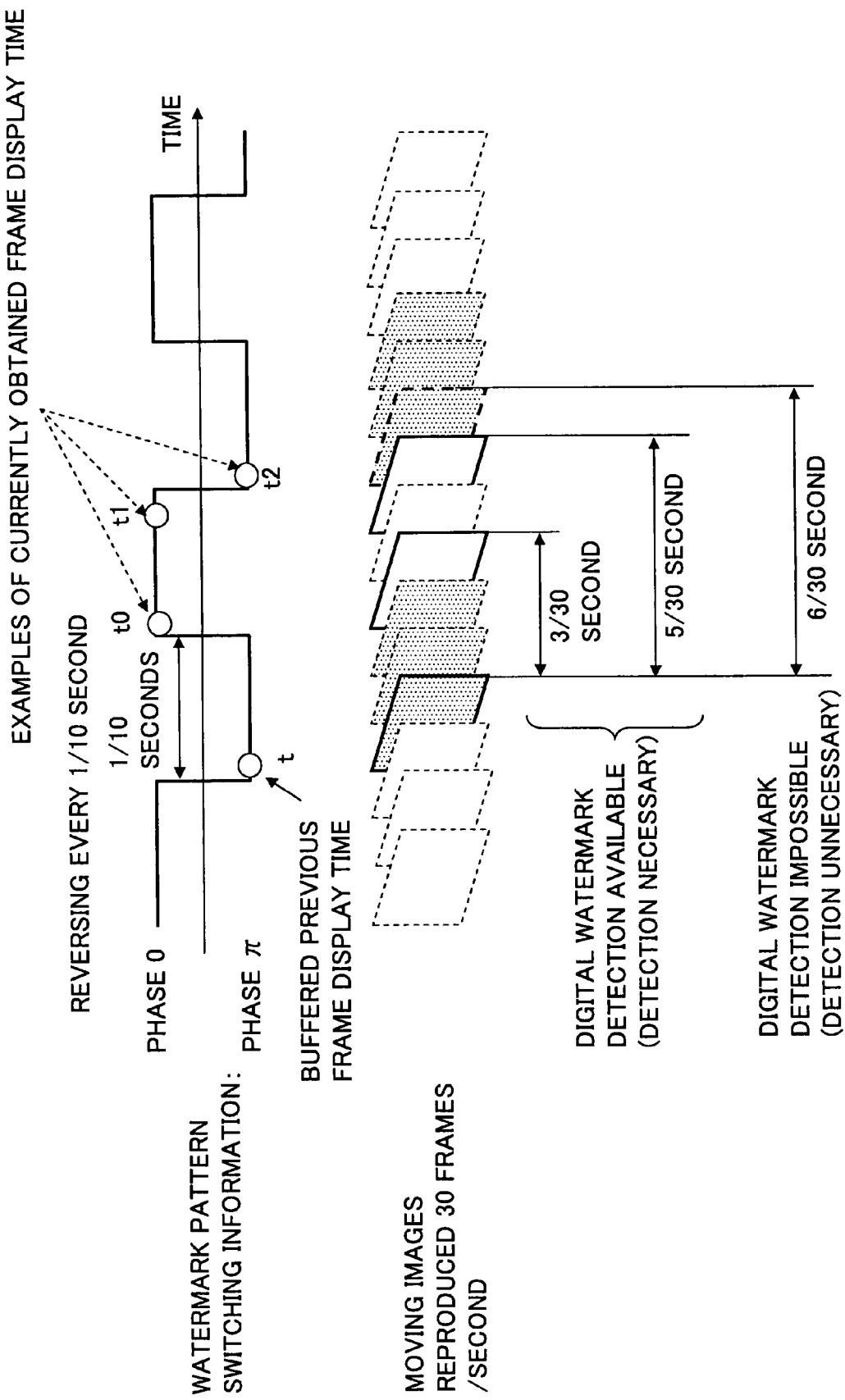

FIG.28A
WHEN WATERMARK PATTERNS ARE IN-PHASE
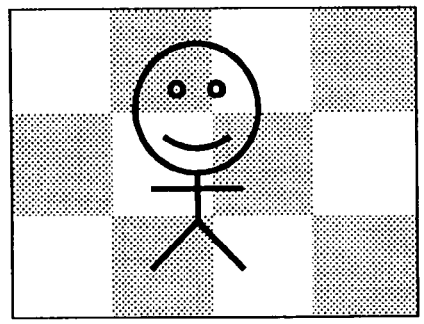 − 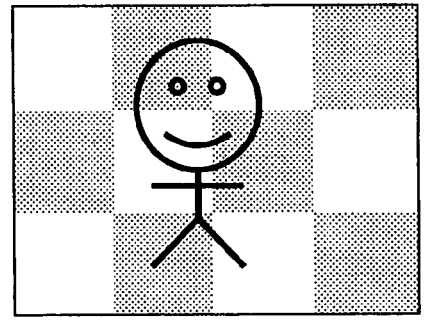
= 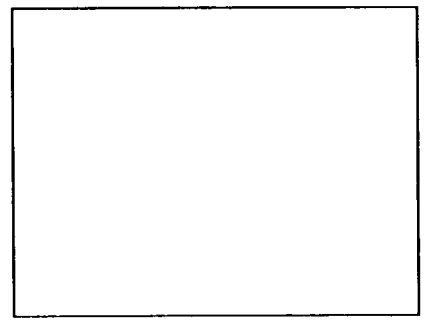
WATERMARK PATTERN IS CANCELED

FIG.28B
WHEN WATERMARK PATTERNS HAVE REVERSED PHASES
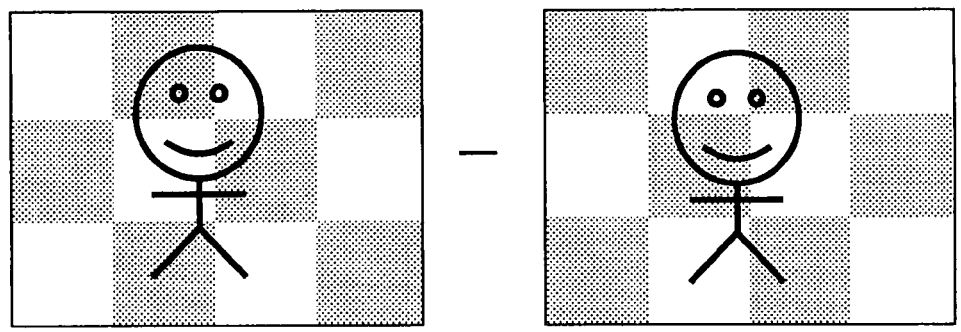
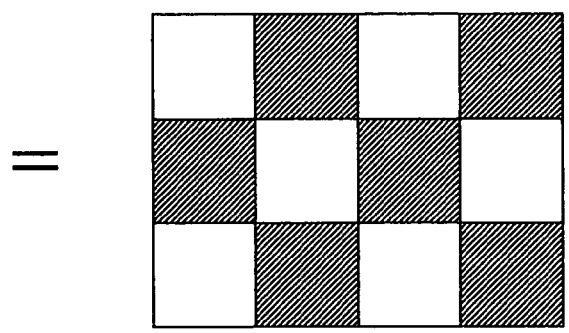
WATERMARK PATTERN IS AMPLIFIED

FIG.33A
WHEN WATERMARK PATTERNS ARE IN-PHASE
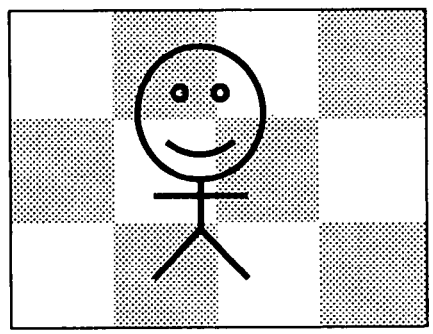 − 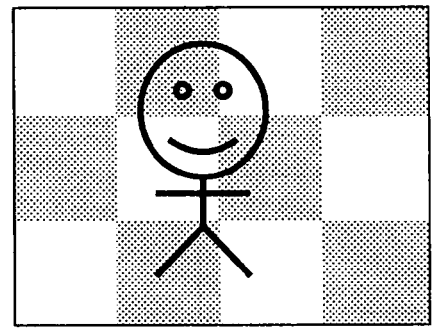
= 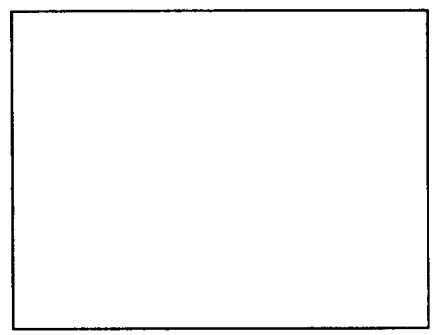
WATERMARK PATTERN IS CANCELED

FIG.33B
WHEN WATERMARK PATTERNS HAVE REVERSED PHASES
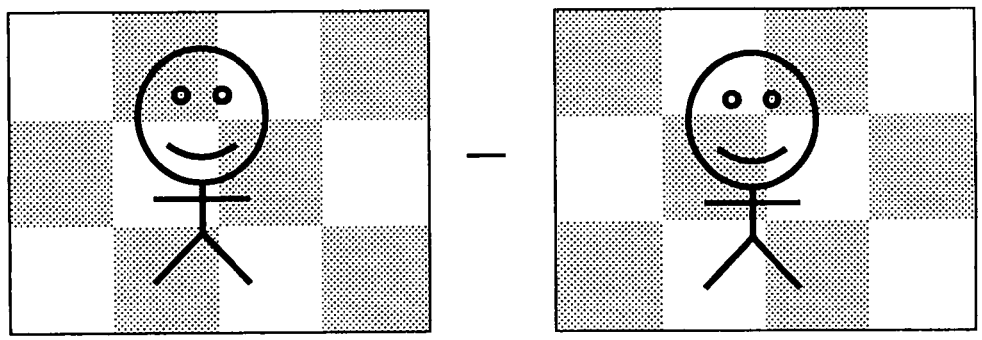
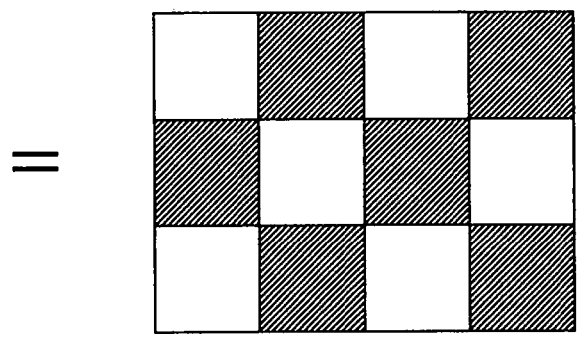
WATERMARK PATTERN IS AMPLIFIED

BASIC WATERMARK PATTERN

IN THE CASE OF FIRST TO THIRD EMBODIMENTS:

WATERMARK INFORMATION: "10101101" —SPREAD SPECTRUM MODULATION→

BASIC WATERMARK PATTERN

IN THE CASE OF PRESENT EMBODIMENT

WATERMARK INFORMATION: "010101101" →  SPREAD SPECTRUM MODULATION

ADD FLAG FOR DETERMINING BIT REVERSAL OF WATERMARK INFORMATION

FIG.38

ADD FLAG FOR DETERMINING BIT REVERSAL OF WATERMARK INFORMATION

WATERMARK INFORMATION: WHEN "010101101" IS EMBEDDED :

(RO) − (I) = DIFFERENCE IMAGE

IN PHASE WITH BASIC WATERMARK PATTERN

→ DETECTION INFORMATION: "010101101"
  AS IT IS →
WATERMARK INFORMATION: "10101101"

(NI) − (HA) = DIFFERENCE IMAGE

REVERSED PHASE OF BASIC WATERMARK PATTERN

→ DETECTION INFORMATION: "101010010"
  BIT REVERSED →
WATERMARK INFORMATION: "10101101"

FIG.48A
MODULATION METHOD (A-1)
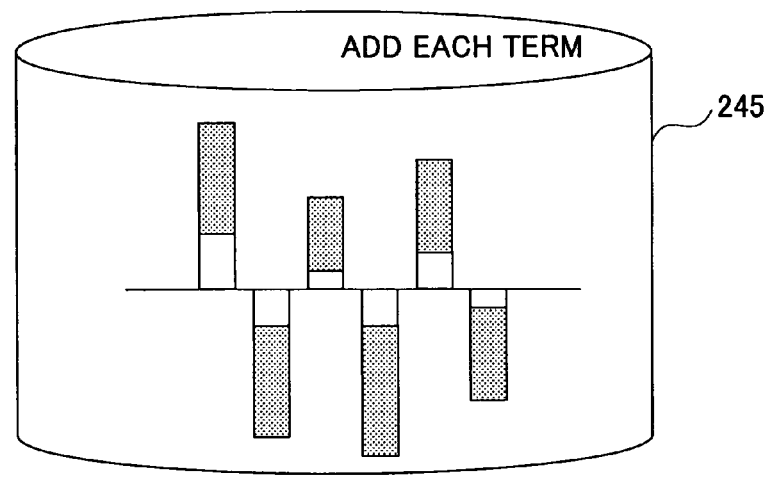
CORRELATION VALUE BUFFER
CALCULATE SUM OF
ABSOLUTE VALUES OF EACH
TERM AND PERFORM
THRESHOLD DETERMINATION
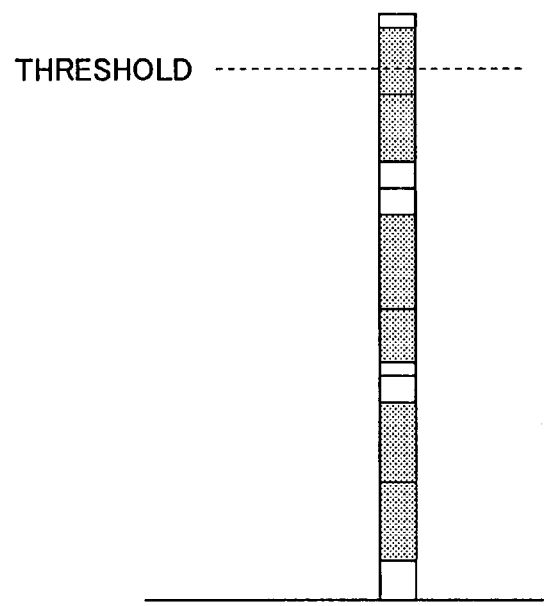
THRESHOLD

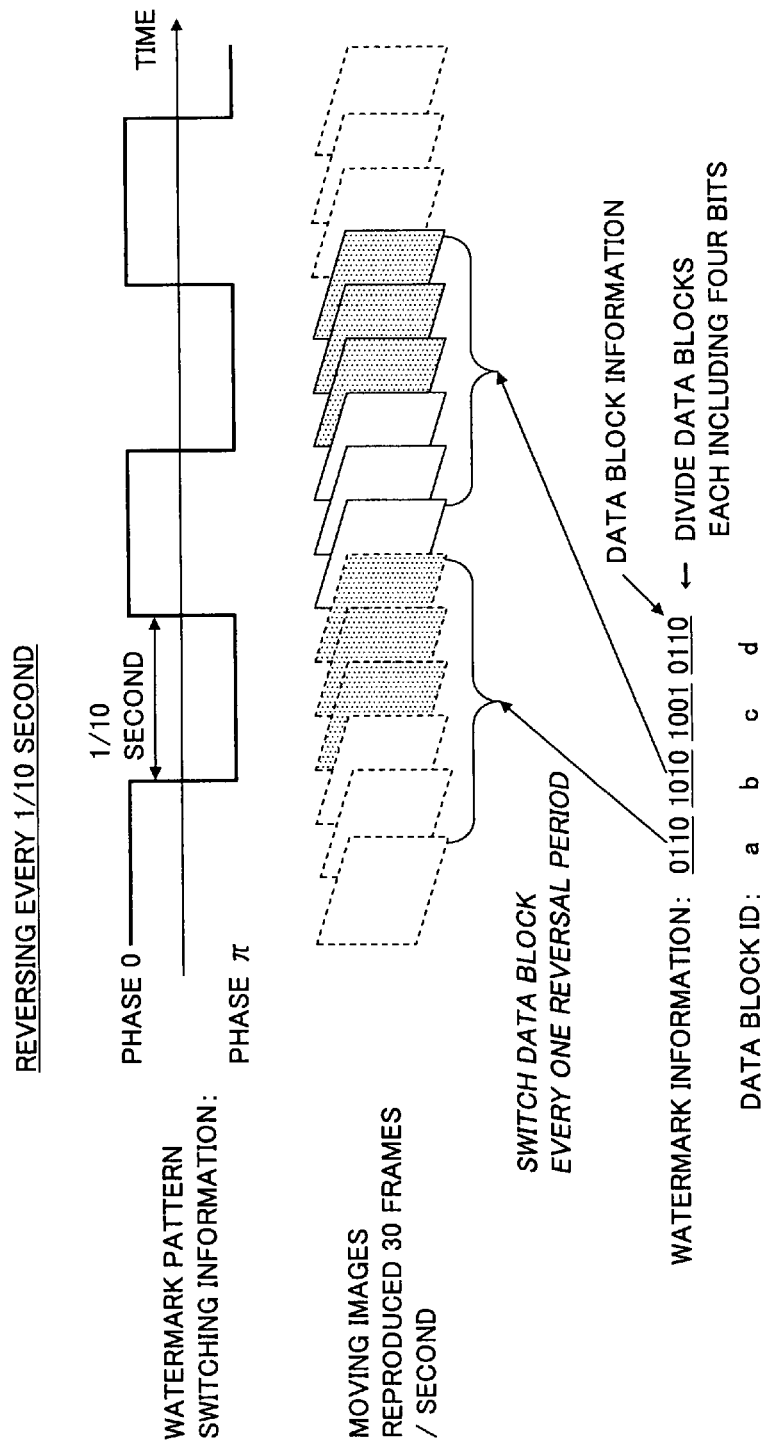

IN THE CASE OF FIRST TO SEVENTH EMBODIMENTS:

WATERMARK INFORMATION: "10101101" —SPREAD SPECTRUM MODULATION→ BASIC WATERMARK PATTERN

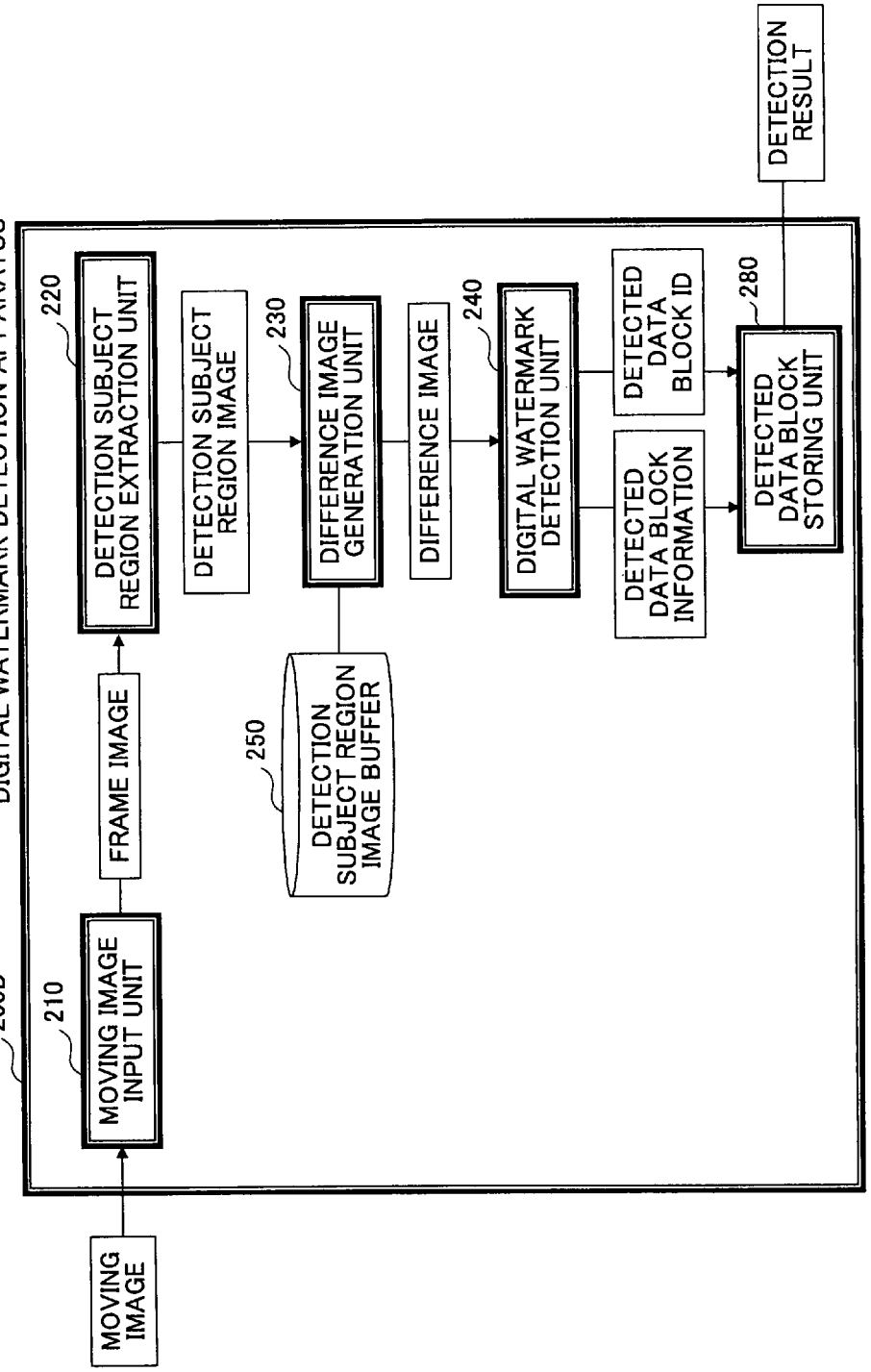

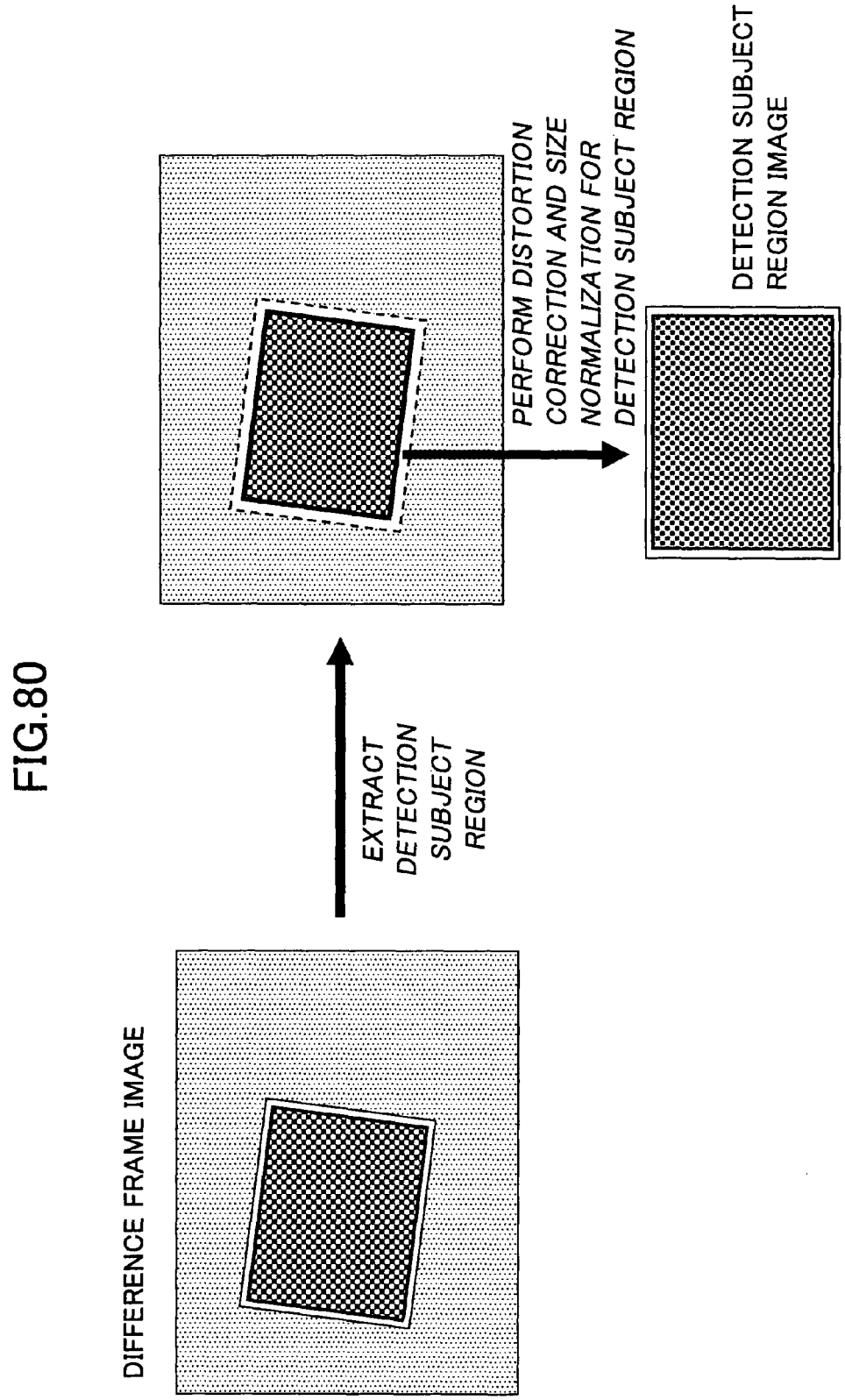

FIG.81A
THIRTEENTH EMBODIMENT
DIFFERENCE FRAME IMAGE
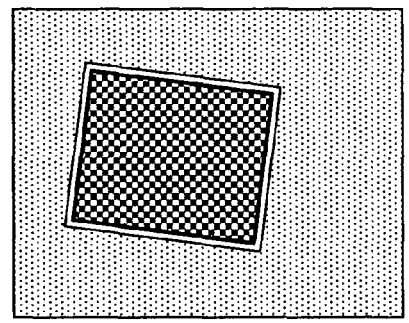
*DIFFERENCE IS CONVERTED TO ABSOLUTE VALUE*
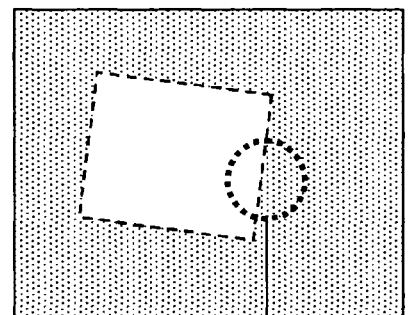
PIXEL VALUE
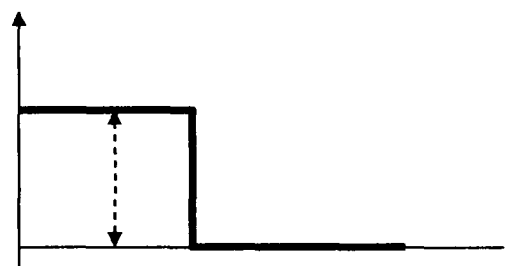
DIFFERENCE TWICE AS LARGE AS AMPLITUDE OF WATERMARK PATTERN WHEN EMBEDDING

FIG.81B
PRESENT EMBODIMENT
DIFFERENCE FRAME IMAGE
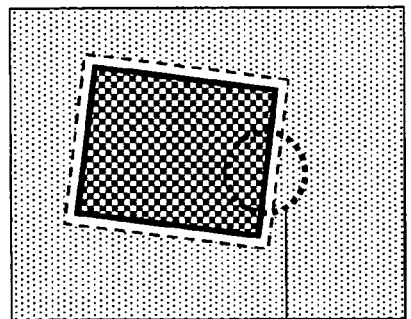
PIXEL VALUE
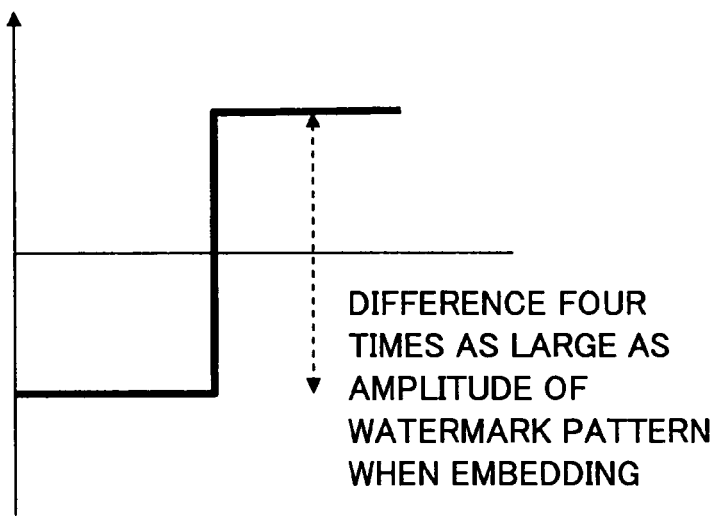
DIFFERENCE FOUR TIMES AS LARGE AS AMPLITUDE OF WATERMARK PATTERN WHEN EMBEDDING

FIG.121
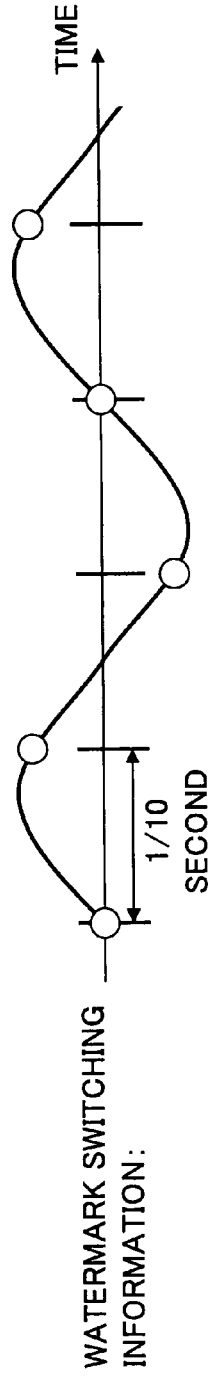
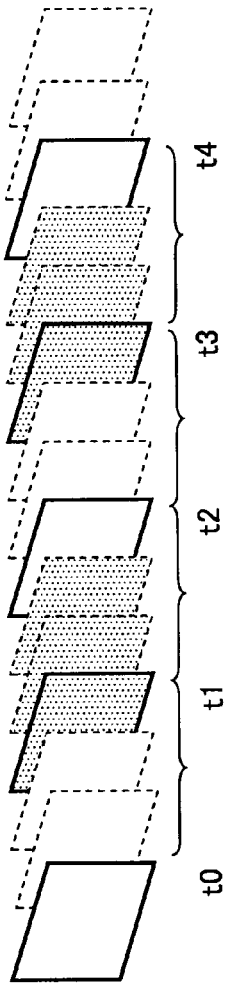
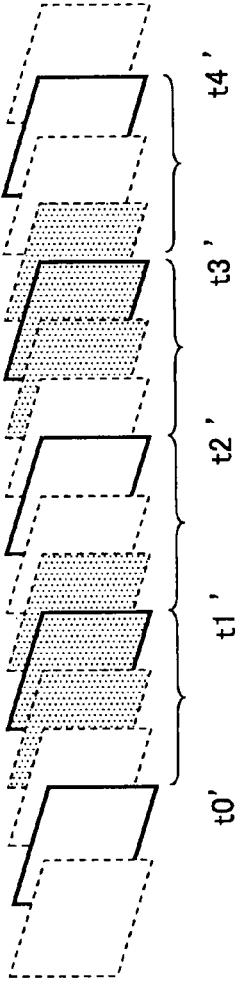

FIG.126A
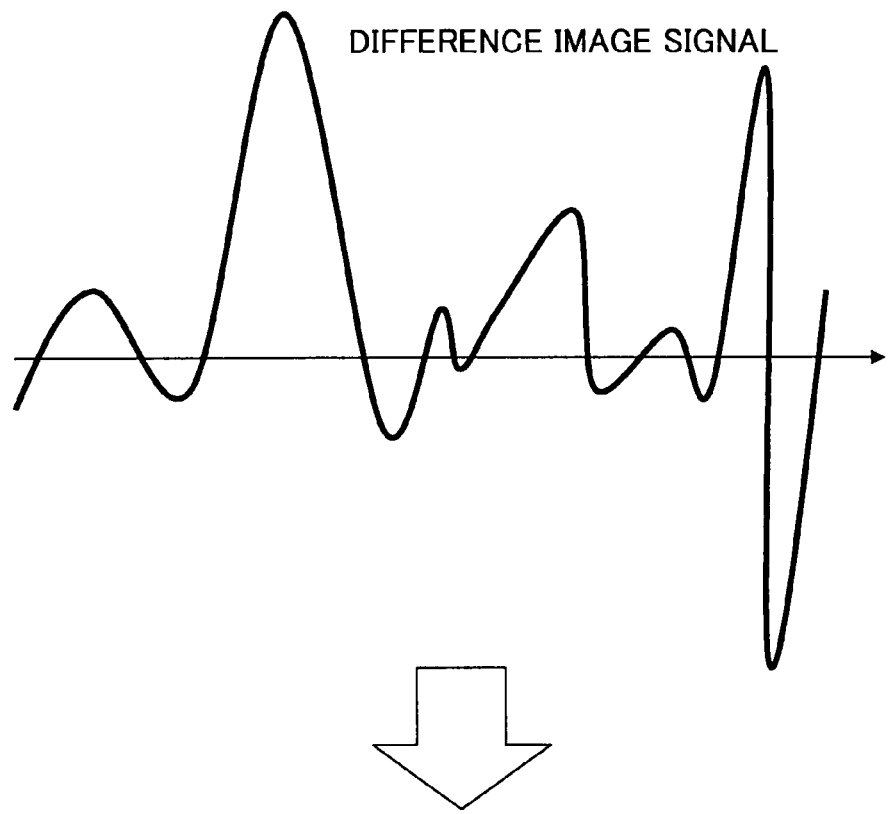
DIFFERENCE IMAGE SIGNAL
CLIPPING WITH THRESHOLD
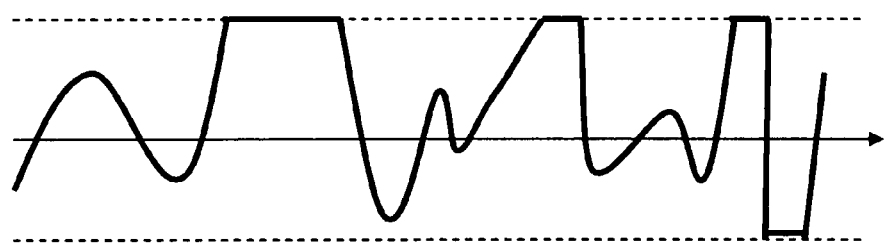

FIG.126B
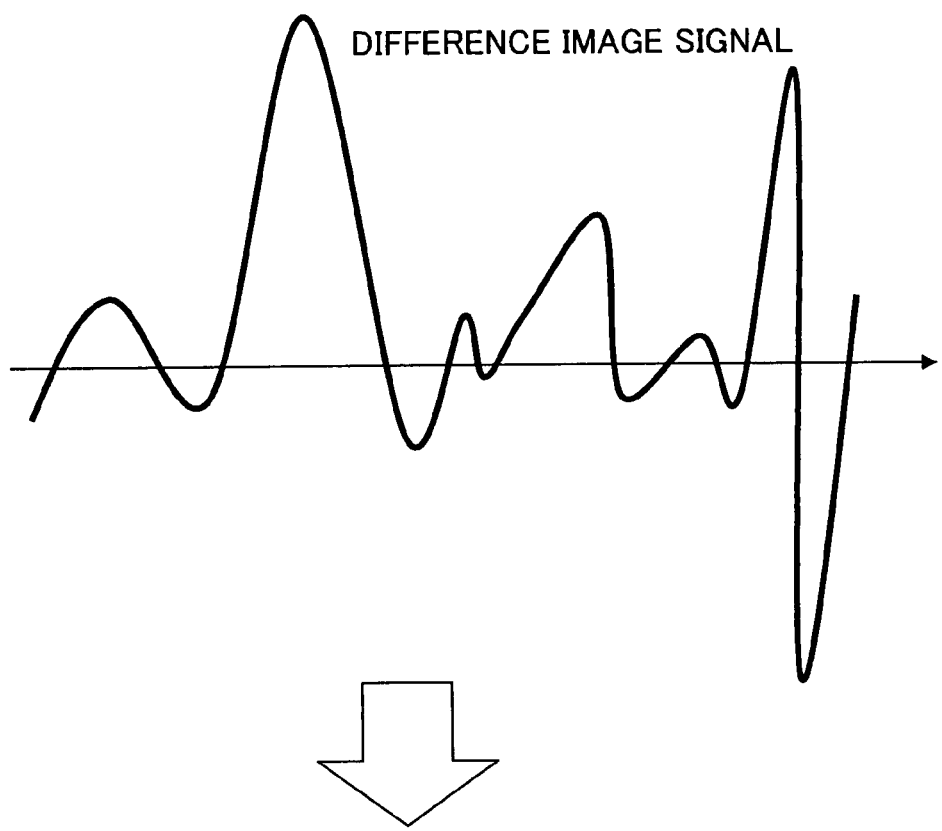
DIFFERENCE IMAGE SIGNAL
⇩
CHANGE DATA EQUAL TO OR GREATER THAN THRESHOLD TO 0
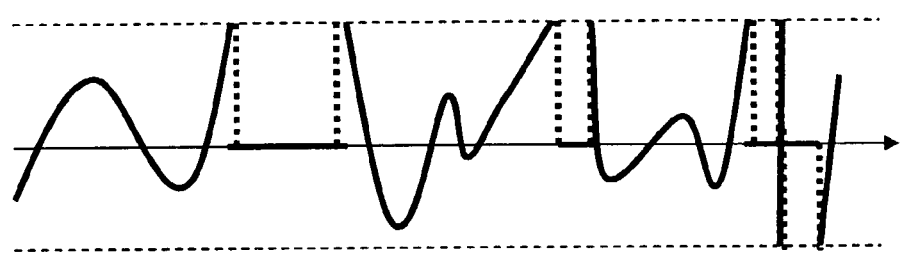

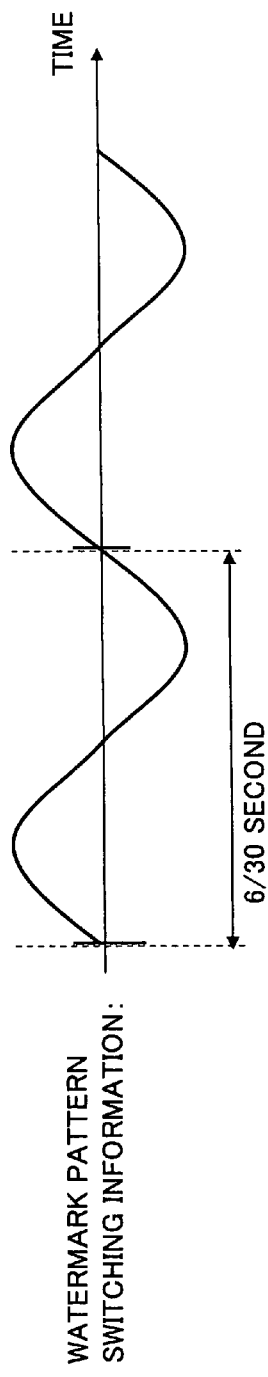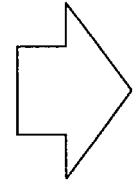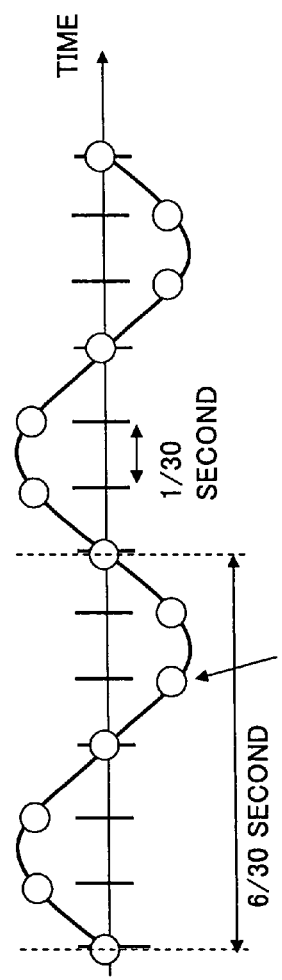
FIG.132

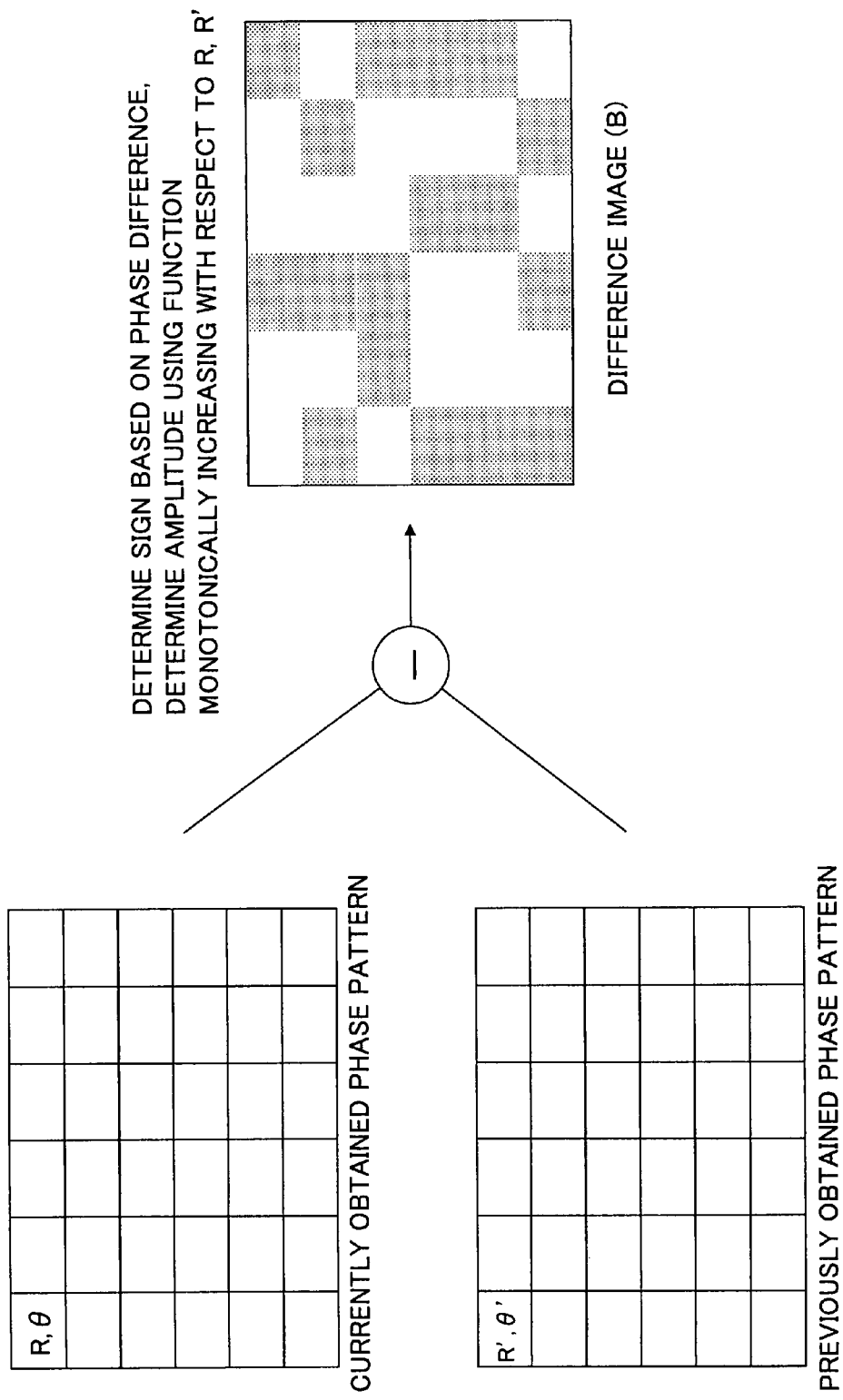

WHEN $\theta - \theta' = 0 \sim \pi$

SIGN="+"

WHEN $\theta - \theta' = -\pi \sim 0$

SIGN = "−"

FIG.142
IN THE CASE OF "+" SIGN PATTERN ELEMENT
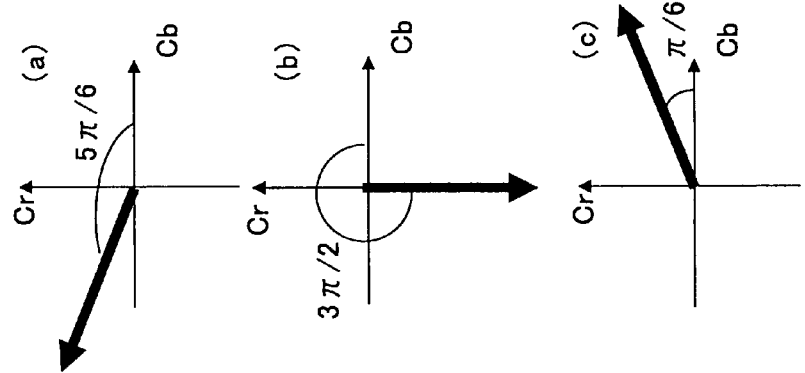
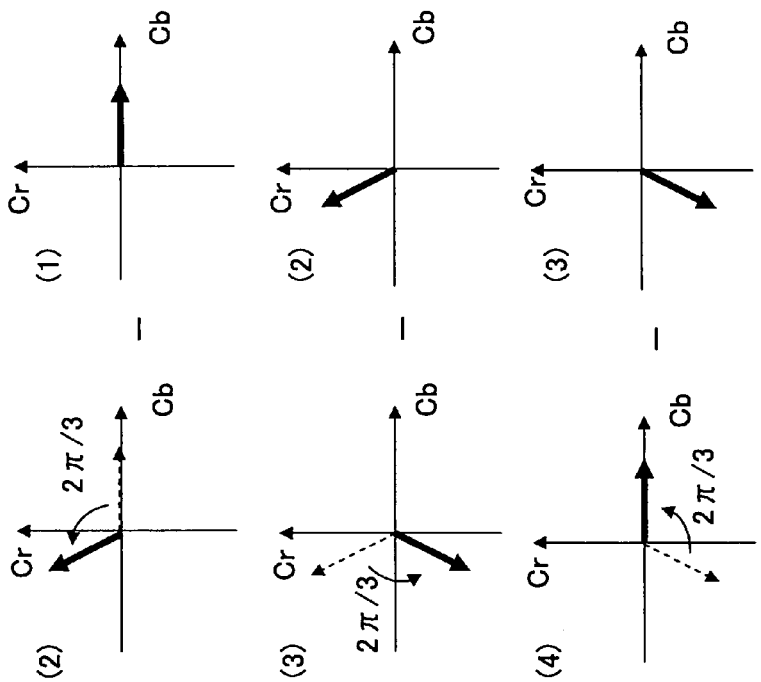
(MEASURE DIFFERENCE OF VECTORS)

FIG.147
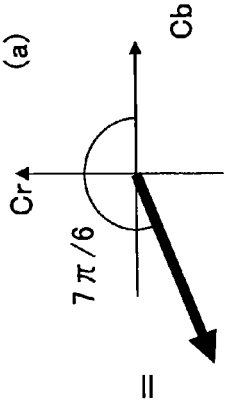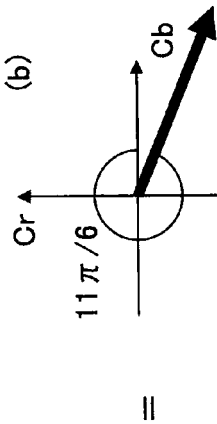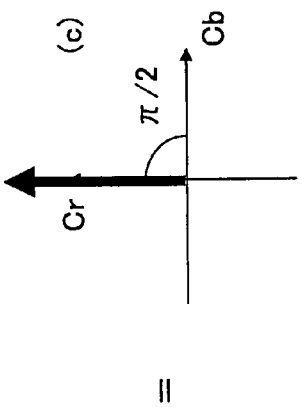
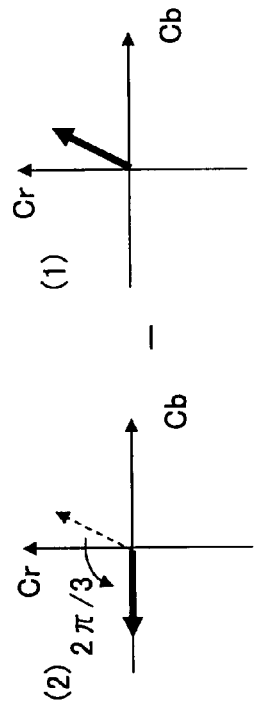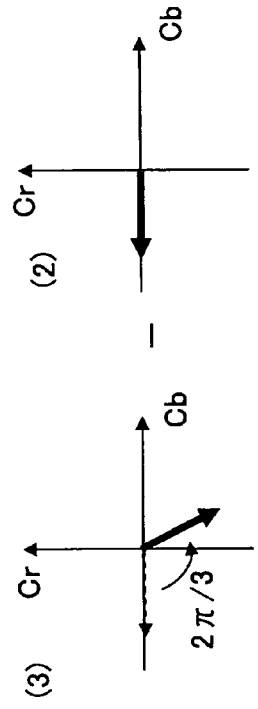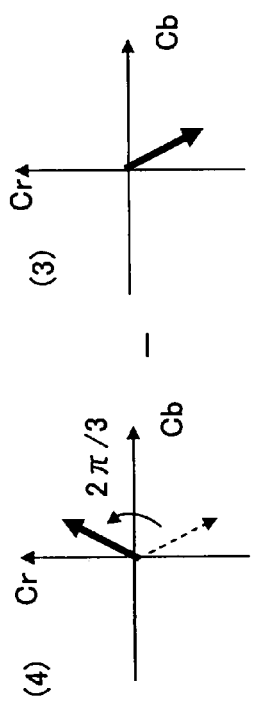

FIG.159
IN THE CASE OF "−" SIGN PATTERN ELEMENT
(MEASURE DIFFERENCE OF VECTORS)
| Cb-Cr VALUE OF WATERMARK PATTERN EMBEDDED IN CURRENT FRAME | Cb-Cr VALUE OF WATERMARK PATTERN EMBEDDED IN NEXT PREVIOUS FRAME | Cb-Cr VALUE OF WATERMARK PATTERN IN DIFFERENCE IMAGE (A) (PHASE VALUE IN PHASE PATTERN) |
|---|---|---|
| 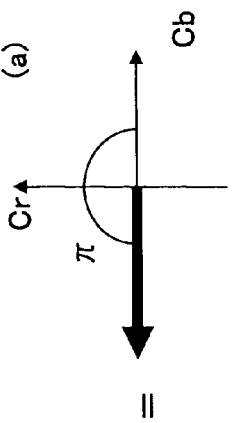 (2) | 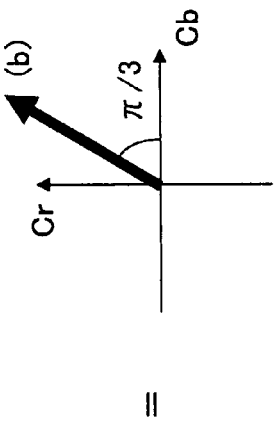 − (1) | 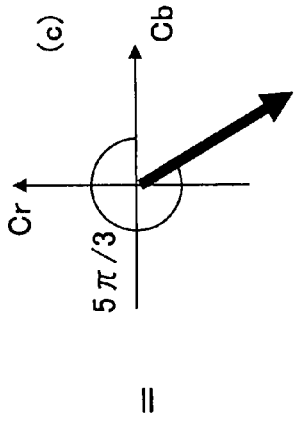 = (a) |
| 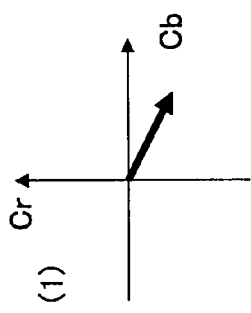 (3) | 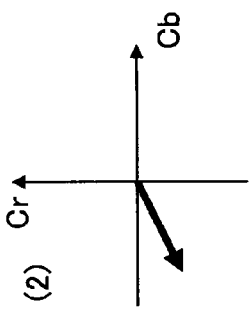 − (2) | 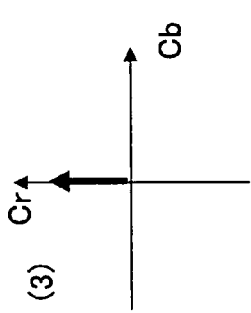 = (b) |
| 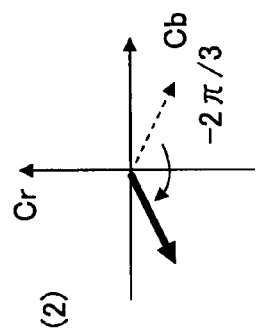 (4) | 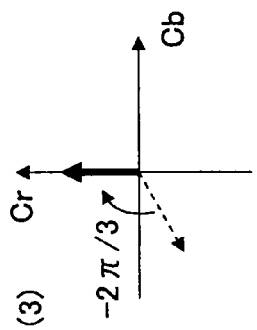 − (3) | 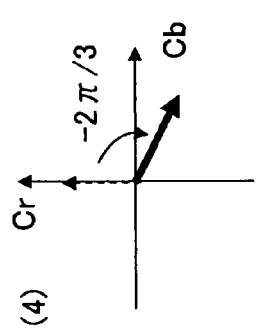 = (c) |

FIG.161
IN THE CASE OF "−" SIGN PATTERN ELEMENT
| Cb-Cr VALUE OF WATERMARK PATTERN IN CURRENT DIFFERENCE IMAGE (A) (PHASE VALUE IN PHASE PATTERN) | | Cb-Cr VALUE OF WATERMARK PATTERN IN NEXT PREVIOUS DIFFERENCE IMAGE (A) (PHASE VALUE IN PHASE PATTERN) | | (MEASURE DIFFERENCE OF PHASE) |
|---|---|---|---|---|
| 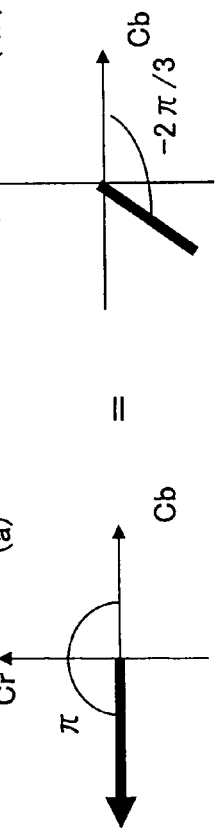 | − |  | = | 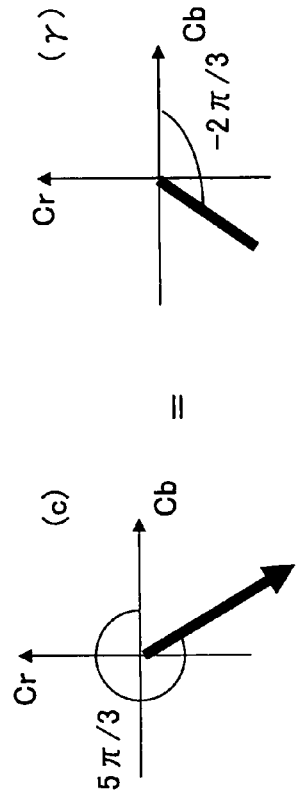 |

FIG.172
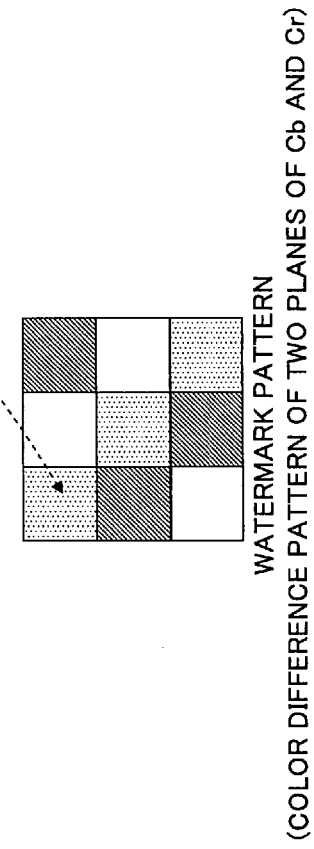
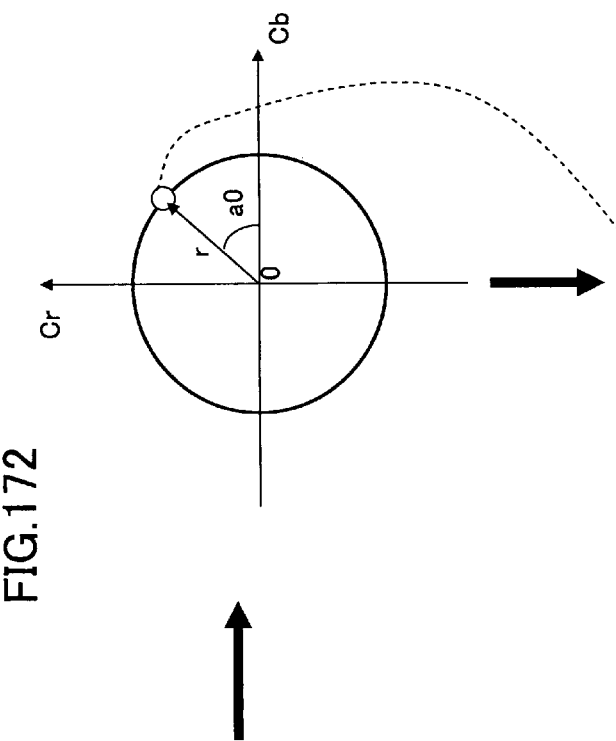

WHEN $\theta - \theta' = -\pi \sim 0$

SIGN = "−"

DIGITAL WATERMARK PADDING METHOD, DIGITAL WATERMARK PADDING DEVICE, DIGITAL WATERMARK DETECTING METHOD, DIGITAL WATERMARK DETECTING DEVICE, AND PROGRAM

TECHNICAL FIELD

The present invention relates to a digital watermark embedding technique and a digital watermark detection technique. More particularly, the present invention relates to a digital watermark embedding technique for embedding sub-information into image content such that it is not perceived by a human, and a digital watermark detection technique for reading the sub-information.

BACKGROUND ART

Today, the digital watermarking technique is used for a content copy right protection/management system, content related service providing system and the like.

For the purpose of content identification/management, copyright protection/management, providing related information and the like when distributing content such as image, video and voice, there are methods using the digital watermark embedding technique for embedding other information into the content such that it is not perceived.

For example, there is a using method for inputting a still image such as printed material with a camera so as to obtain related information by detecting digital watermark from the input image (refer to non-patent document 1, for example).

In addition, there is a method for continuously performing camera input and digital watermark detection in real time to improve detection performance (refer to non-patent document 2, for example).

[Non-patent document 1] Nakamura, Katayama, Miyaji, Yamashita, Yamamuro, "Digital watermark detection scheme for service mediation using camera-equipped mobile-phone", Forum on Information Technology, FIT2003, N-020, September, 2003.

[Non-patent document 2] Nakamura, Miyatake, Hayashi, Katayama, Yamamuro, "Real time digital watermark detection scheme from camera input image", Forum on Information Technology, FIT2004, J-036, September, 2004.

DISCLOSURE OF THE INVENTION

Problem to be Solved by the Invention

However, there is no method for taking moving images such as images on a TV screen and performing digital watermark detection from the moving images in real time, for example. If there is such method, information related to the screen being broadcasted on the TV can be obtained, so that various information services that can be linked up with the moving image content in real time can be realized. However, there is a problem in that it is difficult to realize enough tolerability against noise occurring due to D/A conversion or A/D conversion associated with image taking by the camera. In addition, there is a problem in that it is difficult to identify which part is a digital watermark detection subject in a captured frame image taken with camera.

The present invention is contrived in view of the above-mentioned points, and an object is to provide a technique that did not exist in the past and that realizes taking moving images on a TV and the like with a camera to detect digital watermark from the moving images in real time. In addition, an object of the present invention is provide a technique that realizes identifying a part from which the digital watermark can be detected in the captured frame image so as to be able to detect digital watermark with reliability even under various conditions of camera taking angles and background images.

Means for Solving the Problem

The object can be achieved by a digital watermark embedding method in a digital watermark embedding apparatus for embedding digital watermark into moving images, including:

a step of inputting moving image data including a frame image group, watermark information and watermark pattern switching information specifying temporal change of watermark patterns;

a frame image obtaining step of sequentially obtaining, by frame image obtaining means, each frame image of the moving image data and frame display time that is display time of the frame image;

a watermark pattern generation step of generating, by watermark pattern generation means, a watermark pattern using the watermark information, the frame display time and watermark pattern switching information;

a watermark pattern superimposing step of superimposing, by watermark pattern superimposing means, the watermark pattern onto the frame image; and a moving image data reconstruction step of combining watermark embedded frame images obtained by sequentially repeating processes of the frame image obtaining means, processes of the watermark pattern generation means and processes of the watermark pattern superimposing means to generate watermark embedded moving image data.

In the watermark pattern generation step, timing for switching the watermark pattern may be repeated in a constant period.

The watermark pattern generation step may includes:

a step of generating the watermark pattern corresponding to the watermark information using the watermark information, the frame display time and the watermark pattern switching information; and steps of generating a watermark pattern for phase determination, using the frame display time and the watermark pattern switching information, that is used for estimating temporal change status of the watermark pattern when performing detection, and multiplexing the watermark pattern for phase determination into the watermark pattern corresponding to the watermark information so as to obtain a pattern as the watermark pattern.

The object can be also achieved by a digital watermark embedding method in a digital watermark embedding apparatus for embedding digital watermark into moving images, including:

a step of inputting moving image data including a frame image group, watermark information and watermark pattern switching information that is period information specifying phase change of watermark patterns;

a frame image obtaining step of sequentially obtaining, by frame image obtaining means, each frame image of the moving image data and frame display time that is display time of the frame image;

a watermark pattern generation step of generating, by watermark pattern generation means, a watermark pattern using the watermark information, the frame display time and watermark pattern switching information;

a watermark pattern superimposing step of superimposing, by watermark pattern superimposing means, the watermark pattern onto the frame image; and a moving image data reconstruction step of combining watermark embedded frame images obtained by sequentially repeating steps from the frame image obtaining step to the watermark pattern superimposing step to generate watermark embedded moving image data.

In the digital watermark embedding method, the watermark pattern generation step may include:

a basic watermark pattern generation step of generating a basic watermark pattern using the watermark information; and a step of adding phase change determined in the basic watermark pattern to a next previous watermark pattern using the frame display time and the watermark pattern switching information to generate a new watermark pattern.

The watermark pattern generation step may include:

a basic watermark pattern generation step of generating a basic watermark pattern using the watermark information;

a sign pattern generation step of generating a sign pattern based on pixel values of the basic watermark pattern;

a phase change value calculation step of obtaining a watermark pattern switching phase change value corresponding to time difference from a next previous frame using the frame display time and the watermark pattern switching information;

watermark phase pattern generation steps of providing signs of each element of the sign pattern generated in the sign pattern generation step to the watermark pattern switching phase change value to obtain phase differences from a next previous watermark phase pattern, and generating a watermark phase pattern for the current frame using the phase differences; and a watermark phase pattern imaging step of generating the watermark pattern based on the watermark phase pattern.

The watermark pattern generation step may include:

a step of increasing or decreasing amplitude of a corresponding pixel value in the watermark pattern based on each pixel value of the basic watermark pattern when generating the watermark pattern from the watermark phase pattern.

The watermark pattern generation step may include:

a step of associating phase difference change represented by the basic watermark pattern with rotation amount in a coordinate system obtained from image components so as to generate the watermark pattern based on new component values obtained by rotating by the phase difference change.

In the digital watermark embedding method, Cb-Cr components of an image may be used as the image components.

The watermark pattern generation step may include:

a step of dividing the watermark information into data blocks using the watermark information, the frame display time and the watermark pattern switching information; and a step of generating the watermark pattern based on a data block ID and data block information of the data block ID which are determined from the frame display time and the watermark pattern switching information.

The watermark pattern generation step may include:

a step of dividing the watermark information into data blocks using the watermark information, the frame display time and the watermark pattern switching information; and a step of generating the watermark pattern such that the data block ID also serves as watermark information for phase determination when generating the watermark pattern based on the data block ID and data block information of the data block ID which are determined from the frame display time and the watermark pattern switching information.

The watermark superimposing step may include:

a step of changing scale of the watermark pattern to a size equal to or less than the frame image so as to superimpose the watermark pattern in the inside of the frame image.

In the digital watermark embedding method, the watermark pattern generation step may include:

a step of generating a basic watermark pattern using the watermark information;

a step of adding a positioning pattern for extracting a detection subject region when performing digital watermark detection to the basic watermark pattern; and a step of generating the watermark pattern by changing the basic watermark pattern using the frame display time and the watermark pattern switching information.

In the digital watermark embedding method, the watermark pattern generation step may include steps of:

modulating the watermark information into the basic watermark pattern using existing two-dimensional code; and generating the watermark pattern from the basic watermark pattern using the frame display time and the watermark pattern switching information.

The digital watermark embedding apparatus may include a plurality of watermark pattern generation means, and in the digital watermark embedding step, each of the watermark pattern generation means generates a different watermark pattern, and the watermark pattern superimposing means superimposes a plurality of watermark patterns onto the frame image.

The watermark pattern superimposing step may include:

a step of amplifying amplitude of the watermark patter wherein the larger movement included in the frame image is, the greater the amplitude of the watermark patter for the frame image is.

The watermark pattern superimposing step may include steps of:

storing a previously received frame image into storing means; and generating a difference image between a currently received frame image and the previous frame image to amplify the amplitude of the basic watermark pattern based on pixel values of the difference image.

In the digital watermark embedding method, the watermark pattern superimposing step may include a step of amplifying amplitude of the whole of the watermark pattern.

Further, the watermark pattern superimposing step may include a step of amplifying a pixel region of the watermark pattern corresponding to a pixel region where movement is large in the frame image.

The object can be achieved by a digital watermark detection method in a digital watermark detection apparatus for detecting digital watermark from moving images, including:

a moving image input step of sequentially obtaining a frame image by moving image input means;

a difference image generation step of generating, by difference image generation means, a difference image between the currently obtained frame image and a previously obtained frame image; and a digital watermark detection step of performing, by digital watermark detection means, digital watermark detection from the difference image to output a digital watermark detection status, wherein, in a case where digital watermark detection process is continued including a case where previous digital watermark detection is impossible, the moving image input means obtains a new frame image again so that each of the above steps is repeated.

The digital watermark detection method may include:

obtaining a data block ID and data block information from the watermark information obtained in the digital watermark detection step;

recording the detected data block information into information corresponding to the data block ID in a detected watermark information buffer; and outputting information indicating that digital watermark detection succeeds when detection for every data block ID completes.

The moving image input step may include a step of sequentially obtaining the frame image and frame display time that is display time of the frame image, and the digital watermark detection method may further include:

a determination step of determining detection necessity based on a time interval between the current frame display time and frame display time of the previously obtained frame image using watermark pattern switching information used when embedding digital watermark, wherein, when it is determined that detection is unnecessary in the determination step, the moving image input means obtains a new frame image again, and when it is determined that detection is necessary, processes after the difference image generation step are continued.

The digital watermark detection method may include a capture timing control step of setting timing for capturing frames using the watermark pattern switching information used when performing digital watermark embedding, wherein the moving image input means sequentially obtains the frame image based on the capture timing.

The digital watermark detection method may include a step of setting difference timing representing a time interval between frames for obtaining the difference image using the watermark pattern switching information used when performing digital watermark embedding, wherein the moving image input means sequentially obtains the frame image and the frame display time, and the difference image generation means generates the difference image between the currently obtained frame image and a frame image obtained a time before wherein the time is specified by the difference timing.

In the digital watermark detection method, the digital watermark detection step may include steps of:

determining a phase of a watermark pattern embedded in the difference image; and when the phase of the watermark pattern is reversed, performing bit reversal of detected watermark information and outputting the digital watermark detection status.

The digital watermark detection method may include:

adding the difference image to a difference image storing buffer in the difference image generation step;

performing digital watermark detection from the difference image storing buffer to detect watermark information and output the detection status in the digital watermark detection step.

The digital watermark detection method may include:

a step of determining a phase of the watermark pattern embedded in the difference image; and a step of changing the difference image such that phases of all difference images sequentially processed become the same, wherein the difference image generation step and the digital watermark detection step are performed using the difference image obtained in these steps.

The digital watermark detection step may include steps of:

storing a correlation value calculated when performing detection into storing means each time when detection process is performed; and determining whether detection succeeds using the stored correlation value.

The digital watermark detection step may include the steps of:

storing an absolute value of a correlation value calculated when performing detection into storing means each time when detection process is performed; and determining whether detection succeeds using the stored absolute value of the correlation value.

The digital watermark detection method may include:

a step of determining a phase of the watermark pattern in the difference image based on relationship between the watermark pattern switching information used when performing embedding and the frame display time obtained when obtaining the frame image.

The digital watermark detection method may include steps of:

detecting a bit value of a predetermined bit position in the watermark information represented by the watermark pattern embedded in the difference image; and determining the phase of the watermark pattern in the difference image based on the bit value.

The digital watermark detection method may include:

a step of detecting watermark for phase determination so as to determine the phase of the watermark pattern in the difference image.

The digital watermark detection method may include:

a step of determining the phase of the watermark pattern in the difference image using polarity of plus or minus of a correlation value calculated in watermark detection process.

The digital watermark detection method may include steps of:

detecting data block information and a data block ID that are watermark information by performing digital watermark detection from the difference image; and determining the phase of the watermark pattern embedded in the difference image using polarity of plus or minus of a correlation value obtained when detecting the data block ID.

The difference image generation step may include the steps of:

generating the difference image between the currently obtained frame image and a previously obtained frame image;

obtaining a phase value and an amplitude value based on a particular component in the difference image;

determining a group, among a plurality of given groups, to which the phase value belongs; and correcting the difference image based on the determination result and the amplitude value to output the difference image.

In the digital watermark detection method, the difference image generation step may include steps of generating a difference image (A) between the currently obtained frame image and a previously obtained frame image read from image storing means, and storing the currently obtained frame image into the image storing means, and the digital watermark detection method may include phase difference measurement steps of:

generating a phase pattern based on the currently obtained difference image (A);

measuring a phase difference between the currently obtained phase pattern and a previously obtained phase pattern read from phase pattern storing means;

generating a difference image (B) based on the phase difference; and storing the currently obtained phase pattern in the phase pattern storing means, and the digital watermark detection step may include a step of performing digital watermark detection from the difference image (B) to output the digital watermark detection status.

The phase difference measurement step may include steps of:

when generating the phase pattern from the difference image (A), obtaining an amplitude value with a phase value as an element value of the phase pattern;

measuring a phase difference between the currently obtained phase pattern and a previously obtained phase pattern to determine a sign based on the phase difference; and generating the difference image (B) based on amplitude values of the currently obtained phase pattern and the previously obtained phase pattern, and the sign.

The phase difference measurement step may include steps of:

when generating the phase pattern from the difference image (A), obtaining an amplitude as a value monotonically increasing with respect to amplitude values of the currently obtained phase pattern and the previously obtained phase pattern; and obtaining the difference image (B) based on a value obtained by combining the amplitude and the sign.

In the digital watermark detection method, the particular component in the difference image in the difference image generation step may include a plurality of components.

The digital watermark detection method may include:

when obtaining the phase pattern from the difference image (A) in the phase difference measurement step, using a phase and an amplitude in a coordinate system obtained from a plurality of components in the difference image (A).

The particular component in the difference image may be a Cb component and a Cr component.

The digital watermark detection method may further include a step of adding the difference image (B) into a difference image storing buffer, and the digital watermark detection step may include a step of performing digital watermark detection from the difference image storing buffer to detect watermark information and output the detection status.

The digital watermark detection method may include steps of:

extracting a detection subject region in a current frame image of sequentially obtained frame images; and correcting distortion and normalizing the size to generate a detection subject region image, and in the difference image generation step, generating a difference image between a currently obtained detection subject region image and a previously obtained detection subject region image.

The digital watermark detection method may include steps of:

extracting a detection subject region from the sequentially obtained difference image to generate a detection subject region image, and in the difference image generation step, performing digital watermark detection from the detection subject region image to output the detection status.

The digital watermark detection method may include:

a feature region extraction step of, after sequentially obtaining the frame image, extracting a feature region from the frame image, and performing distortion correction and size normalization to generate a feature region image;

a difference image generation step of generating a difference image between a currently obtained feature region image and a previously obtained feature region image;

a detection subject region extraction step of extracting a detection subject region from the difference image to generate a detection subject region image; and a digital watermark detection step of performing digital watermark detection from the detection subject region.

The detection subject region extraction step may include a step of, when extracting the detection subject region from the difference image, changing pixel values of the difference image into absolute values and searching for the detection subject region.

The detection subject region extraction step may include a step of, when extracting the detection subject region from the difference image, searching for the detection subject region using a positioning pattern added to the basic watermark pattern used when performing embedding.

The detection subject region extraction step may include a step of:

searching a neighborhood region of a detection subject region where the detection status is good in past digital watermark detection trial to perform current detection subject region extraction process.

The detection subject region extraction step may include a step of:

determining the phase of the watermark pattern in the difference image using the positioning pattern.

The detection subject region extraction step may include steps of:

adding and storing the difference image into storing means; and searching for and extracting the detection subject region from the stored difference image.

The detection subject region extraction step may include a step of:

when adding and storing the difference image into the storing means, aligning the phase of the watermark pattern in the difference image to perform the adding and storing.

The object can be also achieved by a digital watermark detection method in a digital watermark detection apparatus for detecting digital watermark from moving images, including:

a frame image obtaining step of sequentially obtaining a frame image by moving image input means;

a feature region extraction step of extracting, by feature region extraction means, a feature region in the frame image to obtain a feature region image;

a difference image generation step of generating, by difference image generation means, a difference image between a currently obtained feature region image and a previously obtained feature region image read from a feature region image buffer to obtain a difference image (A), and storing the currently obtained feature region image into the feature region image buffer;

a phase difference measurement step, performed by phase difference measurement means, of generating a phase pattern based on the currently obtained difference image (A), measuring a phase difference between the currently obtained phase pattern and a previously obtained phase pattern read from a phase pattern buffer, generating a difference image (B) based on the phase difference and amplitude, and storing the currently obtained difference image (A) into the phase pattern buffer;

a detection subject region extraction step, performed by detection subject region extraction means, of performing adding and storing for pixel values of the difference image (B) for each pixel, extracting a detection subject region from a difference image (B) storing buffer obtained by the adding and storing to obtain a detection subject region image;

a digital watermark detection step of performing, by digital watermark detection means, digital watermark detection from the detection subject region image to output digital watermark detection status; and a step of obtaining, by the moving image input means, a new frame image again so as to repeat each of the above steps in a case where digital watermark detection process is continued including a case where digital watermark detection is impossible.

The detection subject region extraction step may include the steps of:

when extracting the detection subject region from the difference image (B) obtained by adding and storing, extracting the detection subject region from pixel values that are converted to absolute values in the difference image (B) storing buffer; and obtaining an image of the detection subject region in the difference image (B) storing buffer before being converted to the absolute values as the detection subject region image.

The digital watermark detection method may include:

extracting a plurality of detection subject regions in the detection subject extraction step; and performing digital watermark detection trial for each of the plurality of detection subject regions to output the detection result in the digital watermark detection step.

The digital watermark detection step may include a step of detecting watermark information using decoding processes for existing two-dimensional code when detecting the watermark information.

In the digital watermark detection method may include a step of:

performing filtering process on the difference image generated by subtraction process to output a difference image to which the filtering process is performed. A non-linear filter may be used as the filtering process.

In the digital watermark detection method, the moving images to be input may be video signals that are taken by a camera and captured.

The digital watermark detection method may include a step, performed by external output means for outputting a screen or sound, of performing feedback output according to any one or more of detection subject region extraction status, digital watermark detection status and data block detection status.

The digital watermark detection method may include:

further generating detection subject region information indicating a size and a position of the detection subject region in the detection subject region extraction step; and a zooming process step of setting a zooming parameter for changing the detection subject region to a given pixel size based on the detection subject region information, and performing zooming process by supplying the zooming parameter to the moving image input means.

The zooming process step may include steps of:

when the detection status in the digital watermark detection step is good, setting the zooming parameter for changing the detection subject region to a given pixel size based on the detection subject region information, and performing the zooming process by supplying the zooming parameter to the moving image input means.

The moving images to be input may captured by taking a state displayed on a display by a camera in real time, and the digital watermark detection method may include a step of obtaining information related to the displayed moving images based on watermark information obtained by digital watermark detection.

In addition, according to the present invention, a digital watermark embedding apparatus, a digital watermark detection apparatus, a program and a recording medium storing the program that are suitable for carrying out the method are provided.

EFFECT OF THE INVENTION

According to the present invention, a technique that realizes taking moving images on a TV and the like with a camera to detect digital watermark from the moving images in real time can be provided. In addition, a technique that realizes identifying a part from which the digital watermark can be detected in the captured frame image so as to be able to detect digital watermark with reliability even under various conditions of camera taking angles and background images can be provided.

BRIEF DESCRIPTION OF THE DRAWINGS

FIG. 1A is a flowchart of a digital watermark embedding method showing an outline A of an embodiment;

FIG. 6B is a block diagram of a digital watermark detection apparatus showing the outline C of the embodiment;

FIG. 15 is a figure (1) for explaining processes of the watermark pattern switching unit in the first embodiment of the present invention;

FIG. 27 is a figure for explaining processes of the detection necessity determination unit in the second embodiment of the present invention;

FIG. 28A is a figure for explaining effects of the second embodiment of the present invention;

FIG. 28B is a figure for explaining effects of the second embodiment of the present invention;

FIG. 33A is a figure (1) for explaining effects of the third embodiment of the present invention;

FIG. 33B is a figure (2) for explaining effects of the third embodiment of the present invention;

FIG. 38 is a figure (3) for explaining effects of the fourth embodiment of the present invention;

FIG. 48A is a figure for explaining contents of processes on the detection availability determination unit in the seventh embodiment of the present invention;

FIG. 51 is a figure for explaining processes of the watermark information dividing unit in the eighth embodiment of the present invention;

FIG. 53 is a block diagram of the digital watermark detection apparatus in the eighth embodiment of the present invention;

FIG. 80 is a figure for explaining processes of the detection subject region extraction unit in the fourteenth embodiment of the present invention;

FIG. 81A is a figure for explaining effects of the fourteenth embodiment of the present invention;

FIG. 81B is a figure for explaining effects of the fourteenth embodiment of the present invention;

FIG. 106 is a figure (1) for explaining the detection subject region extraction unit in the nineteenth embodiment of the present invention;

FIG. 107 is a figure (2) for explaining the difference image generation unit in the nineteenth embodiment of the present invention;

FIG. 108 is a figure (1) for explaining the processes of the watermark pattern superimposing unit in the twentieth embodiment of the present invention;

FIG. 109 is a figure (2) for explaining the processes of the watermark pattern superimposing unit in the twentieth embodiment of the present invention;

FIG. 110 is a figure for explaining processes of the difference image generation unit in the twentieth embodiment of the present invention;

FIG. 111 is a figure (1) for explaining processes of the detection subject region extraction unit in the twentieth embodiment of the present invention;

FIG. 112 is a figure (1) for explaining processes of the detection subject region extraction unit in the twentieth embodiment of the present invention;

FIG. 113 shows an example (1) of feedback output of the digital watermark detection apparatus in the twentieth embodiment of the present invention;

FIG. 114 shows an example (2) of feedback output of the digital watermark detection apparatus in the twentieth embodiment of the present invention;

FIG. 115 shows an example (3) of feedback output of the digital watermark detection apparatus in the twentieth embodiment of the present invention;

FIG. 116 shows an example (4) of feedback output of the digital watermark detection apparatus in the twentieth embodiment of the present invention;

FIG. 117 is a figure for explaining an example of watermark pattern switching information in the twenty first embodiment of the present invention;

Figure 118:
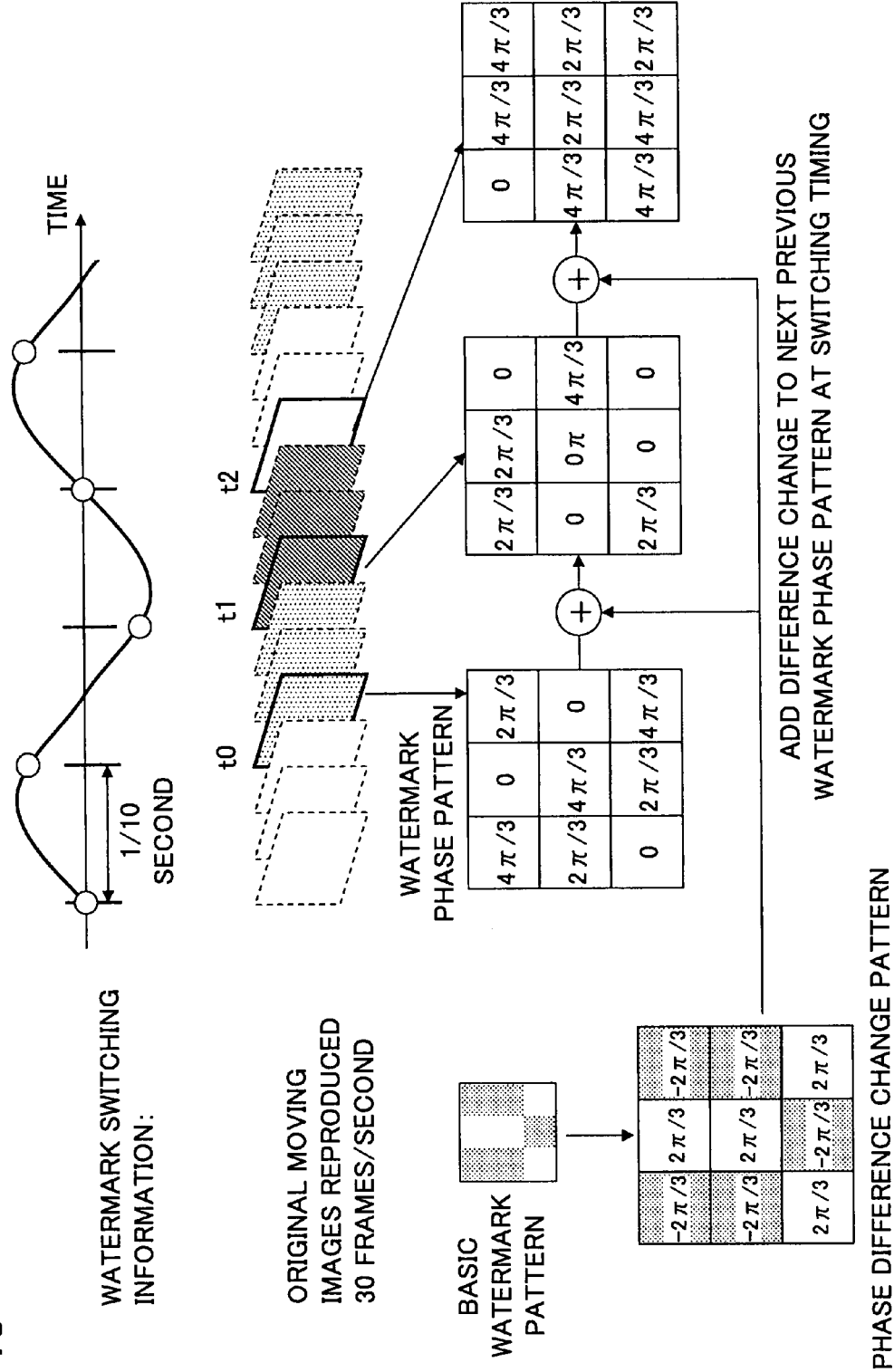
Figure 119:
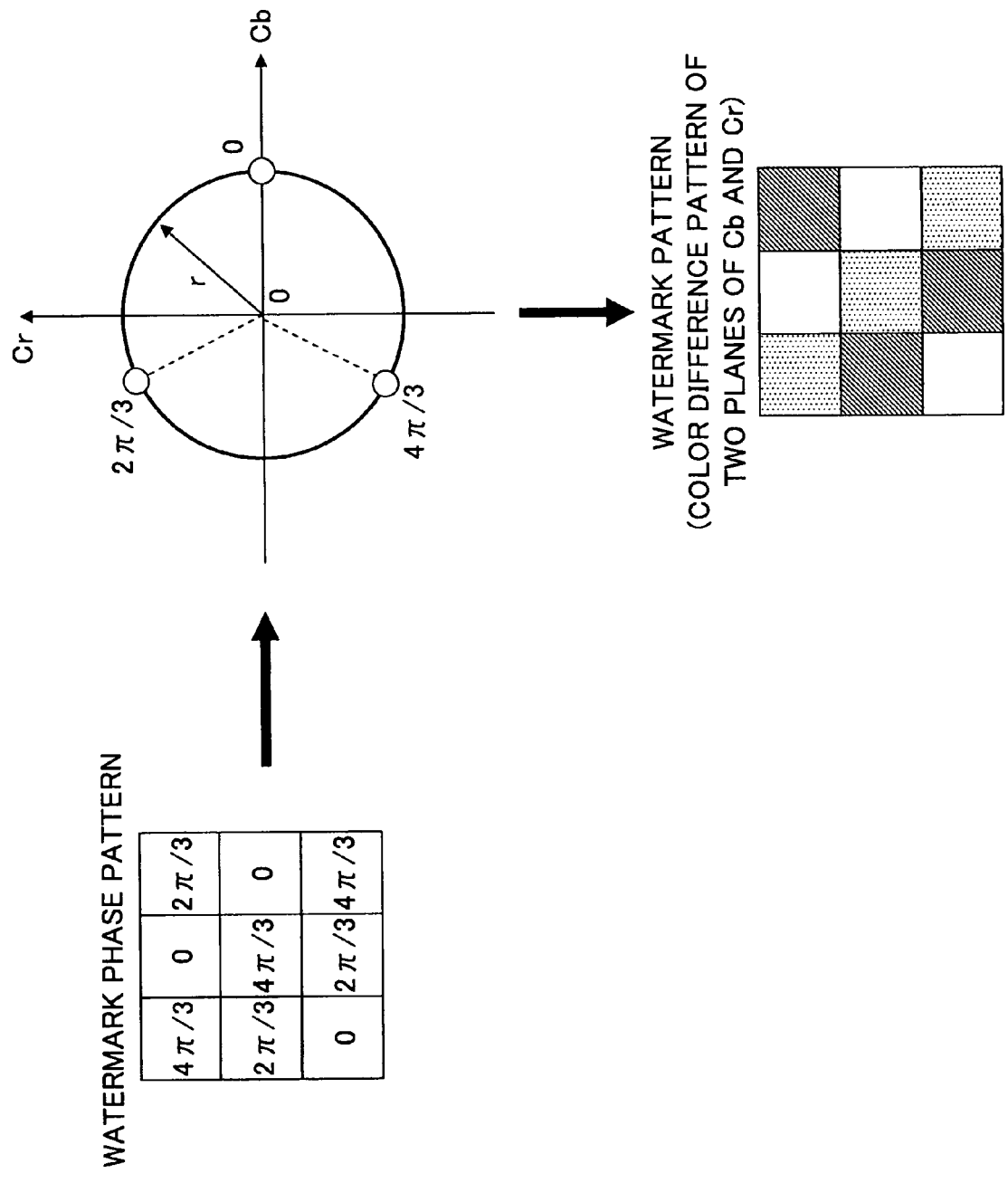
Figure 120:
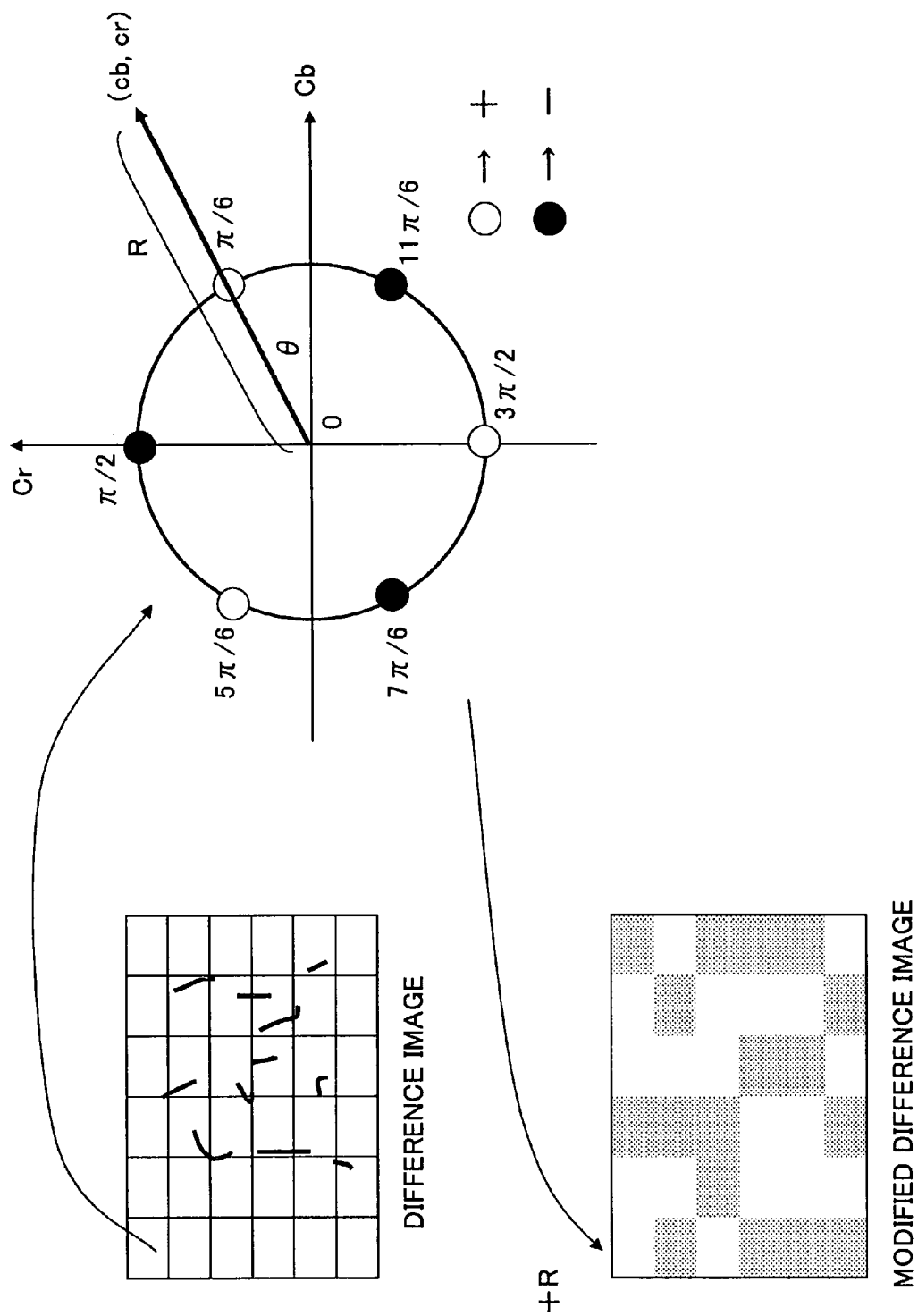
Figure 122:
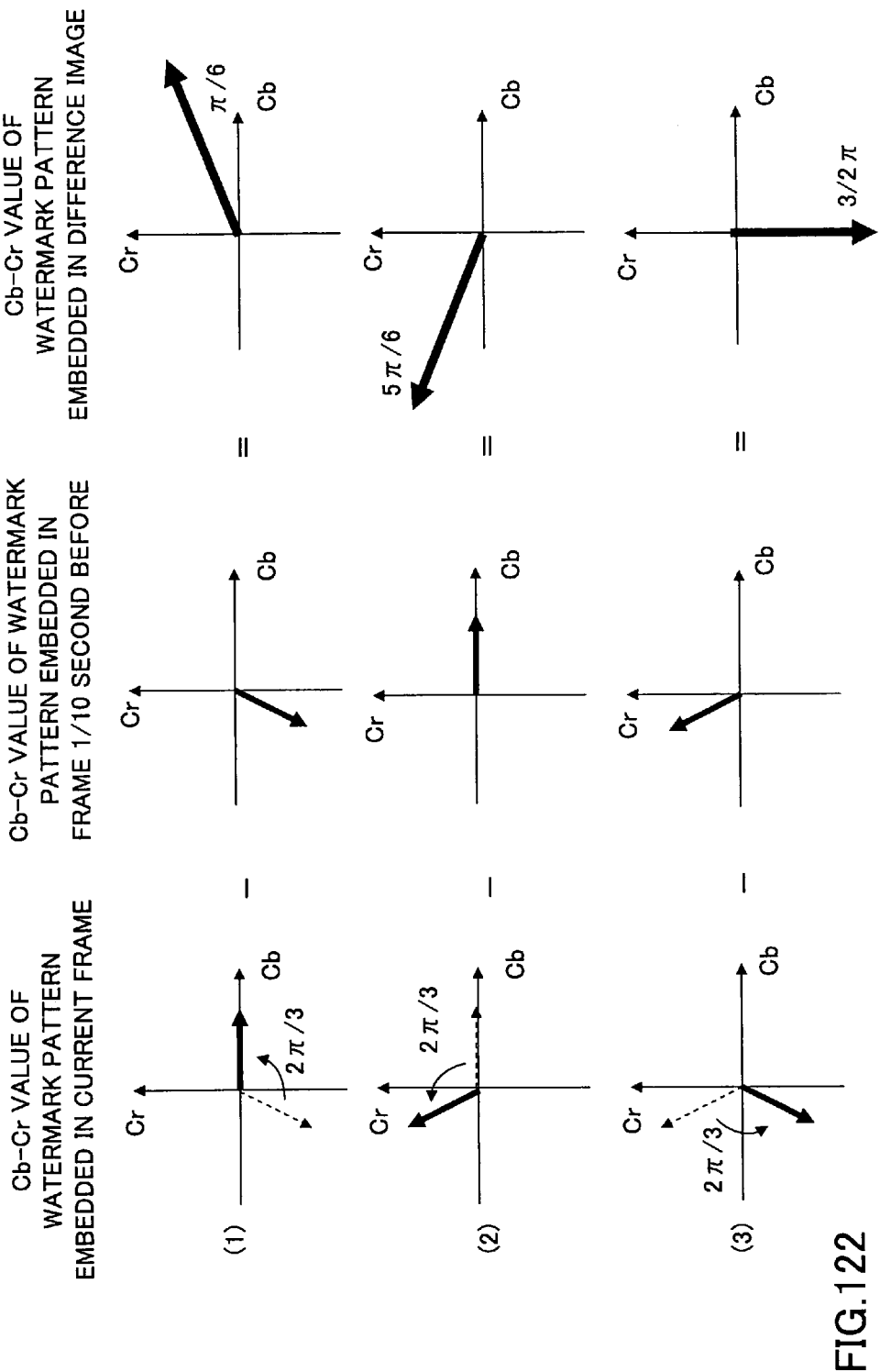
Figure 123:
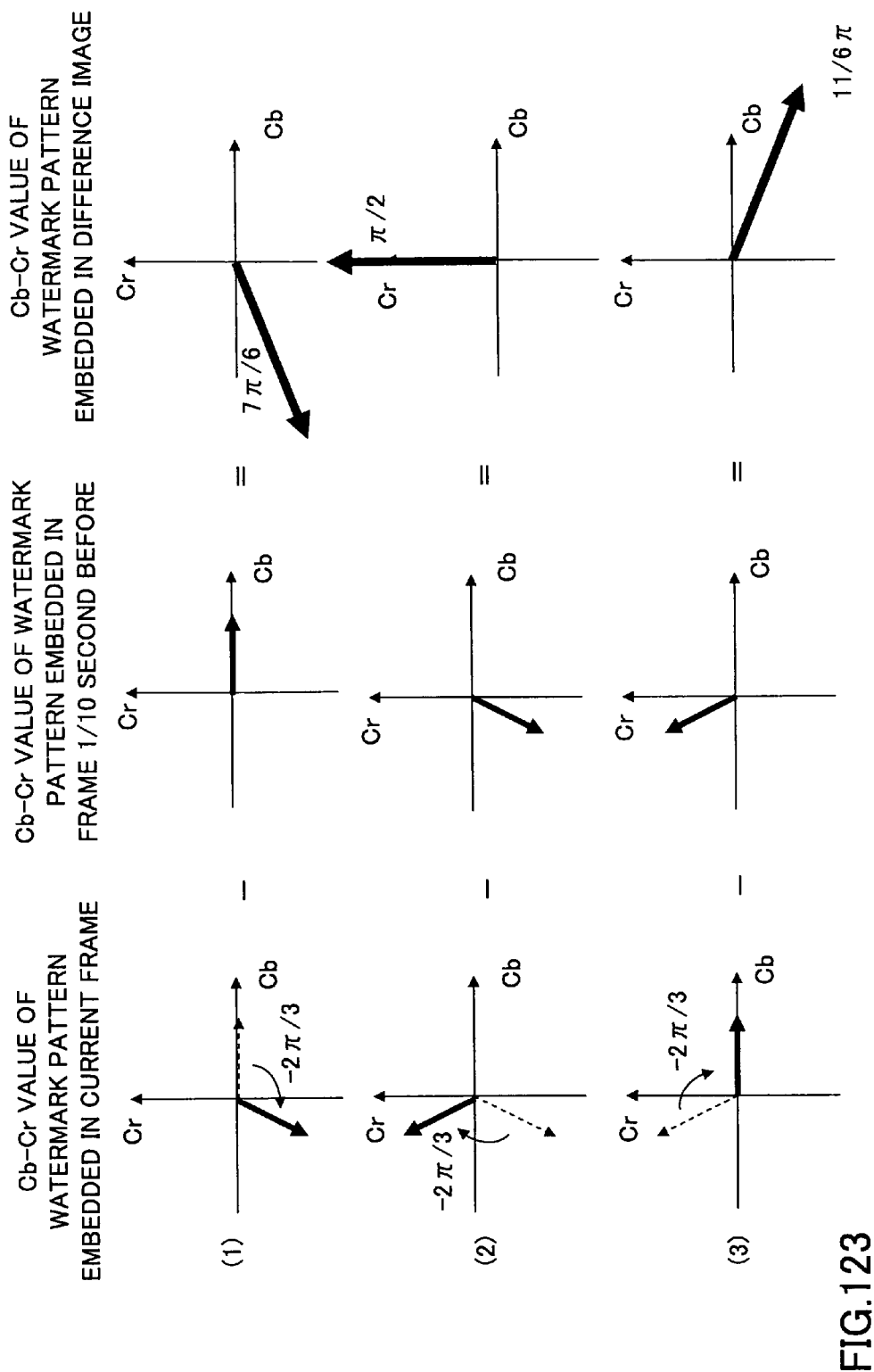
Figure 124:
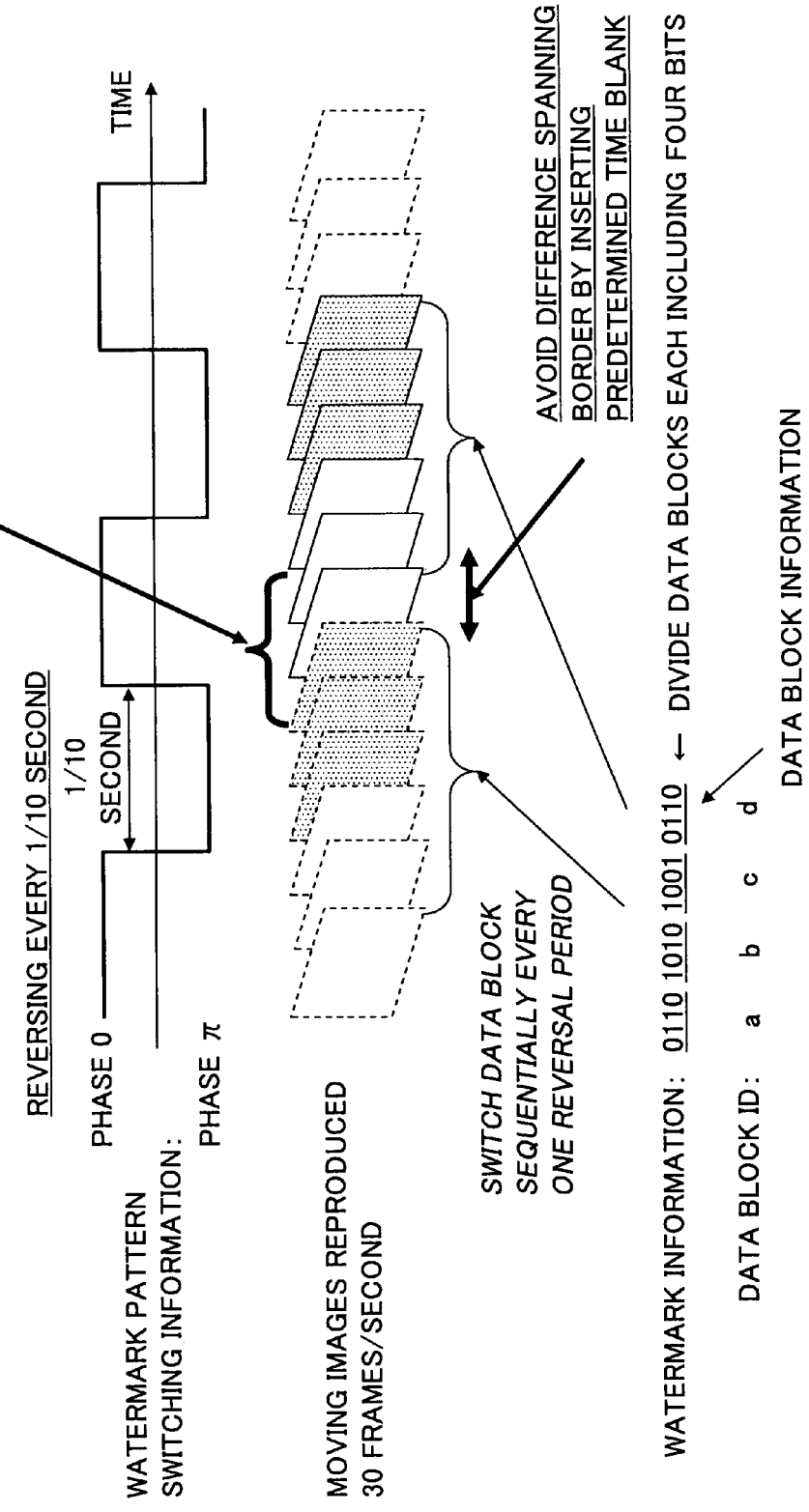
Figure 125:
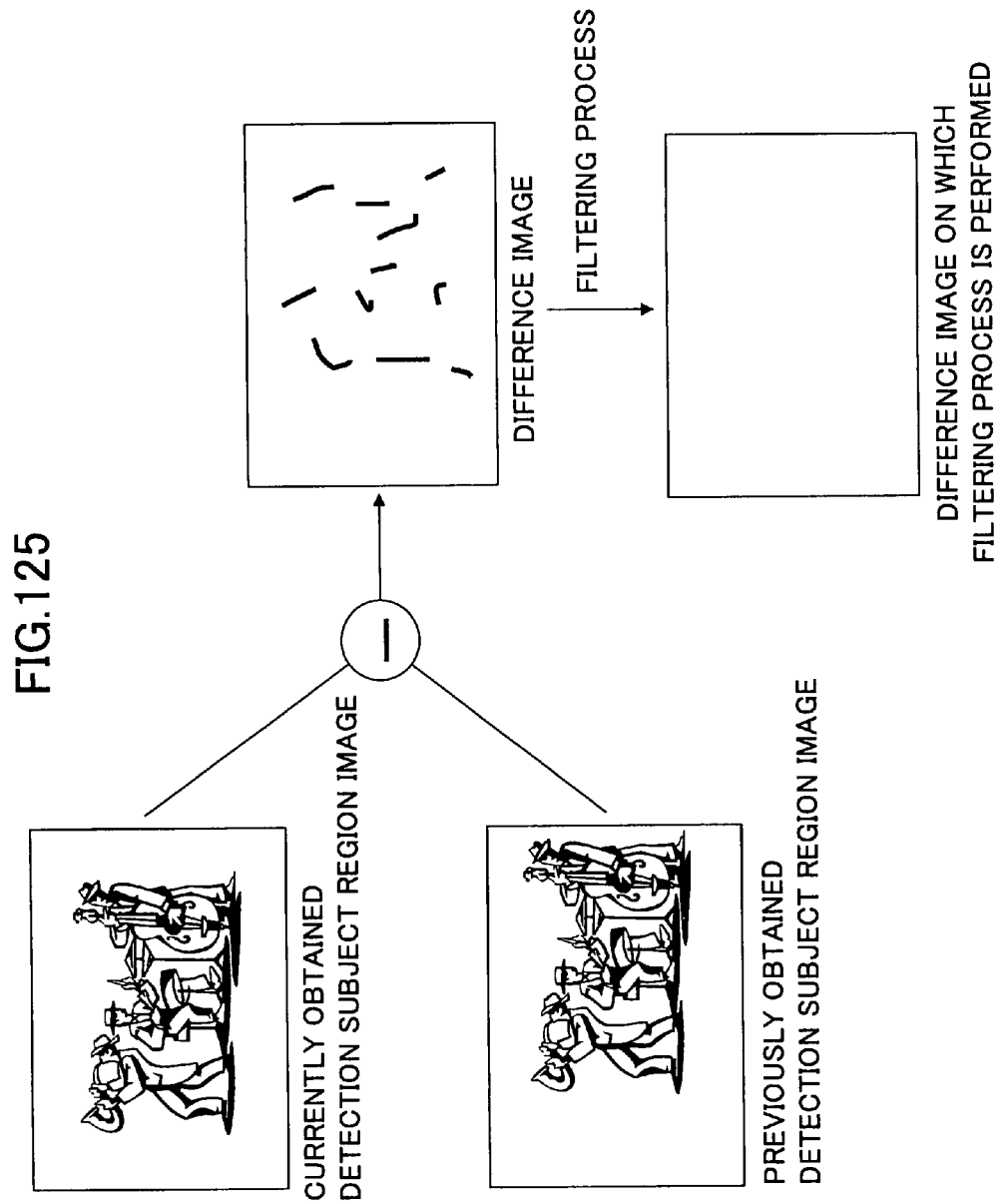
Figure 127:
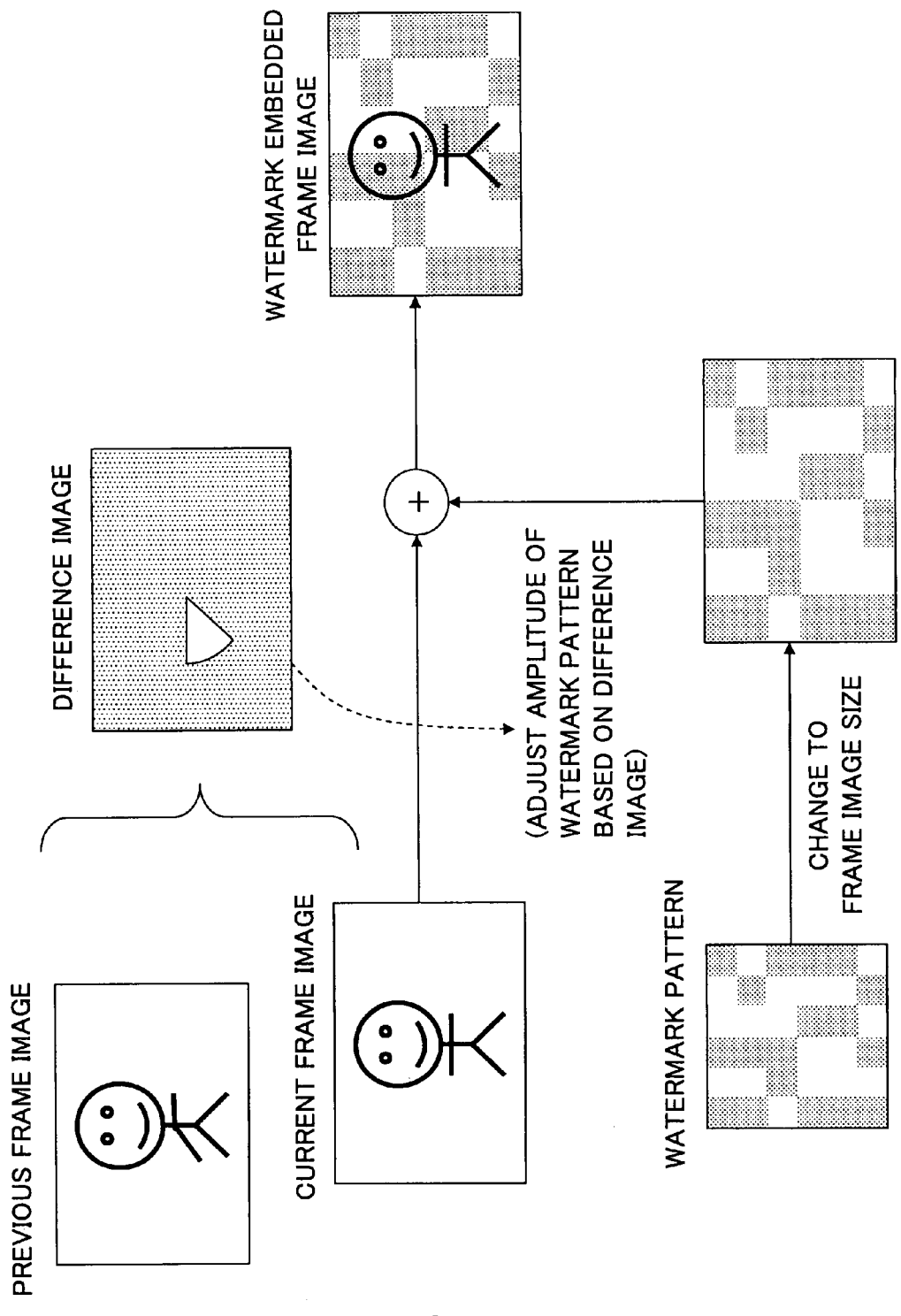
Figure 128:
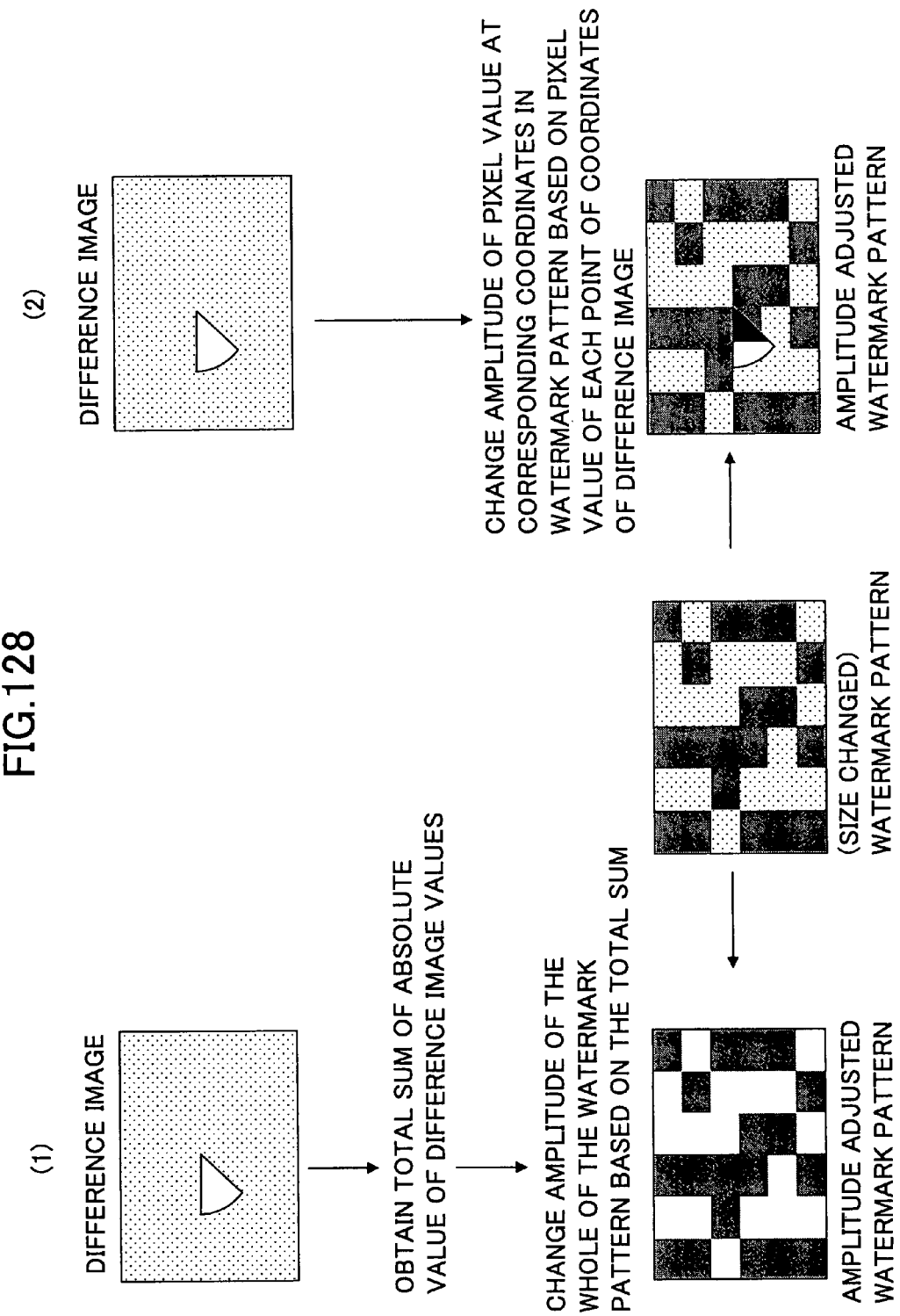
Figure 129:
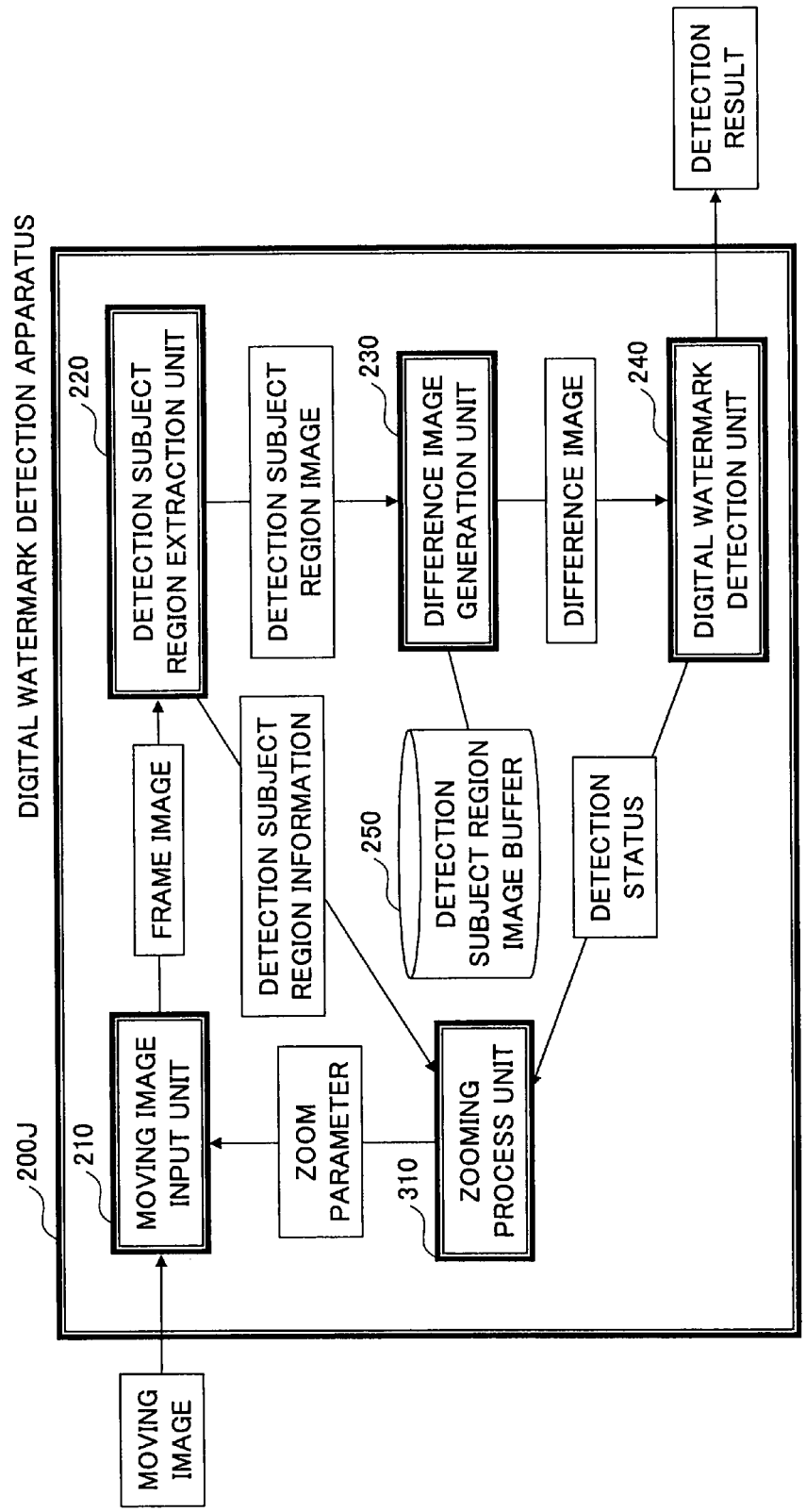
Figure 130:
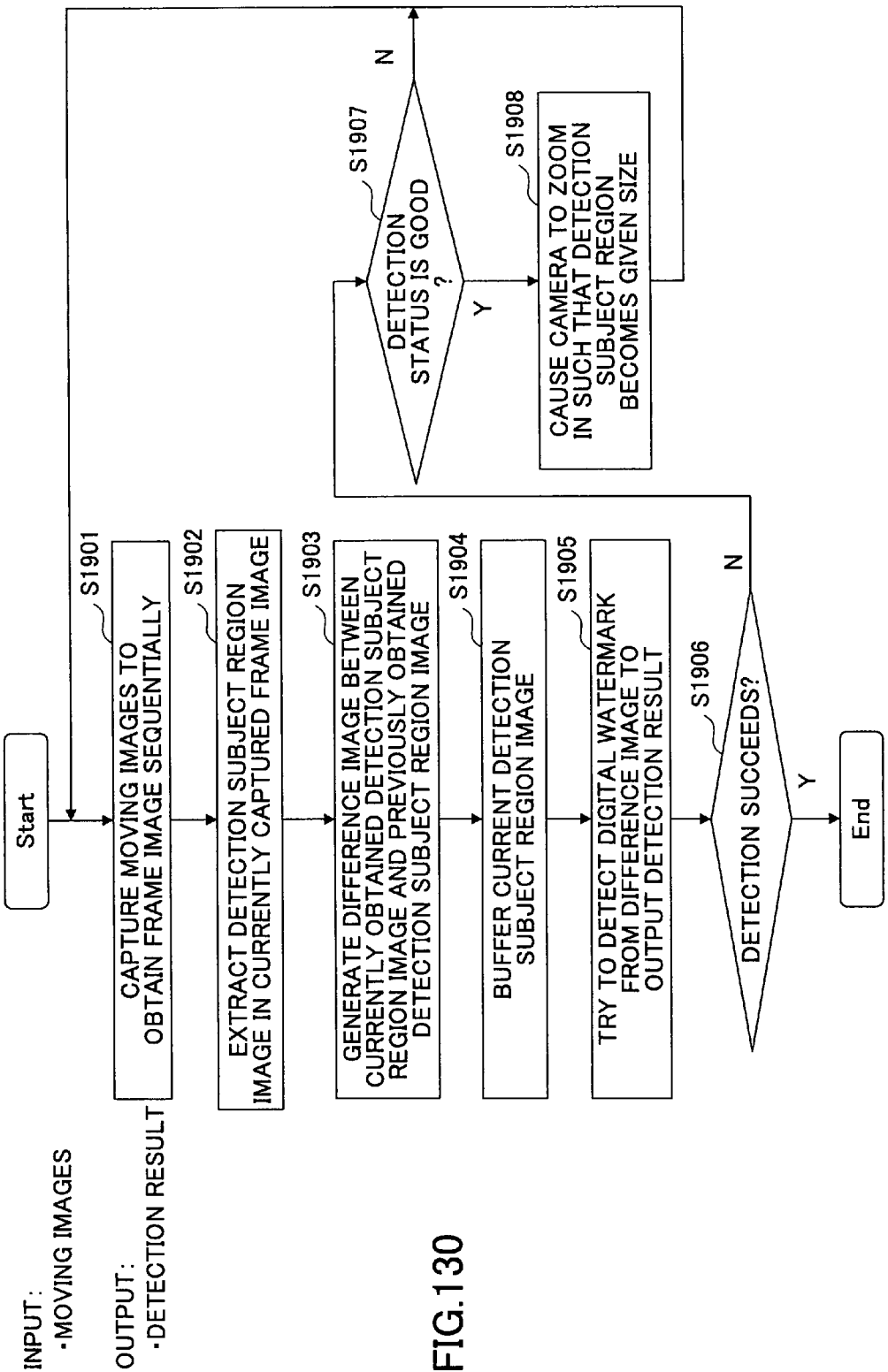
Figure 131A:
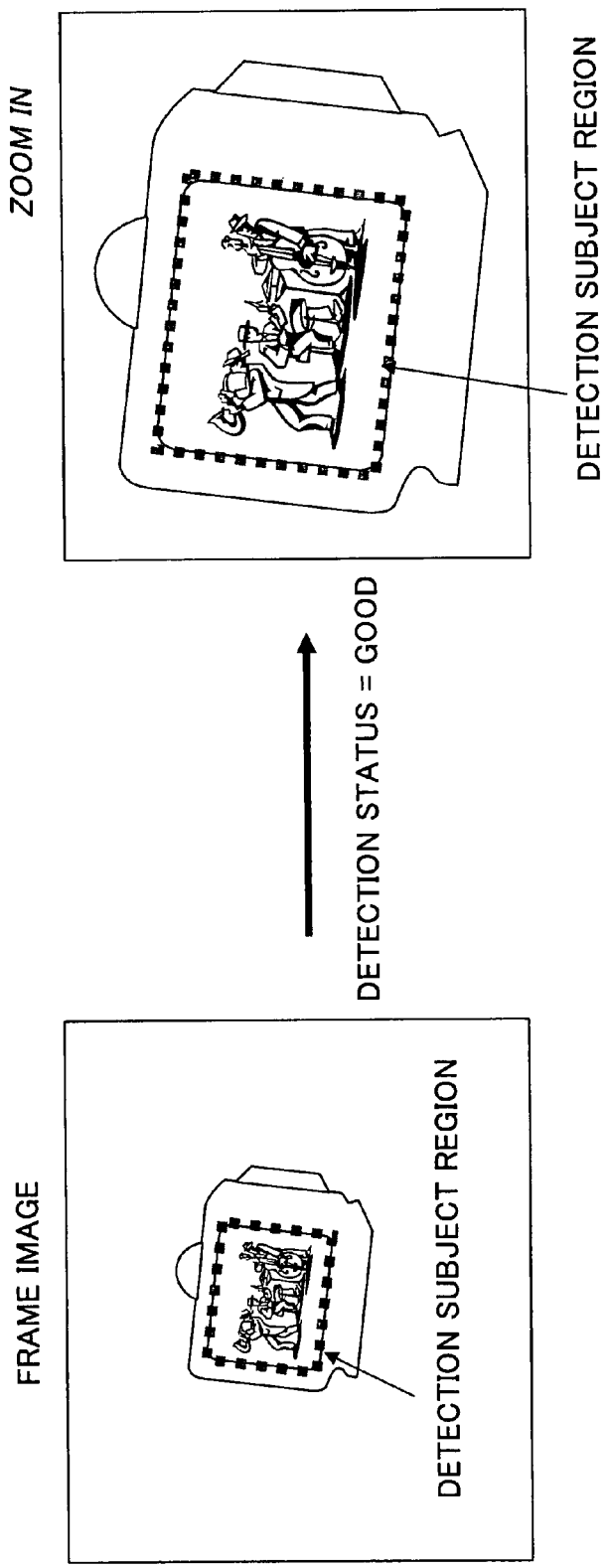
Figure 131B:
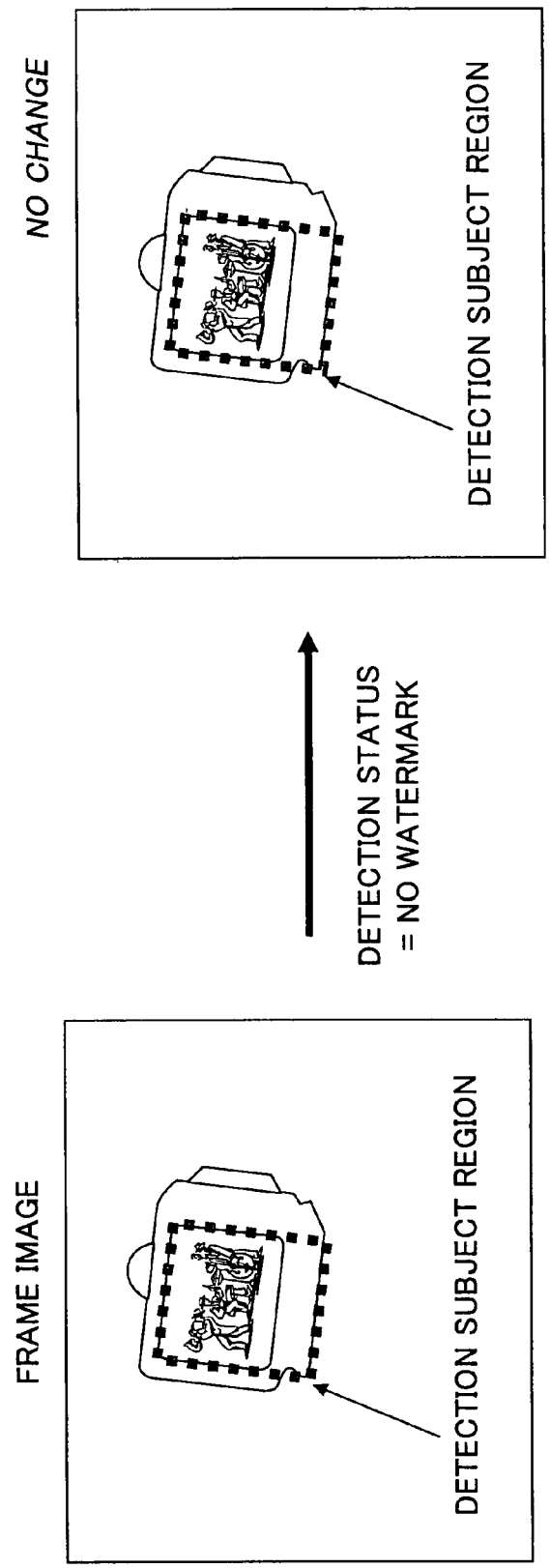
Figure 133:
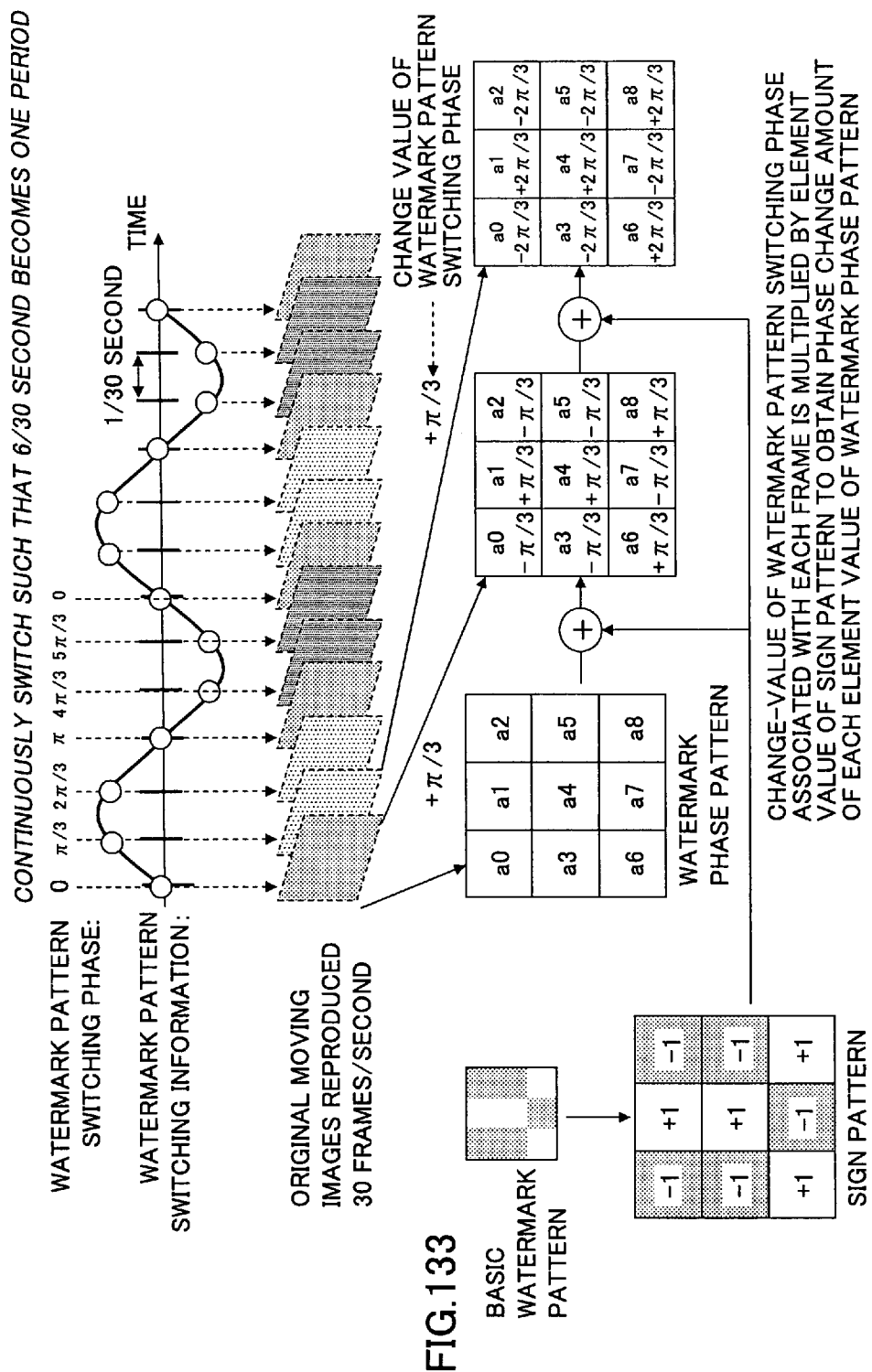
Figure 134:
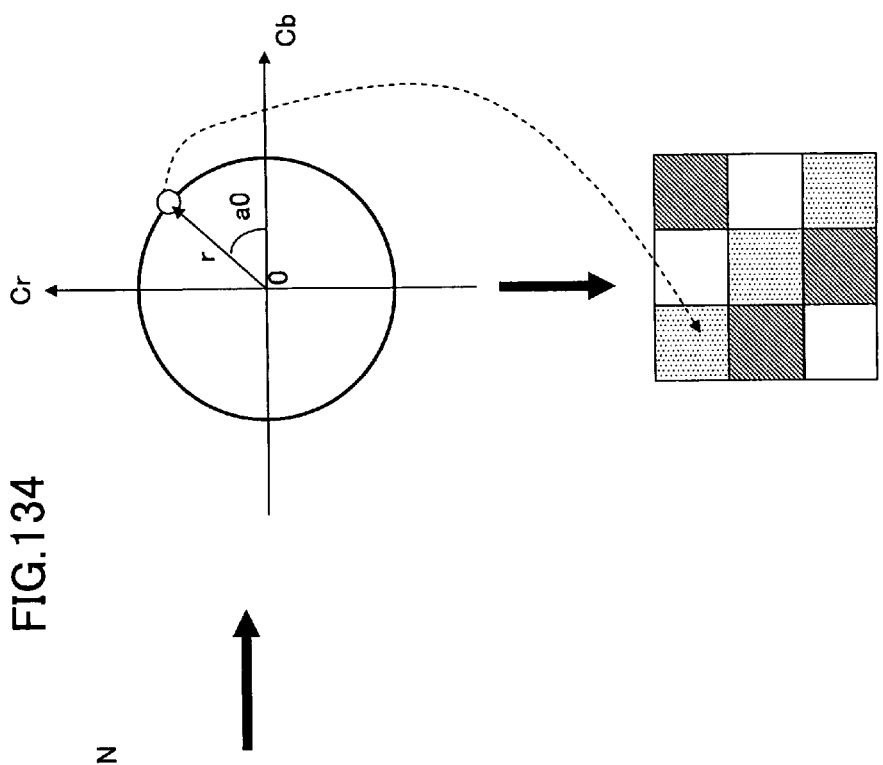
Figure 135:
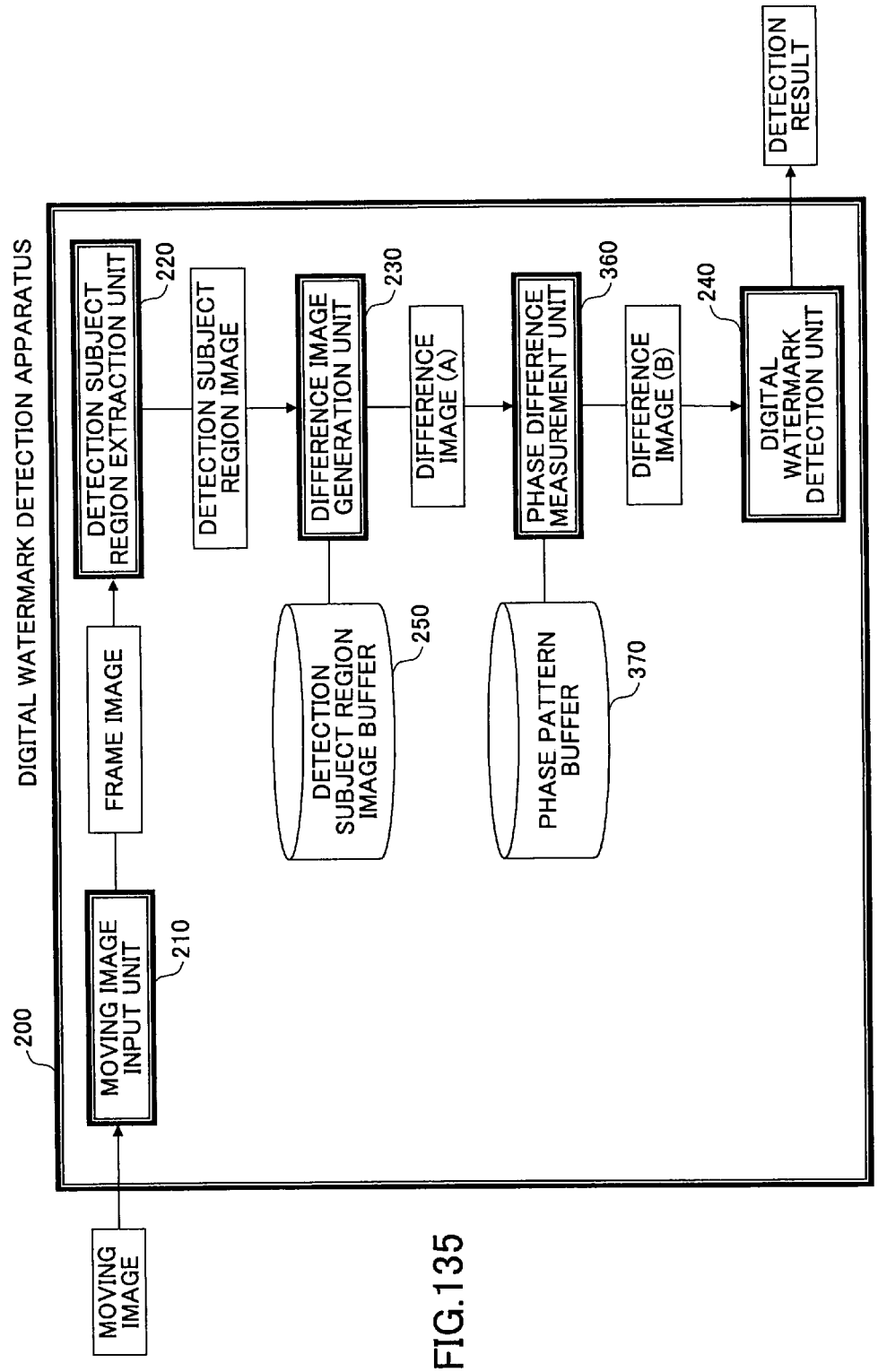
Figure 136:
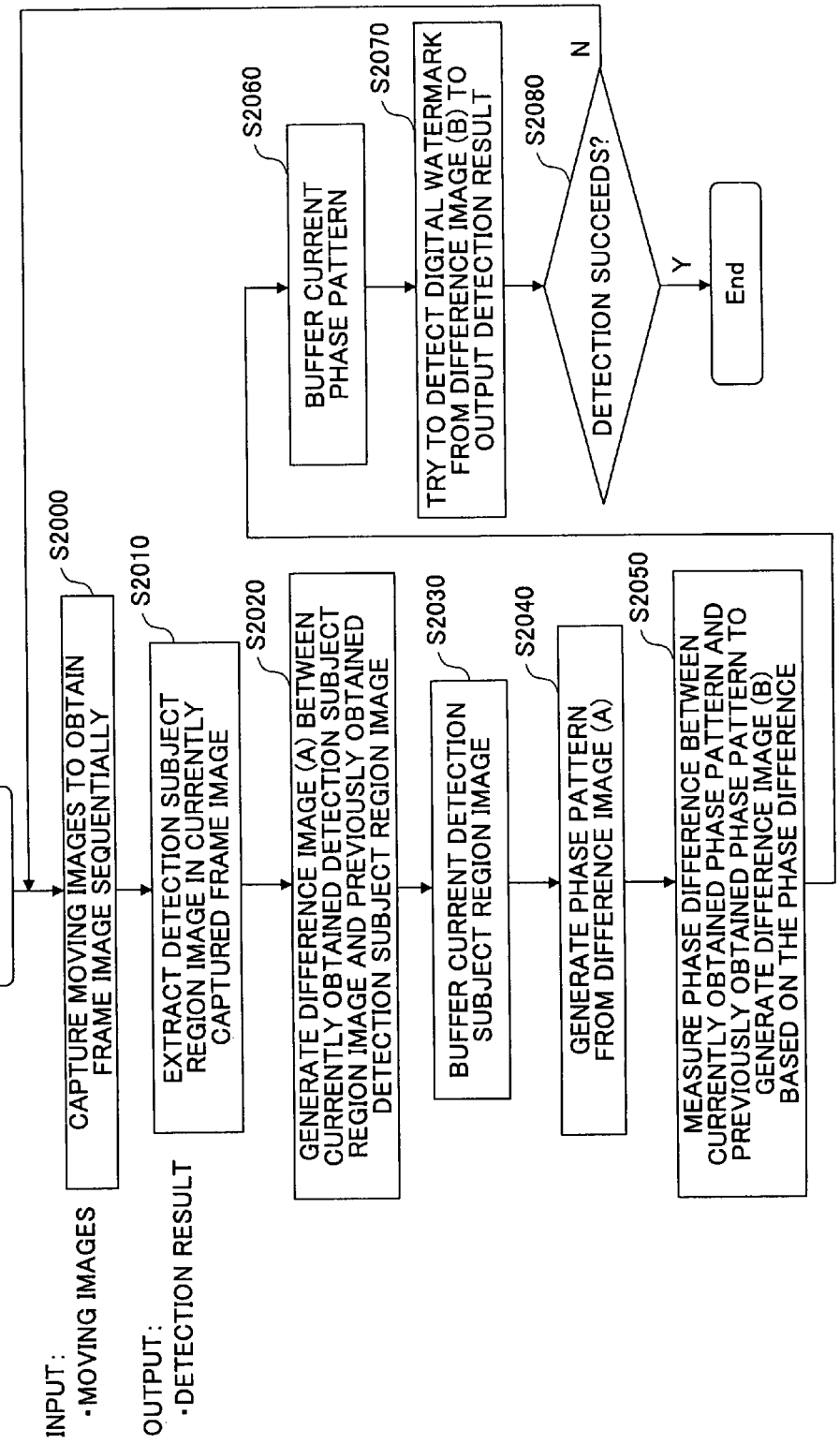
Figure 137:
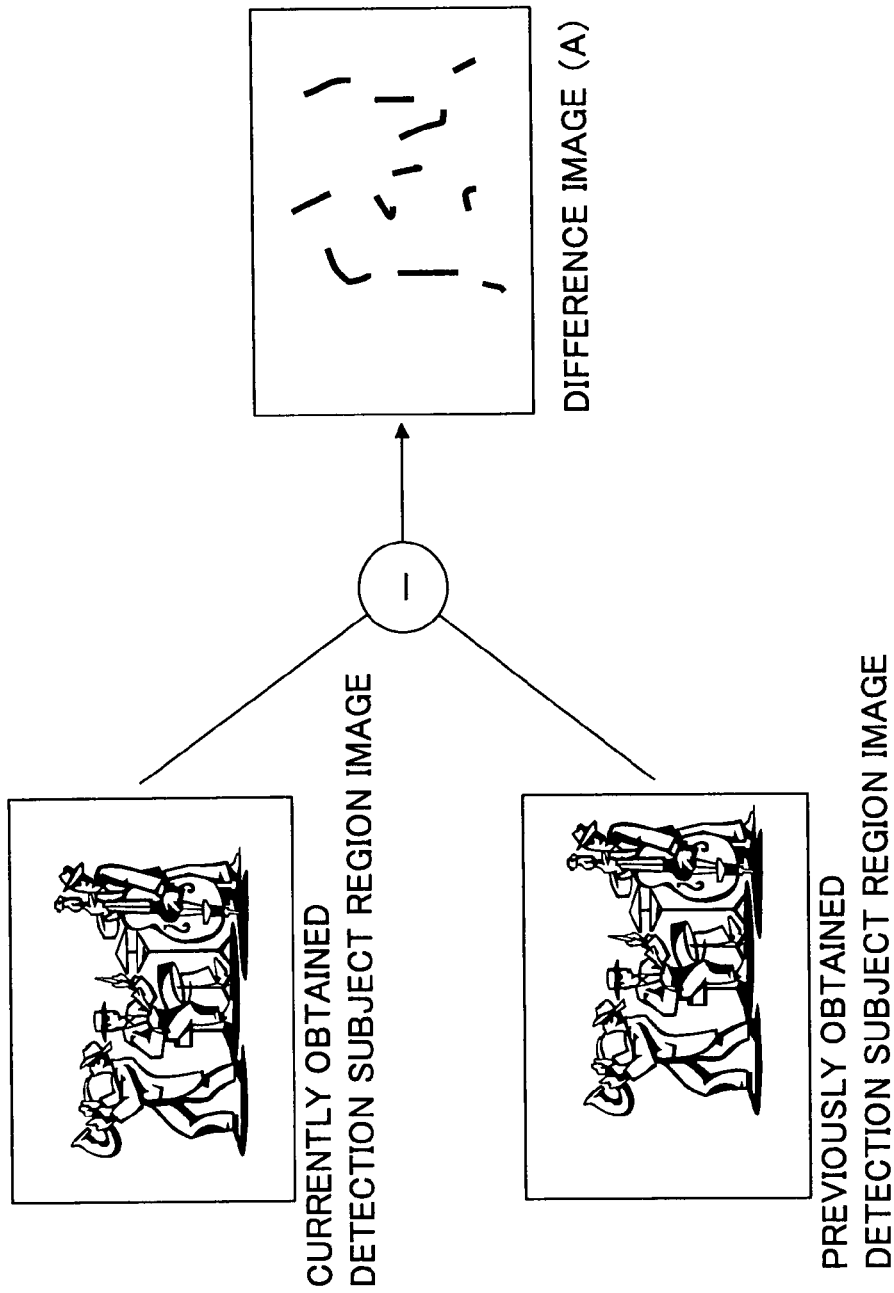
Figure 138:
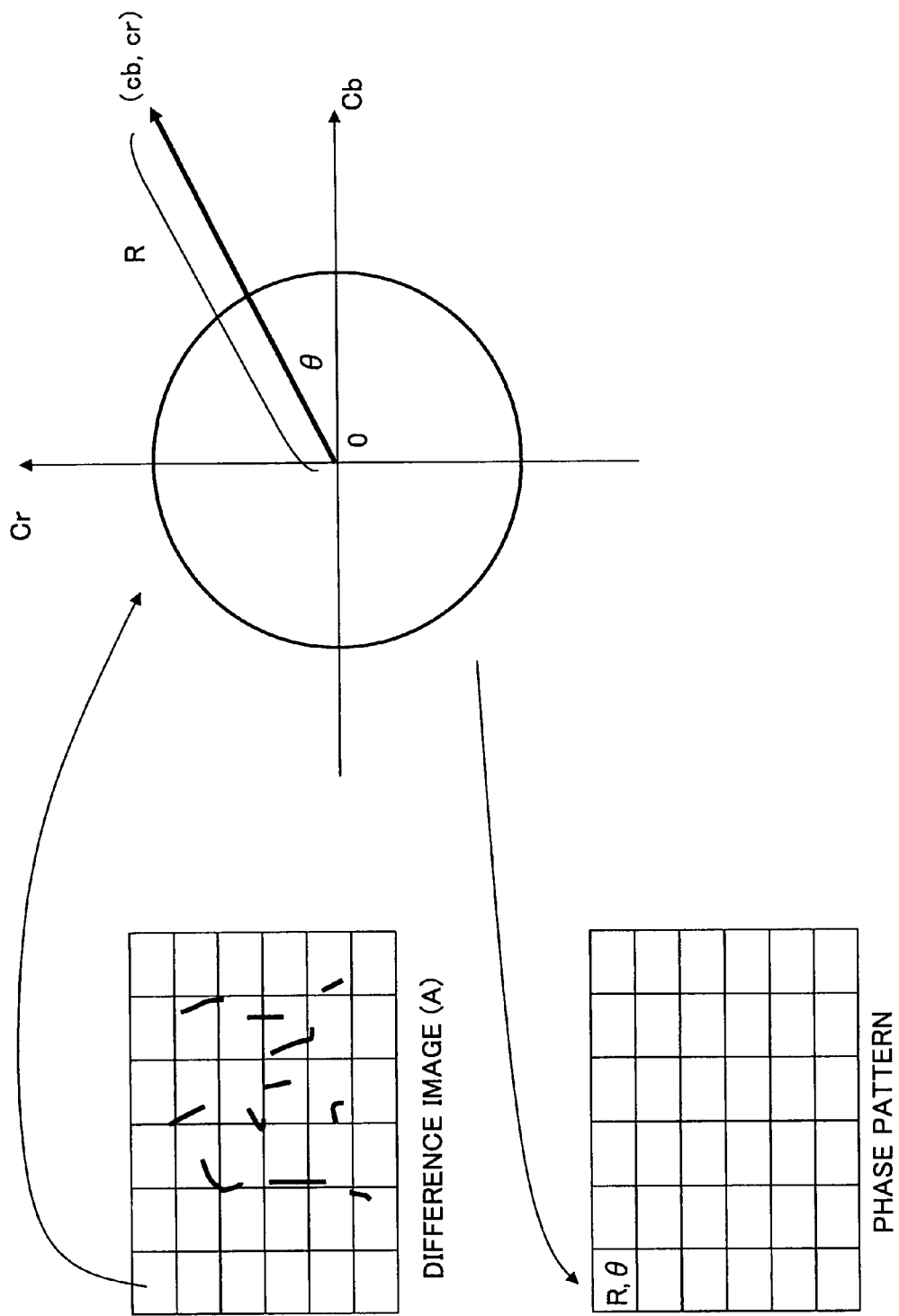
Figure 140A:
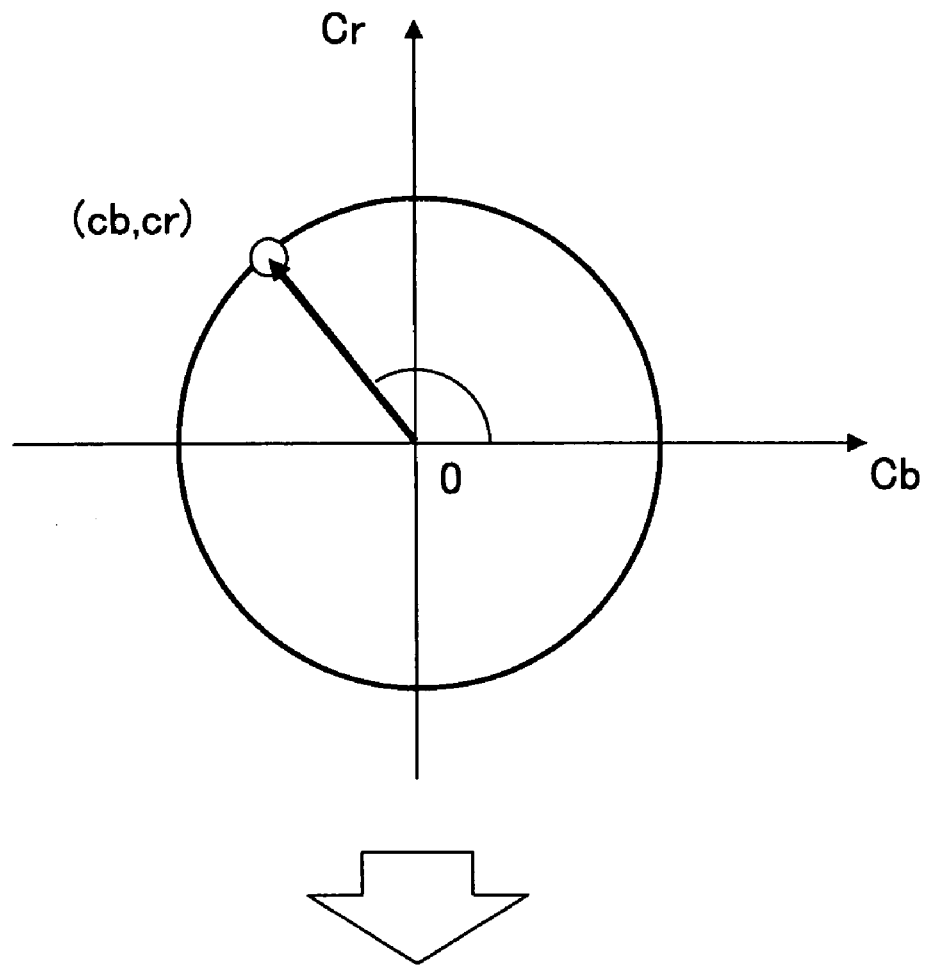
Figure 140B:
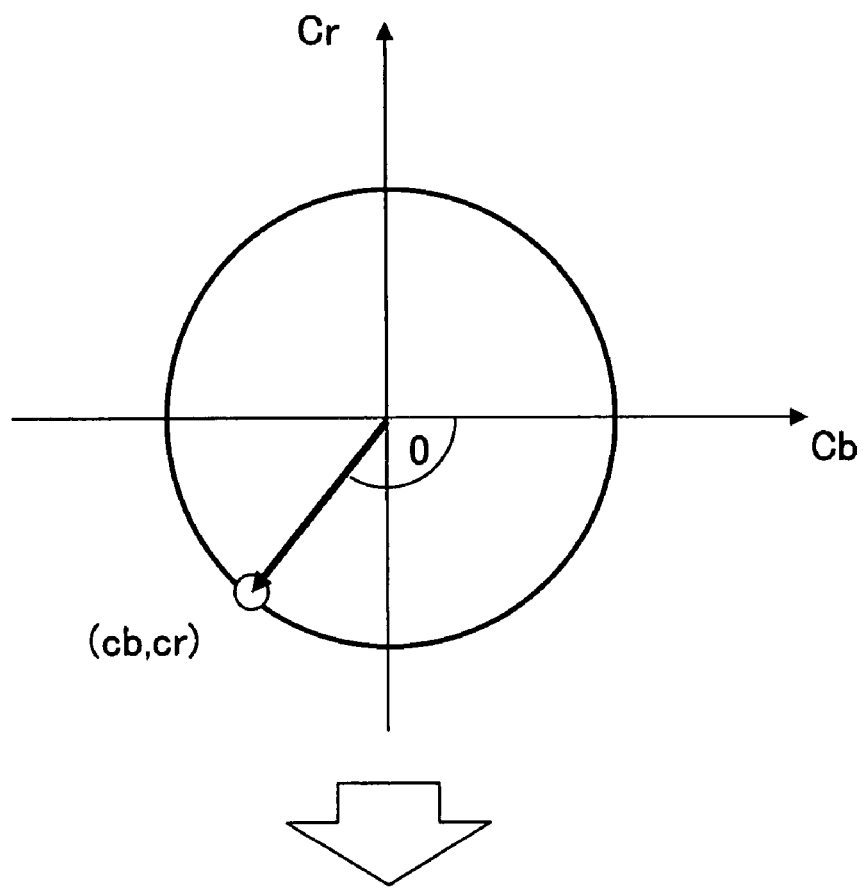
Figure 141:
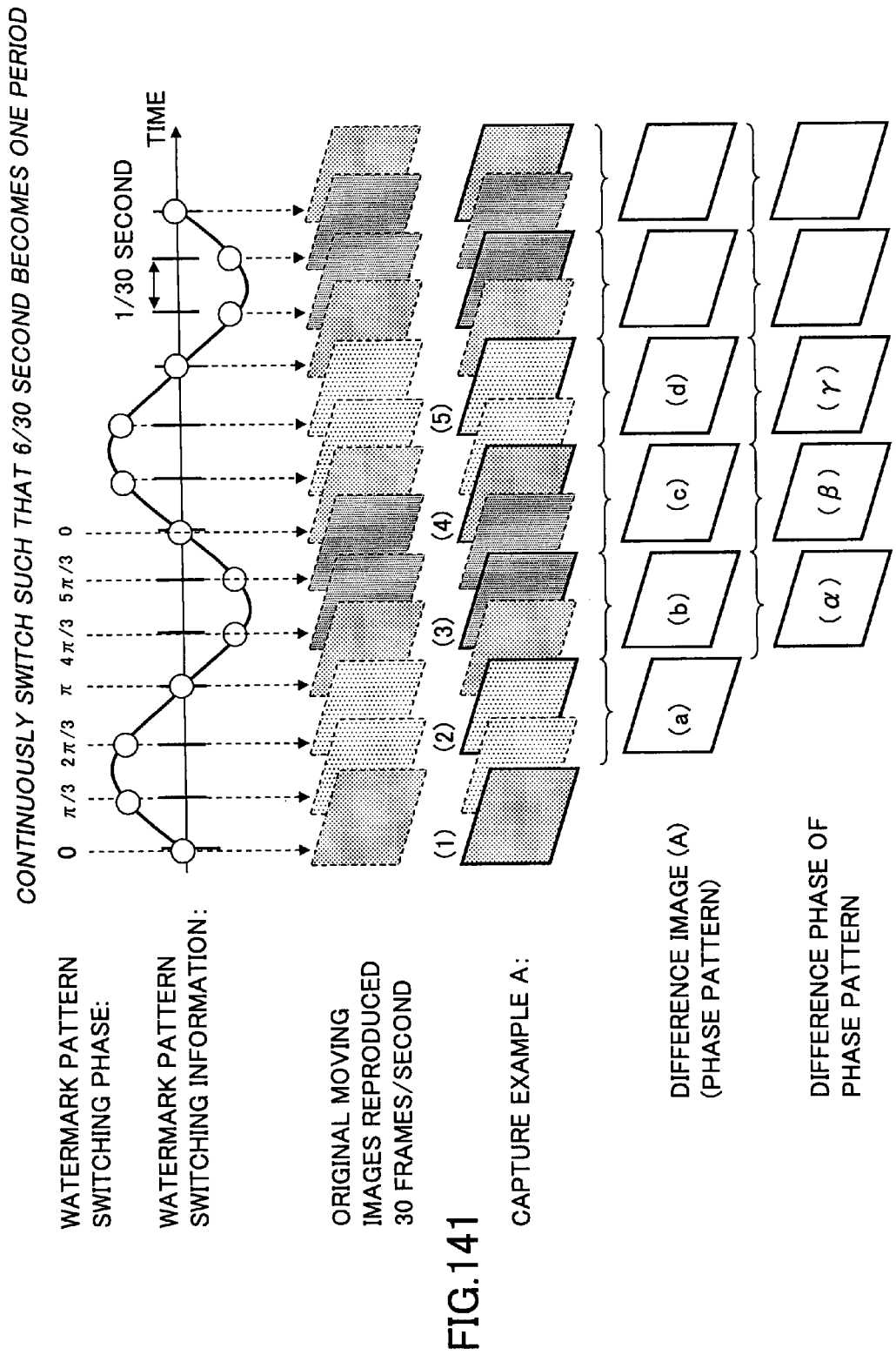
Figure 143:
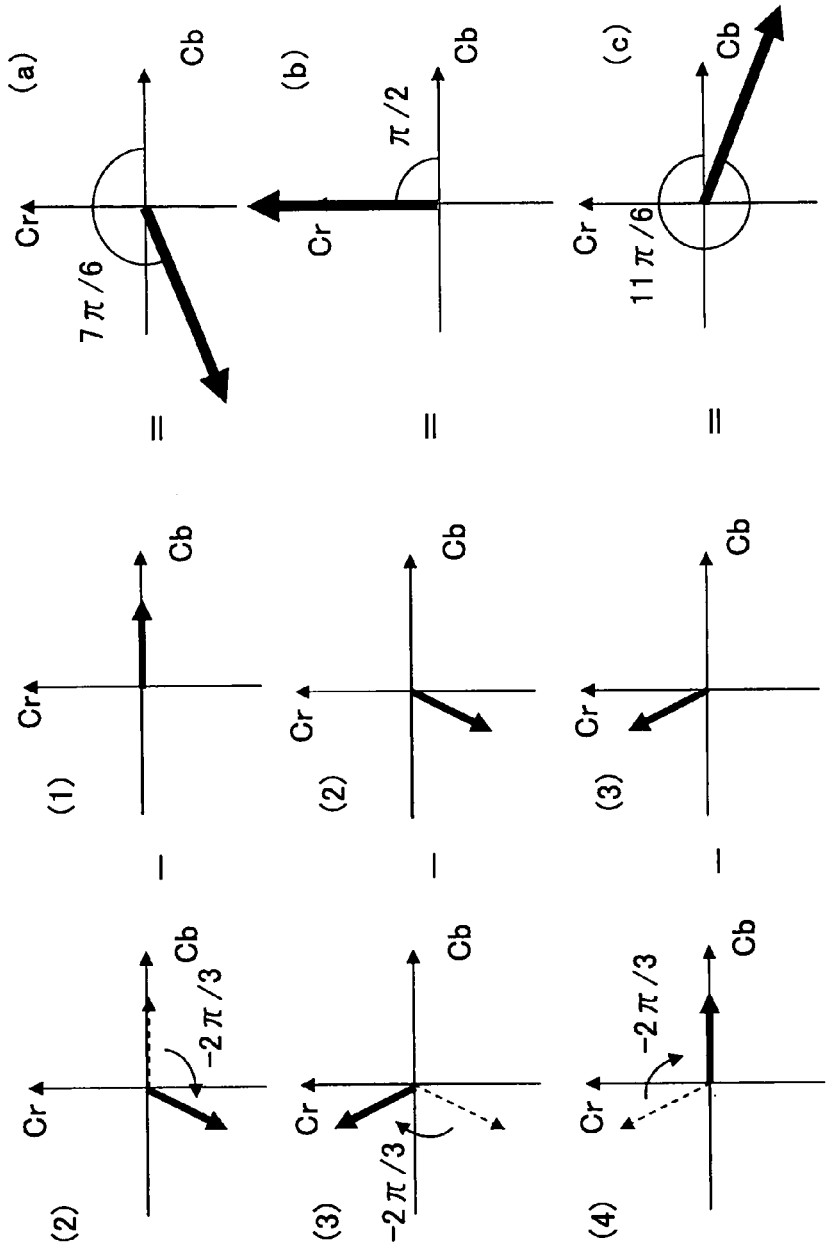
Figure 144:
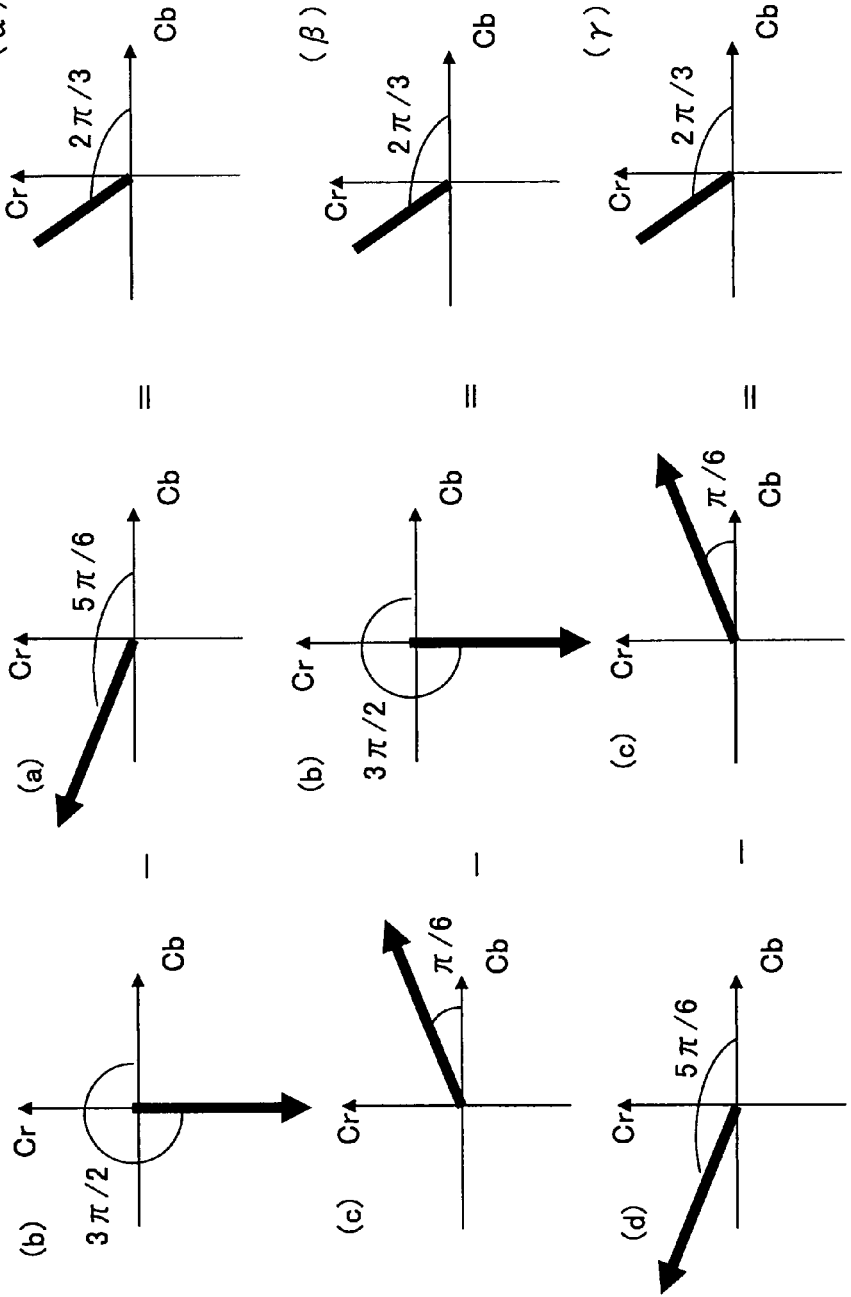
Figure 145:
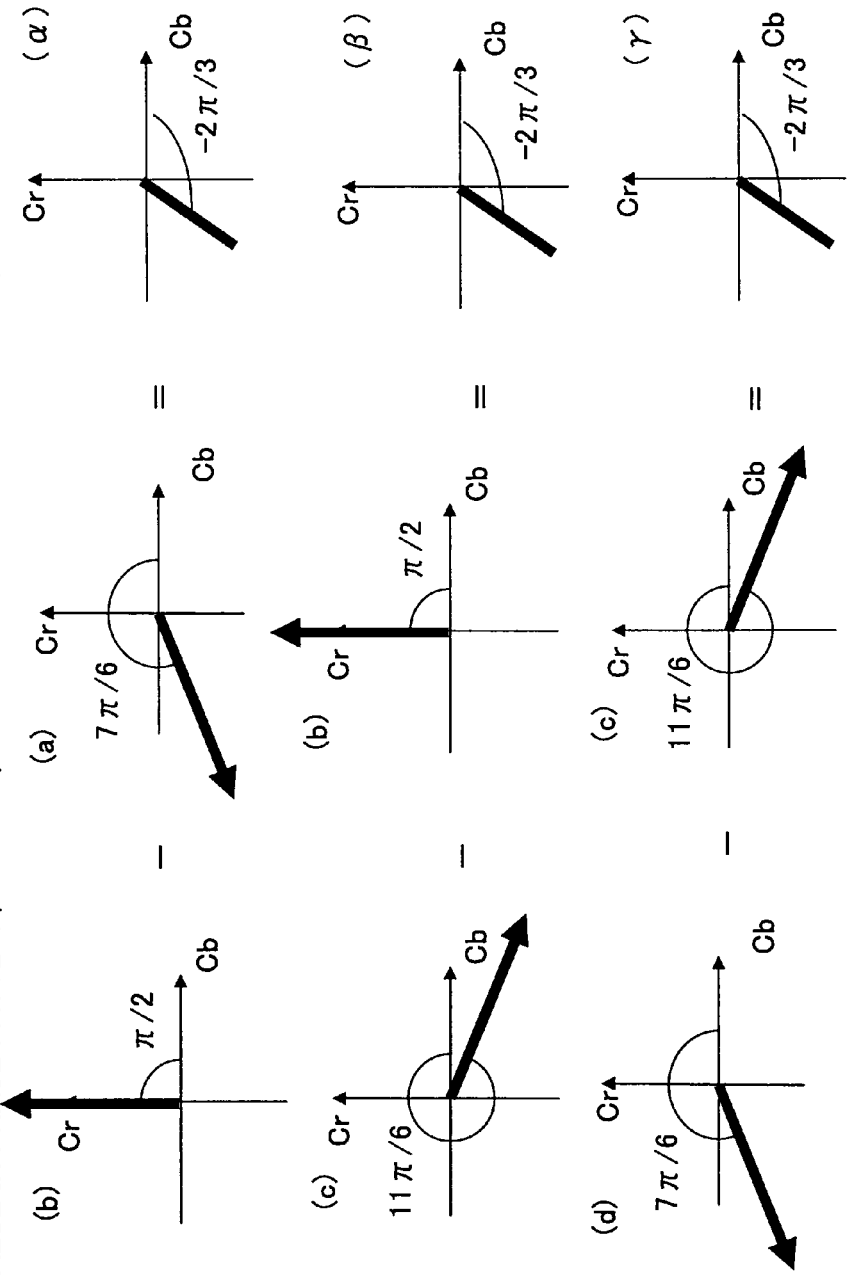
Figure 146:
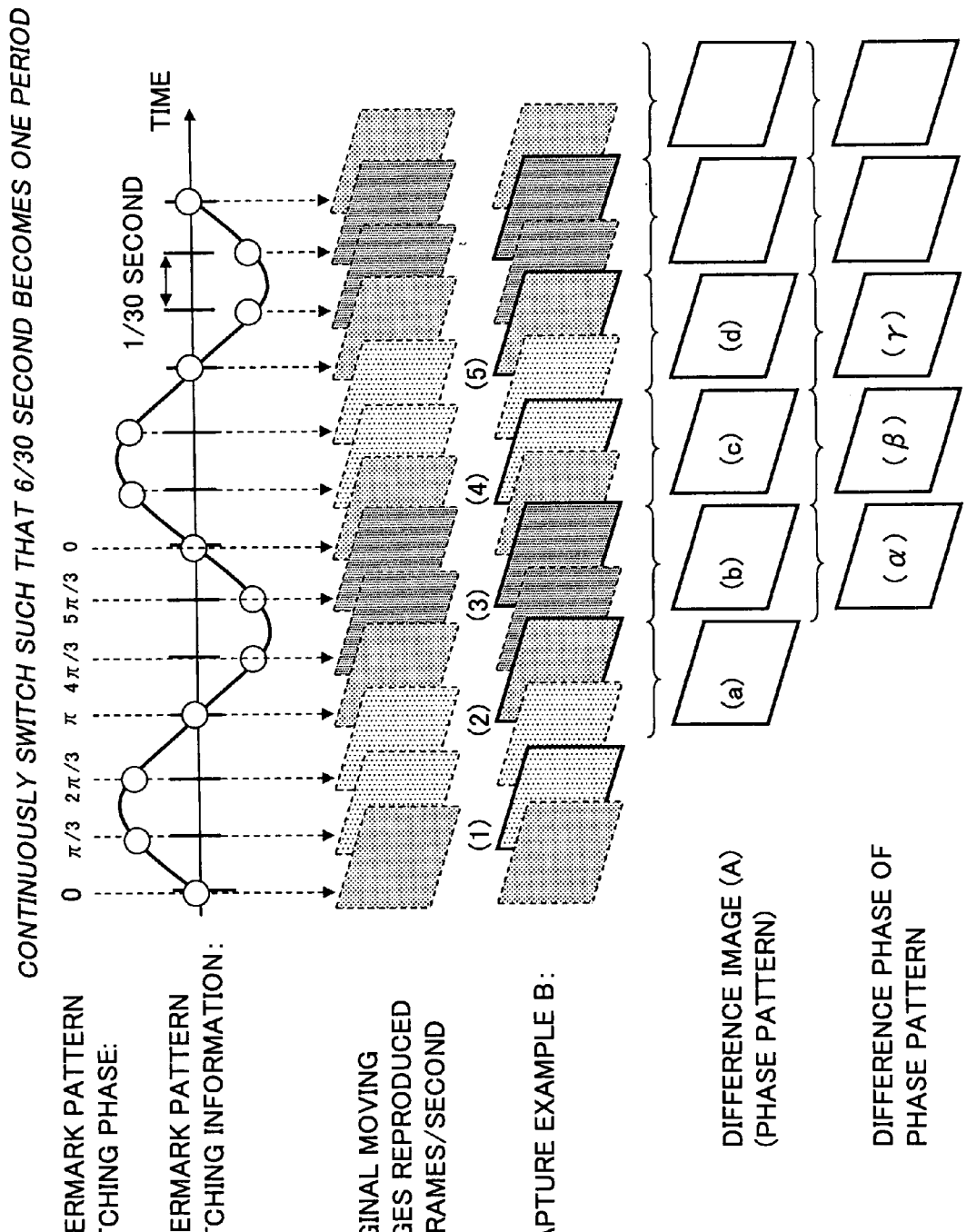
Figure 148:
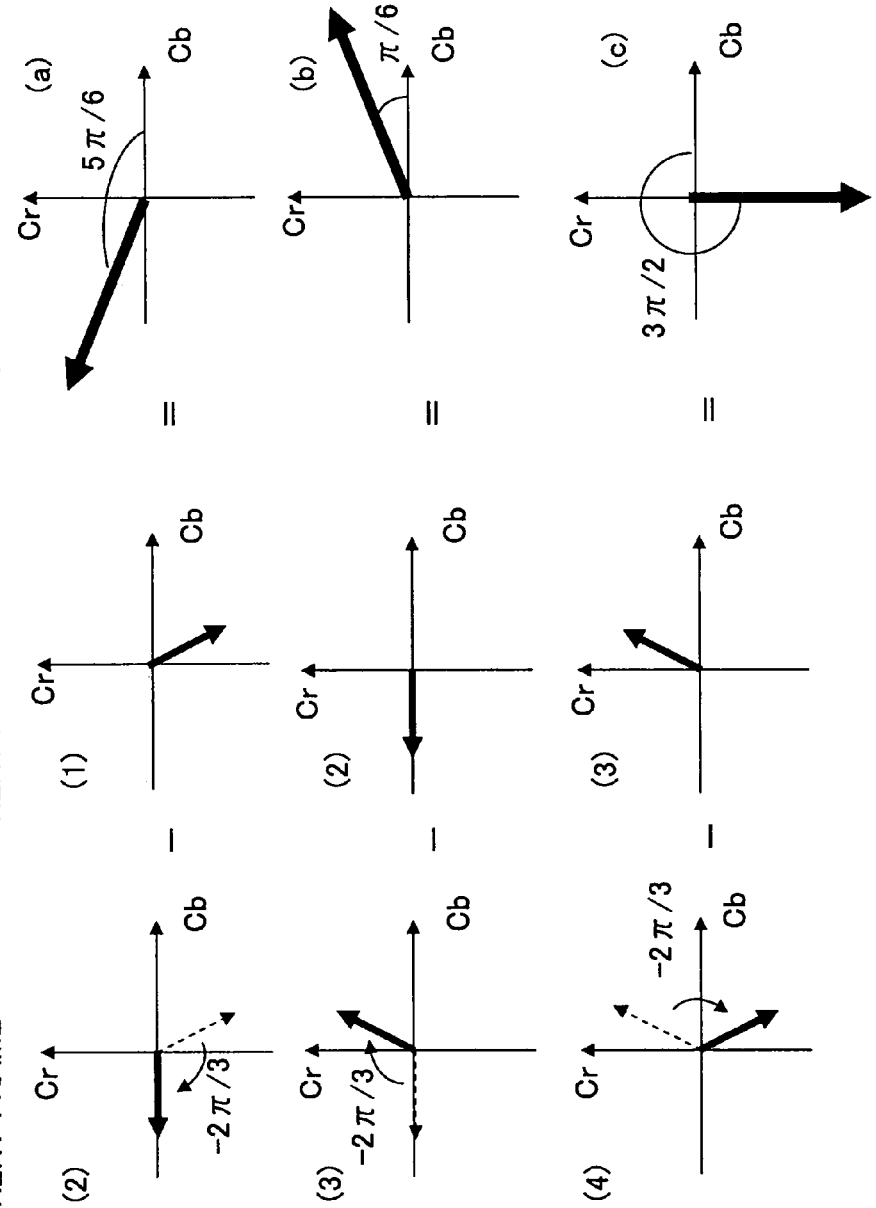
Figure 149:
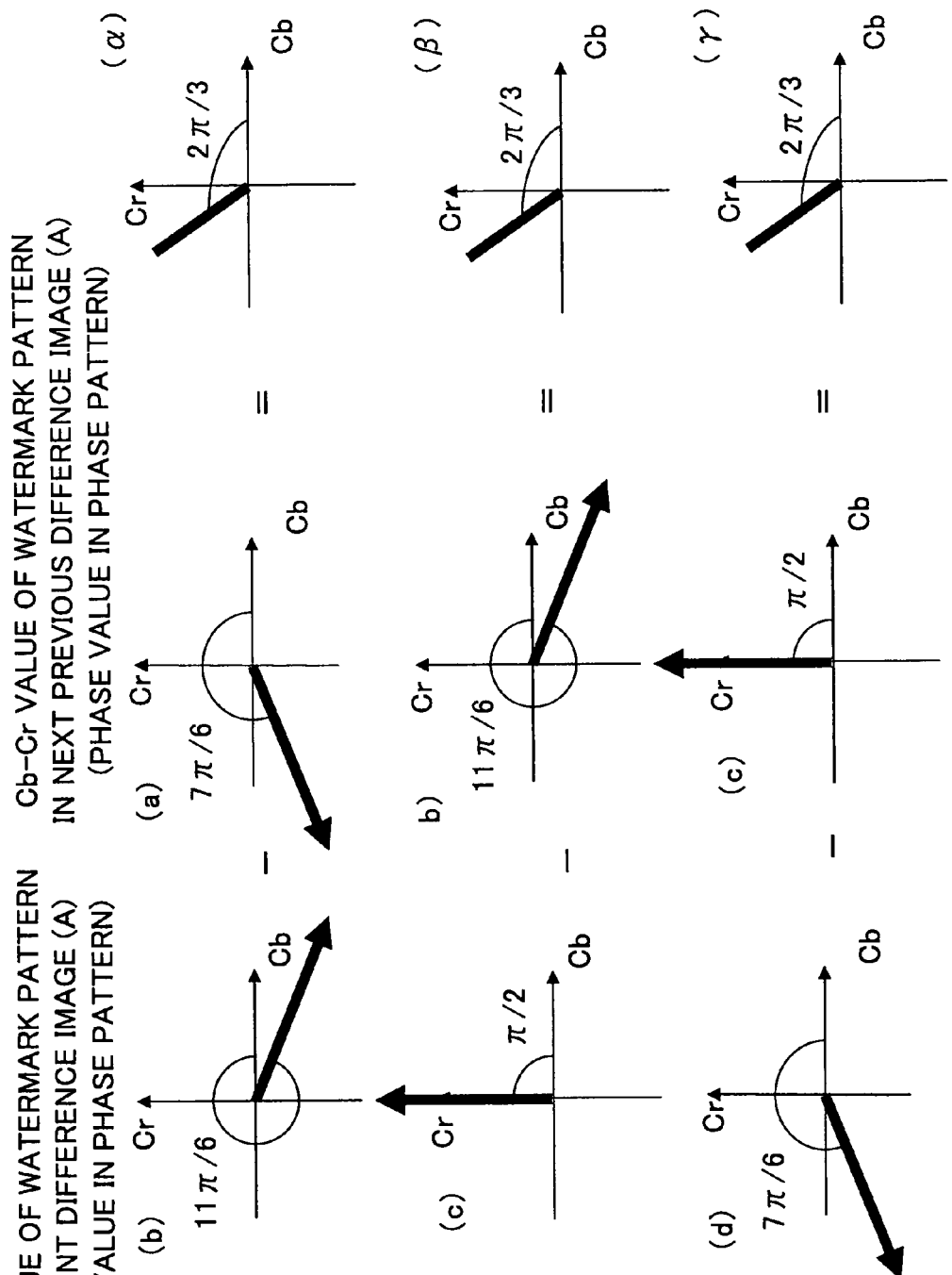
Figure 150:
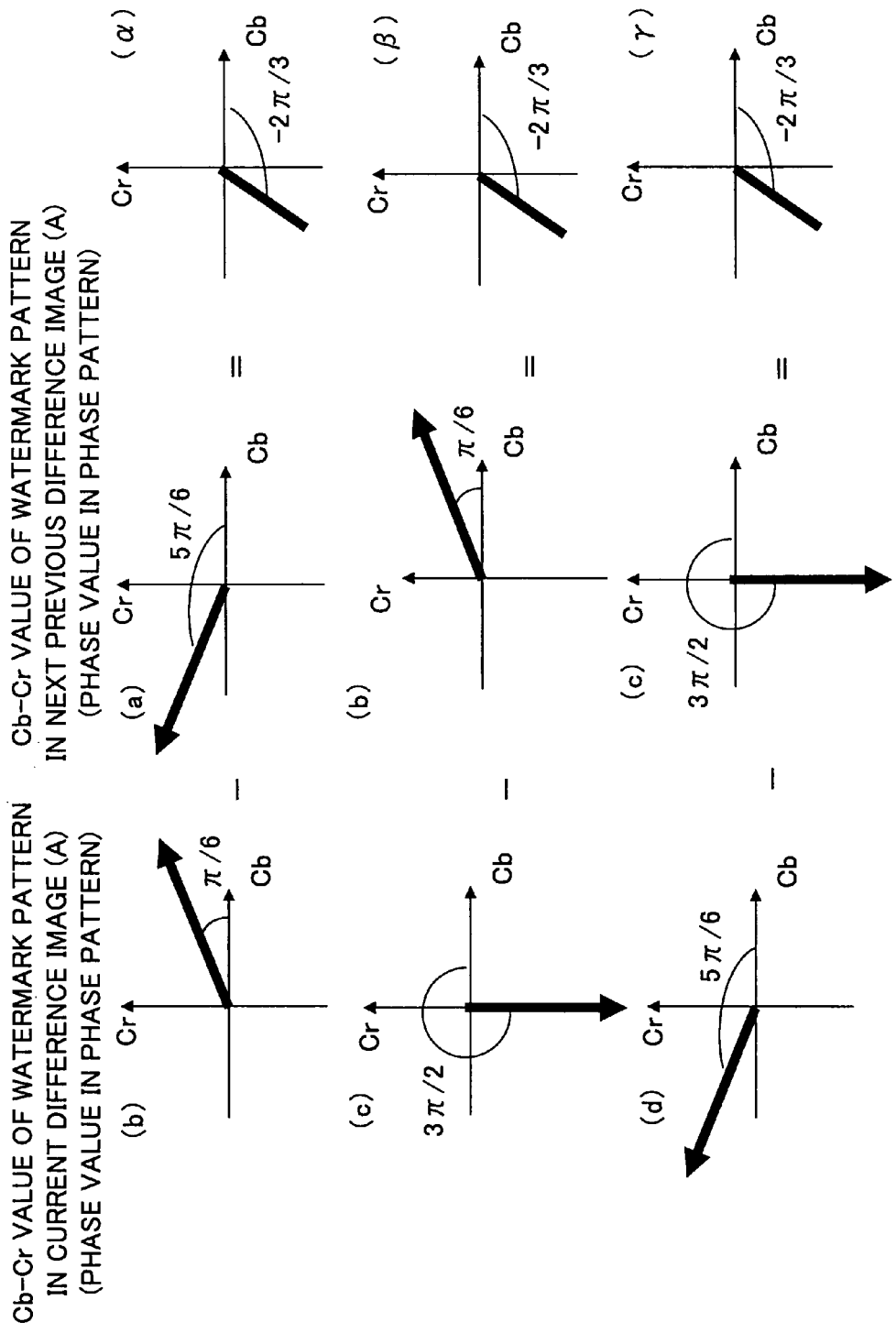
Figure 151:
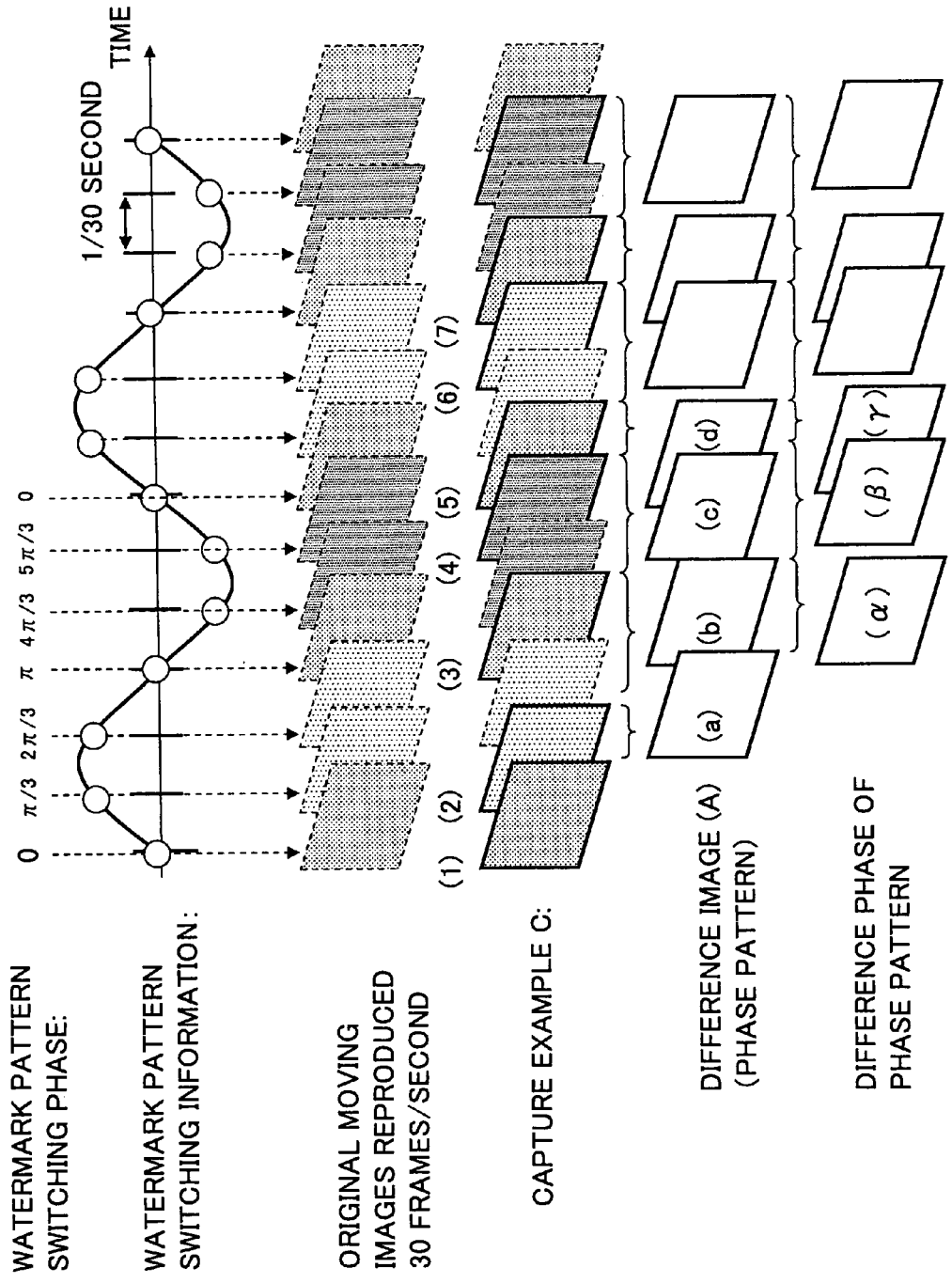
Figure 152:
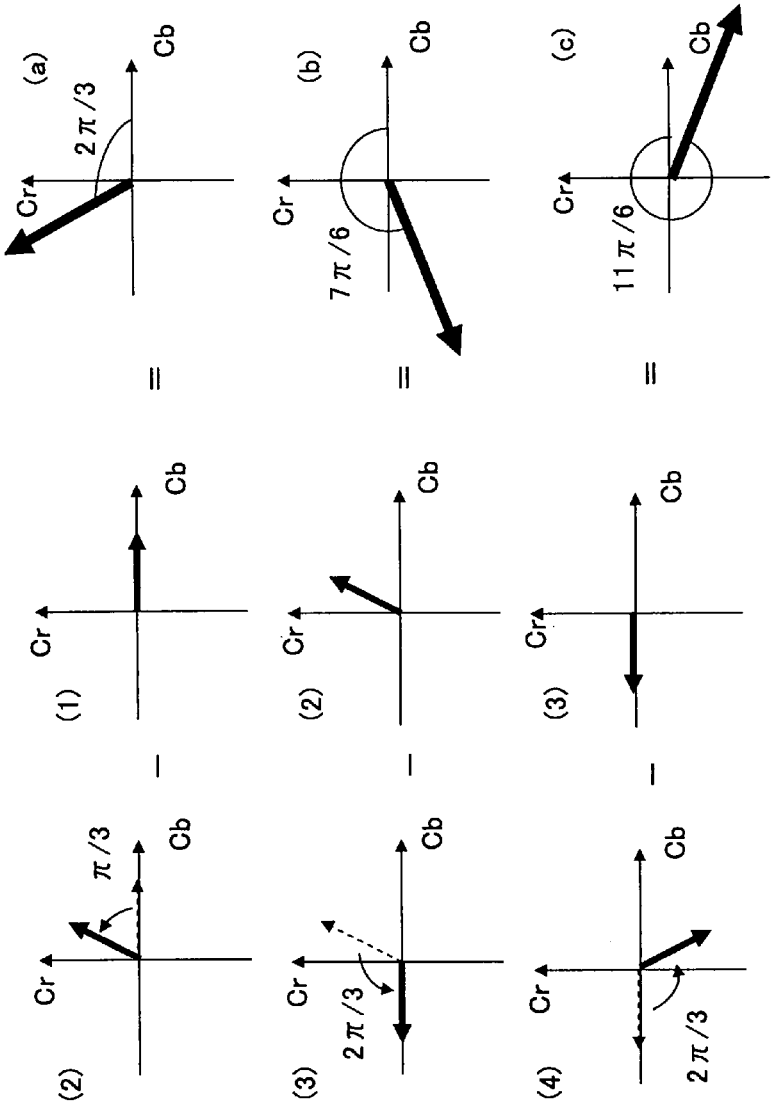
Figure 153:
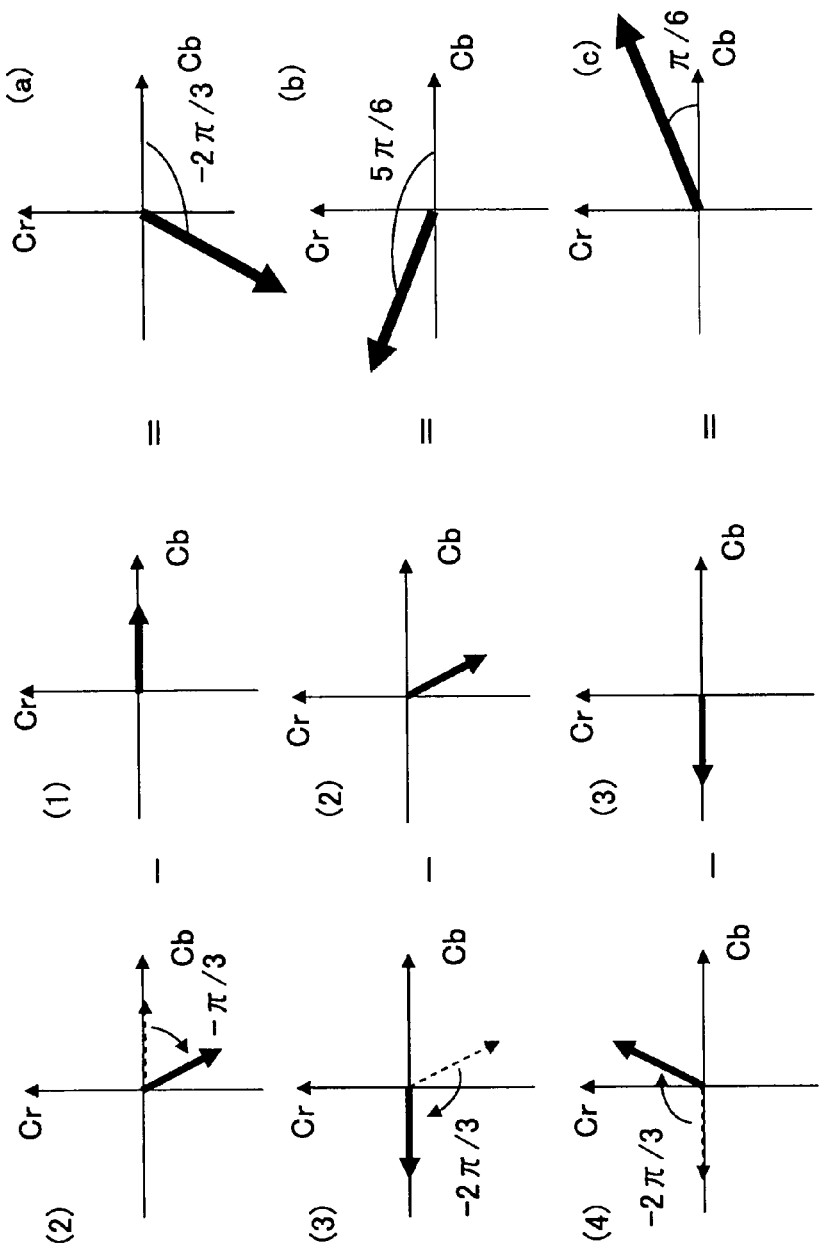
Figure 154:
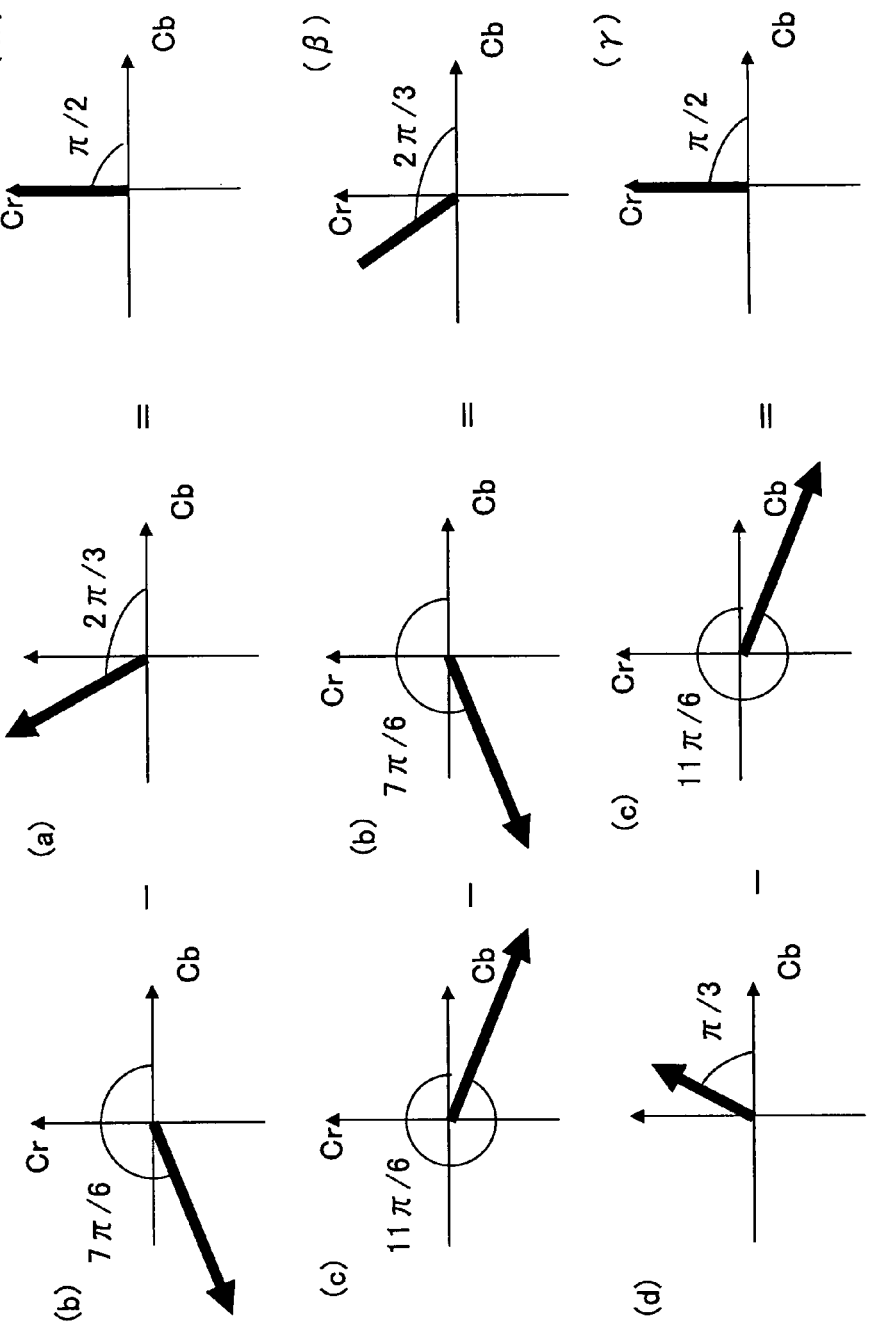
Figure 155:
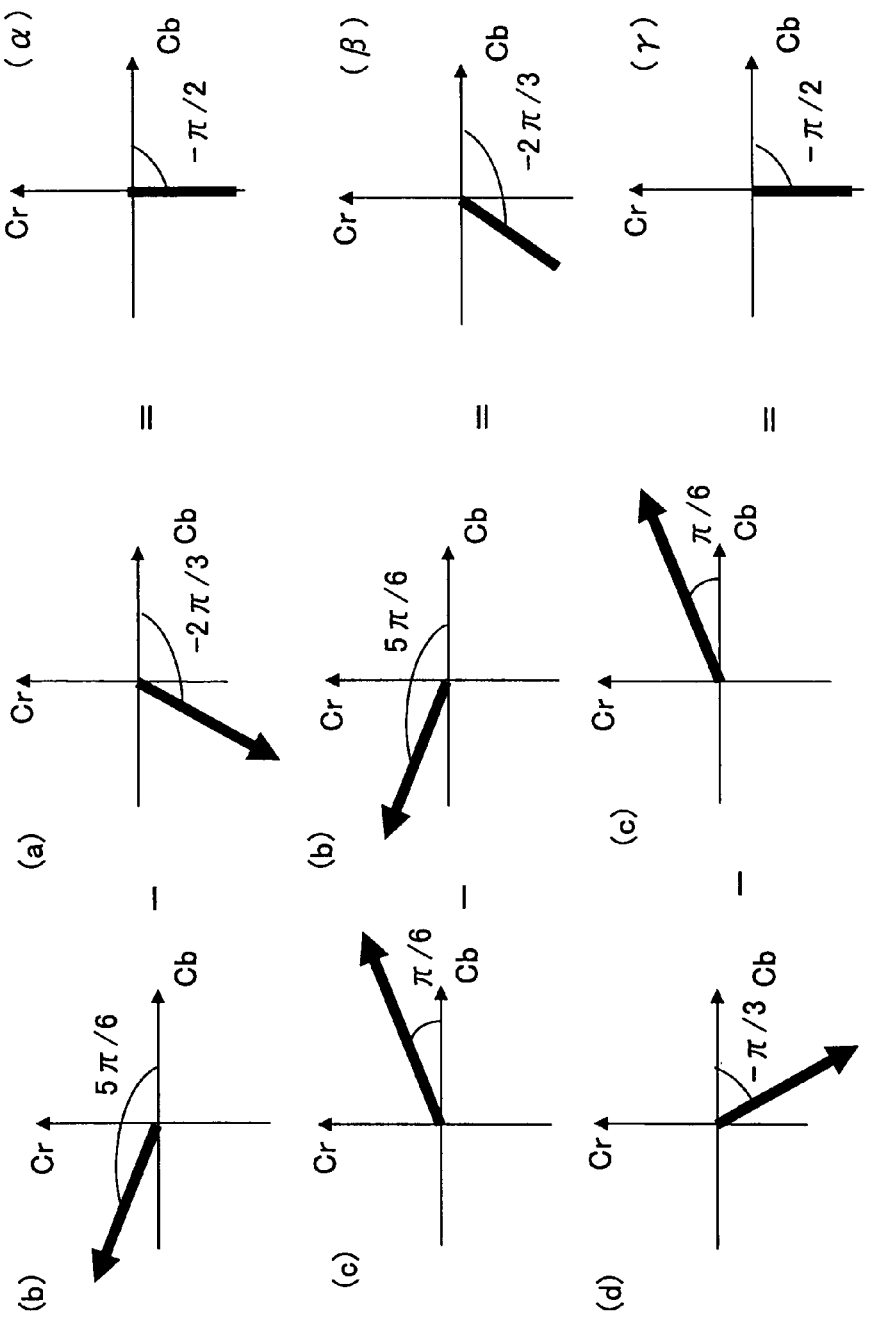
Figure 156:
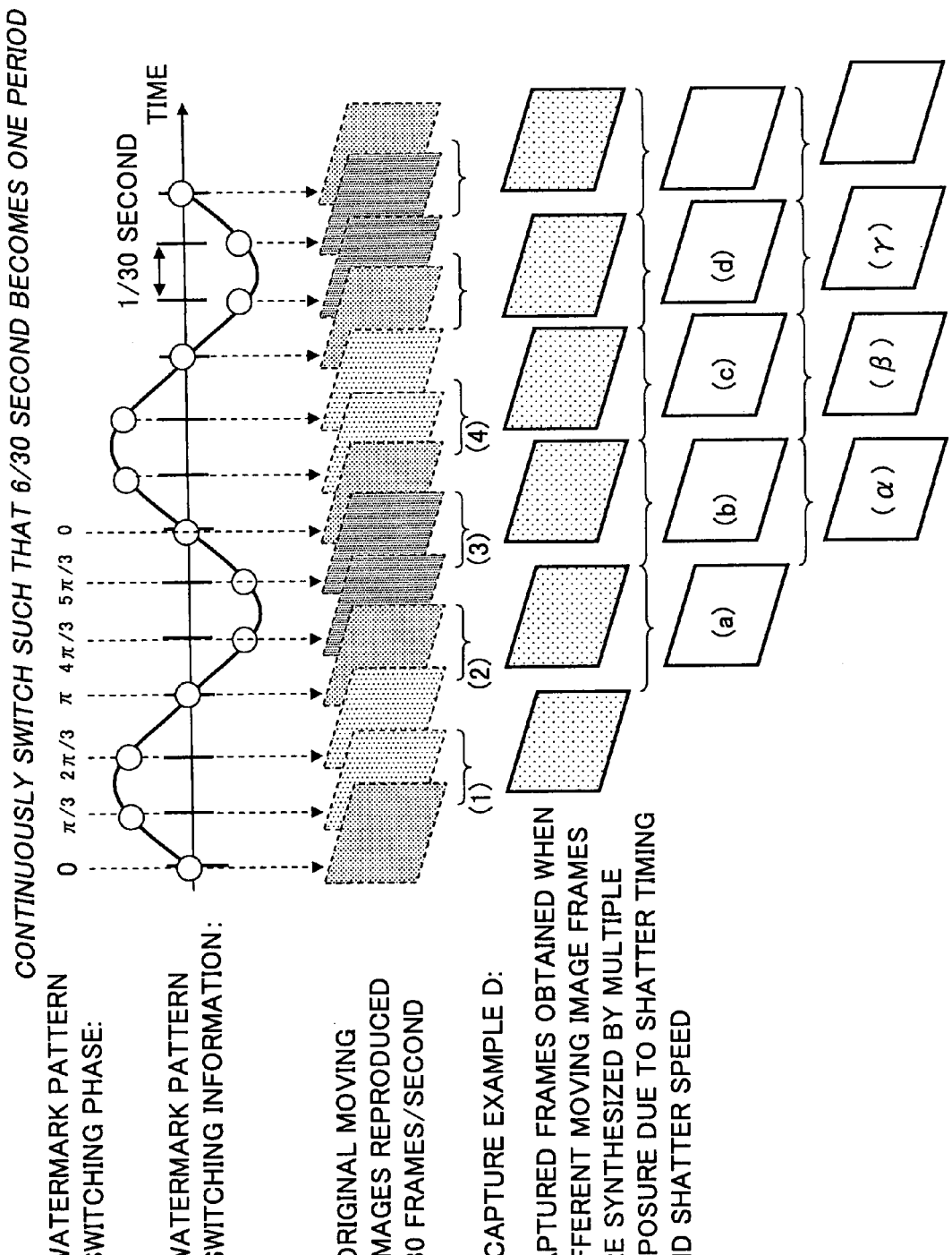
Figure 157:
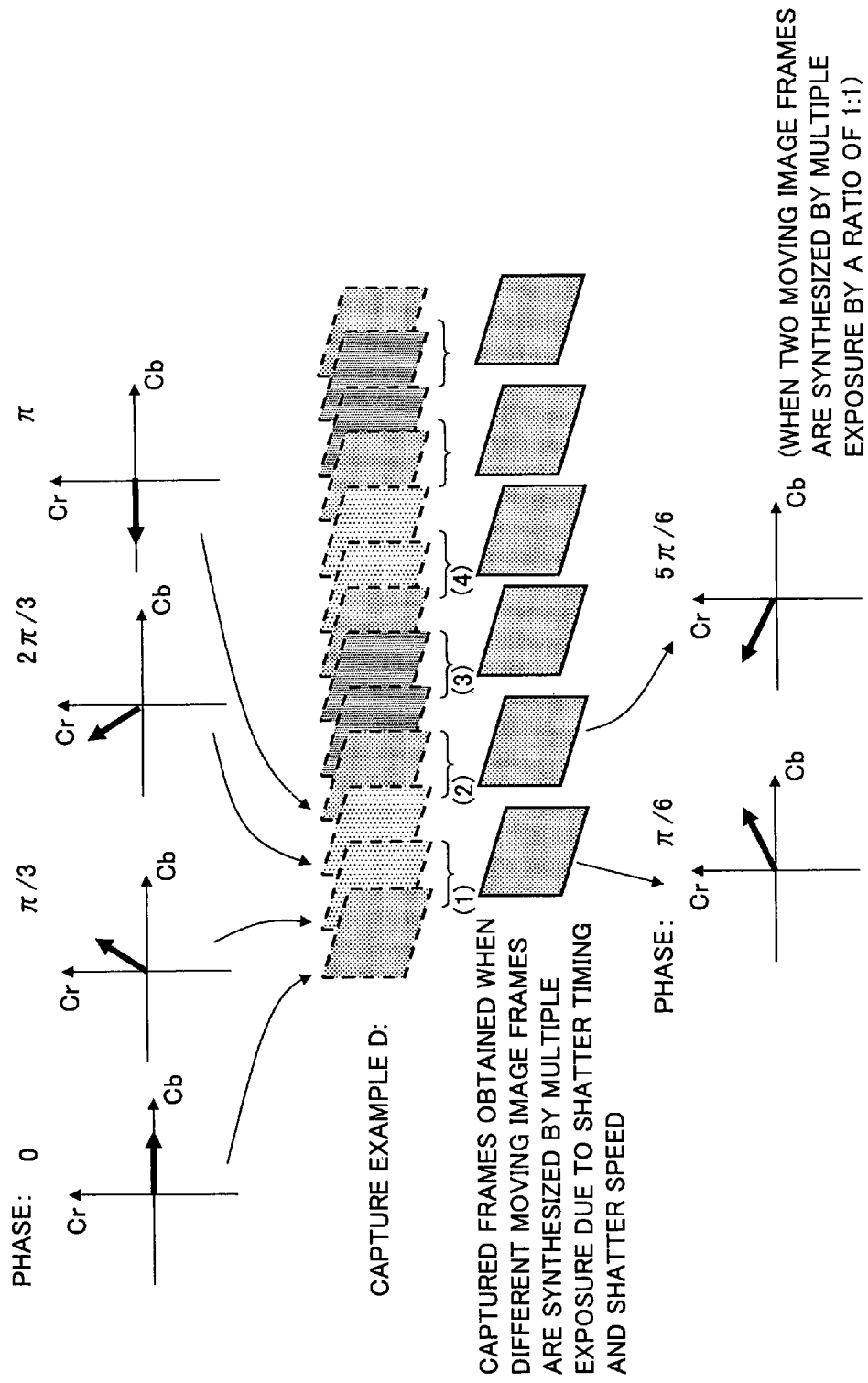
Figure 158:
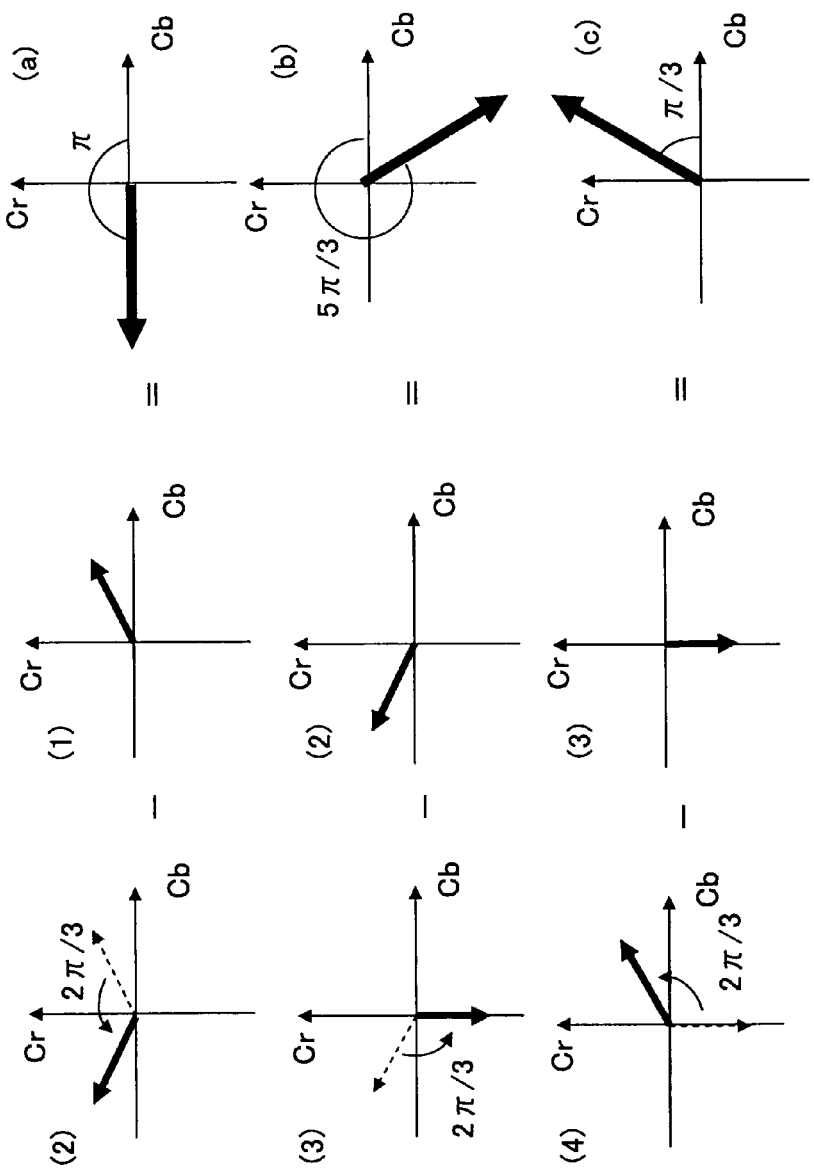
Figure 160:
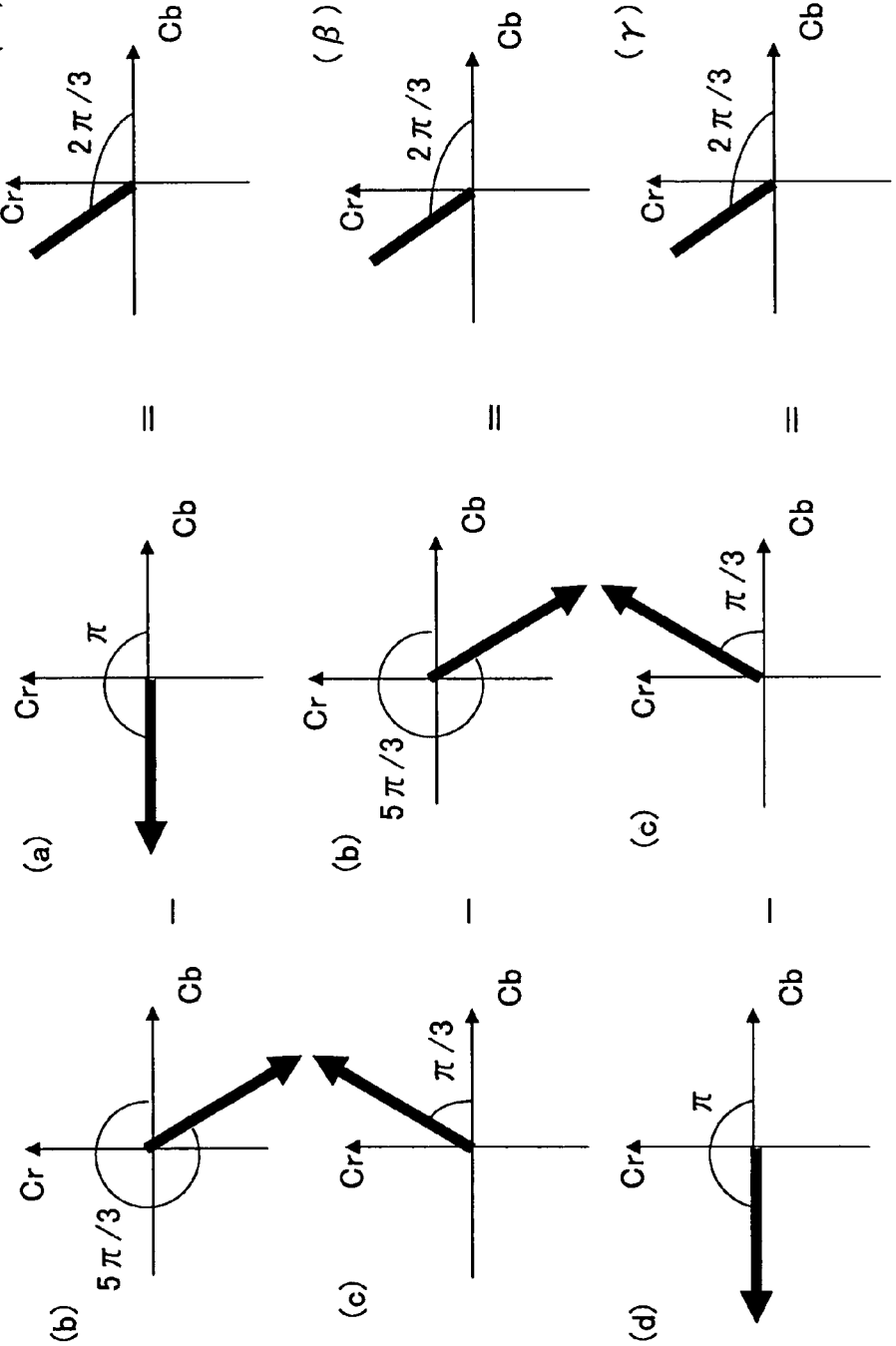
Figure 162:
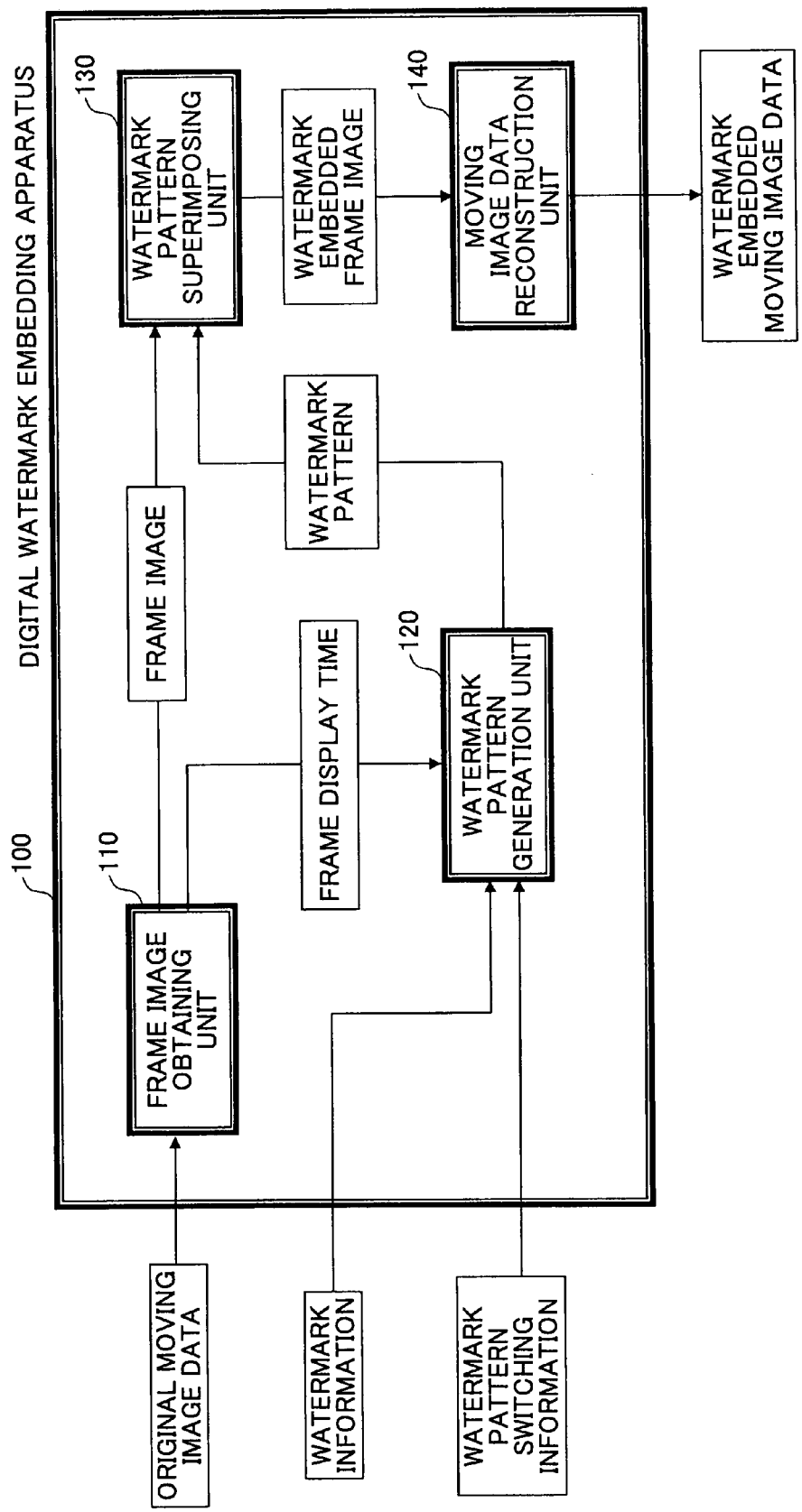
Figure 163:
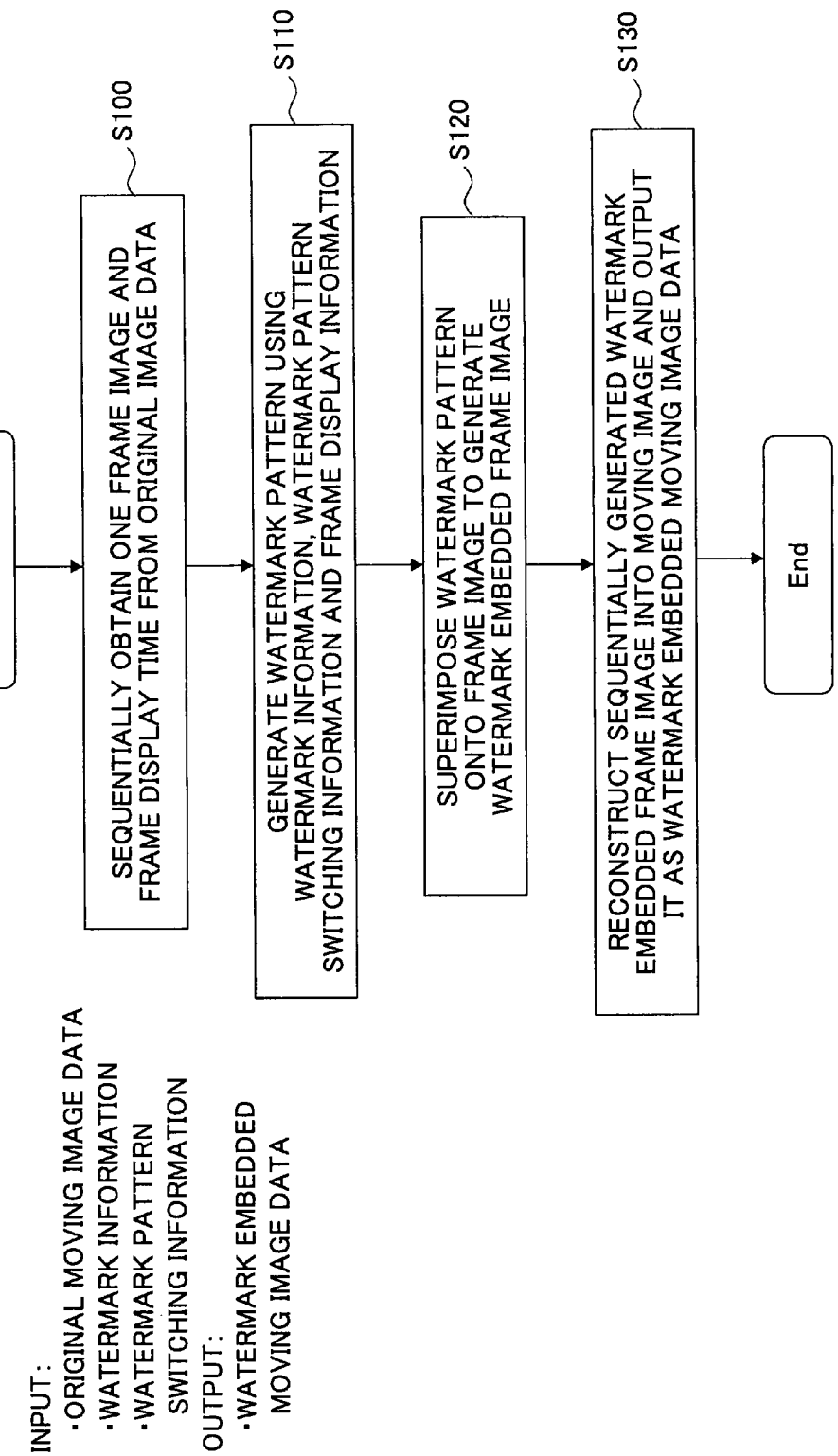
Figure 164:
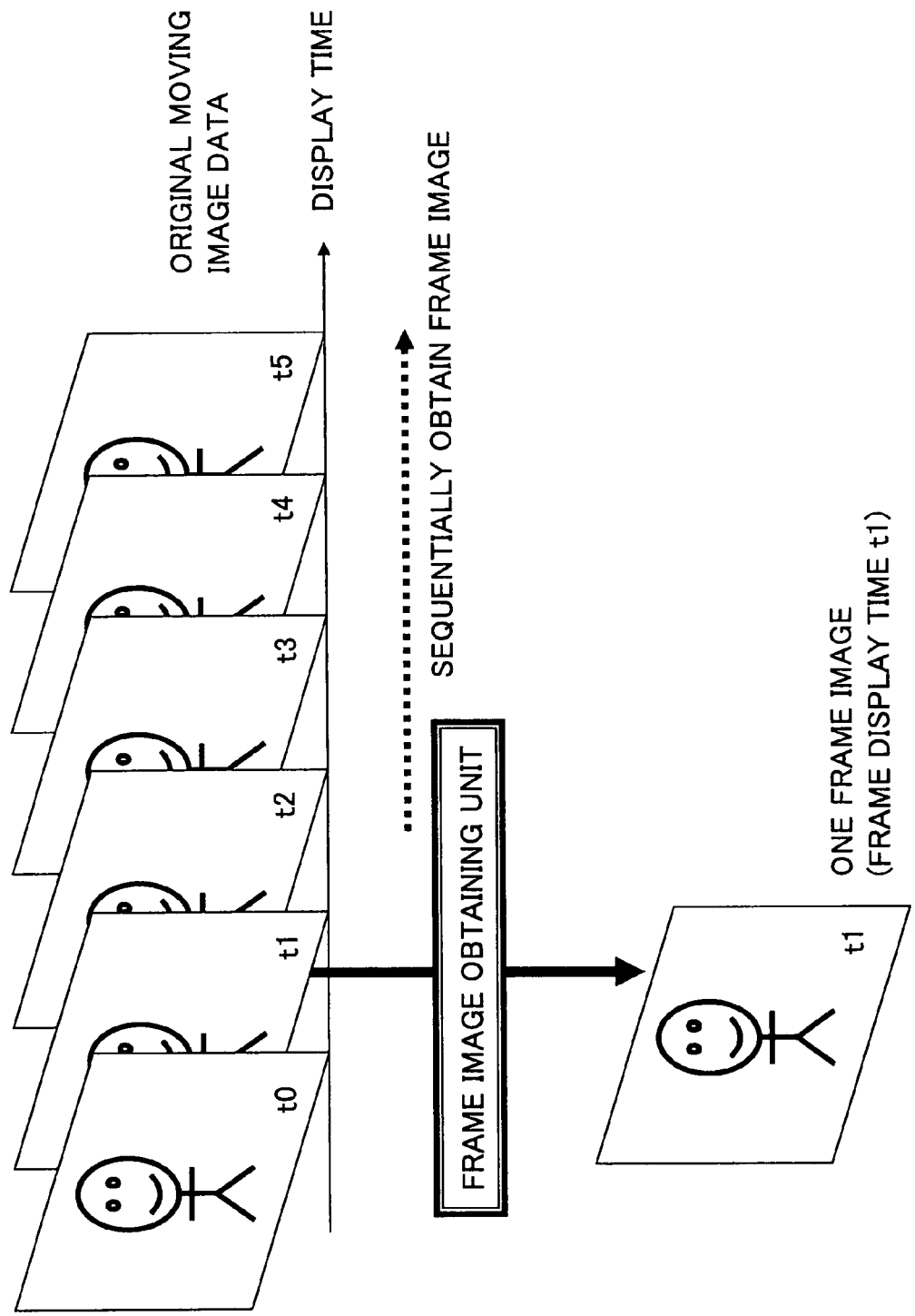
Figure 165:
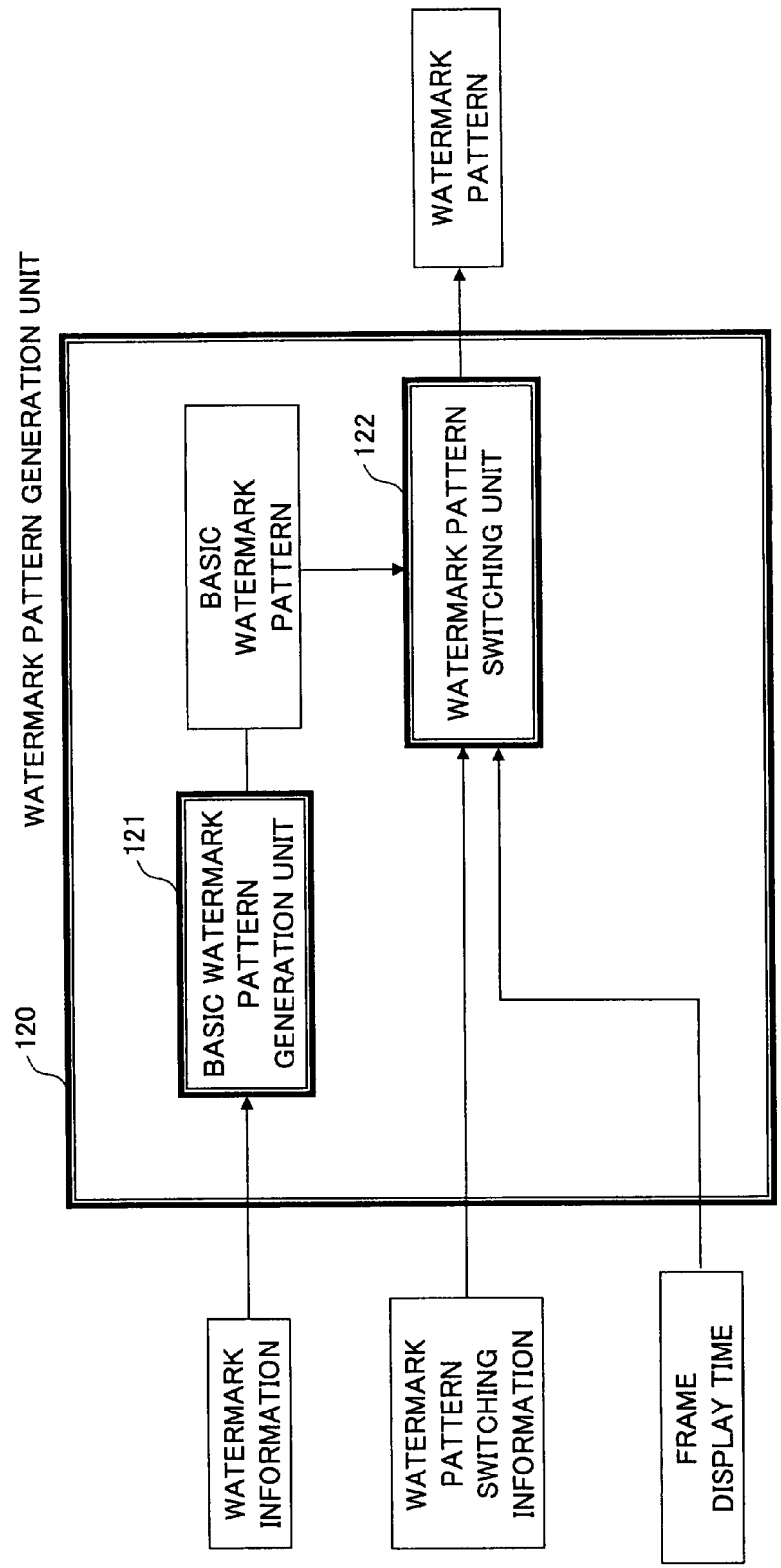
Figure 166:
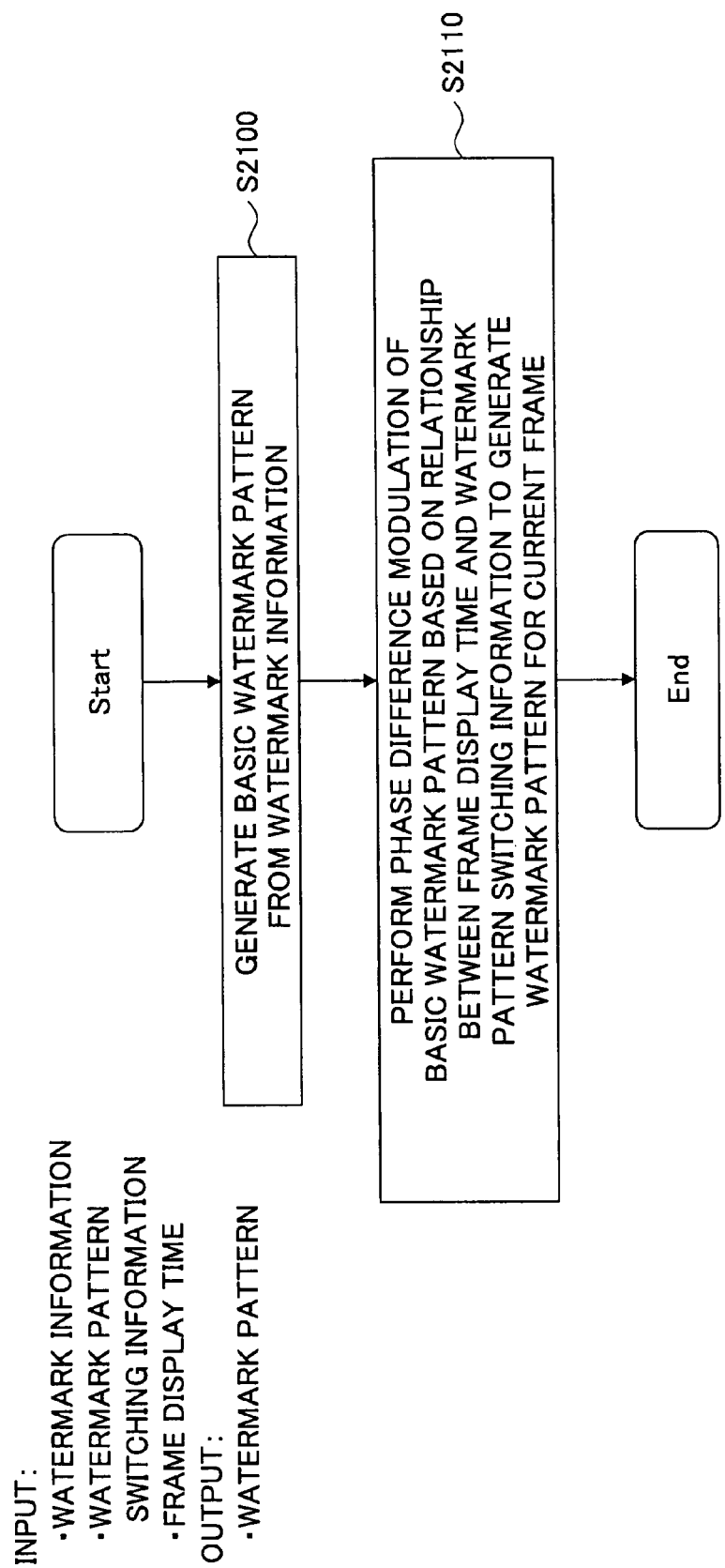
Figure 167:
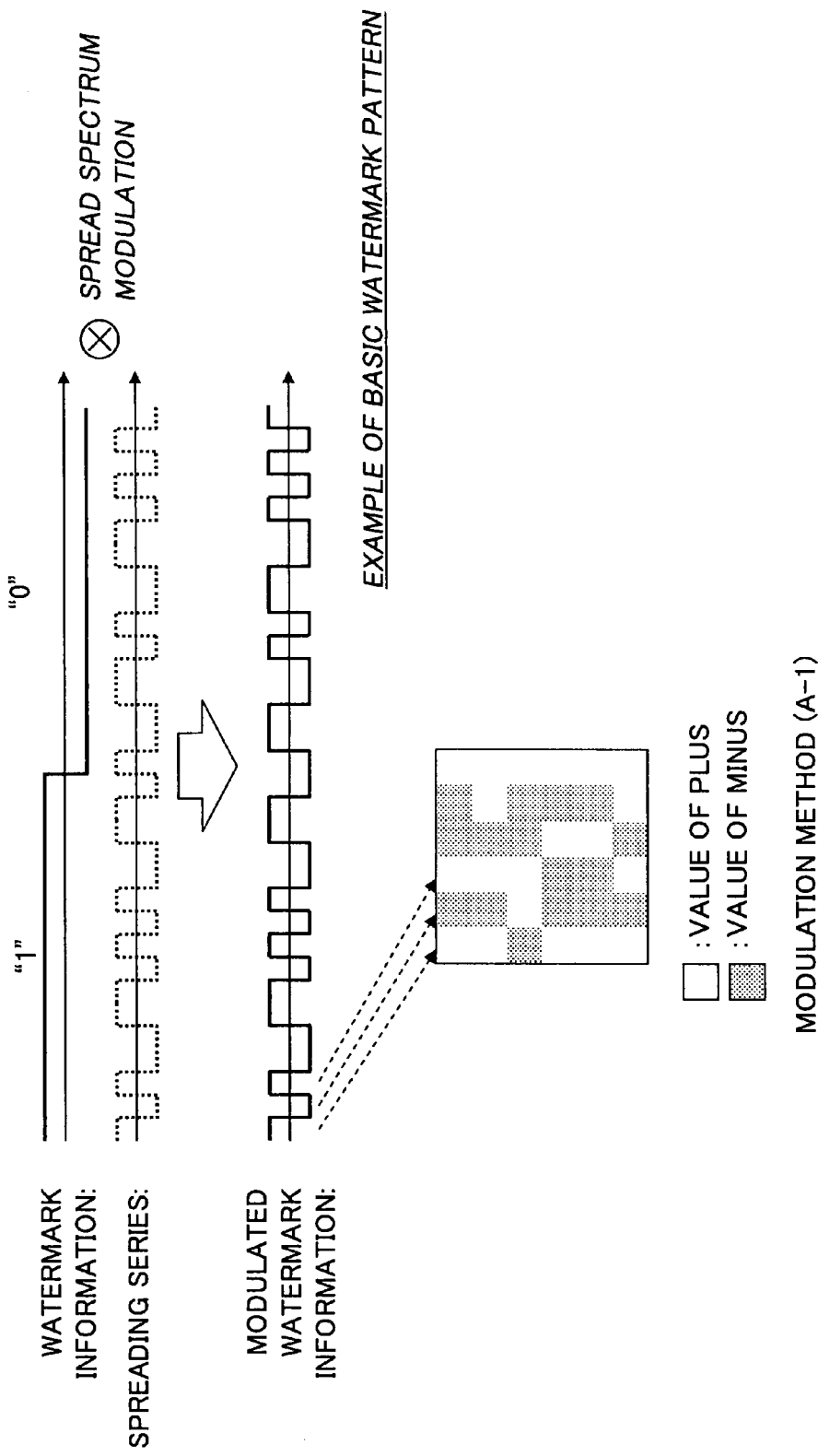
Figure 168:
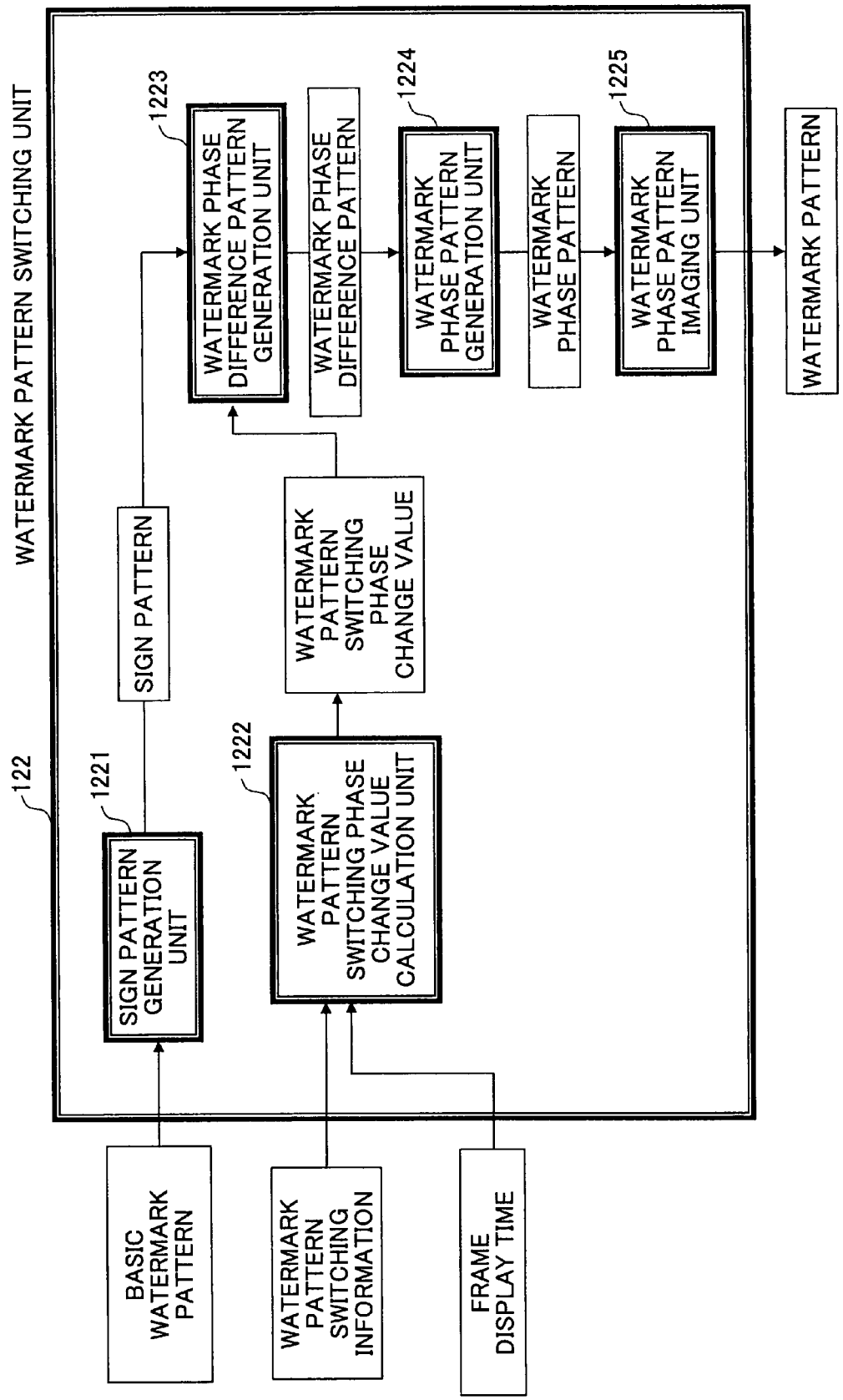
Figure 169:
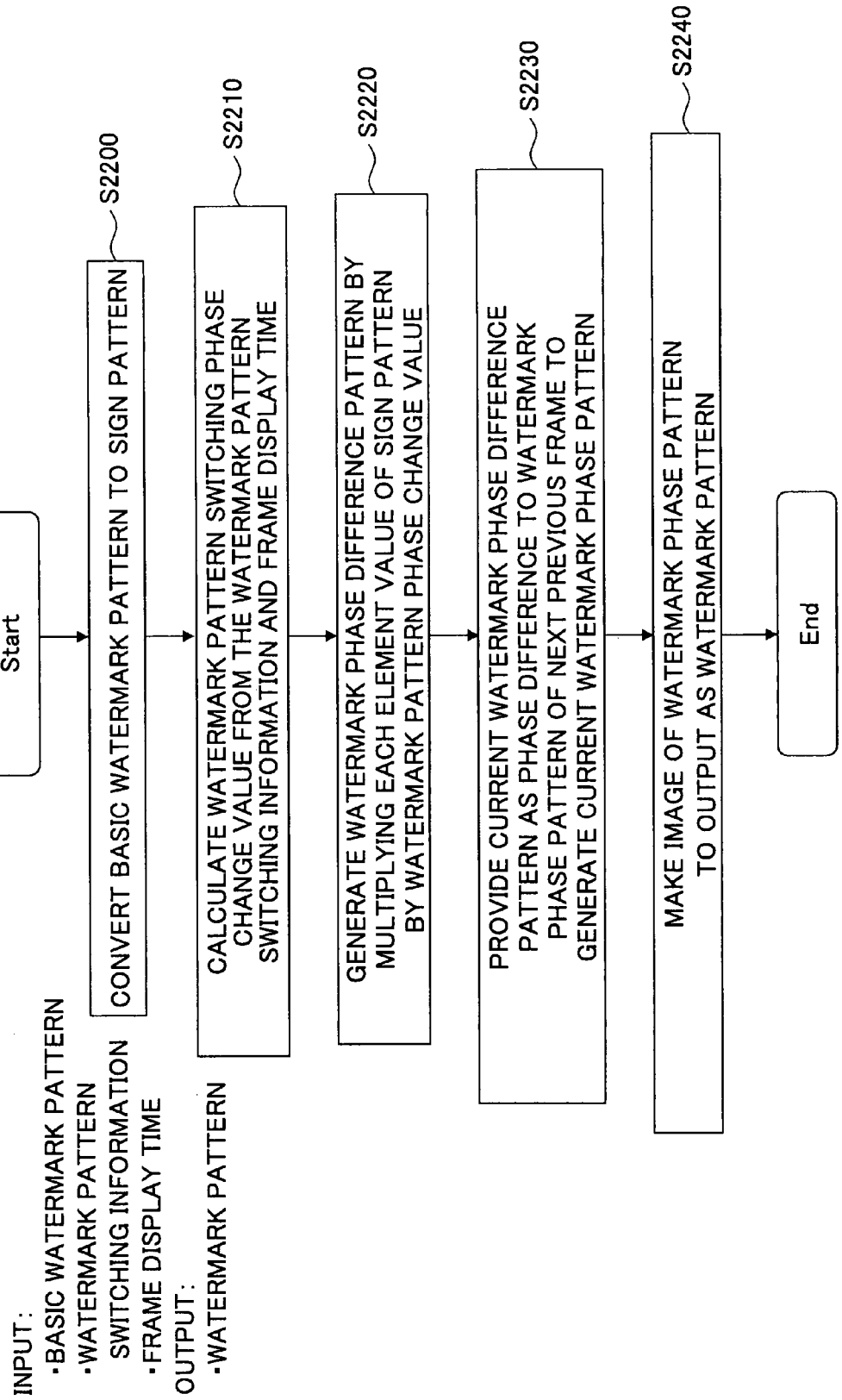
Figure 170:
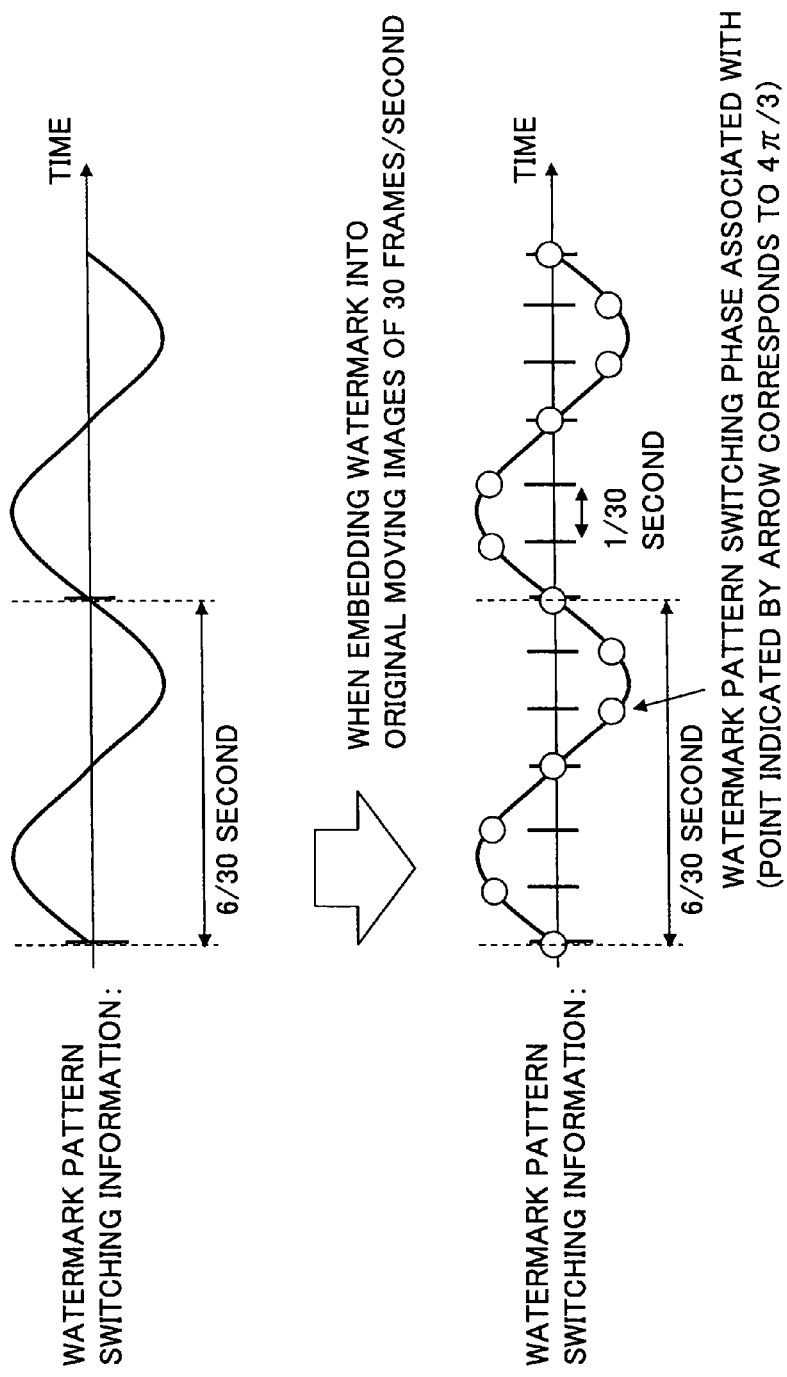
Figure 171:
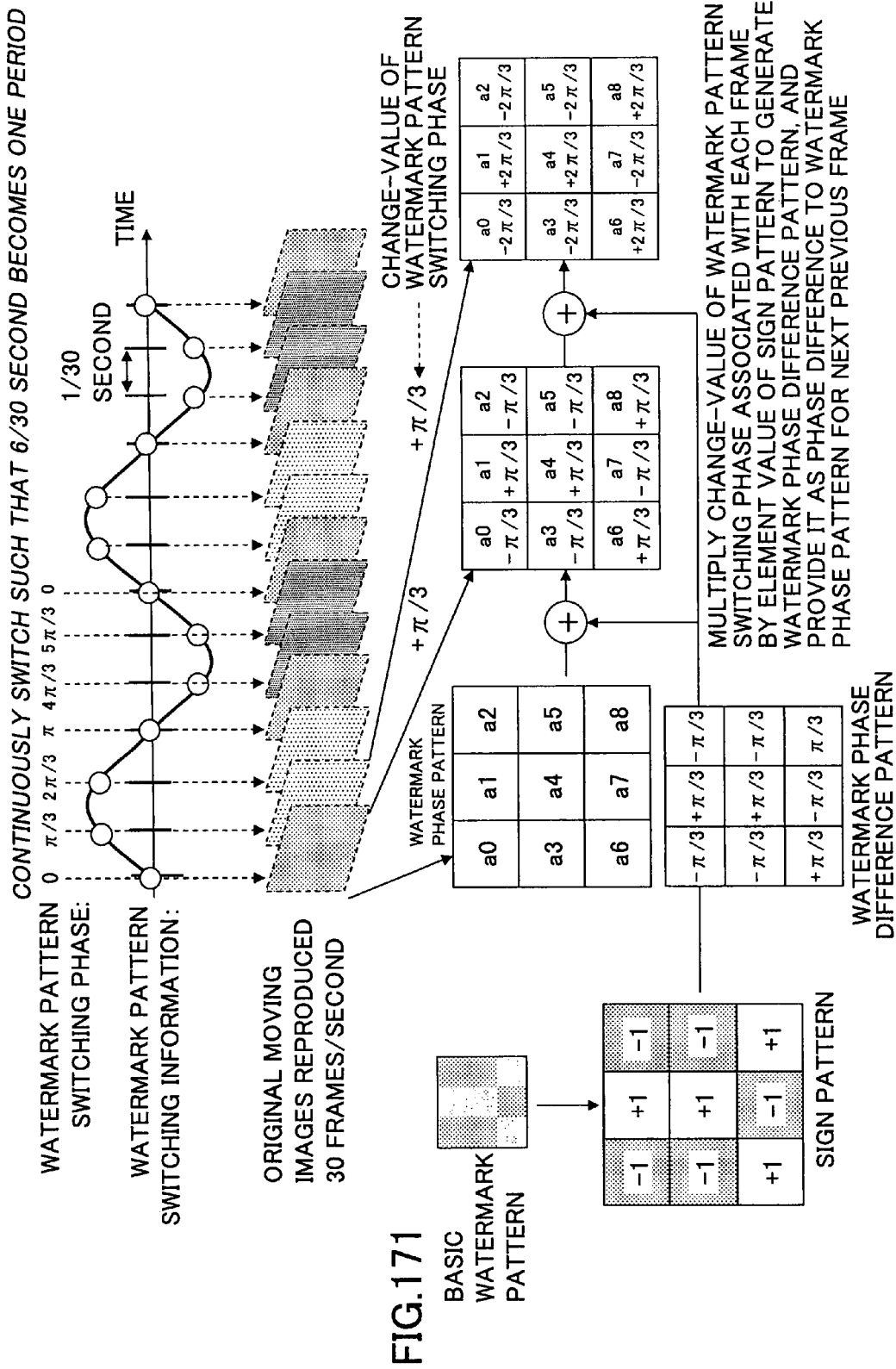
Figure 173:
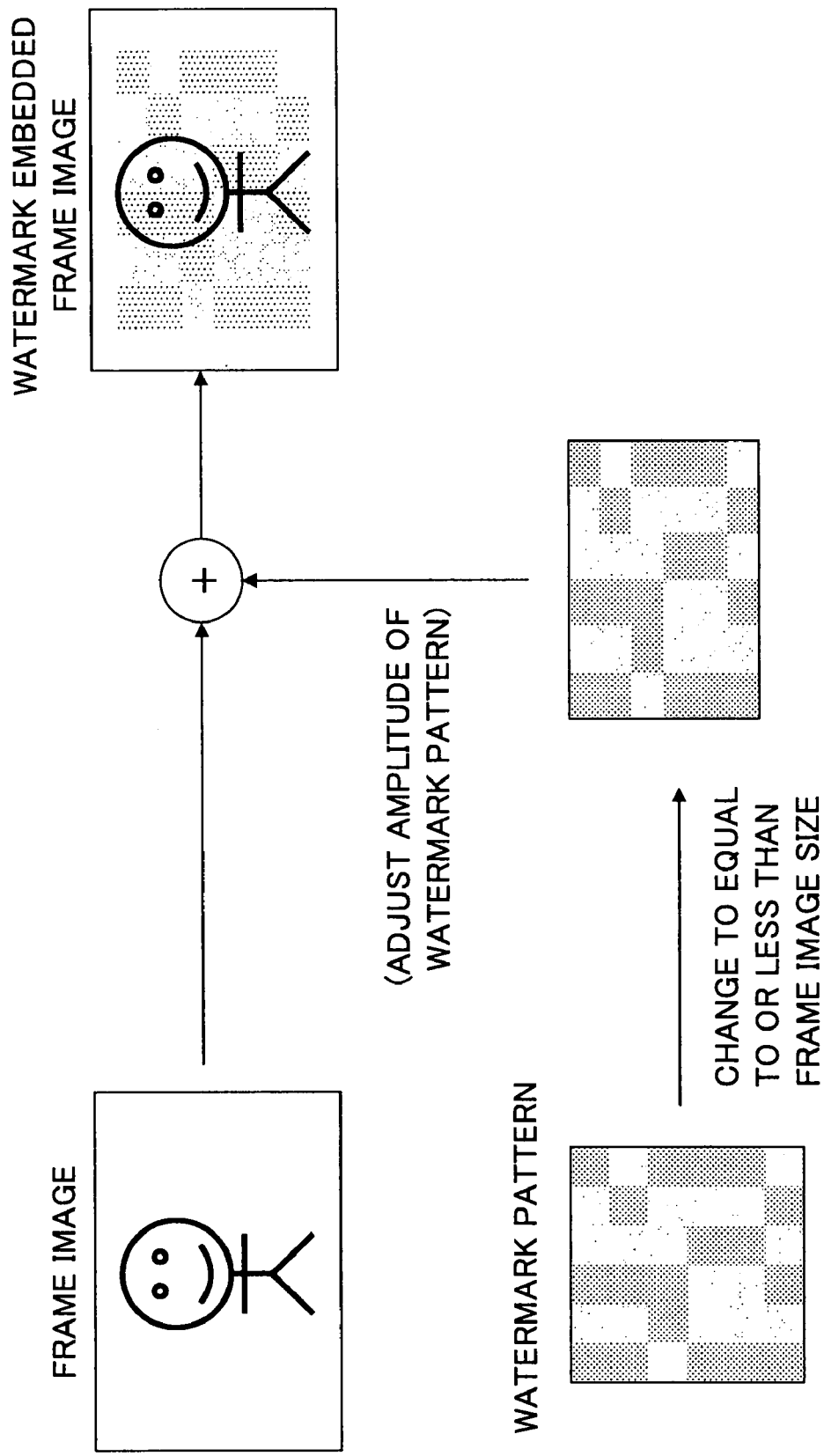
Figure 174:
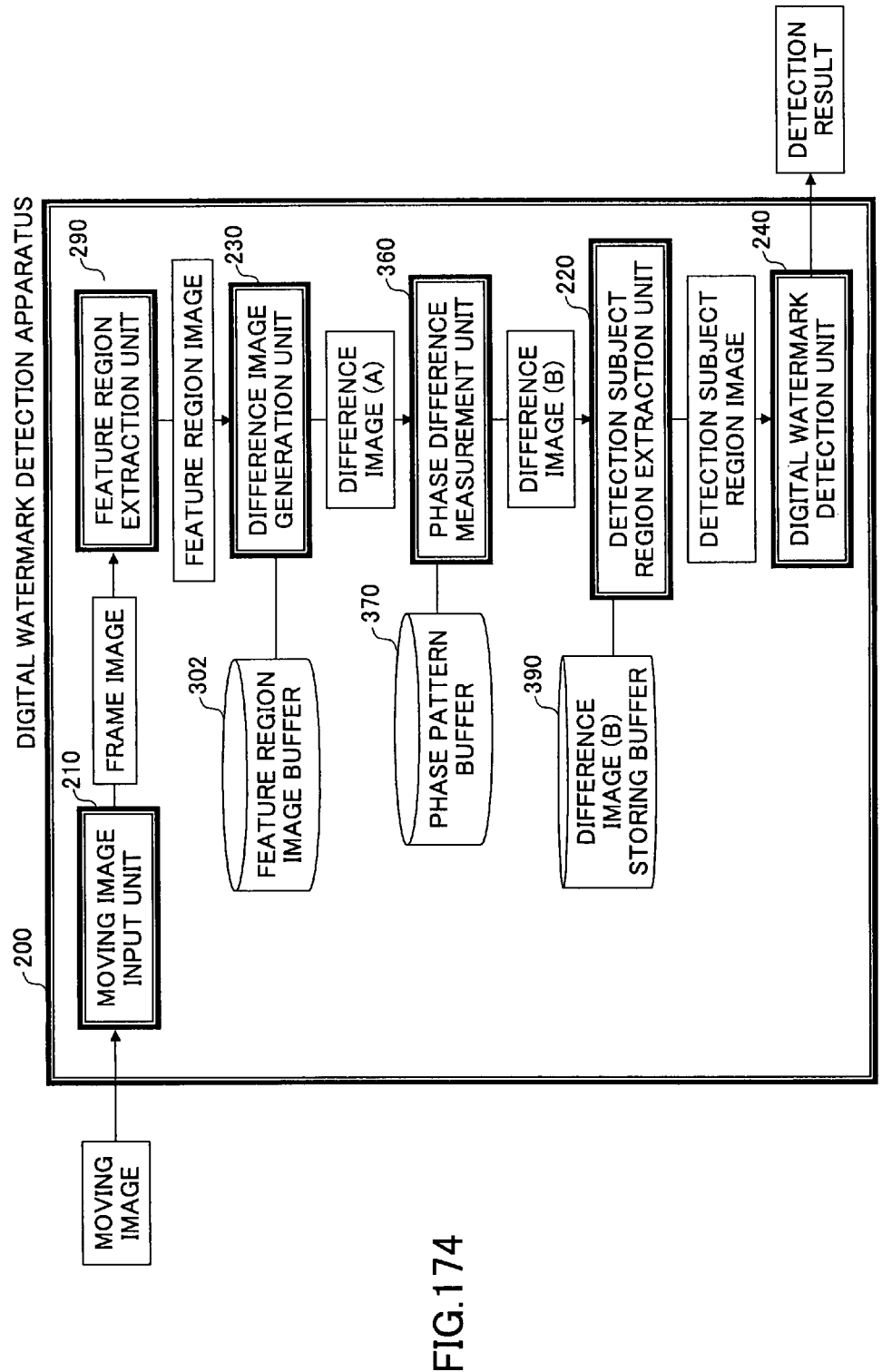
Figure 175:
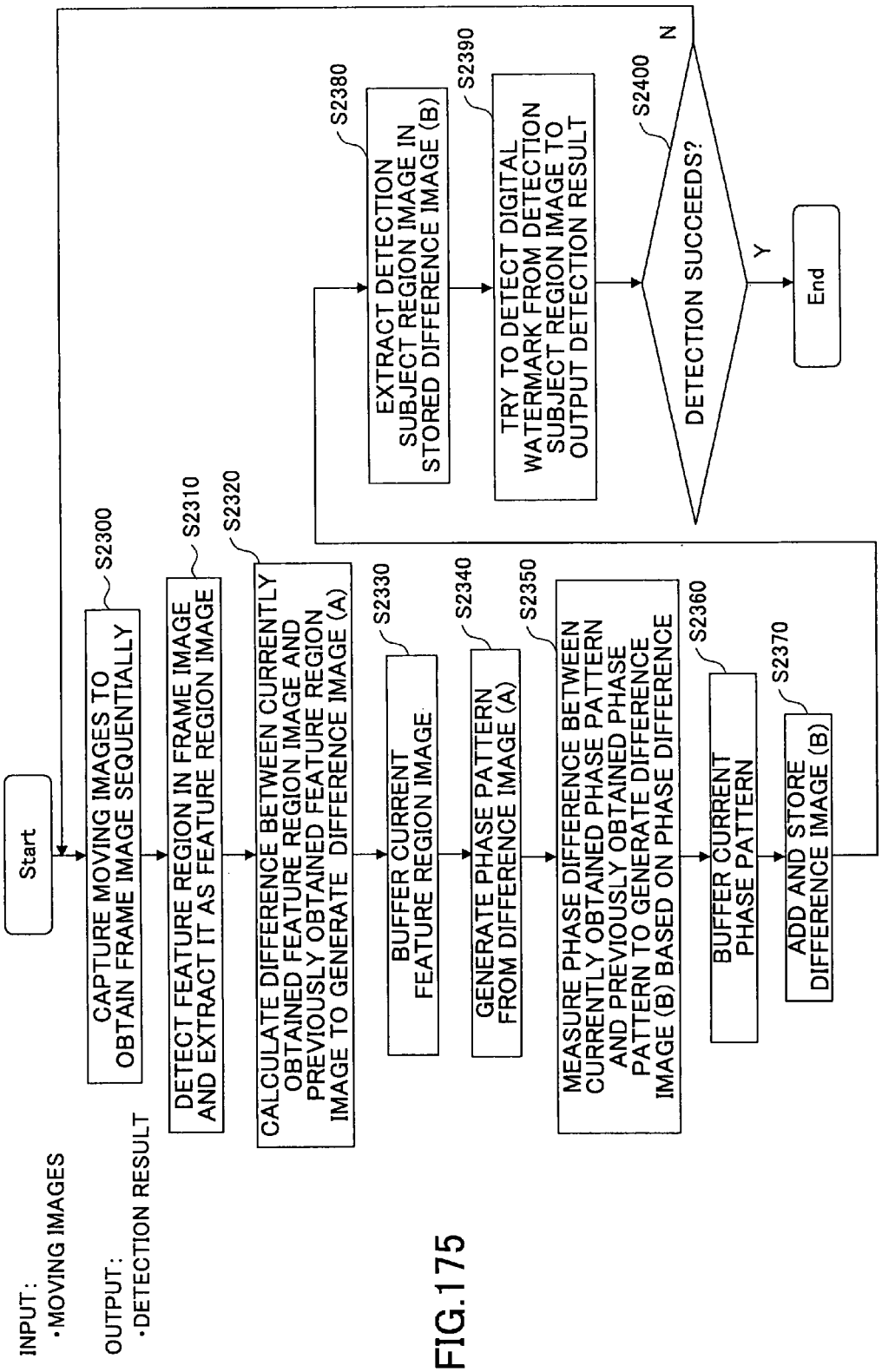
Figure 176:
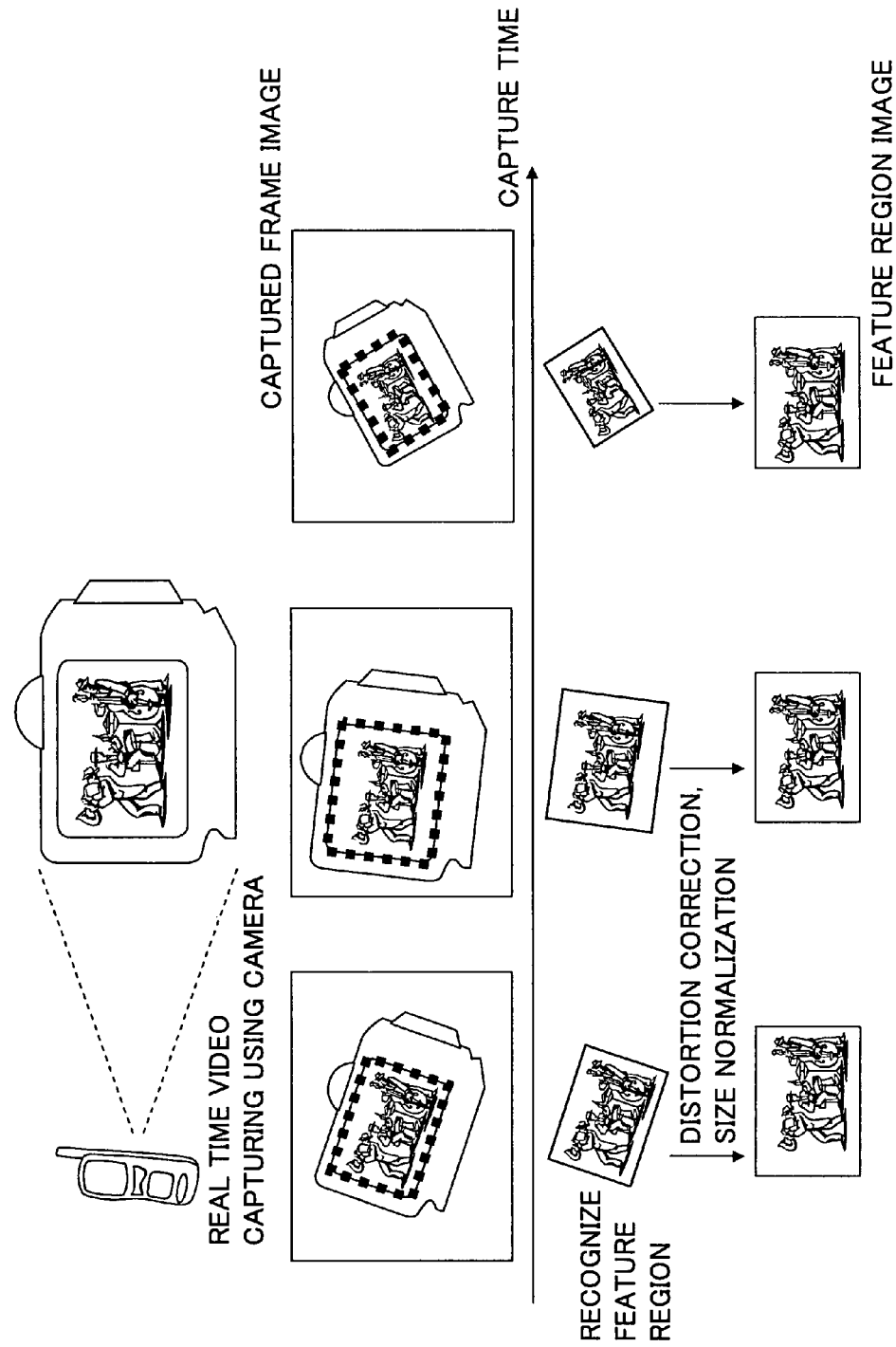
Figure 177:
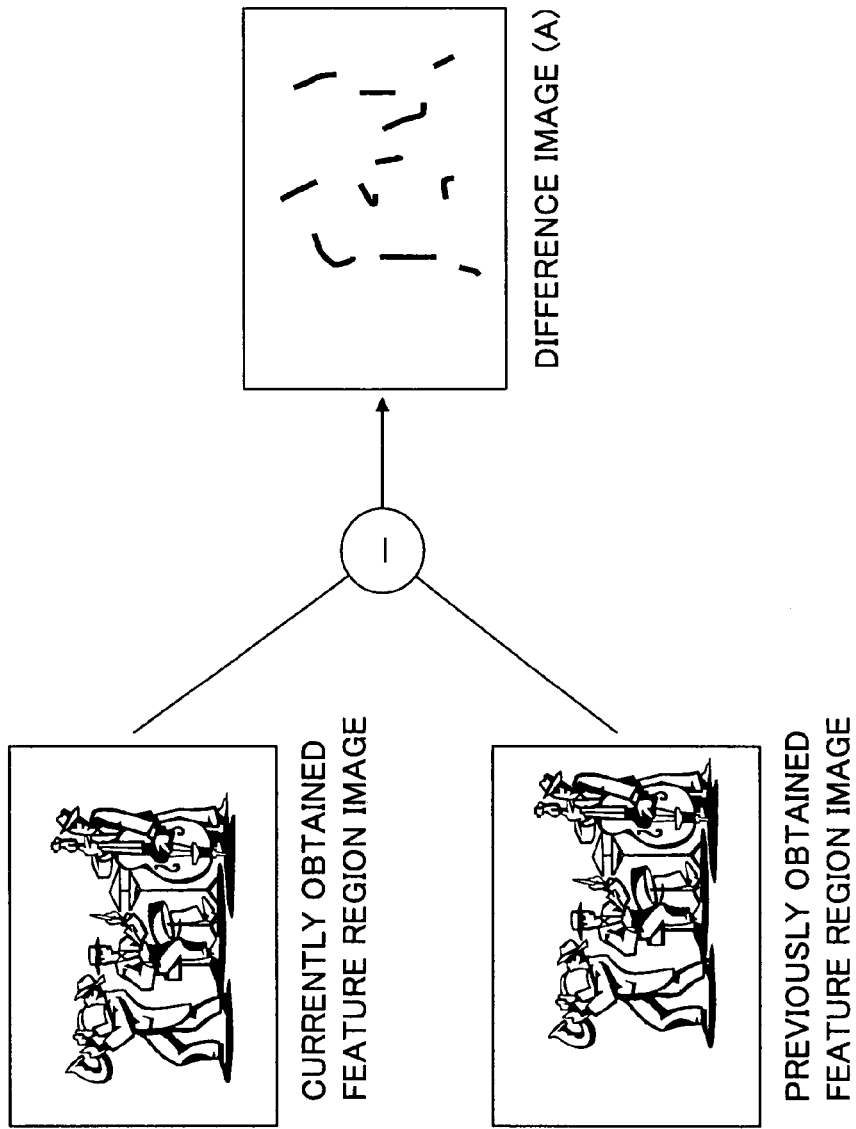
Figure 178:
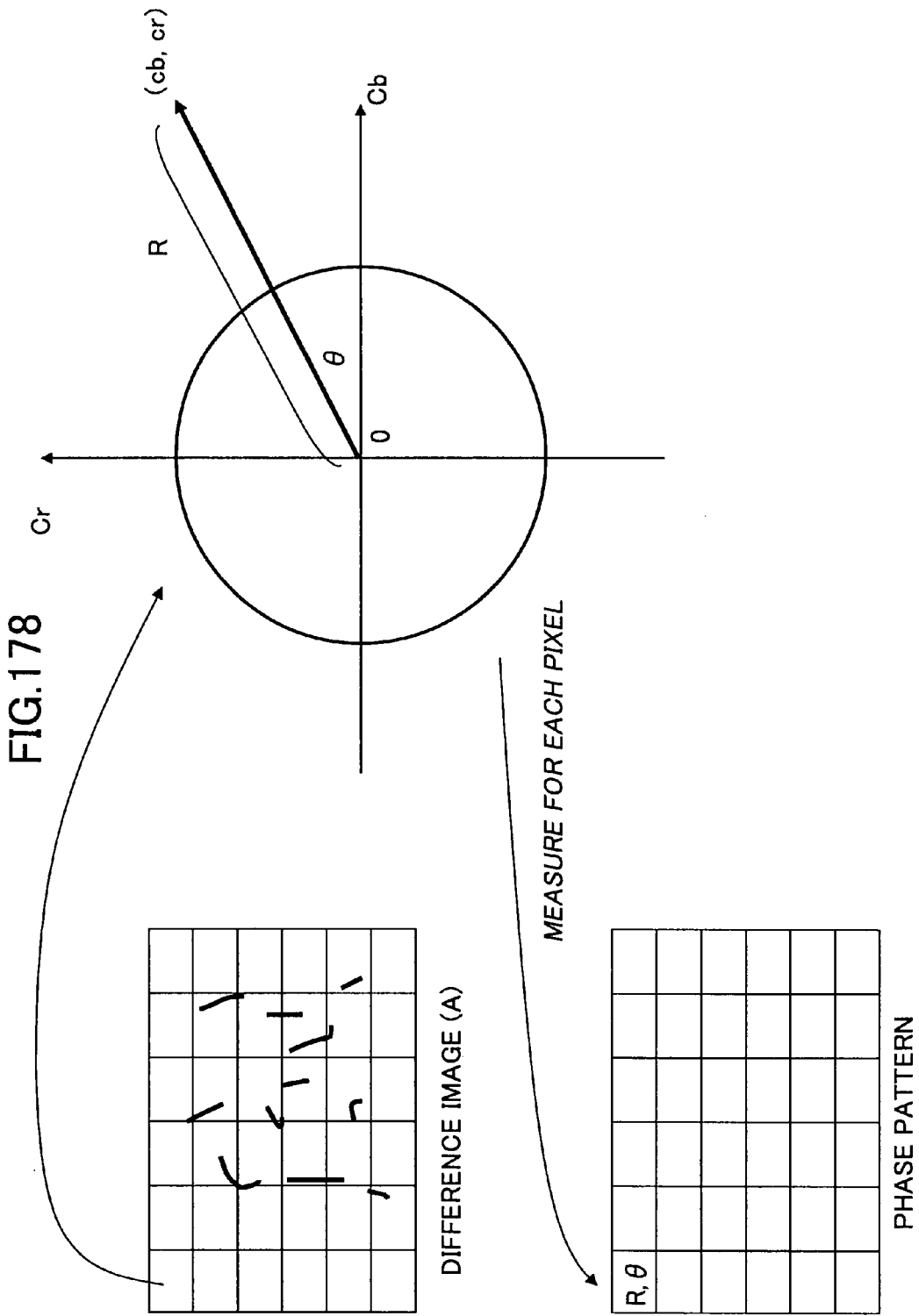
Figure 179:
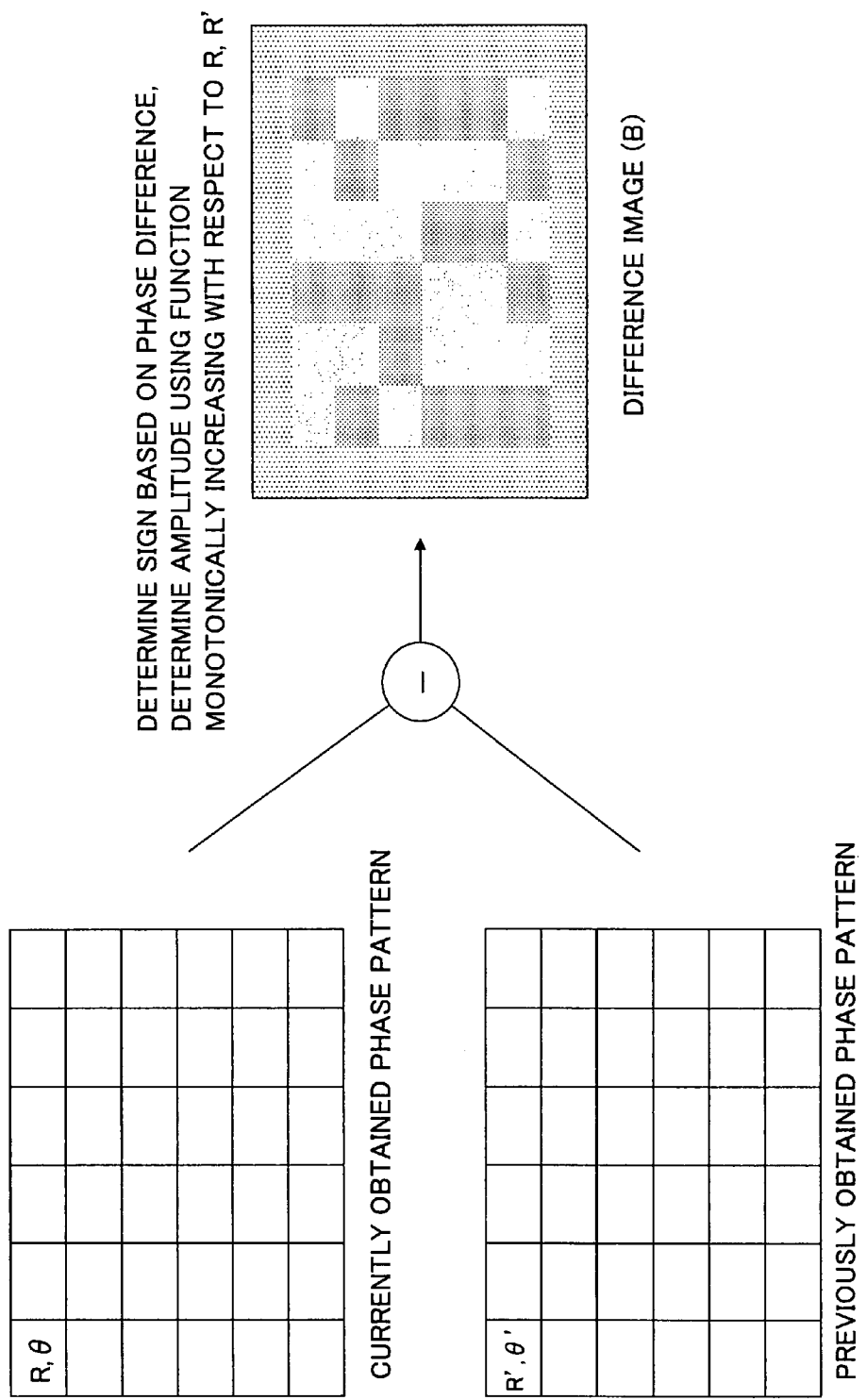
Figure 180A:
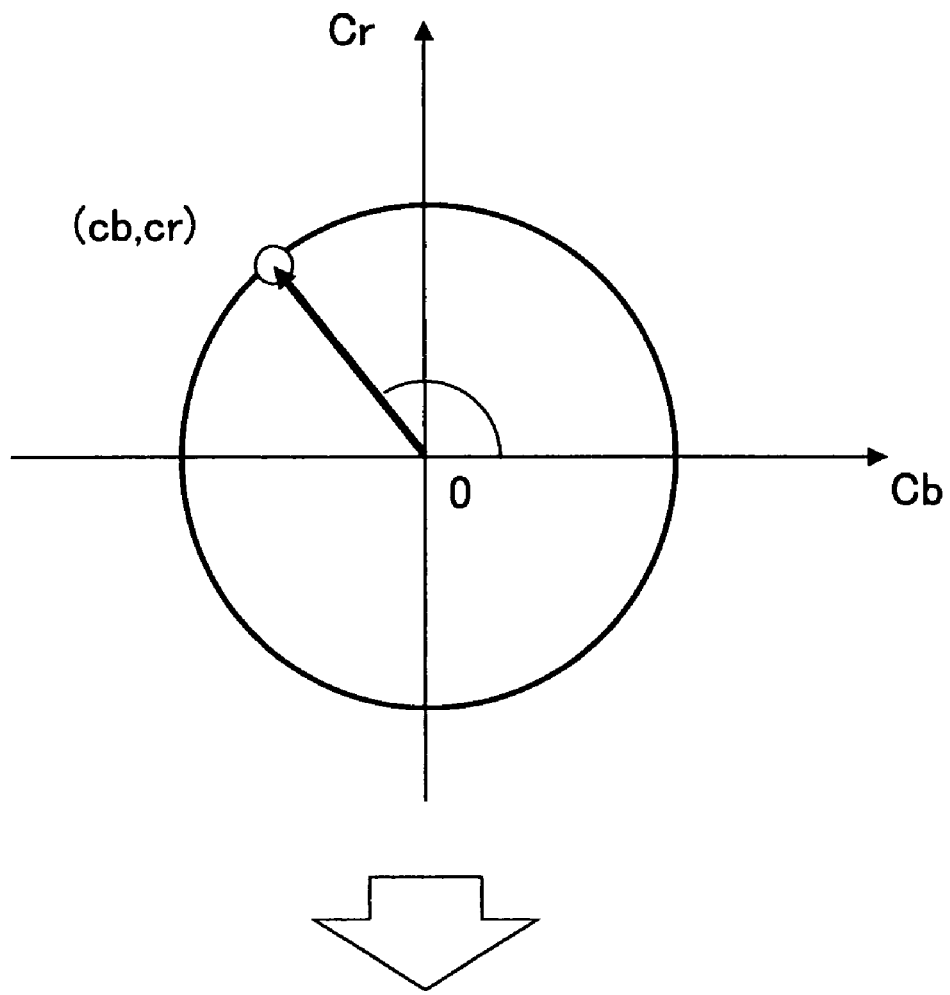
Figure 180B:
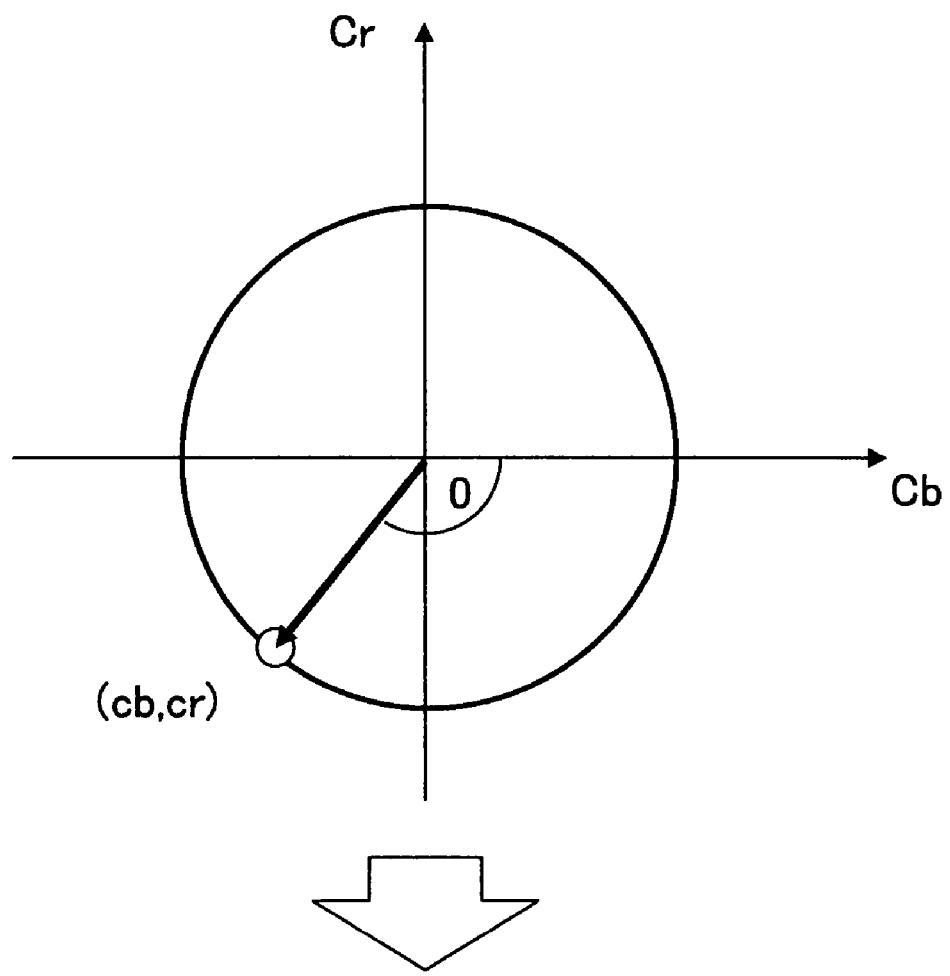
Figure 181:
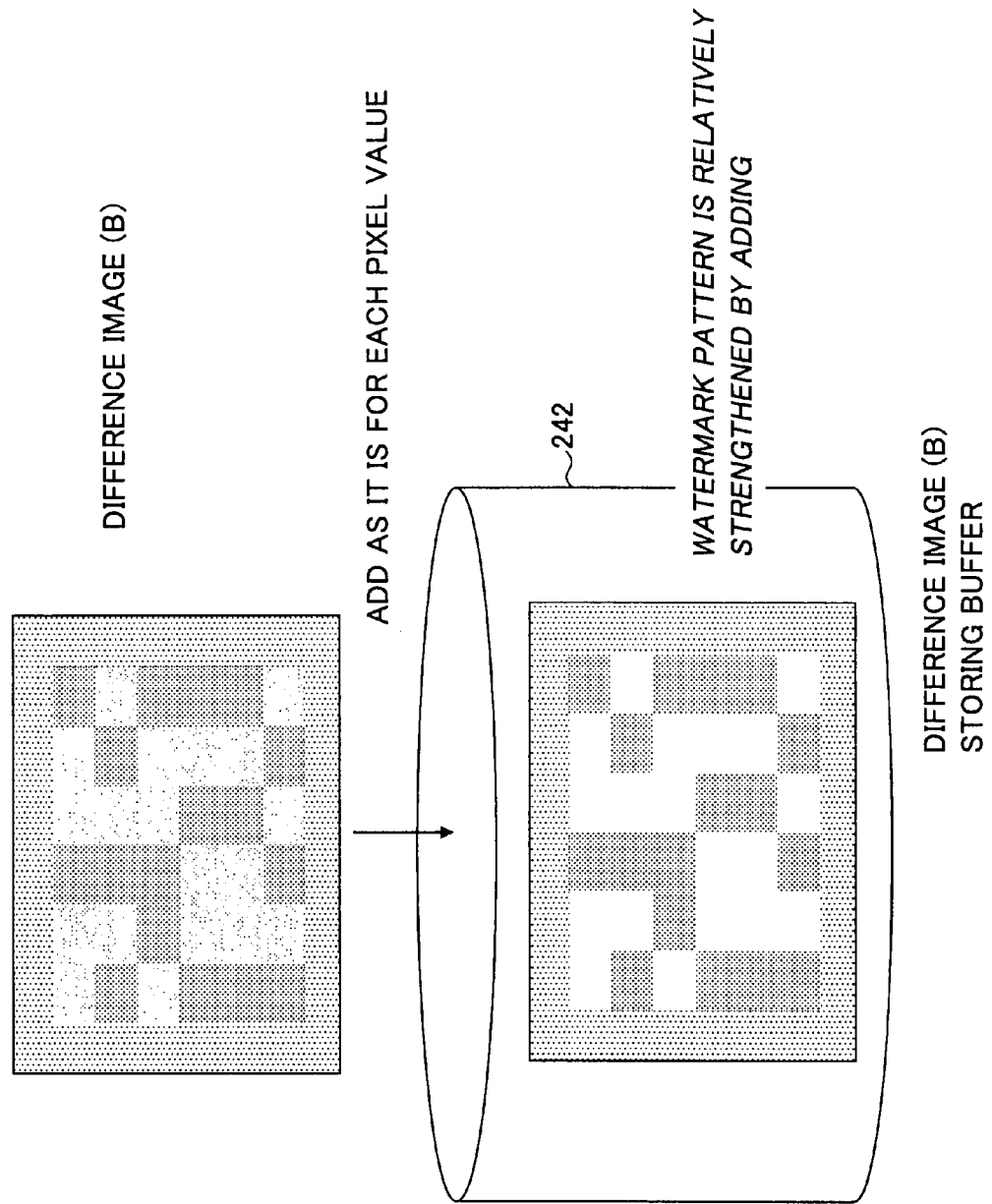
Figure 182:
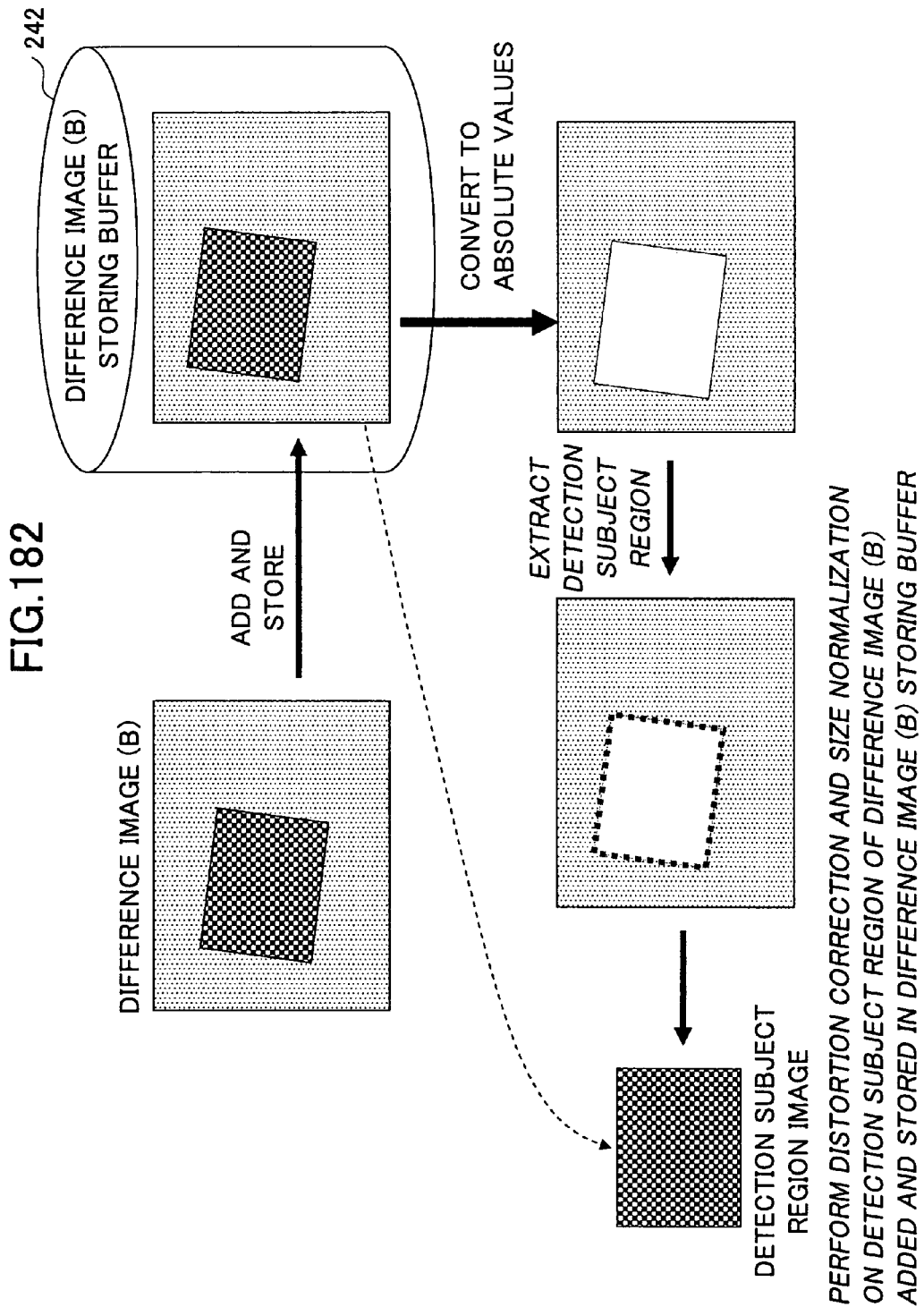
Figure 183:
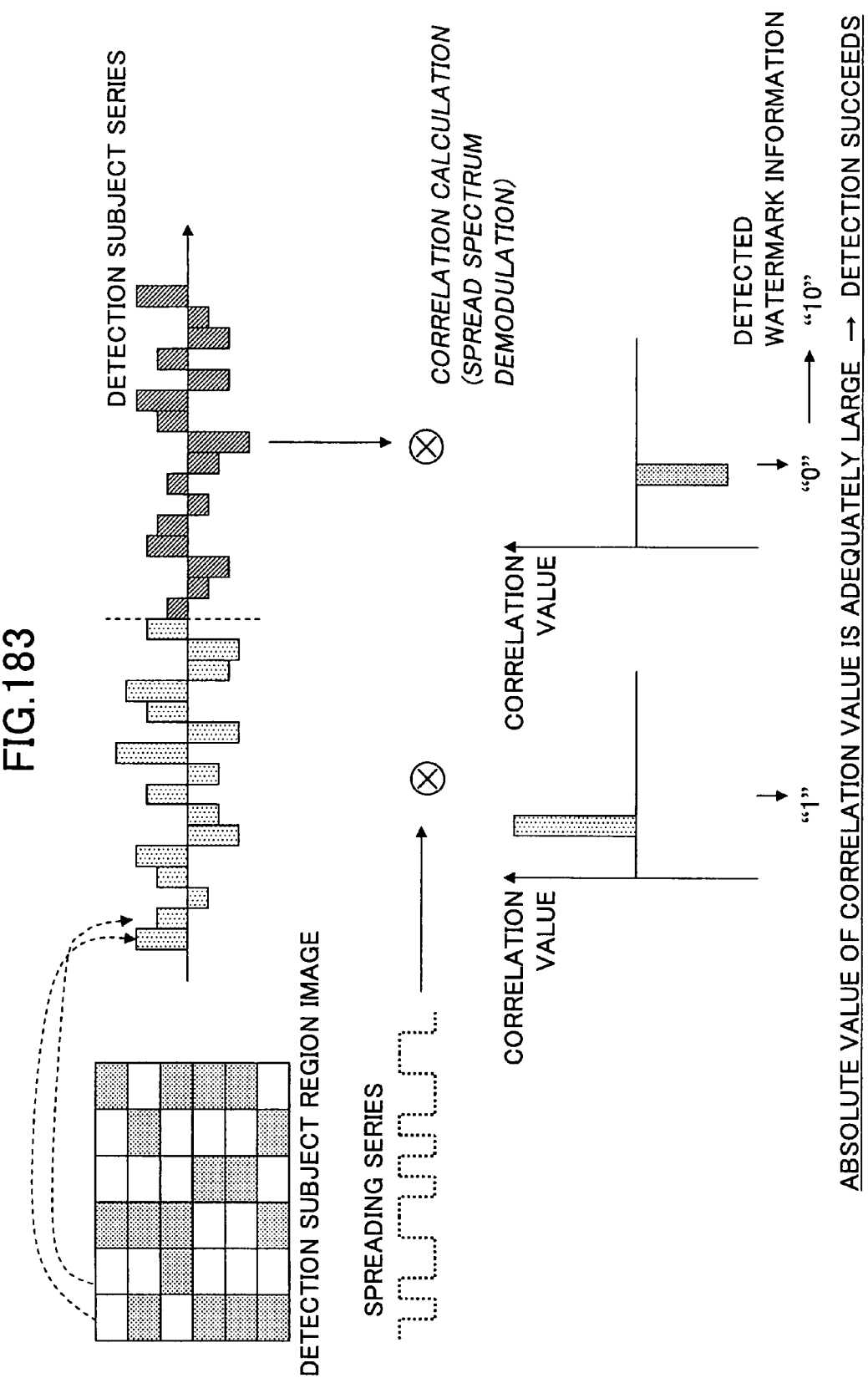

FIG. 118 is a figure for explaining processes of the watermark pattern switching unit in the twenty first embodiment of the present invention;

FIG. 119 is a figure for explaining processes of the watermark pattern switching unit in the twenty first embodiment of the present invention;

FIG. 120 is a figure for explaining processes of the difference image generation unit in the twenty first embodiment of the present invention;

FIG. 121 is a figure (1) for explaining principle of the twenty first embodiment of the present invention;

FIG. 122 is a figure (2) for explaining principle of the twenty first embodiment of the present invention;

FIG. 123 is a figure (3) for explaining principle of the twenty first embodiment of the present invention;

FIG. 124 is a figure for explaining effects of the twenty first embodiment of the present invention;

FIG. 125 is a figure for explaining processes of the difference image generation unit in the twenty second embodiment of the present invention;

FIG. 126A is a figure for explaining an example of filtering process in the twenty second embodiment of the present invention;

FIG. 126B is a figure for explaining an example of filtering process in the twenty second embodiment of the present invention;

FIG. 127 is a figure for explaining processes of the watermark pattern superimposing unit in the twenty third embodiment of the present embodiment;

FIG. 128 is a figure for explaining amplitude adjustment for the watermark pattern in the twenty third embodiment of the present invention;

FIG. 129 is a block diagram of a digital watermark detection apparatus in the twenty fourth embodiment of the present invention;

FIG. 130 is a flowchart of operation of the digital watermark detection apparatus in the twenty fourth embodiment of the present invention;

FIG. 131A is a figure for explaining effects of the twenty fourth embodiment of the present invention;

FIG. 131B is a figure for explaining effects of the twenty fourth embodiment of the present invention;

FIG. 132 is a figure for explaining an example of watermark pattern switching information in the twenty fifth embodiment of the present invention;

FIG. 133 is a figure (1) for explaining processes of the watermark pattern switching unit in the twenty fifth embodiment of the present invention;

FIG. 134 is a figure (2) for explaining processes of the watermark pattern switching unit in the twenty fifth embodiment of the present invention;

FIG. 135 is a block diagram of the digital watermark detection apparatus in the twenty fifth embodiment of the present invention;

FIG. 136 is a flowchart of operation of the digital watermark detection apparatus in the twenty fifth embodiment of the present invention;

FIG. 137 is a figure for explaining processes of the difference image generation unit in the twenty fifth embodiment of the present invention;

FIG. 138 is a figure (1) for explaining contents of processes of the phase difference measurement unit in the twenty fifth embodiment of the present invention;

FIG. 139 is a figure (2) for explaining contents of processes of the phase difference measurement unit in the twenty fifth embodiment of the present invention;

FIG. 140A is a figure (3) for explaining contents of processes of the phase difference measurement unit in the twenty fifth embodiment of the present invention;

FIG. 140B is a figure (3) for explaining contents of processes of the phase difference measurement unit in the twenty fifth embodiment of the present invention;

FIG. 141 is a figure (1) for explaining effects of the twenty fifth embodiment of the present invention;

FIG. 142 is a figure (2) for explaining effects of the twenty fifth embodiment of the present invention;

FIG. 143 is a figure (3) for explaining effects of the twenty fifth embodiment of the present invention;

FIG. 144 is a figure (4) for explaining effects of the twenty fifth embodiment of the present invention;

FIG. 145 is a figure (5) for explaining effects of the twenty fifth embodiment of the present invention;

FIG. 146 is a figure (6) for explaining effects of the twenty fifth embodiment of the present invention;

FIG. 147 is a figure (7) for explaining effects of the twenty fifth embodiment of the present invention;

FIG. 148 is a figure (8) for explaining effects of the twenty fifth embodiment of the present invention;

FIG. 149 is a figure (9) for explaining effects of the twenty fifth embodiment of the present invention;

FIG. 150 is a figure (10) for explaining effects of the twenty fifth embodiment of the present invention;

FIG. 151 is a figure (11) for explaining effects of the twenty fifth embodiment of the present invention;

FIG. 152 is a figure (12) for explaining effects of the twenty fifth embodiment of the present invention;

FIG. 153 is a figure (13) for explaining effects of the twenty fifth embodiment of the present invention;

FIG. 154 is a figure (14) for explaining effects of the twenty fifth embodiment of the present invention;

FIG. 155 is a figure (15) for explaining effects of the twenty fifth embodiment of the present invention;

FIG. 156 is a figure (16) for explaining effects of the twenty fifth embodiment of the present invention;

FIG. 157 is a figure (17) for explaining effects of the twenty fifth embodiment of the present invention;

FIG. 158 is a figure (18) for explaining effects of the twenty fifth embodiment of the present invention;

FIG. 159 is a figure (19) for explaining effects of the twenty fifth embodiment of the present invention;

FIG. 160 is a figure (20) for explaining effects of the twenty fifth embodiment of the present invention;

FIG. 161 is a figure (21) for explaining effects of the twenty fifth embodiment of the present invention;

FIG. 162 is a block diagram of the digital watermark embedding apparatus in the twenty sixth embodiment of the present invention;

FIG. 163 is a flowchart of operation of the digital watermark embedding apparatus of the twenty sixth embodiment of the present invention;

FIG. 164 is a figure for explaining processes of the frame image obtaining unit in the twenty sixth embodiment of the present invention;

FIG. 165 is a block diagram of the watermark pattern generation unit in the twenty sixth embodiment of the present invention;

FIG. 166 is a flowchart of operation of the watermark pattern generation unit in the twenty sixth embodiment of the present invention;

FIG. 167 is a figure for explaining an example of processes of the basic watermark pattern generation unit in the twenty sixth embodiment of the present invention;

FIG. 168 is a block diagram of the watermark pattern switching unit in the twenty sixth embodiment of the present invention;

FIG. 169 is a flowchart of the operation of the watermark pattern switching unit in the twenty sixth embodiment of the present invention;

FIG. 170 is a figure for explaining an example of the watermark pattern switching information in the twenty sixth embodiment of the present invention;

FIG. 171 is a figure for explaining processes of the watermark pattern switching unit in the twenty sixth embodiment of the present invention;

FIG. 172 is a figure for explaining processes of the watermark phase pattern imaging unit in the twenty sixth embodiment of the present invention;

FIG. 173 is a figure for explaining processes of the watermark pattern superimposing unit in the twenty sixth embodiment of the present invention;

FIG. 174 is a block diagram of the digital watermark detection apparatus in the twenty sixth embodiment of the present invention;

FIG. 175 is a flowchart of operation of the digital watermark detection apparatus in the twenty sixth embodiment of the present invention;

FIG. 176 is a figure for explaining processes of the feature region extraction unit in the twenty sixth embodiment of the present invention;

FIG. 177 is a figure for explaining processes of the difference image generation unit in the twenty sixth embodiment of the present invention;

FIG. 178 is a figure (1) for explaining process contents of the phase difference calculation unit in the twenty sixth embodiment of the present invention;

FIG. 179 is a figure (2) for explaining process contents of the phase difference calculation unit in the twenty sixth embodiment of the present invention;

FIG. 180A is a figure (3) for explaining process contents of the phase difference calculation unit in the twenty sixth embodiment of the present invention;

FIG. 180B is a figure (3) for explaining process contents of the phase difference calculation unit in the twenty sixth embodiment of the present invention;

FIG. 181 is a figure for explaining the difference image (B) storing buffer in the twenty sixth embodiment of the present invention;

FIG. 182 is a figure for explaining processes of the detection subject region extraction unit in the twenty sixth embodiment of the present invention;

FIG. 183 is a figure for explaining processes of the digital watermark detection unit in the twenty sixth embodiment of the present invention.

DESCRIPTION OF REFERENCE SIGNS 100 digital watermark embedding apparatus
110 frame image obtaining unit
120 watermark pattern generation unit
121 basic watermark pattern generation unit
122 watermark pattern switching unit
123 watermark information dividing unit
130 watermark pattern superimposing unit
140 moving image data reconstruction unit
200 digital watermark detection apparatus
210 moving image input unit
220 detection subject region extraction unit
230 difference image generation unit
240 digital watermark detection unit
241 difference image phase determination unit
242 watermark information detection unit
243 correlation calculation unit
244 detection availability determination unit
246 data block ID detection unit
247 data block information detection unit
248 difference image storing buffer for data block ID=n
249 correlation calculation unit
250 detection subject region image buffer
260 detection necessity determination unit
265 feedback output unit
270 capture timing control unit
281 detected data block buffering unit
282 detection complete check unit 283 detected watermark information buffer
290 feature region extraction unit
301 frame image buffer
302 feature region image buffer
303 difference frame image buffer
304 feature region difference image buffer
310 zooming process unit
360 phase difference measurement unit
370 phase pattern buffer
390 difference image (B) storing buffer
1221 sign pattern generation unit
1222 watermark pattern switching phase change value calculation unit
1223 watermark phase difference pattern generation unit
1224 watermark phase pattern generation unit
1225 watermark phase pattern imaging unit

PREFERRED EMBODIMENTS FOR CARRYING OUT THE INVENTION

In the following, embodiments of the present invention are described with reference to figures.

Outline of the Embodiments

First, outlines of the embodiments are described. FIGS. 1A-2B show an embodiment outline A.

FIG. 1A shows a flowchart of a digital watermark embedding method of the embodiment outline A. This method is a digital watermark embedding method in an digital watermark embedding apparatus for embedding digital watermark into moving images. In the method, moving image data including a frame image group, watermark information, and watermark pattern switching information are supplied to the digital watermark embedding apparatus (step A1). Next, the digital watermark embedding apparatus sequentially obtains each frame image of the moving image data and its frame display time (step A2), generates a watermark pattern using the watermark information, the frame display time and the watermark pattern switching information (step A3) and superimposes the watermark patter onto the frame image (step A4). Then, the watermark embedding apparatus combines watermark embedded frame images obtained by sequentially repeating the step 2-step 4 so as to generate watermark embedded moving image data (step A5).

Figure 1B:
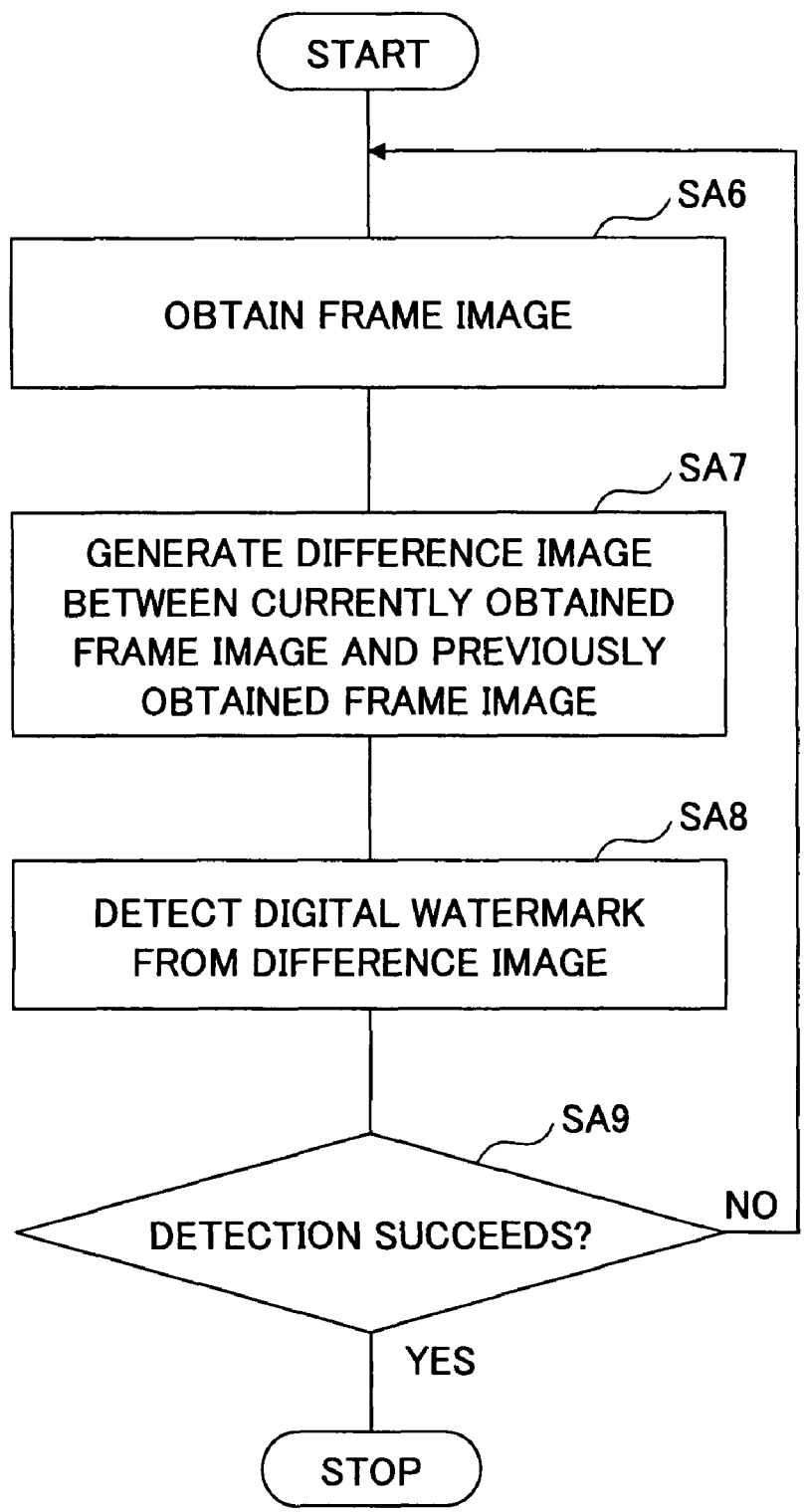
FIG. 1B is a flowchart of a digital watermark detection method showing the outline A of the embodiment.

FIG. 1B shows a flowchart of a digital watermark detection method of the embodiment outline A. This method is a digital watermark detection method in a digital watermark detection apparatus for detecting digital watermark from the moving images. In the method, a frame image is sequentially obtained, first (step A6). Next, the digital watermark detection apparatus generates a difference image between a currently obtained frame image and a previously obtained frame image (step A7) and performs digital watermark detection from the difference image to output digital watermark detection status (step A8). Then, in cases where the digital watermark detection process is continued including a case where digital watermark detection was impossible, the digital watermark detection apparatus obtains a new frame image again with a moving image input means and repeats the above-mentioned process (step A9).

Figure 2A:
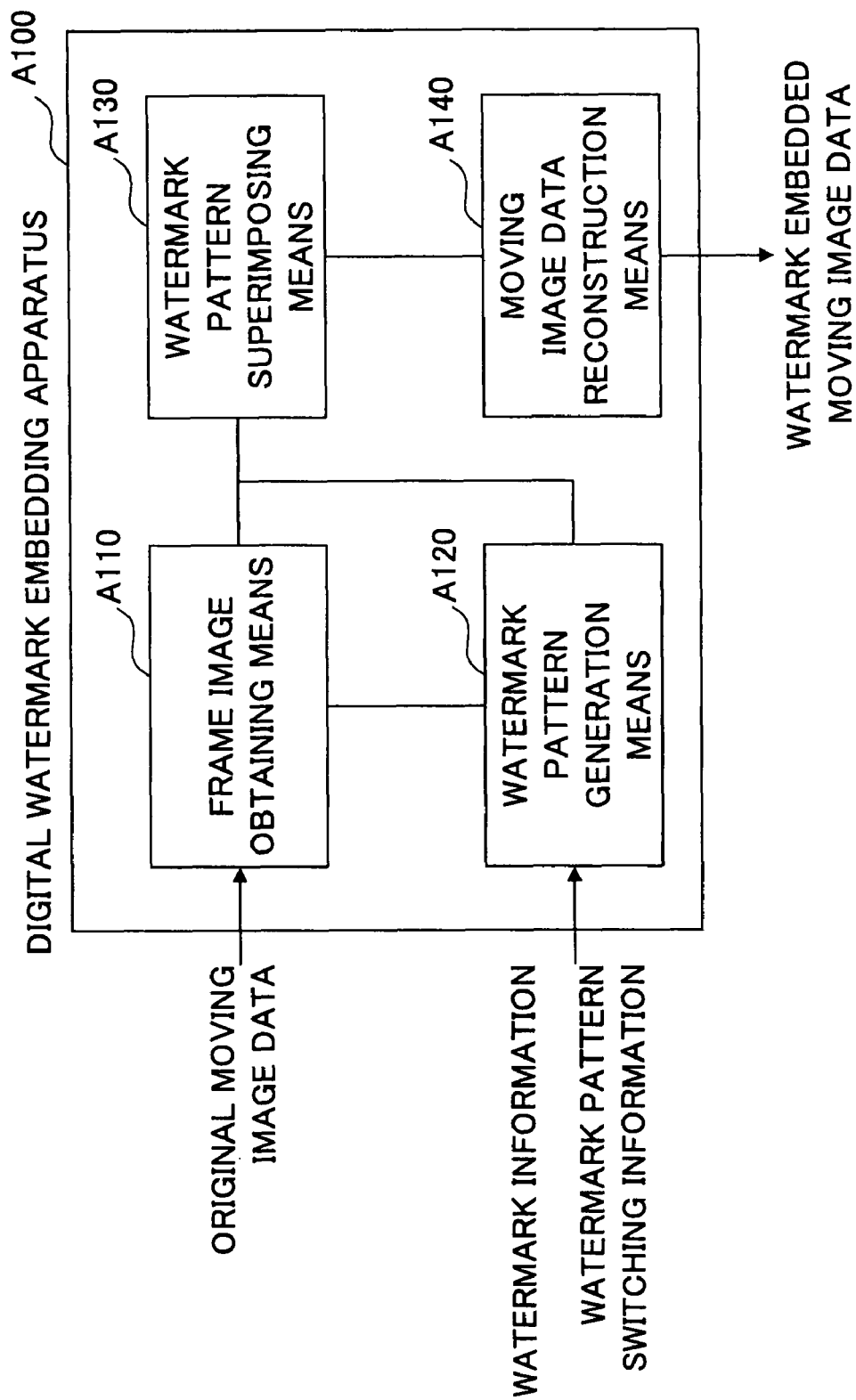
FIG. 2A is a block diagram of a digital watermark embedding apparatus showing the outline A of the embodiment.

FIG. 2A shows a block diagram of the digital watermark embedding apparatus of the embodiment outline A. The digital watermark apparatus includes frame image obtaining means A110 configured to sequentially obtain each frame image of moving image data including a supplied frame image group and the frame display time, watermark pattern generation means A120 configured to generate a watermark pattern using the supplied watermark information, the frame display time and the supplied pattern switching information, watermark pattern superimposing means A130 configured to superimpose the watermark pattern onto the frame image, and moving image data reconstruction means A140 configured to combine the watermark embedded frame images that are obtained by sequentially repeating processes from the frame image obtaining means A110 to the watermark pattern superimposing means so as to generate watermark embedded moving image data.

Figure 2B:
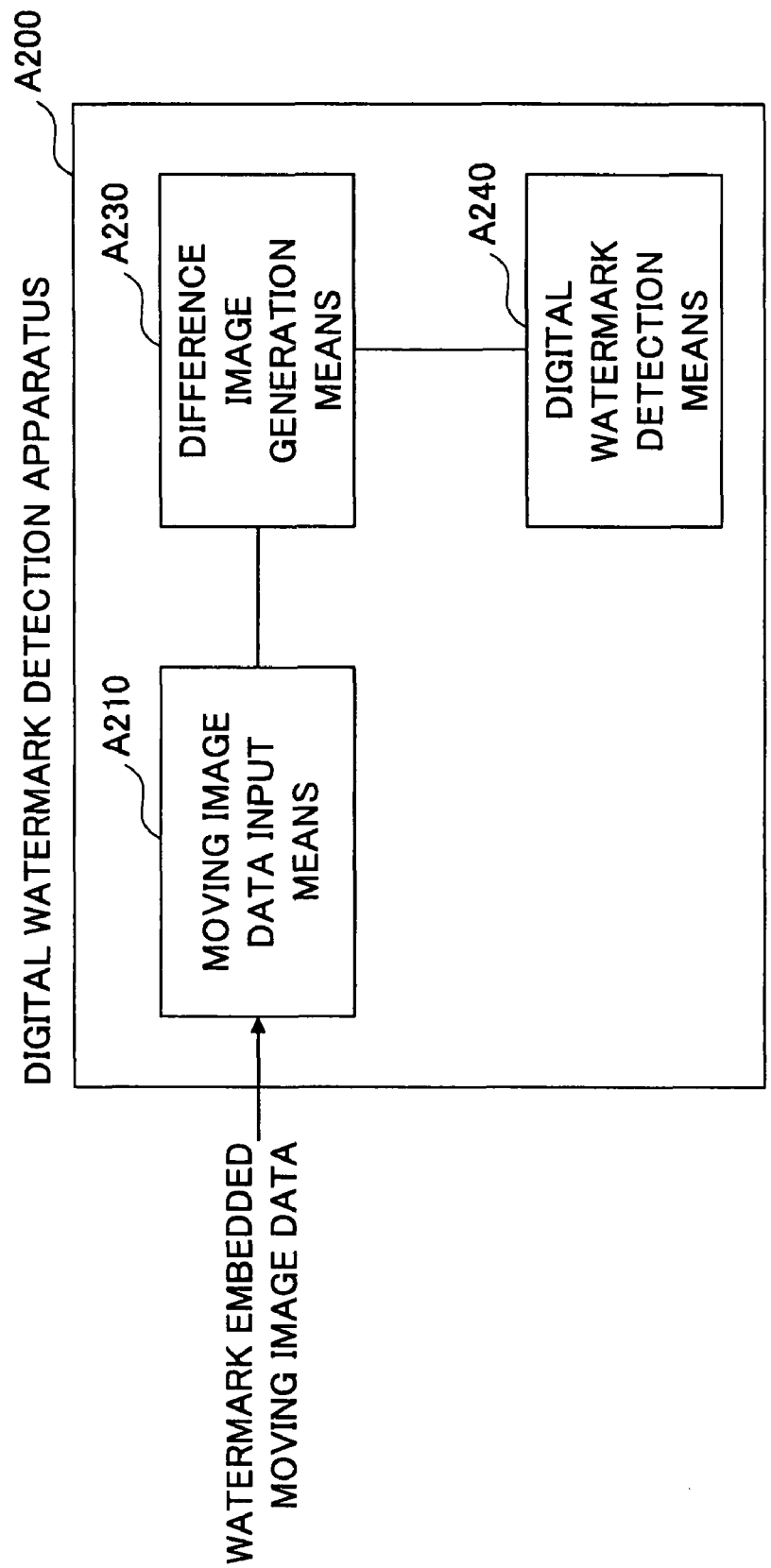
FIG. 2B is a block diagram of a digital watermark detection apparatus showing the outline A of the embodiment.

FIG. 2B shows a block diagram of the digital watermark detection apparatus of the embodiment outline A. This digital watermark detection apparatus includes moving image input means A210 configured to sequentially obtain a frame image, difference image generation means A230 configured to generate a difference image between a currently obtained frame image and a previously obtained frame image, and digital watermark detection means A240 configured to perform digital watermark detection from the difference image to output digital watermark detection status.

Figure 3A:
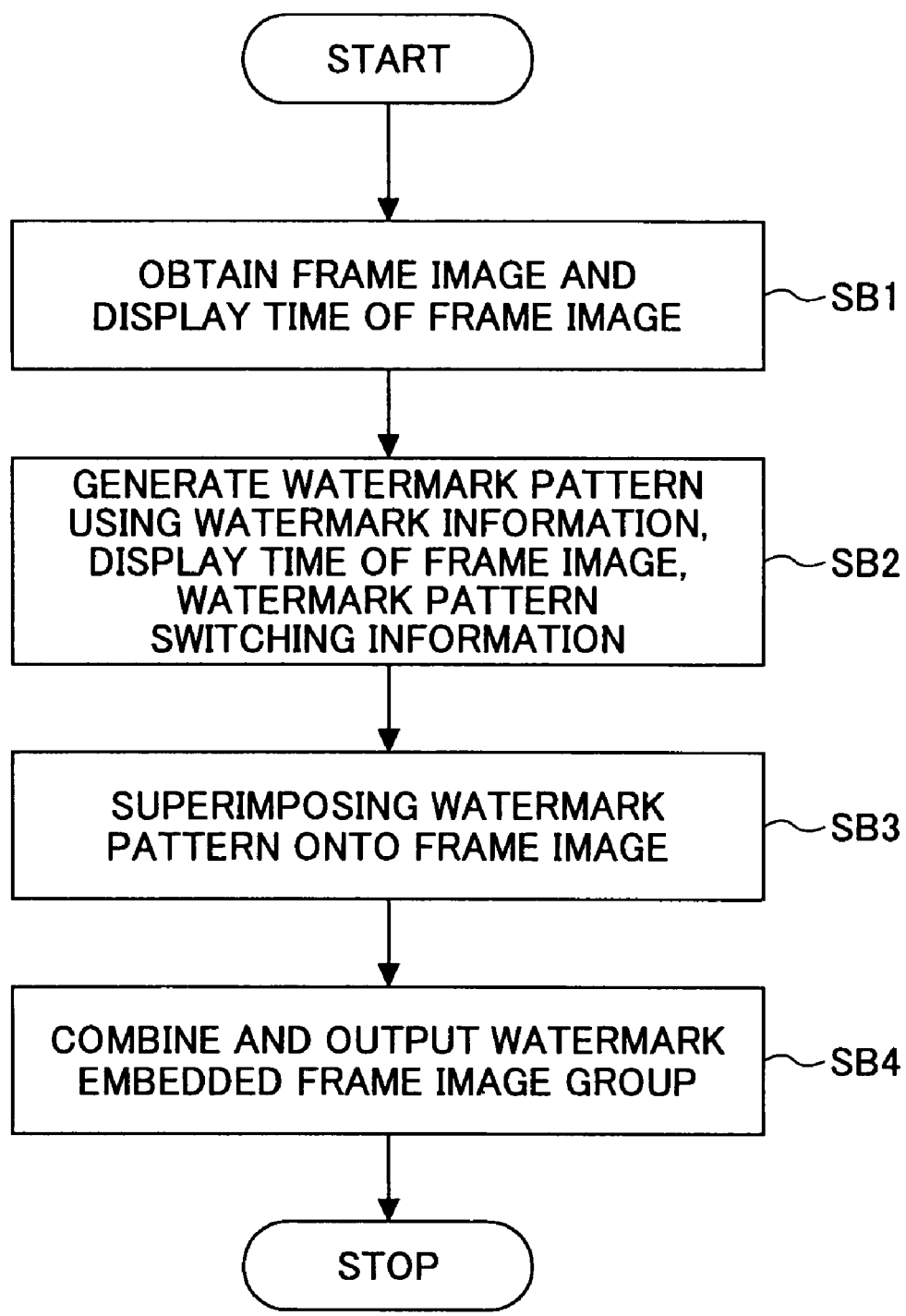
FIG. 3A is a flowchart of a digital watermark embedding method showing an outline B of an embodiment.

FIGS. 3A-4B are figures showing embodiment outline B. FIG. 3A shows a flowchart of a digital watermark embedding method of the embodiment outline B. This method is a digital watermark embedding method in a digital watermark embedding apparatus for embedding digital watermark into moving images. In the method, moving image data including a frame image group, watermark information, and watermark pattern switching information that is period information for designating phase change of watermark pattern are supplied first. Then, the digital watermark embedding apparatus sequentially obtains each frame image of the moving image data and its frame display time (step B1). Then, the digital watermark embedding apparatus obtains a watermark pattern using the watermark information, the frame display time and the watermark pattern switching information (step B2) and superimposes the watermark patter onto the frame image (step B3). Then, the watermark embedding apparatus combines the watermark embedded frame images by sequentially repeating the step B1-step B3 so as to generate watermark embedded moving image data (step B4).

Figure 3B:
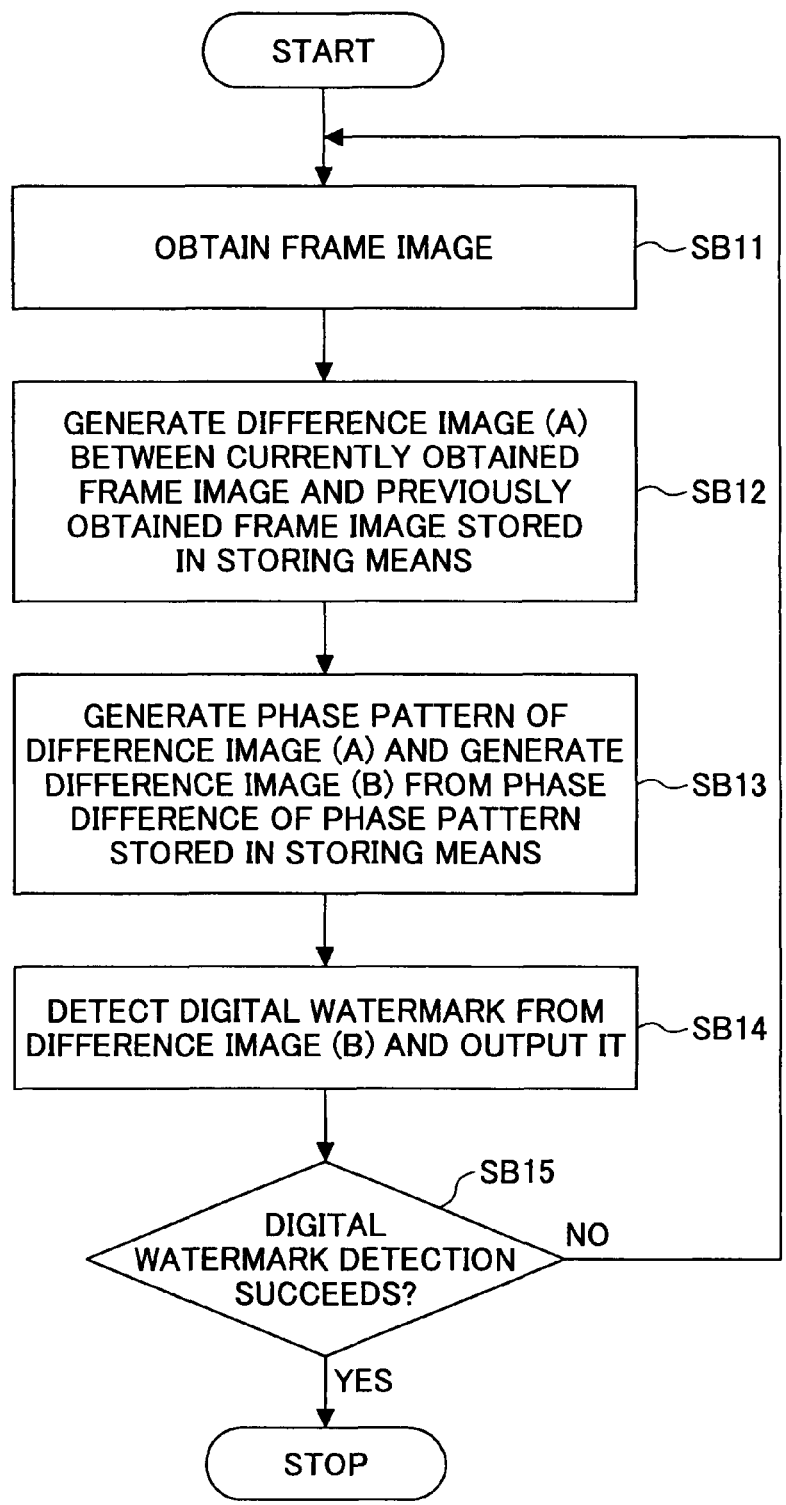
FIG. 3B is a flowchart of a digital watermark detection method showing the outline B of the embodiment.

FIG. 3B shows a flowchart of a digital watermark detection method of the embodiment outline B. This method is a digital watermark detection method by a digital watermark detection apparatus for detecting digital watermark from the moving images. In the method, a frame image is sequentially obtained, first (step B11). Next, the digital watermark detection apparatus generates a difference image (A) between a currently obtained frame image and a previously obtained frame image that is read from image storing means, and stores the currently obtained frame image into the image storing means (step B12). The digital watermark detection apparatus generates a phase pattern based on the currently obtained difference image (A), measures a phase difference between the currently obtained phase pattern and a previously obtained phase pattern that is read from the phase pattern storing means so as to generate a difference image (B) based on the phase difference and stores the currently obtained phase pattern into the phase pattern storing means (step B13). Then, the digital watermark detection apparatus performs digital watermark detection from the difference image (B) to output digital watermark detection status (step B14). Then, in a case when continuing the digital watermark detection process, the digital watermark detection apparatus obtains a new frame image again and repeats the above-mentioned processes (step B15).

Figure 4A:
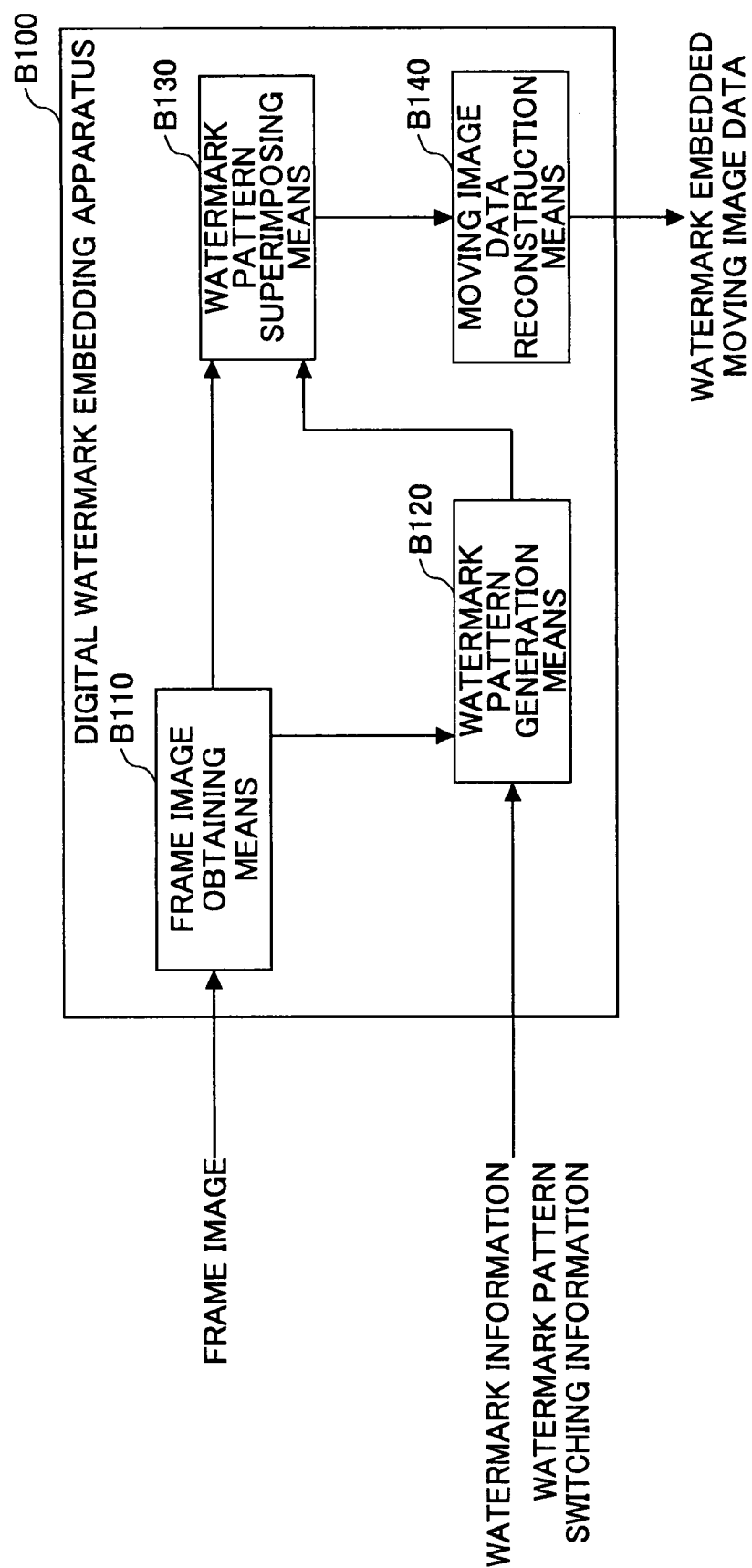
FIG. 4A is a block diagram of a digital watermark embedding apparatus showing the outline B of the embodiment.

FIG. 4A shows a block diagram of a digital watermark embedding apparatus of the embodiment outline B. This digital watermark embedding apparatus includes frame image obtaining means B110 configured to sequentially obtain each frame image of moving image data including input frame images and display time of the frame image, pattern generation means B120 configured to generate a watermark pattern using the supplied watermark information, the frame image display time and watermark pattern switching information that is period information for designating phase change of watermark pattern, watermark pattern superimposing means B130 configured to superimpose the watermark patter onto the frame image, and moving image data reconstruction means B140 configured to combine the watermark embedded frame images so as to generate and output watermark embedded moving image data.

Figure 4B:
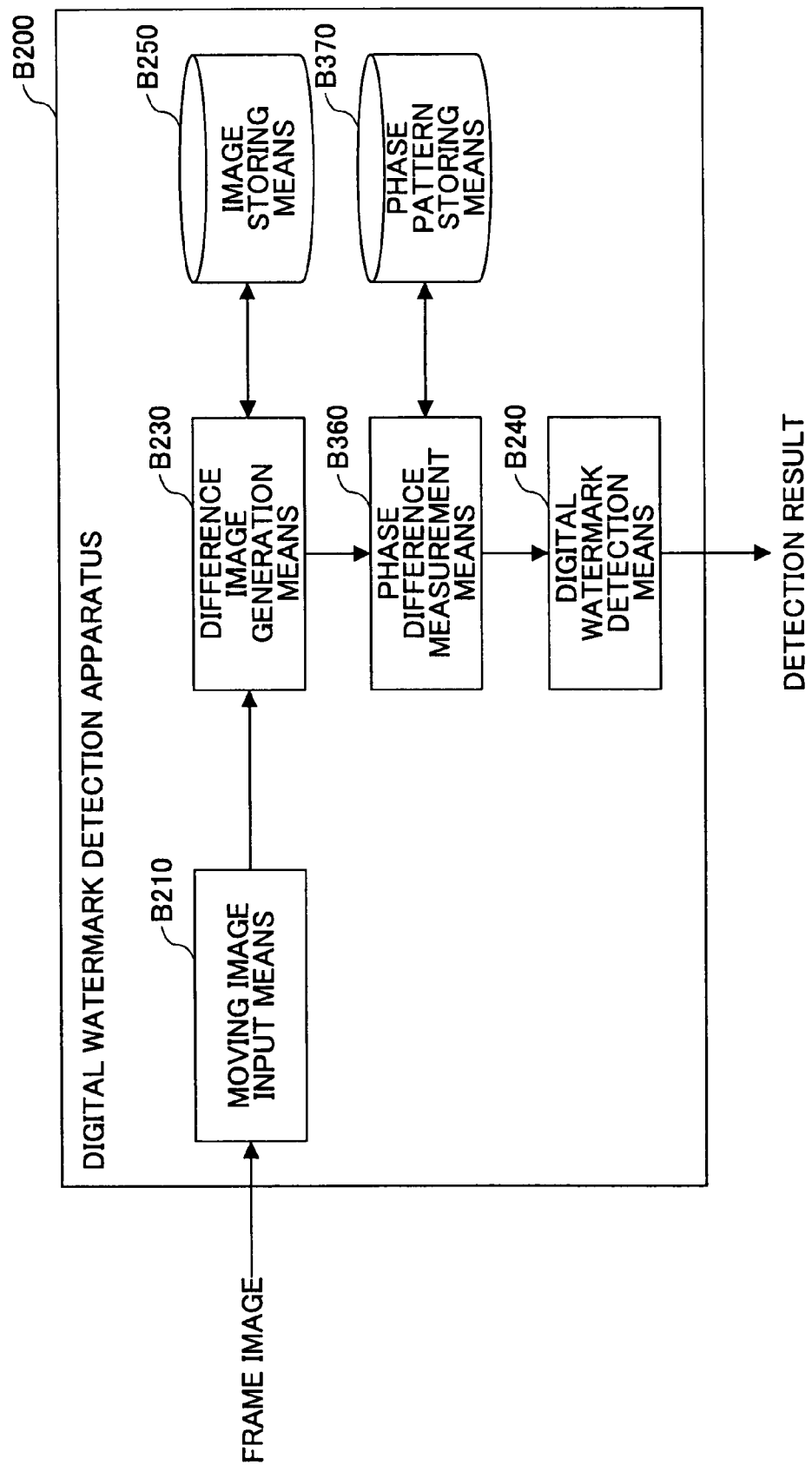
FIG. 4B is a block diagram of a digital watermark detection apparatus showing the outline B of the embodiment.

FIG. 4B shows a block diagram of a digital watermark detection apparatus of the embodiment outline B. This digital watermark detection apparatus includes moving image input means B210 configured to sequentially obtain a frame image, difference image generation means B230 configured to generate a difference image (A) between a currently obtained frame image and a previously obtained frame image that is read from image storing means, and stores the currently obtained frame image into the image storing means B250, phase difference calculation means B360 configured to generate a phase pattern based on the currently obtained difference image (A), measure a phase difference between the currently obtained phase pattern and a previously obtained phase pattern that is read from the phase pattern storing means B370 so as to generate a difference image (B) based on the phase difference and stores the currently obtained phase pattern into the phase pattern storing means, and digital watermark detection means B240 configured to perform digital watermark detection from the difference image (B) to output digital watermark detection status.

Figure 5A:
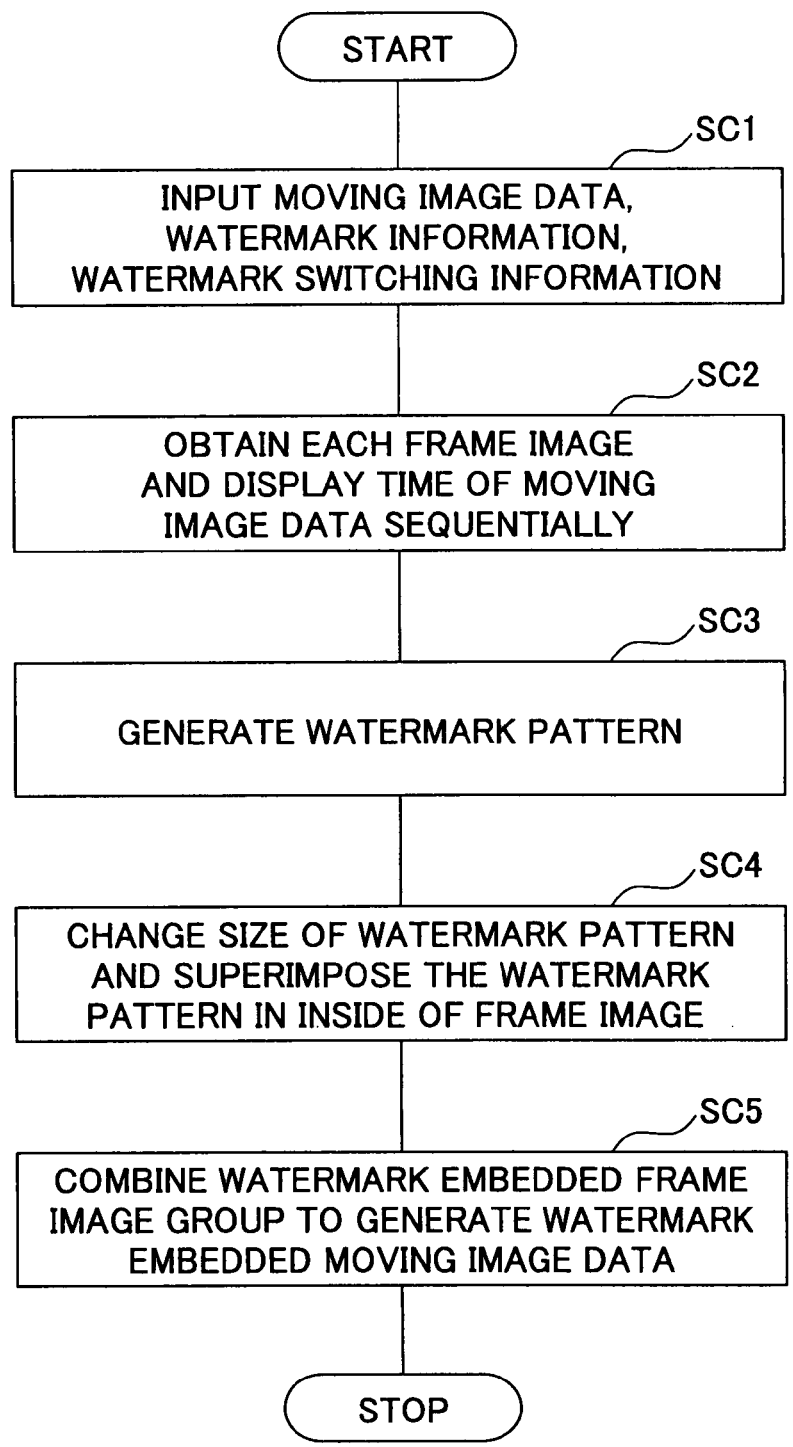
FIG. 5A is a flowchart of a digital watermark embedding method showing an outline C of an embodiment.

FIGS. 5A-6B shows an embodiment outline C. FIG. 5A shows a flowchart of a digital watermark embedding method of the embodiment outline C. This method is a digital watermark embedding method in a digital watermark embedding apparatus for embedding digital watermark into moving images. In the method, moving image data including a frame image, watermark information, and watermark pattern switching information are supplied to the digital watermark apparatus first (step C1). Then, the digital watermark embedding apparatus sequentially obtains each frame image of the moving image data and its frame display time (step C2). Then, the digital watermark embedding apparatus generates a watermark pattern using the watermark information, the frame display time and the watermark pattern switching information (step C3). The digital watermark embedding apparatus changes scale of the watermark pattern into a size equal to or smaller than the frame image and superimposes the watermark patter onto the inside of the frame image (step C4), and combines the watermark embedded frame images by sequentially repeating the step C2-step C4 so as to generate watermark embedded moving image data (step C5).

Figure 5B:
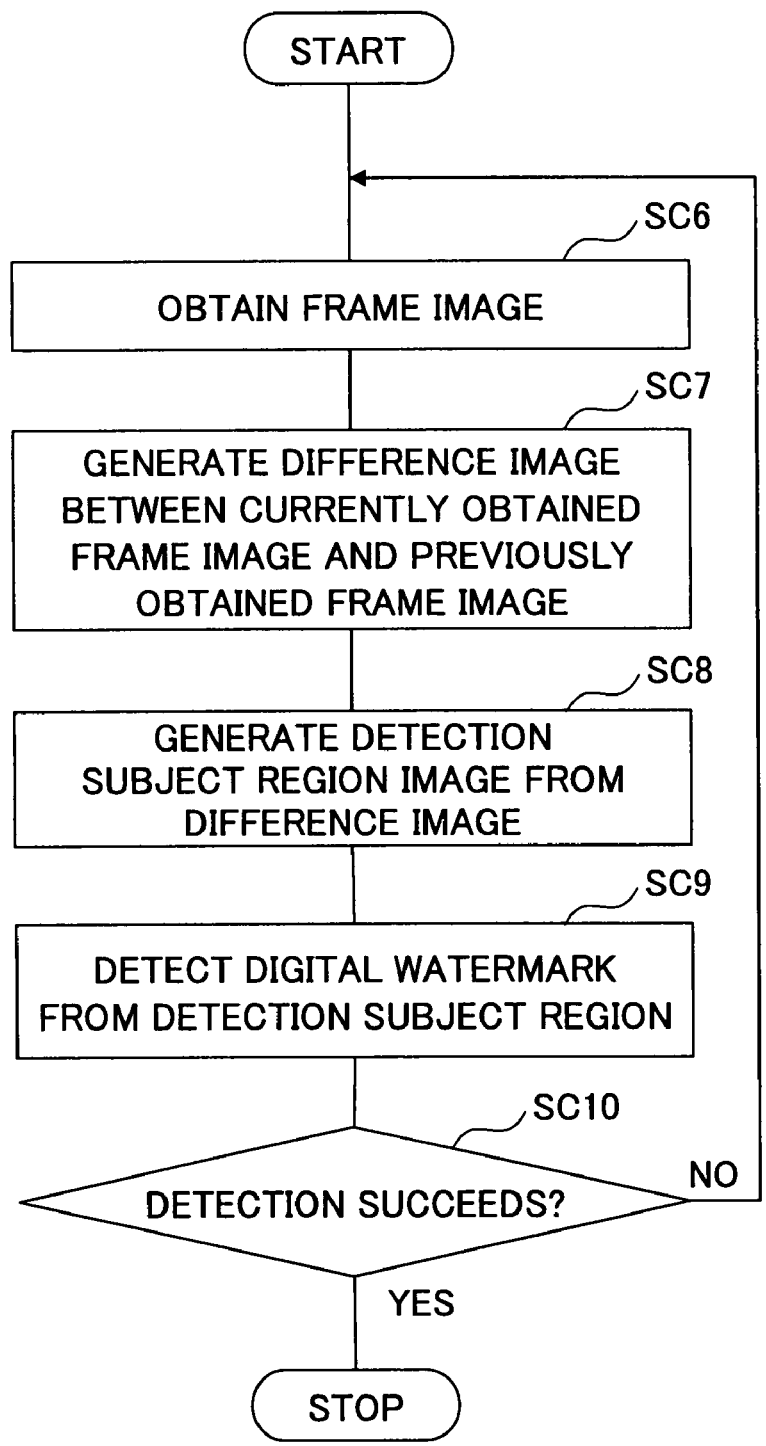
FIG. 5B is a flowchart of a digital watermark detection method showing the outline C of the embodiment.

FIG. 5B shows a flowchart of a digital watermark detection method of an embodiment outline C. This method is a digital watermark detection method in a digital watermark detection apparatus for detecting digital watermark from the moving images. In the method, a frame image is sequentially obtained, first (step C6). Next, the digital watermark detection apparatus generates a difference image between a currently obtained frame image and a previously obtained frame image (step C7), and extracts detection subject region from the difference image to generate a detection subject region image (step C8). Then, the digital watermark detection apparatus performs digital watermark detection for the detection subject region image to output digital watermark detection status (step C9), and in a case when continuing the digital watermark detection process, the digital watermark detection apparatus obtains a new frame image again and repeats the above-mentioned processes (step C10).

Figure 6A:
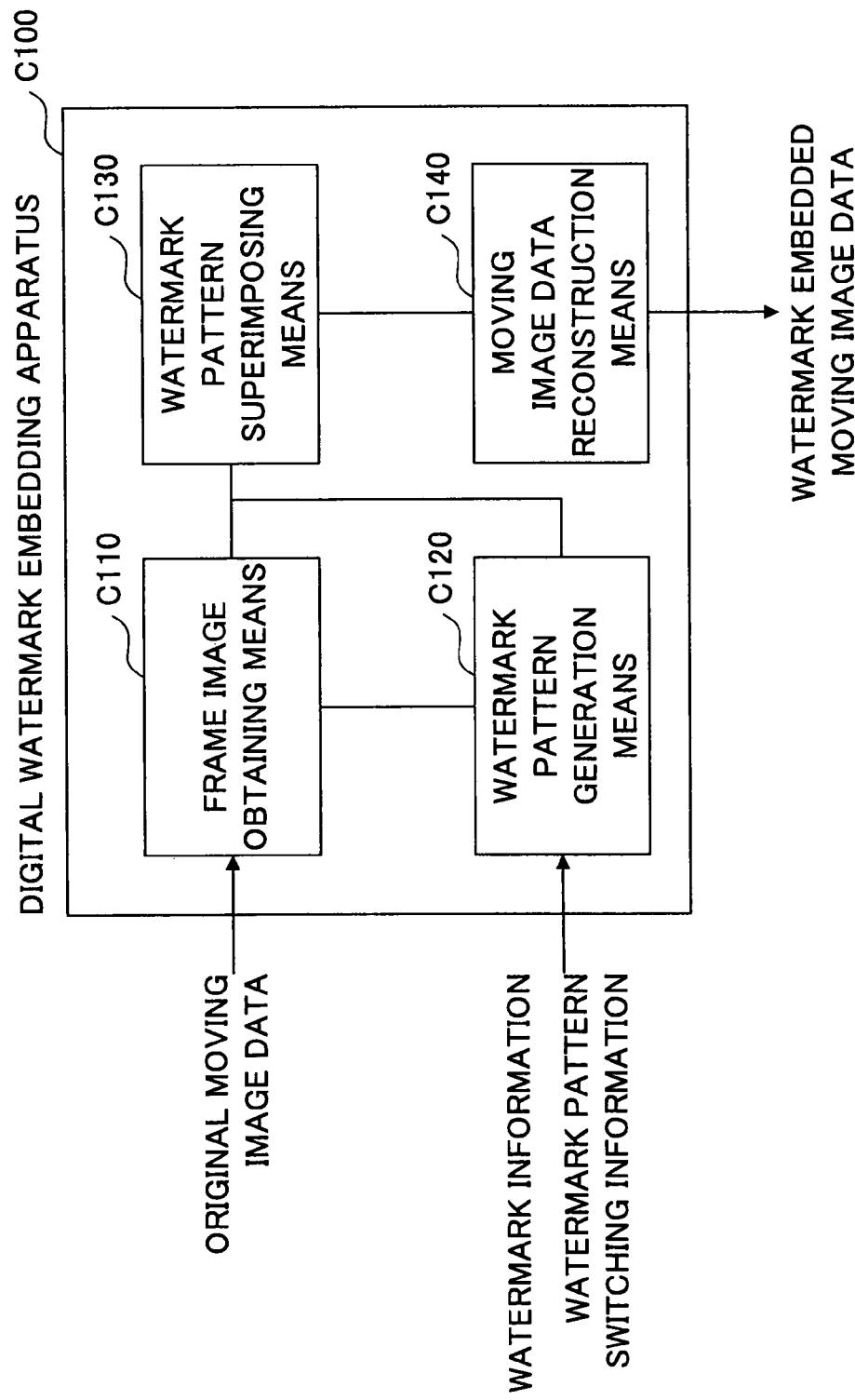
FIG. 6A is a block diagram of a digital watermark embedding apparatus showing the outline C of the embodiment.

FIG. 6A is a block diagram of the digital watermark embedding apparatus of the embodiment outline C. The digital watermark embedding apparatus includes frame image obtaining means C110 configured to sequentially obtain each frame image of the moving image data and its frame display time, watermark pattern generation means C120 configured to generate a watermark pattern using the input watermark information, the watermark pattern switching information and the frame display time, watermark pattern superimposing means C130 configured to change scale of the watermark pattern into a size equal to or smaller than the frame image and superimposes the watermark patter onto the inside of the frame image, and moving image data reconstruction means C140 configured to combine the watermark embedded frame images by sequentially repeating the above-mentioned processes so as to generate watermark embedded moving image data FIG. 6B shows a block diagram of the digital watermark detection apparatus of the embodiment outline C. The digital watermark detection apparatus includes moving image input means C210 configured to sequentially obtain a frame image, difference image generation means C230 configured to generate a difference image between a currently obtained frame image and a previously obtained frame image, and digital watermark, detection subject region extraction means C220 configured to extract a detection subject region from the difference image to generate a detection subject region image, and detection means C240 configured to perform digital watermark detection from the detection subject region image to output digital watermark detection status.

First Embodiment

<Digital Watermark Embedding Apparatus>

Figure 7:
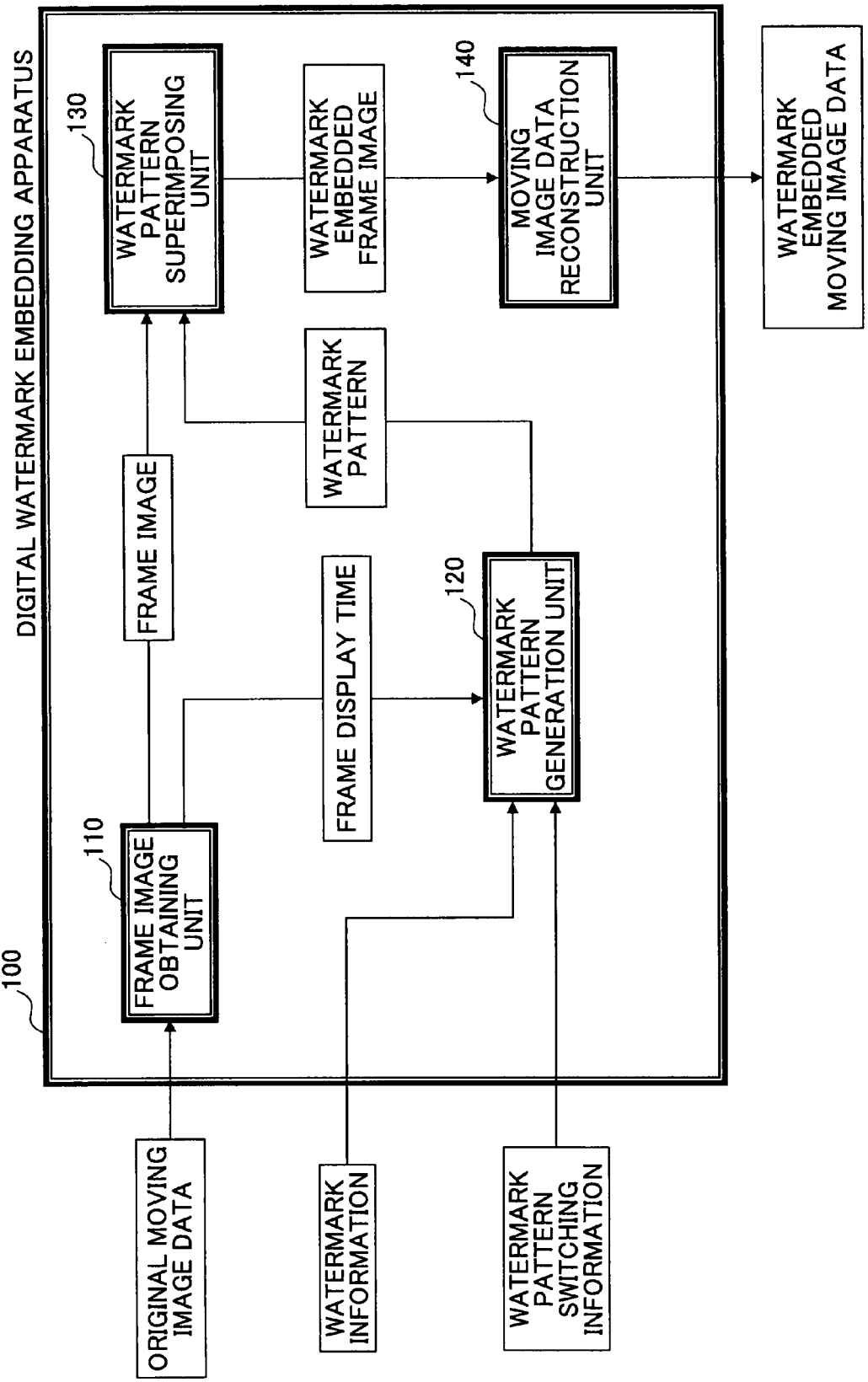
FIG. 7 is a block diagram a digital watermark embedding apparatus of a first embodiment of the present invention.

FIG. 7 shows a configuration of the digital watermark embedding apparatus of the first embodiment of the present invention.

The digital watermark embedding apparatus 100 shown in the figure includes a frame image obtaining unit 110, a watermark pattern generation unit 120, a watermark pattern superimposing unit 130 and a moving image data reconstruction unit 140.

The frame image obtaining unit 110 receives original moving image data, and the watermark pattern generation unit 120 receives watermark information and watermark pattern switching information. In addition, the moving image data reconstruction unit 140 outputs watermark embedded moving image data.

In the following, operation of the digital watermark embedding apparatus 100 is described.

Figure 8:
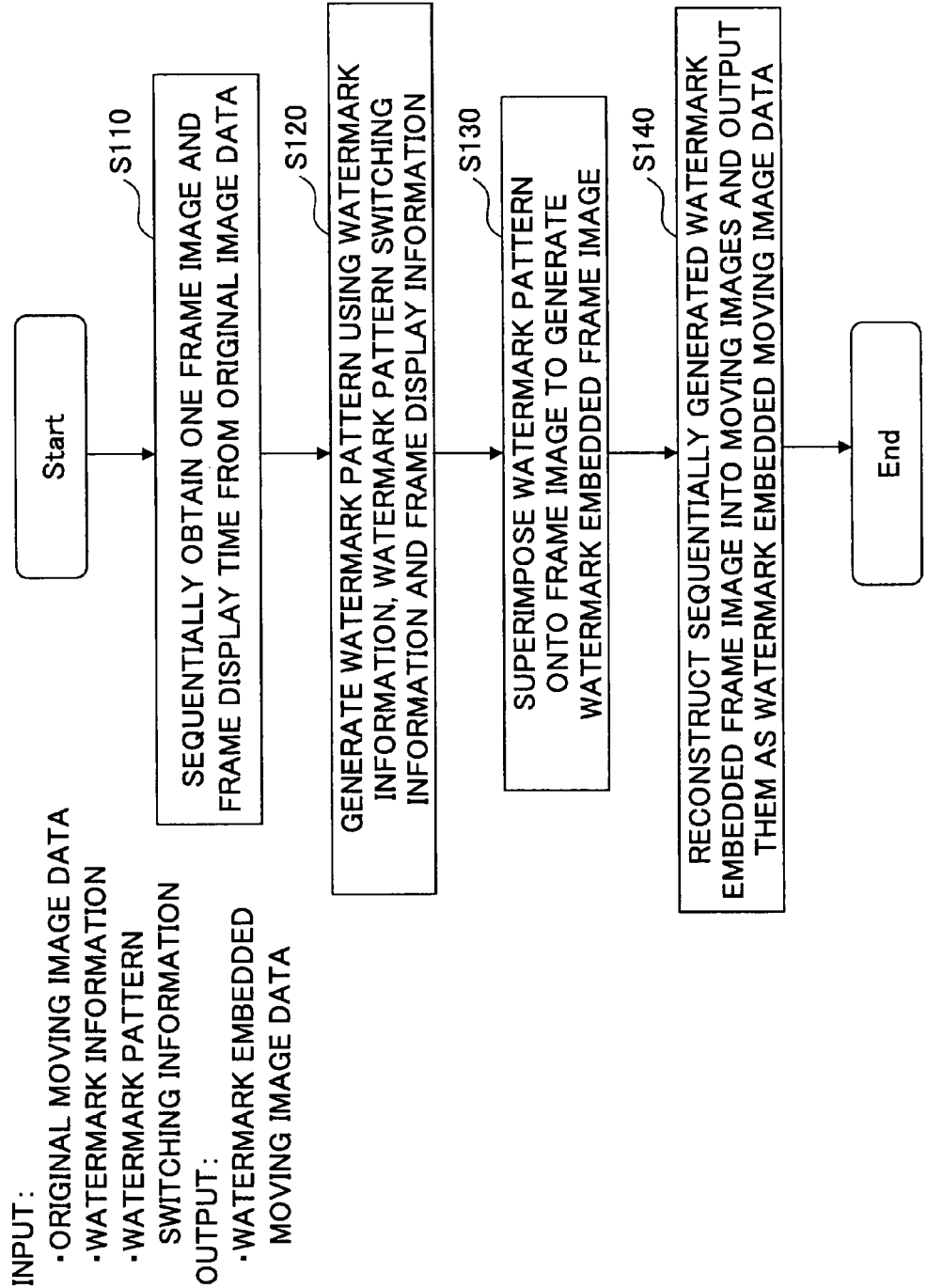
FIG. 8 is a flowchart of operation of the digital watermark embedding apparatus of the first embodiment of the present invention.

FIG. 8 shows a flowchart of the operation of the digital watermark embedding apparatus in the first embodiment of the present invention.

Figure 9:
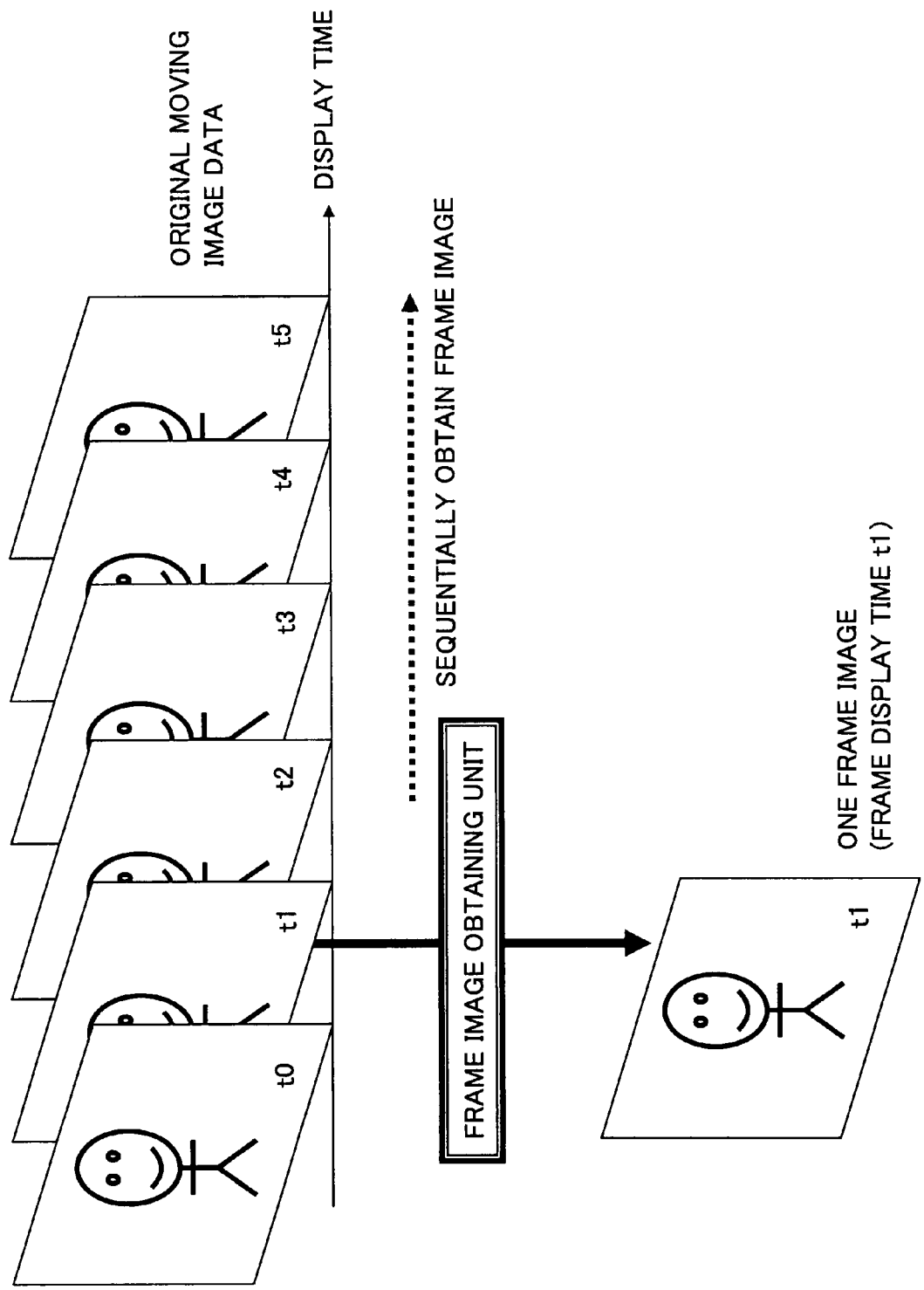
FIG. 9 is a figure for explaining processes of a frame image obtaining unit in the first embodiment of the present invention.

Step 110) As shown in FIG. 9, the frame image obtaining unit 110 sequentially obtains a frame image and the frame display time from the original moving image data one by one. The frame display time is, for example, may be one indicating absolute time, from the head of the moving images, that is determined from time code and frame rate for reproducing, or may be one by which relative time interval between frames for reproducing can be measured such as sequential serial number assigned to each frame. When the input moving image data is coded data such as MPEG data, the frame image obtaining unit 110 obtains the frame image after performing decoding.

Step 120) The watermark pattern generation unit 120 receives the watermark information and the watermark switching information so as to generate a watermark pattern using the watermark information, frame display time and watermark pattern switching information.

Step 130) The watermark pattern superimposing unit 130 superimposes the watermark patter generated by the watermark pattern generation unit 120 onto the frame image to generate a watermark embedded frame image.

Step 140) Finally, the moving image data reconstruction unit 140 reconstructs a series of watermark embedded frame images that are sequentially generated as moving image data so as to output it as watermark embedded moving image data. At this time, encoding such as MPEG encoding may be performed as necessary.

Next, the watermark pattern generation unit 120 is described in detail.

Figure 10:
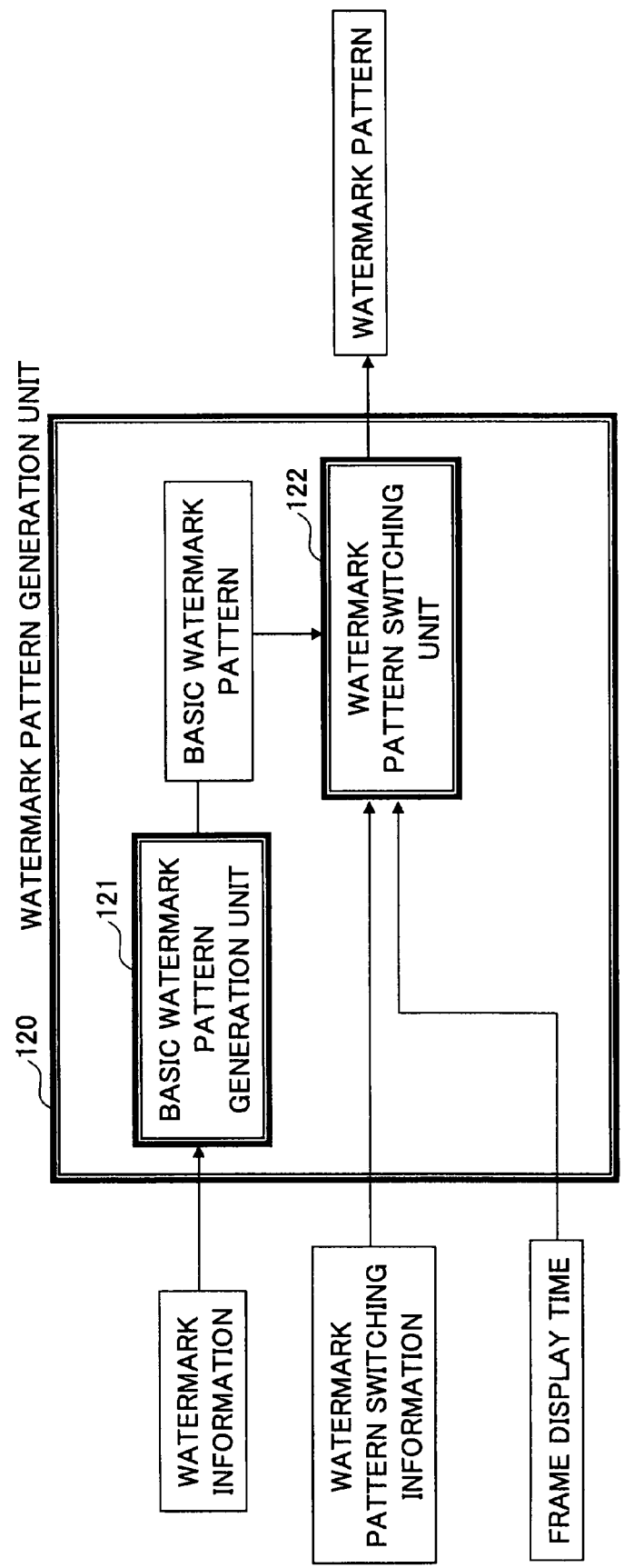
FIG. 10 is a block diagram of a watermark pattern generation unit in the first embodiment of the present invention.

FIG. 10 shows a configuration of the watermark pattern generation unit in the first embodiment of the present invention.

The watermark pattern generation unit 120 includes a basic watermark pattern generation unit 120 and a watermark pattern switching unit 122.

Figure 11:
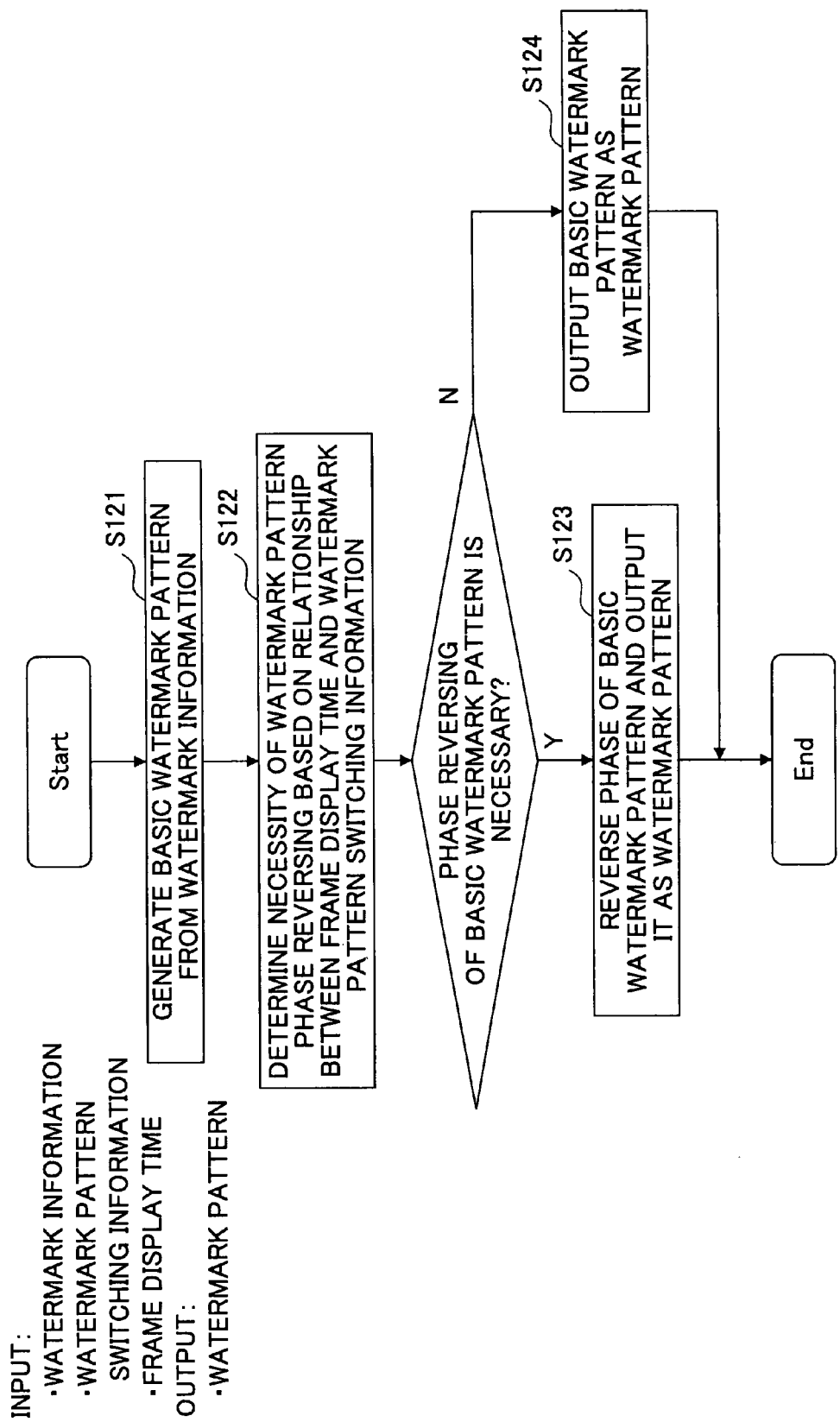
FIG. 11 is a flowchart of operation of the watermark pattern generation unit in the first embodiment of the present invention.

FIG. 11 is a flowchart of operation of the watermark pattern generation unit in the first embodiment of the present invention.

Step 121) When receiving the watermark information, the basic watermark pattern generation unit 121 converts the watermark information into a basic watermark pattern that is a two-dimensional pattern.

Figure 12:
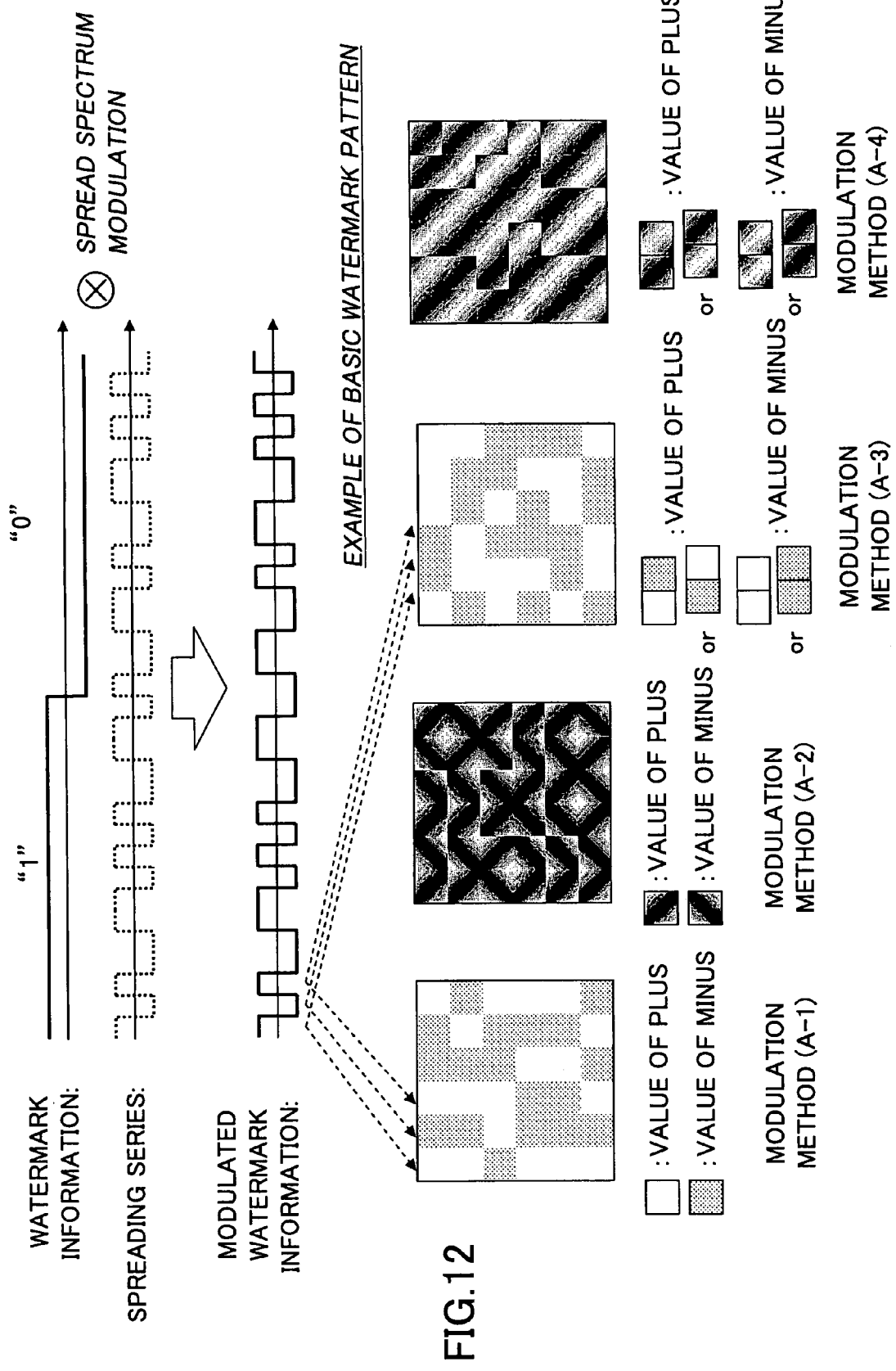
FIG. 12 is a figure (1) for explaining an example of processes of the basic watermark pattern generation unit in the first embodiment of the present invention.

As shown in FIG. 12, as the method for the conversion, a method that is usually used for digital watermark technique for still images, such as a technique described in "Nakamura, Katayama, Yamamuro, Sonehara: High speed digital watermarking scheme from analog image using camera-equipped mobile-phone, IEICE, (D-II), Vo. J87-D-II, No. 12, pp. 2145-2155, December 2004 (to be referred to as document 1 hereinafter), for example, can be used. The methods include a method for associating sizes of pixel values with series values obtained by directly performing spread-spectrum modulation on bit values of watermark information using spreading series (FIG. 12: modulation method (A-1)), a method for switching waveform patterns according to the series values (FIG. 12: modulation method (A-2))), a method for associating the value of a term of the series with two blocks to represent the value using presence or absence of change of pixel values (FIG. 12: modulation method (A-3)), and a method for representing the value using presence or absence of change of phase of waveform pattern (FIG. 12: modulation method (A-4)). By the way, when using modulation such as (FIG. 12: A-3) and (FIG. 12: A-4), modulation can be performed while shifting the position of two blocks corresponding to a term of series one-block by one-block such that blocks are overlapped.

Figure 13:
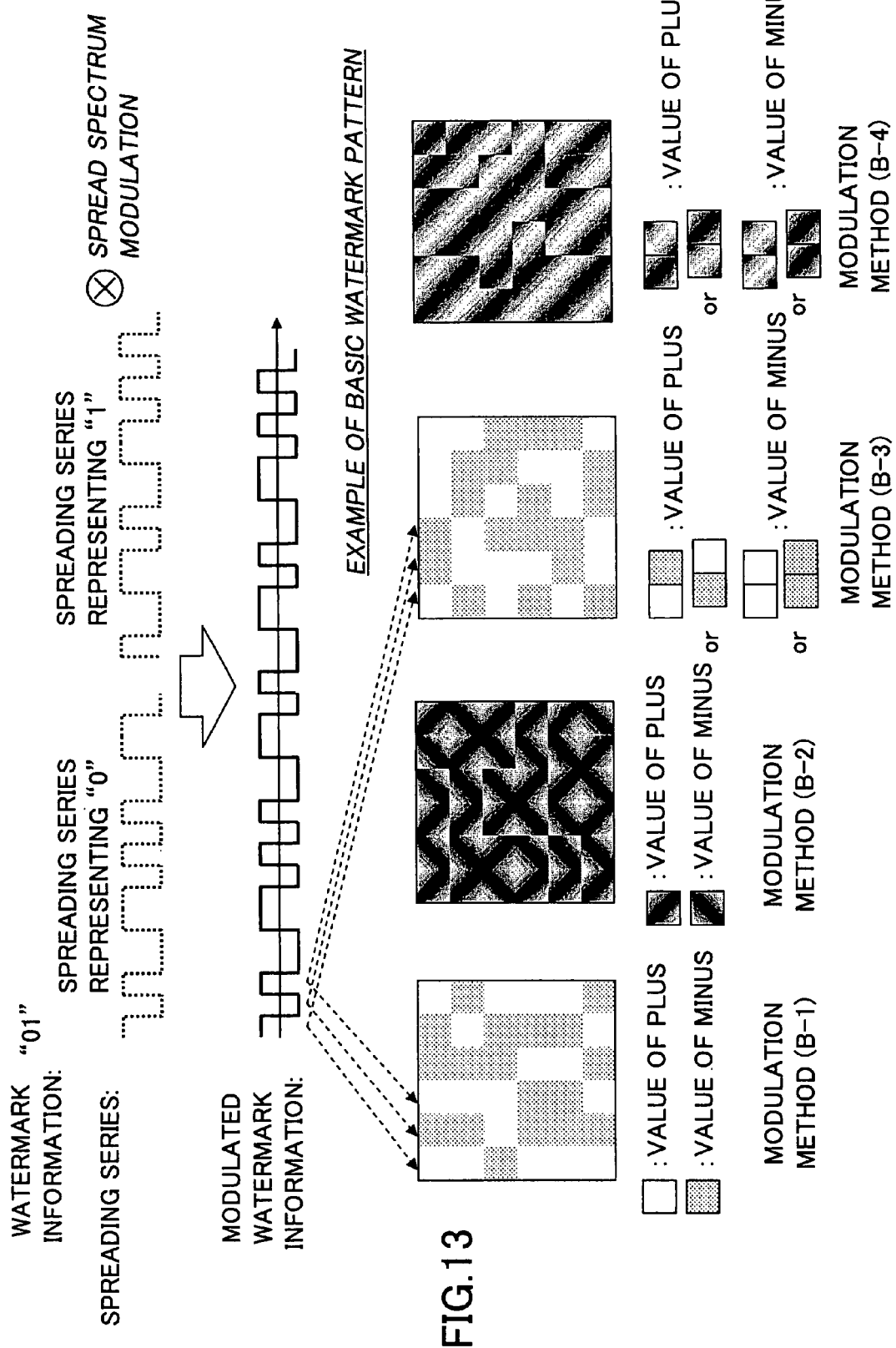
FIG. 13 is a figure (2) for explaining an example of processes of the basic watermark pattern generation unit in the first embodiment of the present invention.

Or, as shown in the example of FIG. 13, a method can be considered for dividing watermark information into symbols each having a certain length (one bit per symbol in the example of FIG. 13), associating each possible value of the symbol with different independent spreading series, combining the spreading series or multiplexing the spreading series by superimposition (not shown in the figure) to obtain series values, and converting the series values into a two-dimensional pattern in the same way as the case of FIG. 12.

By the way, it is desirable to use large sized block or use a low frequency pattern as a waveform pattern for the basic watermark pattern in consideration of a case where resolution for camera capturing becomes low. In addition in the examples shown in FIGS. 12 and 13, although the pixel pattern is directly obtained from a result obtained by performing spread spectrum modulation on the watermark information, the image pattern may be obtained by performing similar process in a frequency space and by using inverse orthogonal transform as shown in document 2 "T. Nakamura, H. Ogawa, A. Tomioka, Y. Takashima, "Improved digital watermark robustness against translation and/or cropping of an image area", IEICE Trans. Fundamentals, vol. E83-A, No. 1, pp. 68-76, January 2000" (to be referred to as document 2). Anyway, any method can be used as long as it is a watermark scheme of a type in which watermark is superimposed on the image in an adding manner.

In the following, for the sake of explanation, it is assumed that each pixel value of the basic watermark pattern has a value of plus or minus, and that an average of the pixel values is 0. It is obviously easy to realize such values by shifting an average value of an arbitrary basic watermark pattern.

Step 122) Next, the watermark pattern switching unit 122 in the watermark patter generation unit 120 determines necessity of phase reversal of the basic watermark pattern based on relationship between the frame display time and the pattern switching information.

step 123) When the phase reversal is necessary, the watermark pattern generation unit 120 reverses the phase of the basic watermark pattern to output it as a watermark pattern.

Step 124) When the phase reversal is unnecessary, the watermark pattern generation unit 120 outputs the basic watermark pattern as it is as the watermark pattern.

Figure 14A:
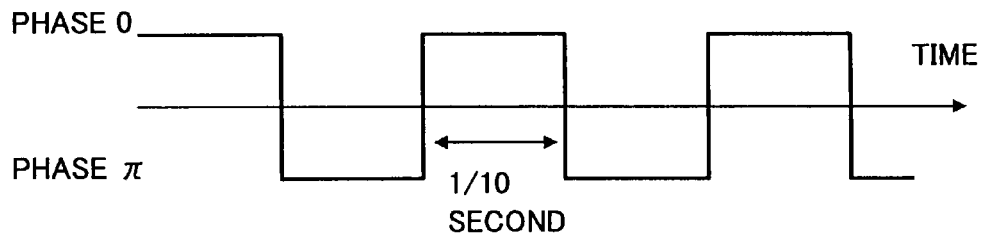
FIG. 14A is a figure for explaining an example of watermark pattern switching information in the first embodiment of the present invention.
Figure 14B:
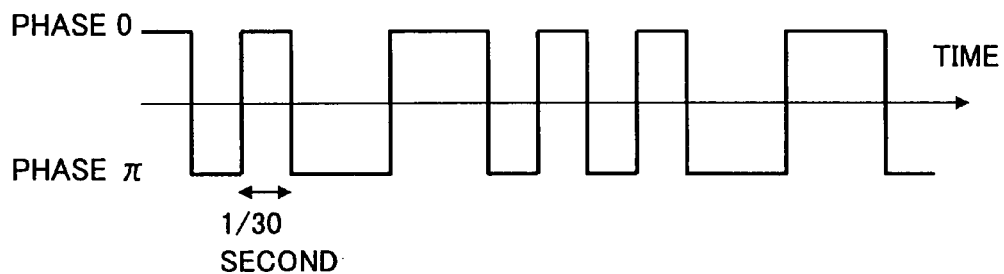
FIG. 14B is a figure for explaining an example of watermark pattern switching information in the first embodiment of the present invention.
Figure 14C:
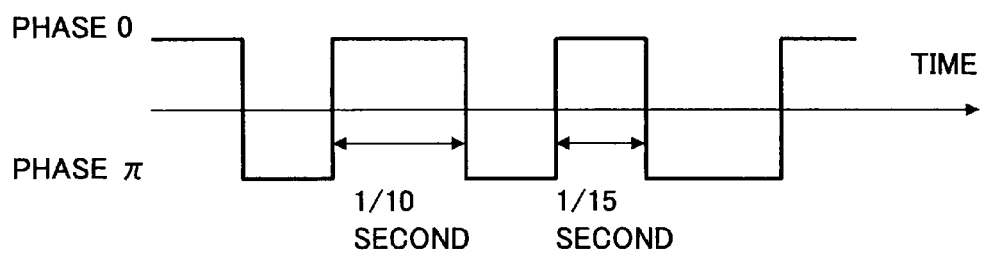
FIG. 14C is a figure for explaining an example of watermark pattern switching information in the first embodiment of the present invention.

FIGS. 14A-14C shows examples of watermark pattern switching information in the first embodiment of the present invention. The watermark pattern switching information is information showing how the phase of the basic watermark pattern is changed with respect to a time axis for reproducing the moving images, and may be one that controls the basic watermark pattern to reverse at constant time intervals as shown in FIG. 14A, may be one that controls the basic watermark pattern to reverse randomly in a unit of time as shown in FIG. 14B, or may be one that controls the basic watermark pattern to reverse at complicated timing. By using a complicated pattern such as random switching, analyzing the pattern becomes difficult. Thus, when the present invention is used for security such as copyright protection, security against attack to digital watermark improves. By the way, although the examples shown in FIGS. 14A-14C show only cases where two values of phase 0 and $\pi$ are taken like a rectangle, a pattern in which the phase changes smoothly such as a sine curve can also be used, for example.

FIG. 15 is a figure for explaining processes of the watermark pattern switching unit in the first embodiment of the present invention. The figure shows a case where the beforementioned modulation method (A-1) is used. The watermark pattern switching unit 122 receives the watermark pattern switching information, the frame display time and the basic watermark pattern, and it is assumed that the watermark pattern switching information is information for instructing reversal for each 1/10 second. When it is assumed that the original moving images are reproduced at 30 frames per second, the phase of the image is reversed every three frames. If it is assumed that, when the frame display time t obtained by the frame image obtaining unit 110 is placed on a time axis of the watermark pattern switching information, the phase represented by the watermark pattern switching information is π, watermark pattern at the frame display time is determined to be one obtained by reversing the phase of the basic watermark pattern.

By the way, the basic watermark pattern has plus and minus pixel values, and the average value is 0. Therefore, phase reverse can be obtained by multiplying each pixel value by −1. If the phase is 0 when a frame display time t' is placed on the time axis of the watermark pattern switching information, the basic watermark pattern with phase change amount 0, that is, without change is output as the watermark pattern.

Figure 16:
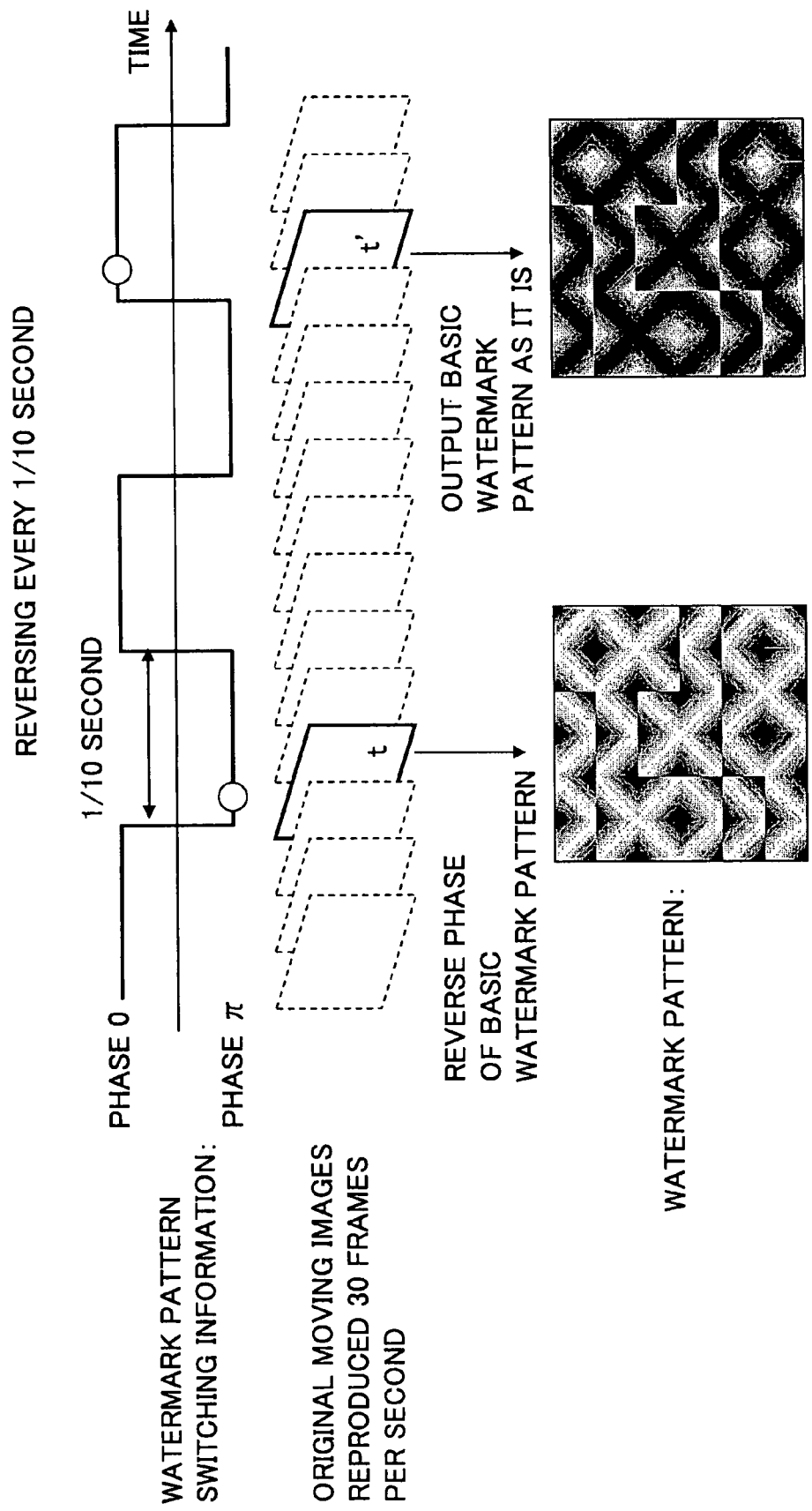
FIG. 16 is a figure (2) for explaining processes of the watermark pattern switching unit in the first embodiment of the present invention.

By the way, as shown in FIG. 16, since phase modulation in the watermark pattern switching unit 122 is performed for amplitude of pixel value, the pixel value is changed in which direction of waveform is not changed in the case of the basic watermark pattern in which a waveform pattern is used for each block like the modulation method (A-2). In addition, it is desirable that phase change of the watermark pattern represented by the watermark pattern switching information does not include bias to the positive phase or to the reverse phase within a range of a certain time interval (1 second, for example) in order to suppress image quality degradation of the watermark embedded moving images. That is, it is desirable that integral of a time section in the lateral axis of the graph in which the phase bias is 0 becomes 0.

As to watermark pattern switching for reversing or non-reversing, it is desirable that sum of time of reversal and sum of time of non-reversal within a time section become almost the same.

Next, the watermark pattern superimposing unit 130 is described in detail.

Figure 17:
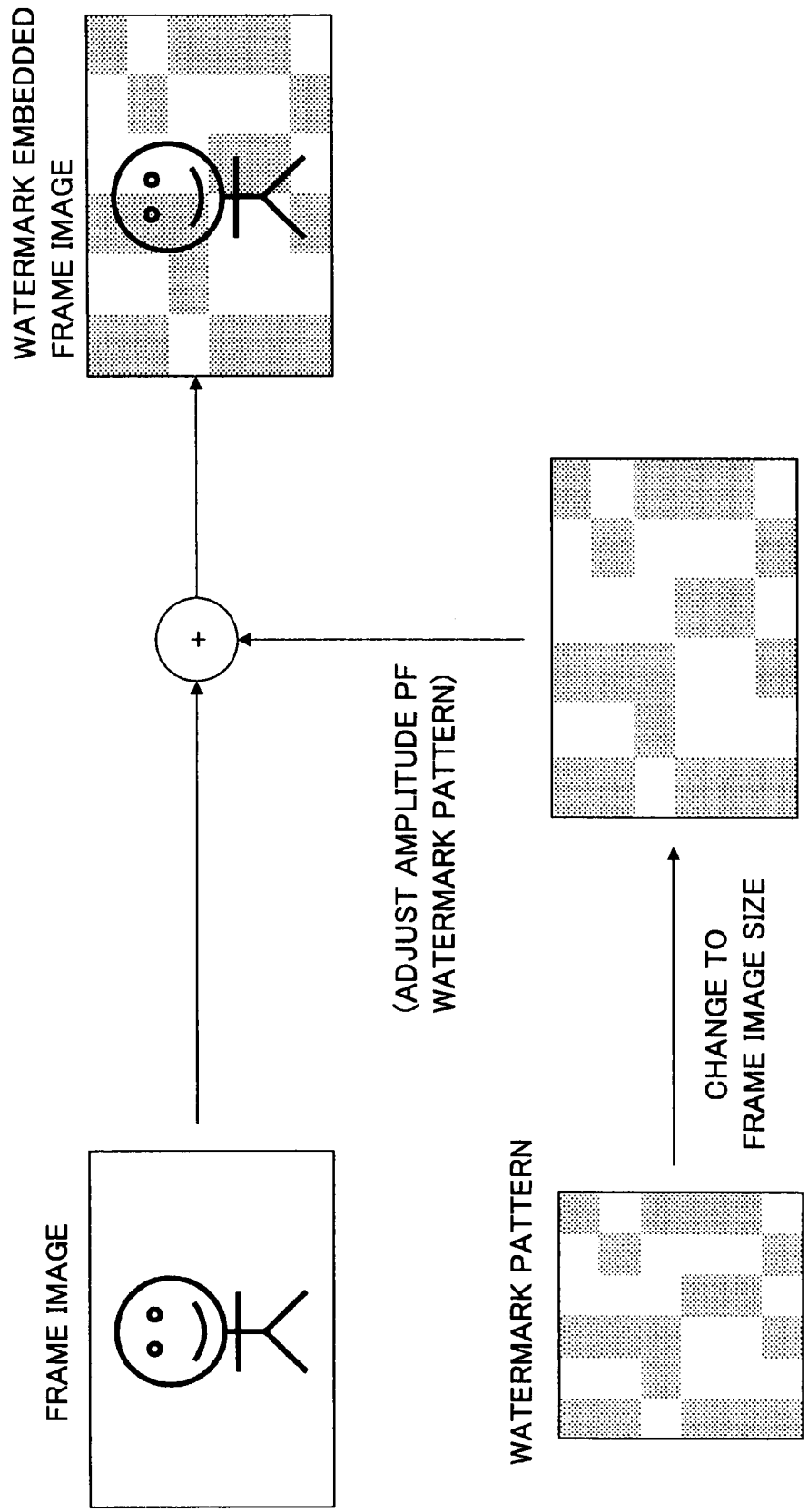
FIG. 17 is a figure for explaining processes of the watermark pattern superimposing unit in the first embodiment of the present invention.

FIG. 17 is a figure for explaining processes of the watermark pattern superimposing unit in the first embodiment of the present invention.

The watermark pattern superimposing unit 130 receives a frame image and a watermark pattern generated based on the frame display time. First, the watermark pattern superimposing unit 130 enlarges the watermark pattern to a size of the frame image, and adds the enlarged watermark pattern to the frame image to obtain a watermark embedded frame image. It is possible to adjust tradeoff balance between tolerance of the digital watermark and image quality deterioration by increasing or decreasing amplitude of the watermark pattern as necessary before adding. In addition, when adding the watermark pattern onto the frame image, there may be various methods as to which component it is added to. For example, the pattern is added to luminance values of the frame image, or added to Blue component in the RGB color coordinate system. Or, the pattern is added to the Yellow component in the CMYK color coordinate system, is added to the Hue component of the HSV color coordinate system, or added to the Cb component in the YCbCr color coordinate system. In addition, there may be a case where the watermark pattern uses a plurality of components for one pixel in which a pixel in the watermark pattern has two values not one value, for example. In such a case, there may be a case where a plurality of components are changed by adding pixel values of each plane of the watermark pattern onto the Red component and the Green component of the RGB color coordinate system, for example.

Finally, the moving image data reconstruction unit 140 is described in detail.

The moving image data reconstruction unit 140 reconstructs the watermark embedded frame images that are sequentially generated according to the above-mentioned processes and outputs the reconstructed data as watermark embedded moving image data. When performing reconstruction, encoding such as MPEG encoding may be performed.

The watermark embedding apparatus 100 in the present embodiment has been described so far.

Here, a using scene of the present embodiment is described.

Figure 18:
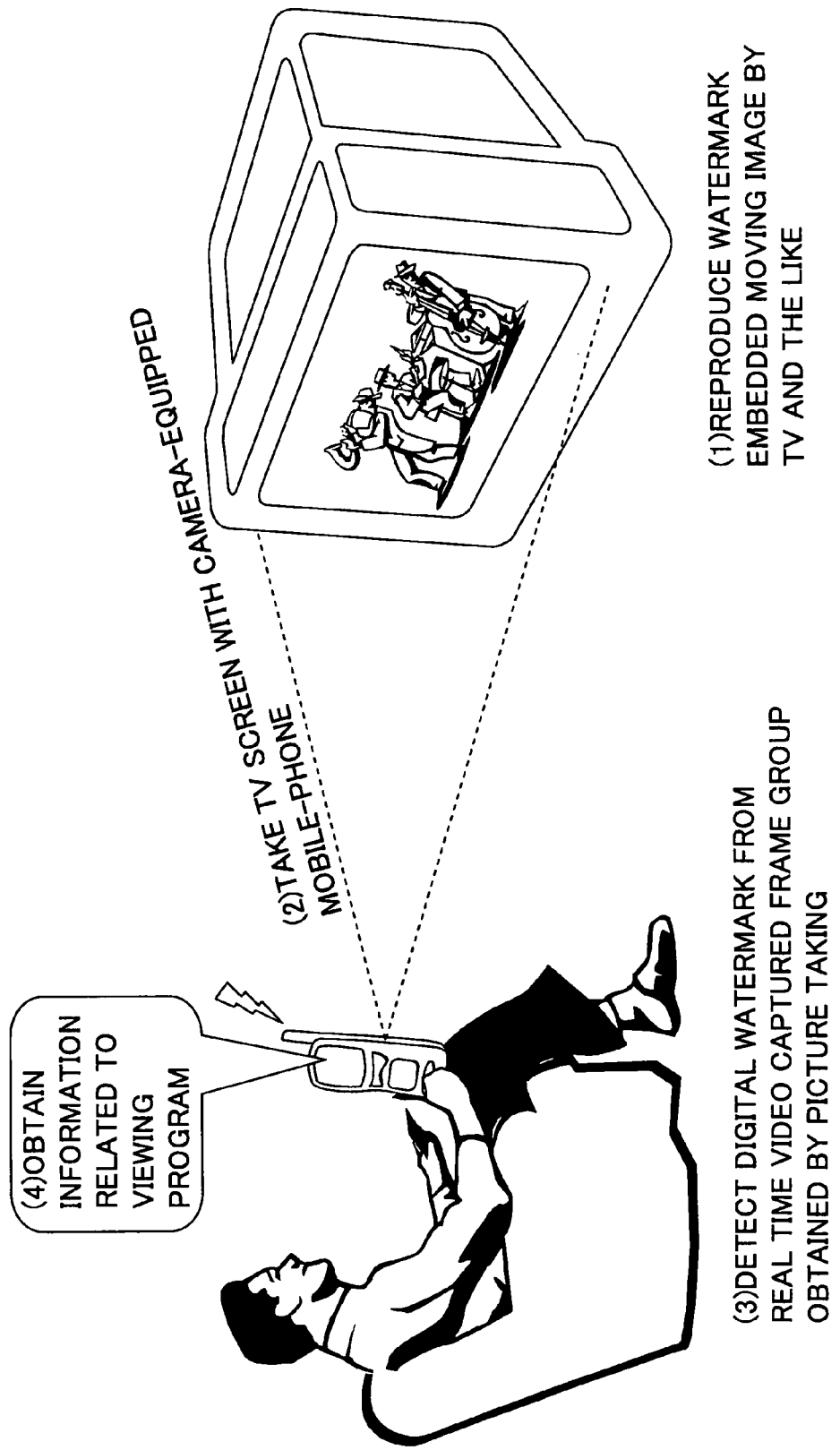
FIG. 18 is a figure for explaining a using scene of the present invention.

FIG. 18 is a figure for explaining the using scene of the first embodiment of the present invention.

The watermark embedded moving image data described above is being reproduced on a TV display apparatus by TV broadcasting and the like (1). When a viewer uses an information service related to the watching program, image-taking is started by directing a camera such as a camera-equipped mobile-phone to a display screen of the TV (2). By taking the images, video frames are captured sequentially so as to be entered into the mobile phone in real time, so that detection of digital watermark from the frame group is performed (3). Based on detected digital watermark information, a related information service such as obtaining information resources on the network can be utilized, for example (4).

<Digital Watermark Detection Apparatus>

Next, a digital watermark detection apparatus is described.

Figure 19:
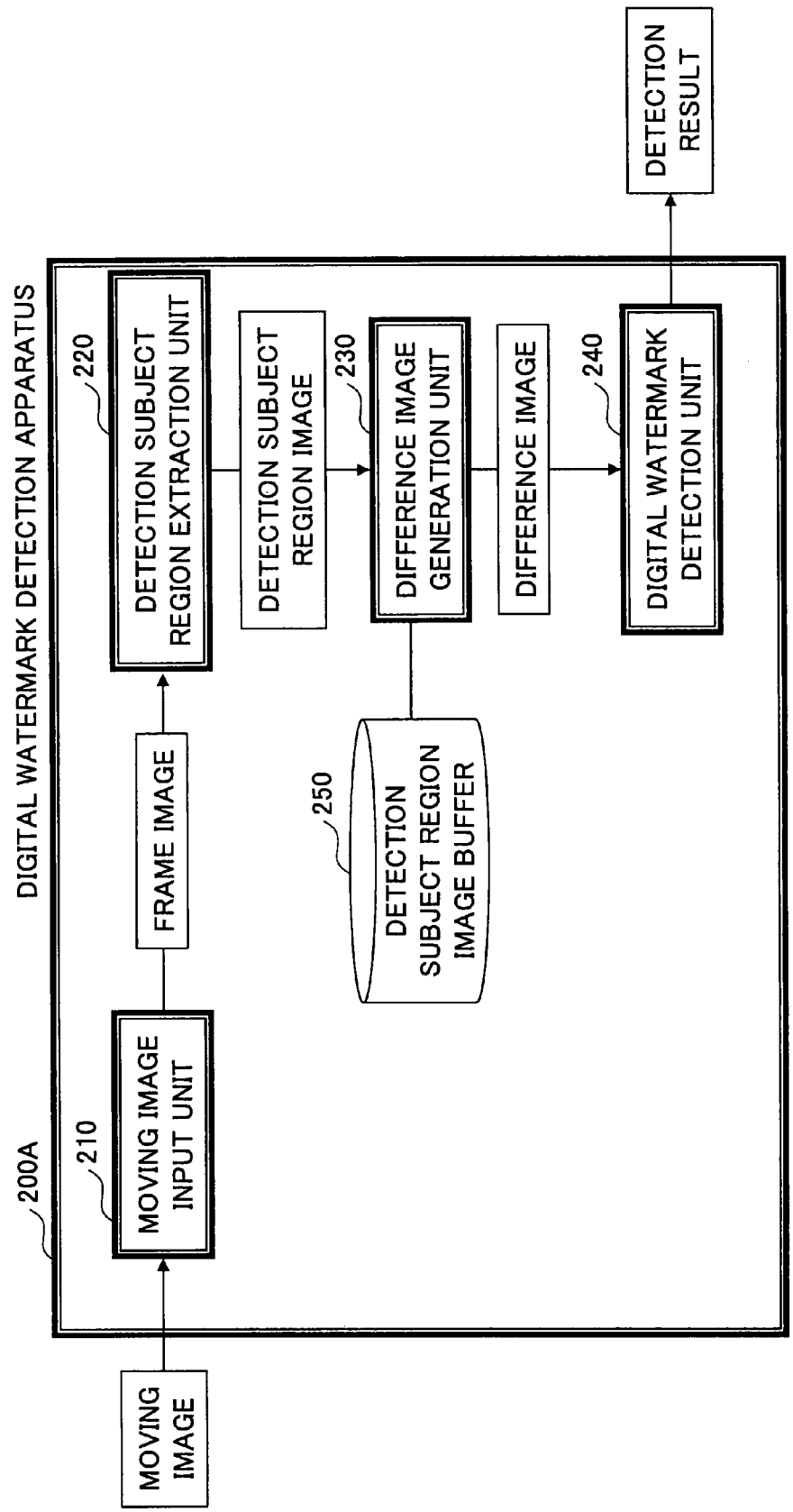
FIG. 19 is a block diagram of the digital watermark detection apparatus in the first embodiment of the present invention.

FIG. 19 shows a configuration of the digital watermark detection apparatus in the first embodiment of the present invention.

The digital watermark detection apparatus shown in the figure includes an moving image input unit 210, a detection subject region extraction unit 220, a difference image generation unit 230, a digital watermark detection unit 240, and a detection subject region image buffer 250. The moving image input unit 210 receives analog moving images displayed on a TV and the like, or receives MPEG-encoded digital moving images, and the digital watermark detection unit 240 outputs a detection result.

Figure 20:
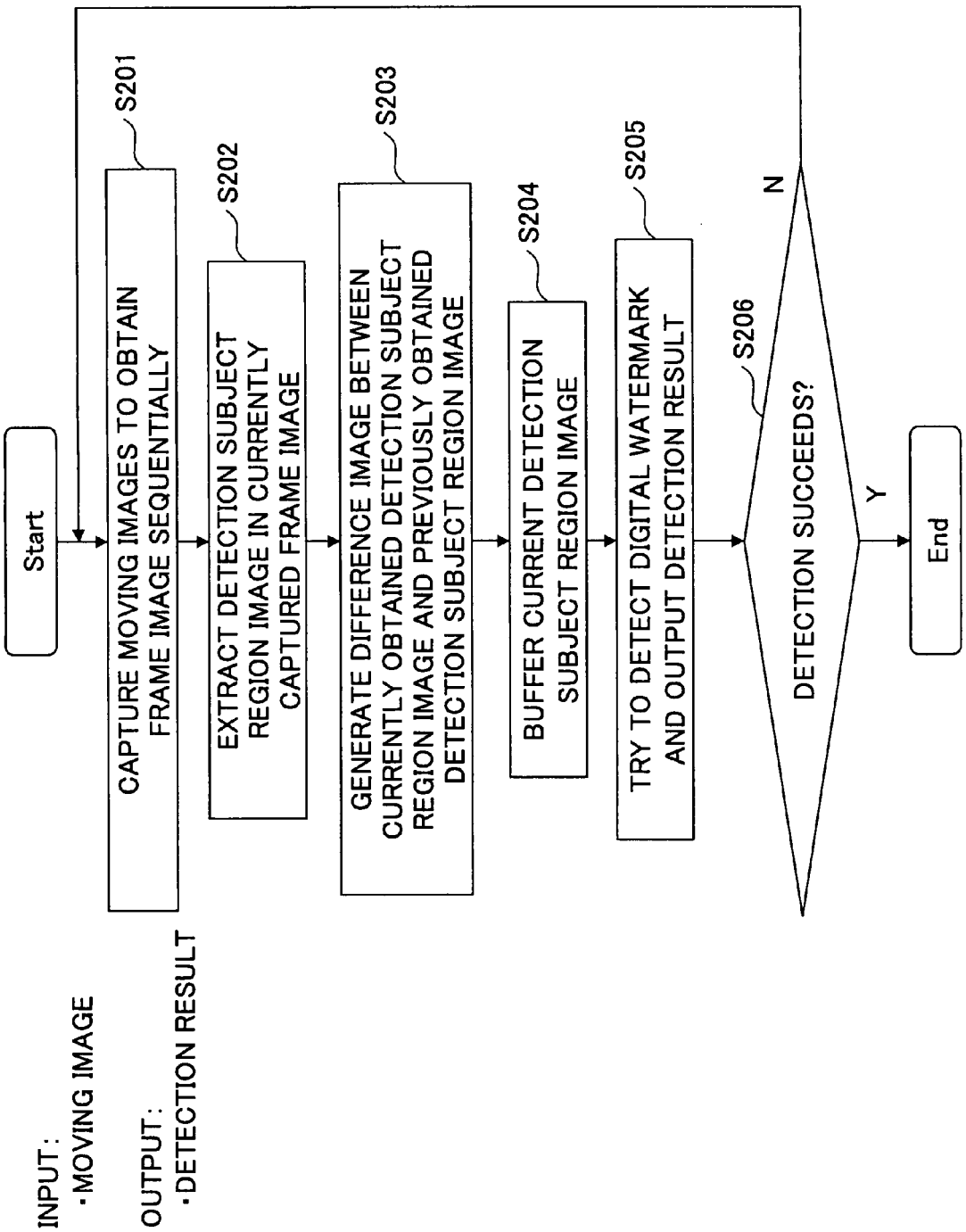
FIG. 20 is a flowchart of operation of the digital watermark detection apparatus in the first embodiment of the present invention.

FIG. 20 is a flowchart of operation of the digital watermark detection apparatus in the first embodiment of the present invention.

Step 201) When the analog or digital moving images are input by the moving image input unit 210, a frame image is obtained sequentially. When inputting the analog moving images, camera, scanner, or analog video signals are input so that the frame image is obtained. When the digital moving images are input, the frame image is obtained after performing decoding processes.

Step 202) Next, the detection subject region extraction unit 220 extracts a detection subject, in each frame image that is input sequentially, that is a subject from which watermark is detected, so as to obtain the detection subject region image.

Step 203) Next, the difference image generation unit 230 generates a difference image between the currently obtained detection subject region image and a previously obtained detection subject region image stored in the detection subject region image buffer 250.

Step 204) The difference image generation unit 230 buffers the current detection subject region image into the detection subject region image buffer 250 in preparation for next detection trial.

Step 205) The digital watermark detection unit 240 tries to detect digital watermark from the difference image and outputs a detection result. When the digital watermark detection does not succeed, the moving image input unit 210 obtains a next frame image so as to repeat the above-mentioned processes sequentially.

Next, processes of the detection subject region extraction unit 220 are described in detail.

Figure 21:
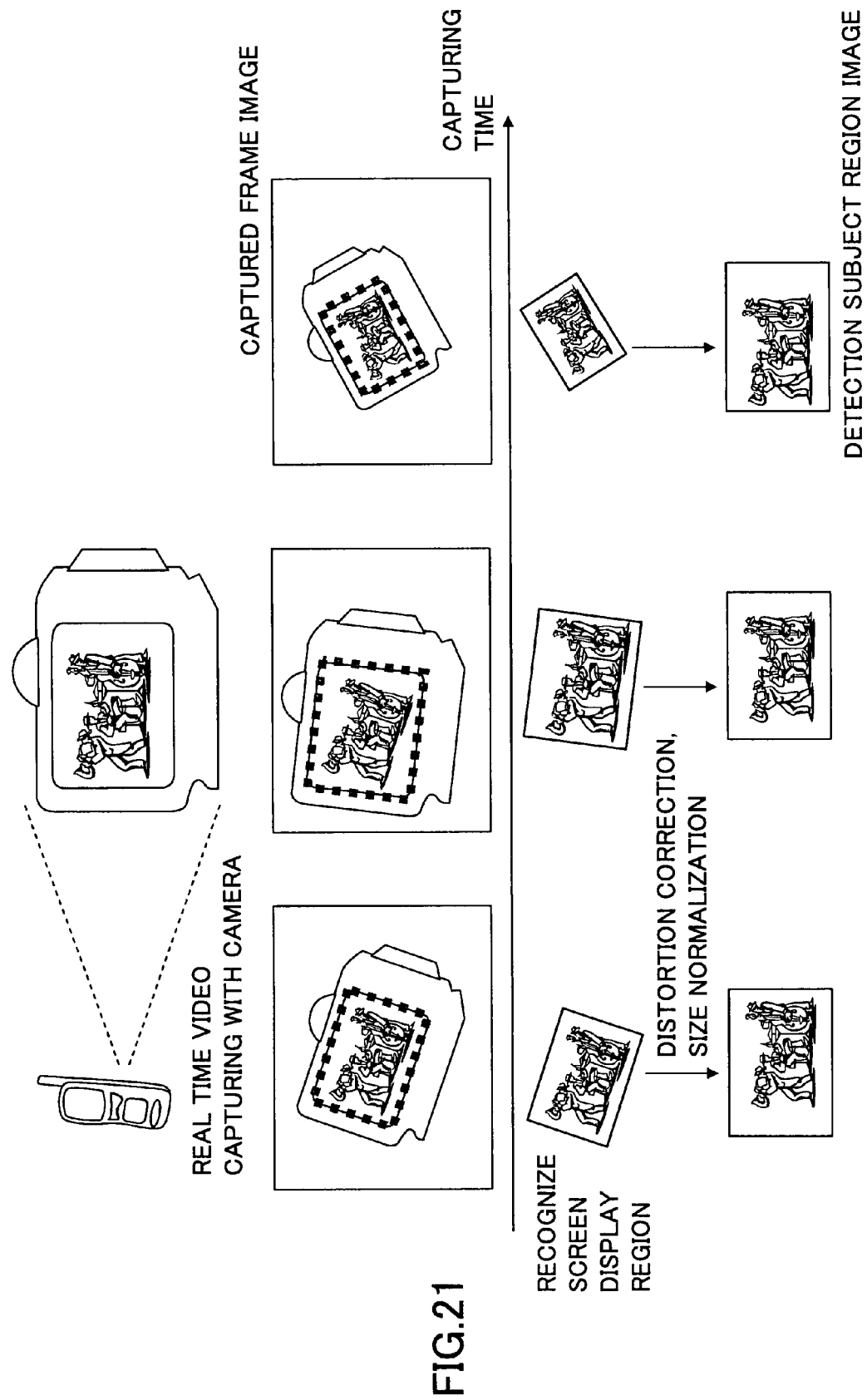
FIG. 21 is a figure for explaining processes of the detection subject region extraction unit in the first embodiment of the present invention.

FIG. 21 is a figure for explaining processes of the detection subject region extraction unit in the first embodiment of the present invention.

The detection subject region extraction unit 220 receives the frame image. FIG. 21 shows an example of camera input. In the case of the camera input, the detection subject region in the frame image suffers geometric deformation in various forms so that it changes due to plane projection conversion caused by image-taking angle or hand jiggling. Therefore, the detection subject region extraction unit 220 detects a display region of a TV and the like for each captured frame image using an edge detection/corner detection method such as "Katayama, Nakamura, Yamamuro, Sonehara: "i appli high speed corner detection algorithm for reading digital watermark", IEICE (D-II), Vol. J88-D-II, No. 6, pp. 1035-1046, June, 2005 (referred to as document 3, in the following). Plane projection distortion of the detected display area is corrected and the image size is normalized to a constant size so that the detection subject region image is output for generating the difference image next. By the way, in the case of analog video signal input such as NTSC or digital moving image input such as MPEG, processes for removing distortion in the frame or cutting out a part of the frame image are unnecessary, and the frame image is output as it is as the detection subject region image.

Next, the difference image generation unit 230 is described in detail.

Figure 22:
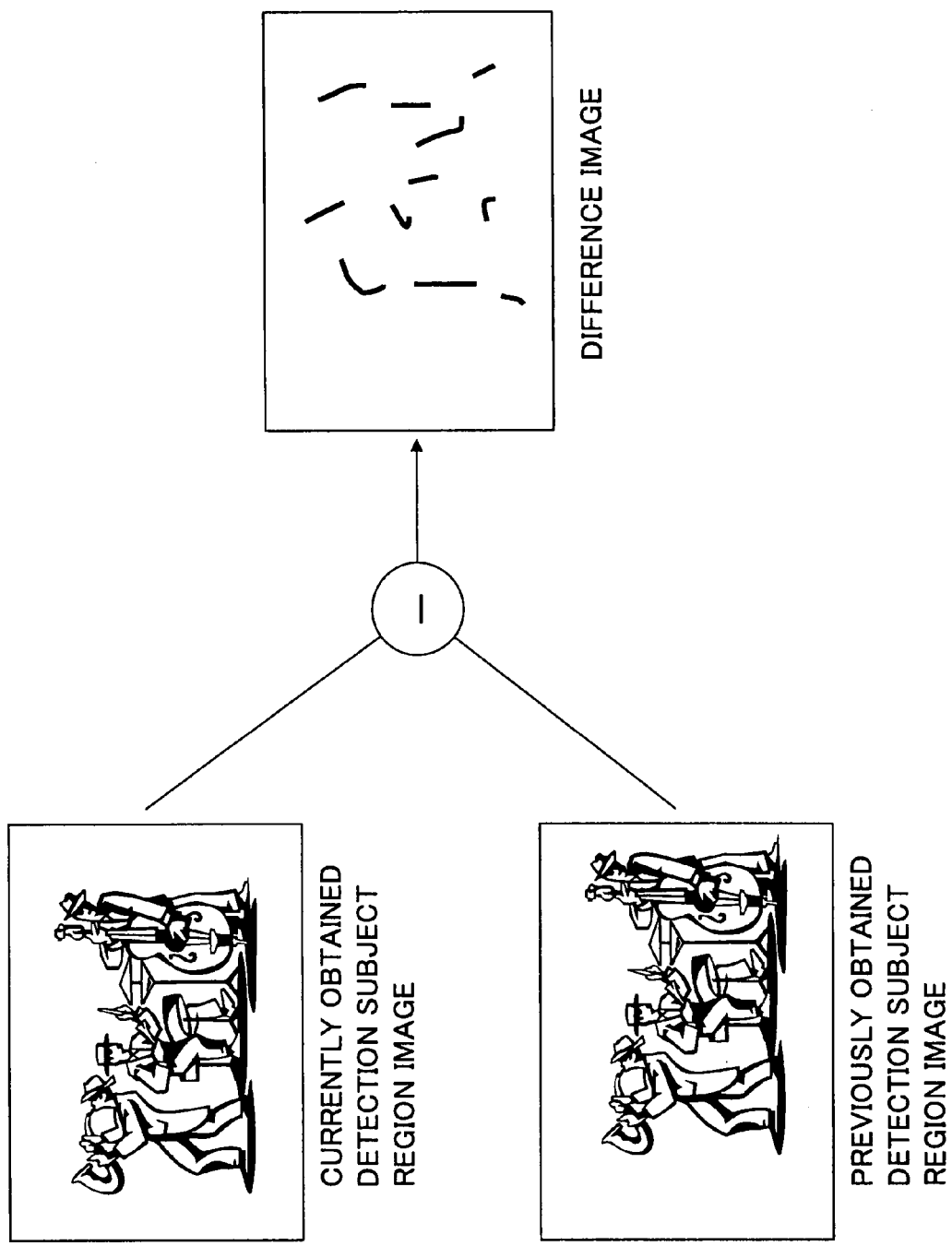
FIG. 22 is a figure for explaining processes of the difference image generation unit in the first embodiment of the present invention.

FIG. 22 is a figure for explaining processes of the difference image generation unit in the first embodiment of the present invention.

The difference image generation unit 230 receives the detection subject region image. The difference image generation unit 230 generates a difference image between the currently received detection subject region image and a previously obtained detection subject region image stored in the detection subject region image buffer 250. Most simply, it can be considered that a next previous detection subject image is buffered as the subtraction subject. Also, a plurality of detection subject region images may be buffered to select a subtraction subject as necessary to generate the difference image. In addition, in preparation for next detection trial, the detection subject region image buffer 250 buffers the current detection subject region image. At this time, an old detection subject region image in the detection subject region image buffer 250 may be discarded.

By the way, at the timing when the first detection subject region image is input, the detection subject region image buffer 250 is empty. In this case, the first detection subject region image may be output as the difference image to try to perform digital watermark detection, or digital watermark detection may be skipped to perform next frame capturing process.

Next, the digital watermark detection unit 240 is described in detail.

The digital watermark detection unit 240 receives the difference image and tries to detect digital watermark from the difference image.

Figure 23:
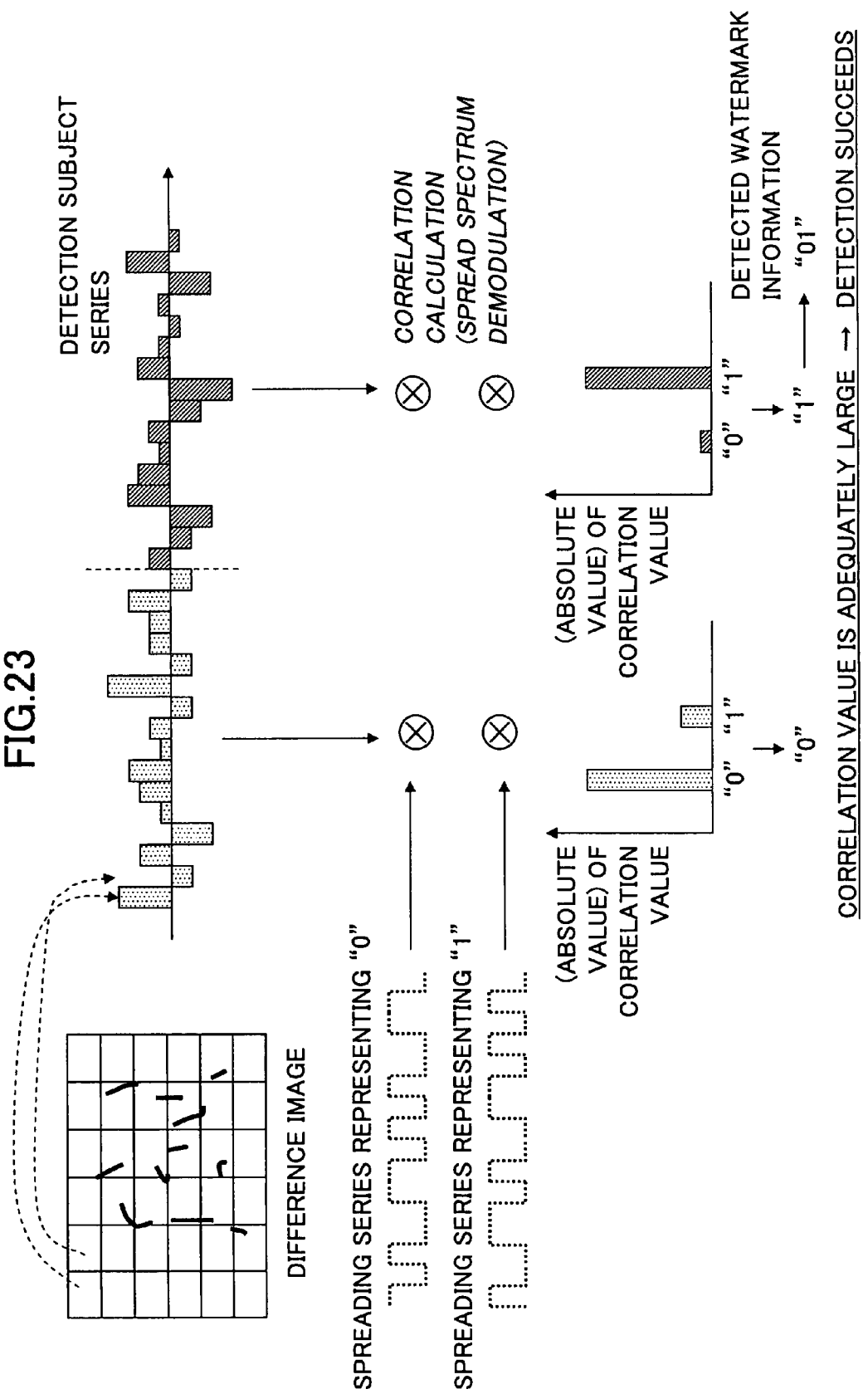
FIG. 23 is a figure for explaining an example of processes of the digital watermark detection unit in the first embodiment of the present invention.

FIG. 23 is a figure for explaining an example of processes of the digital watermark detection unit in the first embodiment of the present invention. The figure shows a demodulation method when performing detection corresponding to the modulation method (B-1) used for digital watermark embedding.

First, a component channel used for embedding for the difference image is extracted. If it is luminance, a luminance component is extracted. Then, the difference image is divided into blocks a number of which is the same as the number of blocks of the watermark pattern when embedding.

Next, sum of luminance values in each block is obtained, and sums are arranged in an order of blocks to obtain a detection subject series that is a one-dimensional series. In the case of modulation information (B-2), energy of the waveform pattern in each block is obtained, and an indicator indicating a dominant pattern in a plurality of waveform patterns is calculated for each block, so that the indicators are arranged in a line (document 1).

Corresponding to that one bit symbol is modulated for each section of the series when embedding, sections for each symbol position of the detection subject series are extracted so as to perform correlation calculation for a spreading series representing a symbol value "0" and a spreading series representing "1" for each section. In each symbol position, a symbol value by which (absolute value of) the correlation value is maximum becomes detected watermark information for each symbol position. In the example shown in FIG. 23, the first symbol: "0" and the second symbol: "1" are detected watermark information. In addition, it is determined that digital watermark detection succeeds when (absolute value of) the correlation value obtained at this time is sufficiently large, that is, when the correlation value is equal to or greater than a predetermined threshold, for example. By the way, as to detection methods for the modulation methods (A-1)-(A-4), bit values can be determined using plus and minus of the correlation value as shown in the document 1.

When the digital watermark detection unit 240 successfully detects the digital watermark, the detected watermark information may be output so as to complete the detection process and change the state to providing a related information service. Alternatively, when using an augmented reality application in which taken images and a CG (computer graphics) are synthesized as described in "J. Rekimoto, Y. Ayatsuka, "CyberCode: Designing Augmented Reality Environments with Visual Tags", Designing Augmented Reality Environments (DARE 2000), 2000" (to be referred to as document 4 hereinafter), digital watermark detection may be continued. When the digital watermark detection is not successfully performed, the procedure retunes to the frame capturing process of the moving image input unit 210 so as to repeat detection trial. Or, when input of moving images completes, the detection process is terminated.

<Effects of the Present Embodiment>

According to the present embodiment, when embedding digital watermark into the moving images, embedding is performed while switching the watermark pattern for each frame. Thus, compared with an embedding method in which a fixed watermark pattern is embedded in each frame image by simply repeating applying a still image algorithm on the frame image, the fixed pattern can be avoided so that image quality deterioration can be kept low. Especially, when the switching speed is high, image quality deterioration becomes less perceptible in view of the knowledge on time frequency characteristics that visual sensitivity decreases when time frequency is high in visual characteristics of a human ("Okewatari, Image engineering handbook, Asakurashoten, ISBN4-254-20033-1, pp. 10-56, 1986", (to be referred as document 5, hereinafter).

Figure 24:
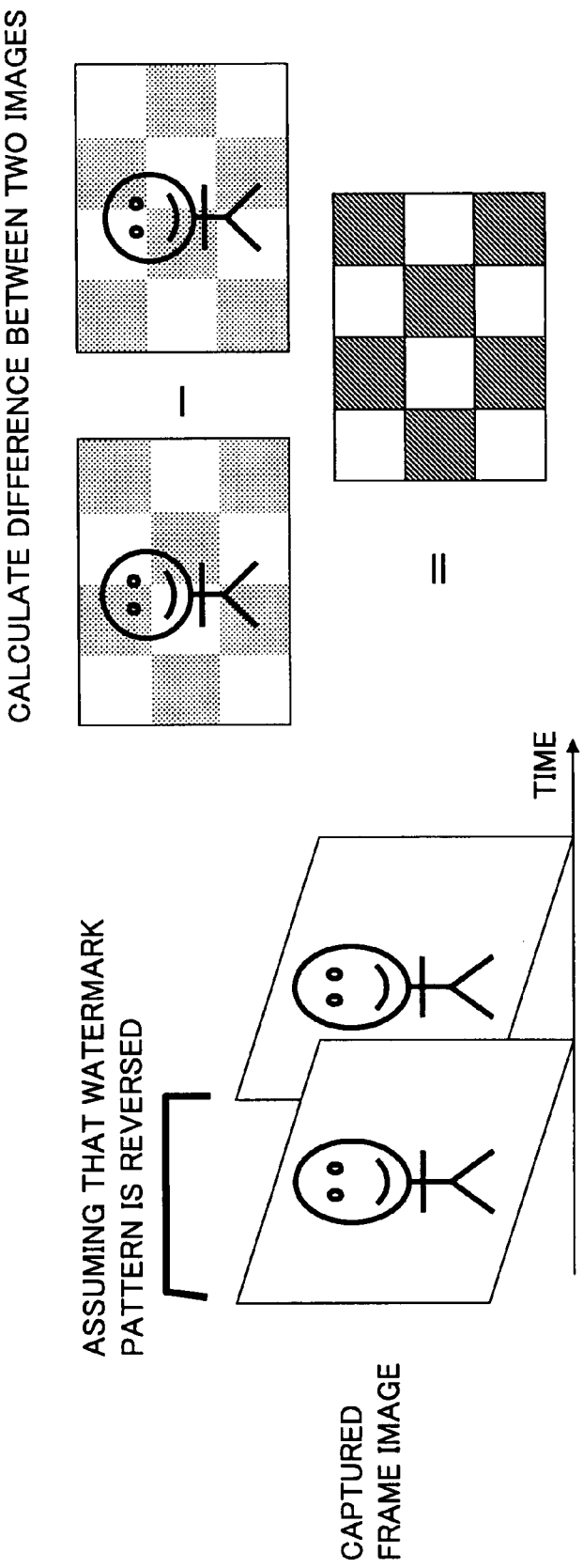
FIG. 24 is a figure for explaining effects of the first embodiment of the present invention.

In addition, in the digital watermark detection process, time subtraction is calculated for the captured frame images to detect digital watermark from the difference image. As shown in FIG. 24, it is generally known that inter-frame correlation is high in a time direction in moving images. Thus, by calculating subtraction, almost all original image components except for a part including intense movements can be canceled. At the same time, in a case of subtraction between two frames in which watermark patterns are reversed, a watermark pattern whose amplitude is twice as that of a watermark pattern used for embedding can be obtained. Accordingly, the original image signal that is a large noise component for a watermark signal can be suppressed and further the amplitude of the watermark signal can be doubled, which were challenges common to digital watermark schemes of a type in which a watermark pattern is additively superimposed onto an image. Therefore, an S/N ratio of the watermark signal can be largely improved when performing detection, so that tolerance of digital watermark improves.

In addition, the detection subject region in the captured frame image is extracted, distortion is corrected and normalization is performed before generating the difference image. Thus, various distortion factors in the detection subject region in the captured frame can be canceled, wherein the factors are such as plane projection conversion distortion due to an image-taking angle when performing camera input, and parallel translation due to camera movement and viewpoint movement and the like. Thus, digital watermark detection from camera input can be realized. Further, by performing the correction for each capture frame, different distortion factors for each taken frame due to movement of the camera caused when the camera is held by hands can be canceled. Thus, the original image signal can be reliably suppressed by generating the difference image, so that watermark detection can be successfully performed without any problem even in a case when taking images by holding a camera-equipped mobile-phone by hand.

Second Embodiment

In this embodiment, a digital watermark detection apparatus is described.

This embodiment is the same as the before-mentioned first embodiment except for parts described below.

Figure 25:
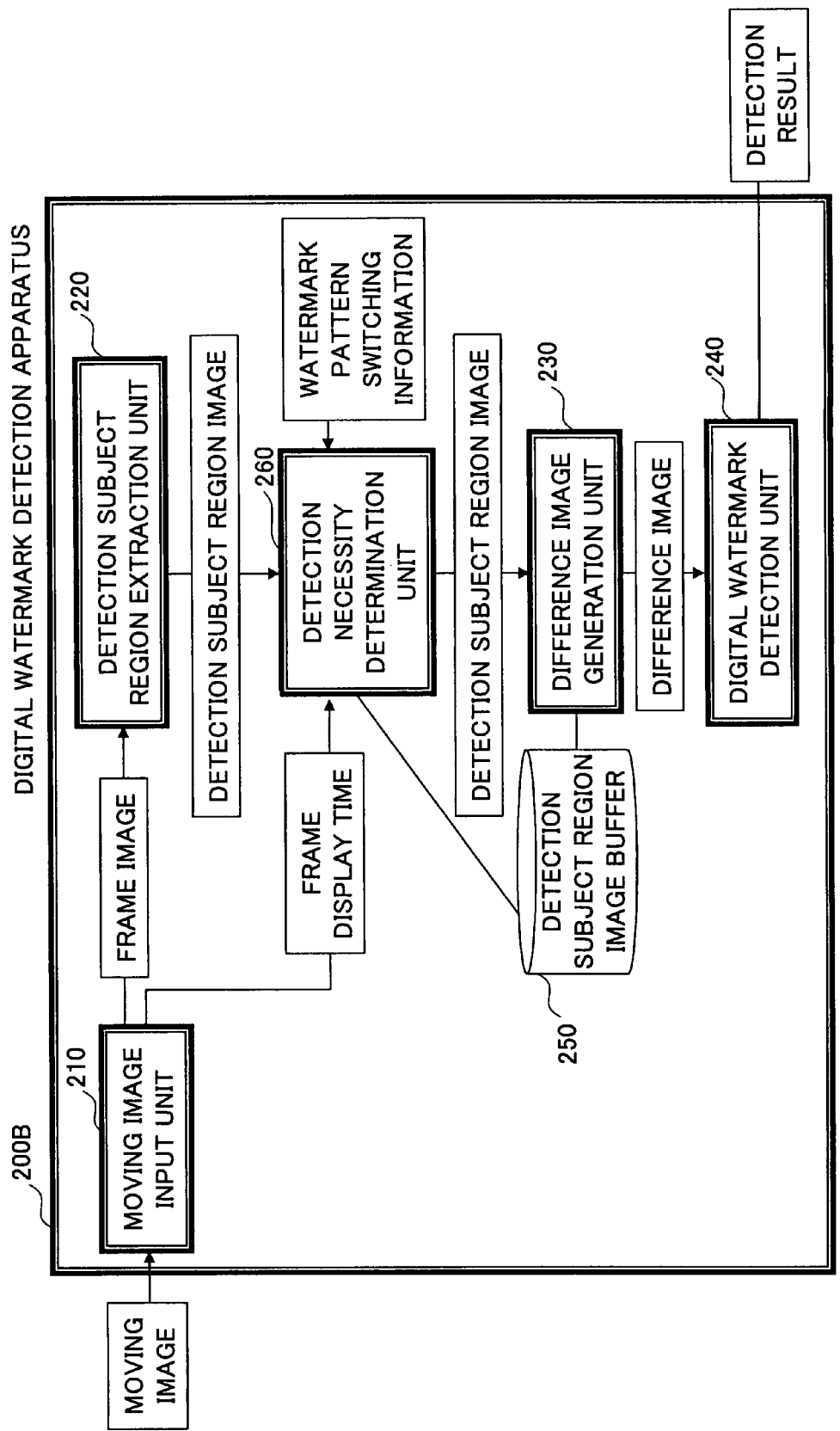
FIG. 25 is a block diagram of the digital watermark detection apparatus in the second embodiment of the present invention.

FIG. 25 shows a configuration of the digital watermark detection apparatus in the second embodiment of the present invention. The digital watermark detection apparatus 200B shown in the figure is configured such that a detection necessity determination unit 206 is added to the configuration shown in FIG. 15 in the before-mentioned first embodiment.

Figure 26:
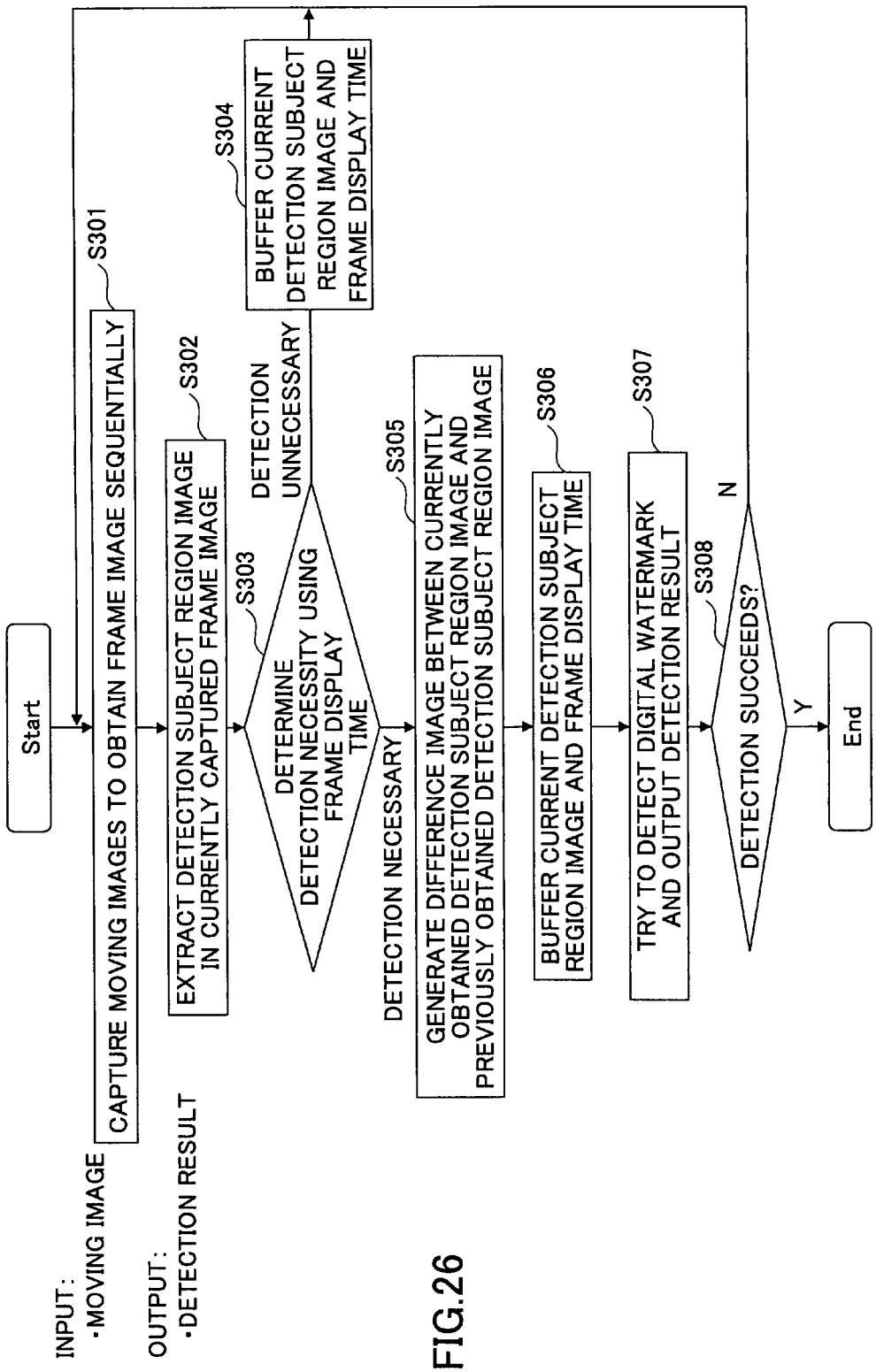
FIG. 26 is a flowchart of operation of the digital watermark detection apparatus in the second embodiment of the present invention.

FIG. 26 shows a flowchart of operation of the digital watermark detection apparatus in the second embodiment of the present invention.

Step 301) The moving image input unit 210 of the digital watermark detection apparatus 200B inputs analog or digital moving images and obtains a frame image sequentially, and at the same time, obtains the frame display time. The frame display time can be obtained based on time code or frame rate or the like in a case of MPEG-encoded moving images, for example. In a case of a camera and the like, it can be considered that synchronization with a display system cannot be taken. In such a case, a timer may be provided in the moving image input unit 210 for obtaining time when capturing or obtaining delay time from next previous capturing so that the frame display time of the captured frame can be obtained.

Step 302) Next, the detection subject region extraction unit 220 extracts a detection subject region, in each of the sequentially input frame images, that is a subject from which watermark is detected to obtain a detection subject region.

Step 303) Next, the detection necessity determination unit 260 compares a frame display time corresponding to the currently obtained detection subject region image with a frame display time corresponding to a detection subject region image obtained before and stored in the detection subject region image buffer while referring to watermark pattern switching information the same as that used when embedding. When the watermark patterns in the two detection subject region images are in phase, it is judged that detection is unnecessary so that the procedure goes to step 304. When it is judged that they are not in phase, the procedure goes to step 305.

Step 304) When detection is unnecessary, the procedure is returned to the capturing process by the moving image input unit 210 after the current detection subject region image and corresponding frame display time are buffered in the detection subject region image buffer 250 (go to step 301).

Step 305) The current detection subject region image is sent to the difference image generation unit 230. The difference image generation unit 230 generates a difference image between the currently obtained detection subject region image and the previously obtained detection subject region image stored in the detection subject region image buffer 250.

Step 306) The difference image generation unit 230 buffers the current detection subject region image and the frame display time in the detection subject region image buffer 250 in preparation for a next detection trial. At this time, old detection subject region images and frame display times in the detection subject region image buffer are discarded for example.

Step 307) Next, the digital watermark detection unit 240 tries to detect digital watermark from the difference image and outputs a detection result.

Step 308) It is determined whether digital watermark detection succeeds. When it does not succeed, the moving image input unit 210 obtains a next frame image to repeat the above-mentioned process sequentially (go to step 301). When the digital watermark detection succeeds, the process is terminated.

The detection necessity determination unit 260 receives the frame display time, the detection subject region image and the watermark pattern switching information. The detection necessity determination unit 260 compares a frame display time corresponding to the currently obtained detection subject region image with a frame display time corresponding to a previously obtained detection subject region image stored in the detection subject region image buffer 250 while referring to watermark pattern switching information the same as that used when embedding. The detection necessity determination unit 260 determines detection necessity by determining whether watermark patterns in the two detection subject region images are in phase. When detection is unnecessary, the procedure returns to capturing process by the moving image input unit 210. When it is determined that detection is necessary, the detection necessity determination unit 260 sends the detection subject region images to the difference image generation unit 230.

FIG. 27 is a figure for explaining processes of the detection necessity determination unit in the second embodiment of the present invention.

As an example, it is assumed that the watermark pattern switching information indicates "switch every $1/10$ second", and that the moving images are reproduced 30 frames per second. In addition, the frame display time of the previous frame stored in the detection subject region image buffer 250 is indicated by t. When the currently obtained frame display time is t0 or t1, each of $t0-t=3/30$ second and $t1-t=5/30$ second indicates that the phase of the watermark pattern is reversed in the every $1/10$ second reversal so that it can be ascertained that possibility in which digital watermark can be detected from the difference image is high. Thus, it is judged that "detection is necessary". When the currently obtained frame display time is t2, t2−t=6/30 second indicates that the phase of the watermark pattern is in phase with the previous display time in the every 1/10 second reversal so that it can be ascertained that possibility in which digital watermark can be detected from the difference image is low. Thus, it is judged that "detection is unnecessary".

Like this example, it is not necessary that the frame display time is an absolute time from the head of the moving images, and it is only necessary that a delay time between capturing times of the reproduced moving images.

<Effects of the Present Embodiment>

According to this embodiment, in addition to the effects of the first embodiment, useless watermark detection process can be omitted by performing the detection necessity determination so that efficient detection process can be performed. As shown in FIGS. 28A and B, since the difference image is generated to perform detection trial only when the phases of the watermark patterns are reversed by evaluating the timing of capturing, the in-phase case in which detection is difficult can be avoided so that useless detection trial can be omitted. The reduced process amount can be used for improving detection performance by increasing the frame rate of capturing and for advancing the user interface so that effects such as improving convenience of the detection apparatus can be obtained.

Third Embodiment

In the present embodiment, a digital watermark detection apparatus is described.

This embodiment is the same as the first embodiment except for parts described as follows.

Figure 29:
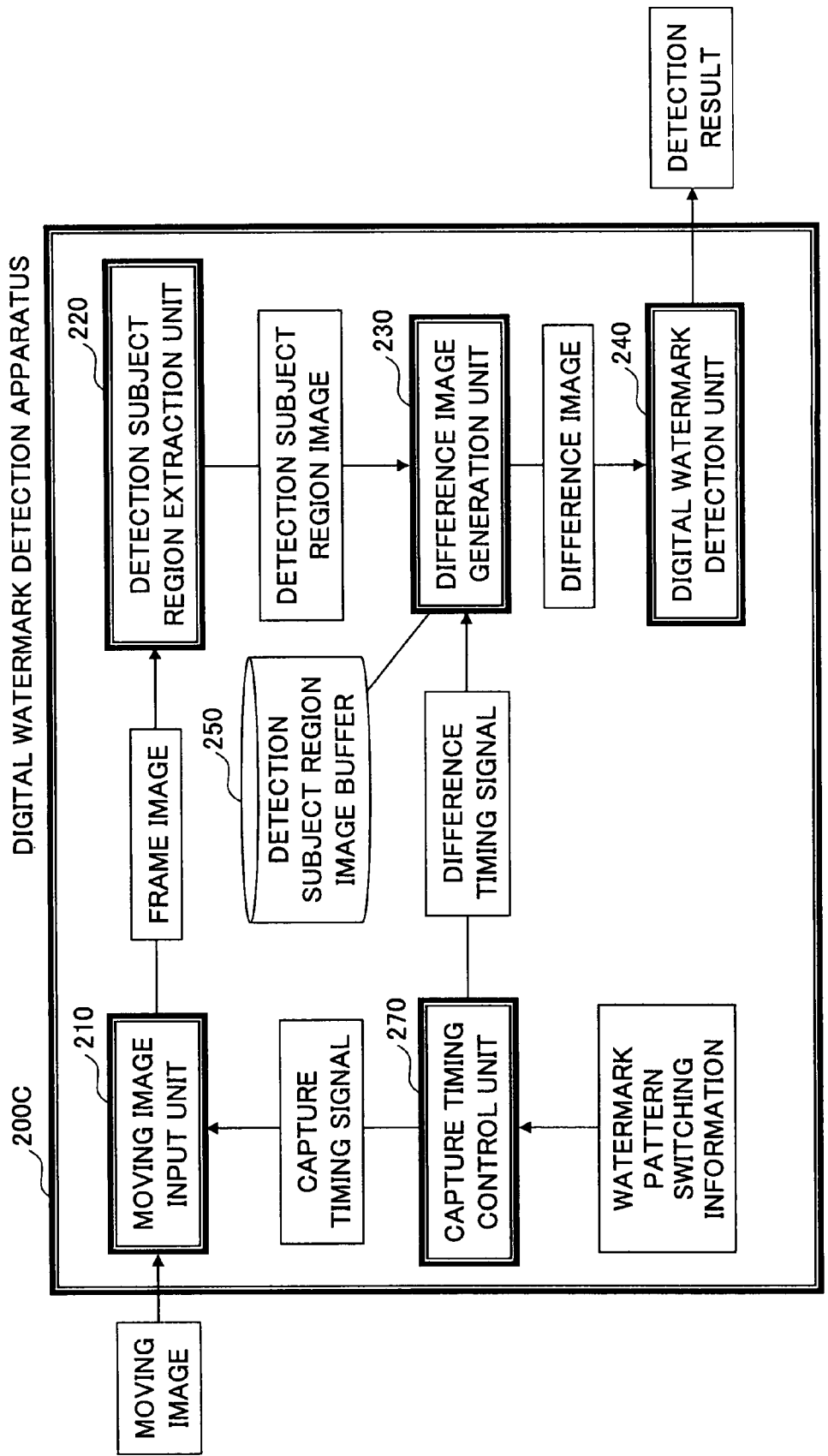
FIG. 29 is a block diagram of the digital watermark detection apparatus in the third embodiment of the present invention.

FIG. 29 shows a configuration of the digital watermark detection apparatus in the third embodiment of the present invention.

The digital watermark detection apparatus 200C shown in the figure is configured such that a capture timing control unit 270 is added to the configuration shown in FIG. 19 in the first embodiment.

The capture timing control unit 270 receives watermark pattern switching information and sends a capture timing signal to the moving image input unit 210. In addition, the capture timing control unit 270 sends a difference timing signal to the difference image generation unit 230.

Figure 30:
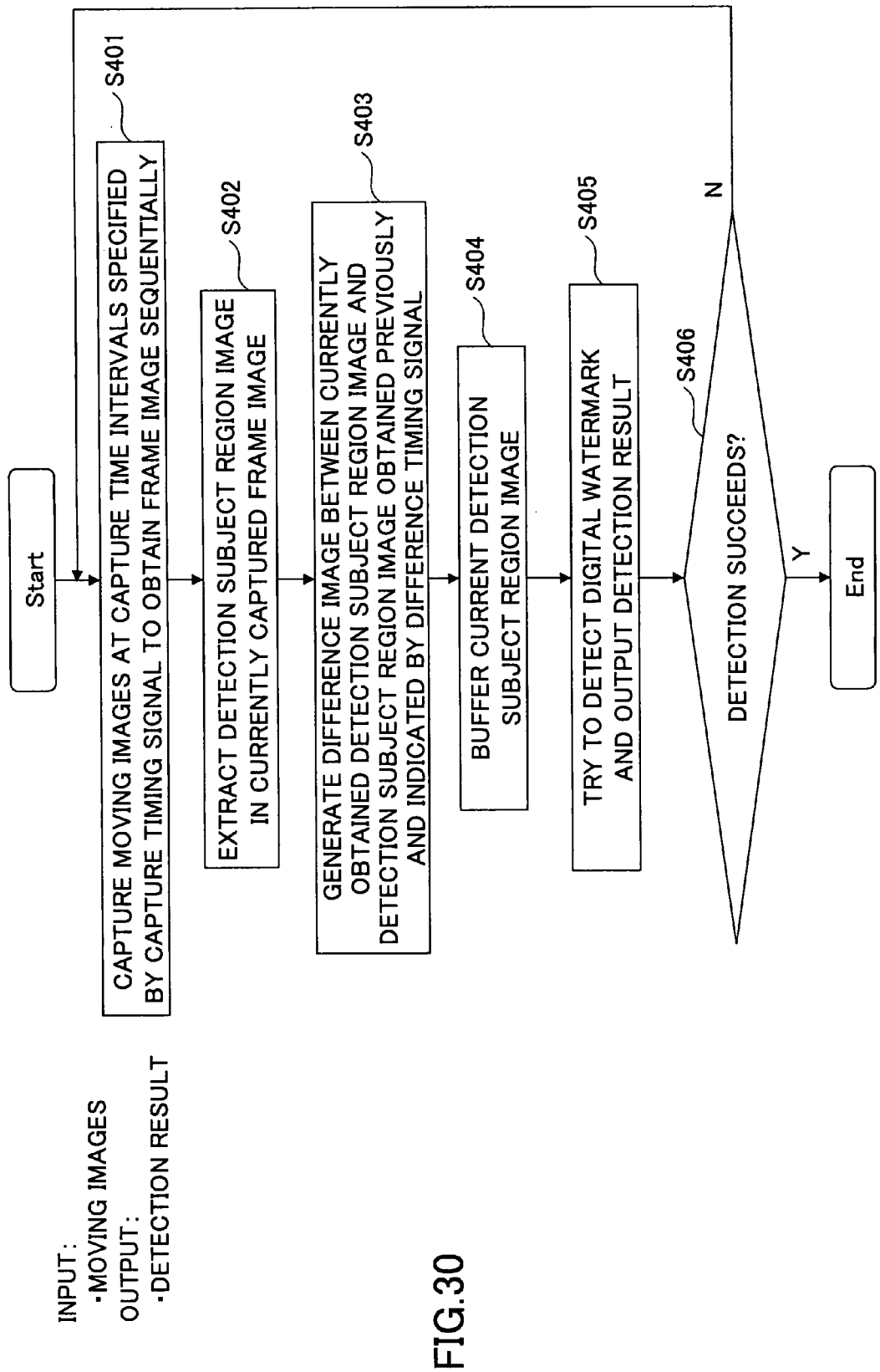
FIG. 30 is a flowchart of operation of the digital watermark detection apparatus in the third embodiment of the present invention.

FIG. 30 shows a flowchart of operation of a digital watermark detection apparatus in the third embodiment of the present invention.

Step 401) The moving image input unit 210 inputs analog or digital moving images at capturing time intervals specified by a capture timing signal supplied from the capture timing control unit 270 so as to sequentially obtain a frame image.

Step 402) The detection subject region extraction unit 220 extracts a detection subject region, in each of the sequentially input frame images, that is an object from which watermark is detected to obtain a detection subject region image.

Step 403) Next, the difference image generation unit 230 generates a difference image between the currently obtained detection subject region image and the temporally previous detection subject region image that is indicated by the difference timing signal and that is stored in the detection subject region image buffer 250.

Step 404) In addition, the difference image generation unit 230 buffers the current detection subject region image in the detection subject region image buffer 250 in preparation for a next detection trial.

Step 405) Next, the digital watermark detection unit 240 tries to detect digital watermark from the difference image and outputs a detection result.

Step 406) When digital watermark detection does not succeed, the moving image input unit 210 obtains a next frame image to repeat the above-mentioned process sequentially (go to step 401). When the digital watermark detection succeeds, the process is terminated.

Figure 31:
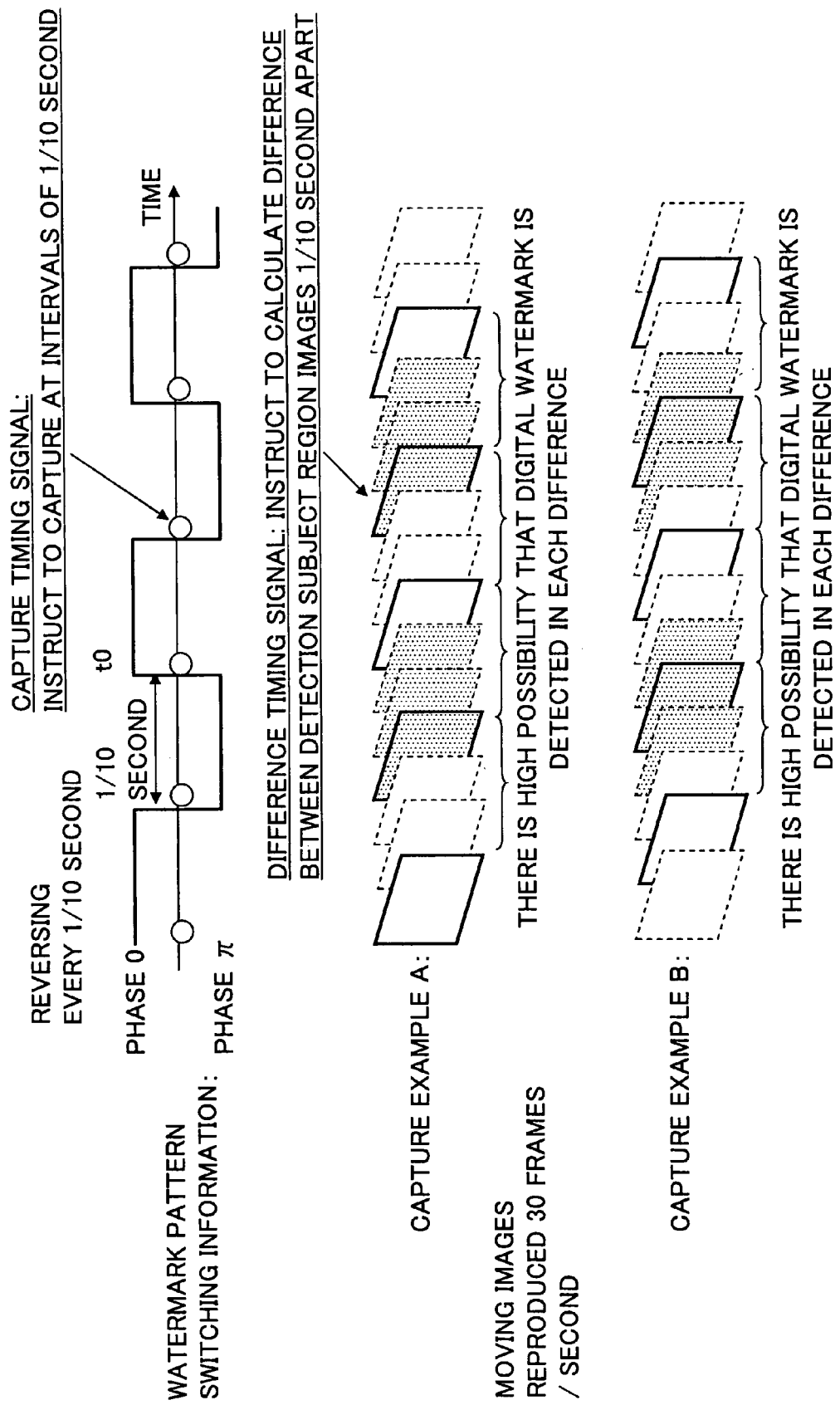
FIG. 31 is a figure (1) for explaining processes of the capture timing control unit in the third embodiment of the present invention.

FIG. 31 is a figure for explaining processes of the capture timing control unit in the third embodiment of the present invention. As an example, it is assumed that the watermark pattern switching information is "switch every 1/10 second", and that the moving images are reproduced 30 frames per second. In this case, the capture timing signal is sent every 1/10 second, and the moving image input unit 210 that receives it performs capturing at intervals of 1/10 second. Alternatively, information indicating "capture at intervals of 1/10 second" is sent as the capture timing signal first, so that capturing operation may be performed at intervals of 1/10 second while adjusting timing in the moving image input unit 210.

In addition, as the difference timing signal, an instruction indicating "obtain difference between detection subject region images (odd number times of) 1/10 second apart" is sent to the difference image generation unit 230. When using camera input and the like, there may be a case in which actually captured frames are different when only time interval for capturing is specified (deference between a capture example A and a capture example B in FIG. 31). However, in either of the capturing examples, frames in which watermark patterns having phases reversed with each other are embedded can be alternately captured according to capturing every 1/10 second. Accordingly, possibility of detecting digital watermark can be made high from a difference between any two consecutive frames. That is, it does not depend on start timing for capturing.

Figure 32:
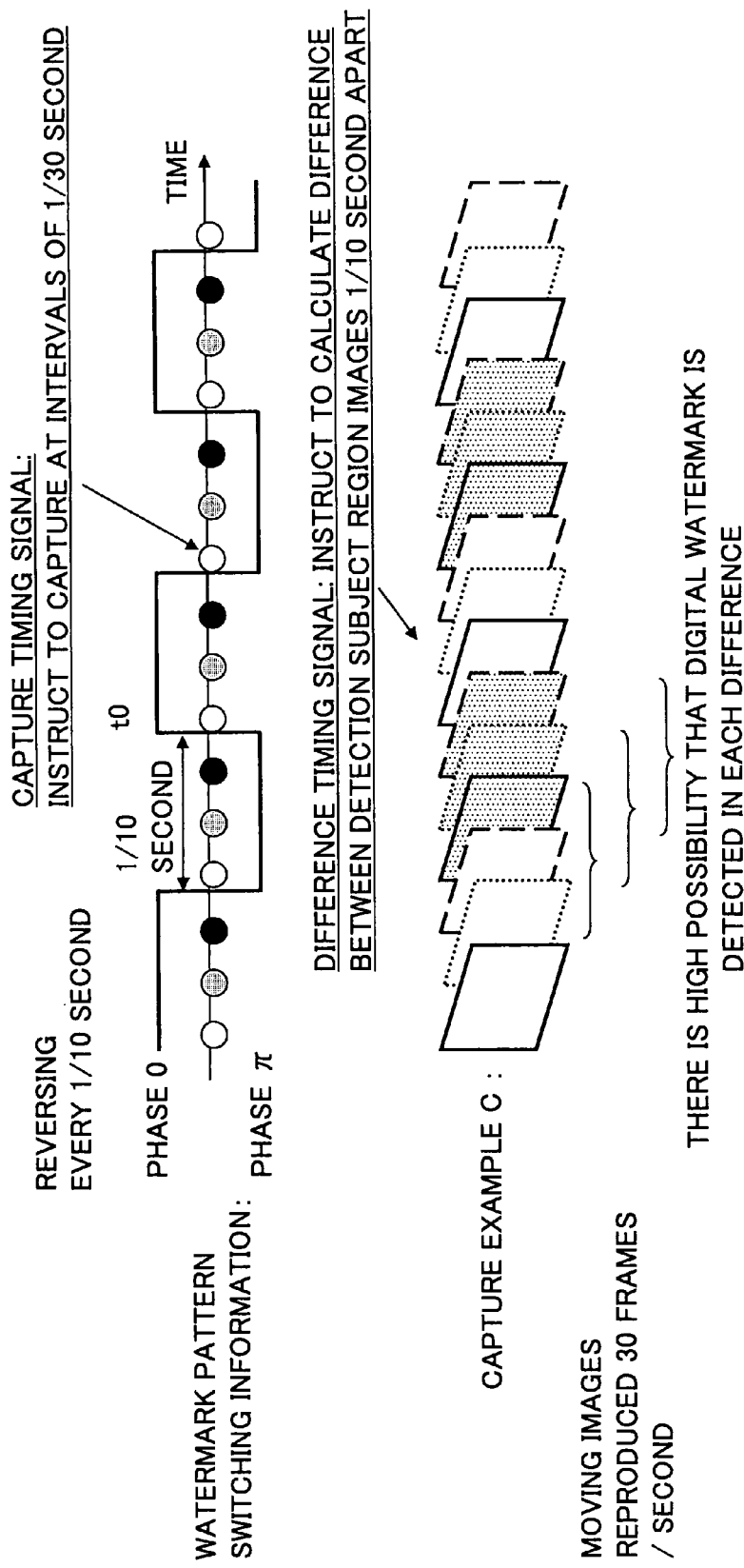
FIG. 32 is a figure (2) for explaining processes of the capture timing control unit in the third embodiment of the present invention.

In addition, as shown in FIG. 32, when it is instructed to "perform capturing at intervals of 1/30 second and obtain difference between detection subject region images (odd number times of) 1/10 second apart" and when the detection subject region image buffer 250 buffers previous three detection subject region images obtained from frames that are captured every 1/30 second, possibility of detection can be made high in every watermark detection trial by sequentially obtaining difference between a new detection subject region image input every 1/30 second and a detection subject region image 1/10 seconds before, that is, three images before.

By the way, when input data are digital data such as MPEG or when the input data are analog video signals, that is, when the input frame display time can be accurately obtained, since it is obvious that synchronization can be maintained, the possibility of detection can be made high in each detection trial by performing processes the same as those described above.

<Effects of the Present Embodiment>

According to the present embodiment, in addition to the effects of the first embodiment, capturing and difference image generation are performed at timing synchronized with the watermark pattern switching timing as shown in FIGS. 33A and B so that detection can be performed by obtaining a difference between images in which the phases of the watermark patterns are always reversed with each other. Thus, detection can be performed from difference images in which the watermark pattern is enhanced in all detection trials so that detection possibility can be increased to be high. Accordingly, since useless trial of low detection possibility can be eliminated, time required for detecting a digital watermark can be reduced, and detection can be succeeded quickly after starting capturing. In addition, in a case where detection is continued although watermark detection is succeeded like a case in an augmented reality application, since a detection succeed status continues without interruption, effects in which user interface is improved and convenience is improved can be also obtained.

Fourth Embodiment

The present embodiment describes a method for detecting correct watermark information even when using a modulation method of a type in which bits of detected watermark information are reversed due to reversal of the phase of the watermark pattern.

This embodiment is the same as the embodiments in the first-third embodiments except for parts described below.

Figure 34A:
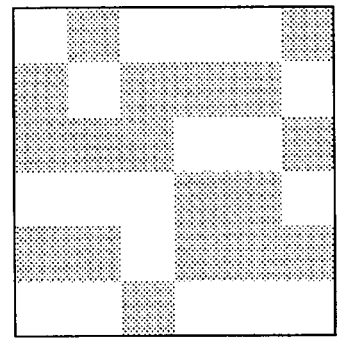
FIG. 34A is a figure for explaining processes of the basic watermark pattern in the fourth embodiment of the present invention.
Figure 34B:
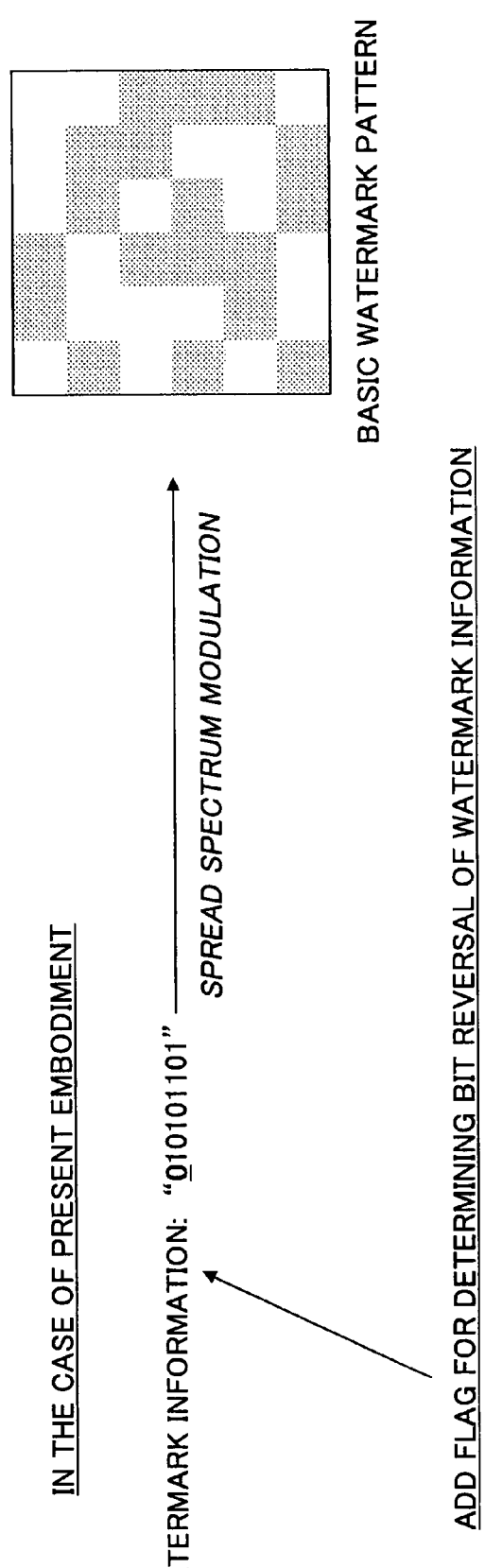
FIG. 34B is a figure for explaining processes of the basic watermark pattern in the fourth embodiment of the present invention.

FIGS. 34A and 34B shows process contents of the basic watermark pattern generation unit in the fourth embodiment of the present invention. The figures show process contents of the basic watermark pattern generation unit 121 in the digital watermark embedding apparatus 100 shown in FIG. 10 in the first embodiment.

The basic watermark pattern generation unit 121 in each of the first to third embodiments modulates only the input watermark information to a basic watermark pattern. In this embodiment, the basic watermark pattern is generated by adding one bit that is a flag bit for determining bit reversal of watermark information to the input watermark information. Alternatively, assuming that bit length of watermark information is one bit less than that of the watermark information of the first to third embodiments, the flag bit for determining the bit reversal is added so that a basic watermark pattern may be generated based on information whose length is the same as the watermark information of the first to third embodiments. In the example shown in FIG. 34, a bit value "0" as the flag bit for determining bit reversal is added to indicate a positive phase, that is, indicate that there is no bit reversal.

Figure 35:
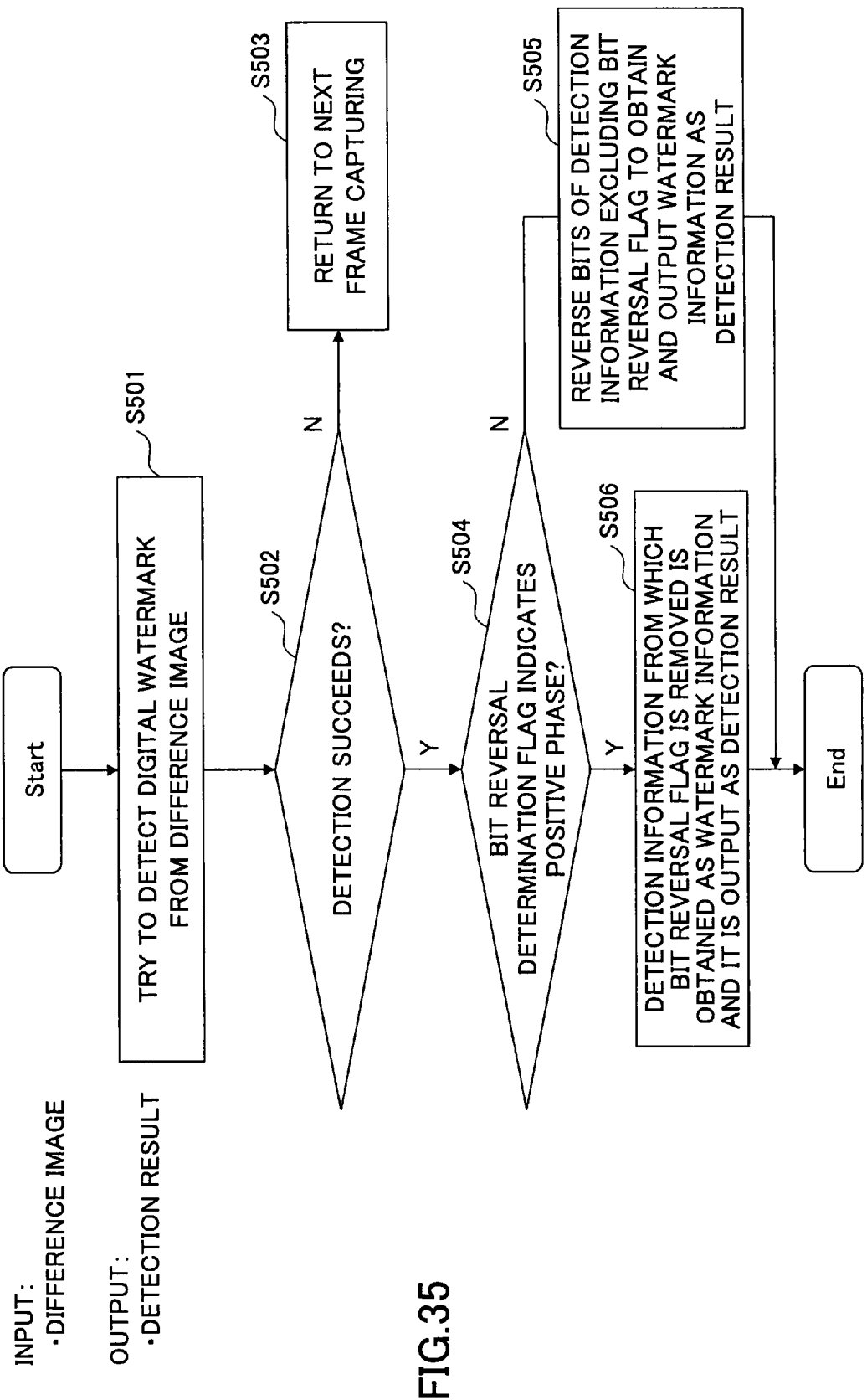
FIG. 35 is a flowchart of operation of the digital watermark detection unit in the fourth embodiment of the present invention.

FIG. 35 is a flowchart of operation of the digital watermark detection unit in the fourth embodiment of the present invention.

Step 501) The digital watermark detection unit 240 receives the difference image, and tries to detect digital watermark in the same way as the first to third embodiments.

Step 502) When the digital watermark is detected, the process goes to step 504. When it is not detected, the process goes to step 503.

Step 503) When it is not detected, operation is returned to next frame capturing.

Step 504) When the digital watermark is detected, a bit reversal determination flag in the detected information is checked and it is evaluated whether the value represents the positive phase. When it represents the positive phase, the process goes to step 506. When it represents a reverse phase, the process goes to step 505.

Step 505) When the bit reversal determination flag indicates reversed phase, bits of information from which the bit reversal determination flag is removed are reversed, and the reversed watermark information is output as detected watermark information as a detection result.

Step 506) When the value indicates positive phase, information obtained by removing the bit reversal determination flag from the detected information is regarded to be watermark information, and the detection result is output.

By the way, like the third embodiment, it is obvious that a phase of a watermark pattern in a current difference image can be also determined by using watermark pattern switching information used when embedding and the frame display time used when capturing.

<Effects of the Present Embodiment>

Figure 36:
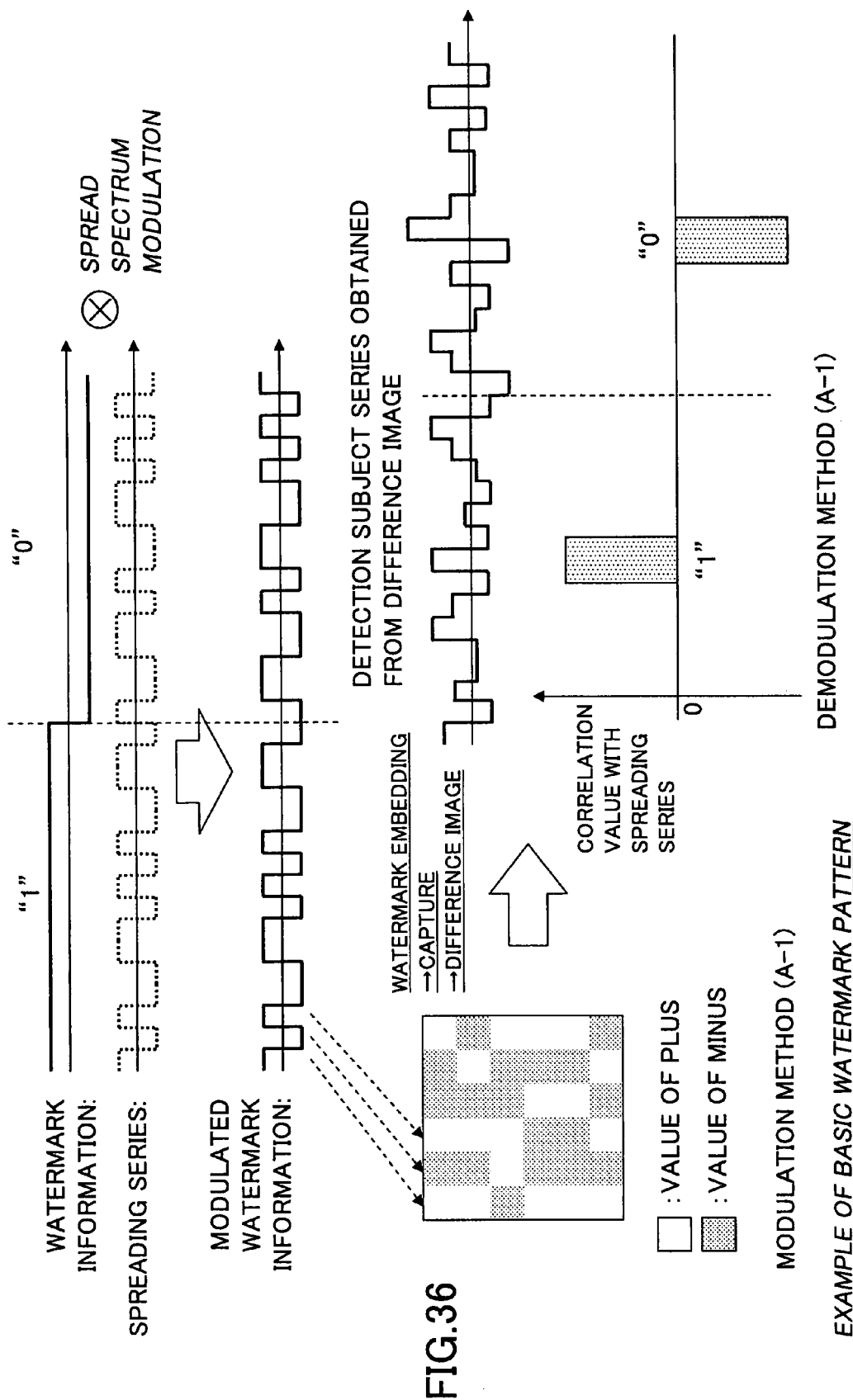
FIG. 36 is a figure (1) for explaining effects of the fourth embodiment of the present invention.
Figure 37:
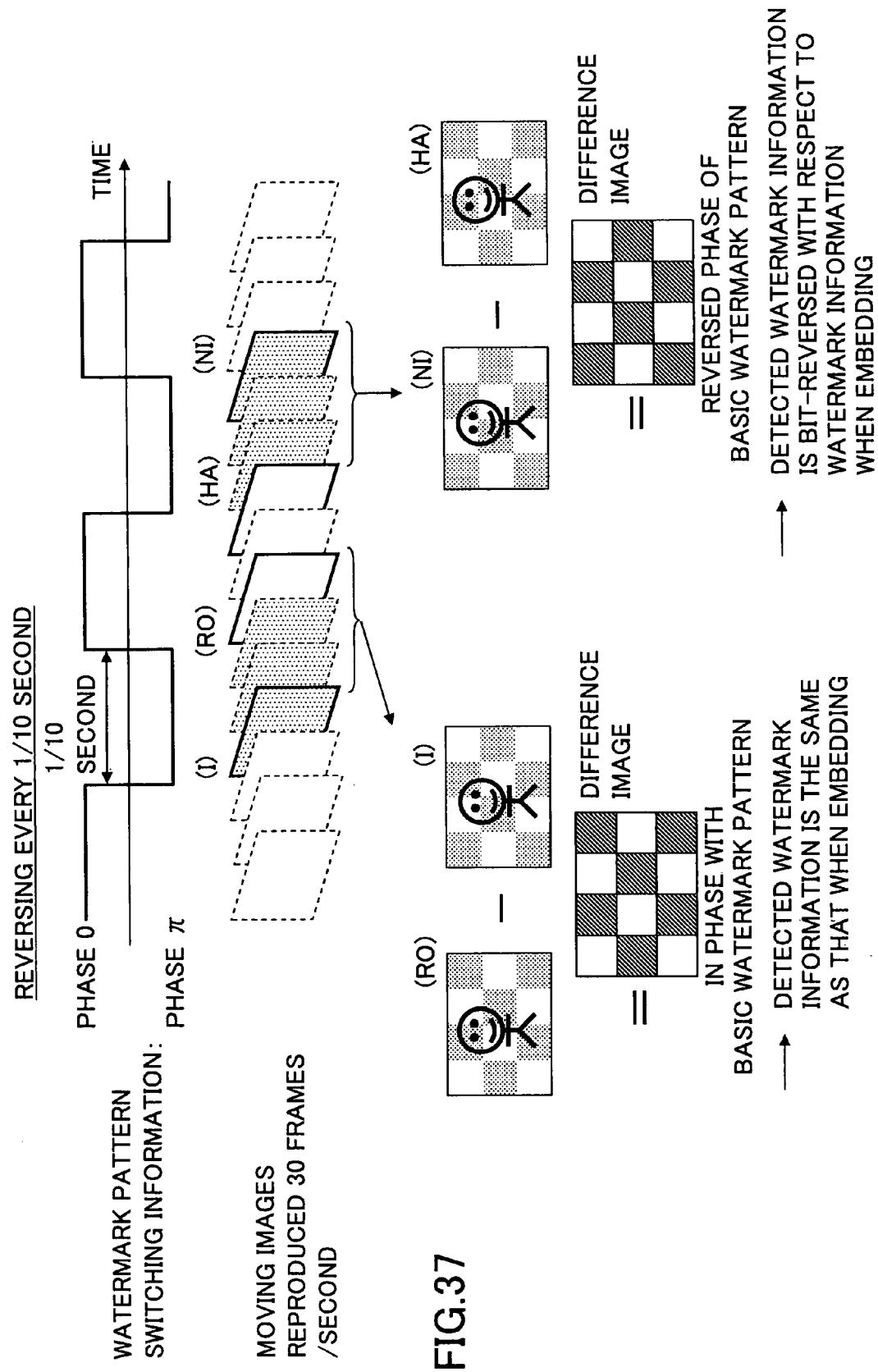
FIG. 37 is a figure (2) for explaining effects of the fourth embodiment of the present invention.

Effects of the present embodiment are described using FIGS. 36-38.

When the modulation method used for digital watermark embedding is the modulation method (A-1) shown in FIG. 12 described in the first embodiment, detection subject series are obtained from pixel values of the difference image and correlation between the detection object series and spreading series is calculated so as to detect a bit value "0" or "1" based on plus/minus of the correlation value when performing detection. Demodulation in the case of the modulation method (A-1) is described with reference to FIG. 36. A basic watermark pattern obtained by performing modulation is embedded in frame images of moving images by reversing the phase as necessary. Since various noises are added to the watermark pattern that is embedded while the watermark embedded moving image is encoded or analog display is captured or the like, signals of the detection subject series obtained from the difference image are changed compared with watermark information that is modulated when embedding. However, by calculating correlation with the spreading series used when embedding, a correlation value of a section corresponding to a bit "1" should become a positive large value, and a correlation value of a section corresponding to a bit "0" should become a minus large value. Accordingly, embedded bit information can be demodulated.

However, as shown in FIG. 37, the phase of the basic watermark pattern is switched to positive phase/reverse phase in a time direction by the watermark pattern switching unit 122. Therefore, for example, considering a difference image obtained from frames of (i) and (ro) shown in FIG. 37, since a reversed phase of the basic watermark pattern is embedded in (i) and an in-phase with the basic watermark pattern is embedded in (ro), a difference image obtained by (ro)-(i) becomes an in-phase, that is, a positive phase with the basic watermark pattern, so that watermark information can be detected correctly. However, depending on timing of capturing, there may be a case of obtaining a frame image from frames of (ha) and (ni). In this case, since (ha) is in phase with the basic watermark pattern and (ni) has the reversed phase of the basic watermark pattern, the difference image becomes reversed phase of the basic watermark pattern. At this time, if watermark detection is performed, since plus/minus of the value of each item of the detection subject series described in FIG. 36 is reversed, a sign of the correlation value is reversed. That is, there may occur a problem in that, even though watermark information "01" is embedded, "10" that is bit reversal of the embedded information is correctly detected.

This embodiment is for avoiding this problem, and the bit reversal determination flag is added to the embedded watermark information as shown in FIG. 38. Accordingly, it can be determined whether bits of detected watermark information are reversed. That is, it can be determined whether the phase of the difference image is the same as that of the basic watermark pattern or is reversed compared with that of the basic watermark pattern. When the bit reversal flag of the detection information is a value indicating the positive phase, bit values are regarded as watermark information as it is. When it is a value indicating the reversed phase, bit values of the detection information are reversed to obtain watermark information. Accordingly, irrespective of how two frames are obtained by capturing, correct watermark information can be always detected. This method can be applied to all of polarity using type modulation methods.

By the way, as to the modulation methods (A-2)-(A-4) and (B-2)-(B-4) described in the first embodiment, since the detection subject series is not formed based on (simple total sum) of pixel values of the difference image, constant watermark information can always be detected irrespective of obtaining methods of the difference image. As to a modulation method of a type like the modulation method (B-1) in which information is not represented by plus/minus of a correlation value but information can be modulated and demodulated based on spreading series with which the information represents a large correlation absolute value, a positive correlation value is obtained when the difference image is the positive phase, and a minus correlation value is obtained when the difference image is the reversed phase, which are similar to (A-1), but, since detection can be always succeeded without problem irrespective whether the difference image is the positive phase or the reverse phase by determining information, by which an absolute value of a correlation value is large, to be a detected symbol, such device is not necessary. Following is a summary.

<Types of Two Dimensional Pattern Modulation and Demodulation>

(1) Pattern amplitude using type: Since a detection subject series is formed based on amplitudes in a pattern in an image, the detection subject series is reversed when the difference image is reversed. (Modulation methods (A-1) and (B-1))

(2) Pattern shape using type: Since the detection subject series is formed based on pattern shapes in an image, the detection subject series is not reversed even when the difference image is reversed. (Modulation methods (A-2)-(A-4), and Modulation methods (B-2)-(B-4)).

<Types of Spread Spectrum Modulation and Demodulation>

(a) Polarity using type: A method representing information with a polarity of positive/minus of a correlation value with spreading series. (Modulation methods (A-1)-(A-4))

(b) Polarity non-using type: A method representing information according to a series, among a plurality of spreading series, by which the maximum absolute correlation value is obtained (Modulation methods (B-1)-(B-4))

A modulation method in which bit values are reversed when the difference image is reversed is one satisfying (1) and (a), that is, only the modulation method (A-1) in the examples.

Fifth Embodiment

In this embodiment, an example is described in which multiple watermark embedding of phase synchronization signals is used without using the phase determination flag that is used in the fourth embodiment.

This embodiment is the same as the first to third embodiments except for parts described below.

Figure 39:
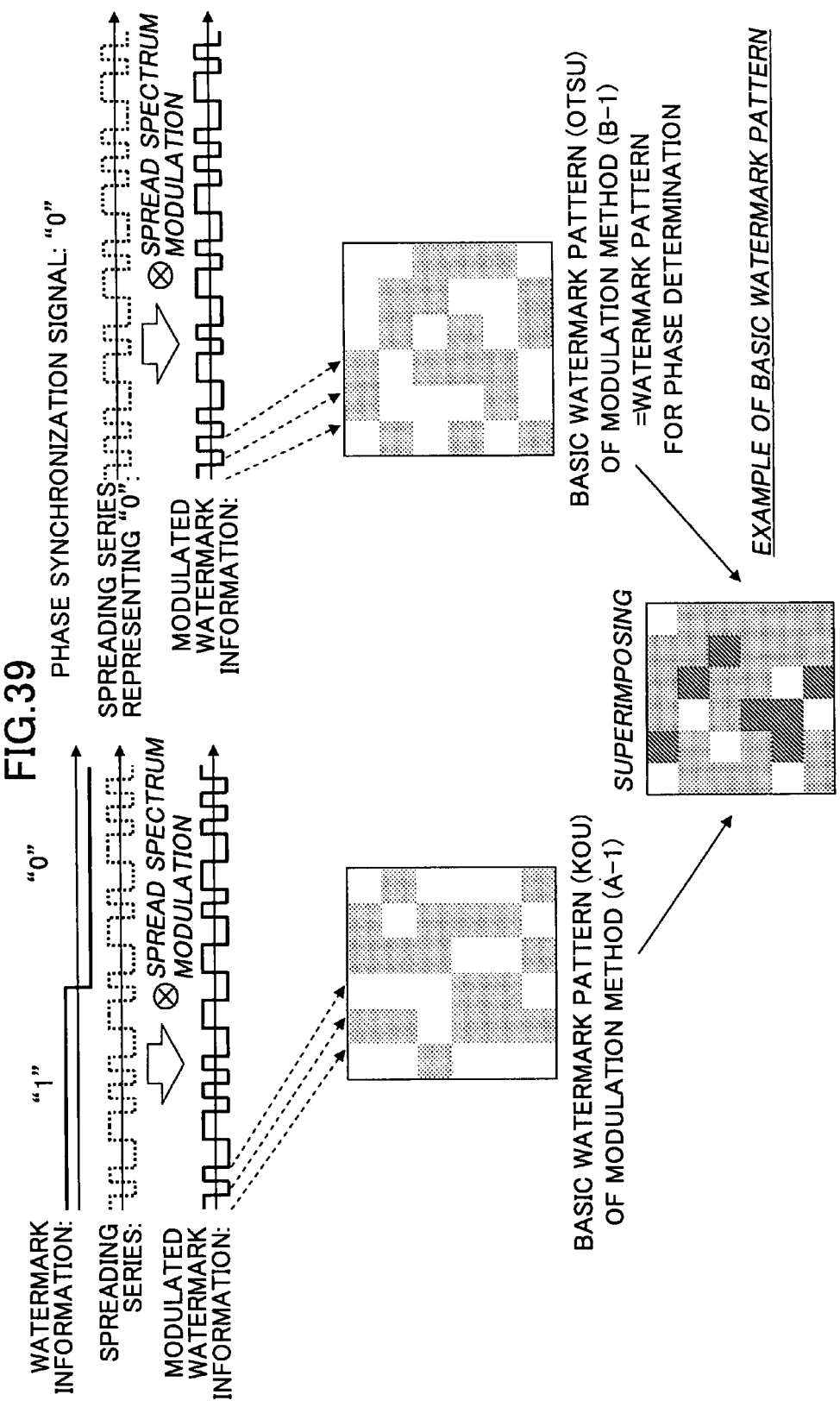
FIG. 39 is a figure for explaining an example of processes of the basic watermark pattern generation unit in the fifth embodiment of the present invention.

FIG. 39 is a figure for explaining an example of processes of the basic watermark pattern generation unit in the fifth embodiment of the present invention. This figure indicates process contents of the basic watermark pattern generation unit 121 of the watermark pattern generation unit 120 in the digital watermark embedding apparatus 100. In the basic watermark pattern generation unit 121 in each of the first to third embodiments modulates only input watermark information to the basic watermark pattern. In this embodiment, not only the input watermark information, but also a phase synchronization signal for specifying a phase of a watermark pattern in a difference image when performing detection is embedded to generate a basic watermark pattern.

In the example shown in FIG. 39, a basic watermark pattern (kou) is obtained using the modulation method (A-1) like the first to third embodiments, and further, a basic watermark pattern (otsu) that is obtained by modulating a phase synchronization signal always taking a value "0" with the modulation method (B-1) is generated as a phase determination watermark pattern, and both of them are multiplexed by superimposition to obtain a basic watermark pattern that is used for embedding.

A process flow of the digital watermark detection unit 240 in the digital watermark detection apparatus in the present embodiment is described.

Figure 40:
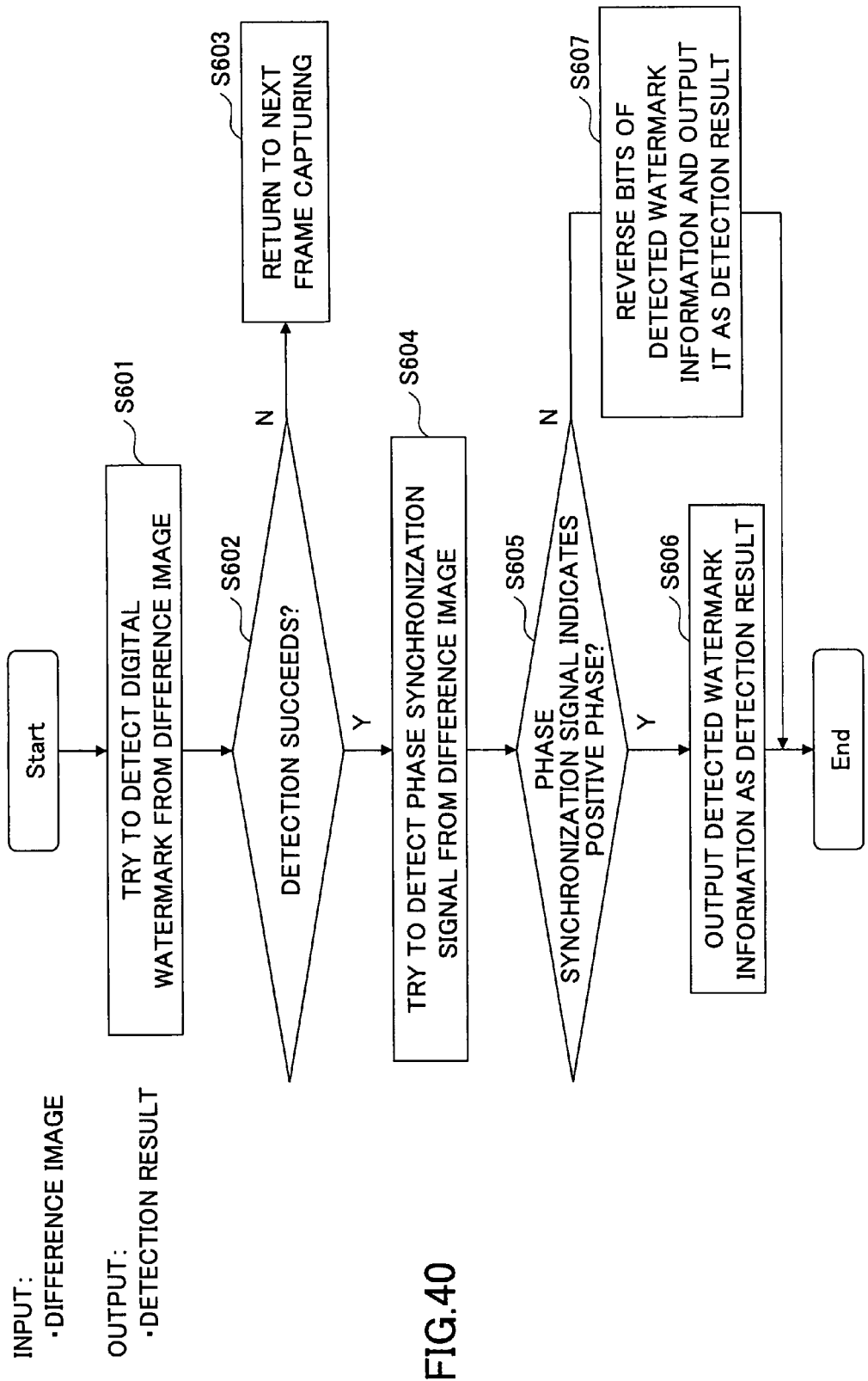
FIG. 40 is a flowchart of operation of the digital watermark detection unit in the fifth embodiment of the present invention.

FIG. 40 shows a flowchart of operation of the digital watermark detection unit in the fifth embodiment of the present invention.

Step 601) The digital watermark detection unit 240 receives the difference image, and tries to detect digital watermark from the difference image like the first to third embodiments.

Step 602) When the digital watermark is not detected, the process goes to step 603. When the digital watermark is detected, the process goes to step 604.

Step 603) The process returns to next frame capturing.

Step 604) When the digital watermark is detected, detection of the phase synchronization signal is tried. Since the phase synchronization signal is embedded with the modulation method (B-1), the phase synchronization signal can be detected if an absolute value of a correlation value with the spreading series representing "0" is large, so that it can be determined whether the watermark pattern in the difference image is in phase or has a reversed phase compared with the basic watermark pattern used when embedding by using polarity of plus/minus of the correlation value.

Step 605) If the correlation value of the phase synchronization signal when it is detected is plus, it is determined that they are in phase, if it is minus, it is determined that they have reversed phases. When it is determined that they are in phase, the process goes to step 606, and when it is determined that they have the reversed phases, the process goes to step 607.

Step 606) When it is determined that they are in phase, the detected watermark information is output as a detection result as it is.

Step 607) When it is determined that they have the reversed phases, bits of the detected watermark information are reversed to output a detection result.

<Effects of the Present Embodiment>

A part of the watermark information is used as the bit reversal determination flag in the fourth embodiment. On the other hand, in the present embodiment, the phase synchronization signal for determining the phase of the watermark pattern in the difference image is multiplexed and embedded with watermark information. At this time, since the phase synchronization signal is embedded using a modulation method that is the pattern amplitude using type and that is the polarity non-using type, the phase of the watermark pattern in the difference image can be determined using polarity when performing detection. Accordingly, correct watermark information can always be detected irrespective of selection methods for selecting two frames obtained by capturing like the fourth embodiment.

In addition, compared with the fourth embodiment, since the bit reversal determination flag is not used, it is not necessary to shorten bit length of the watermark information by one bit. By the way, a pattern shape using type may be used for embedding the phase synchronization signal as long as reversal of the difference image can be specified.

Sixth Embodiment

In this embodiment, an example is described in which it is determined whether the watermark pattern in the difference image is in phase with the basic watermark pattern used when embedding, and the watermark pattern is phase-reversed and stored as necessary.

This embodiment is the same as the first to fifth embodiments except for parts described below. In the following, for simplifying explanation, differences from the first embodiment are described.

Figure 41:
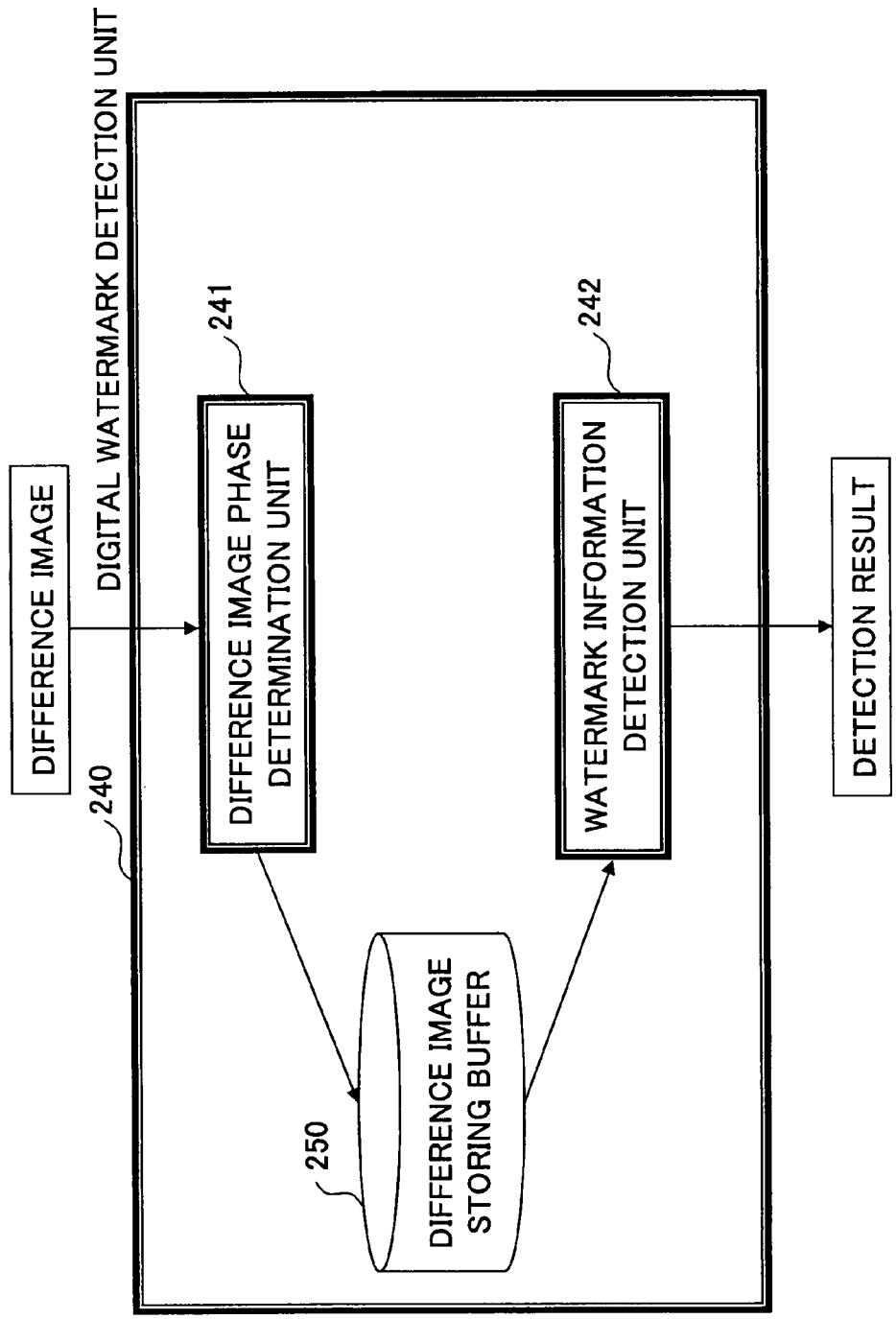
FIG. 41 is a block diagram of the digital watermark detection unit in the sixth embodiment of the present invention.

FIG. 41 shows a configuration of a digital watermark detection unit in the sixth embodiment of the present invention.

The digital watermark detection unit 240 of the digital watermark detection apparatus 200 shown in the figure includes a difference image phase determination unit 241, a watermark information detection unit 242 and a difference image storing buffer 255.

Figure 42:
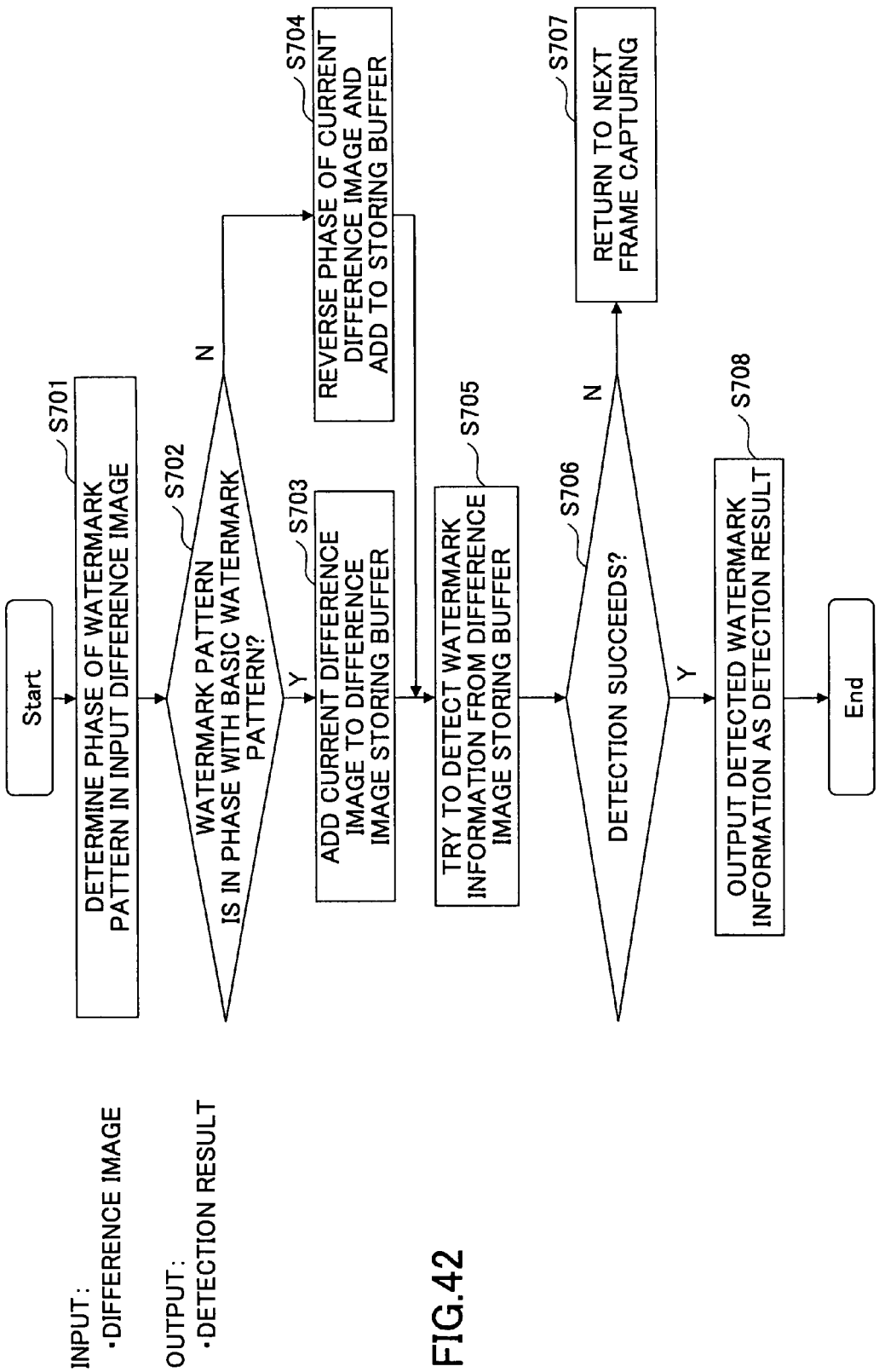
FIG. 42 is a flowchart of operation of the digital watermark detection unit in the sixth embodiment of the present invention.

FIG. 42 is a flowchart of operation of the digital watermark detection unit in the sixth embodiment of the present invention.

Step 701) When the difference image phase determination unit 241 receives a difference image, the difference image phase determination unit 241 determines phase of a watermark pattern in the received difference image.

Step 702) The difference image phase determination unit 241 determines whether the phase of the watermark pattern in the input difference image is the same as or reversed from the phase of the basic watermark pattern used for embedding. When they are in phase, the process goes to step 703. When they are reversed, the process goes to step 704.

Step 703) When they are is in phase, the currently received difference image is added to the difference image storing buffer 255 as it is, and the process goes to step 705.

Step 704) When they have reversed phases, the currently received difference image is phase-reversed and the phase-reversed image is added to the difference image storing buffer 255.

Step 705) Next, the watermark information detection unit 242 tries to detect watermark information from the added difference image stored in the difference image storing buffer 255.

Step 706) When detection succeeds, the process goes to step 708, and when the detection fails, the process goes to step 707.

Step 707) When the detection fails, the process returns to a process for capturing a next frame by the moving image input unit 210.

Step 708) When the detection succeeds, the detection result is output.

Next, the difference image phase determination unit 241 is described.

Figure 43:
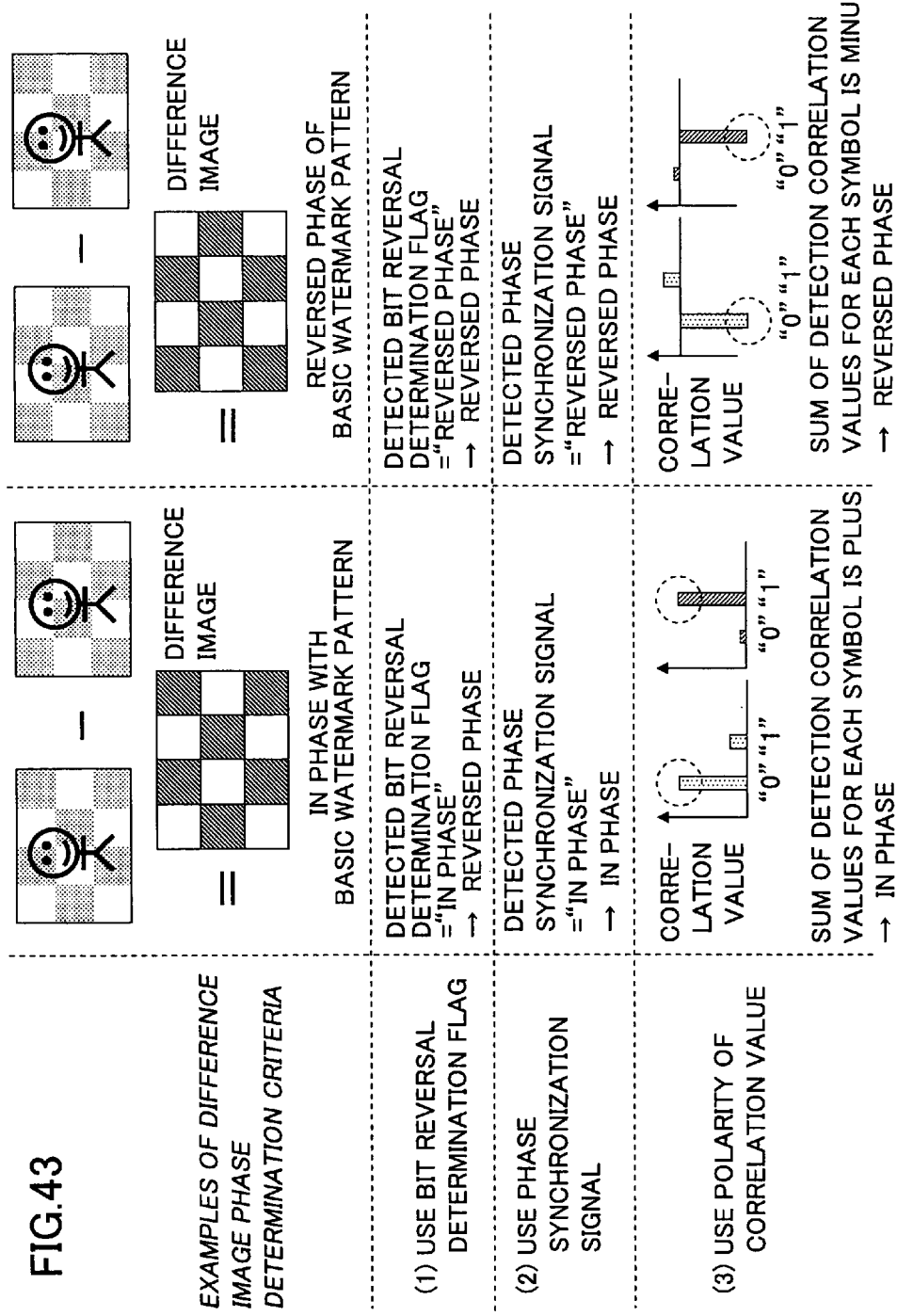
FIG. 43 is a figure for explaining processes of the difference image phase determination unit in the sixth embodiment of the present invention.

FIG. 43 is a figure for explaining processes of the difference image phase determination unit in the sixth embodiment of the present invention.

When the difference image is received, the difference image phase determination unit 241 determines whether the phase of the watermark pattern in the difference image is the same as or reversed from the phase of the basic watermark pattern used when embedding. As determination methods, there may be a method for detecting a bit reversal determination flag described in the fourth embodiment to determine same in-phase/reversed phase using the value, and a method for detecting a phase synchronization signal shown in the fifth embodiment to determine in phase/reversed phase using the value. Alternatively, in a case where the watermark information is modulated using the pattern amplitude using type and the polarity non-using type modulation like the modulation method (B-1) of the first embodiment, it is possible to determine that they are in phase when a total sum of correlation values of the maximum absolute value detected in the detection process for each symbol, and to determine that they have reversed phases when the total sum is minus.

When it is determined that the watermark pattern in the difference image is in phase with the basic watermark pattern used when embedding, the currently received difference image is added to the difference image storing buffer 255 as it is. When it is determined that the phase is reversed, the phase of the currently received difference image is reversed and the reversed image is added to the difference image storing buffer 255. For reversing the phase, minus/plus of pixel values of the whole image may be reversed as to luminance components, for example. Or, if the detection subject region images used for generating the current difference image are X and Y, and if the current difference image is obtained by X–Y, a difference image of Y–X may be used for reversing the phase.

In addition, like the third embodiment, when synchronization of watermark pattern switching timing is realized using the watermark pattern switching information used when embedding, by using a principle that phases of adjacent watermark patterns may be reversed with each other but phases of every other watermark pattern may be the same based on switching timing, for example, the image may be stored while reversing phase every other watermark pattern such that every watermark pattern becomes the same phase when storing difference images.

Figure 44:
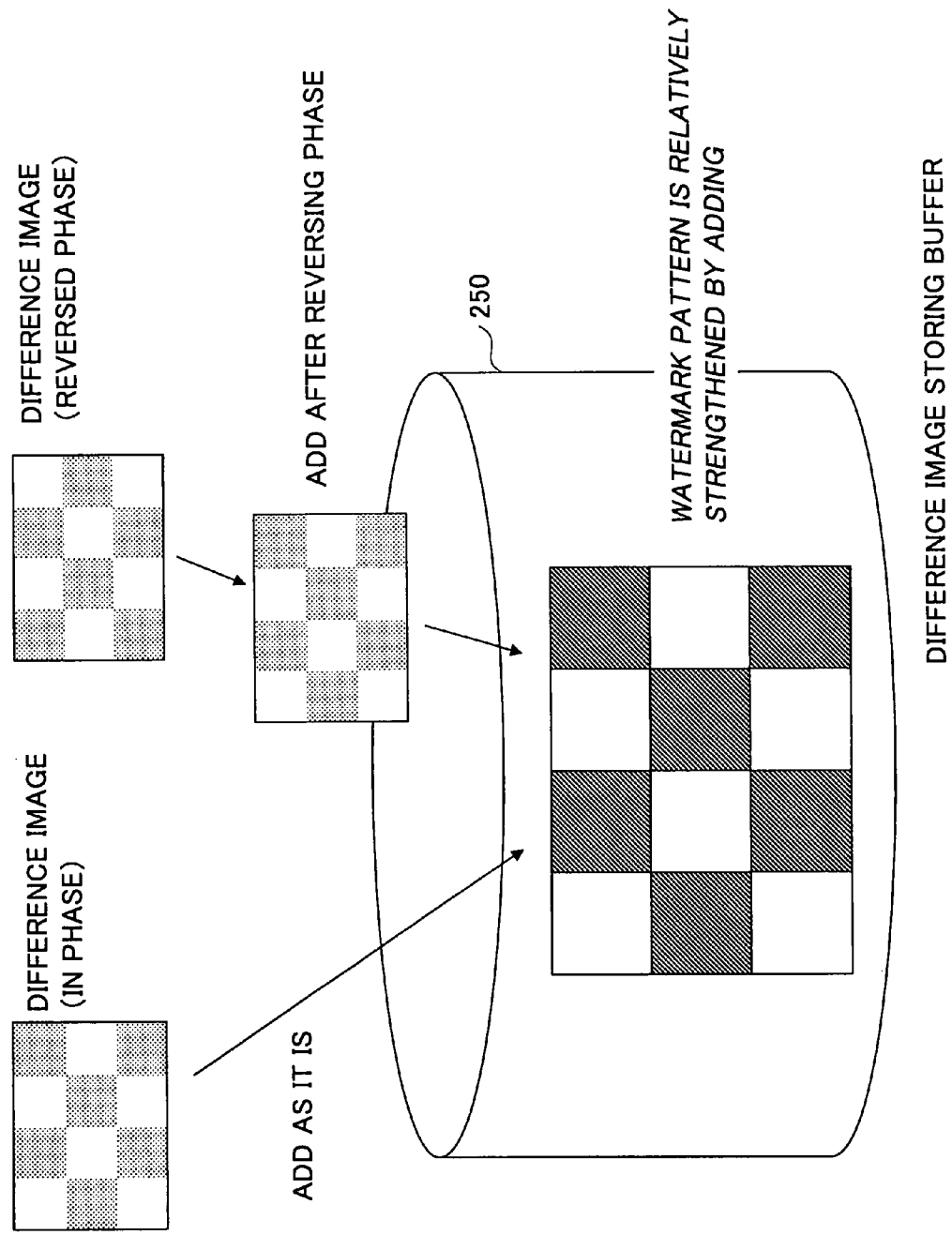
FIG. 44 is a figure for explaining a difference image storing buffer of the sixth embodiment of the present invention.

According to the above-mentioned processes, difference images each having a watermark pattern having a phase the same as the phase of the basic watermark pattern are added sequentially in the difference image storing buffer 255 as shown in FIG. 44. By the way, "add difference image" means obtaining an image, having the same size, by adding pixel values for each point of coordinates of images.

By the way, as to storing using the before-mentioned third embodiment, the result stored in the difference image storing buffer 255 is obtained such that images are added in a state in which phases that are the same or reversed compared with the phase of the basic watermark pattern when embedding are uniformed. By using the contrivance of the fourth embodiment or the fifth embodiment when performing detection from the difference image storing buffer 255, the problem due to the reversed phase can be avoided.

<Effects of the Present Embodiment>

In the present embodiment, it is determined whether the watermark pattern in the difference image is in phase with the basic watermark pattern used when embedding, and the phase is reversed as necessary so that the image is sequentially added in the difference image storing buffer 255 always in a state of a positive phase and detection of watermark information is tried from the added difference image.

Accordingly, even when a watermark pattern in a difference image is weak so that the watermark pattern cannot be sufficiently detected, since a plurality of difference images are integrated and detection is performed, detection can be performed. As shown in FIG. 44, since the watermark pattern is added always in a form of the positive phase, a watermark pattern that is amplified by the number of times the images are added can be obtained in the difference image storing buffer 255 in principle. However, generally, since each difference of the original moving images is different for each timing, a difference signal of the original moving images that is noise for the watermark pattern is not amplified by the number of added times. Accordingly, S/N ratio of the watermark signal improves, and tolerance of the digital watermark improves compared with the first to fifth embodiments.

In addition, this tolerance improvement can be used for suppressing image quality deterioration. That is, watermark can be detected by the difference image storing method even though the watermark embedding strength is weaker than the strength for enabling detection from one difference image like the first to fifth embodiment. Therefore, image quality improvement can be realized.

Seventh Embodiment

In this embodiment, a method is described in which detection can be successfully performed even when sufficient detection performance is not obtained from one difference image.

This embodiment is the same as the first to sixth embodiments except for parts described below. In the following, for simplifying explanation, differences from the first embodiment is described.

Figure 45:
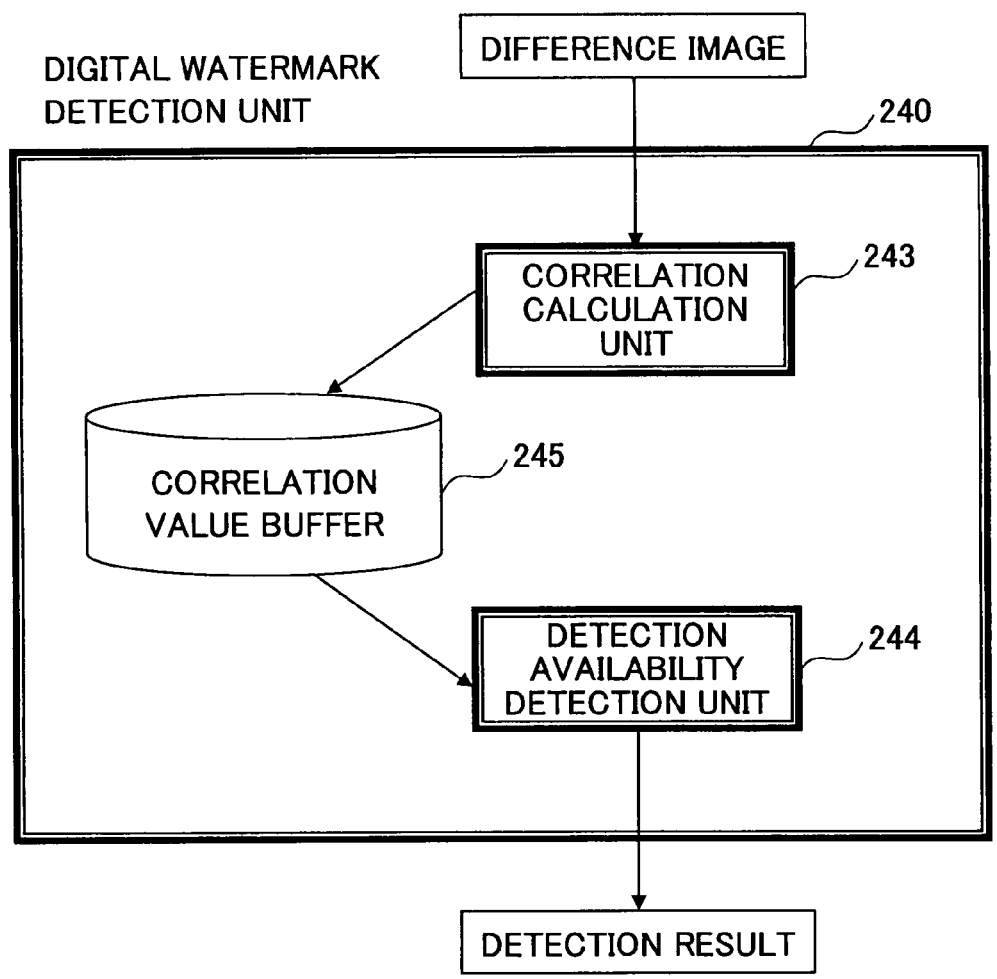
FIG. 45 is a block diagram of the digital watermark detection unit in the seventh embodiment of the present invention.

FIG. 45 shows a configuration of the digital watermark detection unit in the seventh embodiment of the present invention.

The digital watermark detection unit of the digital watermark detection apparatus 200 shown in the figure includes a correlation calculation unit 243, a detection necessity determination unit 244 and a correlation value buffer 245.

Figure 46:
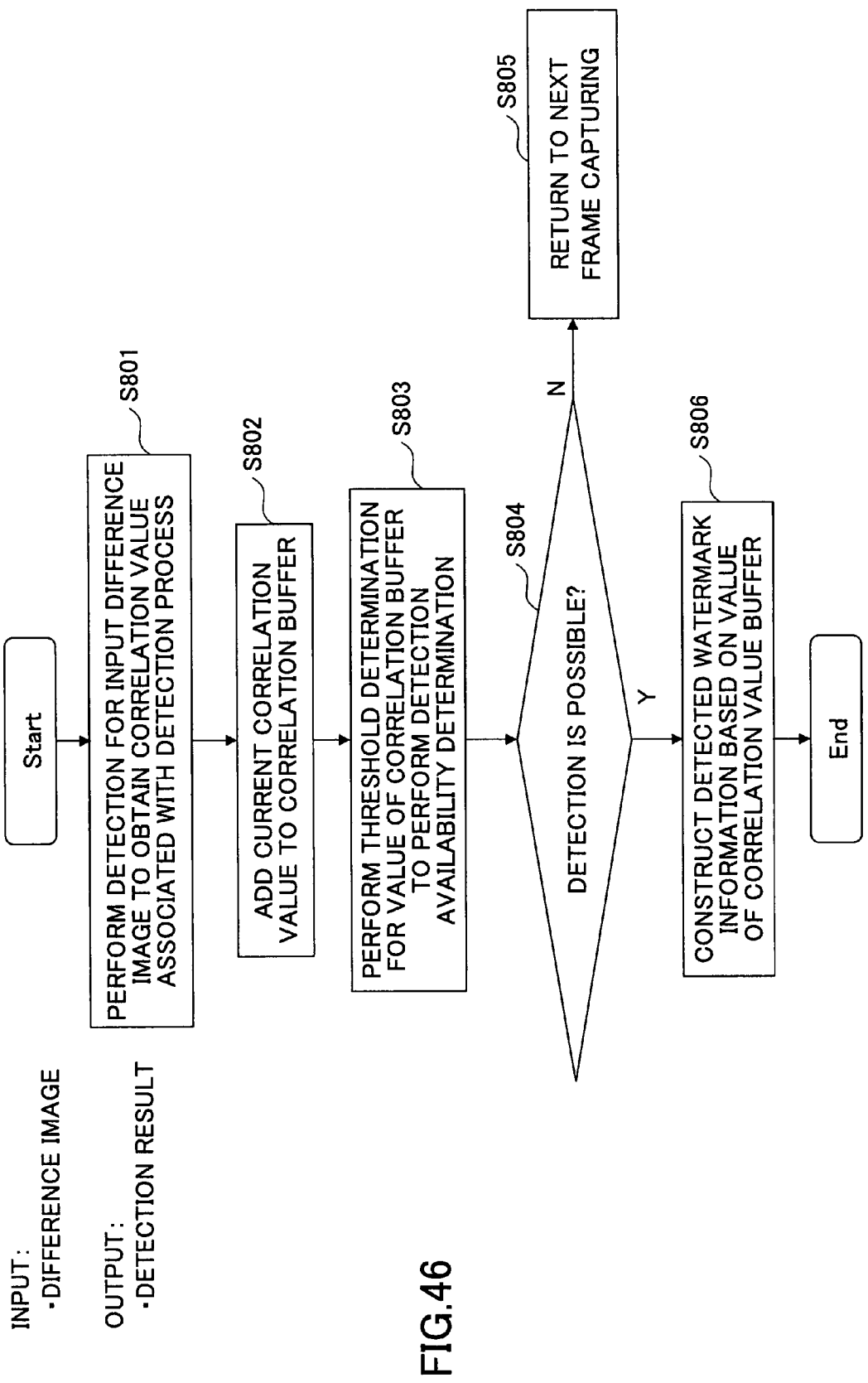
FIG. 46 is a flowchart of operation of the digital watermark detection unit in the seventh embodiment of the present invention.

FIG. 46 shows a flowchart of operation of the digital watermark detection unit in the seventh embodiment of the present invention.

Step 801) The digital watermark detection unit 240 receives a difference image, and obtains detection subject series from the difference image in the same way as a normal digital watermark detection process by the correlation calculation unit 243 so as to obtain correlation values between the detection subject series and spreading series. By the way, at this time, if watermark information is successfully detected only from the received difference image, the digital watermark detection unit 240 may output the watermark information as a detection result and terminate the process. As to the correlation value, values the number of which is the same as bits of the watermark information are obtained when using a bit-by-bit spreading scheme like the modulation methods (A-1)-(A-4), and values whose range is the same as that of number of symbols X symbol values are obtained when using a symbol-by-symbol spreading scheme like the modulation methods (B-1)-(B-4).

Step 802) The correlation value group obtained by the correlation calculation unit 243 is added in the correlation value buffer 245 for each term.

Step 803) Next, the detection availability determination unit 244 performs threshold-determination for the correlation value group stored in the correlation value buffer 245 to determine availability for detecting watermark information.

Step 804) When the watermark information is detected, the process goes to step 806, and when the watermark is not detected, the process goes to step 805.

Step 805) When the watermark information is not detected, the process returns to next frame capturing by the moving image input unit 210.

Step 806) If threshold-determination is passed, it is regarded that detection succeeds, so that detected watermark information is formed based on contents in the correlation value buffer 245 to output a detection result.

Next, processes on the correlation value buffer 245 are described.

Figure 47:
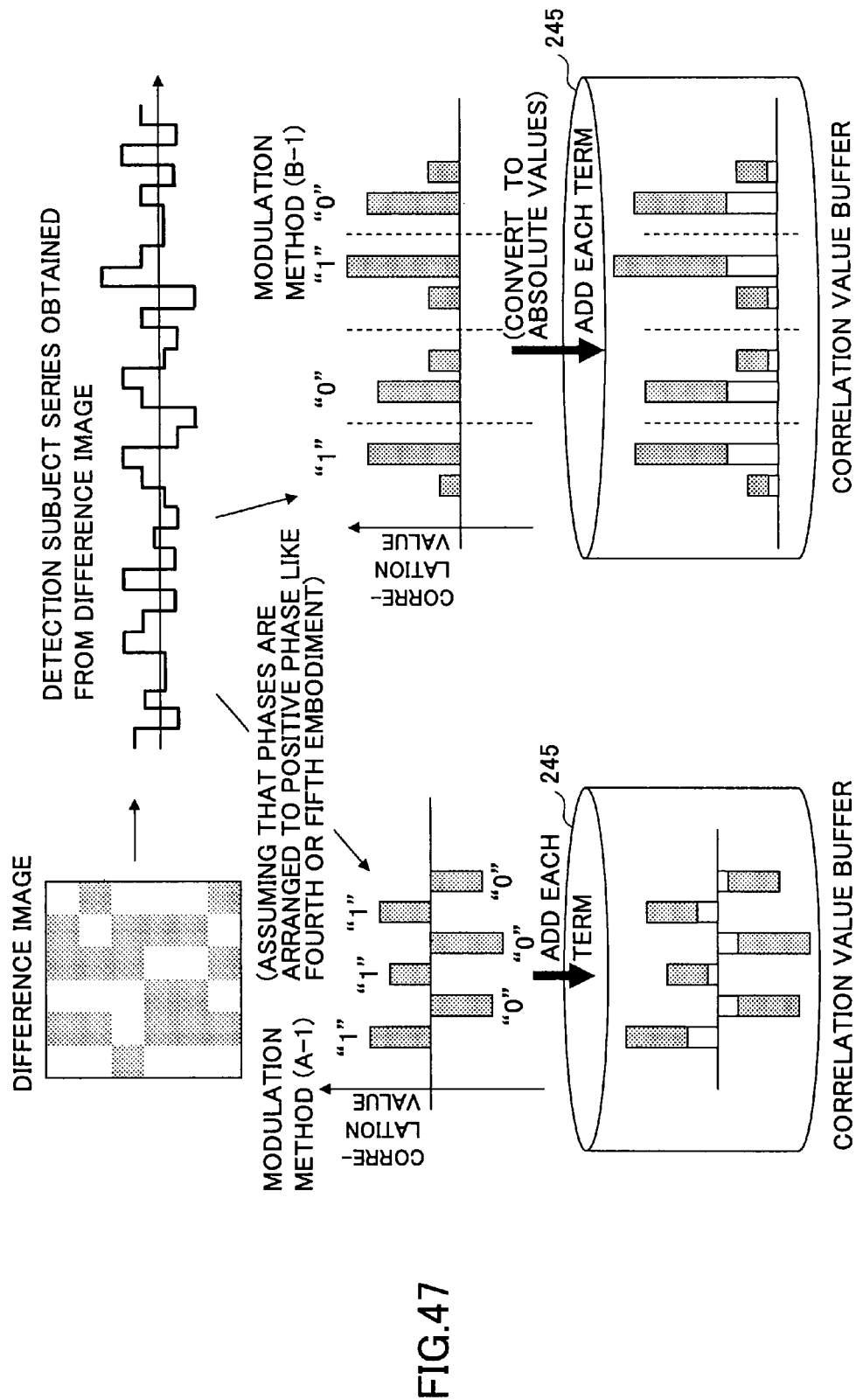
FIG. 47 is a figure for explaining contents of processes on the correlation value buffer in the seventh embodiment of the present invention.

FIG. 47 is a figure for explaining contents of processes on the correlation value buffer in the seventh embodiment of the present invention.

The correlation calculation unit 243 obtains the detection subject series from the difference image to calculate correlation between the detection subject series and spreading series used for modulation. When using the bit-by-bit spreading scheme like the modulation methods (A-1)-(A-4), values the number of which is the same as bits of the watermark information are obtained, when using the symbol-by symbol spreading scheme like the modulation methods (B-1)-(B-4), values whose range is the same as that of the number of symbols X symbol values are obtained (FIG. 47 shows an example in which 1 symbol equals to 1 bit and there are four symbols each taking two values "0" or "1".)

As to a method like the modulation method (A-1) in which bits may be reversed according to a phase of the difference, correlation is calculated after aligning phases using the method described in the fourth embodiment or the fifth embodiment. In addition, in a case of modulation methods (B-1)-(B-4), when the phase of the difference is reversed, an absolute value of the correlation value is calculated since the correlation value becomes minus when the phase of the difference is reversed. The correlation value group obtained by the correlation calculation unit 243 is added in the correlation value buffer 245 for each term of each correlation value.

In addition, like the third embodiment, in a case where synchronization of watermark pattern switching timing can be performed using watermark pattern switching information used when embedding, by using a principle that switching between adjacent watermark patterns forms reversed phases with each other but switching for every other pattern forms same phases, for example, polarity of the correlation values can be always alighted by reversing the polarity of the correlation value for every other image and the image is added and stored.

Figure 48B:
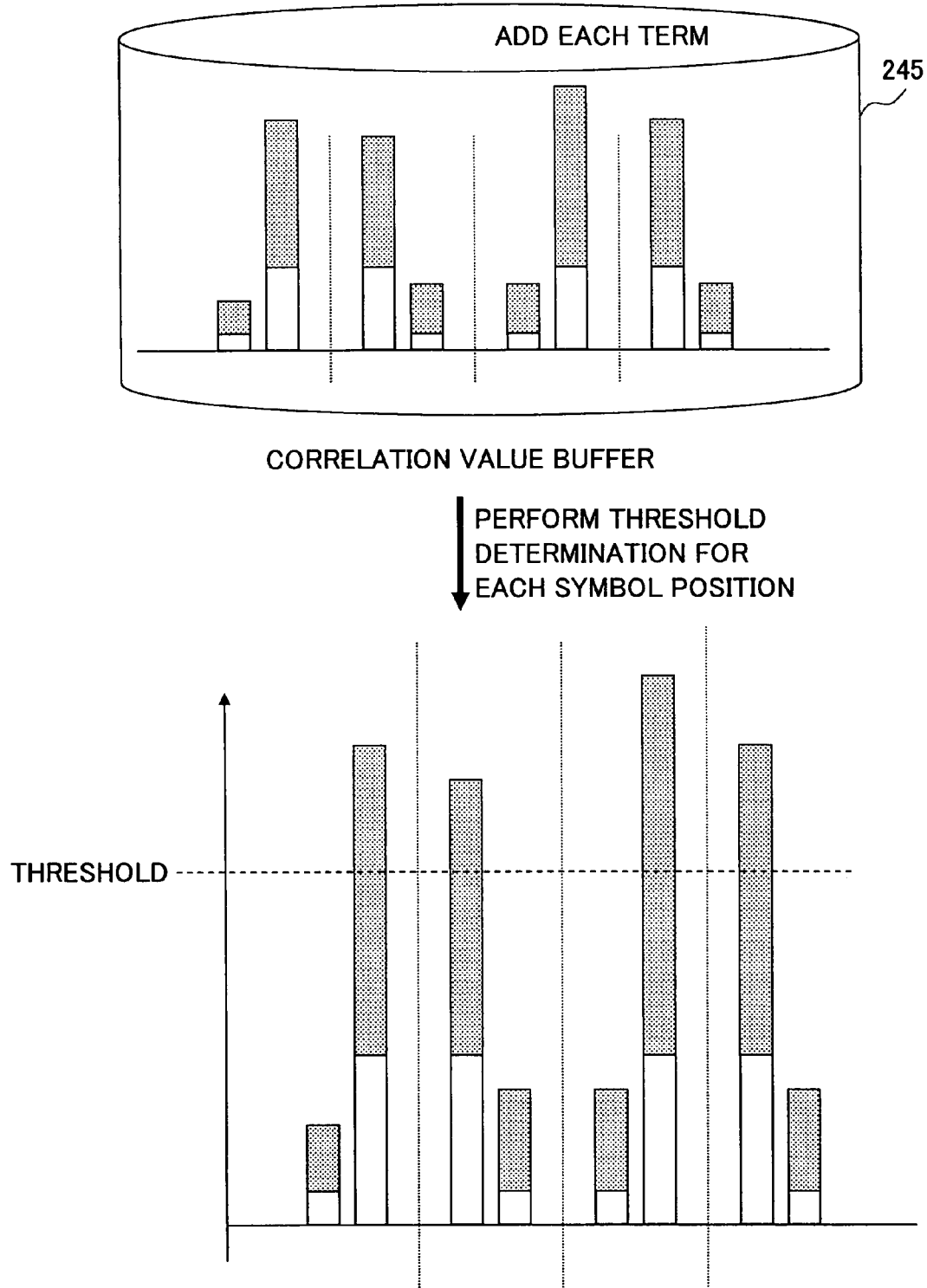
FIG. 48B is a figure for explaining contents of processes on the detection availability determination unit in the seventh embodiment of the present invention.

FIGS. 48A and 48B are figures for explaining contents of processes on the correlation value buffer in the seventh embodiment of the present invention.

The detection availability determination unit 244 performs threshold determination for the correlation values stored in the correlation buffer 245 to determine whether detection succeeds. For the case of the bit-by-bit spreading scheme like the modulation methods (A-1)-(A-4), it may be determined that detection succeeds if all of absolute values of correlation values for each bit position are equal to or greater than a threshold. Or, threshold determination may be performed for a result of calculating sum of absolute values of correlation values for each bit position as shown in FIGS. 48A and 48B. In addition, as to the symbol-by-symbol spreading scheme like the modulation methods (B-1)-(B-4), it is determined that detection succeeds if all of maximum values of correlation values of each symbol position are equal to or greater than a threshold, for example. By the way, the threshold value may be changed according to the number of times of addition to the correlation value storing buffer 245, or each term value in the correlation value storing buffer 245 may be divided by the number of times of addition before performing the threshold determination as necessary.

By the way, as to a storing method using the third embodiment, the problem due to polarity reversal can be avoided by using the contrivance in the fourth or fifth embodiment for the result stored in the correlation value buffer 245.

<Effects of the Present Embodiment>

In this embodiment, detection success and failure is determined based on the result obtained by adding and storing correlation values calculated when performing detection from the difference image. Accordingly, even when detection is difficult by performing detection trial once, detection can be realized by integrating detection results from a plurality of difference images so that detection performance improves.

Eighth Embodiment

This embodiment is the same as the first to seventh embodiments except for parts described below. In the following, for simplifying explanation, differences from the first embodiment are described.

Figure 49:
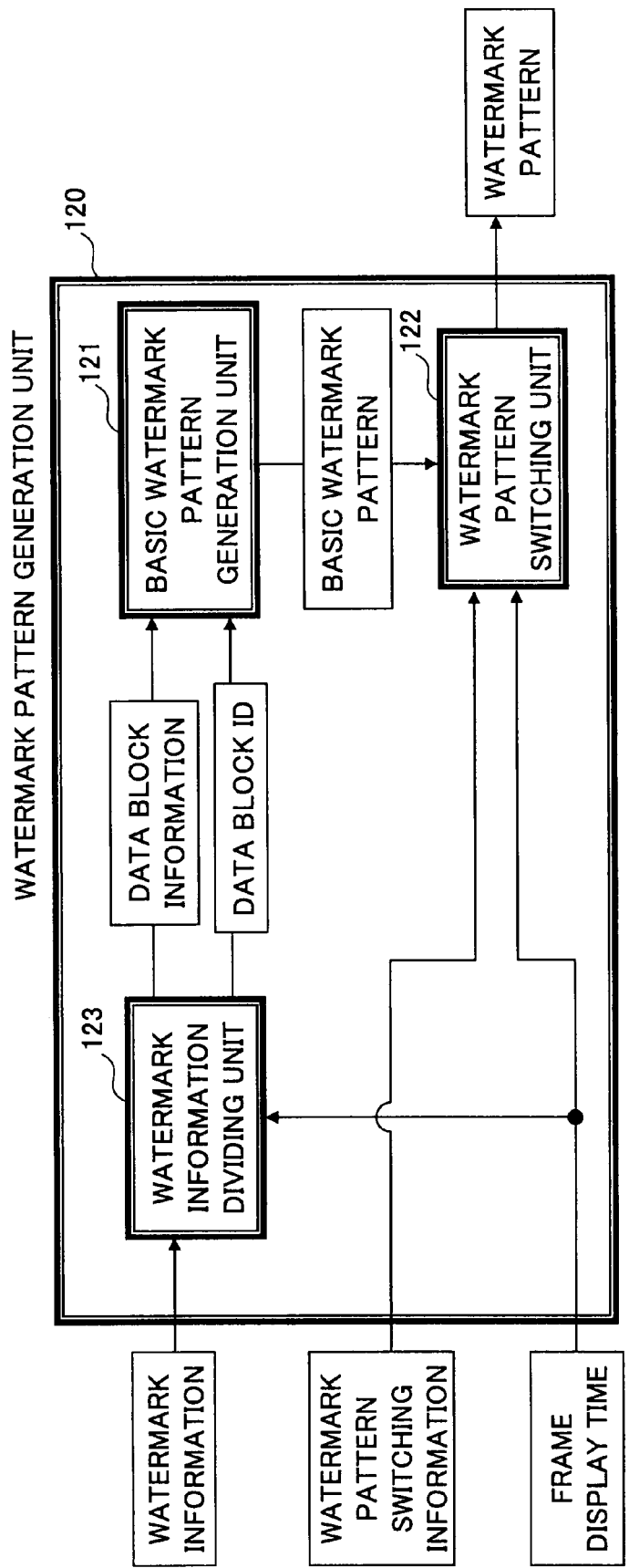
FIG. 49 is a block diagram of the watermark pattern generation unit in the eighth embodiment of the present invention.

FIG. 49 shows a configuration of the watermark pattern generation unit in the eighth embodiment of the present invention. The watermark pattern generation unit 120 of the digital watermark apparatus 100 shown in the figure includes the basic watermark pattern generation unit 121, the watermark pattern switching unit 122 and a watermark information dividing unit 123.

Figure 50:
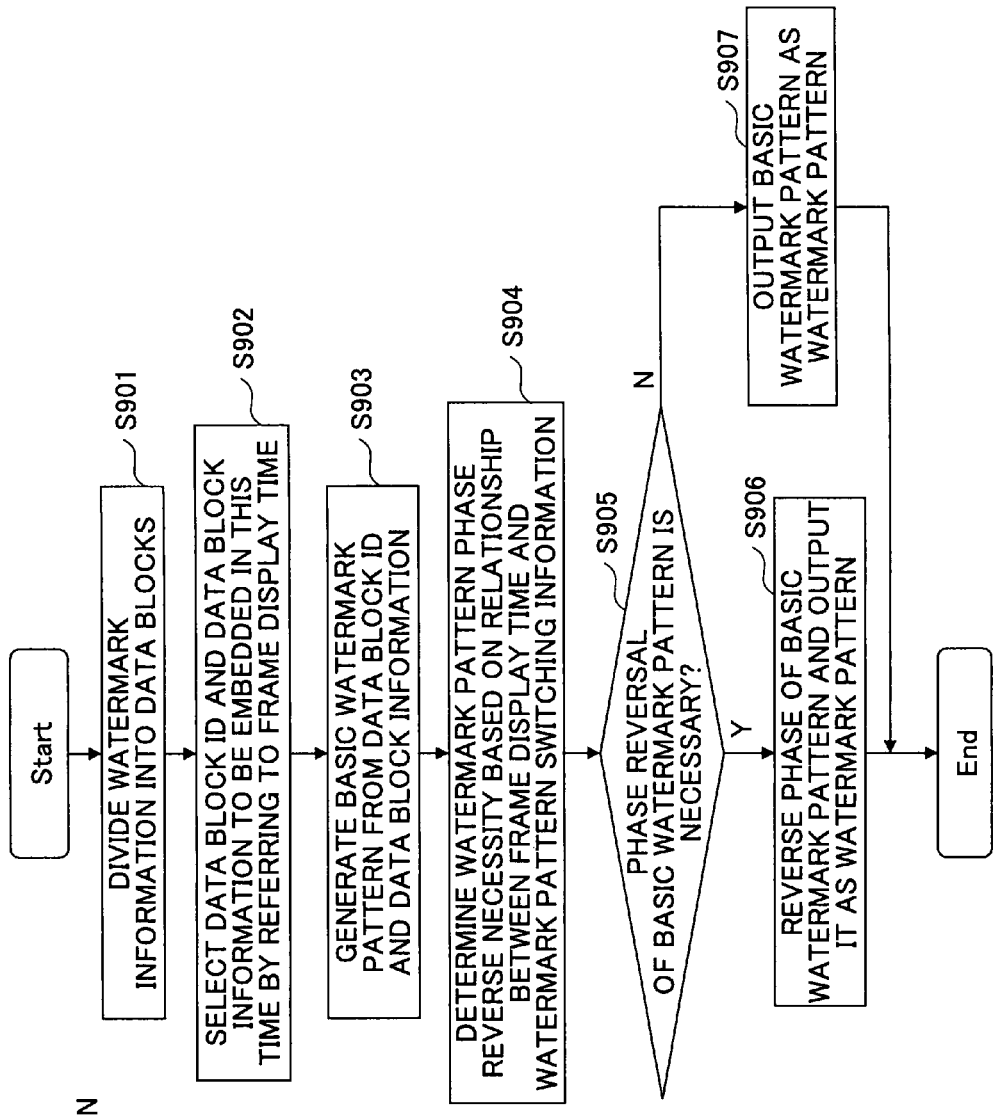
FIG. 50 is a flowchart of operation of the watermark pattern generation unit in the eighth embodiment of the present invention.

FIG. 50 shows a flowchart of operation of the watermark pattern generation unit in the eighth embodiment of the present invention.

Step 901) When the watermark pattern generation unit 120 receives watermark information, watermark pattern switching information, and a frame display time, the watermark information dividing unit 123 subdivides the watermark information into data block information that are bit information shorter than the watermark information.

Step 902) The watermark information dividing unit 123 refers to the frame display time so as to send, to the basic watermark pattern generation unit 121, a data block ID indicating what number a data block to be embedded in the current frame image is and data block information that is bit information of the data block corresponding to the data block ID.

Step 903) The basic watermark pattern generation unit 121 generates a basic watermark pattern from the data block ID and the data block information.

Step 904) Finally, the watermark pattern switching unit 122 determines necessarily of reversing the phase of the basic watermark pattern based on relationship between the frame display time and the watermark pattern switching information.

Step 905) When it is necessary to reverse the phase of the basic watermark pattern, the process goes to step 906, and when it is not necessary, the process goes to step 907.

Step 906) When it is necessary to reverse the phase, the phase of the basic watermark pattern is changed so that the phase changed pattern is output as a watermark pattern, and the process is terminated.

Step 907) The basic watermark pattern is output and the process is terminated.

Next, the watermark information dividing unit 123 is described in detail.

FIG. 51 is a figure for explaining processes of the watermark information dividing unit in the eighth embodiment of the present invention.

In the example shown in the figure, it is assumed that the watermark switching information indicates "reverse every $\frac{1}{10}$ second", the frame rate of the original moving image data is 30 frames per second, and that the watermark information is 16 bits. The watermark information dividing unit 123 divides the watermark information into data blocks each having a predetermined bit length. In the example shown in FIG. 51, watermark information of 16 bits is divided into four four-bit data blocks.

In addition, data block IDs (a, b, c and d in FIG. 51) each indicating what number the data block is are simultaneously obtained. Then, the watermark information dividing unit 123 selects a data block to be embedded into the current frame, and sends selected data block information and the data block ID to the basic watermark pattern generation unit 121. The example of FIG. 51 shows contents of process that is "switch data block at intervals of one period of watermark pattern reversal ($\frac{6}{30}$ seconds)", and the data block is switched every 6 frames in the example.

By the way, when the data block reaches the last data block, the process returns to the top so as to perform selection cyclically. In addition, when the last data block is selected, also termination information indicating termination of the watermark information may be sent to the basic watermark pattern generation unit 121.

Although FIG. 51 shows an example for sequentially switching the data block every one period of watermark pattern reversal, various variations can be adopted such as switching every three reversal periods, every data block switching period other than the reversal period, or selecting randomly instead of sequentially switching data block.

Next, the basic watermark pattern generation unit 121 is described.

Figure 52A:
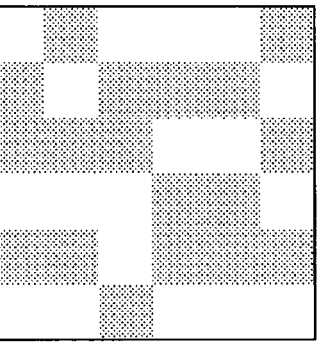
FIG. 52A is a figure for explaining processes of the basic watermark pattern generation unit in the eighth embodiment of the present invention.
Figure 52B:
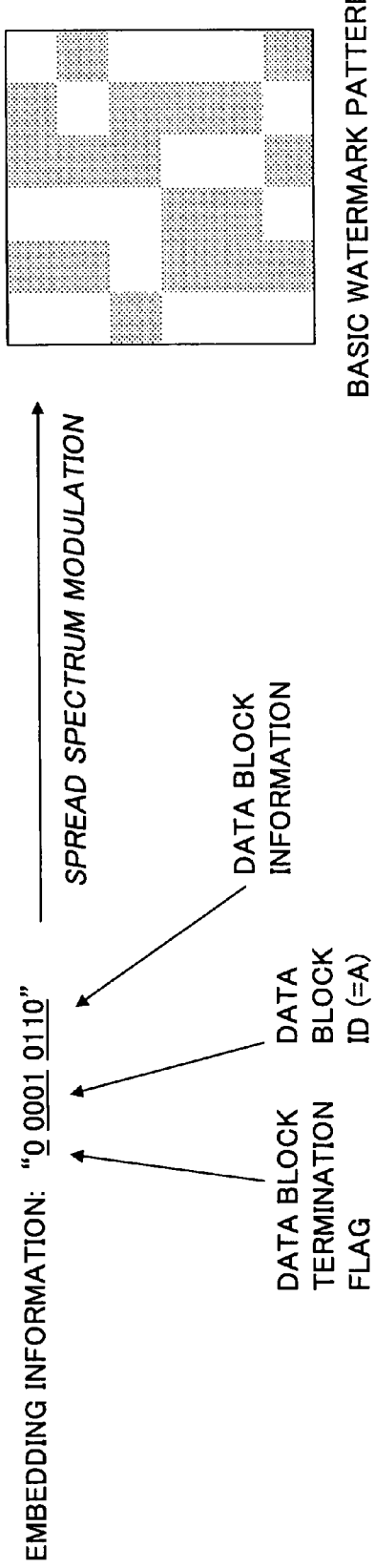
FIG. 52B is a figure for explaining processes of the basic watermark pattern generation unit in the eighth embodiment of the present invention.

FIGS. 52A and 52B are figures for explaining processes of the basic watermark pattern generation unit in the eighth embodiment of the present invention.

Different from the first to sixth embodiments, the basic watermark pattern generation unit 121 generates a basic watermark pattern by modulating, instead of watermark information itself, the data block obtained by dividing the watermark information and the data block ID indicating order of the data block.

When receiving termination information indicating the last data block from the watermark information dividing unit 123, the basic watermark pattern generation unit 121 may add "1" such that termination of data block can be detected when performing detection, but it is not necessary when always using fixed number of data blocks, for example, using only 4 data blocks.

In addition, like the fourth to sixth embodiments, information embedding may be performed simultaneously for determining the phase of the difference image when performing detection.

FIG. 53 shows a configuration of the digital watermark detection apparatus in the eighth embodiment of the present invention.

A difference between the digital watermark detection apparatus 200D shown in the figure and the apparatus 200A in the first embodiment is processes performed after the digital watermark detection unit 240.

Figure 54:
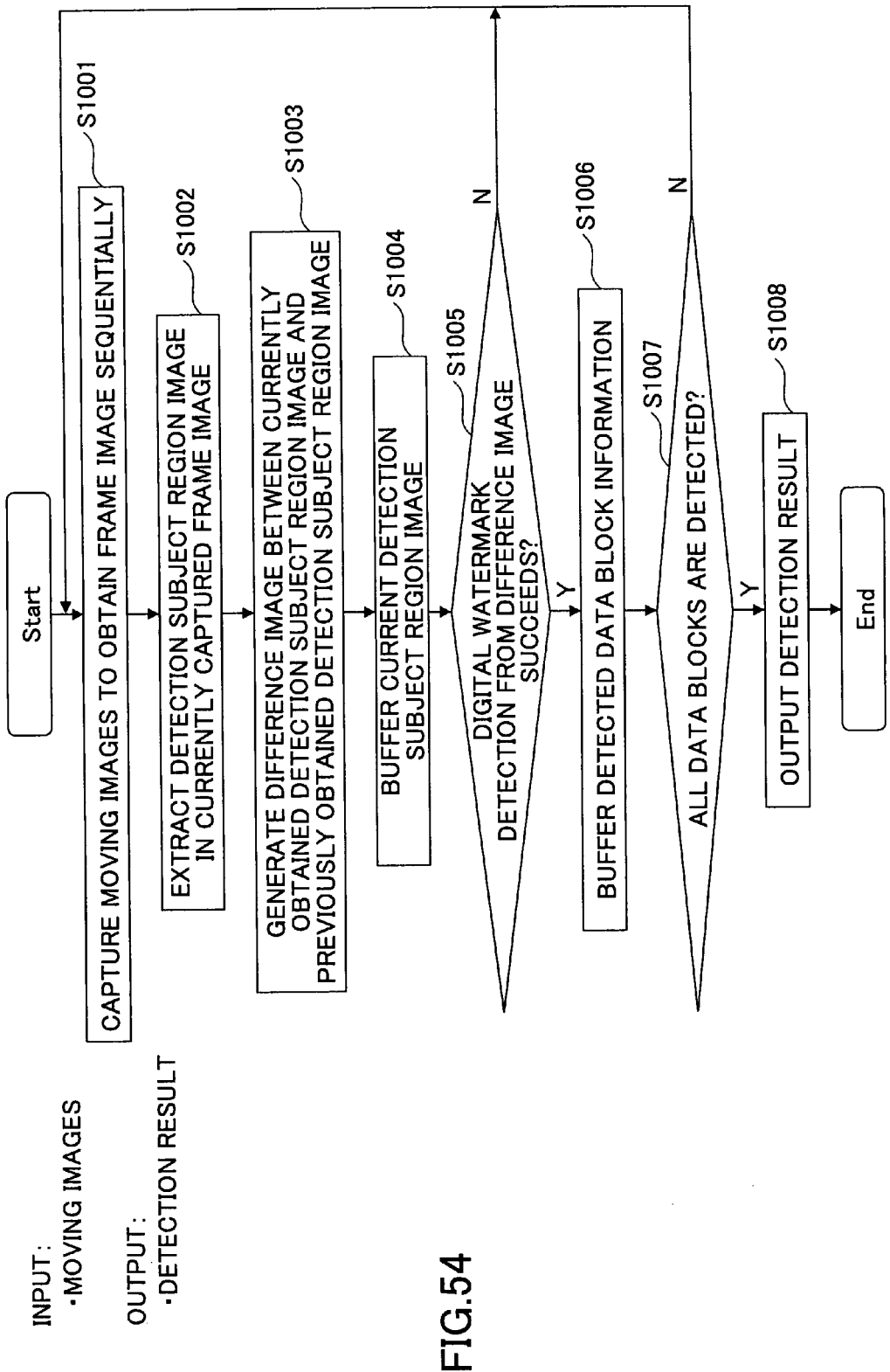
FIG. 54 is a flowchart of operation of the digital watermark detection apparatus in the eighth embodiment of the present invention.

FIG. 54 shows a flowchart of operation of the digital watermark detection apparatus in the eighth embodiment of the present invention.

Step 1001) The moving image input unit 210 sequentially obtains a frame image by capturing the moving images.

Step 1002) A detection subject region extraction unit 220 extracts a detection subject region image in a captured frame image.

Step 1003) The difference image generation unit 230 generates a difference image between a currently obtained detection subject region image and a previously obtained detection subject region image.

Step 1004) The digital watermark detection unit 240 tries to detect embedded information by performing digital watermark detection trial from the difference image in the same way as the first embodiment.

Step 1005) When detection succeeds, the process goes to step 1006. When detection does not succeed, the process goes to step 1001.

Step 1006) Different from the first embodiment, when detection succeeds, since the detected information is not the watermark information but is data block information that is a part of the watermark information and a corresponding data block ID, these pieces of information are sent to the detection data block storing unit 280. The detection data block storing unit 280 sets a data value of a detected watermark information buffer at a position indicated by the currently detected data block ID to be the value of the detected data block information.

Step 1007) When all data blocks in the detected watermark information buffer are successfully detected, the process goes to step 1008. When the digital watermark detection unit 240 fails digital watermark detection from the difference image, or when there remains a data block that is not yet buffered in the detected data block storing unit 280, the process returns to capturing in the moving image input unit 210 to continue the detection process.

Step 1008) The value in the detected watermark information is regarded as detected watermark information and the detection result is output.

Figure 55:
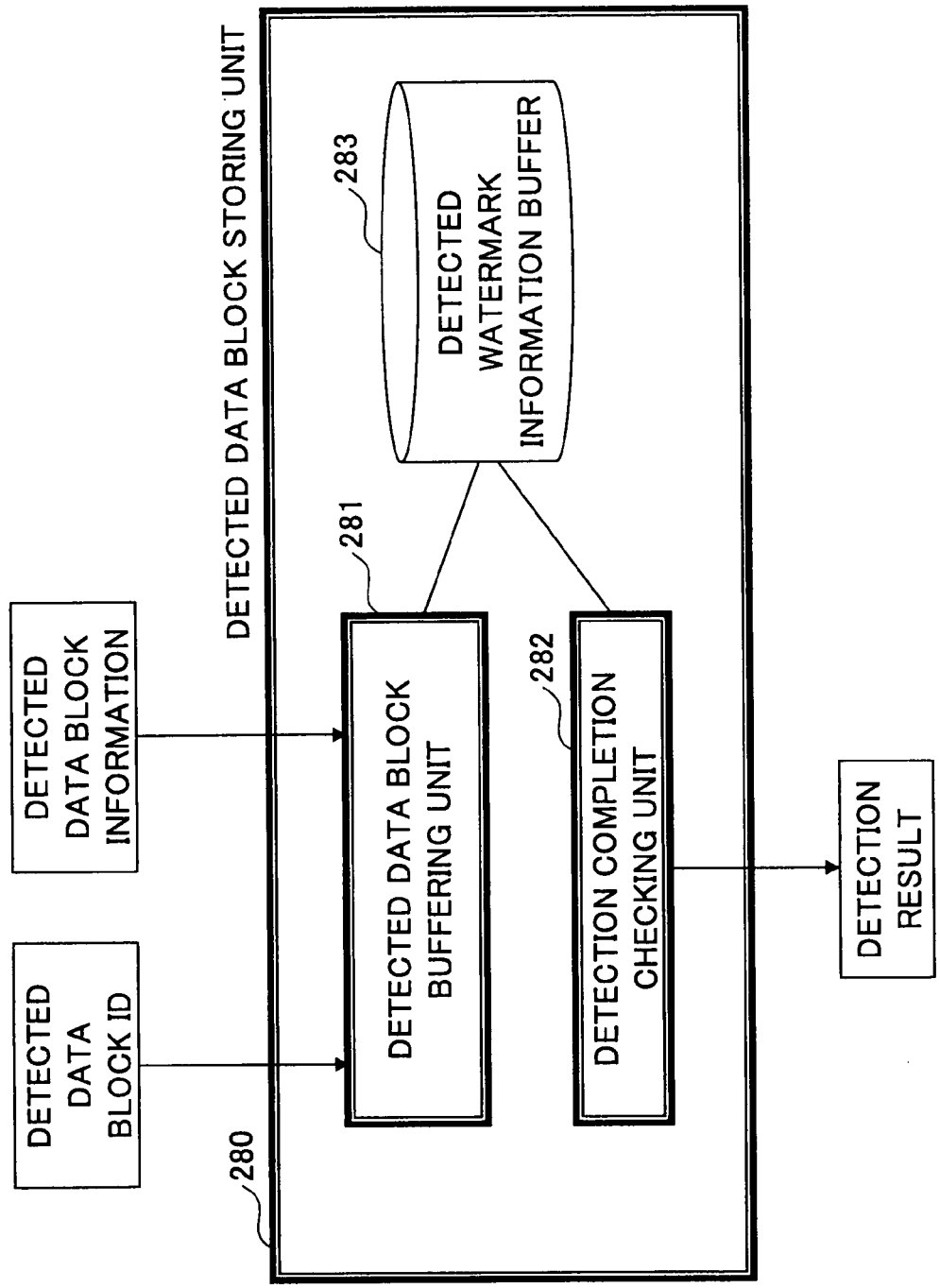
FIG. 55 is a block diagram of the detected data block storing unit in the eighth embodiment of the present invention.

FIG. 55 shows a configuration of the detected data block storing unit in the eighth embodiment of the present invention. The detected data block storing unit 280 shown in the figure includes a detected data block buffering unit 281, a detection complete check unit 282 and a detected watermark information buffer 283.

Operation of the detected data block storing unit 280 is described.

Figure 56:
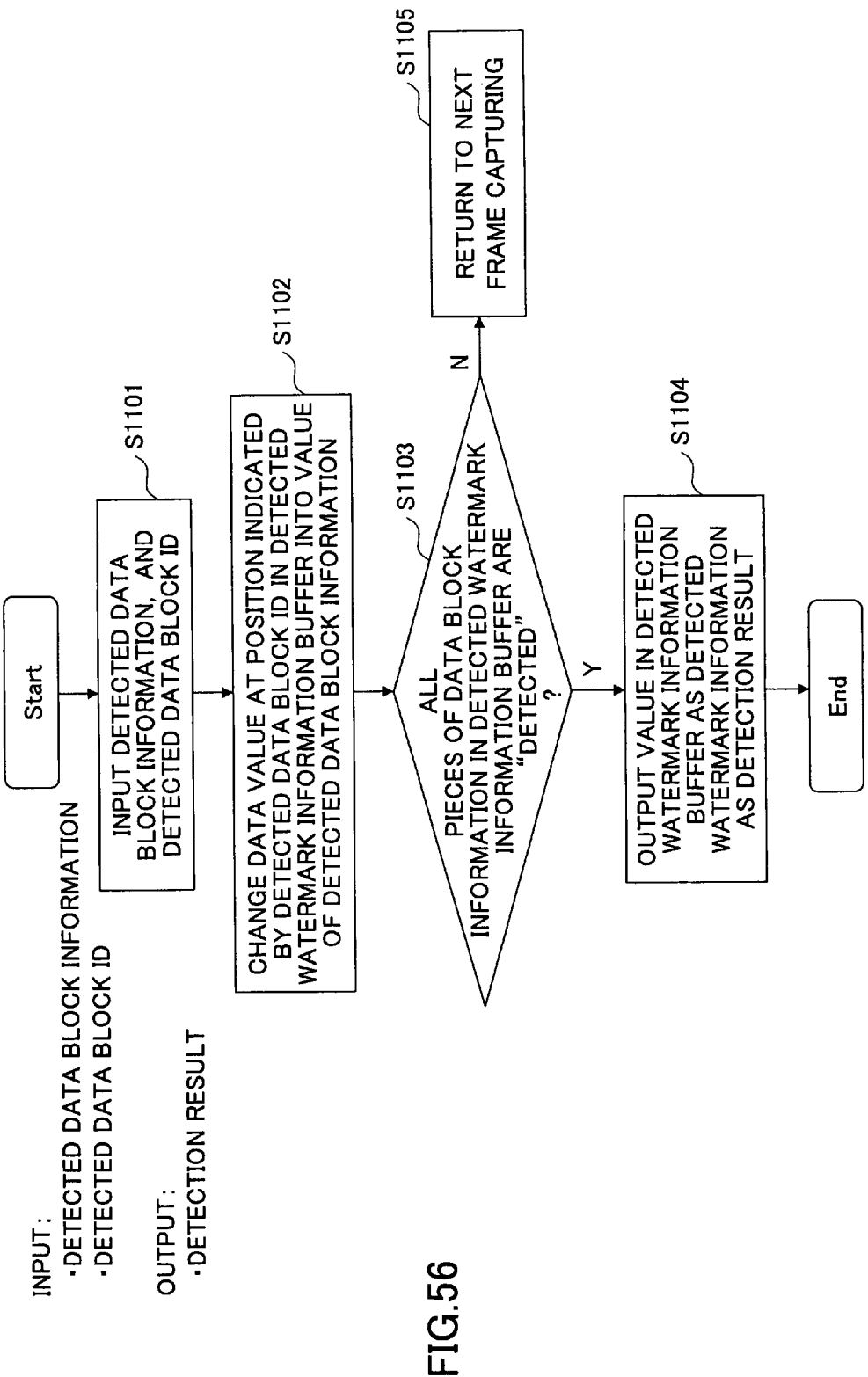
FIG. 56 is a flowchart of operation of the detected data block storing unit in the eight embodiment of the present invention.
Figure 57:
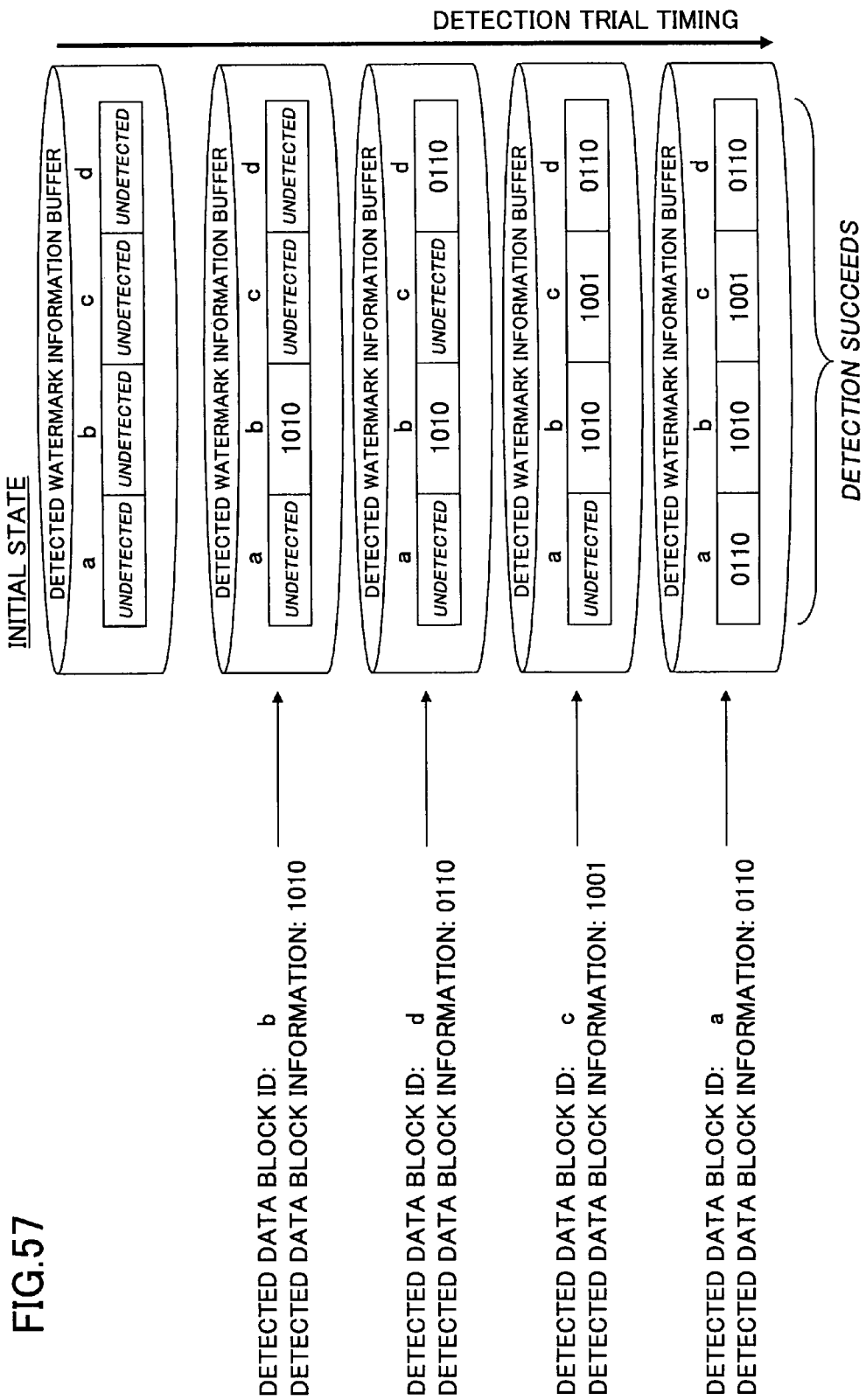
FIG. 57 is a figure (1) for explaining processes of the detected data block storing unit in the eight embodiment of the present invention.
Figure 58:
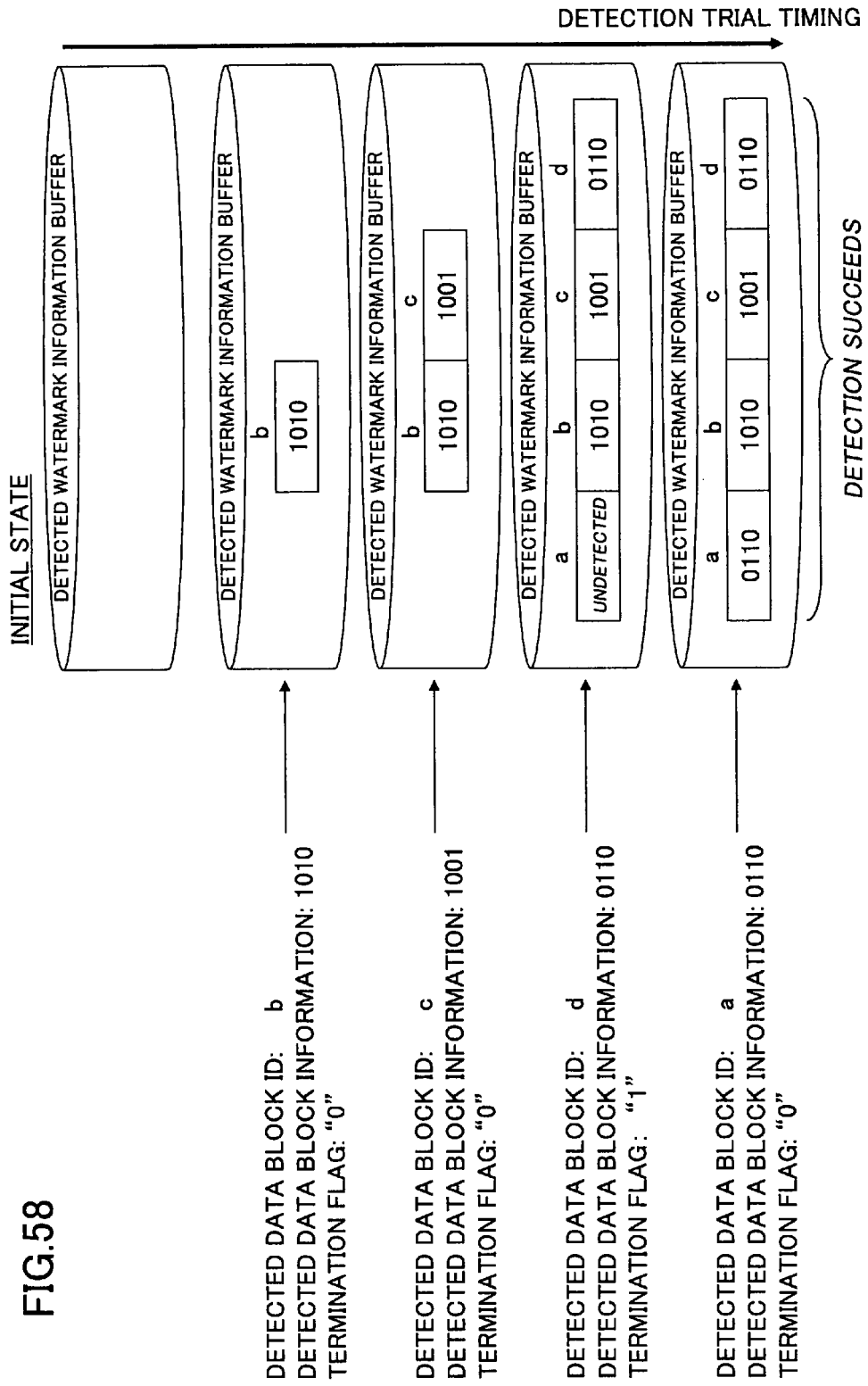
FIG. 58 is a figure (2) for explaining processes of the detected data block storing unit in the eight embodiment of the present invention.

FIG. 56 shows a flowchart of operation of the detected data block storing unit in the eight embodiment of the present invention. FIGS. 57 and 58 show contents of processes of the detected data block storing unit.

Step 1101) The detected data block storing unit 280 receives a detected data block ID and detected data block information.

Step 1102) First, the detected watermark data block buffering unit 281 sets a data value at a position indicated by the received detected data block ID in the detected watermark information buffer 283 to be the value of the received detected data block information.

As shown in FIG. 57, the detected watermark information buffer 283 is in a state in which no data block is detected for every data block ID in an initial state, and the state sequentially changes from the undetected state to detected state each time when a detected data block ID and detected data block information are received. By the way, when a data block ID that is already detected is received, the data value of the corresponding data block ID in the detected watermark information buffer 283 may be overwritten with the detected data block information, or nothing may be performed without performing overwriting.

FIG. 57 shows contents of processes in a case where the number of data blocks are predetermined. In a case where a termination flag of data blocks is embedded when embedding, it cannot be ascertained how many data blocks are in the initial state as shown in FIG. 58. However, by receiving a data block ID including a termination flag, total number of data blocks can be ascertained. Thus, an undetected data block can be specified. After that, processes the same as those when the number of data blocks is predetermined can be performed. By using the termination information, it becomes possible to deal with embedding/detection of watermark information of an arbitrary length.

Step 1103) Next, the detection completion check unit 282 determines whether all data blocks in the detected watermark information buffer 283 are "detected", and if all data blocks are detected, the process goes to step 1104, and when an undetected data block is remained, the process goes to step 1105.

Step 1104) When all data blocks are detected, the data values in the detected watermark information buffer 283 are regarded as detected watermark information, and the detection result is output.

Step 1105) When an undetected data block remains, the process returns to frame capturing by the moving image input unit 210 so as to continue detection trial.

By the way, in the present embodiment, although differences from the first embodiment are mainly described, it is obvious that the contrivance of the present embodiment can be easily carried out by combining with contrivances in the second to seventh embodiments. For example, it is obvious that detection performance improves by storing difference images for each data block like the sixth embodiment, and by storing correlation values like the seventh embodiment.

<Effects of this Embodiment>

In the present embodiment, watermark information is divided into data blocks and watermark is embedded while temporally switching data blocks. In a detection side, detected data blocks are sequentially stored, and when all data blocks are detected, watermark detection is regarded to be succeeded. Accordingly, it becomes possible to perform embedding/detection of watermark information having an information length longer than an embedding information length limit of a watermark algorithm for one difference image, or tolerance improvement can be realized by decreasing an information length embedded into each frame.

In addition, by embedding/detecting termination information, information of an arbitrary length can be dealt with, so that an application that requires longer information can be realized, for example. Thus, use coverage widens.

Ninth Embodiment

In this embodiment, an example is described in which the data block ID is embedded by multiplexing it into watermark information using modulation that is the pattern amplitude using type and that is a polarity non-using type.

This embodiment is the same as the eighth embodiment except for parts described below.

Contents of processes of the basic watermark pattern generation unit 121 in the digital watermark embedding apparatus 100 are described.

Figure 59:
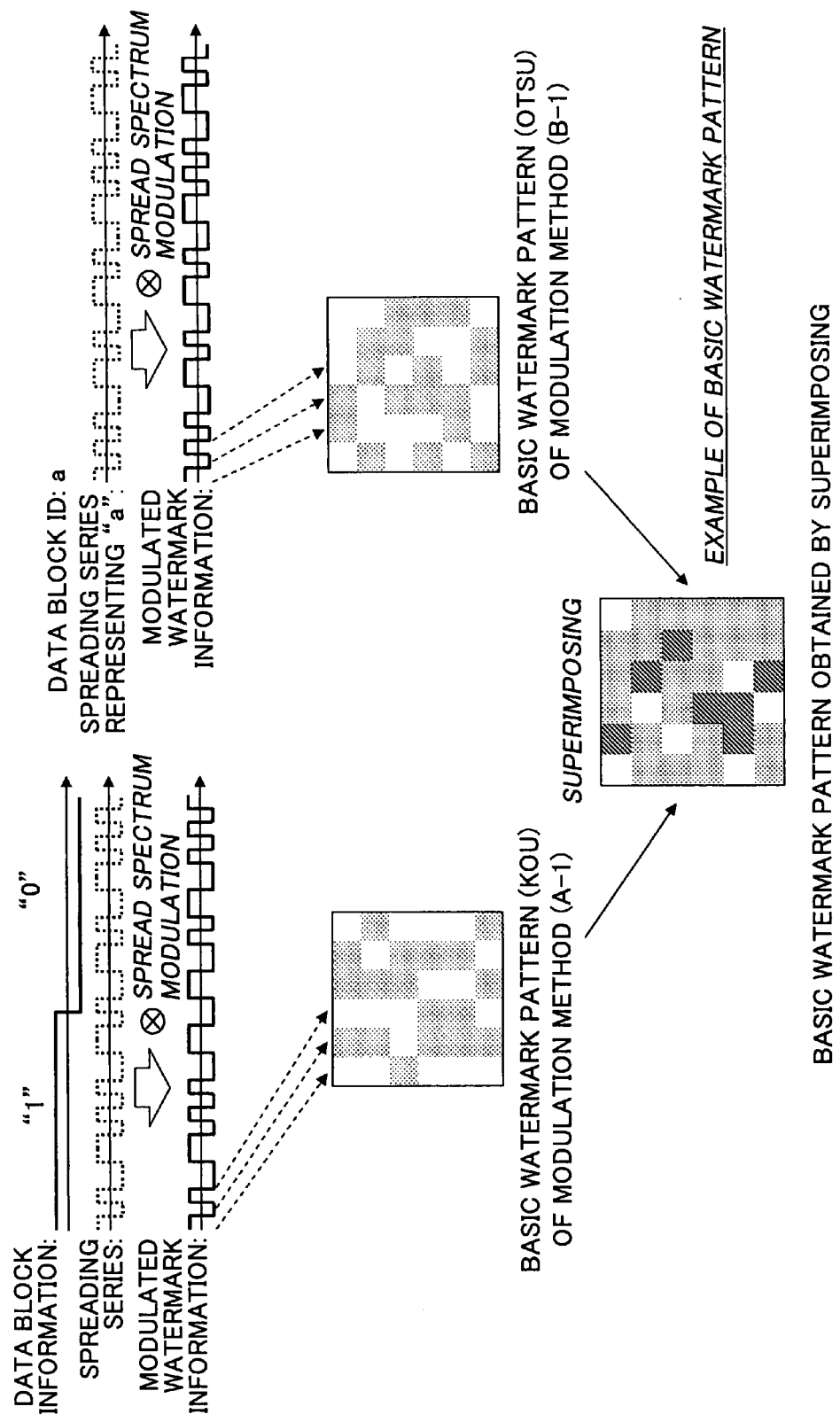
FIG. 59 is a figure for explaining an example of processes of the basic watermark pattern generation unit in the ninth embodiment of the present invention.

FIG. 59 is a figure for explaining an example of processes of the basic watermark pattern generation unit in the ninth embodiment of the present invention.

In the present embodiment, as to the data block information and the data block ID that are inputs for a basic watermark pattern, first, in the same way as the fifth embodiment, the data block information is modulated to obtain a basic watermark pattern (kou).

Next, as to the data block ID, instead of the phase synchronization signal (always same value) of the fifth embodiment, a data block ID having multiple values (including data block termination information as necessary) is modulated using the modulation method (B-1) to obtain a basic watermark pattern (otsu).

Finally, the basic watermark pattern (kou) and the basic watermark pattern (otsu) are superimposed and combined to obtain a basic watermark pattern.

Figure 60:
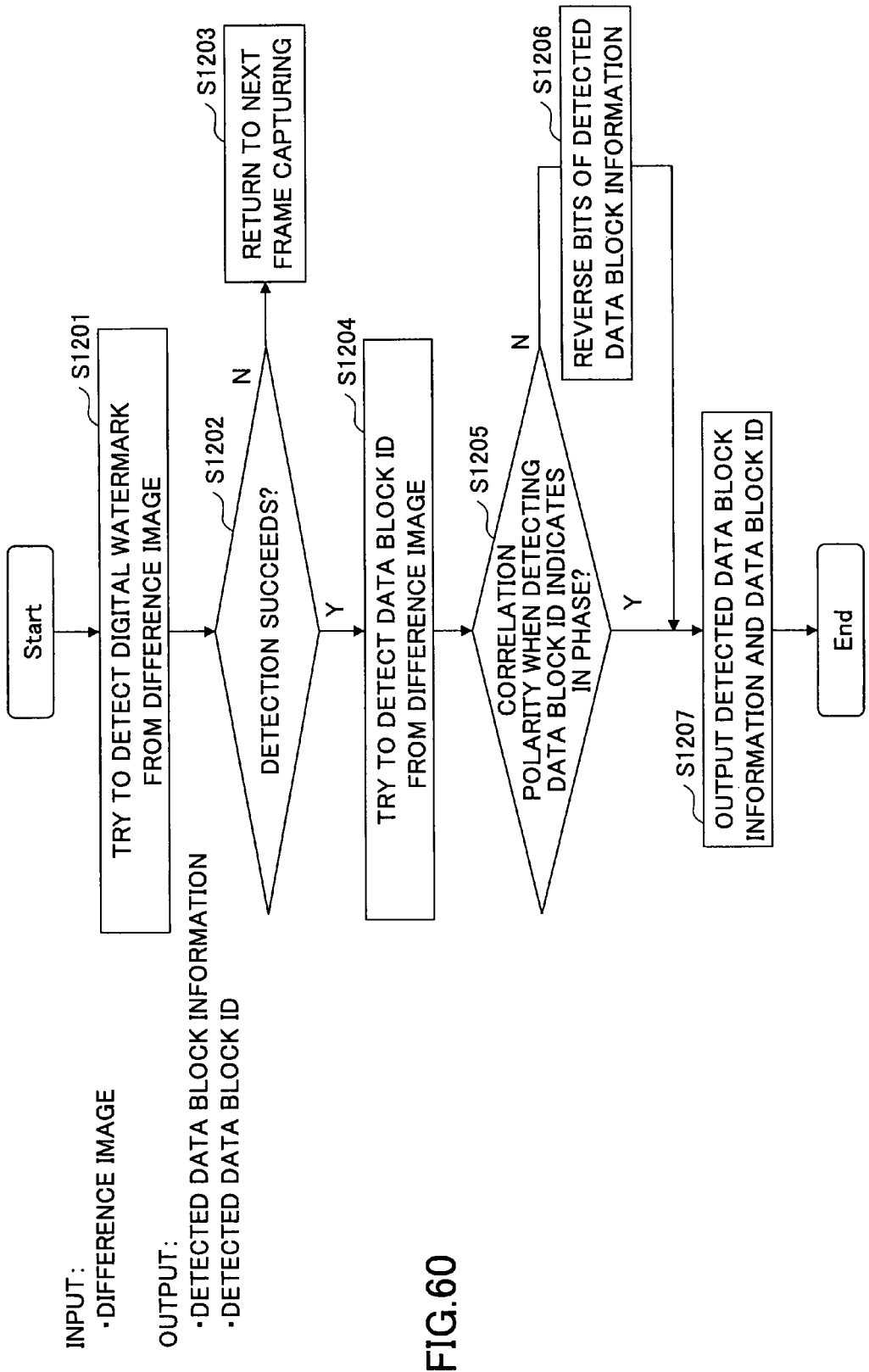
FIG. 60 is a flowchart of operation of the digital watermark detection unit in the ninth embodiment of the present invention.

FIG. 60 shows a flowchart of operation of the digital watermark detection unit in the ninth embodiment of the present invention.

Step 1201) The digital watermark detection unit 240 receives a difference image, and tries to detect data block information from the difference image in the same way as the eighth embodiment.

Step 1202) When the data block information is detected, the process goes to step 1204, and when it is not detected, the process goes to step 1203.

Step 1203) The process returns to next frame capturing by the moving image input unit 210.

Step 1204) When the data block information is detected, it is tried to detect the data block ID next.

Step 1205) Since the data block ID is embedded by the modulation method (B-2), the data block ID can be detected using an absolute value of correlation calculation first, and it can be determined whether the phase of the watermark pattern in the difference image is the same as or reversed from the phase of the basic watermark pattern used when embedding using plus/minus polarity of the correlation value at that time. When the correlation value of the data block ID when detecting is plus, it is determined that the phase is a positive phase, and when the correlation value is minus, it is determined that the phase is a reversed phase. When it is determined that the phase is the positive phase, the process goes to step 1207, and when it is determined that the phase is the reversed phase, the process goes to step 1206.

Step 1206) When the phase is the reversed phase, bits of the detected data block information are reversed and it is output with the data block ID.

Step 1207) When it is determined that the phase is the positive phase, the detected data block information is output as it is with the data block ID.

Like the eighth embodiment, it is obvious to carry out contrivances of this embodiment by combining with contrivances of the first to seventh embodiments. For example, it is obvious that detection performance improves by storing difference images for each data block like the sixth embodiment, and by storing correlation values like the seventh embodiment.

<Effects of the Present Embodiment>

In this embodiment, the data block ID is multiplexed into the watermark information using modulation that is the pattern amplitude using type and that is the polarity non-using type to perform embedding. Accordingly, information length of data block information embedded in each frame can be made long.

In addition, since phase of the watermark pattern can be determined using polarity of correlation when detecting the data block ID, it is not necessary to prepare the flag for determining bit reversal, and it contributes to extension of information length. That is, by using the polarity non-using type modulation for the data block ID, it becomes possible to determine the phase of the watermark pattern simultaneously with detection of the data block ID. Thus, the technique serves a dual purpose.

By the way, the pattern shape using type that can specify reversal of the difference image can be used for data block ID embedding.

Tenth Embodiment

In the present embodiment, an example for storing difference images in which phases are aligned is described.

The embodiment is the same as the first to ninth embodiments except for parts described below. In the following, for simplifying explanation, differences from the eighth embodiment are described.

The digital watermark detection unit 240 in the digital watermark detection apparatus 200 in this embodiment is described.

Figure 61:
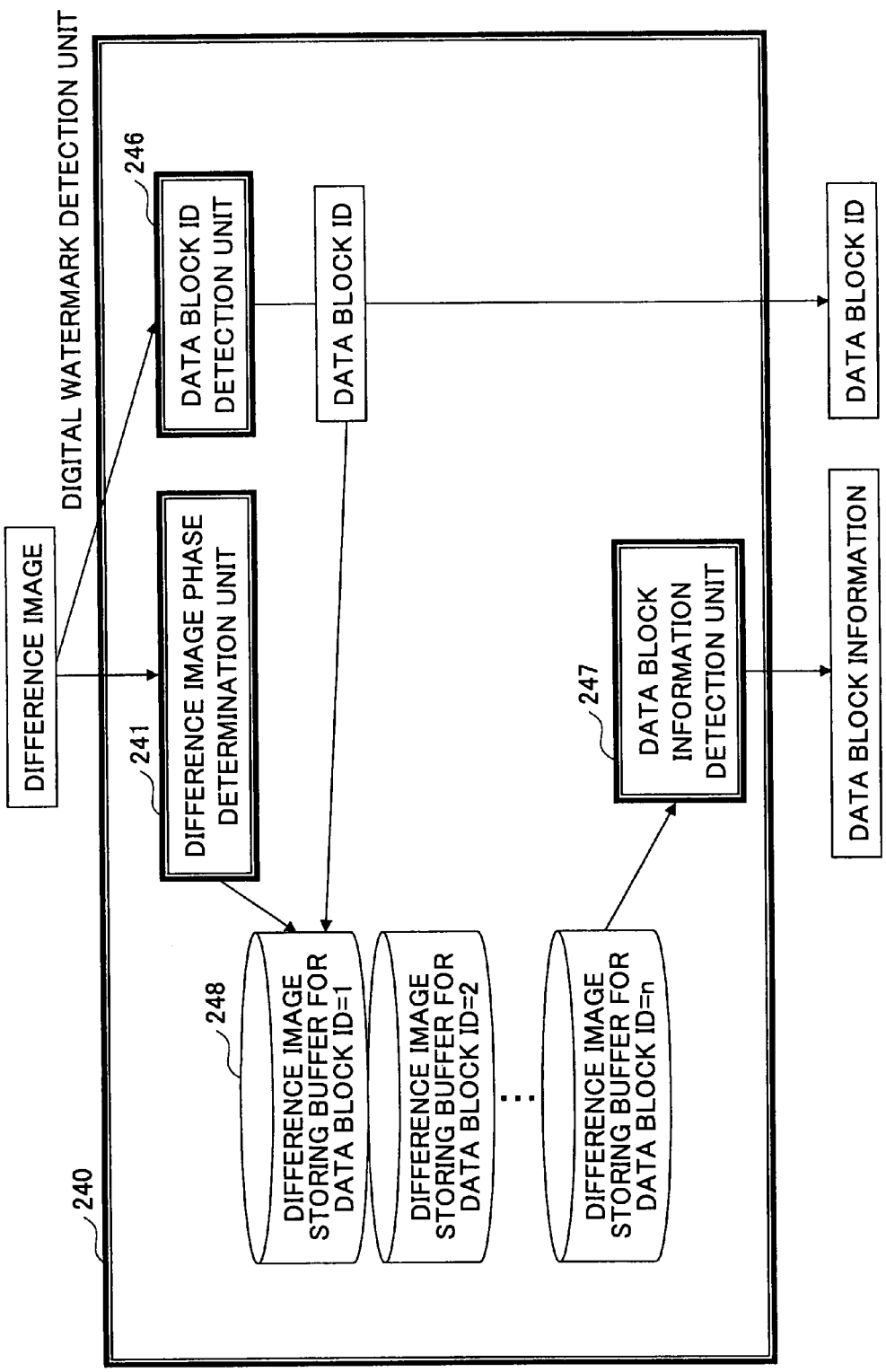
FIG. 61 is a block diagram of the digital watermark detection unit in the tenth embodiment of the present invention.

FIG. 61 shows a configuration of the digital watermark detection unit in the tenth embodiment of the present invention.

The digital watermark detection unit 240 shown in the figure includes a difference image phase determination unit 241, a data block ID detection unit 246, a data block information detection unit 247, and difference image storing buffers 248 for data block ID=n.

Figure 62:
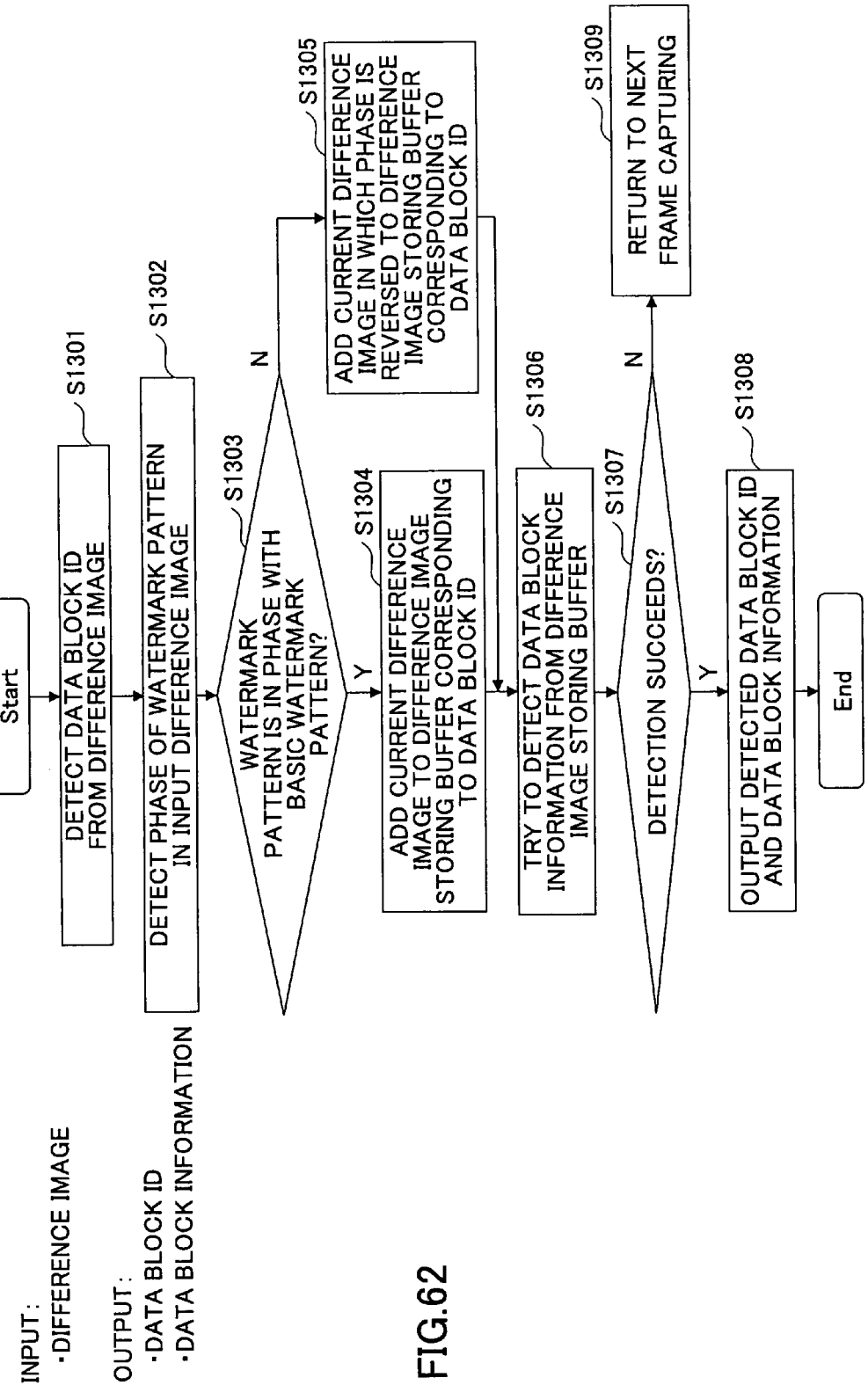
FIG. 62 is a flowchart of operation of the digital watermark detection unit in the tenth embodiment of the present invention.

FIG. 62 shows a flowchart of operation of the digital watermark detection unit in the tenth embodiment of the present invention.

Step 1301) When receiving the difference image, the digital watermark detection unit 240 tries to detect the data block ID by the data block ID detection unit 246.

Step 1302) Next, the difference image phase determination unit 241 detects the phase of the watermark pattern in the difference image in the same way as the sixth embodiment.

Step 1303) When the phase is positive, the process of the difference image phase determination unit 241 goes to step 1304, and when the phase is reversed, the process goes to step 1305.

Step 1304) When the phase is positive, the current difference image is added and stored in a difference image buffer 248 corresponding to detected data block ID, and the process goes to step 1306.

Step 1305) When the phase is reversed, the difference image is changed such that the phase becomes positive, and is stored in the difference image buffer 248 corresponding to the detected data block ID. As shown in FIG. 61, the digital watermark detection unit 240 includes difference image buffers 248 the number of which is the same as a number of kinds of data block IDs.

Step 1306) Next, the data block information detection unit 247 tries to detect data block information from the difference image storing buffer 248 corresponding to the currently detected data block ID.

Step 1307) When detection succeeds, the process goes to step 1308. When detection does not succeed, the process goes to step 1309.

Step 1308) When the detection succeeds, the current data block ID and the data block information are output.

Step 1309) When the detection does not succeed, the process returns to capturing process by the moving image input unit 210.

<Effects of the Present Embodiment>

According to the present embodiment, when enlarging the length of the watermark information using the data blocks, tolerance can be also improved by storing difference images at the same time so that detection performance improves.

Eleventh Embodiment

In this embodiment, an example for storing correlation values is described.

This embodiment is the same as the first to tenth embodiments except for parts described below. In the following, differences from the eighth embodiment are described for simplifying explanation.

Figure 63:
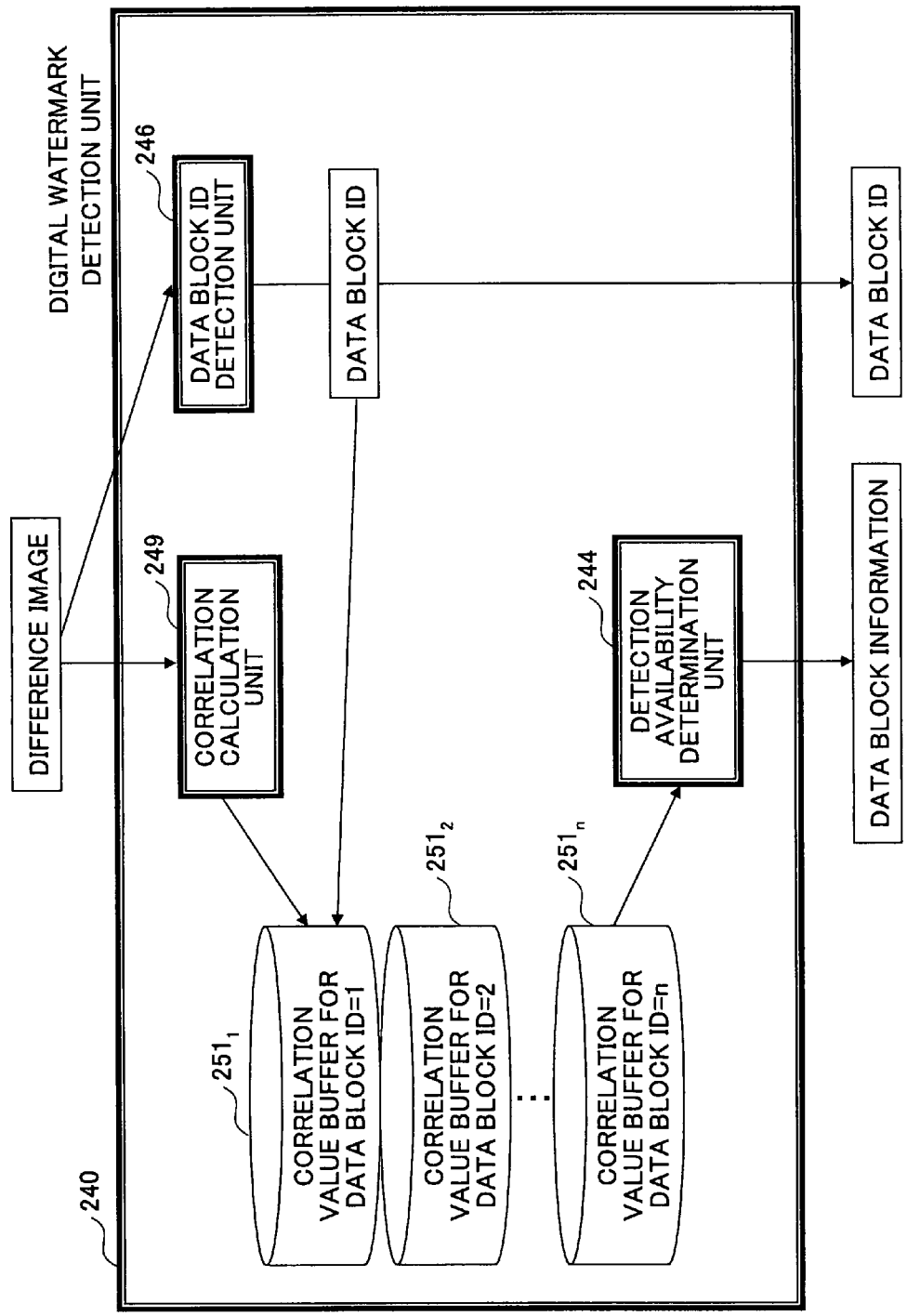
FIG. 63 is a block diagram of the digital watermark detection unit in the eleventh embodiment of the present invention.

FIG. 63 shows a configuration of the digital watermark detection unit in the eleventh embodiment of the present invention.

The digital watermark detection unit 240 shown in the figure includes a data block ID detection unit 246, a detection availability determination unit 244, a correlation calculation unit 249, correlation buffers 251 for data block ID=n. As shown in the figure, the digital watermark detection unit 240 includes correlation value buffers for data block ID=n the number of which is the same as the number of kinds of data block IDs.

Operation of the digital watermark detection unit 240 configured as mentioned above is described below.

Figure 64:
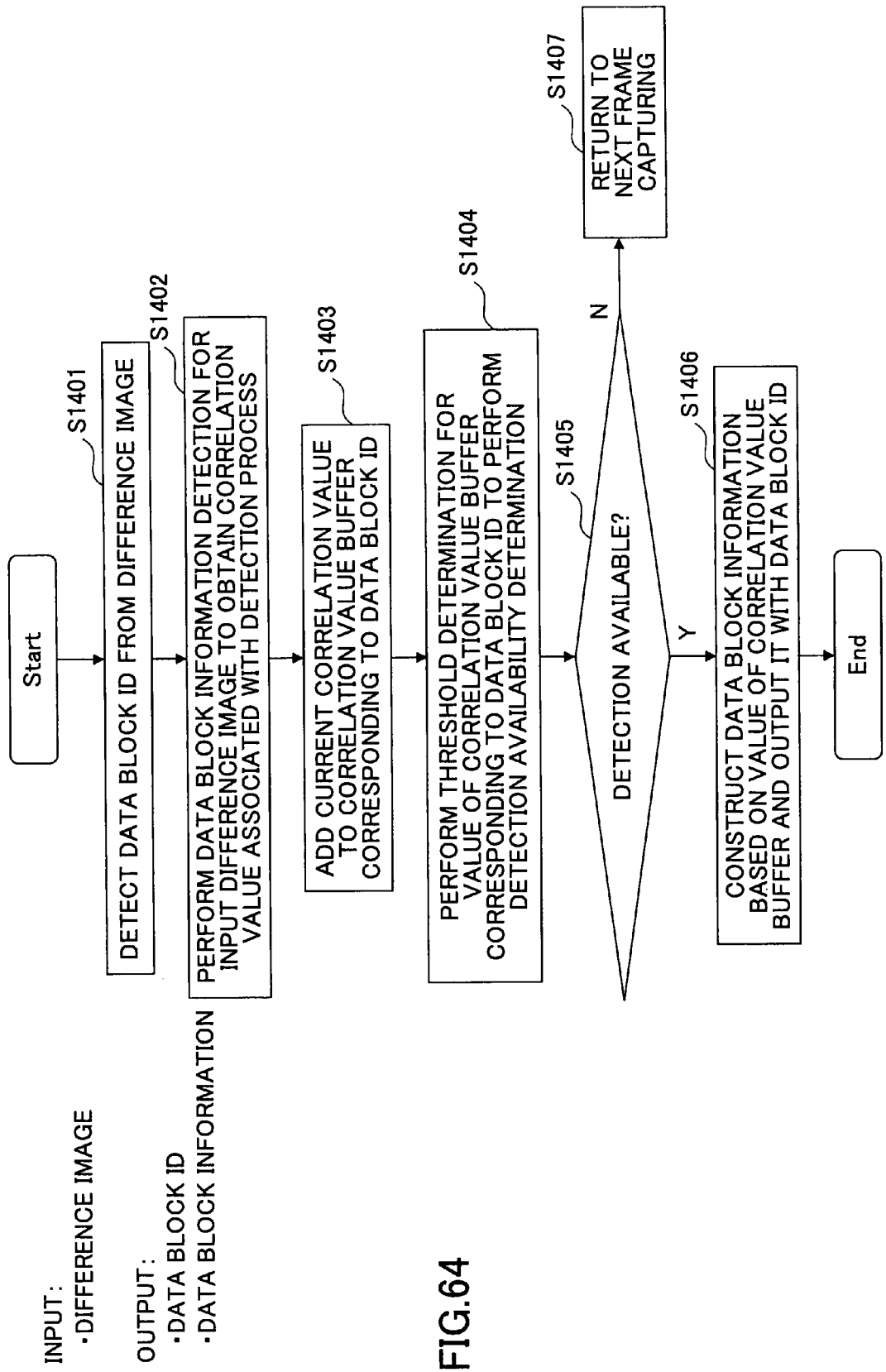
FIG. 64 is a flowchart showing operation of the digital watermark detection unit in the eleventh embodiment of the present invention.

FIG. 64 is a flowchart showing operation of the digital watermark detection unit in the eleventh embodiment of the present invention.

Step 1401) When receiving the difference image, the digital watermark detection unit 240 tries to detect the data block ID by the data block ID detection unit 246.

Step 1402) Next, the correlation calculation unit 249 obtains a correlation value calculated by performing data block information detection trial.

Step 1403) The obtained correlation value is added and stored in a correlation value buffer 251 corresponding to the detected data block ID. By the way, at this time, when detection of the data block information succeeds only from the received difference image, it may be output with the data block ID to terminate the process.

Step 1404) Next, as to the correlation value buffer 251 corresponding to the currently detected data block ID, the detection availability determination unit 244 determines detection possibility for data block information by performing threshold determination in the same way as the seventh embodiment.

Step 1405) When it is determined that detection is possible, the process goes to step 1406, and when the detection does not succeed, the process goes to step 1407.

Step 1406) When it is determined that detection is possible, data block information is formed from values in the current correlation value buffer 251, and is output with the current data block ID.

Step 1407) When detection does not succeed, the process returns to capturing process by the moving image input unit 210.

<Effects of this Embodiment>

According to the present embodiment, when enlarging the watermark information length using the data block, tolerance improvement by the correlation value buffer 251 can be also realized at the same time, so that detection performance improves.

Twelfth Embodiment

In the present embodiment, an example is described in which status of digital watermark detection process is fed back and output in real time.

This embodiment is the same as the first to eleventh embodiments except for parts described below. In the following, differences from the first embodiment are described for simplifying explanation.

Figure 65:
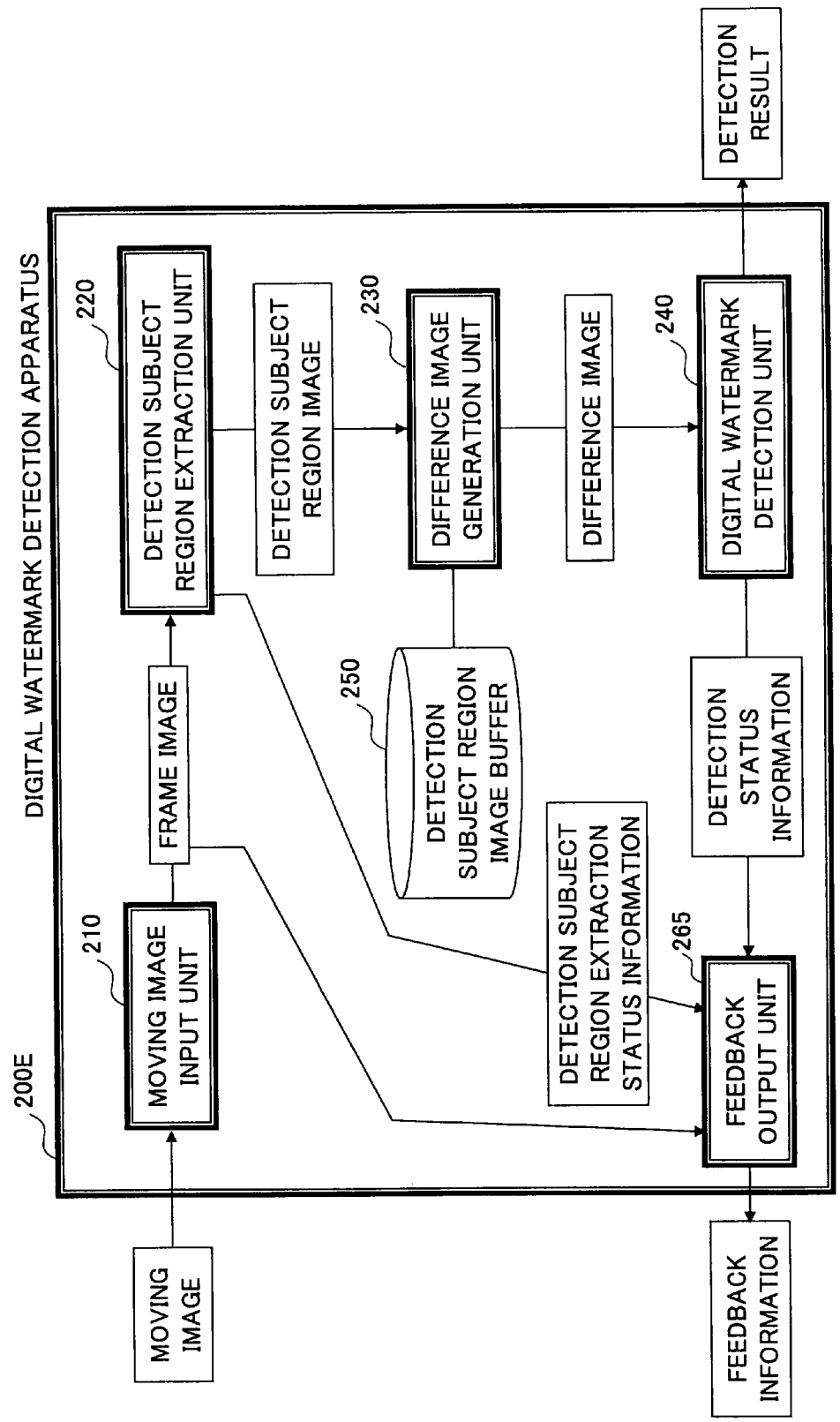
FIG. 65 is a block diagram of a digital watermark detection apparatus of the twelfth embodiment of the present invention.

FIG. 65 shows a configuration of a digital watermark detection apparatus of the twelfth embodiment of the present invention. A difference between the digital watermark detection apparatus 200E shown in the figure and the first embodiment is that the digital watermark detection apparatus 200E includes a feedback output unit 265 that receives a currently captured frame image, current detection subject region extraction status information and detection status information for current digital watermark detection as needed, and generates and outputs feedback information in parallel with performing digital watermark detection corresponding to the first embodiment.

Figure 66:
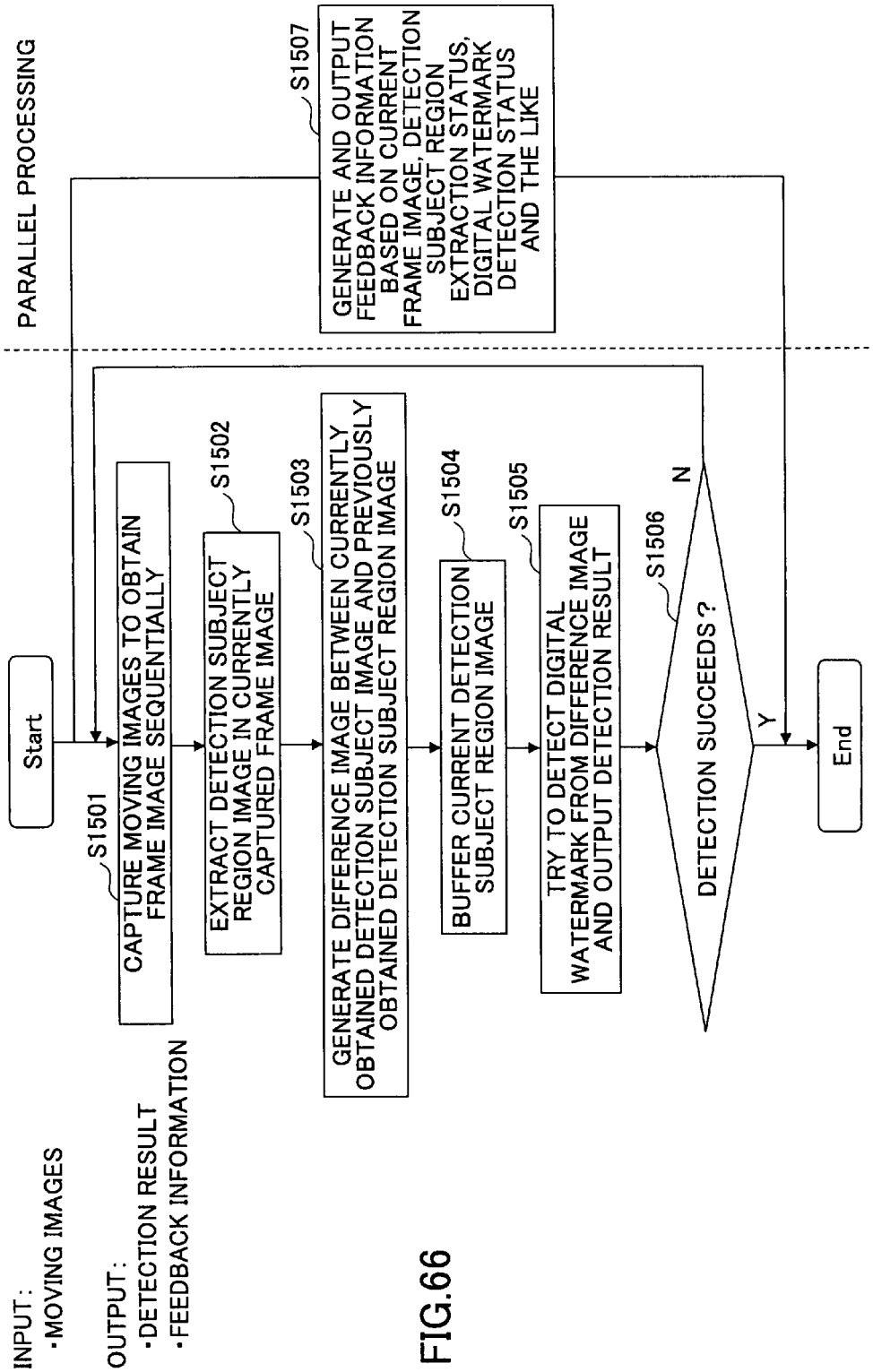
FIG. 66 is a flowchart of operation of the digital watermark detection apparatus in the twelfth embodiment of the present invention.

FIG. 66 is a flowchart of operation of the digital watermark detection apparatus in the twelfth embodiment of the present invention.

In the figure, since steps 1501-1506 are the same as steps 201-206 in FIG. 20, the steps are not described. These steps are performed in parallel with the following process of step 1507.

Step 1507) The feedback output unit 265 receives a currently captured frame image, current detection subject region extraction status information and detection status information for current digital watermark detection as needed, and generates and outputs feedback information in parallel with performing digital watermark detection corresponding to the first embodiment.

Figure 67:
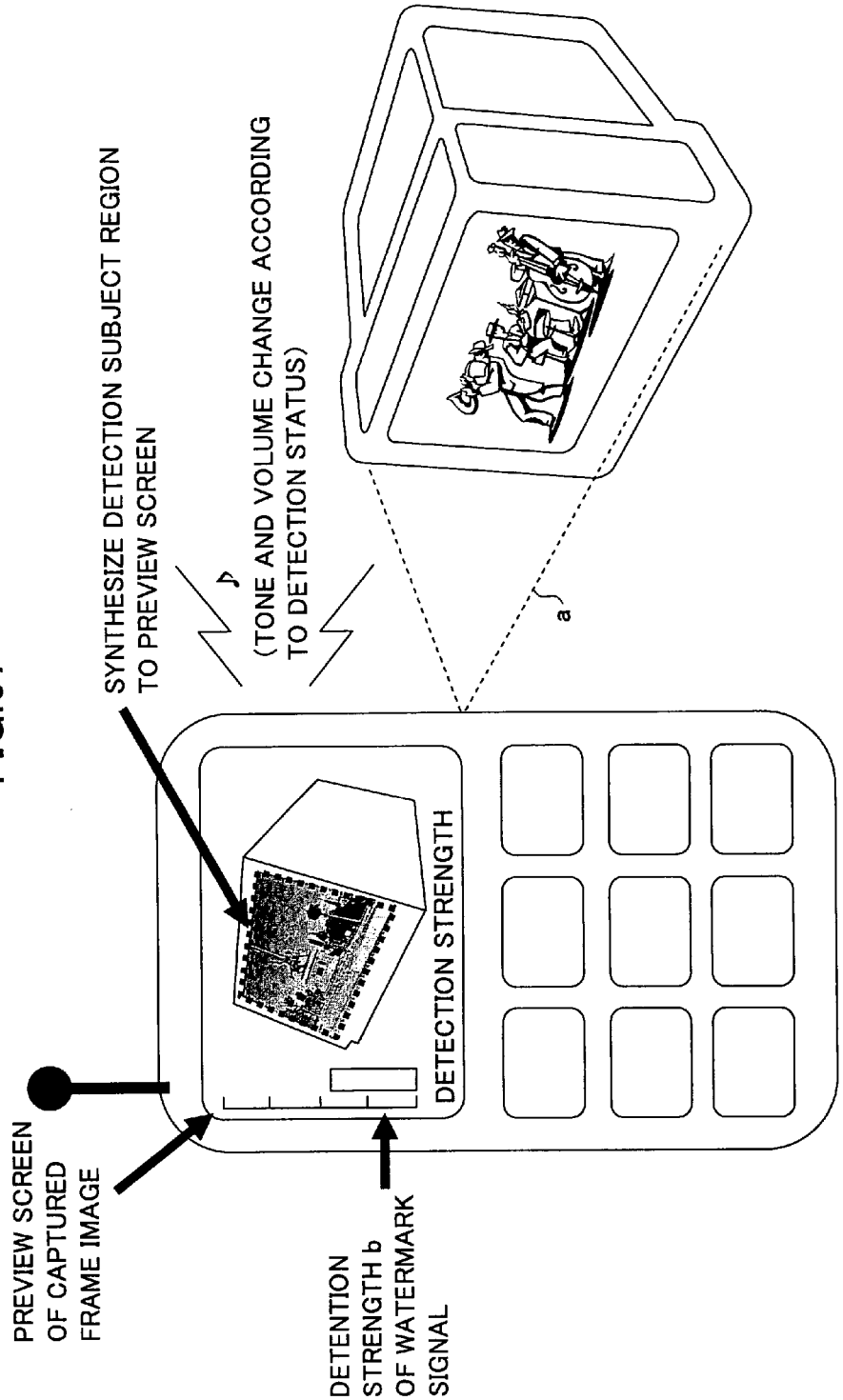
FIG. 67 shows an example (1) of feedback output of the digital watermark detection apparatus in the twelfth embodiment of the present invention.
Figure 68:
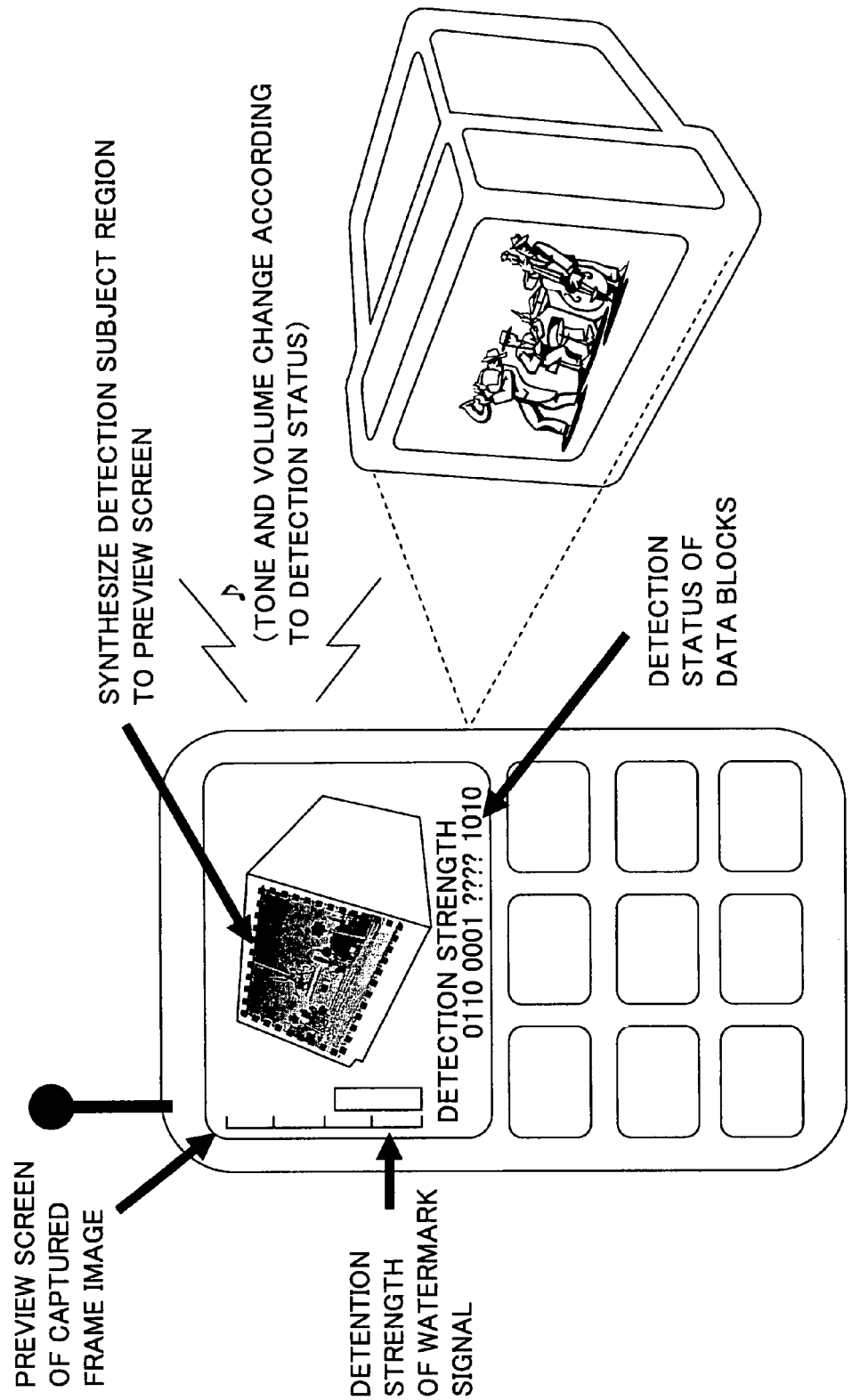
FIG. 68 shows an example (2) of feedback output of the digital watermark detection apparatus in the twelfth embodiment of the present invention.
Figure 69:
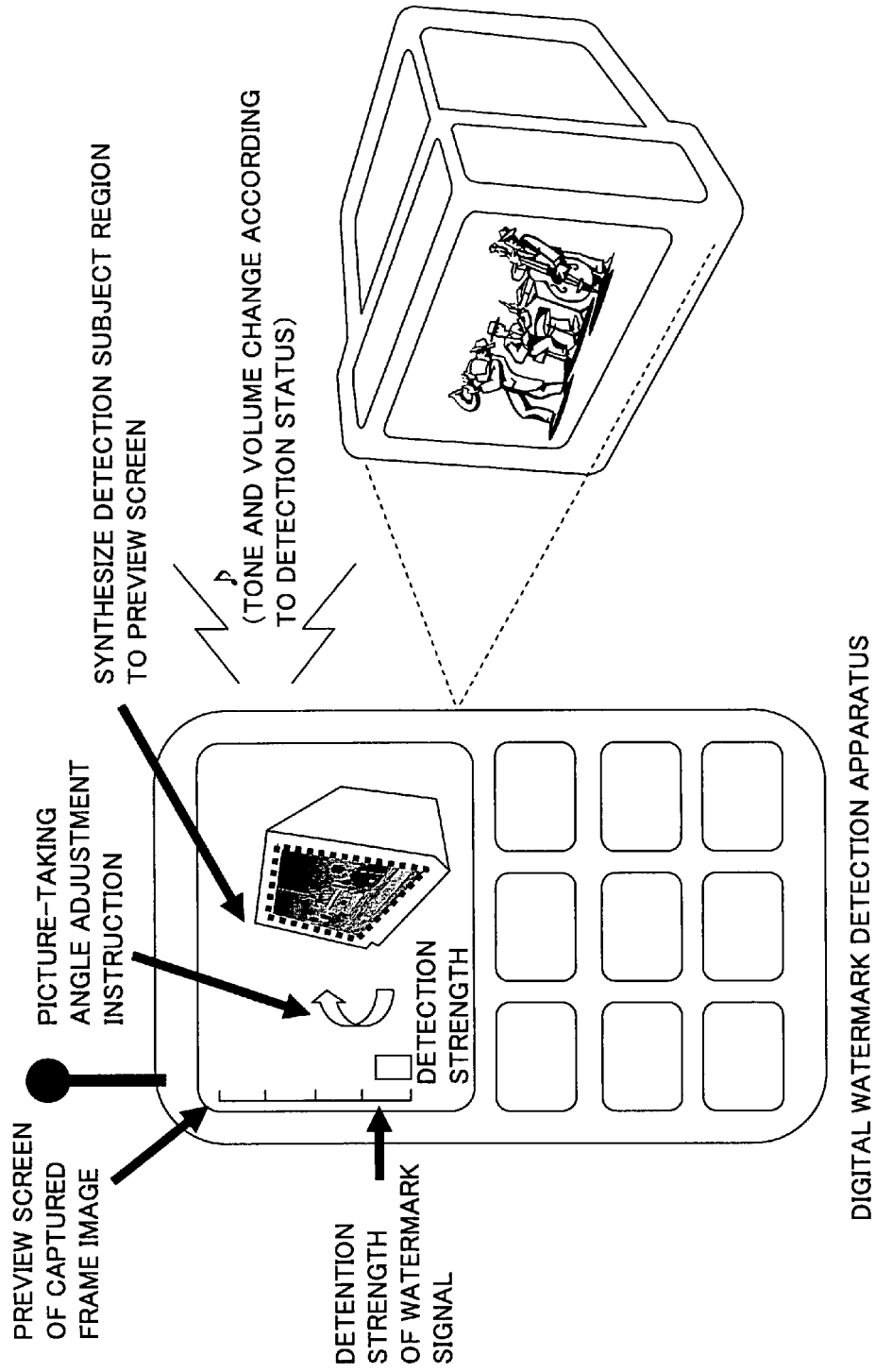
FIG. 69 shows an example of feedback output of the digital watermark detection apparatus in the twelfth embodiment of the present invention.

FIGS. 67, 68 and 69 show examples of the feedback output of the digital watermark detection apparatus in the twelfth embodiment of the present invention.

A preview screen is provided for drawing, in real time, the captured frame image obtained by the moving image input unit 210 of the digital watermark detection apparatus 200E, and the detection subject region obtained by the detection subject region extraction unit 220 is synthesized on the preview screen (a in FIG. 67), so that detection strength obtained by the digital watermark detection unit 240 such as a size of the correlation value when performing demodulation is graphically displayed (b in FIG. 67) or voice is output by changing tone or volume according to the detection strength.

In addition, when using the data block, detection status for data blocks that are buffered until now are synthesized as shown in FIG. 68.

Alternatively, as shown in FIG. 69, when degree of plane projection distortion caused by image-taking angle is large, or when pixel area in the detection subject region in the captured frame image is too small since the image is taken from a distant position so that detection of digital watermark is difficult, a message indicating that adjustment of the angle or zooming up is necessary is displayed to urge the user to perform adjustment.

<Effects of the Present Embodiment>

In the present embodiment, interactivity increases by feeding back and outputting the status of the digital watermark detection process in real time so that convenience improves. Especially, by urging the user to make a status in which detection becomes easy, improvement of detection performance can be expected.

Thirteenth Embodiment

This embodiment is the same as the first to twelfth embodiments except for parts described below. In the following, differences from the first embodiment are described to simplify explanation.

Processes of the watermark pattern superimposing unit 130 in the digital watermark embedding apparatus 100 of this embodiment is described.

Figure 70:
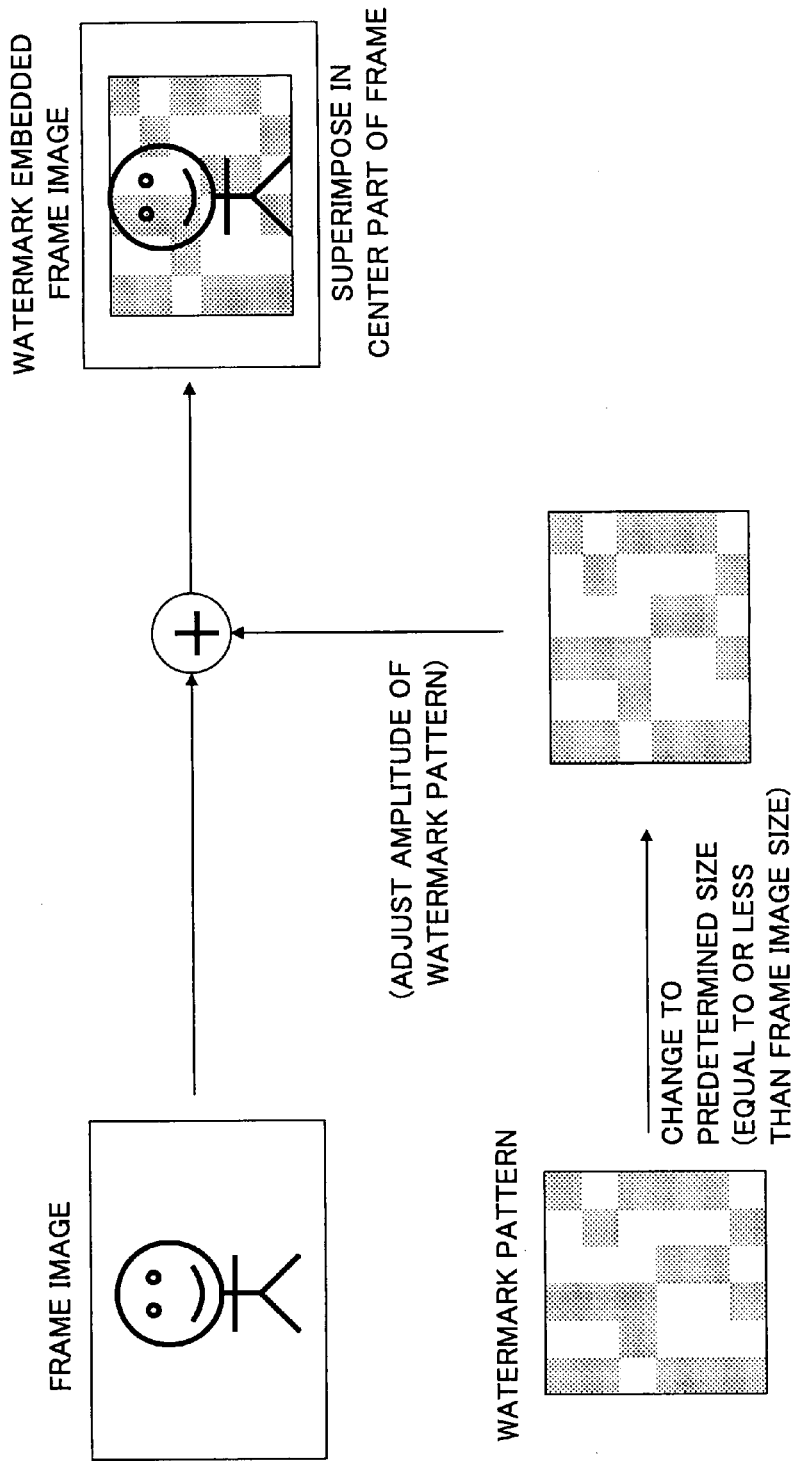
FIG. 70 is a figure for explaining processes of the watermark pattern superimposing unit in the thirteenth embodiment of the present invention.

FIG. 70 is a figure for explaining processes of the watermark pattern superimposing unit in the thirteenth embodiment of the present invention.

The watermark pattern superimposing unit 130 receives a frame image and a watermark pattern generated based on the frame display time. The watermark pattern superimposing unit 130 changes the size of the watermark pattern to a predetermined size that is equal to or smaller than that of the frame image. After that, the watermark pattern superimposing unit 130 adds the watermark pattern onto a central area of the frame image to obtain a watermark embedded frame image.

Next, the digital watermark detection apparatus 200F in this embodiment is described.

Figure 71:
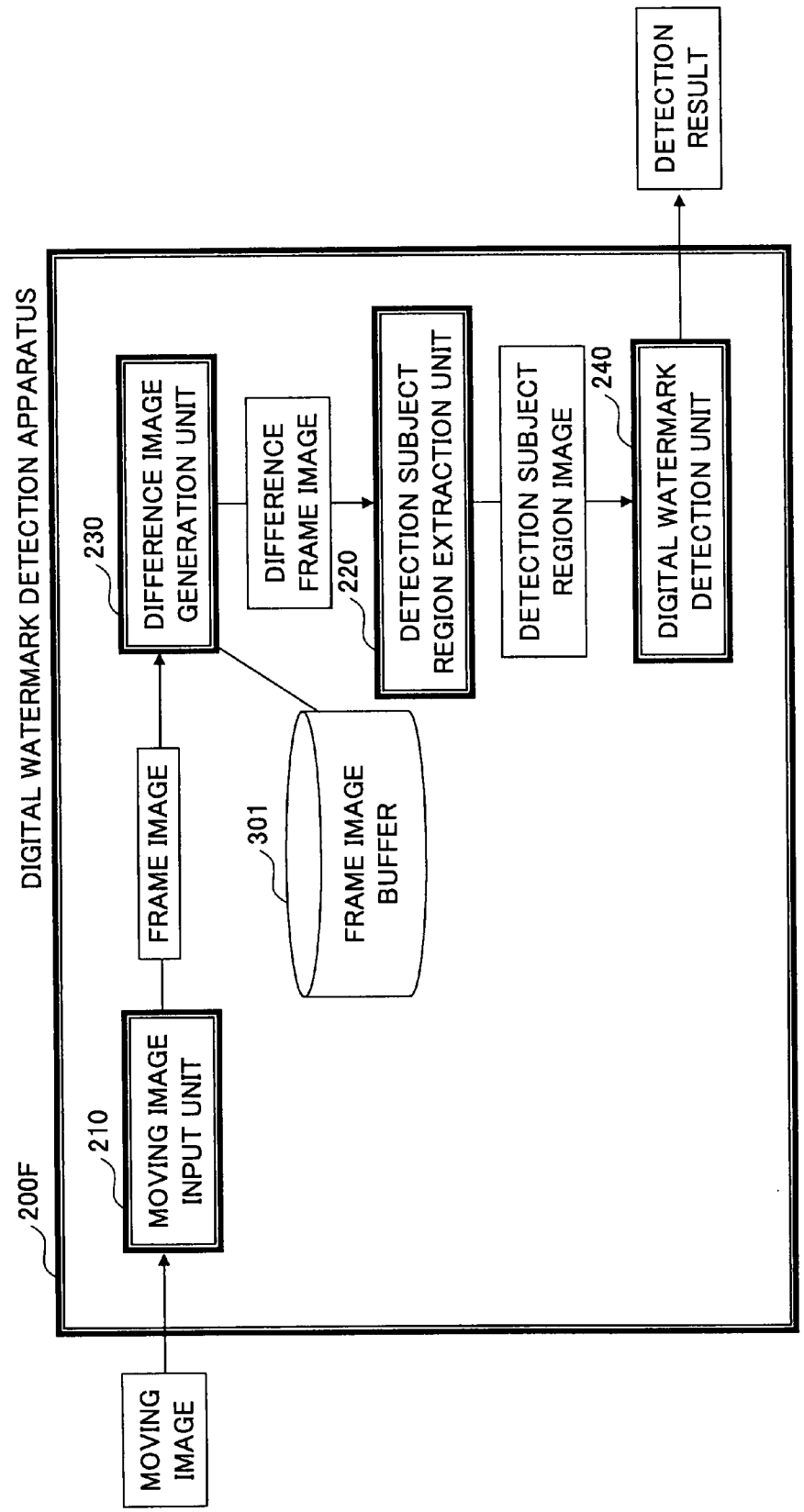
FIG. 71 is a block diagram of the digital watermark detection apparatus in the thirteenth embodiment of the present invention.

FIG. 71 shows a configuration of the digital watermark detection apparatus in the thirteenth embodiment of the present invention.

The digital watermark detection apparatus 200F shown in the figure includes a moving image input unit 210, a difference image generation unit 230, a detection subject region extraction unit 220, a digital watermark detection unit 240, and a frame image buffer 301, wherein the moving image input unit 210 receives data obtained by real-time video-capturing of analog moving images displayed on a TV and the like, or receives digital moving images that are MPEG-encoded.

Operation of the above-mentioned configuration is described.

Figure 72:
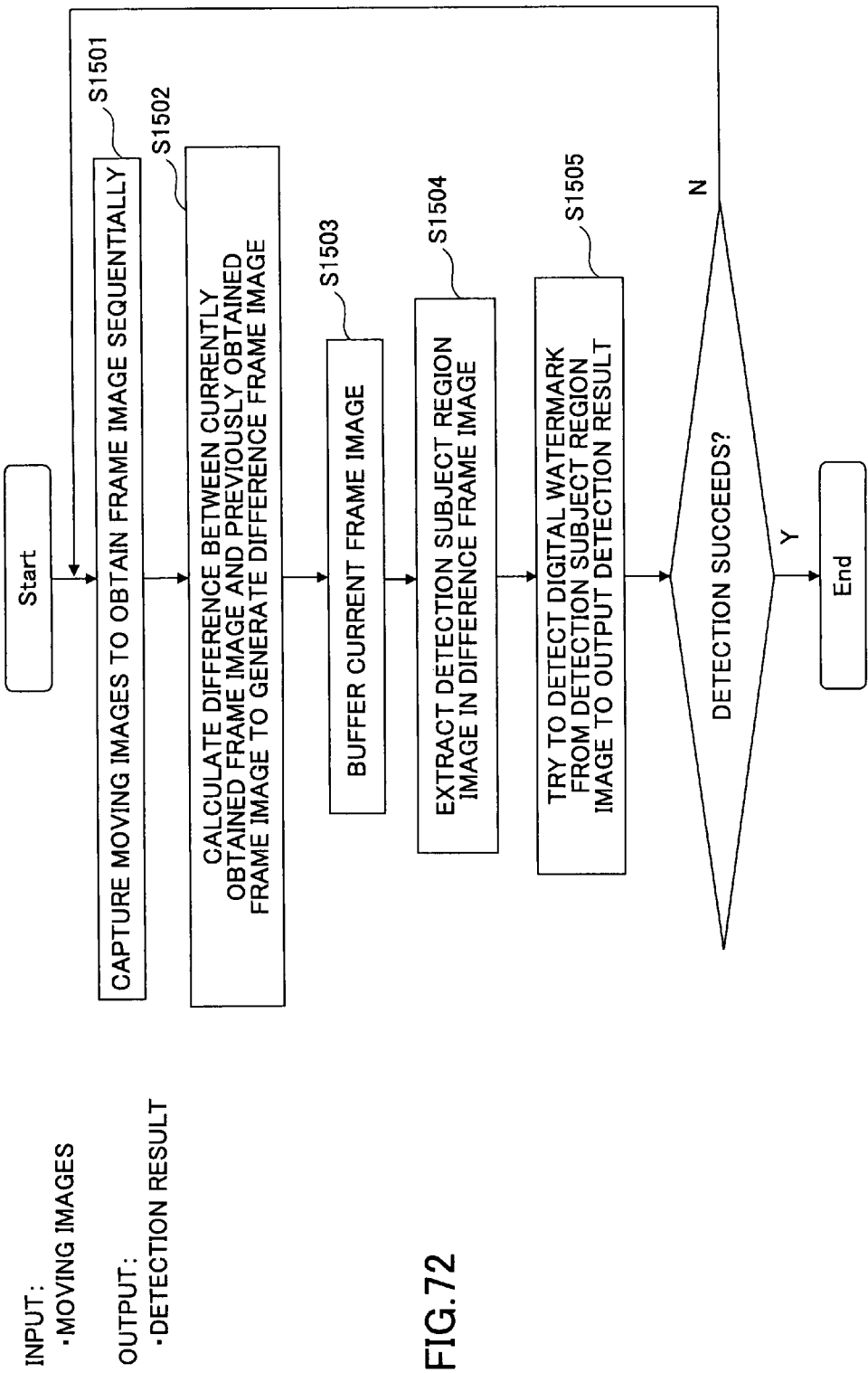
FIG. 72 is a flowchart of operation of the digital watermark detection apparatus in the thirteenth embodiment of the present invention.

FIG. 72 is a flowchart of operation of the digital watermark detection apparatus in the thirteenth embodiment of the present invention.

Step 1501) The moving image input unit 210 inputs the analog or digital moving images to obtain a frame image sequentially. When inputting the analog moving images, camera, scanner, or analog video signals are input so as to obtain the frame image. In the case of digital moving images, the frame image is obtained by performing decoding processes and the like.

Step 1502) Next, the difference image generation unit 230 calculate a difference between the currently obtained frame image and a previously obtained frame image stored in the frame image buffer 301 to generate a difference frame image.

Step 1503) In addition, in preparation for next detection trial, the current frame image is buffered in the frame image buffer 301.

Step 1504) Next, the detection subject region extraction unit 220 extracts a detection subject region that becomes a subject of watermark detection from the difference frame image to obtain a detection subject region image.

Step 1505) Next, the digital watermark detection unit 240 tries to detect digital watermark from the detection subject region image and outputs a detection result.

Step 1506) When digital watermark detection does not succeed, the moving image input unit 210 obtains a next frame image to repeat the above-mentioned process sequentially.

Next, processes of the difference image generation unit 230 are described in detail.

Figure 73:
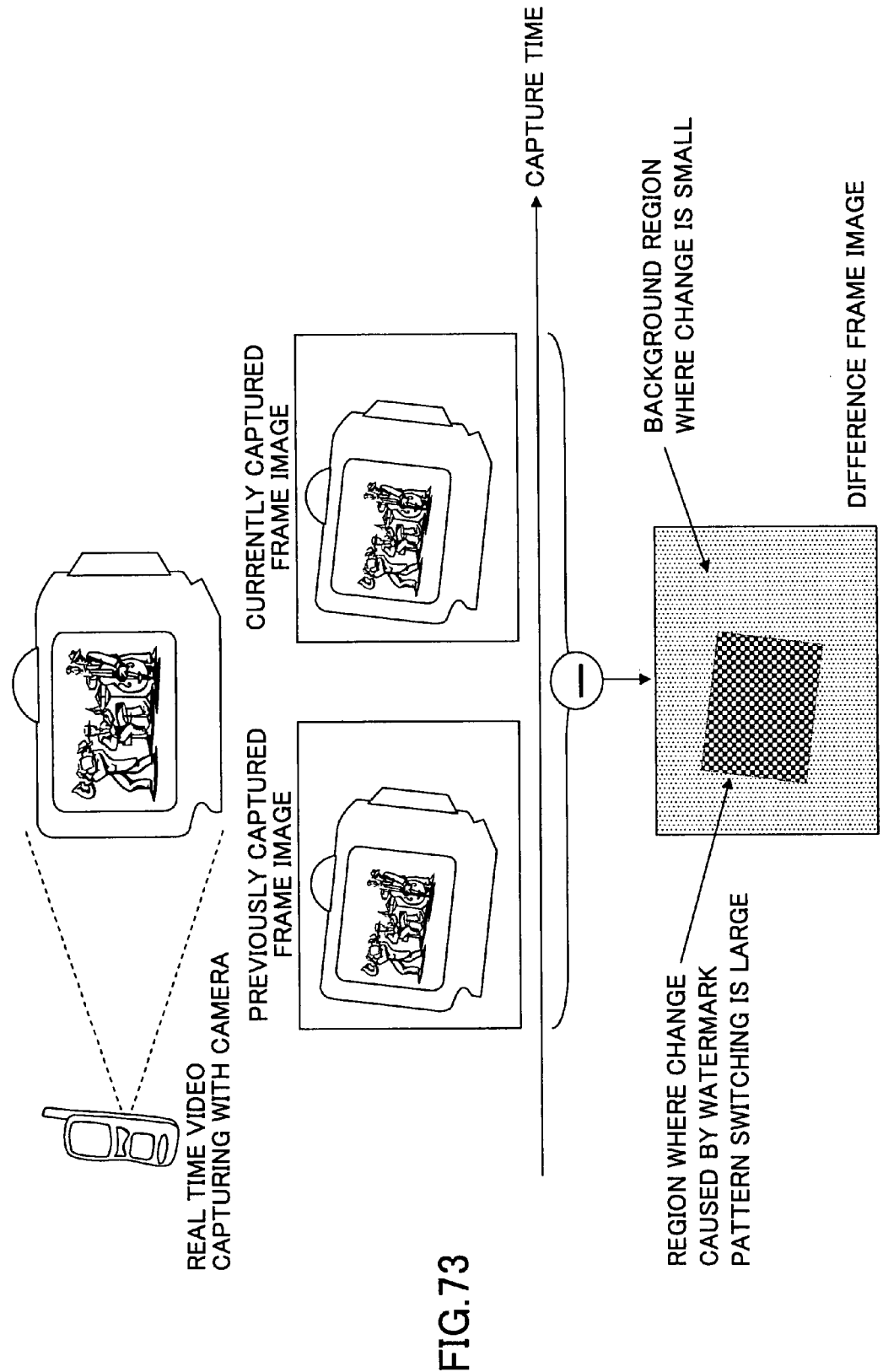
FIG. 73 is a figure for explaining processes of the difference image generation unit in the thirteenth embodiment of the present invention.

FIG. 73 is a figure for explaining processes of the difference image generation unit in the thirteenth embodiment of the present invention.

The difference image generation unit 230 obtains a difference between the currently obtained frame image and a previously obtained frame image stored in the frame image buffer 301 to generate a difference frame image. Here, it is assumed that there is little camera movement when taking the two frame images. As shown in FIG. 73, in the difference frame image, a part in which difference is large caused by watermark pattern switching can be distinguished from a background part in which there is no change.

Next, processes of the detection subject region extraction unit 220 are described in detail.

Figure 74:
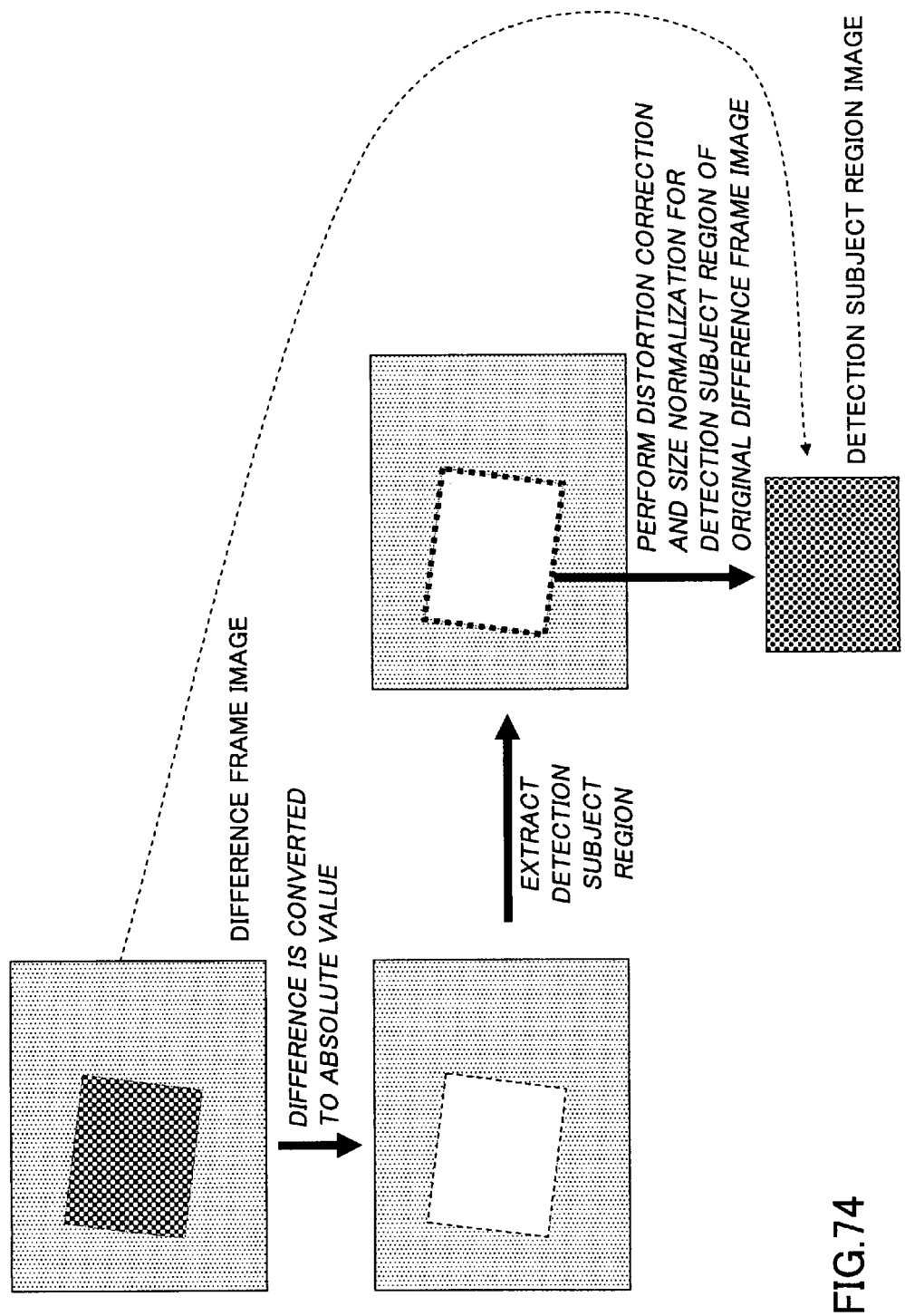
FIG. 74 is a figure for explaining processes of the detection subject region extraction unit in the thirteenth embodiment of the present invention.

FIG. 74 is a figure for explaining processes of the detection subject region extraction unit in the thirteenth embodiment of the present invention.

The detection subject region extraction unit 220 receives the difference frame image and extracts the detection subject region that is a subject for watermark detection to obtain the detection subject region image. As shown in FIG. 74, the detection subject region extraction unit 220 changes values of the difference frame image into absolute values, detects distortion parameters of the detection subject region using an edge detection method of the document 3 so as to perform distortion correction of the original difference frame image before being changed to the absolute values and normalize the size to obtain the detection subject region image. Since the detection subject region image obtained in this way is the same as the basic watermark pattern used for embedding excluding effects due to noise and the like, it is obvious that detection of digital watermark becomes possible from contents of the first to twelfth embodiments.

Also, it is obvious that the present embodiment can be carried out by arbitrarily combining with each contrivance of the first to twelfth embodiments.

<Effects of the Present Embodiment>

Figure 75:
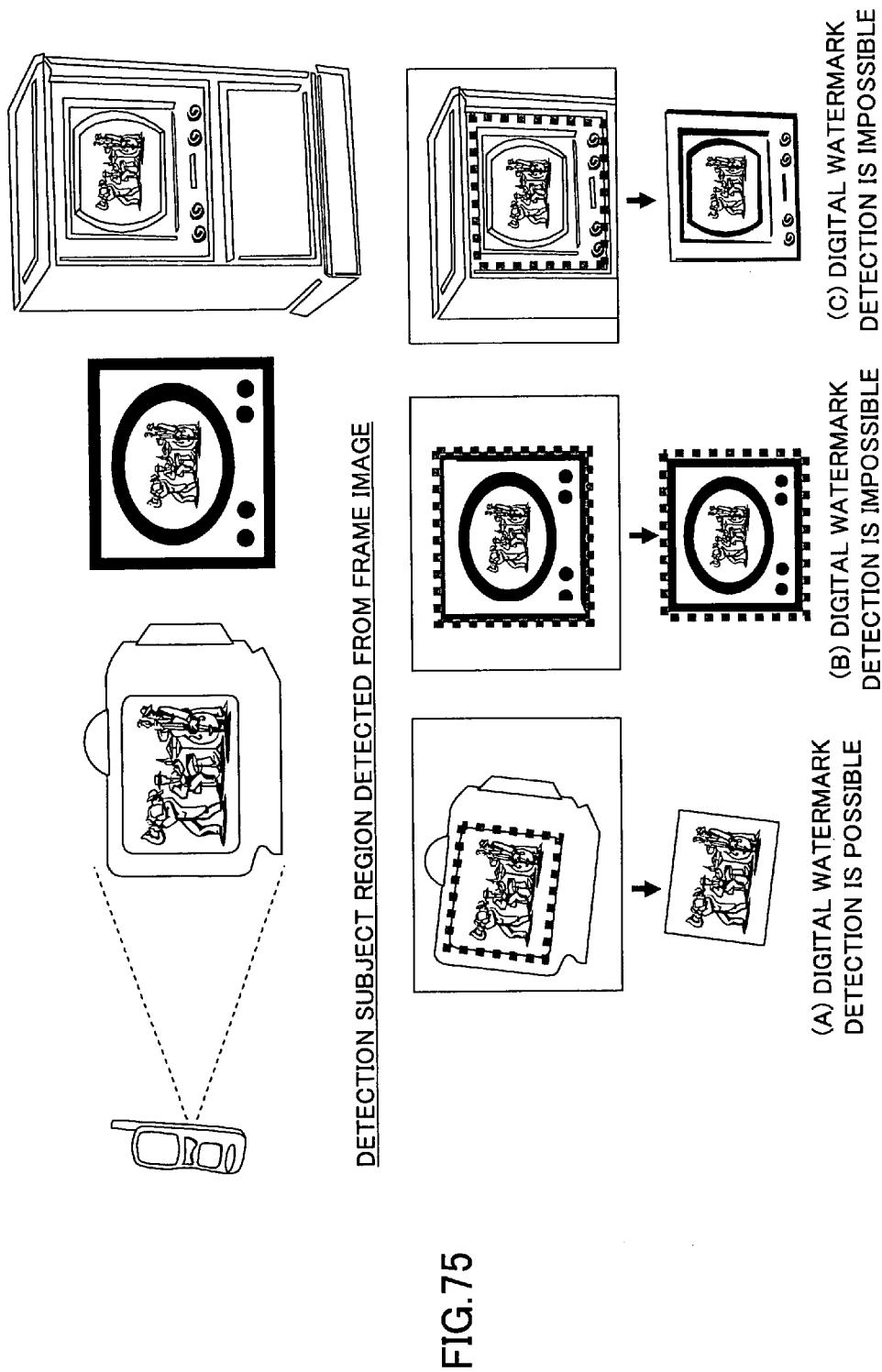
FIG. 75 is a figure (1) for explaining effects of thirteenth embodiment of the present invention.

Effects of the present embodiment is described with reference to FIGS. 75-77.

First, in digital watermark embedding in the first to twelfth embodiments, a watermark pattern having a size the same as the frame size of the received moving image is superimposed. In addition, when detecting a digital watermark, the detection subject region is extracted by detecting an edge of a display area of a TV receiver in a frame captured by a camera. However, as shown in FIG. 75, since it can be considered that environment such as a shape of the TV receiver for reproducing the moving images is not constant, when a display screen area is correctly extracted as a detection subject region, digital watermark detection succeeds as shown in FIG. 75A. But, there may be a case in which the detection subject region is not correctly extracted when an outside of the TV receiver is detected as the edge as shown in the example of FIG. 75B, or when a frame-like design attached outside the display screen of the TV receiver is detected as shown in the example of FIG. 75C.

In such cases, the watermark pattern becomes a contracted shape in the inside of the difference image on the difference image and block dividing cannot be performed correctly. Therefore, digital watermark detection fails in the first to twelfth methods.

Figure 76:
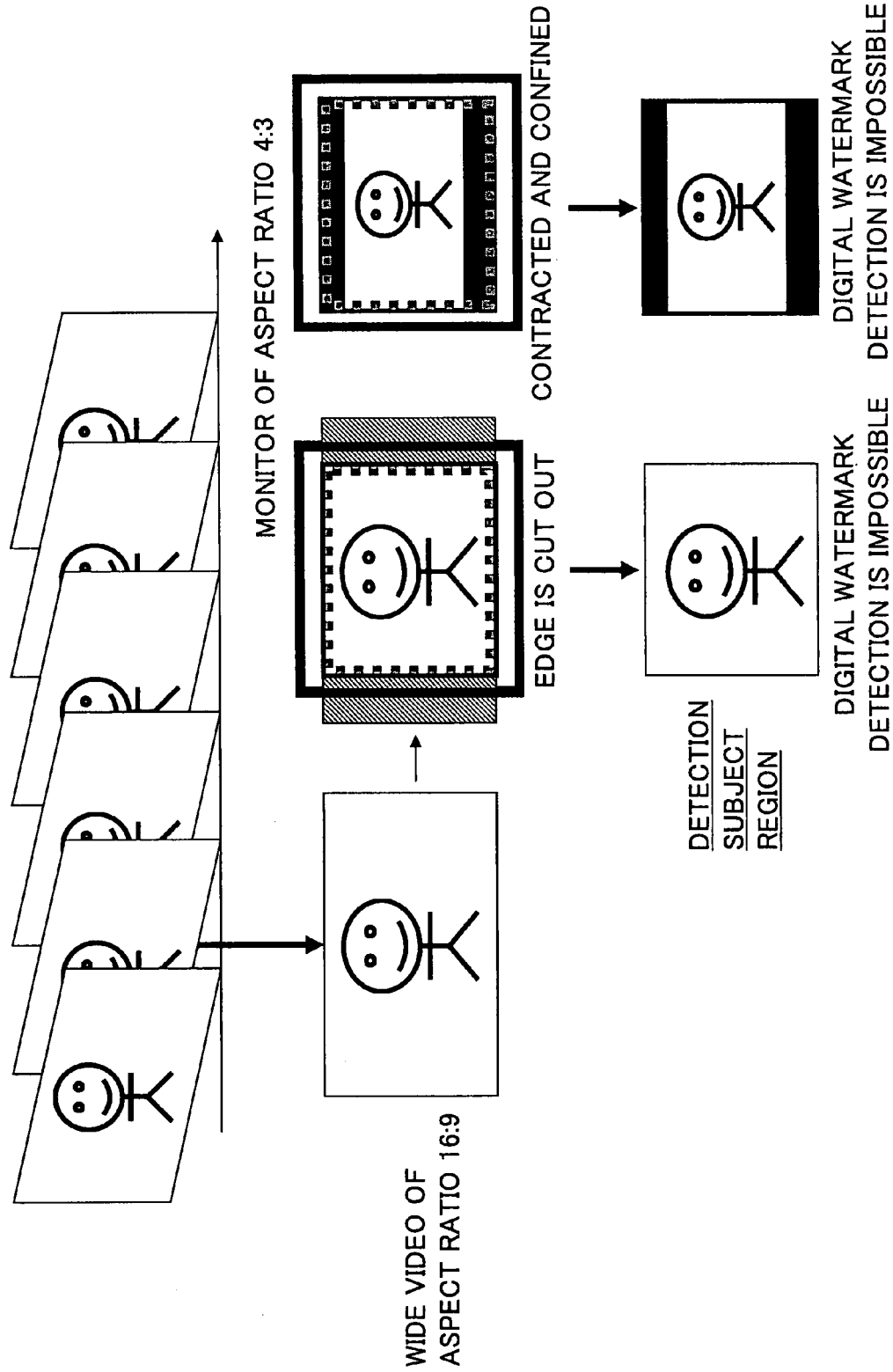
FIG. 76 is a figure (2) for explaining effects of thirteenth embodiment of the present invention.
Figure 77:
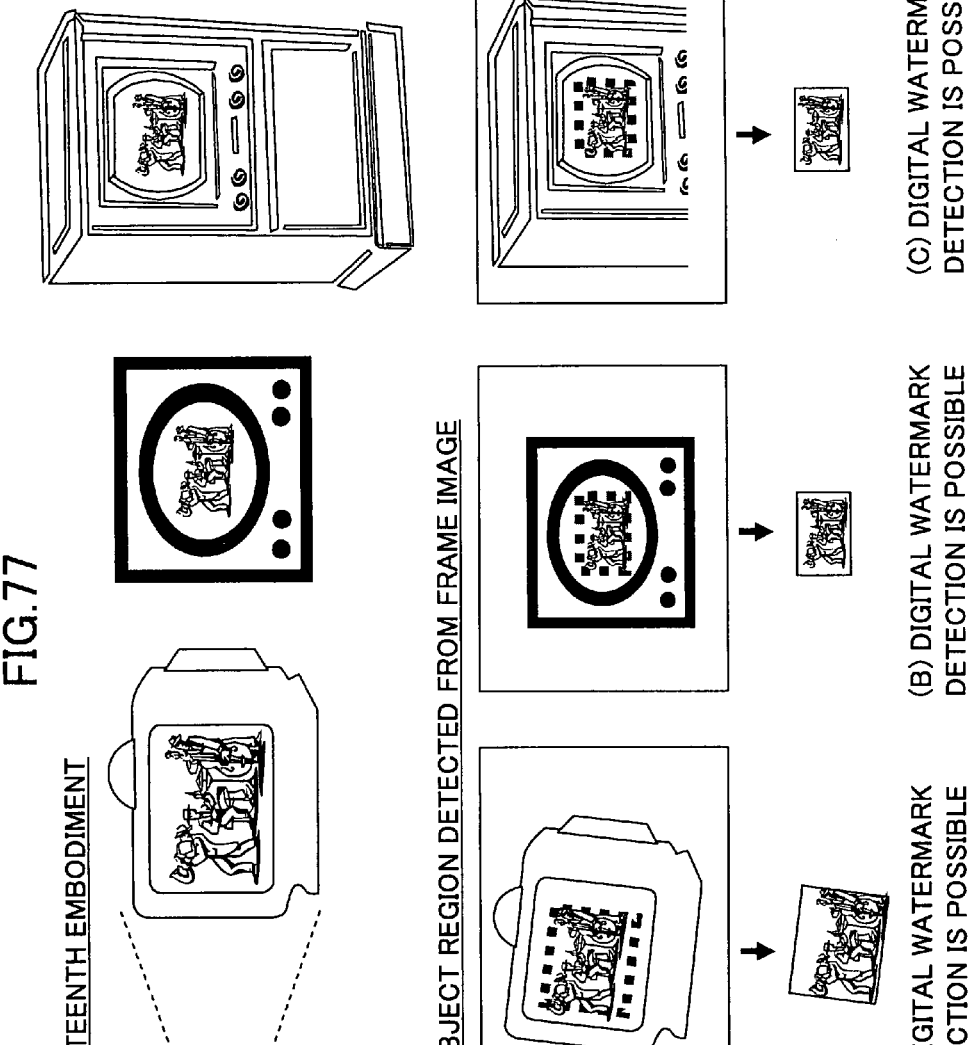
FIG. 77 is a figure (3) for explaining effects of thirteenth embodiment of the present invention.

In addition, as shown in FIG. 76, an example is considered to display original moving image that is a wide video having an aspect ratio of 16:9 on a monitor of an aspect ratio of 4:3. In this case, as display methods that are usually used in general, there are a method for cutting out left and right ends of the wide screen to display the cut out image, and a method for contracting the wide screen of 16:9 so as to fit it into the 4:3 screen. When the image is displayed in such a way, even though the edge of the display screen is correctly detected by detection subject region extraction, since a part of the displayed image itself is cut out or useless white space is added, digital watermark fails in the same way as the example of FIG. 75. As to the problem in that the ends of the screen are cut out, in addition to the case of the wide image, it can be considered that detection of digital watermark becomes difficult due to so-called over scan in which ends of video signals are not displayed when displaying video on a cathode-ray tube so that a part of the video signals is cut out.

Figure 78:
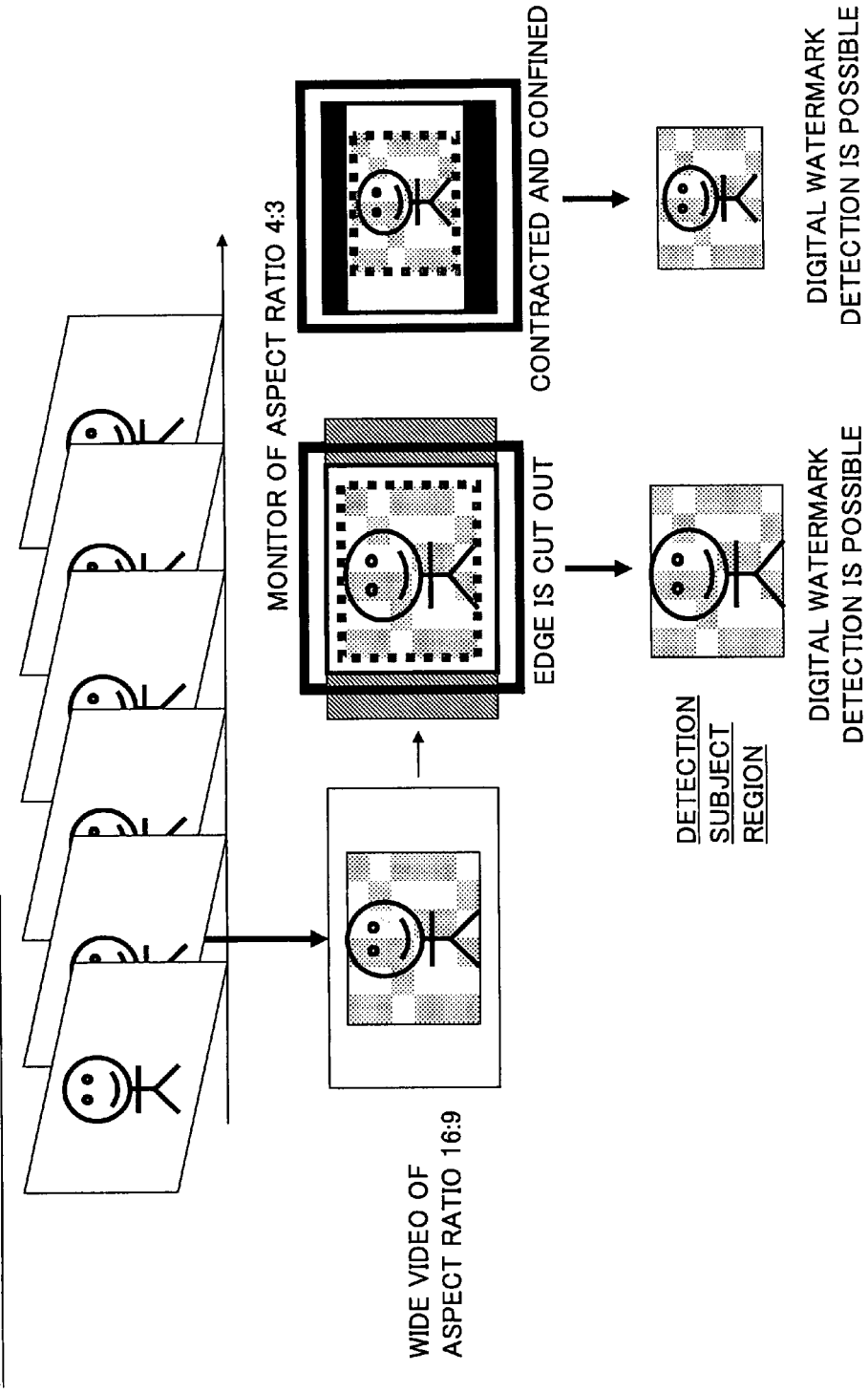
FIG. 78 is a figure (4) for explaining effects of thirteenth embodiment of the present invention.

The present embodiment is for solving the problems, and the size of the watermark pattern is decreased to a size smaller than a size of the frame image so that it is superimposed onto a center area of the frame image. Accordingly, for example, in anticipation of lack of the frame image when displaying a wide screen by the ratio 4:3, the watermark pattern can be superimposed only on an region that is surly displayed. However, if nothing is done, the detection subject region does not agree with the watermark pattern region when performing detection. Therefore, in this embodiment, the difference frame image between captured frame images is generated as shown in FIG. 73, and the detection subject region is extracted from the difference frame image as shown in FIG. 74. When it is assumed that there is little movement when taking images with a camera, (absolute value of) difference only in the detection subject region becomes large by switching watermark patterns in the difference frame image. Accordingly, the detection subject region is extracted by a rectangular recognition technique using edges and the like, so that digital watermark detection becomes possible as shown in FIGS. 77 and 78.

Fourteenth Embodiment

The present embodiment is the same as the thirteenth embodiment except for parts described below.

Figure 79:
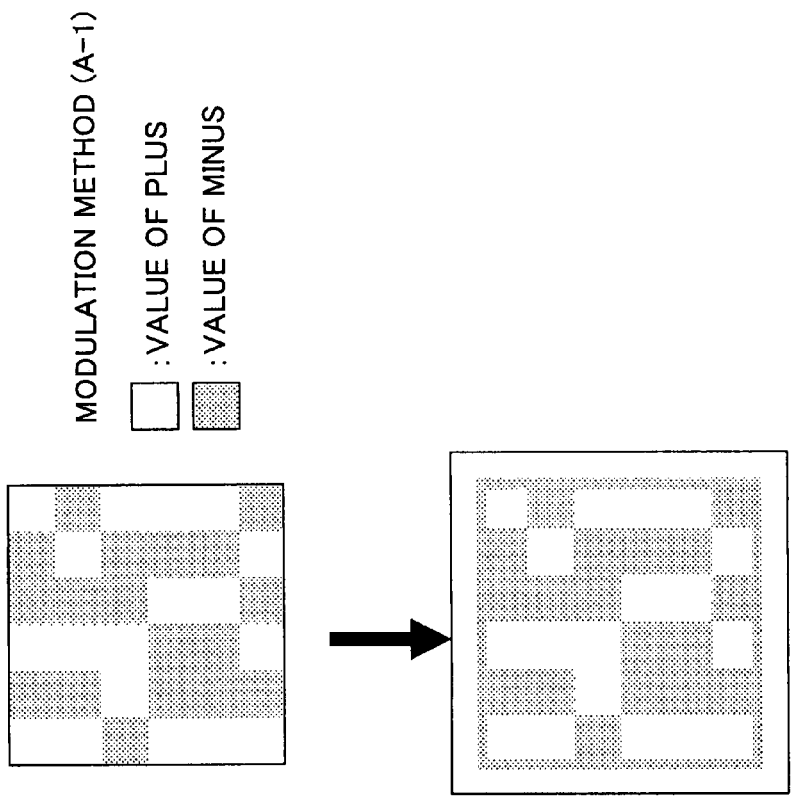
FIG. 79 is a figure for explaining processes of the basic watermark pattern generation unit of the fourteenth embodiment of the preset invention.

FIG. 79 is a figure for explaining processes of the basic watermark pattern generation unit of the fourteenth embodiment of the preset invention.

The basic watermark pattern generation unit 121 of the watermark pattern generation unit 120 in this embodiment adds a frame to the basic watermark pattern generated in the same way as the first to twelfth embodiments using plus/minus pixel values so as to regard the frame added pattern as a basic watermark pattern.

FIG. 80 is a figure for explaining processes of the detection subject region extraction unit in the fourteenth embodiment of the present invention.

The detection subject region extraction unit 220 receives a difference frame image, extracts the detection subject region that becomes a subject for watermark detection to obtain the detection subject region image. As shown in FIG. 80, the detection subject region extraction unit 220 detects distortion parameters of the detection subject region using an edge detection method of the document 3 for the difference frame image so as to perform distortion correction and normalize the size to obtain the detection subject region image. Since the detection subject region image obtained in this way is the same as the basic watermark pattern used for embedding excluding effects due to noise and the like, it is obvious that detection of digital watermark becomes possible from contents of the first to twelfth embodiments.

Also, it is obvious that the present embodiment can be carried out by arbitrarily combining with each contrivance of the first to thirteenth embodiments.

<Effects of the Present Embodiment>

Effects of the present embodiment are described using FIGS. 81A and 81B. In the detection subject region extraction process in the thirteenth embodiment, region extraction is performed by performing edge detection using absolute values of the difference frame image. At this time, since absolute values of the difference frame image is used, contrast of the edge part has a difference twice the watermark pattern amplitude when embedding disregarding effects due to noise.

In this embodiment, a frame having plus/minus pixel values is added to the basic watermark pattern of the first to twelfth embodiments. When extracting a detection subject region, region extraction is performed by performing edge recognition from the difference frame image as it is. Therefore, contrast of edge of the edge part becomes four times the watermark pattern amplitude for embedding, so that edge detection can be easily performed compared with the thirteenth embodiment. Therefore, the detection subject region can be extracted more surly with higher reliability so as to be able to realize improvement of digital watermark detection performance.

Fifteenth Embodiment

The present embodiment is the same as the fourteenth embodiment except for parts described below.

Processes of the basic watermark pattern generation unit 121 in the watermark pattern generation unit 120 in the digital watermark embedding apparatus of the present embodiment are described.

Figure 82:
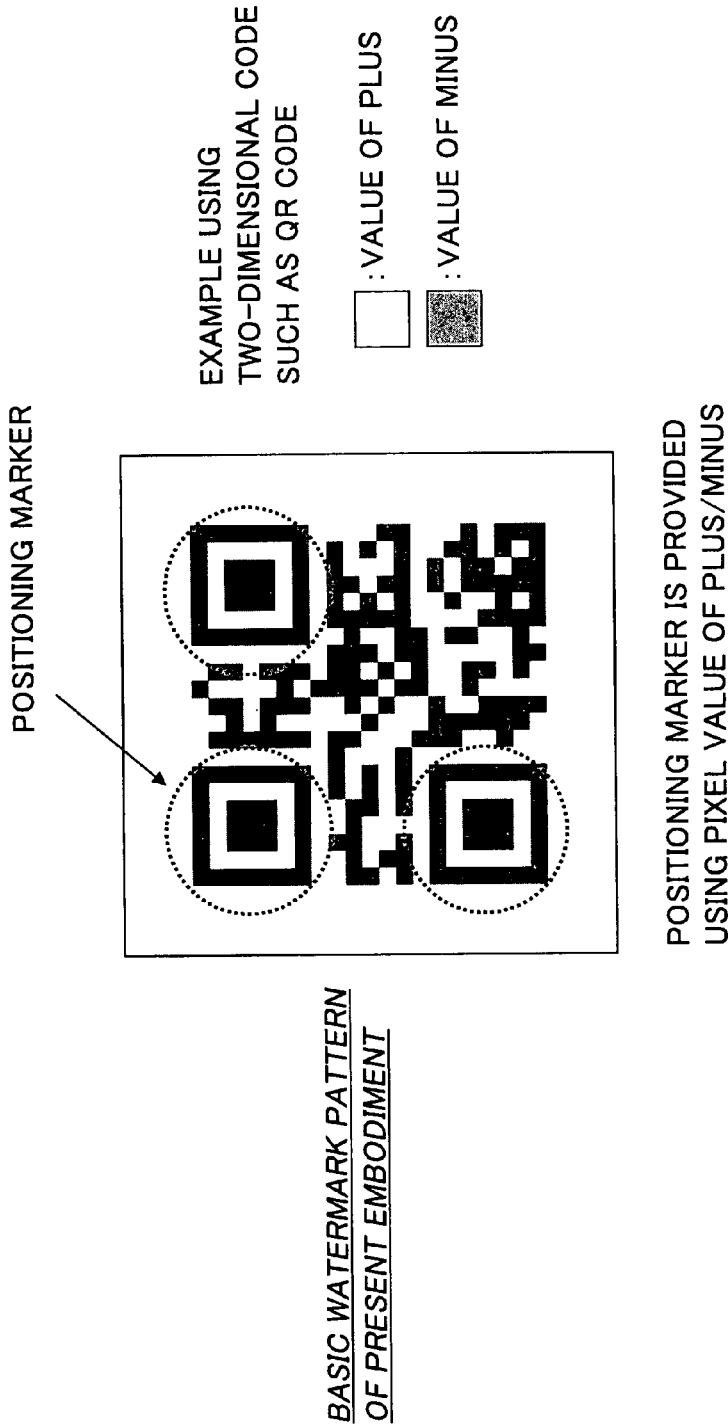
FIG. 82 is a figure for explaining processes of the basic watermark pattern generation unit of the fifteenth embodiment of the preset invention.

FIG. 82 is a figure for explaining processes of the basic watermark pattern generation unit of the fifteenth embodiment of the present invention.

The basic watermark pattern generation unit 121 in the present embodiment adds a marker for position adjustment to the basic watermark pattern generated in the same way as the first to twelfth embodiments using plus/minus pixel values so as to regard the marker added pattern as a basic watermark pattern. The frame in the fourteenth embodiment can be also considered to be an example of a marker for position adjustment. In FIG. 82, a marker for position adjustment for finding corners used in two-dimensional code such as QR code (registered trademark) is added as the positioning marker. By the way, the basic watermark pattern of FIG. 82 is one obtained by changing pixel values of the QR code (registered trademark) to plus/minus. In this way, it is no problem to use two-dimensional code itself as the basic watermark pattern.

Next, the detection subject region extraction unit 220 in the present embodiment is described.

Figure 83:
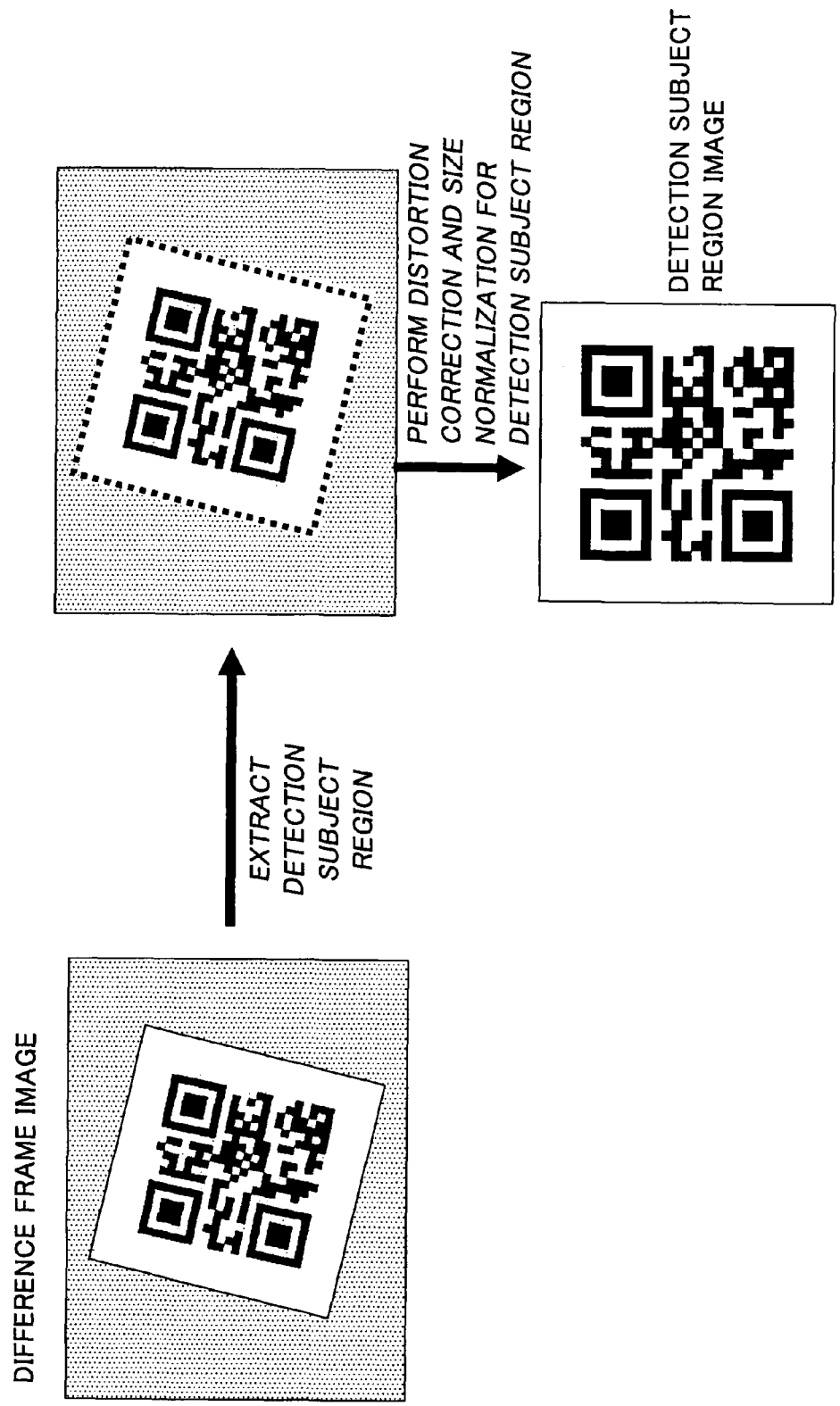
FIG. 83 is a figure for explaining processes of the detection subject region extraction unit in the fifteenth embodiment of the present invention.

FIG. 83 is a figure for explaining processes of the detection subject region extraction unit in the fifteenth embodiment of the present invention.

The detection subject region extraction unit 220 receives the difference frame image and extracts the detection subject region that is a subject of digital watermark detection in the difference frame image to obtain a detection subject region image. In FIG. 83, the detection subject region is extracted from the difference frame image by a method similar to that for detecting a positioning marker used for reading normal QR code (registered trademark).

By the way, when the two-dimensional code is used as the basic watermark pattern like this embodiment, it is obvious that the digital watermark detection unit 240 can detect watermark information without problem considering that the digital watermark detection unit 240 performs two-dimensional code reading process. In addition, also, it is obvious that the present embodiment can be carried out by arbitrarily combining with each contrivance of the first to twelfth embodiments.

<Effects of the Present Embodiment>

In the present embodiment, an example is shown in which the positioning marker, which was the frame in the fourteenth embodiment, is used as a marker for specifying the corners. Also in this embodiment, like the fourteenth embodiment, contrast difference between bright and dark in the difference frame image becomes four times the watermark pattern amplitude used when embedding so that detection performance improves.

In addition, according to the present embodiment, it can be understood that the existing two-dimensional code pattern can be easily diverted as a method for digital watermark generation. Accordingly, cost reduction effect can be obtained by using existing components as a part of the digital watermark embedding/detection apparatuses.

Sixteenth Embodiment

In the present embodiment, an example is described in which a detection subject region is extracted from a difference image between feature region images for which distortion of the feature region has been corrected and size normalization has been performed.

The present embodiment is the same as the thirteenth to fifteenth embodiments except for parts described below.

The digital watermark detection apparatus of the present embodiment is described.

Figure 84:
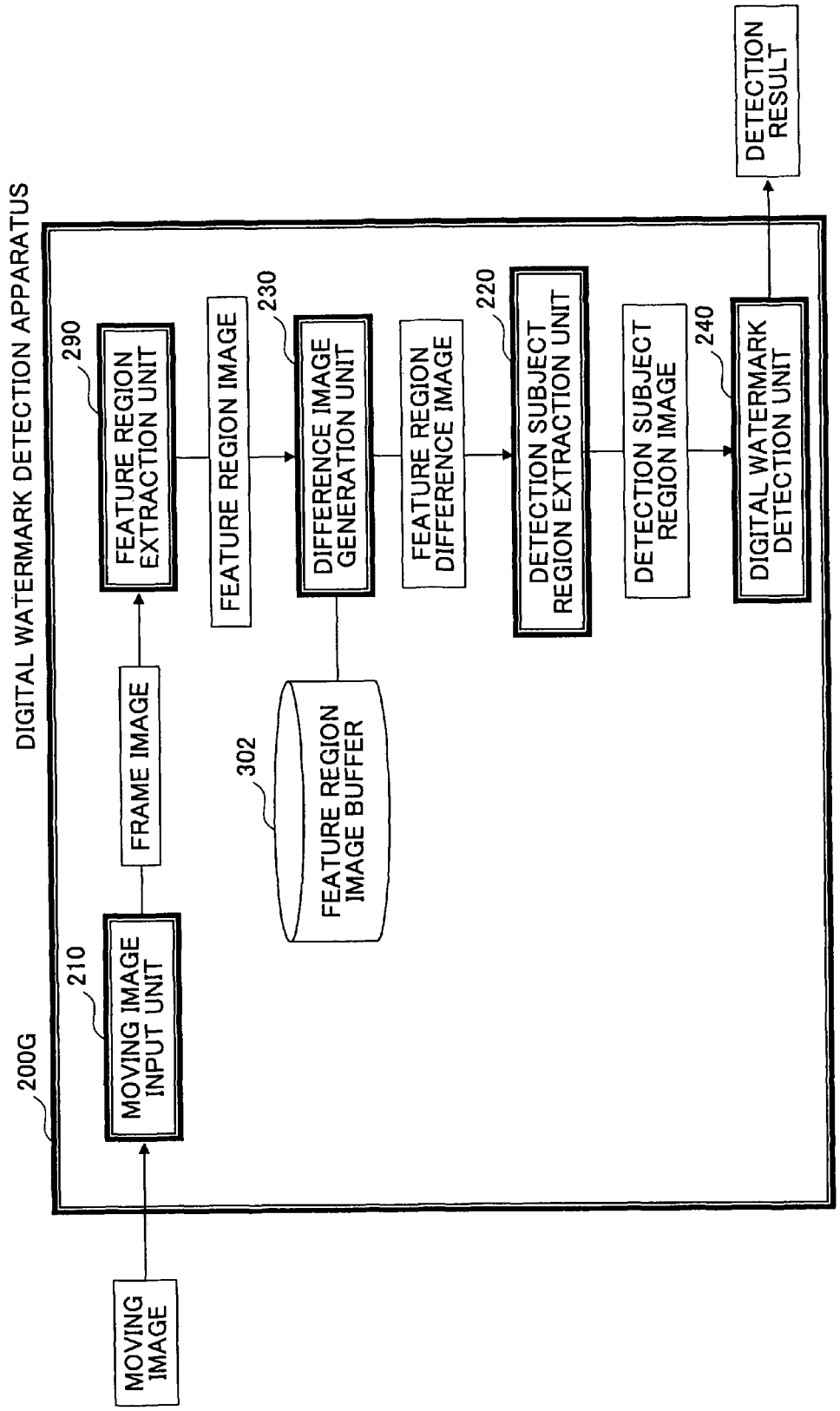
FIG. 84 is a block diagram of the digital watermark detection apparatus in the sixteenth embodiment of the present invention.

FIG. 84 shows a configuration of the digital watermark detection apparatus in the sixteenth embodiment of the present invention. The digital watermark detection apparatus 200G shown in the figure includes a moving image input unit 210, a feature region extraction unit 290, a difference image generation unit 230, a detection subject region extraction unit 220, a digital watermark detection unit 240, and a feature region image buffer 302.

Operation of the digital watermark detection apparatus configured as mentioned above is described.

Figure 85:
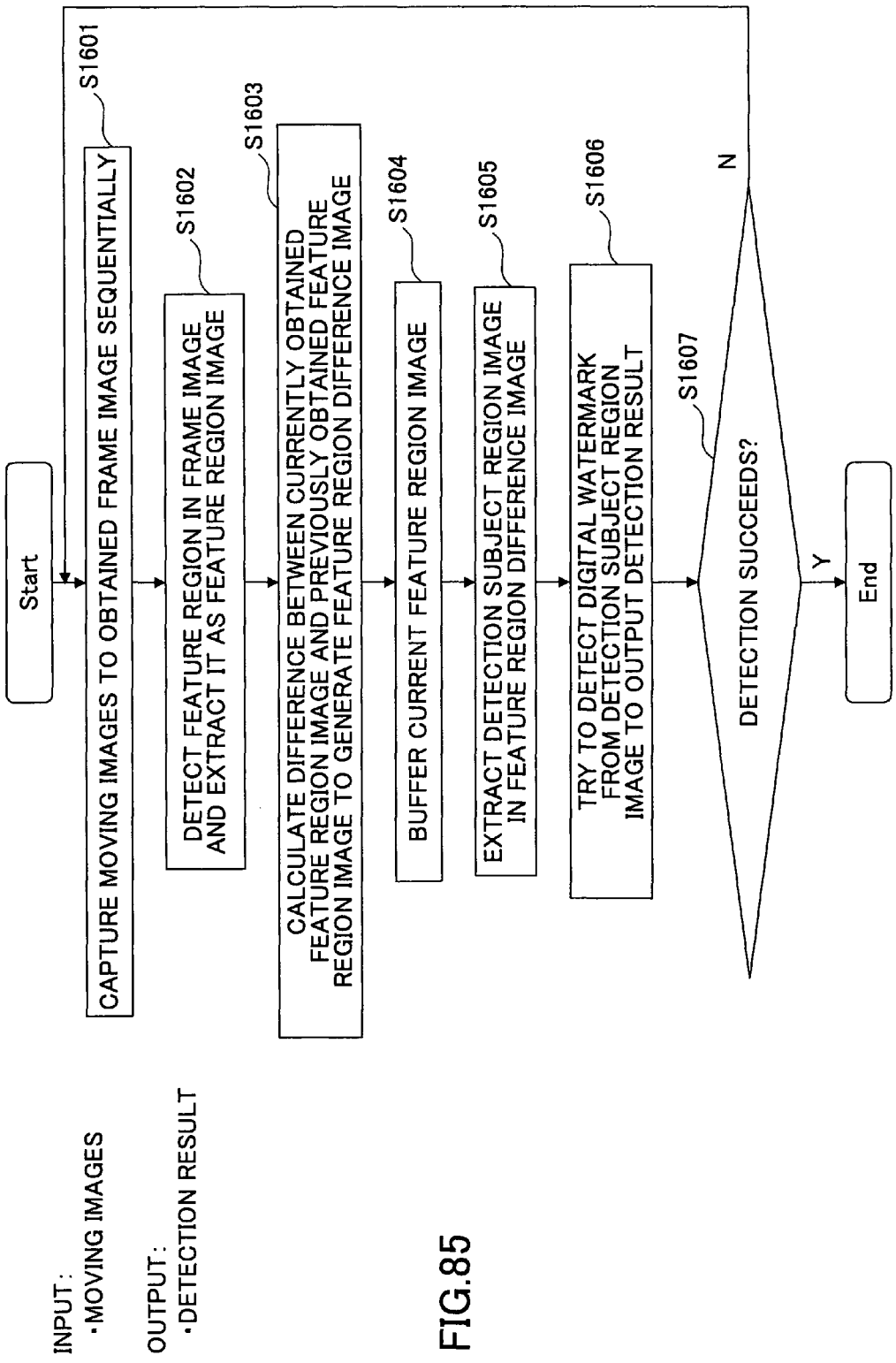
FIG. 85 is a flowchart of operation of the digital watermark detection apparatus in the sixteenth embodiment of the present invention.

FIG. 85 is a flowchart of operation of the digital watermark detection apparatus in the sixteenth embodiment of the present invention.

Step 1601) The moving image input unit 210 receives analog moving images displayed on a TV that are video-captured in real time by a camera or receives MPEG encoded digital moving images, and obtains a frame image sequentially. For inputting the analog moving images, camera signals, scanner signals or analog video signals are received to obtain the frame image. For digital moving images, the frame image is obtained by performing decoding process and the like.

Step 1602) Next, the feature region extraction unit 290 extracts a feature region in the frame image. For extracting the feature region, the technique such as rectangular area detection by edge recognition shown in the document 3 is used. Distortion caused by camera taking angle and the like is corrected for the extracted feature region, and after the size is normalized, it is output as a feature region extraction image.

Step 1603) Next, the difference image generation unit 230 obtains a difference between the currently obtained feature region image and a previously obtained feature region image stored in the feature region image buffer 302 to generate a feature region difference image.

Step 1604) In addition, in preparation for next detection trial, the current feature region image is buffered in the feature region image buffer 302.

Step 1605) Next, the detection subject region extraction unit 220 extracts a detection subject region that is a subject for watermark detection from the feature region difference image to obtain a detection subject region image.

Step 1606) Next, the digital watermark detection unit 240 tries to detect digital watermark from the detection subject region image to output a detection result.

Step 1607) When detection of digital watermark does not succeed, the moving image input unit 210 obtains a next frame image to sequentially repeat the above-mentioned process.

Next, contents of processes of the feature region extraction unit 290 are described.

FIGS. 86-90 are figures for explaining processes of the feature extraction unit in the sixteenth embodiment of the present invention.

Figure 86:
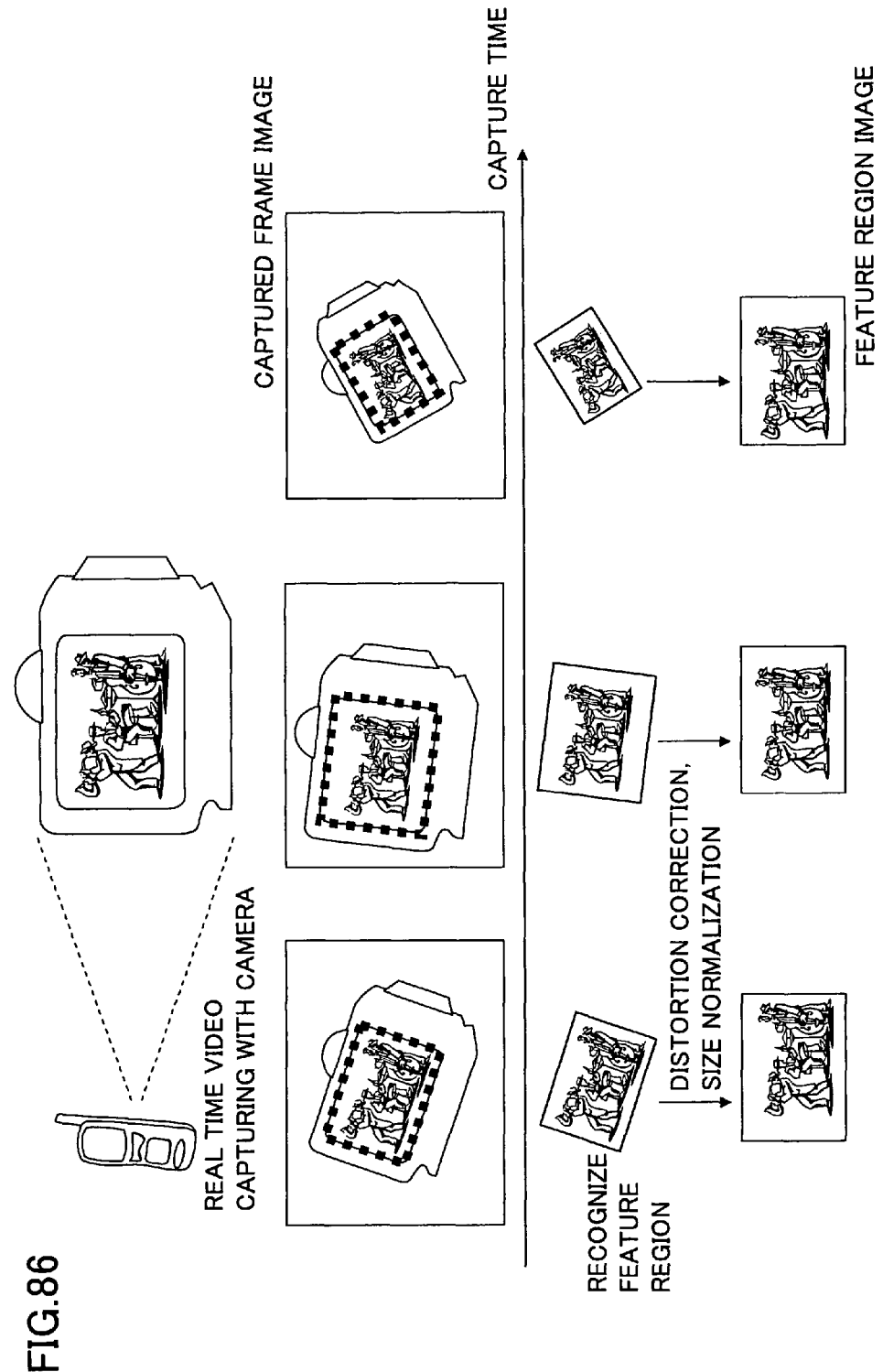
FIG. 86 is a figure (1) for explaining processes of the feature region extraction unit in the sixteenth embodiment of the present invention.
Figure 87:
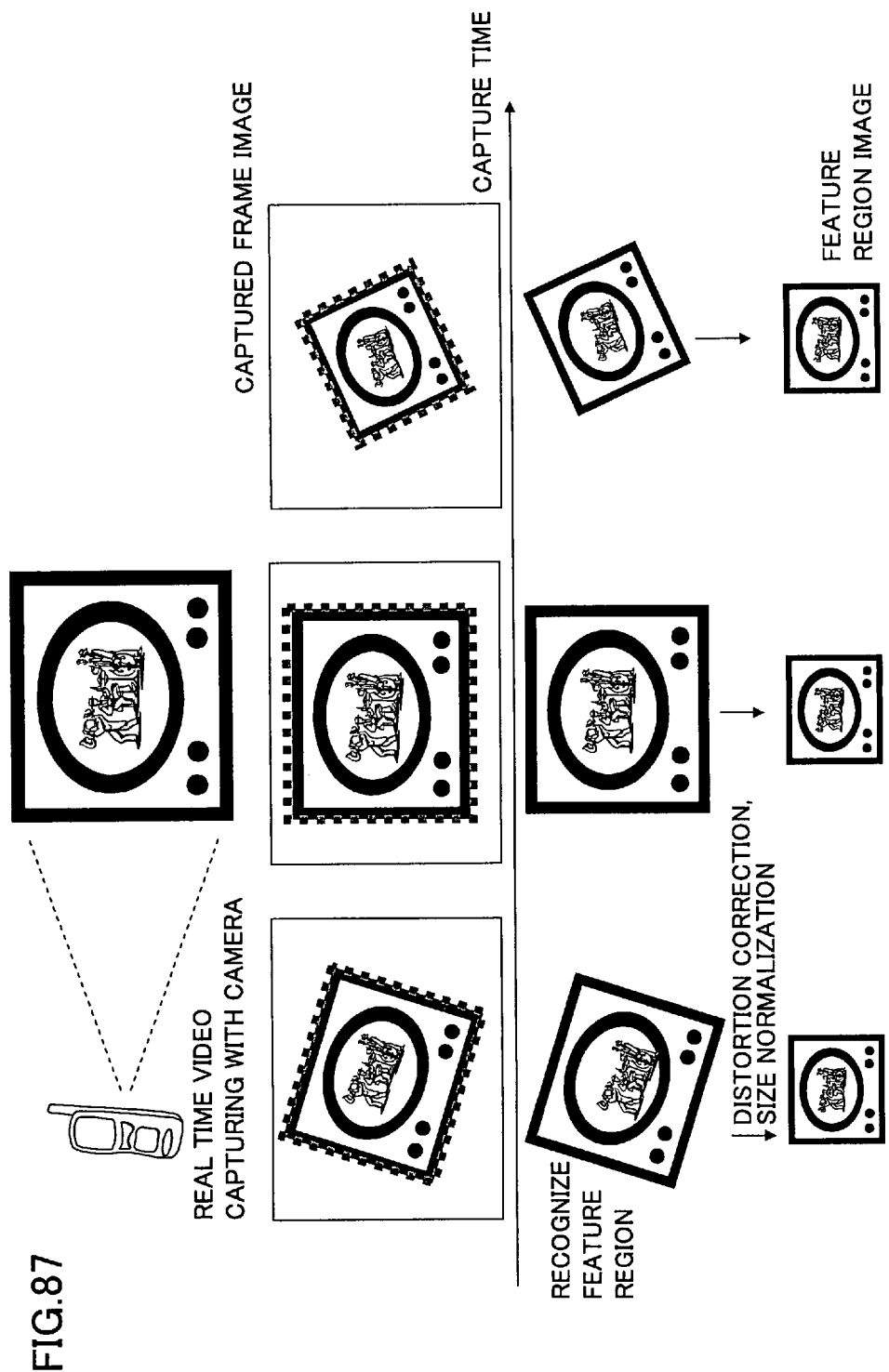
FIG. 87 is a figure (2) for explaining processes of the feature region extraction unit in the sixteenth embodiment of the present invention.
Figure 88:
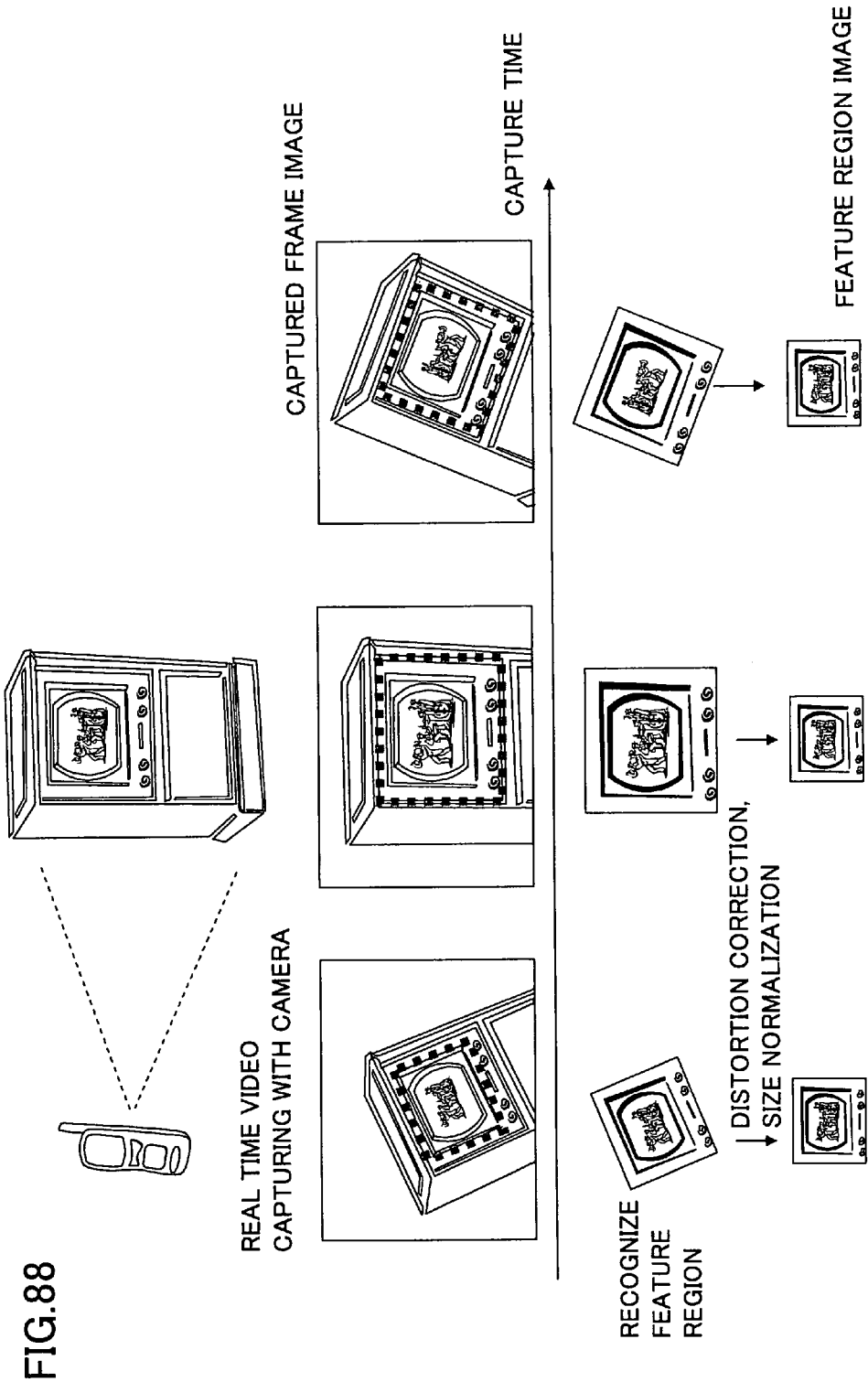
FIG. 88 is a figure (3) for explaining processes of the feature region extraction unit in the sixteenth embodiment of the present invention.
Figure 89:
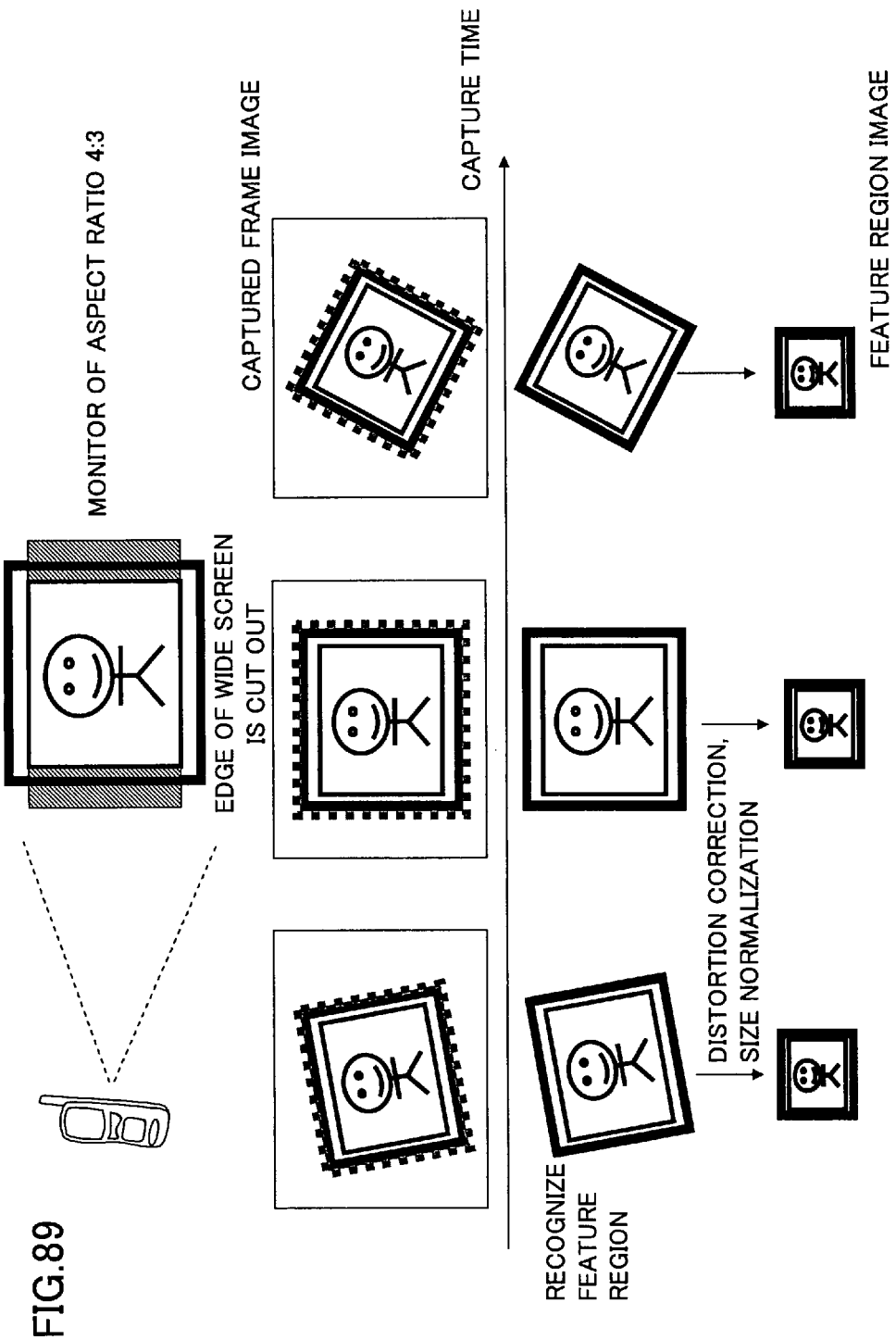
FIG. 89 is a figure (4) for explaining processes of the feature region extraction unit in the sixteenth embodiment of the present invention.
Figure 90:
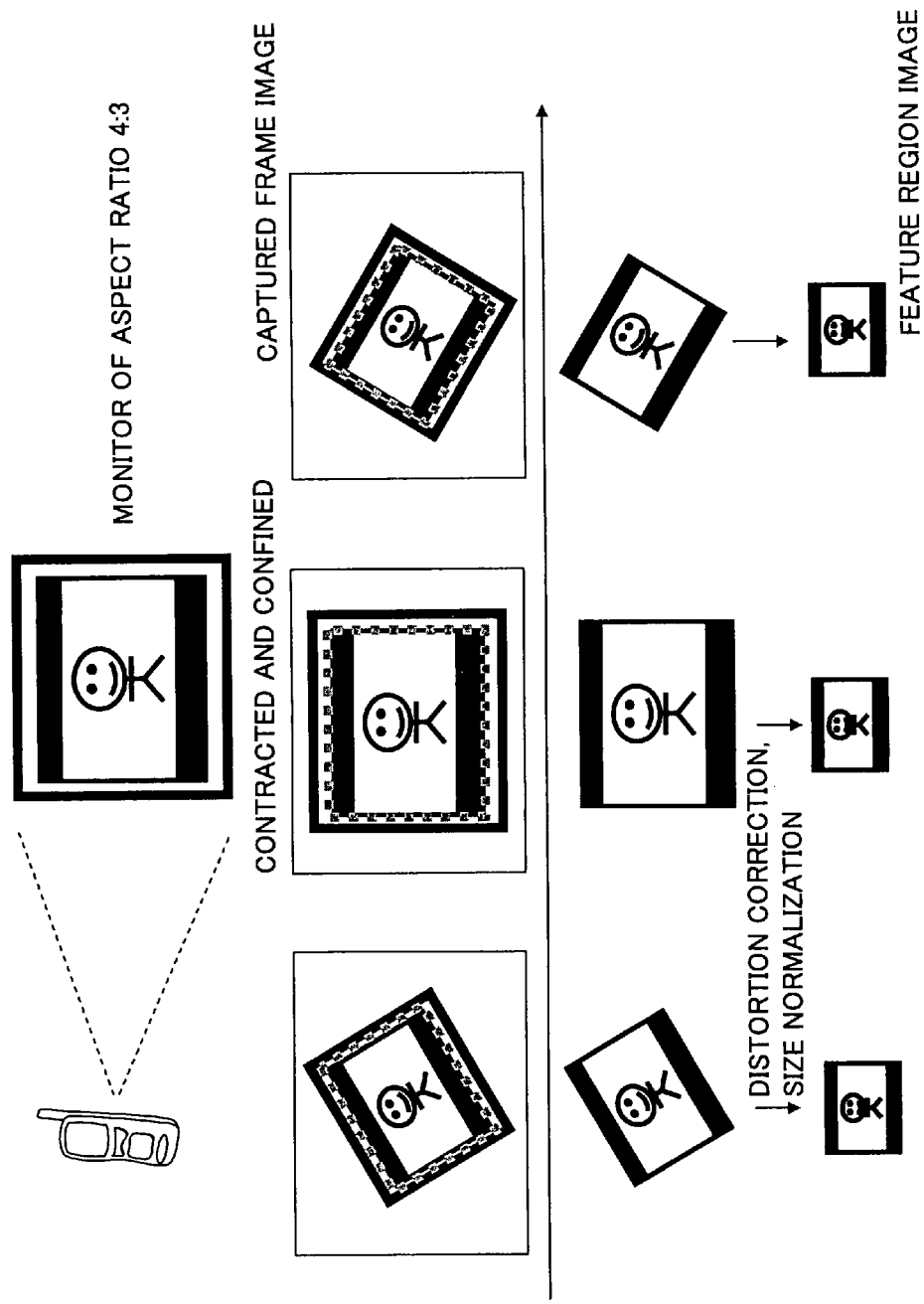
FIG. 90 is a figure (5) for explaining processes of the feature region extraction unit in the sixteenth embodiment of the present invention.

The feature region extraction unit 290 receives a frame image to extract a feature region in the frame image. For extracting the feature region, a technique such as rectangular area detection by edge recognition disclosed in the document 3 is used. Distortion caused by camera taking angle is corrected for the extracted feature region, and the size is normalized so that it is output as a feature region extracted image. By using the rectangular area extraction technique like the document 3, a display region of a TV is detected as the feature region as shown in FIGS. 86 and 90, an outside of a body of a TV is detected as the feature region as shown in FIGS. 87 and 89, or a frame like design outside of the display screen of the TV is detected as the feature region, or although not shown in the figure, a background rectangular region and the like existing behind the TV is detected as the feature region. So, there may be various cases as to the region extracted as the feature region, but an important point is that the feature region images obtained by correcting distortion and normalizing the size can be obtained to be in a same status against picture-taking angle and the like that changes every second according to capturing time as shown in FIGS. 86-90 if feature regions detected from each frame image are substantially the same irrespective of difference of picture-taking angles when taking a same subject.

As long as the condition that "if feature regions detected from each frame image are substantially the same irrespective of difference of picture-taking angles when taking a same subject" is satisfied, the feature region may be detected in any state such as the examples of FIGS. 86 and 90. The feature region extraction method is not limited to the rectangular area detection using edge line shown in the document 3, and any method can be used as long as the method is for stably extracting the feature region from frame images and satisfies the condition.

Next, contents of processes of the difference image generation unit 230 are described.

Figure 91:
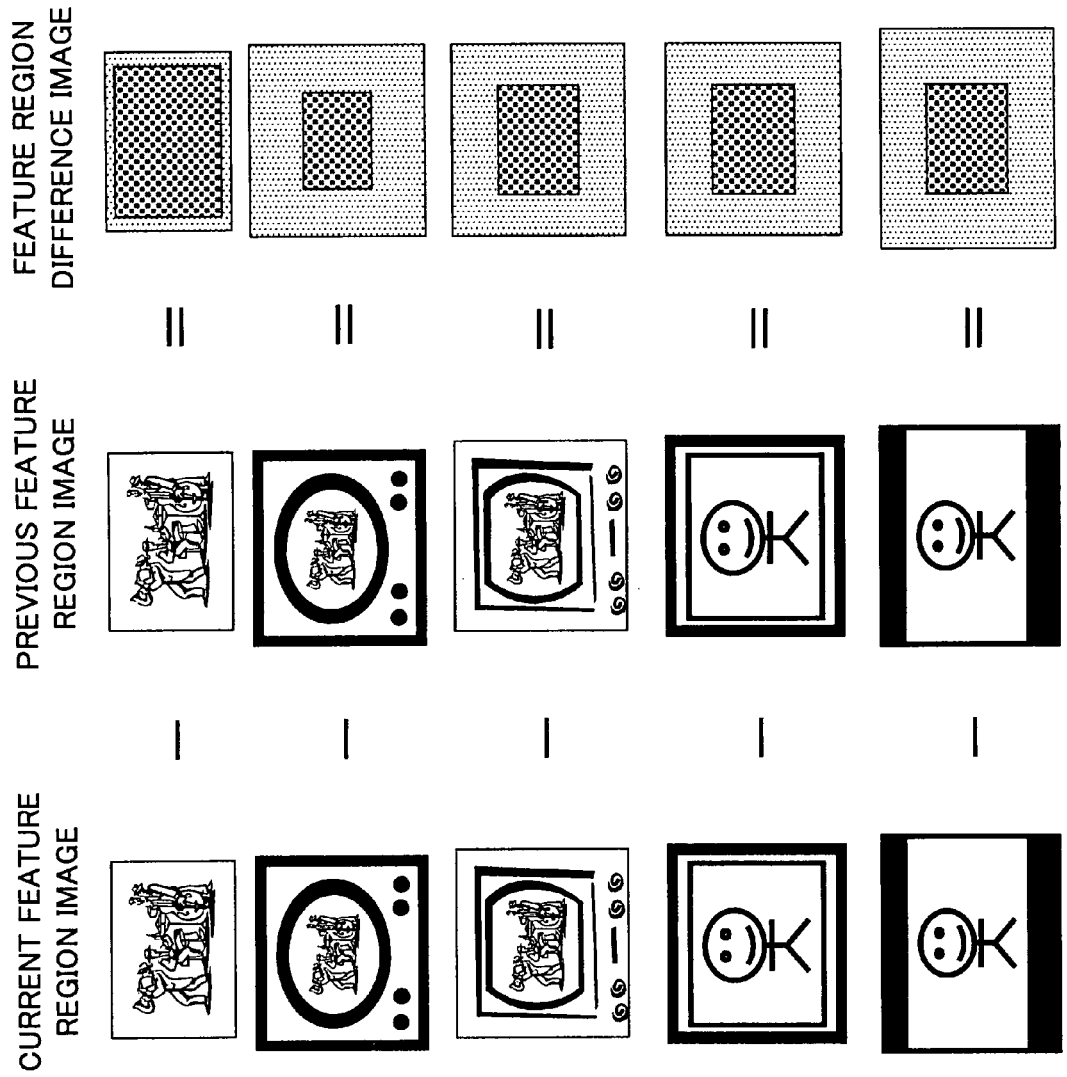
FIG. 91 is a figure (1) for explaining processes of the difference image generation unit in the sixteenth embodiment of the present invention.
Figure 92:
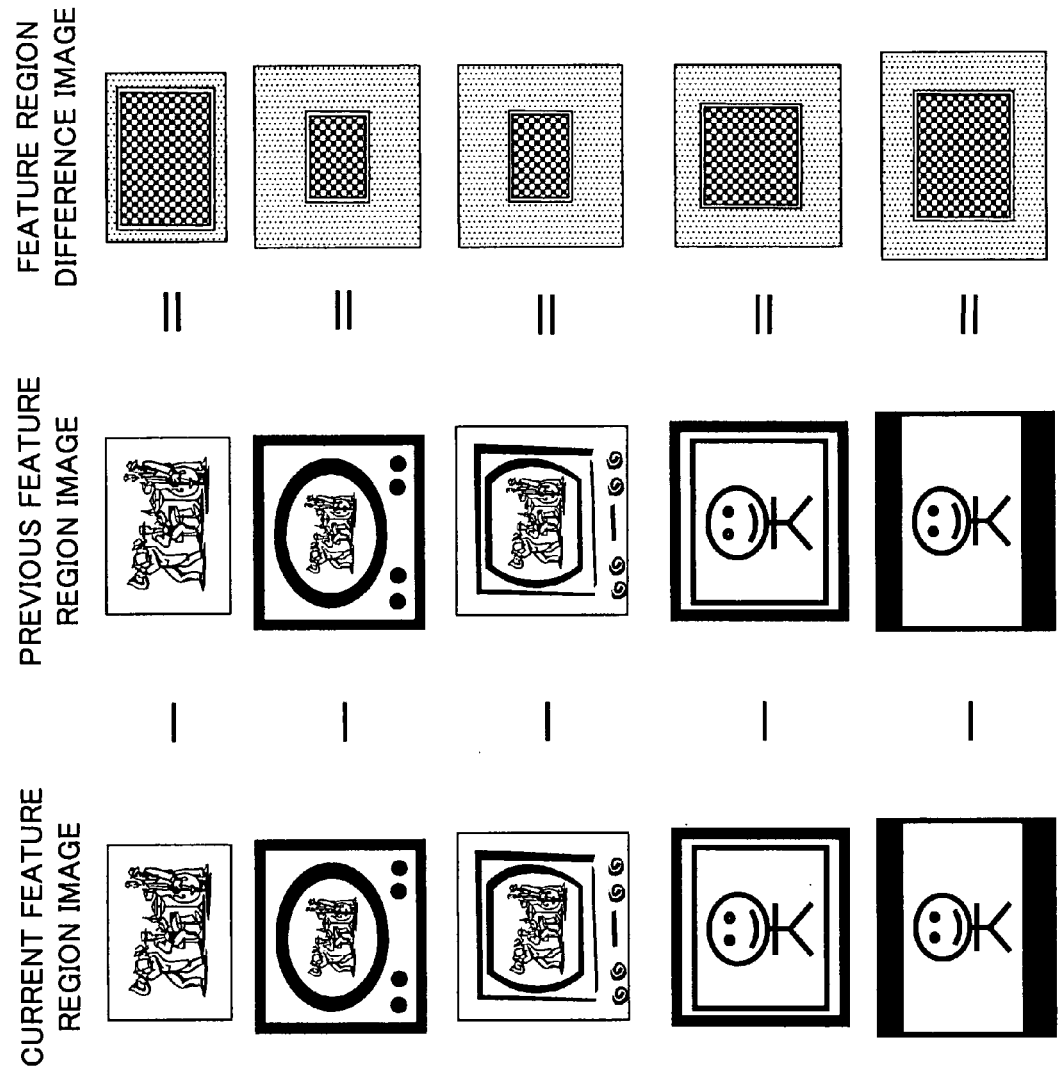
FIG. 92 is a figure (2) for explaining processes of the difference image generation unit in the sixteenth embodiment of the present invention.
Figure 93:
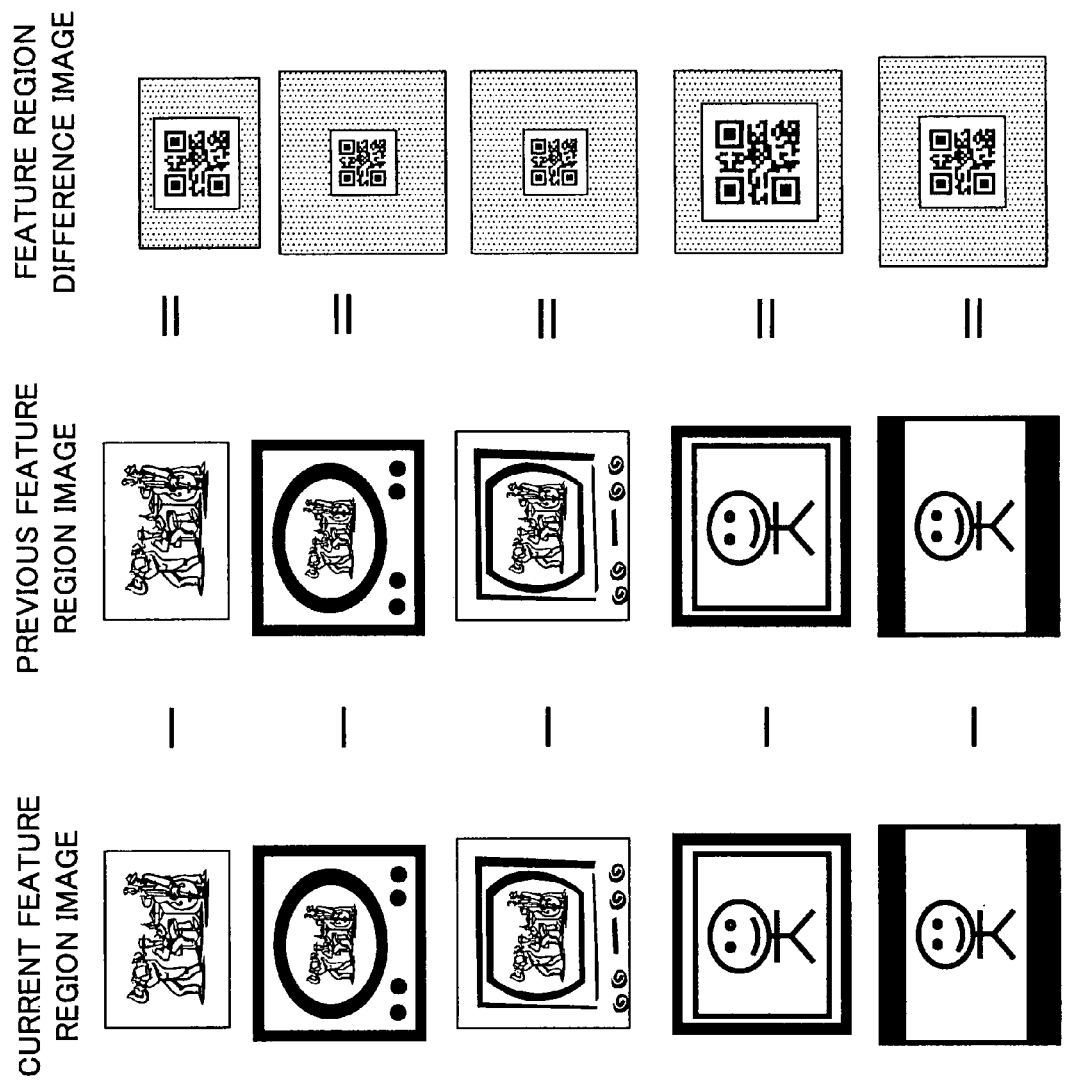
FIG. 93 is a figure (3) for explaining processes of the difference image generation unit in the sixteenth embodiment of the present invention.

FIGS. 91-93 are figures for explaining processes of the difference image generation unit in the sixteenth embodiment of the present invention.

The difference image generation unit 230 obtains a difference between a currently obtained feature region image and a previously obtained feature region image stored in the feature region image buffer 302 to generate a feature region difference image. In addition, in preparation for next detection trial, the current feature region image is buffered in the feature region image buffer 302. As shown in FIGS. 91-93, difference of distortion caused by camera movement between captured frames is absorbed by the feature region extraction process. Thus, as to the feature region difference image obtained as time-difference of feature region images, change amount of difference in a part caused by watermark pattern switching is large, and there is little difference in other parts. Accordingly, like the detection subject region extraction process in the thirteenth to fifteenth embodiments, digital watermark information can be detected by trying to detect digital watermark after extracting the detection subject region from the feature region difference image and correcting distortion and the like.

<Effects of the Present Embodiment>

In this embodiment, in addition to the effects of the thirteenth to fifteenth embodiments, digital watermark detection becomes possible without the presupposed limitation that "when there is little camera movement when taking images". The reason is that distortion is corrected after extracting the feature regions for each captured frame image to absorb difference of distortion between frames so that subtraction for watermark pattern parts is surly performed without displacement in subsequent difference image generation. Accordingly, digital watermark detection performance improves without receiving effects of hand movement and the like caused when performing image capturing from a TV by holding a camera-equipped mobile-phone with one hand, for example.

Seventeenth Embodiment

In the present embodiment, an example is described for extracting a feature region/detection subject region by searching only a neighborhood of a position where digital watermark detection status is good.

This embodiment is the same as the thirteenth to sixteenth embodiments except for parts described below. In the following, differences from the sixteenth embodiment is mainly described.

First, contents of processes of the feature region extraction unit 290 in the digital watermark detection apparatus 200G are described.

Figure 94:
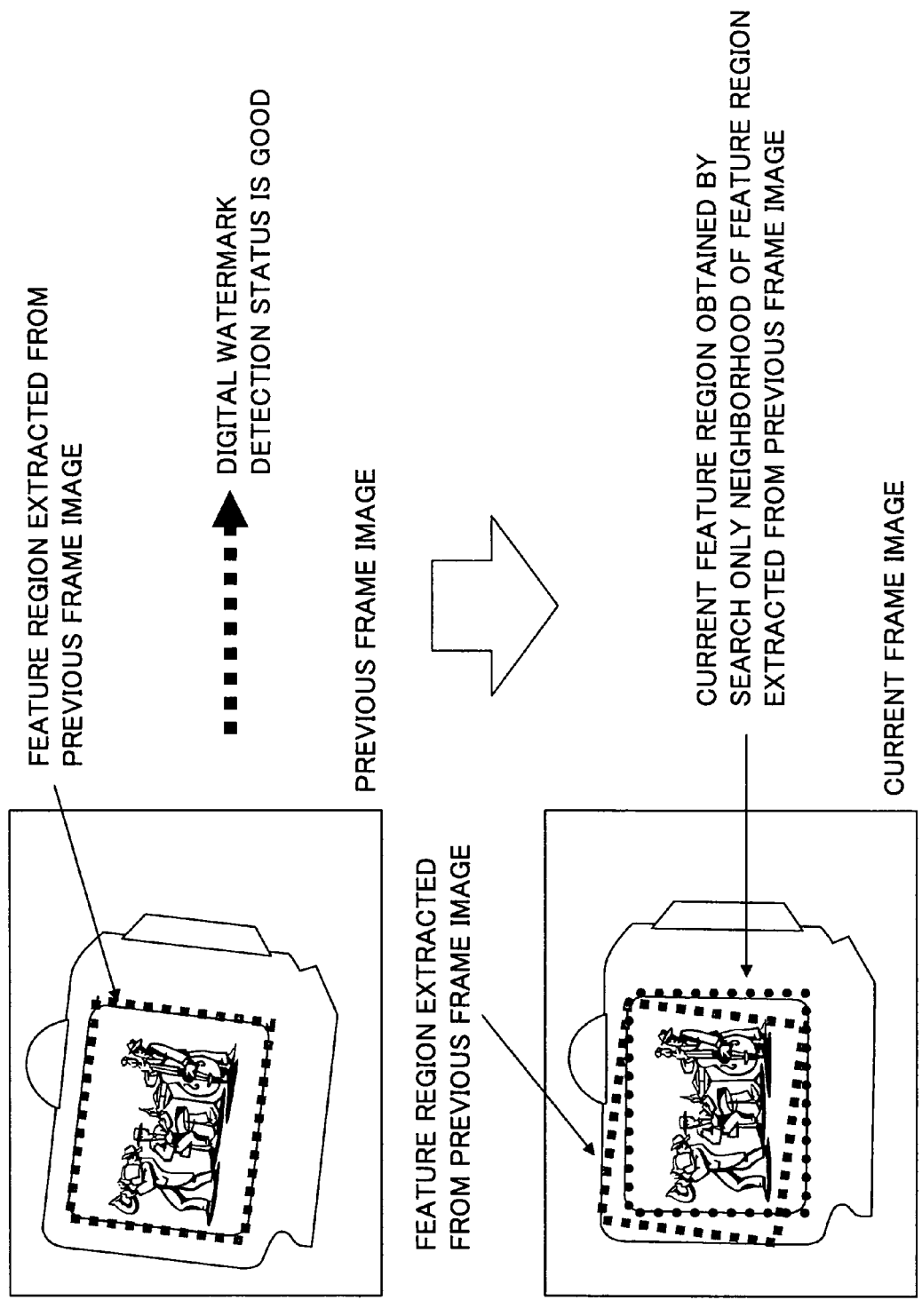
FIG. 94 is a figure for explaining processes of the feature region extraction unit in the seventeenth embodiment of the present invention.

FIG. 94 is a figure for explaining processes of the feature region extraction unit in the seventeenth embodiment of the present invention.

The feature region extraction unit 290 in this embodiment memorizes (stores in some way) a position and a shape of the feature region corresponding to a time when detection status is good in previous digital watermark detection trial. When searching the currently received frame image for a feature region, the feature region extraction unit 290 searches only a neighborhood of a previous feature region. Camera movement is not so large in a capturing time interval for two images for which subtraction calculation is performed. Therefore, when previous detection status is good, a correct feature region exists in a neighborhood of the previous feature region in a current frame image. By using this principle, more stable feature region extraction is realized by narrowing the feature region search area.

By the way, "detection status is good" indicates a state in which a detection reliability indicator value in the document 1 is significant for some extent but digital watermark detection does not yet succeed, or a state in which detection of a data block succeeds when performing detection of each data block in the eighth embodiment. That is, "detection status is good" indicates a case in which existence of digital watermark is significantly obvious from detection status of the digital watermark detection unit 240. In addition, a size of the neighborhood when performing the search may be changed according to the capturing time interval between the two images for which subtraction is calculated. For example, when the capturing time interval is short, since it can be predicted that movement amount of the camera is small, the size of the neighborhood is determined to be small. In contrast, when the capturing time interval is long, since it can be predicted that there may be a case in which the movement amount of the camera is large, the size of the neighborhood may be determined to be large.

Contents of processes of the detection subject region extraction unit 220 are described.

Figure 95:
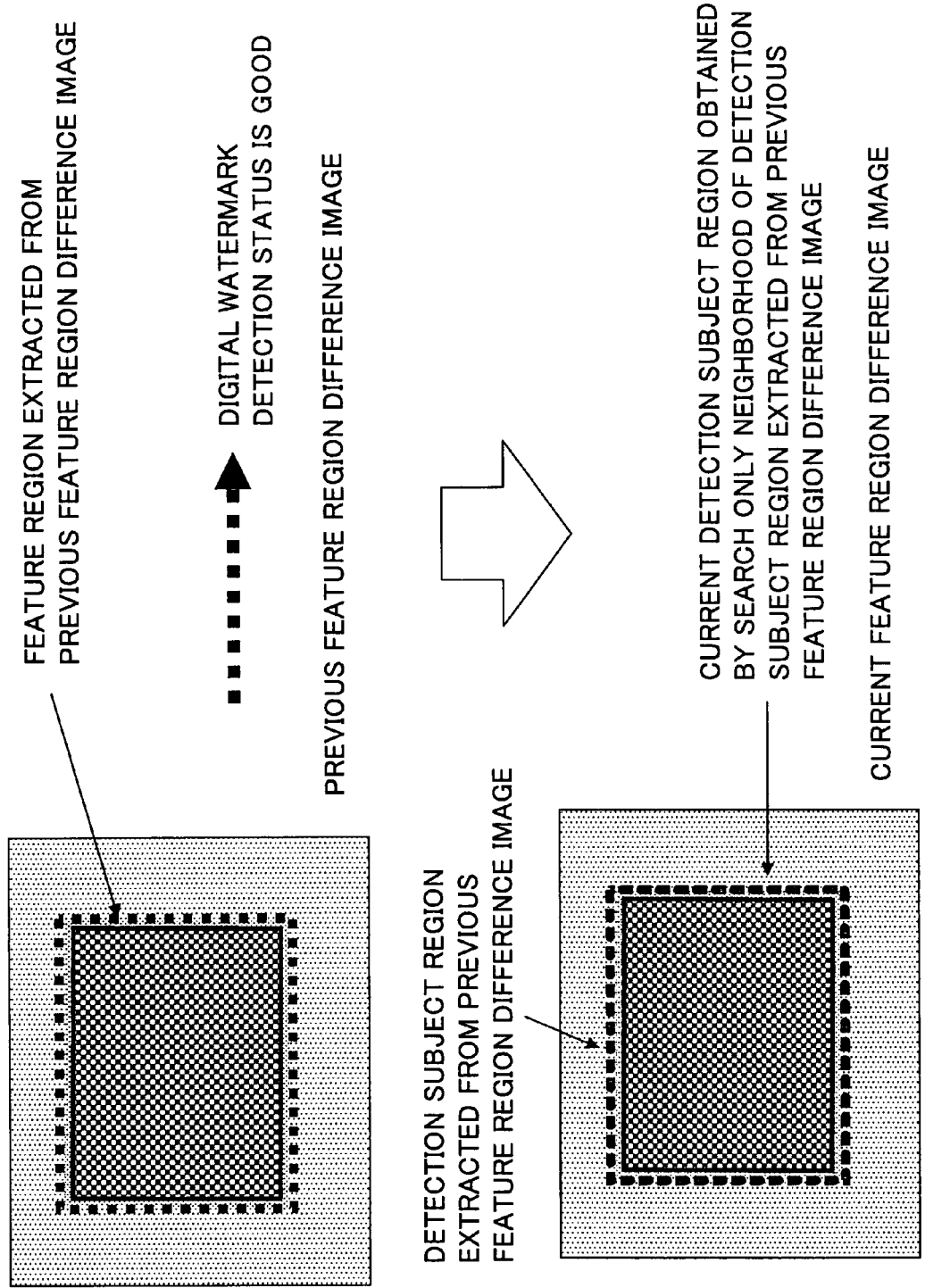
FIG. 95 is a figure for explaining processes of the feature region extraction unit in the seventeenth embodiment of the present invention.
Figure 96:
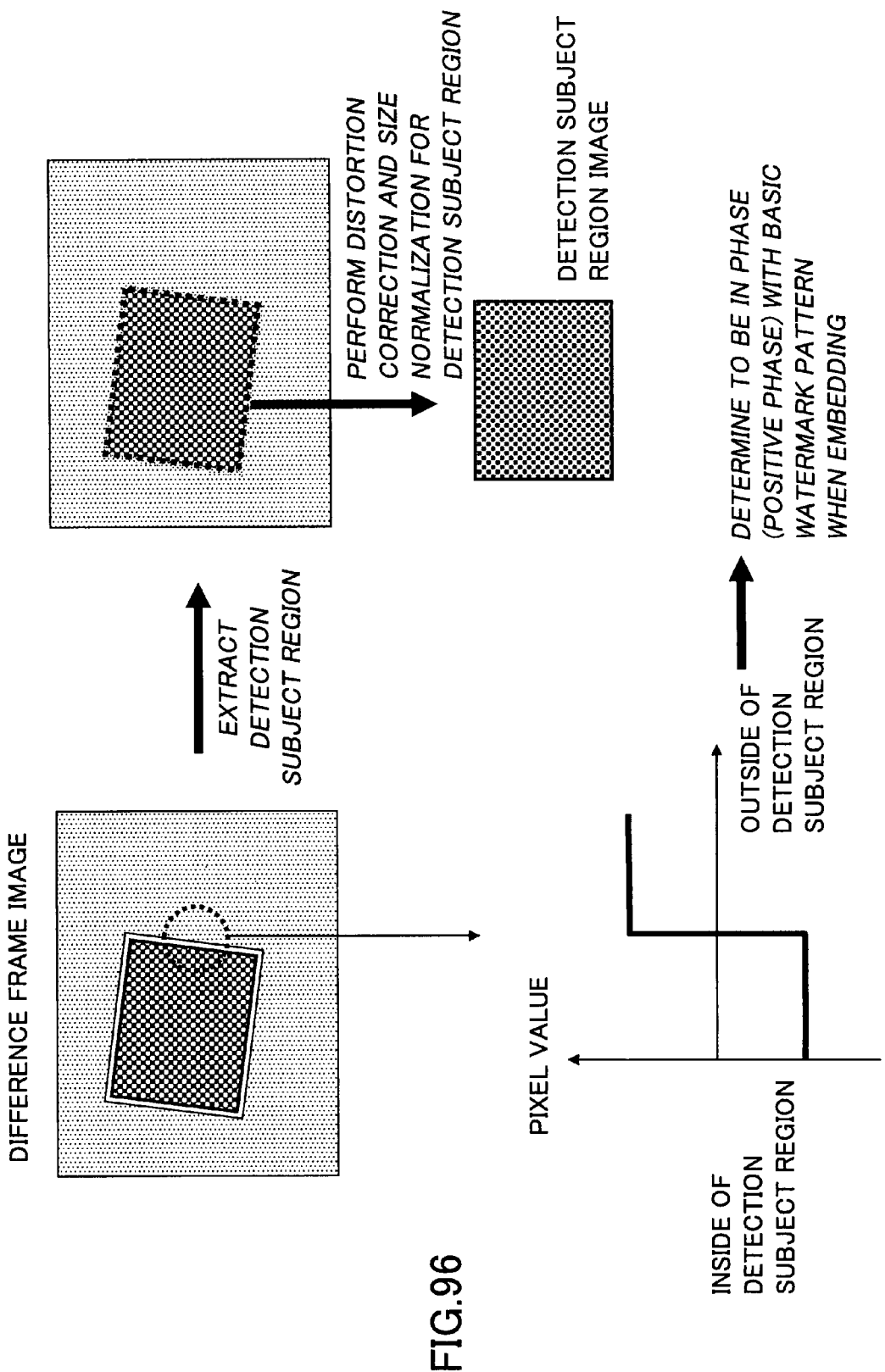
FIG. 96 is a figure (1) for explaining processes of the detection subject region extraction unit in the eighteenth embodiment of the present invention.

FIG. 95 is a figure for explaining processes of the detection subject region extraction unit in the seventeenth embodiment of the present invention.

Also when extracting a detection subject region, in the same way as the feature region extraction unit 290, the detection subject region extraction unit memorizes (stores in some way) a position and a shape of the detection subject region corresponding to a time when detection status is good in previous digital watermark detection trial. When searching the currently received feature region difference image for a detection subject region, the unit searches only a neighborhood of a previous feature region. Accordingly, it can be also performed stably to search for the detection subject region.

By the way, when applying this embodiment to the sixteenth embodiment, since distortion factor due to camera movement and the like is absorbed by the feature region extraction process, a previous detection subject region is almost the same as a current detection subject region as shown in FIG. 95. Thus, the neighborhood size can be taken to be small. As a possible factor for failing extraction of the detection subject region, there is a case in which, when the moving image itself is a scene including movement, not only the watermark pattern but also movement component of moving images appears as noise in the difference. For this case, by using a small size neighborhood, search for the detection subject region becomes very stable.

When applying this embodiment to the thirteenth to fifteenth embodiments, since digital watermark detection is difficult when camera movement is large in the first place, the neighborhood area can be determined to be small also in this case so that search for the detection subject region becomes very stable.

In addition, it is also easy to apply this embodiment to the detection subject region extraction unit 220 in the digital watermark detection apparatus in the first to twelfth embodiments. In this case, it is only necessary to, when detection status for a previous digital watermark detection trial is good, search the detection subject region in a current frame image starting from the neighborhood of the previous detection subject region.

By the way, in this embodiment, although an example is shown for using the case "detection status was good in the previous digital watermark detection trial", it is not limited to "previous", and a feature region or a detection region "at a temporally near time when good detection trial of digital watermark is performed" may be used.

When a state in which digital watermark detection information is not good continues for a predetermined time, processes similar to those of the thirteenth to sixteenth embodiments may be performed without performing the neighborhood search.

<Effects of this Embodiment>

In the present embodiment, in addition to effects of the thirteenth to fifteenth embodiments, since stability and reliability of the feature region and the detection subject region improve, improvement of digital watermark detection performance is realized. Especially, when the method for detecting the feature region or the detection subject region is not so robust, remarkable effect is obtained so that digital watermark detection performance substantially improves.

Eighteenth Embodiment

This embodiment is the same as the fourteenth to seventeenth embodiments except for parts described below. In the following, differences from the fourteenth embodiment are mainly described.

Processes of the detection subject region extraction unit 220 in the digital watermark detection apparatus of the present embodiment are described.

FIGS. 96-99 are drawings for explaining processes of the detection subject region extraction unit in the eighteenth embodiment of the present invention.

Figure 97:
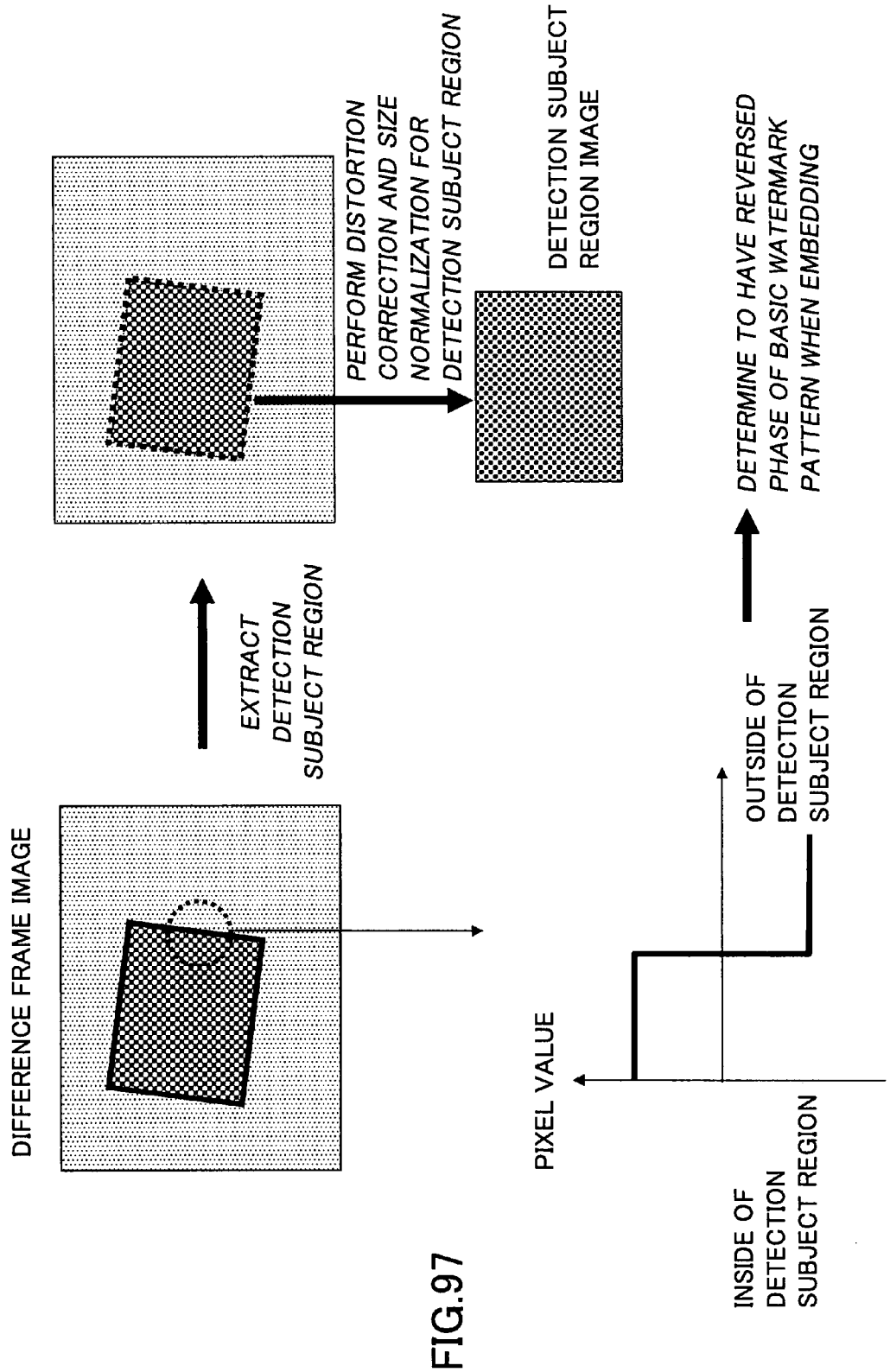
FIG. 97 is a figure (2) for explaining processes of the detection subject region extraction unit in the eighteenth embodiment of the present invention.

The process for extracting the detection subject region from the difference frame image is performed from a difference image between frames of the watermark embedded moving images of the fourteenth embodiment. In this case, in the fourteenth embodiment, a frame pattern in which the outside is bright and the inside is dark is added to the basic watermark pattern in order to perform detection subject region extraction accurately beforehand (by the way, as described in the first embodiment, bright/dark is used for representing large/small of a pixel value, and it is not limited only to the brightness value). When searching for the detection subject region from the difference frame image, the detection subject region extraction unit 220 checks pixel value change in the frame part. In the example of shown in FIG. 96, since the outside of the detection subject region is bright and the inside is dark, it is determined that the watermark pattern in the detection subject region image is in phase (positive phase) with the basic pattern when embedding, so that this phase information can be used for digital watermark detection process as is used in the fourth embodiment and the like. FIG. 97 shows an example in which the phase is reversed. By checking an edge part of the detection subject region, it can be understood that positive phase/reversed phase can be determined.

Figure 98:
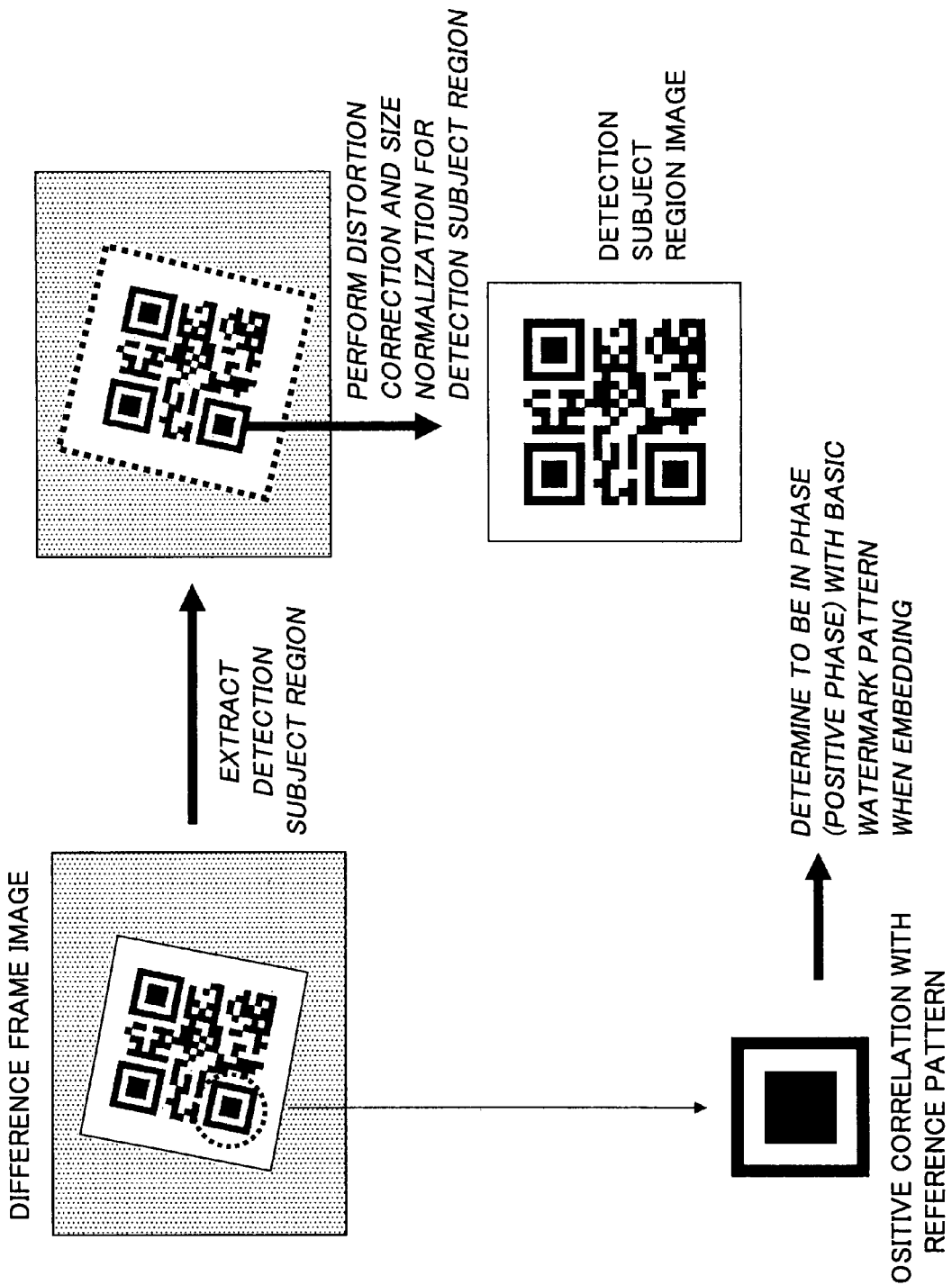
FIG. 98 is a figure (3) for explaining processes of the detection subject region extraction unit in the eighteenth embodiment of the present invention.
Figure 99:
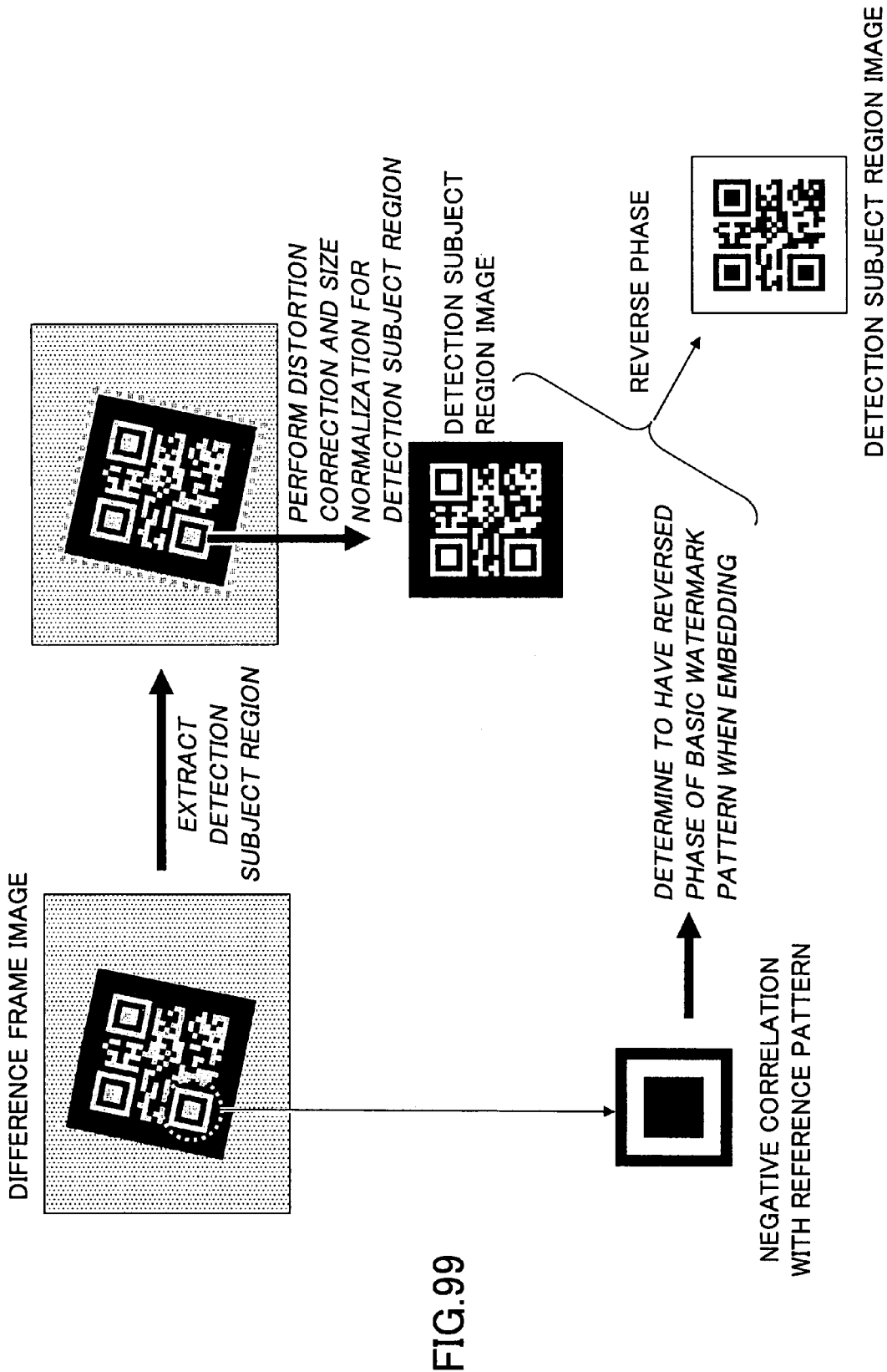
FIG. 99 is a figure (4) for explaining processes of the detection subject region extraction unit in the eighteenth embodiment of the present invention.

In addition, examples in which the present embodiment is applied to the fifteenth embodiment are shown in FIGS. 98 and 99. In this embodiment, if a basic pattern of the positioning marker of the QR code (registered trademark) has a positive correlation with a positioning pattern found from the detection subject region (FIG. 98), it is determined to be the positive phase, and if they have a negative correlation, it is determined to be the reversed phase (FIG. 99). When it is reversed phase, digital watermark detection may be tried after reversing the phase of the detection subject region image. The reason for reversing is that there are many cases that the existing two-dimensional code reading method does not support recognition of phase reversed code. Thus, phase reversing is necessary for using the existing two-dimensional code reading process.

For applying this embodiment to the sixteenth embodiment, it is obvious that it is only necessary to perform processes similar to above-mentioned processes except that the detection subject region extraction unit 220 receives the feature region difference image instead of the difference frame image.

<Effects of the Present Embodiment>

In the present embodiment, positive phase/reversed phase of the watermark pattern in the detection subject region image is determined based on whether the phase of a pattern part of an extracted detection subject region is the same as that of the basic watermark pattern, wherein the detection subject region is extracted using the pattern such as a frame or a positioning marker added to the basic watermark pattern for improving reliability for extracting the detection subject region. By using the phase information, detection performance can be improved as shown in the fourth embodiment and the like.

In addition, according to the present embodiment, the pattern such as the frame and the positioning marker undertakes two roles for improving reliability of extracting the detection subject region and for obtaining the phase information, which means the pattern serves a dual purpose. That is, since it becomes unnecessary to shorten bit length of watermark information by adding a flag to the watermark information for adjusting the phase or to multiplex a phase determination signal that becomes noise for the watermark information, digital watermark detection performance improves.

Nineteenth Embodiment

The present embodiment is the same as the thirteenth to eighteenth embodiments except for parts described below.

Figure 100:
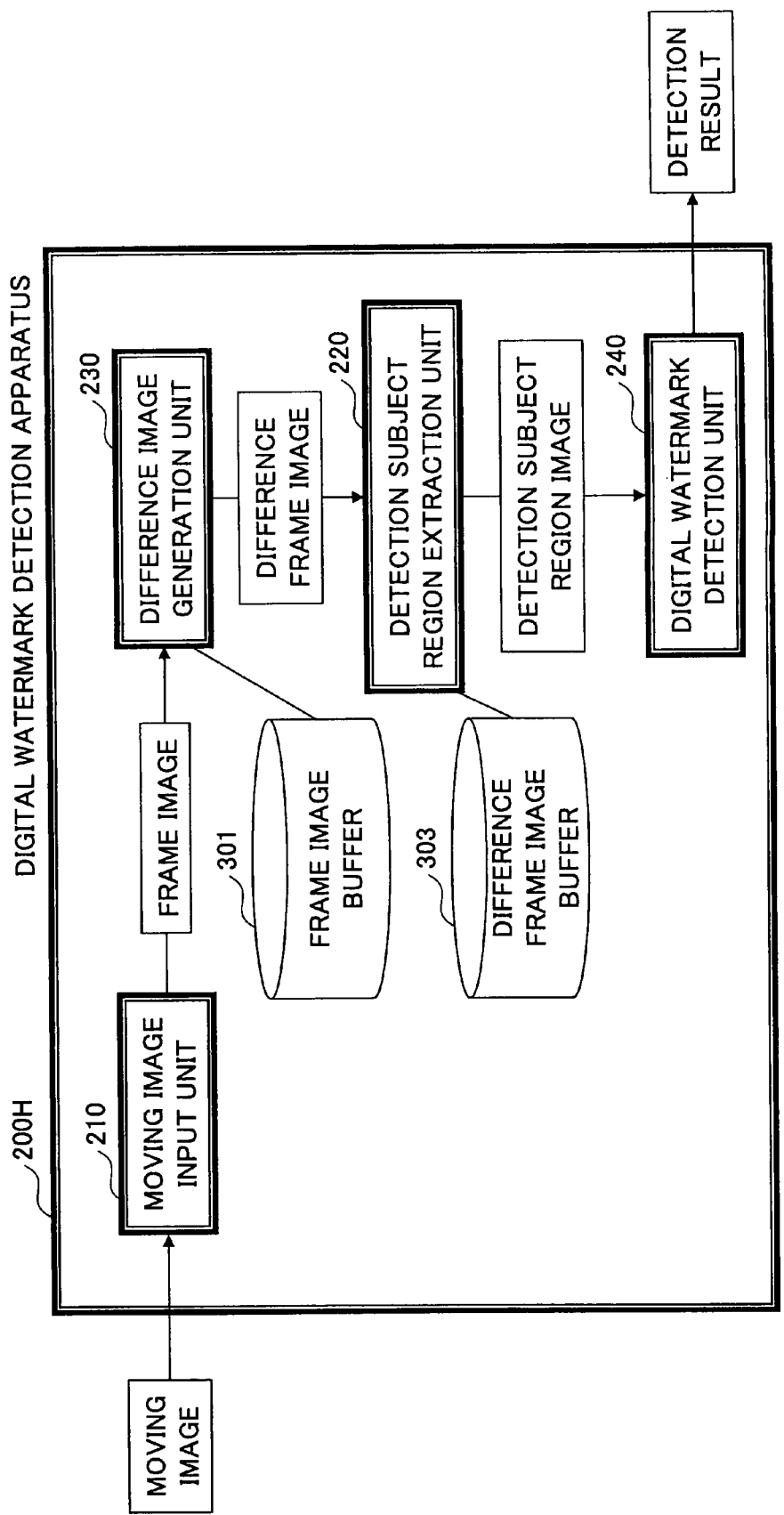
FIG. 100 is a block diagram of the digital watermark detection apparatus in the nineteenth embodiment of the present invention.

FIG. 100 shows a configuration of the digital watermark detection apparatus in the nineteenth embodiment of the present invention.

The digital watermark detection apparatus 200H shown in the figure includes an moving image input unit 210, a difference image generation unit 230, a detection subject region extraction unit 220, a digital watermark detection unit 240, a frame image buffer 301, and a difference frame image buffer 303.

Differences from the thirteenth embodiment are processing contents of the detection subject region extraction unit 220 and that the difference frame image buffer 303 is newly provided.

Figure 101:
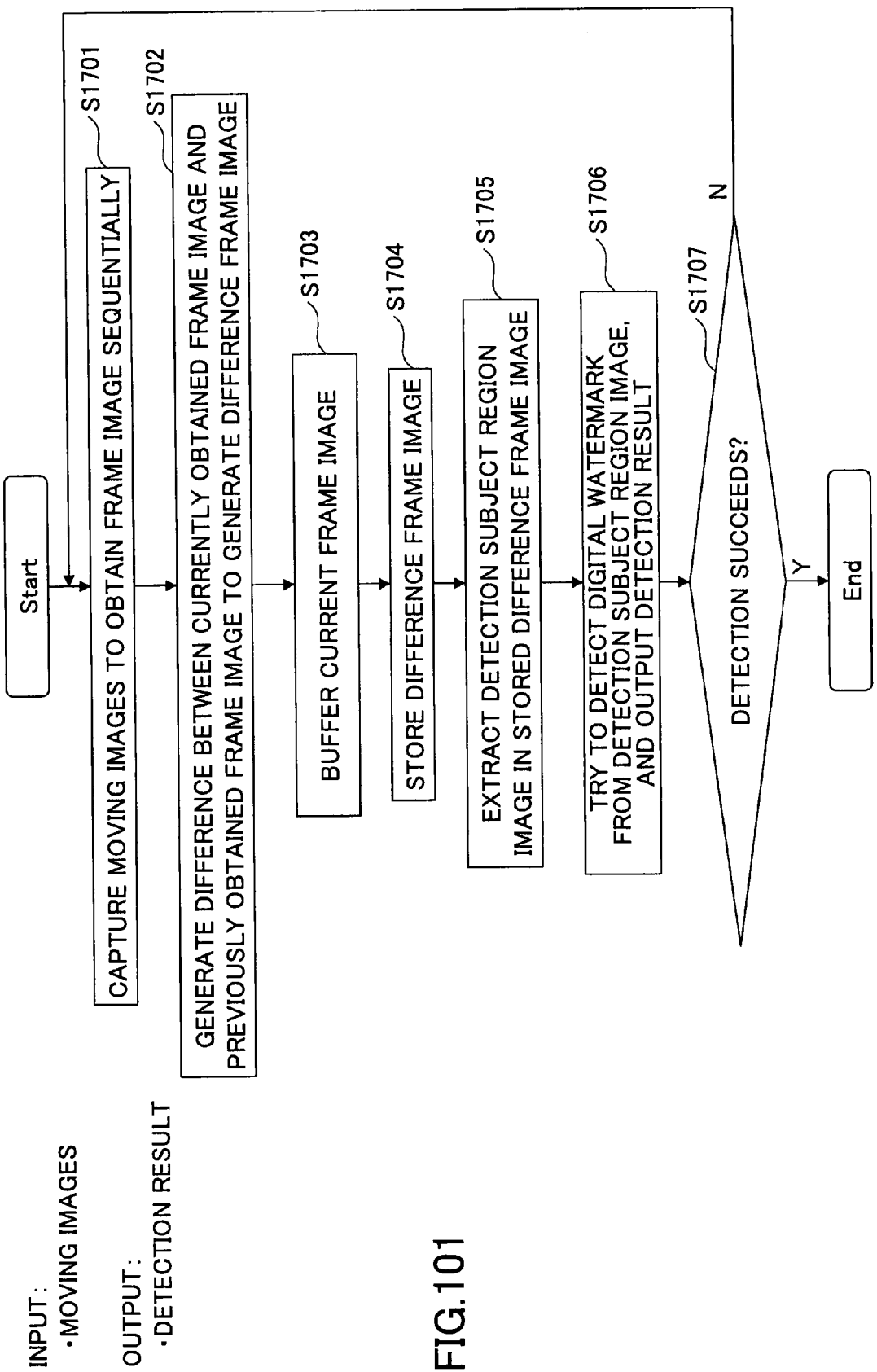
FIG. 101 is a flowchart showing operation of the digital watermark detection apparatus in the nineteenth embodiment of the present invention.

FIG. 101 is a flowchart showing operation of the digital watermark detection apparatus in the nineteenth embodiment of the present invention.

Step 1701) The analog or digital moving images are input by the moving image input unit 210, so that a frame image is obtained sequentially. When inputting analog moving images, camera, scanner, or analog video signals are input so as to obtain the frame image. When digital moving images are input, the frame image is obtained by performing decoding processes.

Step 1702) Next, the difference image generation unit 230 calculates a difference between the currently obtained frame image and a previously obtained frame image stored in the frame image buffer 301 so as to generate a difference frame image.

Step 1703) The currently input frame image is buffered into the difference frame buffer 301.

Step 1704) The currently obtained difference frame image is added and stored into the difference frame buffer 301.

Step 1705) A detection subject region that is a subject for watermark detection is extracted from the difference frame image that is added and stored in the difference frame buffer 301 so as to obtain a detection subject region image.

Figure 102:
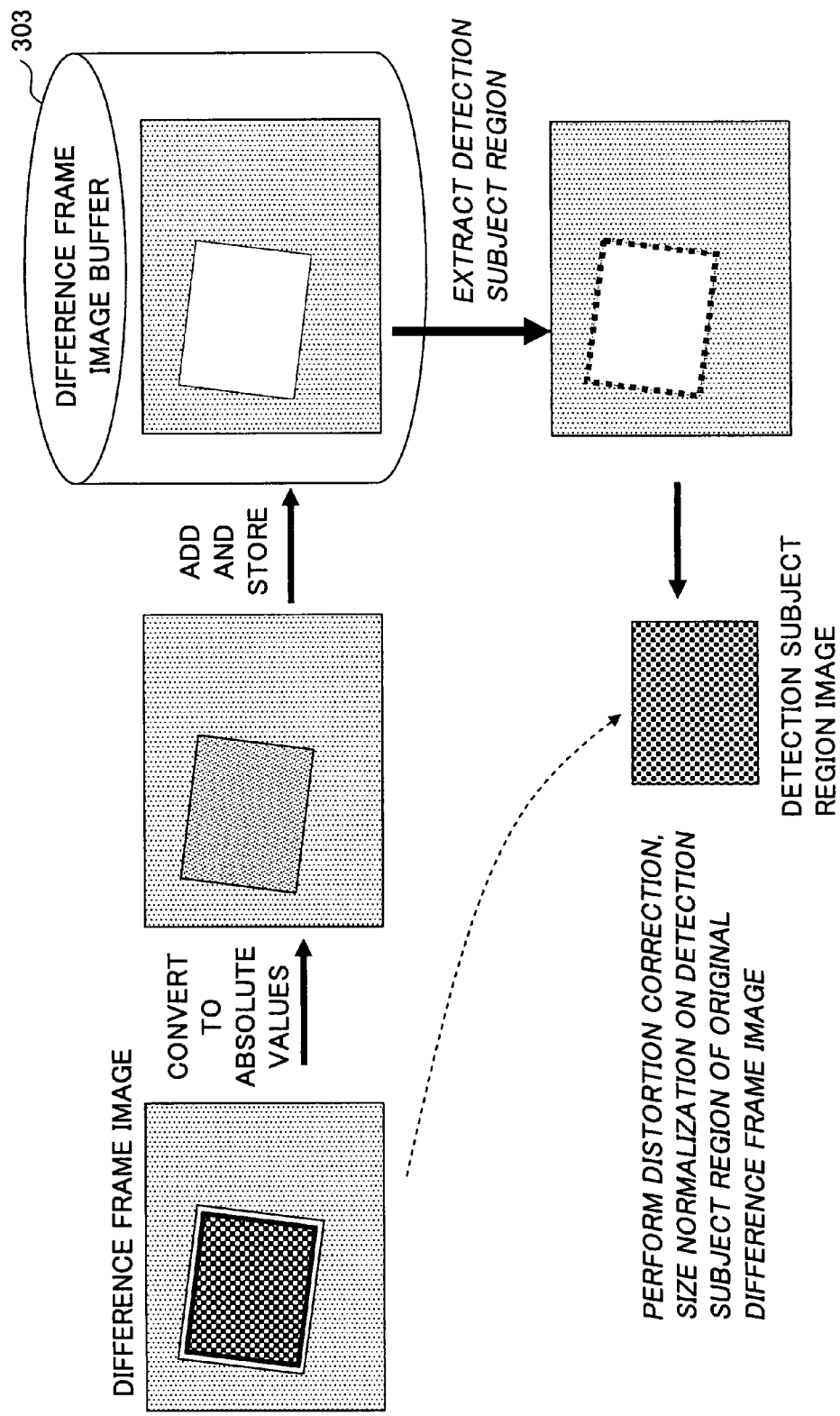
FIG. 102 is a figure (1) for explaining processes of the detection subject region extraction unit in the nineteenth embodiment of the present invention.

At this time, as shown in FIG. 102, the difference frame image may be added and stored in the difference frame image buffer 303 after changing pixel values of the difference frame image into absolute values. Then, the detection subject region is extracted from the difference frame image added and stored in the difference frame image buffer 303, and distortion correction and size normalization may be performed on the image of the detection subject region of the current difference frame image to obtain the detection subject region image. According to this method, since the absolute value image of the difference frame image is added and stored, contrast between the detection subject region and a background area increases by the adding and storing irrespective of the phase of the watermark pattern in the received difference frame image so that reliability for extracting the detection subject region increases.

Figure 103:
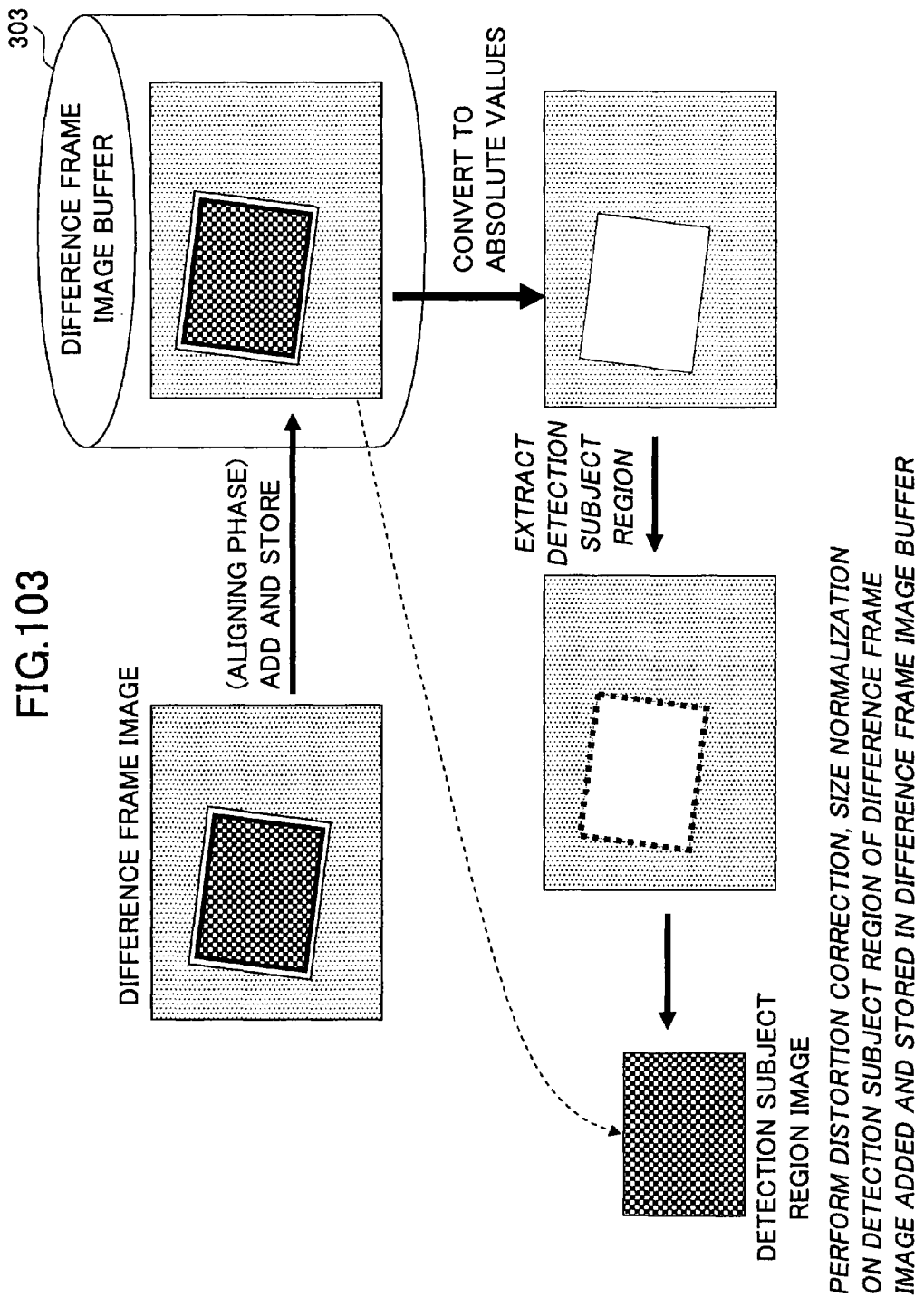
FIG. 103 is a figure (2) for explaining processes of the detection subject region extraction unit in the nineteenth embodiment of the present invention.

Alternatively, in a case where the difference frame image can be generated in synchronization with the switching timing of the watermark pattern represented by the watermark pattern switching information like the third embodiment, it cannot be determined whether the watermark pattern in the obtained difference frame image is in phase/reversed phase with respect to the basic watermark pattern using the start timing of capturing and the like, but it can be determined whether the currently obtained difference frame image is in phase with a previously obtained difference frame image (for example, in the example of FIG. 31, in-phase status can be obtained every other difference image). By using this, as shown in FIG. 103, the difference image may be added and stored in the difference frame image buffer 303 after aligning the phase of the difference image (as a result, only images in phase with the basic watermark pattern are added or only images having reversed phase are added). Then, the detection subject region is extracted after changing the difference frame image added and stored in the difference frame image buffer into absolute values, and distortion correction and size normalization may be performed on the image of the detection subject region of the difference frame image added and stored in the difference frame image buffer 303 to obtain a detection subject region image. According to this method, the watermark pattern is emphasized by the adding and storing, an effect that digital watermark detection performance improves can be obtained in addition to the effect that the reliability for extracting detection subject region improves.

Step 1706) Next, the digital watermark detection unit 240 tries to detect digital watermark from the detection subject region image to output a detection result.

Step 1707) Digital watermark detection does not succeed, the moving image input unit obtains a next frame image to repeat the above-mentioned processes sequentially.

In addition, the digital watermark detection apparatus where the present embodiment is applied to the sixteenth embodiment is described.

Figure 104:
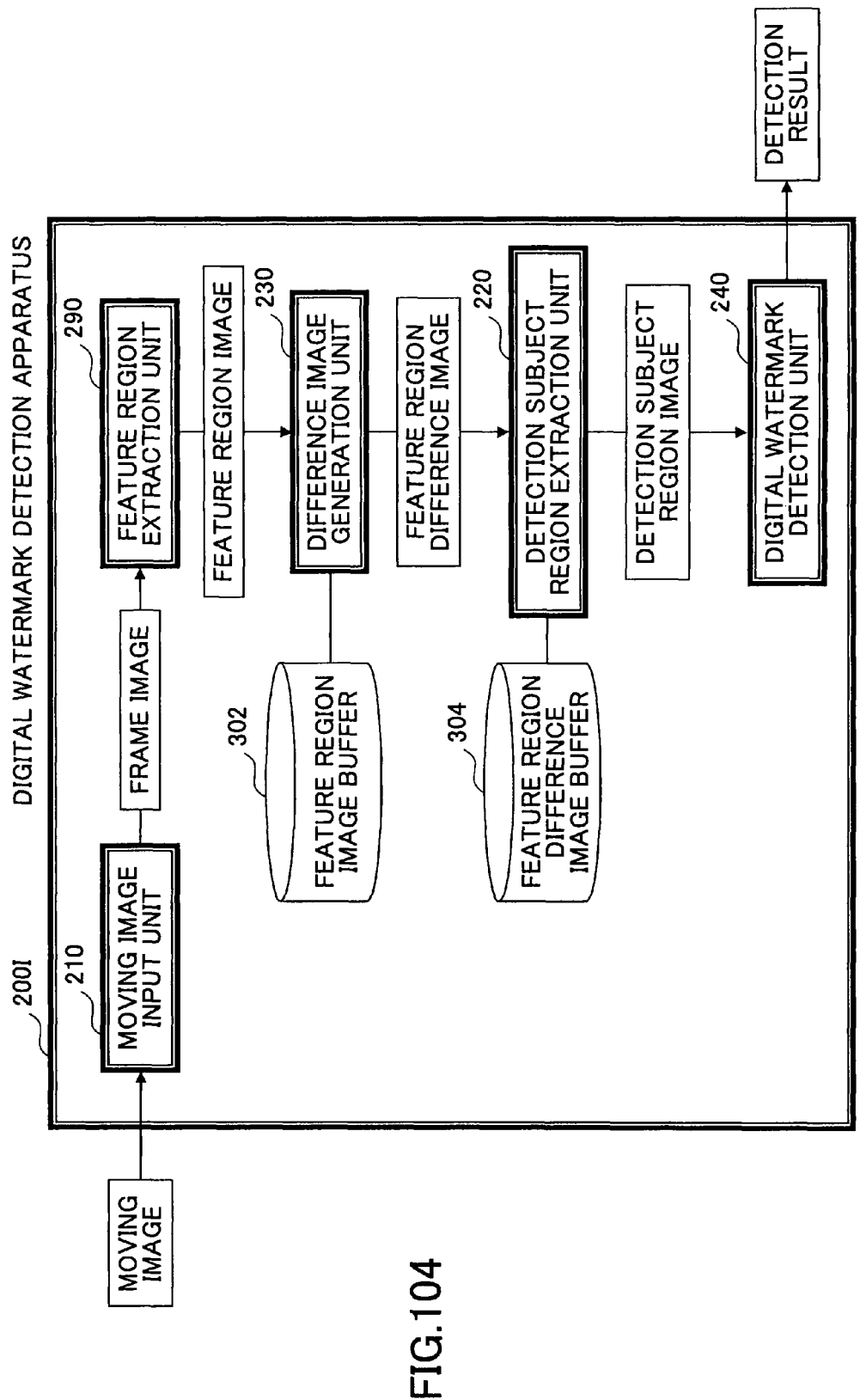
FIG. 104 is a block diagram of the digital watermark detection apparatus in the nineteenth embodiment of the present invention.

FIG. 104 shows a configuration of the digital watermark detection apparatus in the nineteenth embodiment of the present invention.

The digital watermark detection apparatus 200I shown in the figure includes an moving image input unit 210, a feature region extraction unit 290, a difference image generation unit 230, a detection subject region extraction unit 220, a digital watermark detection unit 240, a feature region buffer 302, and a feature region difference image buffer 304.

Differences from the sixteenth embodiment are processing contents of the detection subject region extraction unit 220 and that the feature region difference image buffer 304 is newly provided.

Figure 105:
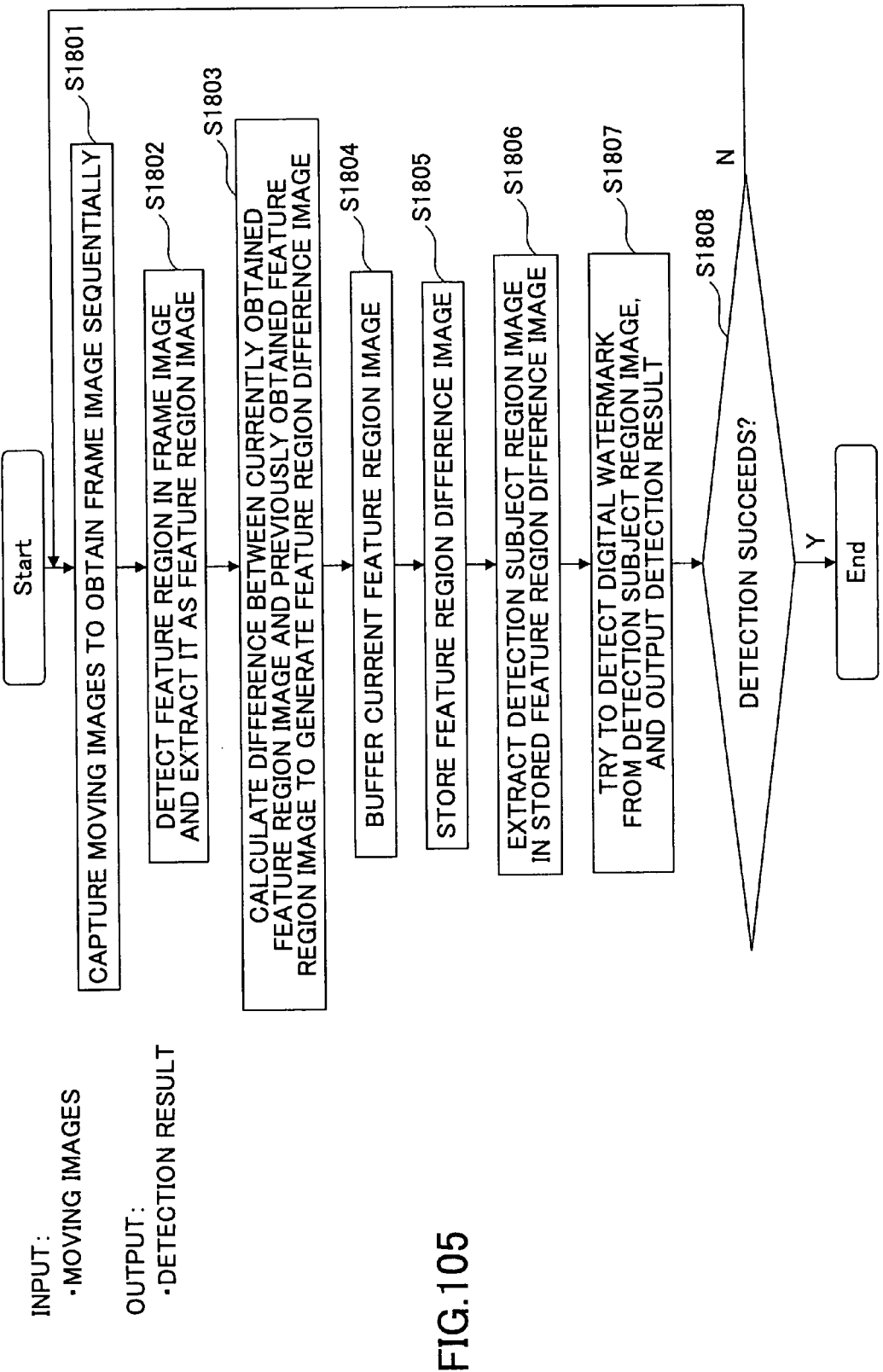
FIG. 105 is a flowchart of operation of the digital watermark detection apparatus in the nineteenth embodiment of the present invention.

FIG. 105 is a flowchart (applied to the sixteenth embodiment) showing operation of the digital watermark detection apparatus in the nineteenth embodiment of the present invention.

Step 1801) When the moving image input unit 210 receives analog moving images displayed on a TV and the like and video-captured in real time by a camera, or digital moving images encoded by MPEG, the moving image input unit 210 obtains a frame image sequentially. When inputting analog moving images, camera, scanner, or analog video signals are input so as to obtain the frame image. When digital moving images are input, the frame image is obtained by performing decoding processes.

Step 1802) Next, the feature region extraction unit 290 extracts a feature region in the frame image. For extracting the feature region, a technique such as rectangular area detection by edge recognition and the like shown in the document 3 can be used. Distortion caused by camera taking angle and the like is corrected for the extracted feature region, and the size is normalized so that the image is output as a feature region extraction image.

Step 1803) Next, the difference image generation unit 230 calculates a difference between the currently obtained feature region image and a previously obtained feature region image stored in the feature region image buffer 302 so as to generate a feature region difference image.

Step 1804) The current feature region image is buffered into the feature region image buffer 302 in preparation for a next detection trial.

Step 1805) The detection subject region extraction unit 220 stores the feature region difference image into the feature region difference image buffer 304.

Figure 106:
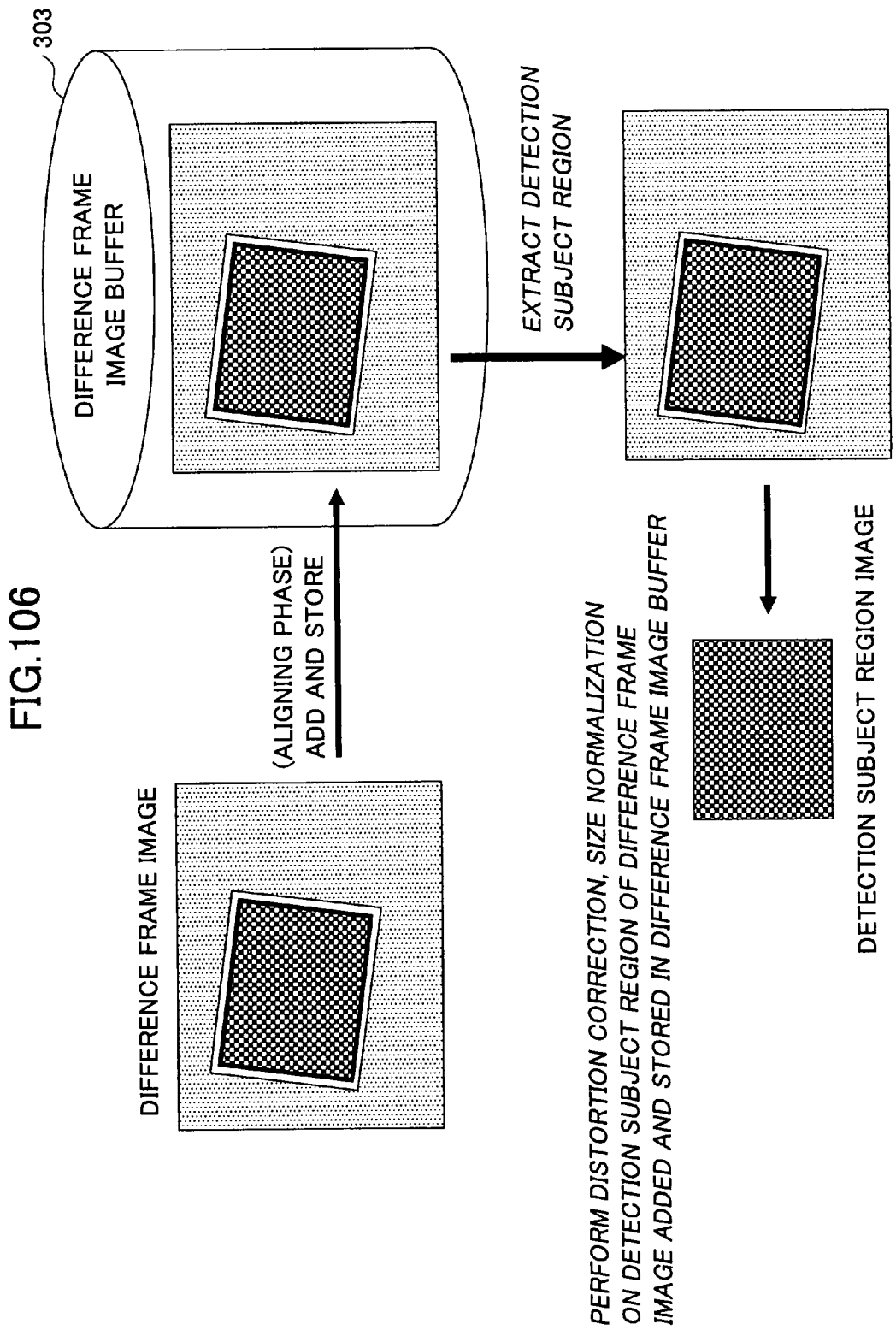
Figure 107:
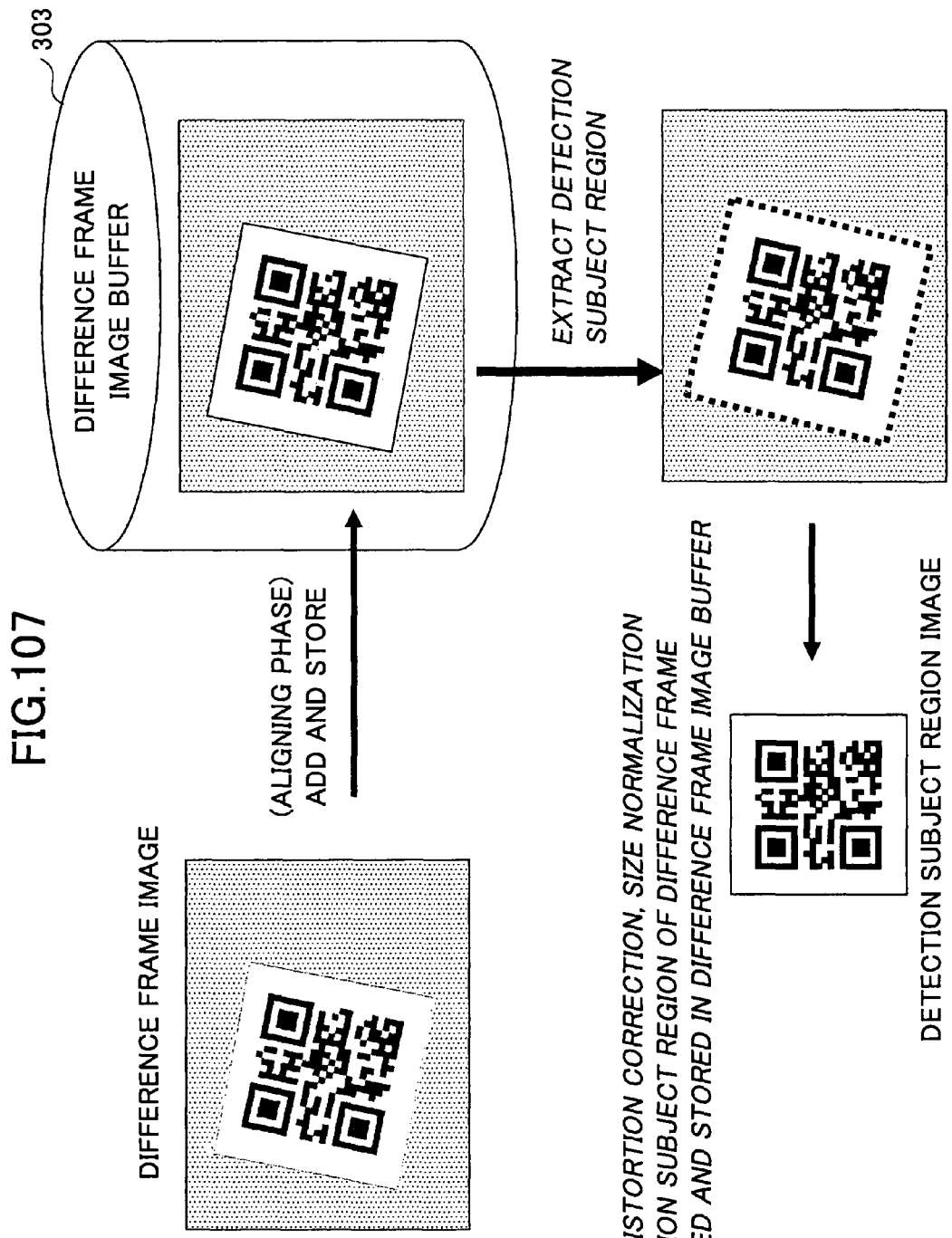

At this time, as shown in FIGS. 106 and 107, the feature region difference image is added and stored in the feature region difference image buffer 304 after aligning the phase of the feature region difference images. For aligning the phase, the above-mentioned method for synchronizing with the watermark pattern switching timing and the methods shown in the sixth and seventeenth embodiments can be used. As a result, only images in phase with the basic watermark pattern are added or only images having reversed phase are added in the feature region difference image buffer 304.

Step 1806) Next, a detection subject region that is a subject for watermark detection is extracted from the feature region difference image added and stored in the feature region difference image buffer 304, and the detection subject region image is obtained after performing distortion correction and size normalization.

Step 1807) Next, the digital watermark detection unit 240 tries to detect digital watermark from the detection subject region image to output a detection result.

Step 1808) When digital watermark detection does not succeed, the moving image input unit 210 obtains a next frame image to repeat the above-mentioned processes sequentially.

As mentioned above, according to the method for adding and storing after aligning the phase, since the watermark pattern in the detection subject region relatively stands out compared with a case using only one difference image, reliability of extracting the detection subject region improves and the detection performance of the digital watermark improves like the sixth embodiment.

<Effects of the Present Embodiment>

In the present embodiment, the detection subject region is extracted by relatively strengthening the watermark pattern by storing the difference frame image or the feature region difference image so that improvement of reliability for extracting the detection subject region is realized.

In addition, especially, by performing adding and storing after aligning the phase of the watermark pattern in the difference image, not only reliability of the detection subject can be improved but also detection performance of digital watermark can be improved simultaneously. Generally, since the watermark pattern is added to an image with a weak amplitude such that a human cannot perceive the watermark pattern, there is a possibility that the detection subject region is not clearly identified in one difference image. According to the present invention, this problem can be solved by the above-mentioned contrivances.

Twentieth Embodiment

The present embodiment is the same as the first to nineteenth embodiments except for parts described below. In the following, differences from the thirteenth embodiment are mainly described.

Processes of the watermark pattern superimposing unit 130 in the digital watermark embedding apparatus 100 in the present embodiment are described.

Figure 108:
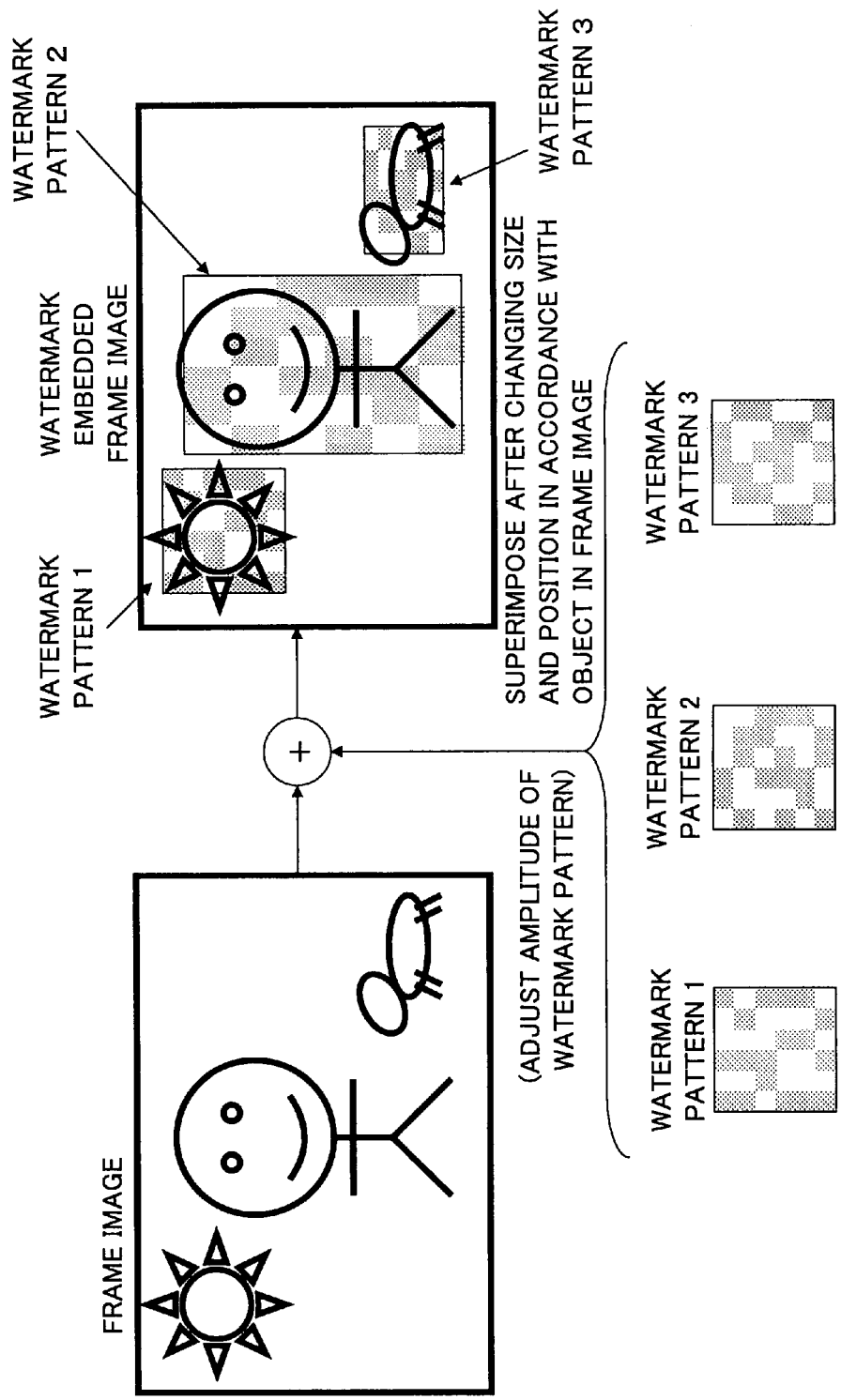
Figure 109:
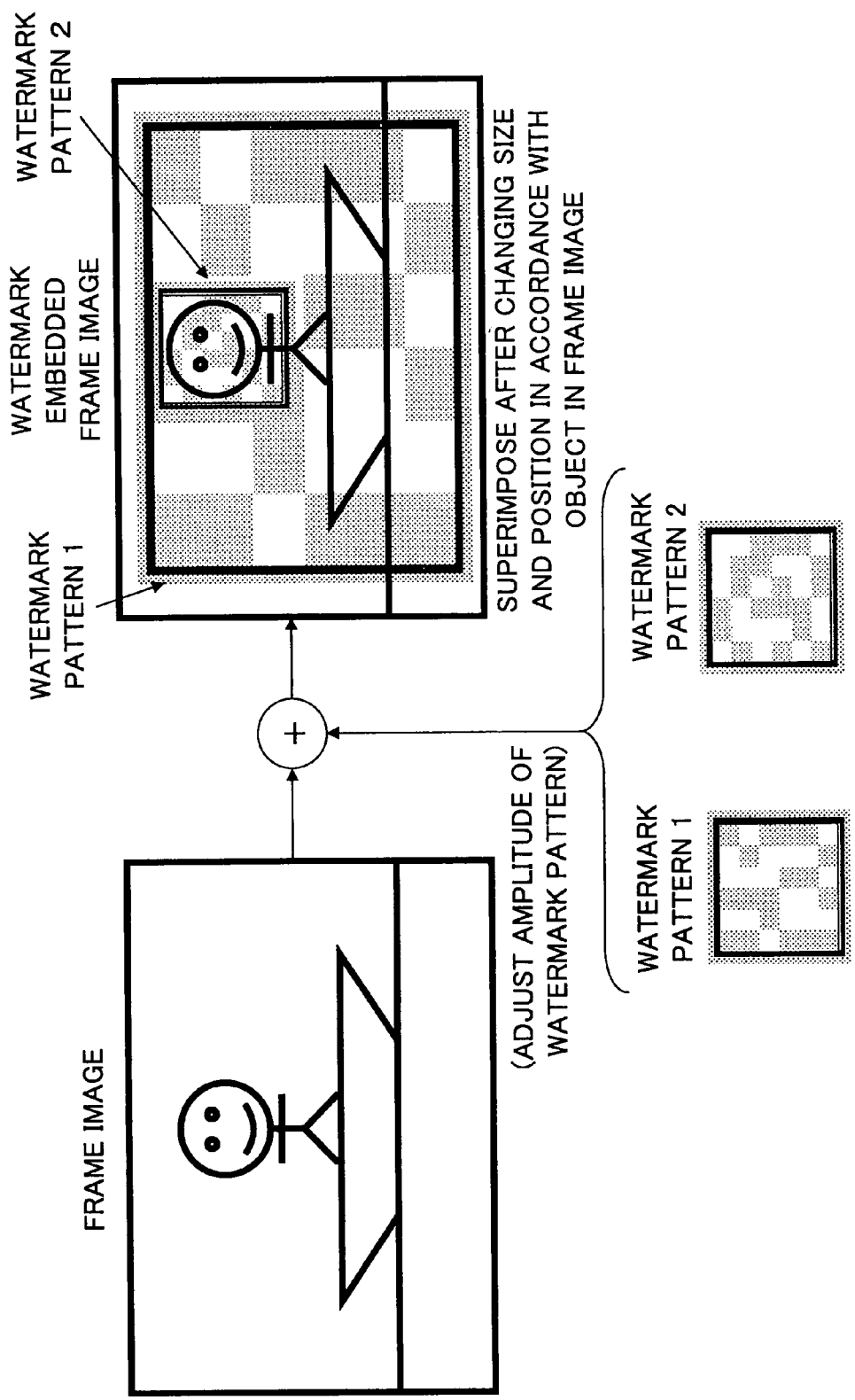

FIGS. 108 and 109 are figures to explain the processes of the watermark pattern superimposing unit in the twentieth embodiment of the present invention.

The watermark pattern superimposing unit 130 receives a frame image and watermark patterns generated based on the frame display time. It is assumed that a plurality of watermark patterns are generated such that a plurality of watermark patterns can be superimposed on one frame image as necessary. For example, assuming that three watermark patterns each having different information are provided. The watermark pattern superimposing unit 130 adjusts an amplitude of each watermark pattern as necessary, and superimposes each watermark pattern onto the frame image after adjusting the position and the size of the watermark pattern for an object, in the frame image, desired to be associated with information indicated by the watermark pattern. FIG. 108 shows an example for superimposing watermark patterns onto three different object regions in the frame image. Alternatively, as shown in FIG. 109, a watermark pattern corresponding to an object may be superimposed onto a watermark pattern corresponding to the whole image like nesting. In this case, the values of the inside watermark pattern in the nest may be overwritten on the values of the outside watermark pattern. In addition, as shown in FIG. 109, like the fourteenth and fifteenth embodiments, a marker and the like for extracting the detection subject region is added to the watermark pattern.

Next, processes of the difference image generation unit 230 of the digital watermark detection apparatus in the present embodiment are described.

Figure 110:
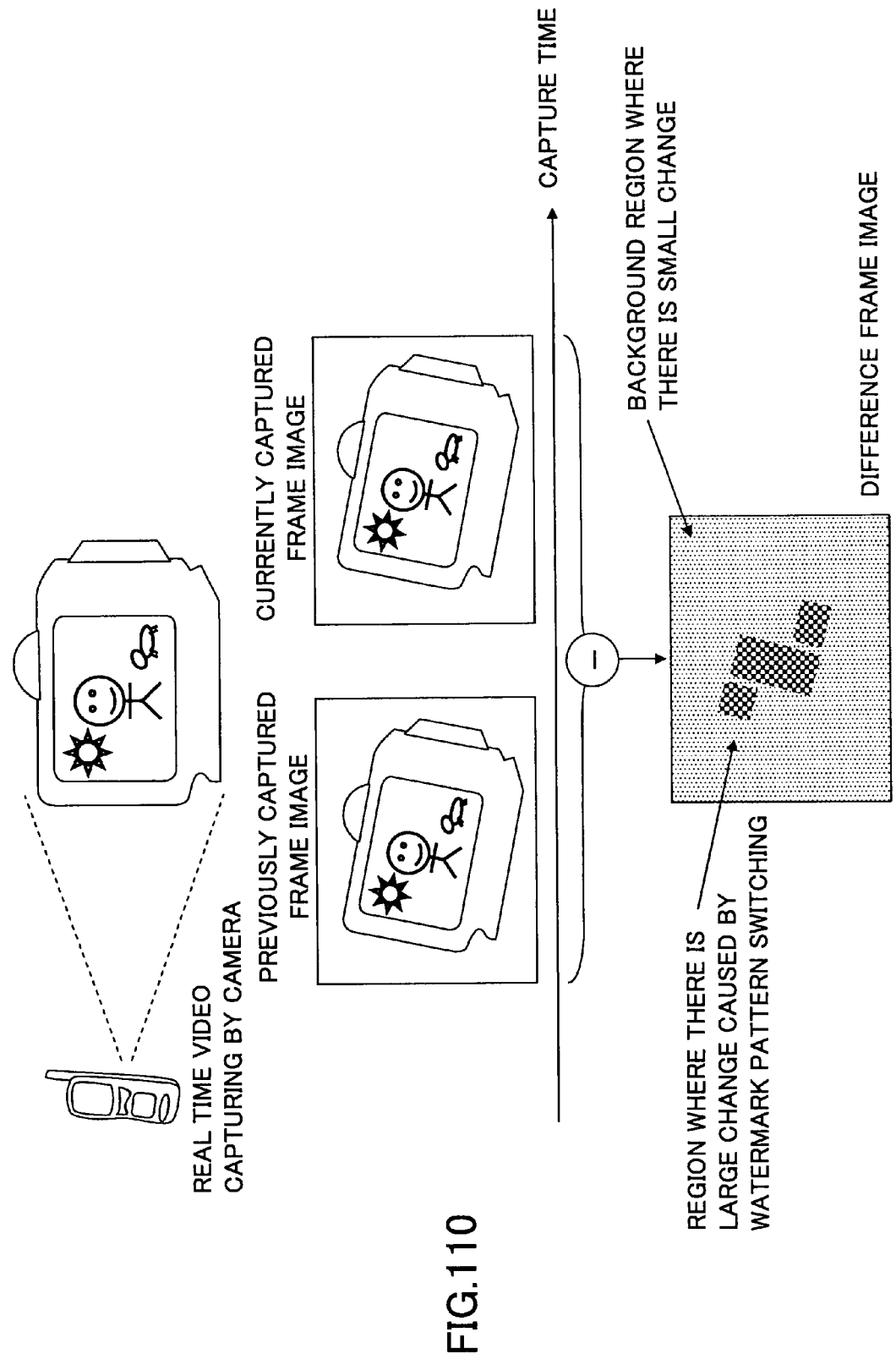

FIG. 110 is a figure for explaining processes of the difference image generation unit according to the twentieth embodiment of the present invention.

The process itself of the difference image generation unit 230 is completely the same as that of the thirteenth embodiment. But, since there are a plurality of watermark patter regions in the received frame image, a plurality of watermark pattern regions are obtained in the difference frame image as shown in FIG. 110.

Next, processes of the detection subject region extraction unit 220 in the present embodiment are described.

Figure 111:
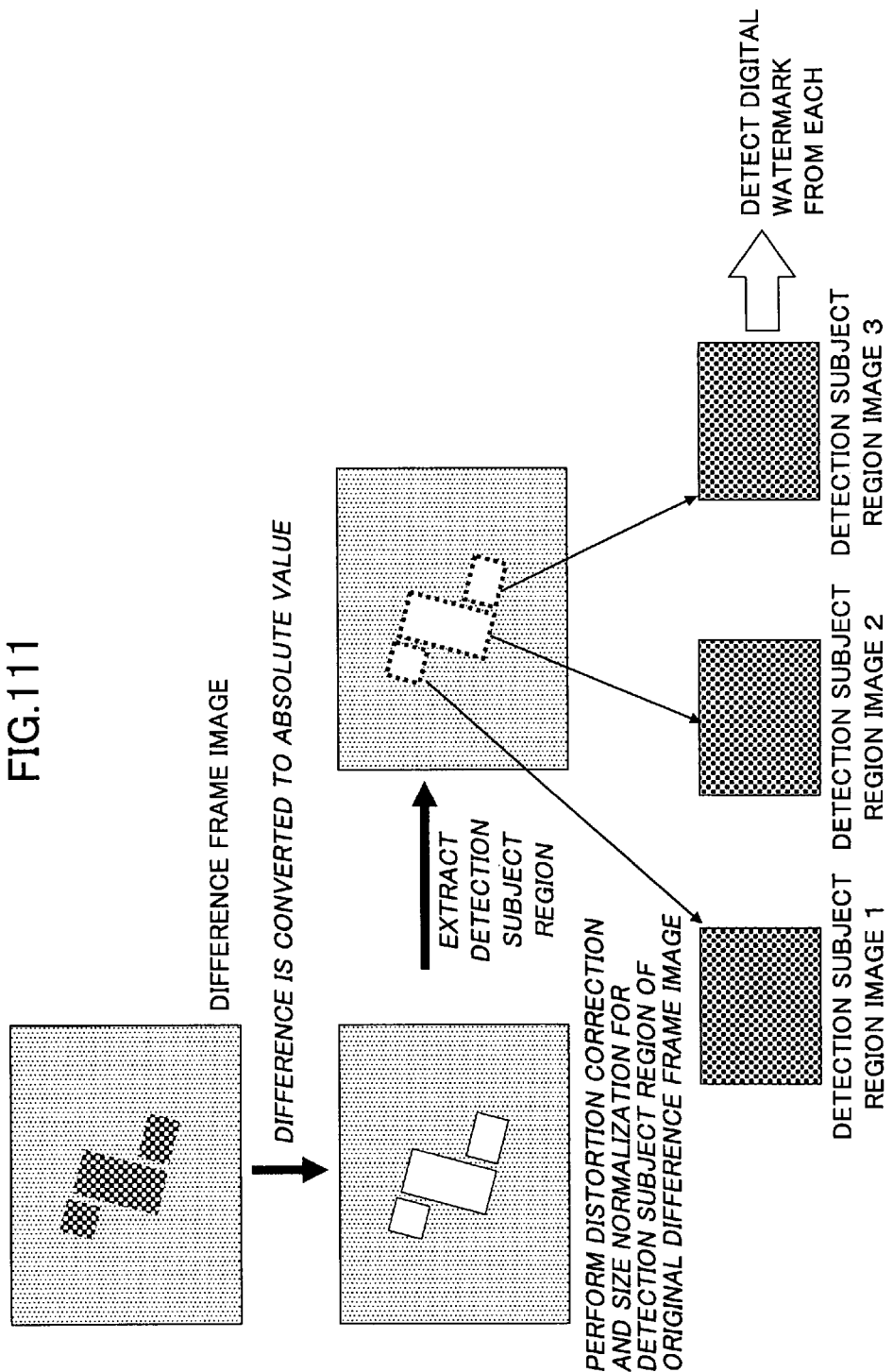
Figure 112:
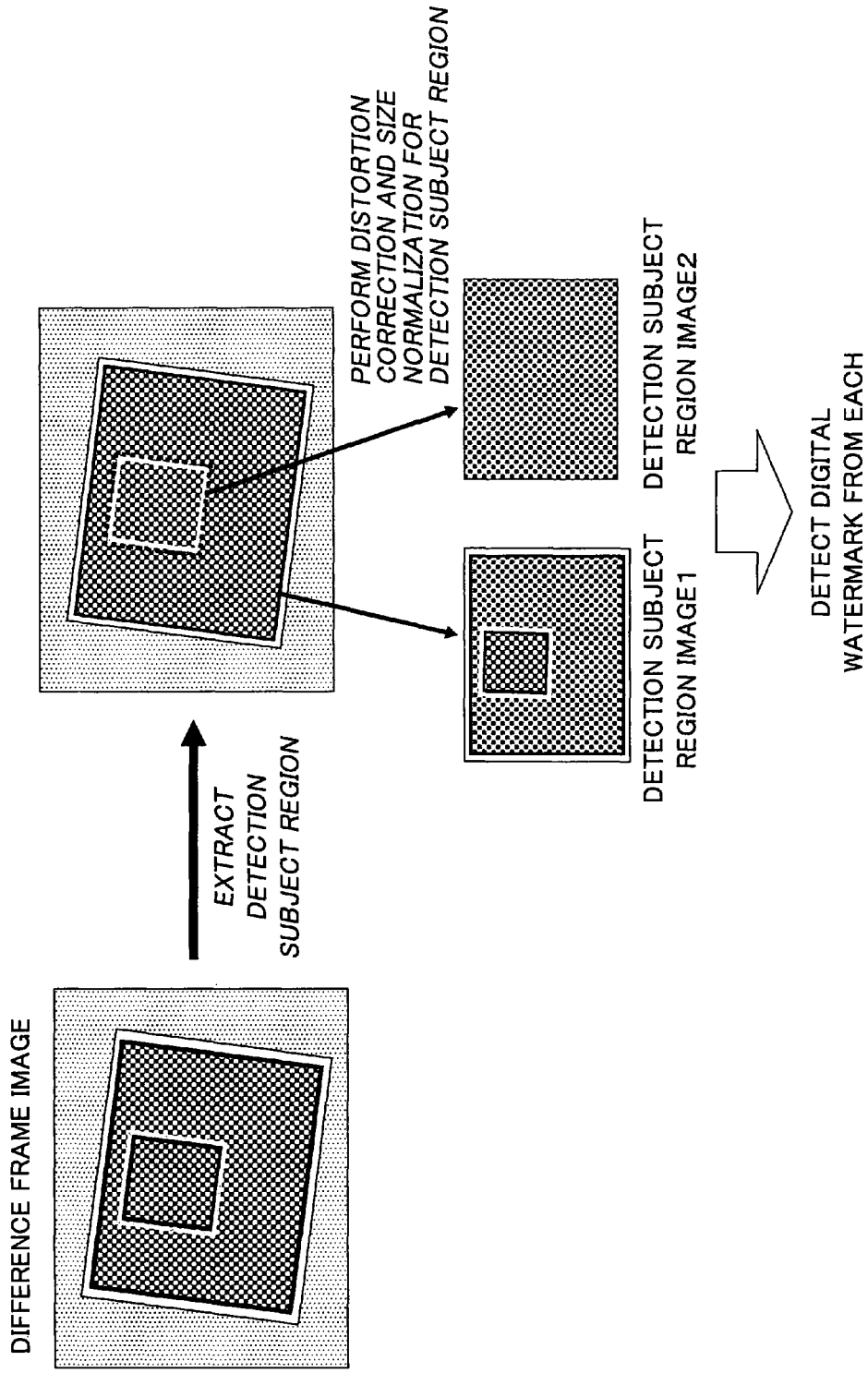

FIGS. 111 and 112 are figures for explaining the processes of the detection subject region extraction unit in the twentieth embodiment of the present invention. Like the thirteenth embodiment, by searching for rectangular areas after calculating absolute values of the pixel values of the difference frame image, three detection subject regions can be found as shown in FIG. 111. A detection subject region image is generated for each of the three detection subject regions, and digital watermark detection trial is performed for each detection subject region image.

Processes of the detection subject region extraction unit 220 when performing watermark pattern superimposition as shown in FIG. 109 are described using FIG. 112. Even though watermark pattern regions are nested in the difference frame image, the detection subject regions of the nesting structure can be found by using a positioning marker and the like shown in the fourteenth of fifteenth embodiment, so that the detection subject region image is generated for each detection subject region to perform digital watermark detection trial. By the way, in FIG. 112, the inside watermark pattern is nested in the outside watermark pattern so that any pattern of the outside watermark pattern does not remain in the inside region. But, digital watermark detection is available since loss of the pattern can be supported because of robustness of the digital watermark scheme itself.

Next, an example of feedback output of the digital watermark detection apparatus 200 in the present embodiment is shown.

FIGS. 113-116 show examples of the feedback output of the digital watermark detection apparatus in the twentieth embodiment of the present invention.

Figure 113:
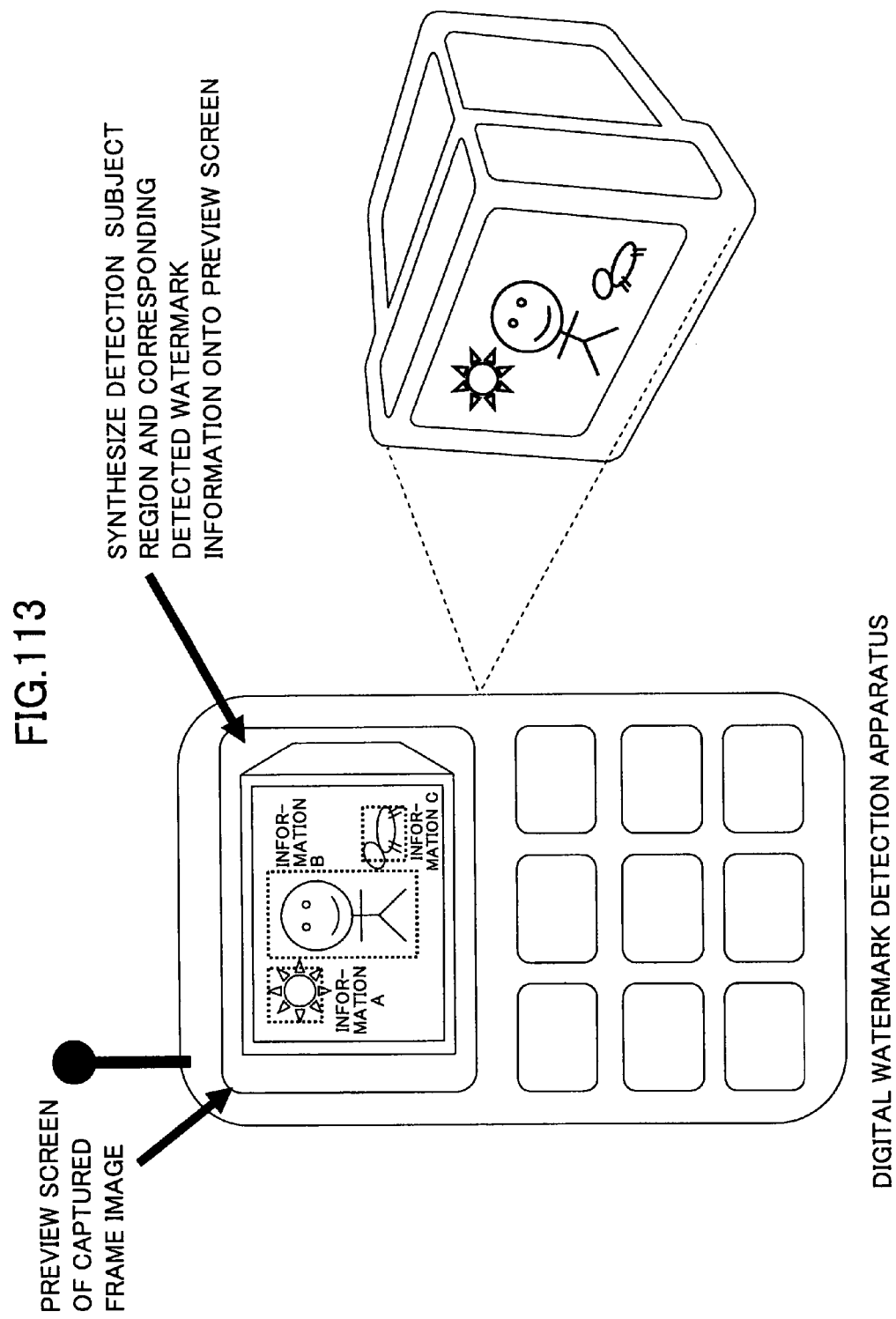

The detection status obtained for each detection subject region is synthesized on a preview screen in accordance with the position and size of the detection subject region on the display screen of the digital watermark detection apparatus 200. In FIG. 113, digital watermark detection status detected from three detection subject regions are superimposed and displayed at object positions associated with original watermark patterns.

Figure 114:
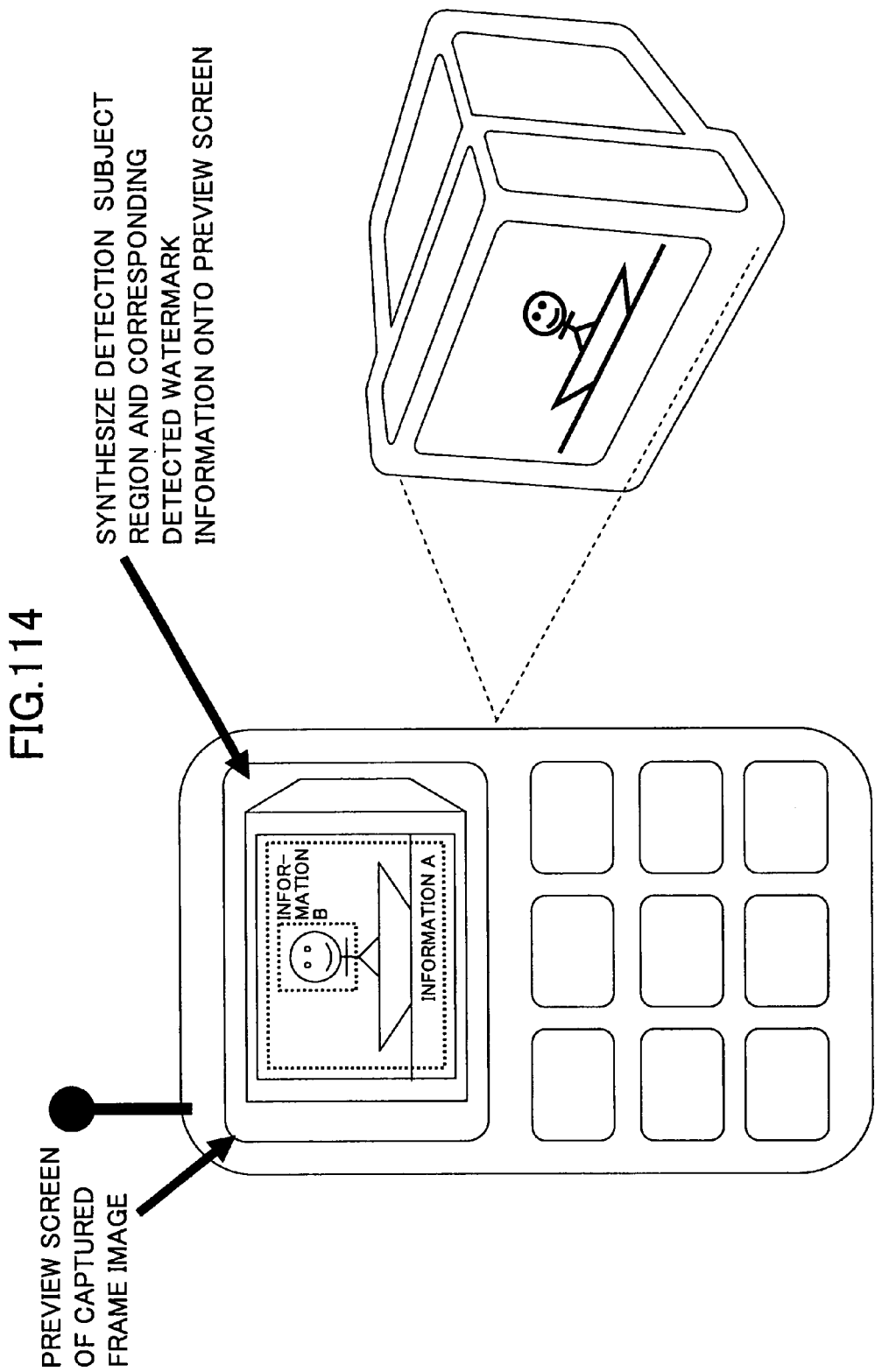

FIG. 114 shows an example of synthesizing of the digital watermark detection statuses detected from nested two detection subject regions. When a plurality of digital watermark detection subject regions are obtained like this, it is possible to feedback the digital watermark detection statuses at the same time.

Figure 115:
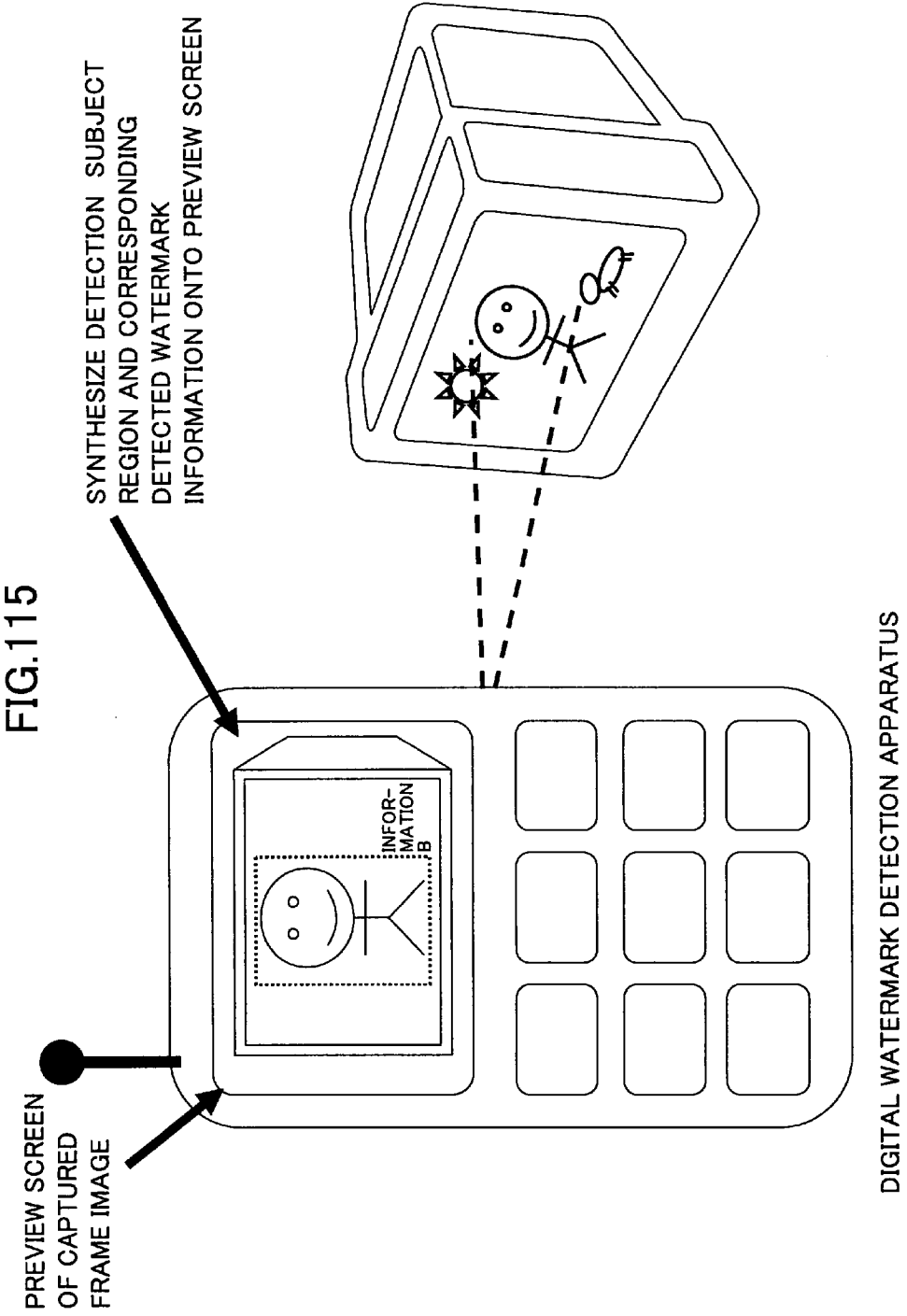
Figure 116:
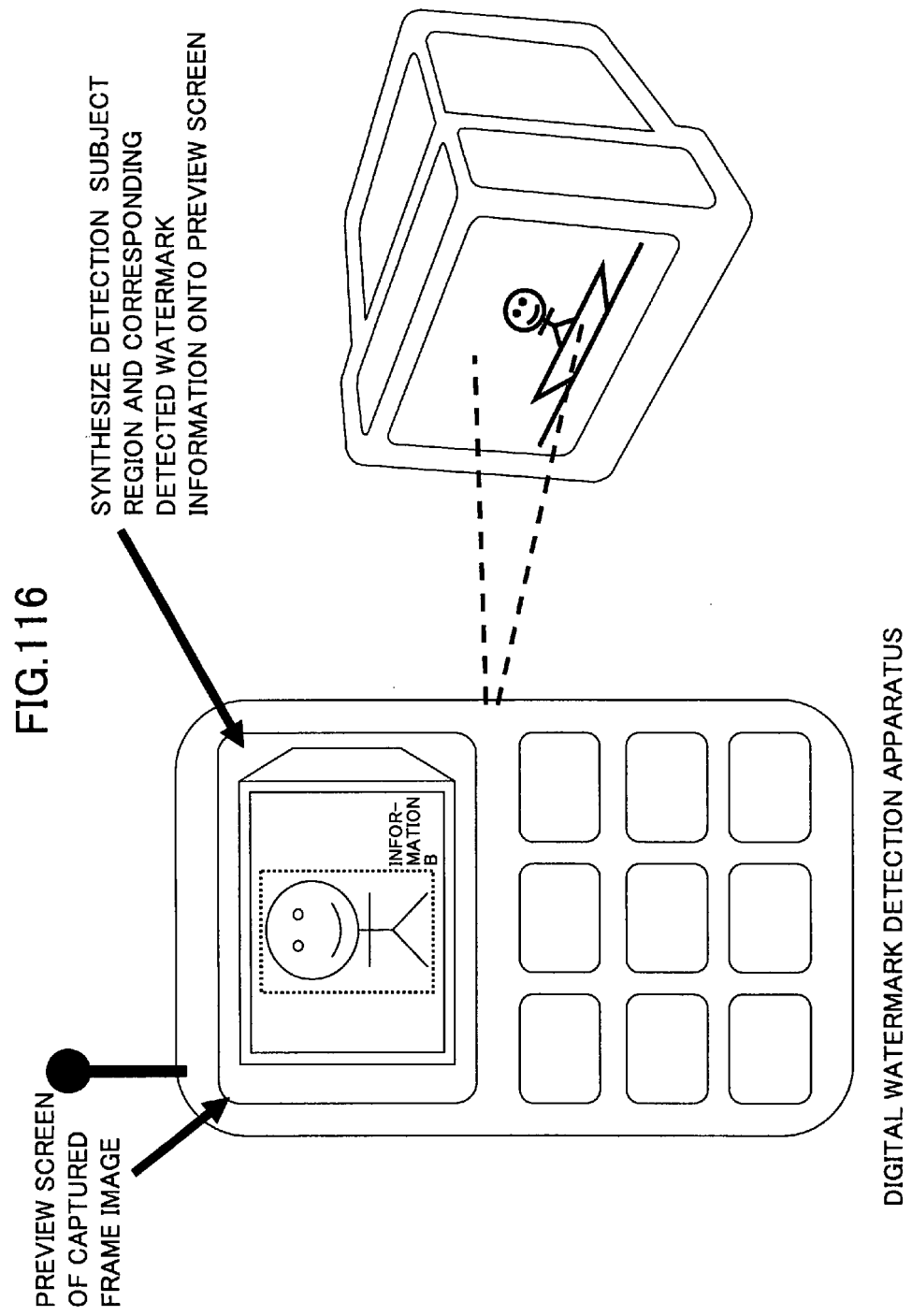

In addition, as shown in FIGS. 115 and 116, when zooming in a part of the display screen to take the part, a digital watermark detection status corresponding to only the part can be output. By using this, for example, an instruction can be realized for selecting some objects from a plurality of objects in the display screen using digital watermark detection.

By the way, it is obvious that the present embodiment can be also carried out by arbitrarily combining with contrivances of the first to nineteenth embodiments.

<Effects of the Present Embodiment>

According to the present embodiment, a plurality of watermark patterns are superimposed and embedded onto one frame of the moving images, and a plurality of detection subject regions in the frame image obtained by camera-capturing are extracted so that digital watermark detection is performed for each region. Accordingly, it becomes possible to embed and detect digital watermark associated with an object in the frame image so that convenience improves. In addition, by performing capturing and detection by zooming in a particular object when taking the image, it can be used for an user interface for selecting a particular object in the screen.

Twenty First Embodiment

In the present embodiment, an example is described for performing embedding of watermark information as phase difference change of the watermark pattern.

The present embodiment is the same as the first to twentieth embodiments except for parts described below. In the following, differences from the first embodiment are mainly described.

The watermark pattern generation unit 120 in the digital watermark embedding apparatus 100 in the present embodiment is described.

Figure 117:
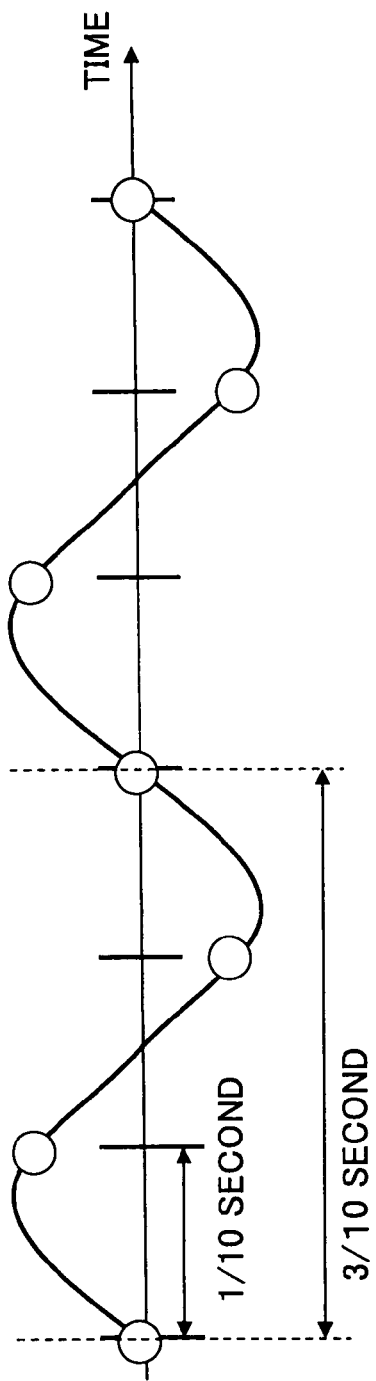

FIG. 117 is a figure for explaining an example of watermark pattern switching information in the twenty first embodiment of the present invention.

The watermark pattern switching information in the present embodiment is not information for directly instructing to reverse the pattern, but is information for indicating a period of the watermark pattern and a switching point in the period.

FIGS. 118 and 119 are figures for explaining processes of the watermark pattern switching unit in the twenty first embodiment of the present invention.

The watermark pattern switching unit 122 first converts gray values of the received basic watermark pattern into a phase difference change pattern. For example, when the basic watermark pattern is binary as shown in FIG. 118, two phase difference change values corresponding to bright and dark respectively are obtained, the phase difference change value is associated to a pixel position having a pixel value of bright or dark on the basic watermark pattern. As to how the binary phase change difference values are obtained, when the watermark pattern switching information indicates "switching intermittently every $1/10$ second such that $3/10$ second becomes one period", since one period is $3/10$ second, and the switching timing is $1/10$ second, if phase is changed by $2\pi/3$ in $1/10$ second, the phase returns to the original phase after 3/10 second. Therefore, two values of 2π/3 and −2π/3 which is in the opposite direction are used as the phase difference change values.

After obtaining the phase difference change pattern as mentioned above, the watermark pattern switching unit 122 adds the phase difference change pattern to a pattern of a next previous watermark phase for each switching timing where display time of received frame is placed on a time axis of the pattern switching information. In the example of FIG. 118, a phase difference change pattern is added to the watermark phase pattern at each of times t0, t1 and t2. By the way, it is assumed that an initial value of the watermark pattern in a head frame of moving images, for example, is set such that each element of the watermark phase pattern arbitrarily takes any of 0 and the above-mentioned difference change values.

After obtaining the watermark phase pattern in the above-mentioned way, the watermark pattern switching unit 122 converts the watermark phase pattern into a watermark pattern. As to how the conversion is performed, as shown in FIG. 119 for example, each element value of the watermark phase pattern is associated with a point on a circle having a radius r (r is a given value) centered on the origin point (0, 0) in a coordinate system having orthogonal axes indicating more than one components of image, that are Cb and Cr in YCbCr color coordinate system in the example of the figure. A Cb coordinate and a Cr coordinate in the Cb-Cr coordinate system obtained as a result of the above-mentioned process are regarded as a pixel value of the watermark pattern corresponding to an element of the watermark phase pattern so as to obtain all pixel values of the watermark pattern. The watermark pattern obtained in the above mentioned way becomes a pattern in which each pixel has a plurality of component values.

By the way, in the present embodiment, although Cb and Cr are used as an example, various methods may be used such as R-G of RGB color coordinate system, X-Y in XYZ color coordinate system, H-S in HSV color coordinate system and the like.

When visual sensitivity for change amount is different for each axis, scales may be corrected as necessary such that visual sensitivity becomes the same for each change amount for each axis. In the present embodiment, an example using Cb and Cr components is shown because they cannot be easily perceived compared with Y in the YCbCr color coordinate system.

In addition, when the present embodiment is carried out using a single component instead of a plurality of image components, for example, using a brightness component, digital watermark embedding using phase difference change can be realized in the same way as the present embodiment by using the waveform pattern for the basic watermark pattern like the modulation method (A-2) of the first embodiment and by changing the phase of the waveform pattern.

Similar to the first embodiment, the watermark pattern obtained in the above-mentioned way is sequentially superimposed onto the frame image so that the watermark embedded moving images can be obtained.

The difference image generation unit 230 in the digital watermark detection apparatus 200 in this embodiment is described.

FIG. 120 is a figure for explaining processes of the difference image generation unit in the twenty first embodiment of the present invention. The difference image generation unit 230 obtains the difference image by performing processes similar to those of the first embodiment. After that, the difference image generation unit 230 further modifies the difference image. As an example of the method of the modification, as shown in FIG. 120, Cb and Cr component values (cb,cr) is obtained for each pixel of the difference image, and the values are plotted on a Cb-Cr orthogonal coordinate system to obtain polar coordinate representation (R, θ) in the same way as performed when embedding. Next, an angle among angles (π/6, π/2, π/6, 5π/6, 7π/6, 3π/2, 11π/6), indicated by circles in the figure, nearest to θ is determined so that a sign (+ or −) assigned to the nearest angle is obtained. Finally, a distance R from the origin point is multiplied by this sign to obtain a value, and the value is overwritten on the difference image as a pixel value of the pixel. This process is performed on every pixel of the difference image.

Processes after the difference image generation unit 230 are the same as those in the first embodiment.

Next, principle of the present embodiment is described.

As assumption of explanation, it is assumed that capture timing and difference timing are specified based on watermark pattern switching information like the third embodiment as shown in FIG. 121 in the digital watermark detection apparatus in the present embodiment. In FIG. 121, it is specified to calculate a difference between detection subject region images 1/10 apart. As described in the fourth embodiment and the like, in the digital watermark embedding and detection method described in the first to twentieth embodiments, the watermark pattern in the obtained difference image becomes in phase or in reversed phase with respect to the phase used when embedding so that it is necessary to support it by using various contrivances.

Principle of the present embodiment is described with reference to FIGS. 122 and 123. FIG. 122 enumerates all possible patterns of Cb-Cr component values embedded in two frame 1/10 second apart, namely, values corresponding to phase pattern used when embedding and Cb-Cr values obtained by subtraction, when the phase difference change pattern value used when embedding is 2π/3. As shown in the figure, when the phase difference change value when embedding is 2π/3, the Cb-Cr component value in the difference image has a phase of one of three phases: π/6, 5π/6 and 3π/2.

FIG. 123 shows a case when the phase difference change value is −2π/3. In this case, the Cb-Cr component value in the difference image has either one phase of three phases: 7π/6, π/2 and 11π/6. That is, Cb-Cr component values in the difference image can be classified to two groups according to the phase difference change values. By using this, the phase difference change value when embedding can be steadily obtained irrespective of timing of capturing by determining which group the phase of the Cb-Cr component when performing detection belongs to as shown in FIG. 120. Since the phase difference change value corresponds to a value of a term in a series obtained by spreading the watermark information, the watermark pattern (corresponding to the watermark pattern in the corrected difference image in FIG. 120) obtained by subtraction is not reversed irrespective of capturing timing so that the watermark pattern is in phase with the basic watermark pattern used when embedding.

The characteristic that "the watermark pattern obtained by subtraction is always constant irrespective of timing" is extremely important. For example, as to the modulation method (A-1) in the first embodiment, since bits of detected watermark information are reversed when the watermark pattern in the difference image is reversed, contrivances such as those in the fourth and fifth embodiments are required for identifying the phase.

In addition, as to other modulation methods in the first embodiment, the phase needs to be adjusted for improving detection performance of the watermark information and the detection subject region so that various contrivances are used as shown in the sixth embodiment and the nineteenth embodiment for example. In contrast, by using the present embodiment, such problem is completely solved, and since the watermark pattern is constant irrespective of how the difference is calculated, bit reversal does not occur in the detected watermark information as a matter of course, and it is only necessary simply add images without concern of the phase when adding and storing the difference images.

In addition, when watermark information is divided into data blocks so that they are sequentially embedded in a time direction like the eighth embodiment, there is a risk in that incorrect watermark information may be detected for a difference image that straddles a border of the data blocks as shown in FIG. 124 according to the modulation method shown in the first embodiment. Therefore, for keeping safety, it is necessary to put a section where watermark is not embedded into data block sections. Accordingly, there is a problem in that the watermark information length per a unit time is reduced.

However, by using the present embodiment, watermark information is represented by the phase difference change. Thus, by performing embedding by adding a phase difference change representing current data block information to a phase pattern at a next previous data block terminal end, even though a difference image straddling a data block border is obtained when performing detection, data block information can be correctly detected from the difference image. Accordingly, since embedding/detection can be performed while switching data blocks continuously without inserting unnecessary blanks, watermark information amount per a unit time can be increased.

By the way, it is obvious that the present embodiment can be carried out by arbitrarily combining it with each contrivance of the first to twentieth embodiments.

<Effects of the Present Embodiment>

According to the present embodiment, since watermark information is embedded as the phase difference change, the difference image including constant watermark pattern can be obtained irrespective of the timing for obtaining the difference image. Accordingly, it becomes unnecessary to avoid bit reversal of watermark information and to adjust phases when storing difference images so that it is only necessary to simply add and store difference images. Thus, apparatus configuration can be simplified, speed of processes can be increased, and the phase synchronization signal becomes unnecessary, so that increase of watermark information length and improvement of tolerance can be realized. In addition, when using the data block using type like the eighth embodiment, reliability of detection information can be kept without inserting any unnecessary blank between data blocks. Thus, the watermark information length per a unit time can be increased.

Twenty Second Embodiment

The present embodiment is the same as the first to twenty first embodiments except for parts described below.

In the following, differences from the first embodiment is described. Processes of the difference image generation unit 230 in the digital watermark detection apparatus 200 are described.

FIG. 125 is a figure for explaining processes of the difference image generation unit in the twenty second embodiment of the present embodiment.

In the present embodiment, after the difference image generation unit 230 generates the difference image of the detection subject region images, the difference image generation unit 230 performs filtering process on the difference image to output it.

FIGS. 126A and 126B are figures for explaining examples of filtering process in the twenty second embodiment of the present invention. The difference image is represented as one dimensional signal for explanation. In FIG. 126A, non-linear filtering process is performed in which, when an absolute value of a pixel value of the difference image is equal to or greater than a given threshold, the value is clipped to the threshold value. In the FIG. 126B, non-linear filtering process is performed in which, when an absolute value of a pixel value of the difference image is equal to or greater than a given threshold, the pixel value is changed to 0.

<Effects of the Present Embodiment>

According to the present embodiment, large difference component that occurs when taking moving images including movement can be suppressed by the filtering process. Generally, since the watermark pattern is embedded with a weak amplitude, a difference component caused by movement of the image itself appears as a difference pixel value having a large absolute value on the difference image. Therefore, by using the non-linear filter in the present embodiment, the difference component due to the movement of the moving images can be suppressed, and the component of the watermark pattern is not suppressed. Thus, an S/N ratio of the watermark pattern is improved so that detection performance from the moving images including movement can be improved.

Twenty Third Embodiment

The present embodiment is the same as the first to twenty second embodiments except for parts described below. In the following, differences from the first embodiment are described.

FIG. 127 is a figure for explaining processes of the watermark pattern superimposing unit in the twenty third embodiment of the present invention.

The watermark superimposing unit 130 in the present embodiment includes a function for storing a several number of past frame images that are sequentially received, and generates a difference image between a currently received frame image and a previous frame image. The previous frame image may be a next previous one or may be one several frames before. Next, the watermark pattern is scaled as necessary like the first to twenty second embodiments. Next, an amplitude of the watermark pattern is adjusted based on the difference image. As an only process after that, the watermark pattern in which the amplitude is adjusted is superimposed on the frame image like the first to twenty second embodiments.

FIG. 128 is a figure for explaining amplitude adjustment for the watermark pattern in the twenty third embodiment of the present invention.

In (1) in the figure, a total sum of absolute values of pixel values of the difference image are obtained, and the amplitude of the whole watermark pattern is adjusted based on the value of the total sum. As to how the adjustment is performed, the greater the total sum value is, the greater the amplitude is adjusted to be, such as amplifying the amplitude by a value in proportion to the total sum value, for example. Alternatively, as shown in (2) in the figure, there may be a method in which, based on a pixel value of each coordinate point in the difference image, the amplitude of a pixel value at a corresponding coordinate point in the watermark pattern may be adjusted. In this case, for example, the larger the absolute value of the pixel value of the difference image is, the larger the amplitude of the watermark pattern at a corresponding position is adjusted to be. In both of (1) and (2) in the figure, the larger the number of pixels having a large absolute value is in the difference image, that is, the more vigorously the movement in the moving image is, the more the amplitude of the watermark pattern is amplified. In addition, the method for amplifying may be performed in more complicated way such as performing (2) in the figure after performing (1) in the figure.

<Effects of the Present Embodiment>

According to the present embodiment, when superimposing a watermark pattern onto moving images including movement, a watermark pattern having larger amplitude is superimposed for a frame including many pixels having a large absolute value in the difference value, that is, for a frame including vigorous movement compared with a frame including small movement. Generally, noise is hardly perceived in a moving image scene including vigorous movement compared with a still scene. Thus, even when the amplitude of the watermark pattern is strengthened in the frame including the vigorous movement, it is possible that image quality deterioration due to watermark embedding cannot be perceived.

In addition, in a scene including especially many movements, since there are many pixels having a large absolute value in the difference image when performing detection, there is a problem in that noise becomes large as to watermark detection. But, by embedding watermark pattern strongly beforehand for a scene including vigorous movement like the present embodiment, the S/N ratio improves so that watermark detection performance improves.

Twenty Fourth Embodiment

The present embodiment is the same as the first to twenty third embodiments except for parts described below. In the following, differences from the first embodiment are described.

FIG. 129 shows a configuration of a digital watermark detection apparatus in the twenty fourth embodiment of the present invention.

The digital watermark detection apparatus 200J shown in the figure includes a moving image input unit 210, a detection subject region extraction unit 220, a difference image generation unit 230, a digital watermark detection unit 240, a detection subject region image buffer 250, and a zooming process unit 310. The configuration shown in the figure is one in which the zooming process unit 310 is added to the digital watermark detection apparatus 100A of the first embodiment.

FIG. 130 is a flowchart of operation in the twenty fourth embodiment of the present invention.

Operation in steps 1901-1906 in the flowchart shown in the figure is the same as that in steps 201-206 in FIG. 20, and the explanation is not provided.

Step 1907) When detection status of the digital watermark detection unit 210 is not good, the process goes to step 1901, and when it is good, process in step 1908 is performed.

Step 1908) When the detection status is good, the zooming process unit 310 generates a zooming parameter such that the detection subject region becomes a given size using the detection subject region information indicating the size and the position of the detection subject region and the detection status of the digital watermark detection unit 240, and the zooming parameter is given to the moving image input unit 210, and the process goes to the process of step 1901. Accordingly, the moving image input unit 210 automatically causes a camera, a scanner and the like to perform zooming based on the given zooming parameter.

Here, in the same way as the seventeenth embodiment, "detection status is good" indicates a status in which the detection reliability index value of the document 1 is a significant value for some extent but digital watermark detection is not succeeded, for example, or indicates a status in which detection of a data block is succeeded when performing detection for each data block in eighth embodiment, that is, it indicates a case in which existence of digital watermark is significantly obvious according to a detection status of the digital watermark detection unit 240. For example, when the detection subject region represented by current detection subject region information is less than 40%, zooming-in is automatically performed such that it becomes equal to or greater than 40% such that the area of the detection subject region becomes equal to or greater than 40% of the area of the frame image. Alternatively, when detection status in a detection trial is good and when the area of the detection subject region is 20%, zooming-in may be gradually performed for each detection trial so as to change display image smoothly to improve user interface.

In a case when detection of the edge of the detection subject region fails if performing zooming-in too much, the detection subject region may not be zoomed in until it fills the frame image but it may be zoomed in to a given size (50% of the frame image, for example). Further, instead of to the given size, the zooming ratio may be changed as necessary such that vertexes or sides of the detection subject region defined by current detection subject region information are fallen within the frame image (for example, between a case when the detection subject region exists in a center part of the frame image and a case when it exists in an edge side, degree of zooming is smaller in the latter case).

By the way, in the above-mentioned example, although differences from the first embodiment are described, a combination with any of the thirteenth to fifteenth embodiments can be easily realized, and it can be easily realized to perform zooming such that the feature region of the sixteenth embodiment becomes a given size, to combine the seventeenth embodiment by zooming into a range of neighborhood search according to change of zooming ratio in the same way, or to detect watermark information associated with a particular image region by performing detection trial by framing one of a plurality of watermark patterns into a center part of the taken image by automatically performing the zooming in the twentieth embodiment.

<Effects of the Present Embodiment>

According to the present embodiment, when a pixel size of the detection subject region in the taken frame image is small, a detection subject region of a larger pixel size can be obtained by automatically performing zooming-in. Generally, when a number of pixel samples becomes small, digital watermark detection becomes difficult. Thus, by increasing the number of pixel samples in the detection subject region by performing zooming-in, performance for detecting digital watermark can be improved.

In addition, by performing zooming-in only when the detection status is good based on the detection status of the digital watermark, for example, when detection status is good as shown in FIG. 131A, the number of pixel samples in the detection subject region can be increased by zooming-in so as to be able to increase detection performance. At the same time, as shown in FIG. 131B, when a region that is not a real detection subject region is incorrectly determined as a detection subject region, since digital watermark detection status is not good, zooming-in is not performed, that is, since zooming-in is performed only for a detection subject region where existence of digital watermark is surly obvious to improve

Twenty Fifth Embodiment

In the present embodiment, watermark information is embedded as the phase difference change. When detecting, a difference image (A) is generated first, and a phase difference between temporally adjacent difference images (A) is measured, and digital watermark detection is performed from a difference image (B) obtained by using the phase difference, so that digital watermark detection is always available under a same condition irrespective of capture timing, capture time interval or shatter speed when performing detection.

The present embodiment is the same as the first to twenty fourth embodiments except for parts described below. In the following, differences from the first embodiment are mainly described. The configuration of the digital watermark embedding apparatus in the present embodiment is the same as one in the first embodiment.

FIG. 132 is a figure for explaining an example of watermark pattern switching information in the twenty fifth embodiment of the present invention.

Watermark pattern switching information of the watermark pattern generation unit 120 in the digital watermark embedding apparatus 100 in the present embodiment is not information for directly instructing reversal of pattern, but is represented by a continuous function such as a sine wave in which one cycle is 6/30 second, more particularly, is information indicating a period of a sine wave. Actually, the input moving images are provided as discrete frame images having a specific frame rate such as 30 frames/second. Thus, as shown in a lower figure in FIG. 132, embedding can be performed by performing discrete sampling on a sine wave. By the way, in the present embodiment, a phase value for a period of the sine wave is used as shown in the following description.

FIG. 133 is a figure for explaining processes of the watermark pattern switching unit in the twenty fifth embodiment. The watermark pattern switching unit 122 converts density values of the input basic watermark pattern into a sign pattern first. The sign pattern is an array including each element value that is obtained by extracting + or − sign of each density value of the basic watermark pattern and by changing the size to 1.

Next, the watermark pattern switching unit 122 obtains a phase (to be called a watermark pattern switching phase hereinafter) for a period of watermark pattern switching information corresponding to a frame display time, where input frame display time is taken on a time axis of the watermark pattern switching information. Then, a phase change value between the watermark pattern switching phase and a watermark pattern switching phase of a next previous frame is obtained (+π/3 in FIG. 133), and this phase change value is multiplied by the element value of the sign pattern to obtain a phase change amount of each element value of the watermark phase pattern. The watermark phase pattern is an array having a size the same as that of the sign pattern, wherein each element has a phase value from 0 to 2π. The initial value of each element of the watermark phase pattern may be an arbitrary value.

After obtaining the watermark phase pattern as mentioned above, the watermark pattern switching unit 122 converts the phase pattern into a watermark pattern. As to how conversion is performed, as shown in FIG. 134 for example, each element value of the watermark phase pattern is associated with a point on a circle of a radius r (r is a given value) centered on the origin (0, 0) in a coordinate system having orthogonal axes of more than one image components, that are, Cb and Cr in the YCbCr color coordinate system in the figure, wherein the angle of the point is the phase pattern element value. All pixel values of the watermark pattern are obtained in which a Cb coordinate and a Cr coordinate on the Cb-Cr coordinate system obtained as a result of the above-mentioned process are a pixel value of the watermark pattern corresponding to an element of the phase pattern. The watermark pattern obtained in such a way becomes a pattern including a plurality of component values for each pixel. By the way, although Cb and Cr are used as an example in the present embodiment, various methods can be used such as using R-G in the RGB color coordinate system, using X-Y in the XYZ color coordinate system, and using Hue-Saturation in the HSV color coordinate system (in this case, Hue-Saturation may not be taken on the orthogonal coordinate, but, a phase value may directly set to be a Hue value and may have a given Saturation value).

In addition, when visual sensitivity for change amount is different for each axis, scales may be corrected as necessary such that visual sensitivity becomes the same for each change amount for each axis (for example, an ellipse instead of a circle is used in FIG. 134). In the present embodiment, an example using Cb and Cr components is shown because they cannot be easily perceived compared with Y in the YCbCr color coordinate system.

In addition, when the present embodiment is carried out using a single component instead of a plurality of image component, for example, using a brightness component, digital watermark embedding using phase difference change can be realized in the same way as the present embodiment by using the waveform pattern for the basic watermark pattern and changing the phase of the waveform pattern like the modulation method (A-2) of the first embodiment.

Similar to the first embodiment, the watermark pattern obtained in the above-mentioned way is sequentially superimposed onto the frame image so that the watermark embedded moving images can be obtained.

When Cb-Cr is used, to adjust the amplitude of the watermark pattern means to increase or decrease the amplitude (distance between point a0 and the origin in FIG. 134) on the Cb-Cr coordinate system. In addition, when using Hue-Saturation, it means to increase or decrease Saturation. In addition, when multiple values instead of binary value are used for the basic watermark pattern, the amplitude of a pixel value of the watermark pattern may be increased or decreased according to a size of an absolute value of the corresponding pixel value of the basic watermark pattern.

FIG. 135 is a block diagram of the digital watermark detection apparatus in the twenty fifth embodiment of the present invention.

The digital watermark detection apparatus in the present embodiment includes an moving image input unit 210, a detection subject region extraction unit 220, a difference image generation unit 230, a phase difference measurement unit 360, a digital watermark detection unit 240, a detection subject region image buffer 250, and a phase pattern buffer 370.

FIG. 136 is a flowchart of operation of the digital watermark detection apparatus in the twenty fifth embodiment of the present invention.

Differences from the first embodiment are described. A difference image (represented as difference image (A) in the present embodiment) output by the difference image generation unit 230 in the same way as the first embodiment is input to the phase difference measurement unit 360 as shown in FIG. 137. The phase difference measurement unit 360 generates a phase pattern from the difference image (A) (step 2040), measures a phase difference between the currently obtained phase pattern and a previously obtained phase pattern so as to form a new difference image (B) based on the phase difference and output it (step 2050). The digital watermark detection unit 240 receives the difference image (B) and performs digital watermark detection from the difference image (B) in the same way as the first embodiment (step 2070).

FIG. 138 is a figure for explaining contents of processes of the phase difference measurement unit in the twenty fifth embodiment of the present invention.

The phase difference measurement unit 360 receives the difference image (A). The phase difference measurement unit 360 divides the difference image (A) into blocks in the same way performed when embedding, and obtains each total sum for the Cb component and the Cr component for each block, and obtains an amplitude R and an phase θ when representing the result (Cb, Cr) as a point on the Cb-Cr coordinate system, and sets each of these to be a value of an element corresponding to the block position in a phase pattern. The phase pattern is an array including an amplitude and a phase for each element position, and each element is associated with each block in the difference image.

Next, the phase difference measurement unit 360 compares the previously obtained phase pattern stored in the phase pattern buffer 370 and the currently obtained phase pattern so as to determine a sign that is plus or minus based on a phase difference of each element, further determine a new amplitude using a monotone increasing function in which the larger each amplitude of the two phase pattern is, the larger value the function takes, and determines each element value of the difference image (B) having the sign and the amplitude as the element value.

FIGS. 140A and B are figures for explaining contents of processing of the phase difference measurement unit in the twenty fifth embodiment of the present invention.

A phase difference θ-θ' between a phase value θ of an element of the currently obtained phase pattern and a phase value θ' of a corresponding element of the previously obtained phase pattern is obtained, and if the value is within a range of 0-π, a sign "+" is selected, and if the value is within a range of −π-0, a sign "−" is selected. As an example of the monotone increasing function used for obtaining a new amplitude value ρ from an amplitude value R of an element of the currently obtained phase pattern and an amplitude value R' of a corresponding element of the previously obtained phase pattern, ρ(R,R')=R+R' or ρ(R,R')=R×R' can be used. The reason for using monotone increasing function with respect to the amplitude values R and R' is to improve detection performance of digital watermark by assigning weight to one in which watermark signal is strongly remained, that is, amplitude R, R' is large.

After performing the processes for selecting the sign and obtaining the amplitude value for every element, the difference image (B) is sent to the digital watermark detection unit to try watermark detection from the difference image (B). By the way, the currently obtained phase pattern is stored in the phase pattern buffer 370 for using in later detection trial.

Next, principle of the present embodiment is described using some examples where capturing timing is different when performing detection.

In the capturing example A in FIG. 141, frame capturing is performed every 1/15 second, that is, every other frame. Considering a Cb-Cr value in a watermark pattern in a difference image (A) (represented as (a), (b), (c), . . . in FIG. 141) obtained between adjacent captured frames (represented as (1), (2), (3), (4) . . . , in FIG. 141), the value becomes a result of calculating a difference when regarding Cb-Cr component value as a vector as shown in FIG. 142 as to a positive element in the sign pattern in FIG. 133, and as shown in FIG. 143 as to a minus element. This is because, calculation for the difference image corresponds to difference calculation of each term of the Cb component and Cr component (accordingly, original image component is largely reduced), and as described in the twenty first embodiment, a plurality of phases are obtained in the difference image (A) as shown in FIGS. 142 and 143.

In the present embodiment, after obtaining the difference image (A), the phase pattern is generated on the basis of the phase value of the Cb-Cr component of the difference image (A), and a difference value between temporally adjacent phase patterns is measured (phase difference data between the phase pattern is represented as (α), (β), (γ) . . . in FIG. 141). The statuses are shown in FIG. 144 (when the sign pattern is plus) and FIG. 145 (when the sign pattern is minus). In FIGS. 144 and 145, by obtaining the difference of the phases, it turns out that a phase difference 2π/3 of the watermark pattern when embedding is equally obtained between any adjacent captured frames from the phase difference of the phase patterns.

In this embodiment, digital watermark detection is performed by determining the sign of the difference image (B) using plus and minus of the phase difference value. As mentioned above, since the phase difference is associated with the sign pattern when embedding, it is obvious that detection of digital watermark is available. That is, digital watermark detection can be similarly performed from any timing of the captured frames.

FIG. 146 shows a capturing example B different from the capturing example A (FIG. 141). In the capturing example B, although capturing is performed every 1/15 second like the capturing example A, timing of start of capturing is shifted. In the case of the capturing example B, when the difference image (A) is generated first, since phase of the watermark pattern embedded in each captures frame is shifted with respect to the capturing example A (FIG. 141), combination of Cb-Cr values (phase values of phase pattern) in the watermark pattern in the difference image (A) is different from the cases (FIG. 142 and FIG. 143) of the capturing example A. Accordingly, in the twenty first embodiment in which watermark information is detected only from combination of Cb-Cr values (phase values of the phase pattern) in the watermark pattern in the difference image (A), it turns out that, the sign patter can be classified to "+" or "−", but which is "+" or which is "−" among the two groups can not be identified.

However, in the present embodiment, by measuring the phase difference of adjacent difference images (A) as shown in FIGS. 149 and 150, a sign the same as the sign pattern element when embedding can be always detected. That is, according to the present embodiment, there is no difference between the capturing example A and the capturing example B, so that digital watermark detection can be performed similarly in an arbitrary capture start timing.

FIG. 151 shows a capturing example C different from each of the capturing examples A and B. In the capturing example C, the timing for capturing is not constant in which the timing is 1/30 second interval or 1/15 second interval or the like. In the case of capturing example C, when the difference image (A) is generated first, Cb-Cr values (phase values in the phase pattern) in the difference image (A) are obtained where the combination is different from those of the capturing example A and capturing example B as shown in FIGS. 152 and 153. In the case where time intervals for capturing are different for each time like the capturing example C, since it is difficult to classify Cb-Cr values (phase values in the phase pattern) in the difference image (A) into two, detection is difficult using a method like that in the twenty first embodiment.

However, in the present embodiment, the phase difference between adjacent difference images (A) is measured as shown in FIGS. 154 and 155. At this time, although the value of the phase difference varies according to change of the capturing time interval, the sign determined based on the phase difference is constant (0~π→+, −π~0→−) irrespective of the capturing time interval, and the sign is the same as the sign pattern when embedding. Accordingly, even when the capturing time intervals change like the capturing example C, digital watermark detection can be performed without problem.

FIG. 156 shows a capturing example D different from each of the capturing examples A, B and C. In a case such as camera capturing for moving images, when shutter speed is low, there is a case in which a plurality of moving image frames are exposed and superimposed on one capture frame. For example, in the capturing example D shown in FIG. 156, moving image frames displayed every 1/30 second are superimposed on one capture frame by multiple exposure. However, since the phase of the watermark pattern in the captured frame obtained by the superimposition is a superimposition of phases in each of the multiplexed moving image frames (since synthesized image can be obtained by calculating weighting average with a proper ratio for each term of the Cb and Cr components in a plurality of frames), a value in the middle of the phase of each of the multiplexed moving image frames is taken as shown in FIG. 157 (although FIG. 157 shows an example in which two frames are synthesized with a ratio of 1:1 by multiple exposure, it is obvious that, in a case when 2:1 for example, an intermediate value is taken according to an interior division ratio). In the case of the capturing example D, when the difference image (A) is obtained first, Cb-Cr values (phase values in the phase pattern) are obtained in which the combination is different from that of each of the capturing examples A, B and C as shown in FIGS. 158 and 159. In the case of the capture frame obtained by multiple exposure like the capturing example D, it is difficult to classify Cb-Cr values (phase values in the phase pattern) in the difference image (A) into two, detection is difficult using a method like that in the twenty first embodiment.

However, according to the present embodiment, by measuring the phase difference between adjacent difference images (A) as shown in FIGS. 160 and 161, a sign the same as the sign pattern element when embedding can be always detected. That is, according to the present embodiment, even if a plurality of moving image frames are multiple-exposed and synthesized in a captured frame when capturing timing shifts by an arbitrary time smaller than frame display timing of the moving images, digital watermark detection can be performed similarly.

The characteristic that "the watermark pattern obtained by the difference is always constant irrespective of capture timing, capture time interval or shatter speed" is extremely important. For example, as to the modulation method (A-1) in the first embodiment, when the watermark pattern in the difference image is reversed, since bits of the detection watermark information are reversed, contrivance like the fourth or fifth embodiment are required for identifying phase.

In addition, as to other modulation methods shown in the first embodiment, various contrivances are used as shown in the sixth or ninth embodiment, for example, since it is necessary to adjust phases when storing difference images in order to improve detection performance for watermark information and the detection subject region. But, by using the present embodiment, such problems are completely solved, and since the watermark pattern is constant irrespective of how the difference is calculated, bit reversal does not occur in the detected watermark information as a matter of course, and it is only necessary to simply add images without concern of the phase when adding and storing the difference images.

In addition, when watermark information is divided into data blocks so that it is sequentially embedded in a time direction like the eighth embodiment, there is a risk in that incorrect watermark information may be detected for a difference image that straddles a border of the data blocks as shown in FIG. 124 in the modulation method shown in the first embodiment. Therefore, for keeping safety, it is necessary to put a section where watermark is not embedded into data block sections. Accordingly, there is a problem in that the watermark information length per a unit time is reduced.

However, by using the present embodiment, watermark information is represented by the phase difference change. Thus, by performing embedding by adding a phase difference change representing current data block information to a phase pattern at a next previous data block terminal end, even though a difference image straddling a data block border is obtained when performing detection, data block information can be correctly detected from the difference image. Accordingly, since embedding/detection can be performed while switching data blocks continuously without inserting unnecessary blanks, watermark information amount per a unit time can be increased.

In addition, in a case where capture interval is changed and a plurality of moving image frames are synthesized to be a capture frame by multiple exposure, which are difficult case for the twenty first embodiment, according to the present embodiment, detection is available without problem as mentioned above, and effects by combining with each of the above-mentioned embodiments can be obtained.

By the way, it is obvious that the present embodiment can be carried out by combining it with each contrivance in the first to twenty fourth embodiments. That is, before-mentioned effects can be obtained by inserting the process of the phase difference measurement unit of the present embodiment into a corresponding portion in each embodiment (such as before the digital watermark detection unit or the detection subject region extraction unit) and by performing the process. When being combined with other embodiment, it is only necessary to read the difference image (B) in the present embodiment as the difference image or the detection subject region image. In the following, a simple explanation is provided for a case where contrivance of the present embodiment is applied to each embodiment.

First to twelfth, and twenty first to twenty fourth embodiments: output of the difference image generation unit in the digital watermark detection unit is supplied to the phase difference measurement unit as the difference image (A) to obtain the difference image (B) and it is supplied to the digital watermark detection unit.

Thirteenth to twentieth embodiments: a detection subject region image that is an output of the detection subject region extraction unit is supplied to the phase difference measurement unit as the difference image (A) of the present embodiment to obtain the difference image (B) and it is supplied to the digital watermark detection unit.

<Effects of the Twenty Fifth Embodiment>

According to the present embodiment, watermark information is embedded as the phase difference change, and the difference image (A) is generated first when detecting, and the phase difference between temporally adjacent difference images (A) is measured, and digital watermark detection is performed from the difference image (B) obtained by using the phase difference. Therefore, as mentioned before, digital watermark detection can be always performed under a same condition irrespective of capture timing, capture time interval, or shatter speed when detecting. Accordingly, it becomes unnecessary to avoid bit reversal of watermark information and to adjust phases when storing difference images so that it is only necessary to simply add and store difference images. Thus, apparatus configuration can be simplified, speed of processes can be increased, and the phase synchronization signal becomes unnecessary, so that increase of watermark information length and improvement of tolerance can be realized.

In addition, when using the data block using type like the eighth embodiment, reliability of detection information can be kept without inserting any unnecessary blank between data blocks. Thus, the watermark information length of per a unit time can be increased. In addition, when capture timing of a detection apparatus changes or when a plurality of moving image frames are multiple-exposed and synthesized by camera taking, digital watermark detection is available without any problem. Thus, the configuration of the moving image input unit 210 in the digital watermark detection apparatus 200 can be simplified (it is not necessary to perform capturing with accurate clocks), and it becomes possible to improve digital watermark detection performance in a case when using analog optical reading such as a case using a camera.

Twenty Sixth Embodiment

According to the present embodiment, watermark information is embedded as the phase difference change, and the difference image (A) is generated first when detecting, and the phase difference between temporally adjacent difference images (A) is measured, a difference image (B) obtained by using the phase difference is generated, a detection subject region is extracted by adding and storing the difference images (B), and digital watermark detection is performed from the detection subject region image. Therefore, as mentioned before, digital watermark detection can be always performed under a same condition irrespective of capture timing, capture time interval, or shatter speed when detecting. In addiction, effects of distortion caused by camera taking angle is corrected and watermark tolerance is improved by storing, so that more stable digital watermark detection is realized.

FIG. 162 is a block diagram of the digital watermark embedding apparatus in the twenty sixth embodiment of the present invention.

The digital watermark embedding apparatus 100 includes a frame image obtaining unit 110, a watermark pattern generation unit 120, a watermark pattern superimposing unit 130, and a moving image data reconstruction unit 140. The digital watermark embedding apparatus 100 of the present embodiment receives original moving image data, watermark information and watermark pattern switching information.

FIG. 163 is a flowchart of operation of the digital watermark embedding apparatus of the twenty sixth embodiment of the present invention.

Step 100) As shown in FIG. 164, the frame image obtaining unit 110 sequentially obtains a frame image and the frame display time from the original image data one by one. The frame display time, for example, may be one indicating absolute time, from the head of the moving image, that is determined from time code and frame rate when reproducing, or may be one by which relative time interval between frames when reproducing can be measured. When the supplied moving image data is coded data such as MPEG data, the frame image obtaining unit 110 obtains the frame image after performing decoding and the like.

Step 110) Next, the watermark pattern generation unit 120 generates the watermark pattern using the watermark information, frame display time and watermark pattern switching information.

Step 120) Next, the watermark pattern superimposing unit 130 superimposes the watermark patter onto the frame image to generate a watermark embedded frame image.

Step 130) Finally, the moving image data reconstruction unit 140 reconstructs a series of the watermark embedded frame images that are sequentially generated as moving image data so as to output the series as watermark embedded moving image data. At this time, encoding such as MPEG encoding may be performed as necessary.

FIG. 165 shows a configuration of the watermark pattern generation unit in the twenty sixth embodiment of the present invention. FIG. 166 is a flowchart of operation of the watermark pattern generation unit in the twenty sixth embodiment of the present invention.

The watermark pattern generation unit 120 includes a basic watermark pattern generation unit 121 and a watermark pattern switching unit 122, and receives the watermark information, the watermark pattern switching information and the frame display time.

Step 2100) First, the basic watermark pattern generation unit 121 converts the watermark information into a basic watermark pattern that is a two-dimensional pattern. There may be various methods for the conversion as shown in the first embodiment, and the modulation shown in the first embodiment is used in the present embodiment for simplifying explanation.

FIG. 167 shows an example of the process of the basic watermark pattern generation unit 121. In the present embodiment, a method is used in which a size of a pixel value is associated with a value of series obtained by directly performing spread spectrum modulation on the bit value of the watermark information using spreading series. Each pixel value of the basic watermark pattern in this case takes a value that is plus or minus.

Step 2110) Next, the watermark pattern switching unit 122 in the watermark patter generation unit 120 determines necessity of phase reversal of the basic watermark pattern based on relationship between the frame display time and the watermark pattern switching information, and changes the phase of the basic watermark pattern as necessary and output it as a watermark pattern.

FIG. 168 is a block diagram of the watermark pattern switching unit in the twenty sixth embodiment of the present invention.

The watermark pattern switching unit 122 includes a sign pattern generation unit 121, a watermark pattern switching phase change value calculation unit 1222, a watermark phase difference pattern generation unit 1223, a watermark phase pattern generation unit 1224 and a watermark phase pattern imaging unit 1225.

FIG. 169 is a flowchart of the operation of the watermark pattern switching unit in the twenty sixth embodiment of the present invention.

Step 2200) The sign pattern generation unit 1221 in the watermark pattern switching unit 122 converts the basic watermark pattern into a sign pattern first.

Step 2210) Next, the watermark pattern switching phase change value calculation unit 1222 obtains a difference value of the watermark pattern switching phase represented by the watermark pattern switching information based on a time difference between a next previous frame and the current frame represented by frame display times, in which the difference value is regarded as the watermark pattern switching phase change value.

Step 2220) Next, the watermark phase difference pattern generation unit 1223 generates a watermark phase difference pattern that has the sign indicated by the sign pattern and has the watermark pattern switching phase change value as the absolute value.

Step 2230) Next, the watermark phase pattern generation unit 1224 obtains a current watermark phase pattern by providing the current watermark phase difference pattern as a phase difference to each element value of the watermark phase pattern for the next previous frame.

Step 2240) Finally, the watermark phase pattern imaging unit 1225 converts the watermark phase pattern into an image pattern and outputs the result as a watermark pattern.

FIG. 170 is a figure for explaining watermark pattern switching information in the twenty sixth embodiment of the present invention.

Watermark pattern switching information of the watermark pattern generation unit 120 in the digital watermark embedding apparatus 100 in the present embodiment is not information for directly instructing reversal of pattern, but is represented by a continuous function such as a sine wave in which one cycle is 6/30 second, more particularly, is information indicating a period of a sine wave. Actually, the input moving images are provided as discrete frame images having a specific frame rate such as 30 frames/second. Thus, as shown in a lower figure in FIG. 170, embedding can be performed by performing discrete sampling on a sine wave. By the way, in the present embodiment, a phase value for a period of the sine wave is used as shown in the following description.

FIG. 171 is a figure for explaining processes of the watermark pattern switching unit in the twenty sixth embodiment of the present invention.

The watermark pattern switching unit 122 converts density values of the input basic watermark pattern into a sign pattern first. The sign pattern is an array including each element value that is obtained by extracting + or − sign of each density value of the basic watermark pattern and changing the size to 1.

Next, the watermark pattern switching unit 122 obtains a phase (to be called a watermark pattern switching phase hereinafter) for a period of watermark pattern switching information corresponding to a frame display time where input frame display time is taken on a time axis of the watermark pattern switching information. Then, a phase change value between the watermark pattern switching phase and a watermark pattern switching phase for a next previous frame is obtained (+π/3 in FIG. 171) as the watermark pattern switching phase change value, and this watermark pattern switching phase change value is multiplied by the element value of the sign pattern to obtain a watermark phase difference pattern. Then, each element value of the watermark phase pattern is provided to each element value of a watermark phase pattern for a next previous frame as a phase change amount so that a current watermark phase pattern is obtained. The watermark phase pattern is an array having a size the same as that of the sign pattern, wherein each element has a phase value from 0 to 2π). The initial value of each element of the watermark phase pattern may be an arbitrary value.

After obtaining the watermark phase pattern as mentioned above, the watermark phase pattern imaging unit 125 converts the watermark phase pattern into a watermark pattern. As to how conversion is performed, as shown in FIG. 172 for example, each element value of the watermark phase pattern is associated with a point on a circle of a radius r (r is a given value) centered on the origin (0, 0) in a coordinate system having orthogonal axes of more than one image components, that are, Cb and Cr in the YCbCr color coordinate system in the figure, wherein the angle of the point is the phase pattern element value. All pixel values of the watermark pattern are obtained in which a Cb coordinate and a Cr coordinate on the Cb-Cr coordinate system obtained as a result of the above-mentioned process are a pixel value of the watermark pattern corresponding to an element of the phase pattern. The watermark pattern obtained in such a way becomes a pattern including a plurality of component values for each pixel.

By the way, although Cb and Cr are used as an example in the present embodiment, various methods can be used such as using R-G in the RGB color coordinate system, using X-Y in the XYZ color coordinate system, and using Hue-Saturation in the HSV color coordinate system (in this case, Hue-Saturation may not be taken on the orthogonal coordinate, but, a phase value may directly set to be a Hue value and may have a given Saturation value).

When visual sensitivity for change amount is different for each axis, scales may be corrected as necessary such that visual sensitivity becomes the same for each change amount for each axis (for example, an ellipse instead of a circle is used in FIG. 134). In the present embodiment, an example using Cb and Cr components is shown because they cannot be easily perceived compared with Y in the YCbCr color coordinate system. In addition, when the present embodiment is carried out using a single component instead of a plurality of image component, for example, using a brightness component, digital watermark embedding using phase difference change can be realized in the same way as the present embodiment by using the waveform pattern for the basic watermark pattern and changing the phase of the waveform pattern like the modulation method (A-2) of the first embodiment.

Similar to the first embodiment, as shown in FIG. 173, the watermark pattern obtained in the above-mentioned way is sequentially superimposed onto the frame image while changing the amplitude of the watermark pattern as necessary in the watermark pattern superimposing unit 130 so that a watermark embedded moving image can be obtained. At this time, the size of the watermark pattern is changed to a size equal to or less than that of the frame image so that the watermark pattern is superimposed on a center of the frame image. By the way, when Cb-Cr is used, to adjust the amplitude of the watermark pattern means to increase or decrease the amplitude (distance between point a0 and the origin in FIG. 172) on the Cb-Cr coordinate system. In addition, when using Hue-Saturation, it means to increase or decrease Saturation.

In addition, when multiple value instead of binary value is used for the basic watermark pattern, the amplitude of a pixel value of the watermark pattern may be increased or decreased according to a size of an absolute value of the corresponding pixel value of the basic watermark pattern. Finally, the moving image data reconstruction unit 140 reconstructs the sequentially generated watermark embedded frame images as moving image data to output watermark embedded moving image data. When performing reconstruction, encoding such as MPEG encoding may be performed.

Above descriptions are descriptions for the digital watermark embedding apparatus.

Next, the digital watermark detection apparatus in the present embodiment is described.

FIG. 174 is a block diagram of the digital watermark detection apparatus in the twenty sixth embodiment of the present invention.

The digital watermark detection apparatus includes a moving image input unit 210, a feature region extraction unit 290, a difference image generation unit 230, a phase difference calculation unit 360, a detection subject region extraction unit 220, a digital watermark detection unit 240, a feature region image buffer 302, a phase pattern buffer 370 and a difference image (B) storing buffer 390.

The digital watermark detection apparatus 200 receives analog moving images displayed on a TV and the like or digital moving images encoded by MPEG.

FIG. 175 is a flowchart of operation of the digital watermark detection apparatus in the twenty sixth embodiment of the present invention.

Step 2300) The moving image input unit 210 receives analog or digital moving images to obtain a frame image sequentially. For inputting the analog moving images, camera signals, scanner signals or analog video signals are received to obtain the frame image. For digital moving images, the frame image is obtained by performing decoding process and the like.

Step 2310) Next, the feature region extraction unit 290 extracts a feature region in the captured frame image to obtain a feature region image in the same way as the sixteenth embodiment and the like.

Step 2320) Next, the difference image generation unit 230 obtains a difference image between the currently obtained feature region image and a previously obtained feature region image stored in the feature region image buffer 302 to output as it a difference image (A).

Step 2330) In addition, in preparation for next detection trial, the current feature region image is buffered in the feature region image buffer 302.

Step 2340) Next, the phase difference measurement unit 360 converts the difference image (A) into a phase pattern.

Step 2350) The phase difference measurement unit 360 measures a phase difference between the currently obtained phase pattern and a previously obtained phase pattern stored in the phase pattern buffer 370, and newly generates a difference image (B) based on the phase difference and amplitude values of the two phase patterns.

Steps 2360-2380) Next, the detection subject region extraction unit 220 adds and stores the current difference image (B) in the difference image (B) storing buffer 390, and extracts a detection subject region from the stored difference image (B) to obtain a detection subject region image.

Step 2390) Finally, the digital watermark detection unit 240 tries to detect digital watermark from the detection subject region image to output a detection result.

Step 2400) When digital watermark detection does not succeed, the moving image input unit 210 obtains a next frame image to repeat the above-mentioned processes sequentially.

FIG. 176 is a figure for explaining processes of the feature region extraction unit in the twenty sixth embodiment of the present invention.

The feature region extraction unit 290 receives the frame image and extracts a feature region in the frame image in the same way as the sixteenth embodiment to obtain a feature region image.

FIG. 177 is a figure for explaining processes of the difference image generation unit in the twenty sixth embodiment of the present invention. The difference image generation unit 230 receives a feature region image. The difference image generation unit 230 generates a difference image between the currently received feature region image and a previously obtained feature region image stored in the feature region image buffer 302 to output it as the difference image (A). The subtraction process is performed by subtraction for each component such as R, G, B or Y, Cb, Cr. In addition, in preparation for a next detection trial, the current feature region image is buffered in the feature region image buffer 302.

FIG. 178 is a figure for explaining process contents of the phase difference calculation unit in the twenty sixth embodiment of the present invention.

The phase difference measurement unit 360 receives the difference image (A). The phase difference measurement unit 360 obtains a Cb component and a Cr component for each pixel of the difference image (A), and obtains an amplitude R and a phase $\theta$ by representing the result (Cb, Cr) as a point on the Cb-Cr coordinate system, and sets these to be values of an element corresponding to the pixel position of the phase pattern. The phase pattern is an array including an amplitude and a phase for each element position, and each element is associated with each pixel in the difference image.

Next, as shown in FIG. 179, the phase difference measurement unit 360 compares the previously obtained phase pattern stored in the phase pattern buffer 370 and the currently obtained phase pattern so as to determine a sign that is plus or minus based on a phase difference of each element, further determines a new amplitude using a monotone increasing function in which the larger each amplitude of the two phase patterns is, the larger value the function takes, and determines each element value of the difference image (B) having the sign and the amplitude as its value.

FIGS. 180A and B show examples of methods for selecting the sign based on the phase difference. A phase difference $\theta$-$\theta'$ between a phase value $\theta$ of an element of the currently obtained phase pattern and a phase value $\theta'$ of a corresponding element of the previously obtained phase pattern is obtained, and if the value is within a range of $0$-$\pi$, a sign "+" is selected, and if the value is within a range of $-\pi$-$0$, a sign "−" is selected. As an example of the monotone increasing function used for obtaining a new amplitude value $\rho$ from an amplitude value R of an element of the currently obtained phase pattern and an amplitude value R' of a corresponding element of the previously obtained phase pattern, $\rho(R,R')=R+R'$ or $\rho(R,R')=R\times R'$ can be used. The reason for using a monotone increasing function with respect to the amplitude values R and R' is to improve detection performance of digital watermark by assigning weight to one in which watermark signal is strongly remained, that is, amplitude R, R' is large. After performing the processes for selecting the sign and obtaining the new amplitude value for every element, the difference image (B) is output. In addition, in preparation for a next detection trial, the currently obtained phase pattern is stored in the phase pattern buffer 370.

Next, contents of processes of the detection subject region extraction unit 220 are described.

The detection subject region extraction unit 220 receives the difference image (B). The detection subject region extraction unit 220 adds and stores the received difference image (B) in the difference image (B) storing buffer 390.

FIG. 181 is a figure for explaining the difference image (B) storing buffer in the twenty sixth embodiment of the present invention. The difference image (B) storing buffer 390 is a pixel array having a size same as that of the difference image (B). Each pixel value of a newly received difference image (B) is added to a corresponding pixel position in the difference image (B) storing buffer 390.

FIG. 182 is a figure for explaining processes of the detection subject region extraction unit in the twenty sixth embodiment of the present invention. After the difference image (B) is added and stored in the difference image (B) storing buffer 390, the detection subject region extraction unit 220 converts pixel values in the difference image (B) storing buffer 390 to absolute values, and extracts the detection subject region from the difference image (B) storing buffer 390 in the same way as the thirteenth embodiment and the like. Then, distortion of the image of the detection subject region in the difference image (B) storing buffer 390 before being converted into absolute values is corrected such that it becomes a given size rectangle, and further the size is normalized to generate and output the detection subject region image.

Effects of the detection subject region extraction unit 220 obtained by the above-mentioned processes are described. Considering the difference image (B) obtained by the phase difference measurement unit 360, absolute values of pixel values in a pixel region where the watermark pattern is embedded are generally larger than those in a pixel region where the watermark pattern is not embedded. The reason is as follows. Absolute values of pixel values in a pixel region where the watermark pattern is embedded in the difference image (A) are large since the watermark pattern is different for each captured frame, but absolute values of pixel values in a pixel region where the watermark pattern is not embedded are small since temporal correlation of original image components is high. In addition, since the phase difference measurement unit 360 determines a sign of each pixel value of the difference image (B) using the phase difference, a same sign is always obtained in a same pixel position in the pixel region where the watermark pattern is embedded irrespective of capturing timing as described in the twenty fifth embodiment. Therefore, by adding and storing images in the difference image (B) storing buffer 390, the absolute value becomes larger every time the addition is performed. However, as to the pixel region where the watermark pattern is not embedded, since signs do not become the same and vary and absolute values of the pixel values are small as mentioned before, absolute values of the pixel values become not so large by the addition and storing so that contrast between the pixel area where the watermark pattern is not embedded and the pixel area where the watermark pattern is embedded becomes relatively larger every time the addition and storing are performed. Thus, by converting the pixel values obtained by the addition and storing in the difference image (B) buffer 390 into absolute values, difference between plus and minus of the watermark pattern disappears so that the pixel region where the watermark pattern is embedded emerges with high contrast in the pixel region that is a background region where the watermark pattern is not embedded. Accordingly, the region where the watermark pattern is embedded can be extracted as the detection subject region reliably.

In addition, since the watermark pattern is relatively strengthened by the addition and storing as shown in FIG. 181, detection performance in digital watermark detection described next can be improved, and digital watermark detection having higher tolerance can be realized.

Finally, the digital watermark detection unit 240 receives the detection subject region image, and tries to detect digital watermark from the detection subject region image. A process example of the digital watermark detection unit 240 is described using FIG. 183. FIG. 183 shows a demodulation method when detecting corresponding to the modulation method (A-1) when embedding digital watermark (document 1).

First, the detection subject region image is divided into blocks the number of which is the same as that of blocks of the watermark pattern when embedding. Next, sum of pixel values in each block is obtained, and the sums are arranged in an order of the blocks to obtain a detection subject series that is a one-dimensional series. Next, a section corresponding to 1 bit when embedding is extracted from the detection subject series, and correlation calculation between the section and a corresponding section in a spreading series is performed. When the correlation value is a large plus value, it is determined that a bit value "1" is detected, and when the correlation value is a large minus value, it is determined that a bit value "0" is detected. Accordingly, the detection process is performed for every bit. In addition, error correction/detection decoding process may be performed on watermark information for which detection process is completed as necessary. When digital watermark detection does not succeed, the process returns to the frame capturing process of the moving image input unit 210 next so as to repeat the detection trial. Or, when input of the moving images ends, detection process is terminated.

<Effects of Twenty Sixth Embodiment>

According to the present embodiment, effects that there is no problem even if the moving images are captured at any timing can be obtained in the same way as the twenty fifth embodiment. In addition to that, effects the same as those of the nineteenth embodiment can be also obtained by obtaining the difference image (B) from the difference image (A) for each pixel, adding and storing the difference image (B) and extracting the detection subject region from the difference image (B) that is converted to absolute values to perform digital watermark detection.

In addition, since the watermark information is embedded as the phase difference change, pixel values can be added as they are in the addition and storing of the difference image (B), and since bits of the watermark information do not reversed, simpler and more efficient digital watermark scheme is obtained compared with the nineteenth embodiment.

In addition, according to the present embodiment, a part, in the captured frame image, from which digital watermark detection should be performed is identified using various contrivances. Thus, digital watermark detection can be available reliably and under various conditions of image taking angles and background images, and digital watermark detection performance is further improved. Accordingly, it becomes possible to perform digital watermark detection process reliably in real time from moving images on a TV and the like that are taken by a camera.

It is possible to construct each operation of the digital watermark embedding apparatus 100 and the digital watermark detection apparatus 200 as a program so as to install and execute the program in a computer used as the digital watermark embedding apparatus or the digital watermark detection apparatus, or, the program can be distributed via a network. In addition, the program can be stored in a computer readable medium such as a CD-ROM and an electrical memory and the like and can be used.

The present invention is not limited to the specifically disclosed embodiments, and variations and modifications may be made without departing from the scope of the invention. The present invention can be applied to digital watermark techniques. The present invention is not limited only to the above-described embodiments, and the present invention can be applied to various fields such as a three-dimensional display system, a three-dimensional picture-taking system, voice information and the like, and a signal region such as infrared rays that cannot be perceived.

[Effects]

According to an embodiment of the present invention, by embedding the watermark pattern that temporally changes with respect to frames of moving images, a pattern that switches at high speed instead of a fixed pattern is embedded in each frame in the moving images. Thus, since it is known that visual sensitivity is low for high frequency in time frequency characteristics in human visual characteristics, image quality deterioration due to watermark embedding can be decreased.

In addition, when performing detection, digital watermark detection is performed by generating the difference image between temporally adjacent two captured frames for frame images continuously received from an analog input device such as a camera. Thus, the original image signal that becomes noise for the digital watermark signal can be largely cancelled and digital watermark detection performance can be improved.

In addition, if the watermark pattern switching timing used when embedding is known in a detection side, each difference image where watermark pattern is remained can be selected using times of captured two frames, so that it becomes unnecessary to perform unnecessary digital watermark detection. In addition, by controlling capture timing of camera in a detection side or controlling time difference between two images when obtaining the difference image in accordance with the watermark pattern switching timing, it becomes possible that the watermark pattern always remains in the difference image so that efficient digital watermark detection becomes possible.

In addition, by determining a phase of the watermark pattern in the difference image, correct watermark information can be detected even when using a modulation method of a type in which bit of detection watermark information is reversed due to reversal of the phase of the watermark pattern. In the case, 1 bit in the watermark information may be used as a flag for phase determination, or digital watermark for phase determination different from the watermark information may be used.

In addition, difference information sequentially obtained by continuous capturing is added and stored after adjusting phases so as to relatively increase strength of the watermark pattern, then, digital watermark detection is tried from the storing buffer. Accordingly, detection becomes possible even when adequate detection performance is not obtained only from one difference image. By the way, for adjusting the phases, the above-mentioned flag for phase reversal determination may be used, the watermark for phase determination different from the watermark information may be used, and in addition to that, there may be a method using sign polarity of the correlation value in spread spectrum modulation.

In addition, by adding and storing correlation values calculated when detecting digital watermark and by evaluating stored correlation values so as to determine detection availability, detection can be performed even when adequate detection performance from one difference image cannot be obtained. In this case, the correlation values may be stored with a constant phase by aligning phases of the difference images or absolute values of the correlation values may be stored.

In addition, the embedding information is divided into small data blocks to perform embedding while switching the data block in a time direction, and data blocks obtained by performing detection for each data block are connected when detecting. Thus, it becomes possible to embed/detect longer watermark information. Further, in the same way as processes for one difference image, difference phase determination may be performed for each data block detection, phase determination may be also performed by embedding the data block ID representing order of data blocks, difference images in which phases are aligned may be stored, or correlation values may be stored, so that it becomes also possible to further improve digital watermark detection performance.

Further, under a situation where real time detection processing is performed using a camera, the status of the digital watermark detection process is fed back and output in real time. Thus, convenience improves since interactivity increases. Especially, it can be expected that detection performance improves by urging the user to make a status in which detection can be easily performed.

Further, by embedding watermark information as the phase difference change of the watermark pattern, a difference image can be obtained such that it includes a constant watermark pattern irrespective of obtaining timing of the difference image. Accordingly, bit reversal of watermark information is prevented, and it becomes unnecessary to adjust phases when storing the difference image or when storing the correlation value, and it is only necessary to simply add and store. Therefore, since apparatus configuration is simplified, speed of processing is increased and the phase synchronization signal is unnecessary, watermark information length can be increased and tolerance can be improved. In addition, as to the data block using type, since reliability of detection information is ensured even though unnecessary blank is not inserted between data blocks, length of watermark information per a unit time can be increased.

In addition, according to an embodiment of the present invention, when embedding watermark pattern temporally changing with respect to frames of moving images, a watermark pattern smaller than a frame size of the moving image data is superimposed. In addition, when performing detection, a difference image between captured frame images is generated so as to extract a region having large difference, that is, a region that is a detection subject for digital watermark from the difference image. Accordingly, stable digital watermark detection can be realized irrespective of picture taking angles or background images.

In addition, by extracting the detection subject region from a difference image between feature region images each obtained by performing distortion correction and size normalization of a feature region for each captured frame, the detection subject region can be extracted stably even through the camera moves while taking the images.

In addition, when embedding, a plurality of watermark patterns indicating different pieces of information are associated with objects in the image, and are arranged and superimposed, and when performing detection, a plurality of detection subject regions are extracted from the difference image, so that a plurality of pieces of digital watermark information can be detected at the same time or different information for each object can be extracted.

In addition, watermark information is embedded as phase difference change. When performing detection, a difference image (A) is generated first, a phase difference between temporally adjacent difference images (A) is measured, and digital watermark detection is performed from a difference image (B) obtained using the phase difference. Therefore, digital watermark detection can be performed always under a same condition irrespective of capture timing and capture time interval or shatter speed when performing detection.

In addition, watermark information is embedded as phase difference change. When performing detection, a difference image (A) is generated first, a phase difference between temporally adjacent difference images (A) is measured, a difference image (B) obtained by using the phase difference is generated, a detection subject region is extracted by adding and storing the difference image (B), and digital watermark detection is performed from the detection subject region image. Therefore, as mentioned before, digital watermark detection can be performed always under a same condition irrespective of capture timing and capture time interval or shatter speed when performing detection, and in addition to that, effects of distortion caused by picture taking angle are corrected and watermark tolerance is improved by storing, so that it becomes possible to realize more stable digital watermark detection.

In addition, when watermark pattern switching timing used when embedding is known in the detection side, a difference image in which a watermark pattern remains can be selected using times of captured two frames, so that it becomes unnecessary to perform useless digital watermark detection. Further, by controlling capture timing of a camera in the detection side or controlling time difference of two images when obtaining the difference image in accordance with watermark pattern switching timing, a watermark pattern always remains in the difference image, so that it becomes possible to perform efficient digital watermark detection.

In addition, according to the embodiment of the present invention, when embedding a watermark pattern temporally changing with respect to frames of moving images, a watermark pattern smaller than a frame size of the moving image data is superimposed. In addition, when performing detection, a difference image between captured frame images is generated so as to extract a region having large difference, that is, a region that is a detection subject for digital watermark from the difference image, so that stable digital watermark detection can be realized irrespective of picture taking angles or background images.

In addition, by extracting the detection subject region from a difference image between feature region images each obtained by extracting a feature region, performing distortion correction and size normalization for each captured frame, the detection subject region can be extracted stably even through the camera moves while taking the images.

In addition, when searching for the detection subject region or the feature region, by searching only a neighborhood of a position where digital watermark detection status was good before, it becomes possible to perform region extraction more stably.

In addition, by adding and storing difference images so as to extract the detection subject region from the added and stored difference image, it becomes possible to perform further stable region extraction and to improve digital watermark detection performance.

In addition, when embedding, a plurality of watermark patterns indicating different pieces of information are associated with objects in the image, and the watermark patterns are arranged and superimposed, and when performing detection, a plurality of detection subject regions are extracted from the difference image, so that a plurality of pieces of digital watermark information can be detected at the same time and difference information for each object can be extracted.

In addition, when the pixel size in the detection subject region in the frame image when is taken is small, a detection subject region of a larger pixel size can be obtained by automatically performing zooming-in. Generally, when the number of pixel samples is small, digital watermark detection becomes difficult. Thus, by performing zooming-in to increase the number of the pixel samples in the detection subject region, performance for detecting digital watermark can be improved.

As mentioned above, according to embodiments of the present invention, performance for detecting digital watermark is improved using various contrivances so that it becomes possible to take moving images on a TV and the like and perform digital watermark detection processes in real time from the moving images.

In addition, a part in a captured frame image from which digital watermark detection should be performed is specified, so that digital watermark detection can be performed reliably under various conditions of picture taking angles and background images, and that performance for detecting digital watermark is improved. Accordingly, it becomes possible to take moving images on a TV and the like and perform digital watermark detection processes in real time from the taken moving images.

According to embodiments of the present invention, for example, viewing program related information can be obtained by taking images being viewed on a TV with a camera-equipped mobile-phone, or by selecting a choice using watermark detection in a quiz program or in viewer questionnaires and by sending the result to a broadcasting station by communication, interactive TV broadcasting can be realized in which feedback on program contents is obtained in real time. Or, in an augmented reality system that requires barcode and the like in a conventional technology, the barcode can be unnecessary by using invisible digital watermark so as to solve unnaturalness, or, watermark is used for game operation in a TV game by specifying an object that is an operation subject using watermark detection, or, applications the same as those mentioned above are performed on an aurora vision on the street, or by embedding watermark into a display screen of a PC (personal computer) and by taking the image using a camera-equipped mobile-phone, information can be sent from the PC to the mobile-phone so that liaison of apparatuses can be performed, or watermark embedding and detection can be performed also for a still image on a display screen by copying the still image to produce arbitrary n images (n is an integer greater than one), applying the present invention regarding the n images to be moving images of n frames, performing encoding using a method such as animation GIF, and displaying the image on a browser screen and the like. Or, when analyzing a hyper text such as one of HTML on a PC to display on a browser and the like, by embedding hyperlink information into a display region of an object having a hyper link, browsing is performed with a camera-equipped mobile-phone by taking the display screen of the PC with the camera-equipped mobile-phone, or by performing the above-mentioned application using a display screen of a mobile-phone, linkage between mobile-phones and linkage from a mobile-phone to a PC can be realized. As mentioned above, extremely wide range of application fields can be provided. Further, it is obvious that the present invention can be applicable to copy right management and copy right protection that are usual application objects of digital watermark technology.

The present international application claims priority based on Japanese patent application No. 2005-226755, filed in the JPO on Aug. 4, 2005, Japanese patent application No. 2005-226756, filed in the JPO on Aug. 4, 2005, and Japanese patent application No. 2005-275965, filed in the JPO on Sep. 22, 2005, and the entire contents of the applications No. 2005-226755 No. 2005-226756 and No. 2005-275965 are incorporated herein by reference.

The invention claimed is:

1. A digital watermark detection method in a digital watermark detection apparatus for detecting a digital watermark from moving images, comprising:

a moving image input step, at the digital watermark detection apparatus, of sequentially obtaining a frame image by moving image input means;

a difference image generation step, at the digital watermark detection apparatus, of generating, by difference image generation means, a difference image between the currently obtained frame image and a previously obtained frame image; and a digital watermark detection step, at the digital watermark detection apparatus, of performing, by digital watermark detection means, digital watermark detection from the difference image to output a digital watermark detection status, wherein, in a case where digital watermark detection process is continued including a case where previous digital watermark detection is impossible, the moving image input means obtains a new frame image again so that each of the above steps is repeated, the moving image input step including a step of sequentially obtaining the frame image and frame display time that is a display time of the frame image, the digital watermark detection method further comprising:

a determination step, at the digital watermark detection apparatus, of determining detection necessity based on a time interval between the current frame display time and frame display time of the previously obtained frame image using watermark pattern switching information used when embedding a digital watermark, wherein, when it is determined that detection is unnecessary in the determination step, the moving image input means obtains a new frame image again, and when it is determined that detection is necessary, processes after the difference image generation step are continued.

2. The digital watermark detection method as claimed in claim 1, comprising:

obtaining a data block ID and data block information from the watermark information obtained in the digital watermark detection step;

recording the detected data block information into information corresponding to the data block ID in a detected watermark information buffer; and outputting information indicating that digital watermark detection succeeds when detection for every data block ID completes.

3. The digital watermark detection method as claimed in claim 1 or 2, the digital watermark detection method comprising a capture timing control step of setting timing for capturing frames using the watermark pattern switching information used when performing digital watermark embedding, wherein the moving image input means sequentially obtains the frame image based on the capture timing.

4. The digital watermark detection method as claimed in claim 1 or 2, the digital watermark detection method comprising a step of setting difference timing representing a time interval between frames for obtaining the difference image using the watermark pattern switching information used when performing digital watermark embedding, wherein the moving image input means sequentially obtains the frame image and the frame display time, and the difference image generation means generates the difference image between the currently obtained frame image and a frame image obtained a time before wherein the time is specified by the difference timing.

5. The digital watermark detection method as claimed in claim 1 or 2, the digital watermark detection step including steps of:

determining a phase of a watermark pattern embedded in the difference image; and when the phase of the watermark pattern is reversed, performing bit reversal of detected watermark information and outputting the digital watermark detection status.

6. The digital watermark detection method as claimed in claim 5, comprising:

a step of determining a phase of the watermark pattern in the difference image based on relationship between the watermark pattern switching information used when performing embedding and the frame display time obtained when obtaining the frame image.

7. The digital watermark detection method as claimed in claim 5, comprising steps of:

detecting a bit value of a predetermined bit position in the watermark information represented by the watermark pattern embedded in the difference image; and determining the phase of the watermark pattern in the difference image based on the bit value.

8. The digital watermark detection method as claimed in claim 5, comprising:

a step of detecting watermark for phase determination so as to determine the phase of the watermark pattern in the difference image.

9. The digital watermark detection method as claimed in claim 5, comprising:

a step of determining the phase of the watermark pattern in the difference image using polarity of plus or minus of a correlation value calculated in watermark detection process.

10. The digital watermark detection method as claimed in claim 5, comprising steps of:

detecting data block information and a data block ID that are watermark information by performing digital watermark detection from the difference image; and determining the phase of the watermark pattern embedded in the difference image using polarity of plus or minus of a correlation value obtained when detecting the data block ID.

11. The digital watermark detection method as claimed in claim 1 or 2, comprising:

adding the difference image to a difference image storing buffer in the difference image generation step;

performing digital watermark detection from the difference image storing buffer to detect watermark information and output the detection status in the digital watermark detection step.

12. The digital watermark detection method as claimed in claim 11, comprising:

a step of determining a phase of the watermark pattern embedded in the difference image; and a step of changing the difference image such that phases of all difference images sequentially processed become the same, wherein the difference image generation step and the digital watermark detection step are performed using the difference image obtained in these steps.

13. The digital watermark detection method as claimed in claim 1 or 2, the digital watermark detection step including steps of:

storing a correlation value calculated when performing detection into storing means each time when detection process is performed; and determining whether detection succeeds using the stored correlation value.

14. The digital watermark detection method as claimed in claim 1 or 2, the digital watermark detection step including the steps of:
    storing an absolute value of a correlation value calculated when performing detection into storing means each time when detection process is performed; and
    determining whether detection succeeds using the stored absolute value of the correlation value.

15. The digital watermark detection method as claimed in claim 1 or 2, the difference image generation step comprising the steps of:
    generating the difference image between the currently obtained frame image and a previously obtained frame image;
    obtaining a phase value and an amplitude value based on a particular component in the difference image;
    determining a group, among a plurality of given groups, to which the phase value belongs; and
    correcting the difference image based on the determination result and the amplitude value to output the difference image.

16. The digital watermark detection method as claimed in claim 15, wherein the particular component in the difference image in the difference image generation step includes a plurality of components.

17. The digital watermark detection method as claimed in claim 16, wherein the particular component in the difference image is a Cb component and a Cr component.

18. The digital watermark detection method as claimed in claim 1 or 2, the difference image generation step including steps of generating a difference image (A) between the currently obtained frame image and a previously obtained frame image read from image storing means, and storing the currently obtained frame image into the image storing means,
    the digital watermark detection method comprising phase difference measurement steps of:
    generating a phase pattern based on the currently obtained difference image (A);
    measuring a phase difference between the currently obtained phase pattern and a previously obtained phase pattern read from phase pattern storing means;
    generating a difference image (B) based on the phase difference; and
    storing the currently obtained phase pattern in the phase pattern storing means,
    the digital watermark detection step including a step of performing digital watermark detection from the difference image (B) to output the digital watermark detection status.

19. The digital watermark detection method as claimed in claim 18, the phase difference measurement step including steps of:
    when generating the phase pattern from the difference image (A), obtaining an amplitude value with a phase value as an element value of the phase pattern;
    measuring a phase difference between the currently obtained phase pattern and a previously obtained phase pattern to determine a sign based on the phase difference; and
    generating the difference image (B) based on amplitude values of the currently obtained phase pattern and the previously obtained phase pattern, and the sign.

20. The digital watermark detection method as claimed in claim 19, the phase difference measurement step including steps of:
    when generating the phase pattern from the difference image (A), obtaining an amplitude as a value monotonically increasing with respect to amplitude values of the currently obtained phase pattern and the previously obtained phase pattern; and
    obtaining the difference image (B) based on a value obtained by combining the amplitude and the sign.

21. The digital watermark detection method as claimed in claim 18, comprising:
    when obtaining the phase pattern from the difference image (A) in the phase difference measurement step, using a phase and an amplitude in a coordinate system obtained from a plurality of components in the difference image (A).

22. The digital watermark detection method as claimed in claim 18, the digital watermark detection method further comprising a step of adding the difference image (B) into a difference image storing buffer, and
    the digital watermark detection step including a step of performing digital watermark detection from the difference image storing buffer to detect watermark information and output the detection status.

23. The digital watermark detection method as claimed in claim 1 or 2, the digital watermark detection method comprising steps of:
    extracting a detection subject region in a current frame image of sequentially obtained frame images; and
    correcting distortion and normalizing the size to generate a detection subject region image, and
    in the difference image generation step, generating a difference image between a currently obtained detection subject region image and a previously obtained detection subject region image.

24. The digital watermark detection method as claimed in claim 1 or 2, the digital watermark detection method comprising steps of:
    extracting a detection subject region from the sequentially obtained difference image to generate a detection subject region image, and
    in the difference image generation step, performing digital watermark detection from the detection subject region image to output the detection status.

25. The digital watermark detection method as claimed in claim 24, the detection subject region extraction step including a step of, when extracting the detection subject region from the difference image, changing pixel values of the difference image into absolute values and searching for the detection subject region.

26. The digital watermark detection method as claimed in claim 24, the detection subject region extraction step including a step of, when extracting the detection subject region from the difference image, searching for the detection subject region using a positioning pattern added to the basic watermark pattern used when performing embedding.

27. The digital watermark detection method as claimed in claim 26, the detection subject region extraction step including a step of:
    determining the phase of the watermark pattern in the difference image using the positioning pattern.

28. The digital watermark detection method as claimed in claim 24, the detection subject region extraction step including a step of:
    searching a neighborhood region of a detection subject region where the detection status is good in past digital watermark detection trial to perform current detection subject region extraction process.

29. The digital watermark detection method as claimed in claim 24, the detection subject region extraction step including steps of:
  adding and storing the difference image into storing means; and
  searching for and extracting the detection subject region from the stored difference image.

30. The digital watermark detection method as claimed in claim 29, the detection subject region extraction step including a step of:
  when adding and storing the difference image into the storing means, aligning the phase of the watermark pattern in the difference image to perform the adding and storing.

31. The digital watermark detection method as claimed in claim 1 or 2, comprising:
  a feature region extraction step of, after sequentially obtaining the frame image, extracting a feature region from the frame image, and performing distortion correction and size normalization to generate a feature region image;
  a difference image generation step of generating a difference image between a currently obtained feature region image and a previously obtained feature region image;
  a detection subject region extraction step of extracting a detection subject region from the difference image to generate a detection subject region image; and
  a digital watermark detection step of performing digital watermark detection from the detection subject region.

32. A digital watermark detection method in a digital watermark detection apparatus for detecting a digital watermark from moving images, comprising:
  a frame image obtaining step, at the digital watermark detection apparatus, of sequentially obtaining a frame image by moving image input means;
  a feature region extraction step, at the digital watermark detection apparatus, of extracting, by feature region extraction means, a feature region in the frame image to obtain a feature region image;
  a difference image generation step, at the digital watermark detection apparatus, of generating, by difference image generation means, a difference image between a currently obtained feature region image and a previously obtained feature region image read from a feature region image buffer to obtain a difference image (A), and storing the currently obtained feature region image into the feature region image buffer;
  a phase difference measurement step, performed by phase difference measurement means at the digital watermark detection apparatus, of generating a phase pattern based on the currently obtained difference image (A), measuring a phase difference between the currently obtained phase pattern and a previously obtained phase pattern read from a phase pattern buffer, generating a difference image (B) based on the phase difference and amplitude, and storing the currently obtained difference image (A) into the phase pattern buffer;
  a detection subject region extraction step, performed by detection subject region extraction means at the digital watermark detection apparatus, of performing adding and storing for pixel values of the difference image (B) for each pixel, extracting a detection subject region from a difference image (B) storing buffer obtained by the adding and storing to obtain a detection subject region image;
  a digital watermark detection step, at the digital watermark detection apparatus, of performing, by digital watermark detection means, digital watermark detection from the detection subject region image to output digital watermark detection status; and
  a step of obtaining, by the moving image input means, a new frame image again so as to repeat each of the above steps in a case where digital watermark detection process is continued including a case where digital watermark detection is impossible,
  wherein the frame image obtaining step includes a step of sequentially obtaining the frame image and frame display time that is a display time of the frame image,
  the digital watermark detection method further comprising:
  a determination step, at the digital watermark detection apparatus, of determining detection necessity based on a time interval between the current frame display time and frame display time of the previously obtained frame image using watermark pattern switching information used when embedding a digital watermark,
  wherein, when it is determined that detection is unnecessary in the determination step, the moving image input means obtains a new frame image again, and when it is determined that detection is necessary, processes after the difference image generation step are continued.

33. The digital watermark detection method as claimed in claim 32, the detection subject region extraction step including the steps of:
  when extracting the detection subject region from the difference image (B) obtained by adding and storing, extracting the detection subject region from pixel values that are converted to absolute values in the difference image (B) storing buffer; and
  obtaining an image of the detection subject region in the difference image (B) storing buffer before being converted to the absolute values as the detection subject region image.

34. The digital watermark detection method as claimed in claim 32 or 33, comprising:
  extracting a plurality of detection subject regions in the detection subject extraction step; and
  performing digital watermark detection trial for each of the plurality of detection subject regions to output the detection result in the digital watermark detection step.

35. The digital watermark detection method as claimed in claim 32 or 33, the digital watermark detection step including a step of detecting watermark information using decoding processes for existing two-dimensional code when detecting the watermark information.

36. The digital watermark detection method as claimed in claim 32 or 33, comprising a step of:
  performing filtering process on the difference image generated by subtraction process to output a difference image to which the filtering process is performed.

37. The digital watermark detection method as claimed in claims 36, wherein a non-linear filter is used as the filtering process.

38. The digital watermark detection method as claimed in claim 32 or 33, wherein the moving images to be input are video signals that are taken by a camera and captured.

39. The digital watermark detection method as claimed in claim 32 or 33, comprising a step, performed by external output means for outputting a screen or sound, of performing feedback output according to any one or more of detection subject region extraction status, digital watermark detection status and data block detection status.

40. The digital watermark detection method as claimed in claim 32 or 33, comprising:

further generating detection subject region information indicating a size and a position of the detection subject region in the detection subject region extraction step; and a zooming process step of setting a zooming parameter for changing the detection subject region to a given pixel size based on the detection subject region information, and performing zooming process by supplying the zooming parameter to the moving image input means.

41. The digital watermark detection method as claimed in claim 40, the zooming process step including steps of:

when the detection status in the digital watermark detection step is good, setting the zooming parameter for changing the detection subject region to a given pixel size based on the detection subject region information, and performing the zooming process by supplying the zooming parameter to the moving image input means.

42. The digital watermark detection method as claimed in claim 32 or 33, wherein the moving images to be input are captured by taking a state displayed on a display by a camera in real time, and the digital watermark detection method comprising a step of obtaining information related to the displayed moving images based on watermark information obtained by digital watermark detection.

43. A digital watermark detection apparatus for detecting a digital watermark from moving images, comprising:

moving image input means for sequentially obtaining a frame image;

difference image generation means for generating a difference image between the currently obtained frame image and a previously obtained frame image; and digital watermark detection means for performing digital watermark detection from the difference image to output a digital watermark detection status, means for, in a case where digital watermark detection process is continued including a case where previous digital watermark detection is impossible, repeating processes of the moving image input means, processes of the difference image generation means and processes of the digital watermark detection means, wherein the moving image input means sequentially obtains the frame image and frame display time that is a display time of the frame image, the digital watermark detection apparatus further comprises:

detection necessity determination means for determining detection necessity based on a time interval between the current frame display time and frame display time of the previously obtained frame image using watermark pattern switching information used when embedding a digital watermark, wherein, when it is determined that detection is unnecessary by the detection necessity determination means, the moving image input means obtains a new frame image again, and when it is determined that detection is necessary, processes after processing performed by the difference image generation means are continued.

44. The digital watermark detection apparatus as claimed in claim 43, wherein the digital watermark detection apparatus:

obtains a data block ID and data block information from the watermark information obtained by the digital watermark detection means;

records the detected data block information into information corresponding to the data block ID in a detected watermark information buffer; and outputs information indicating that digital watermark detection succeeds when detection for every data block ID completes.

45. The digital watermark detection apparatus as claimed in claim 43 or 44, the digital watermark detection apparatus comprising capture timing control means for setting timing for capturing frames using the watermark pattern switching information used when performing digital watermark embedding, wherein the moving image input means sequentially obtains the frame image based on the capture timing.

46. The digital watermark detection apparatus as claimed in claim 43 or 44, the digital watermark detection apparatus comprising means for setting difference timing representing a time interval between frames for obtaining the difference image using the watermark pattern switching information used when performing digital watermark embedding, wherein the moving image input means sequentially obtains the frame image and the frame display time, and the difference image generation means generates the difference image between the currently obtained frame image and a frame image obtained a time before wherein the time is specified by the difference timing.

47. The digital watermark detection apparatus as claimed in claim 43 or 44, the digital watermark detection apparatus comprising difference phase determination means for determining a phase of a watermark pattern embedded in the difference image, and wherein, as a result of determination of the difference phase determination means, when the phase of the watermark pattern is reversed, the digital watermark detection apparatus performs bit reversal of detected watermark information and outputs the digital watermark detection status.

48. The digital watermark detection apparatus as claimed in claim 47, wherein the difference phase determination means determines a phase of the watermark pattern in the difference image based on relationship between the watermark pattern switching information used when performing embedding and the frame display time obtained when obtaining the frame image.

49. The digital watermark detection apparatus as claimed in claim 47, wherein the difference phase determination means detects a bit value of a predetermined bit position in the watermark information represented by the watermark pattern embedded in the difference image, and determines the phase of the watermark pattern in the difference image based on the bit value.

50. The digital watermark detection apparatus as claimed in claim 47, wherein the difference phase determination means detects watermark for phase determination so as to determine the phase of the watermark pattern in the difference image.

51. The digital watermark detection apparatus as claimed in claim 47, wherein the difference phase determination means determines the phase of the watermark pattern in the difference image using polarity of plus or minus of a correlation value calculated in watermark detection process.

52. The digital watermark detection apparatus as claimed in claim 47, wherein the difference phase determination means:

detects data block information and a data block ID that are watermark information by performing digital watermark detection from the difference image; and determines the phase of the watermark pattern embedded in the difference image using polarity of plus or minus of a correlation value obtained when detecting the data block ID.

53. The digital watermark detection apparatus as claimed in claim 43 or 44, wherein the difference image generation means adds the difference image to a difference image storing buffer, and the digital watermark detection means performs digital watermark detection from the difference image storing buffer to detect watermark information and output the detection status.

54. The digital watermark detection apparatus as claimed in claim 53, wherein the digital watermark detection apparatus:

determines a phase of the watermark pattern embedded in the difference image;

changes the difference image such that phases of all difference images sequentially processed become the same; and performs processes of the difference image generation means and processes of the digital watermark detection means using the obtained difference image.

55. The digital watermark detection apparatus as claimed in claim 43 or 44, wherein the digital watermark detection means:

stores a correlation value calculated when performing detection into storing means each time when detection process is performed; and determines whether detection succeeds using the stored correlation value.

56. The digital watermark detection apparatus as claimed in claim 43 or 44, wherein the digital watermark detection means:

stores an absolute value of a correlation value calculated when performing detection into storing means each time when detection process is performed; and determines whether detection succeeds using the stored absolute value of the correlation value.

57. The digital watermark detection apparatus as claimed in claim 43 or 44, wherein the difference image generation means:

generates the difference image between the currently obtained frame image and a previously obtained frame image;

obtains a phase value and an amplitude value based on a particular component in the difference image;

determines a group, among a plurality of given groups, to which the phase value belongs; and corrects the difference image based on the determination result and the amplitude value to output the difference image.

58. The digital watermark detection apparatus as claimed in claim 57, wherein the particular component in the difference image in the difference image generation step includes a plurality of components.

59. The digital watermark detection apparatus as claimed in claim 58, wherein the particular component in the difference image is a Cb component and a Cr component.

60. The digital watermark detection apparatus as claimed in claim 43 or 44, wherein the difference image generation means generates a difference image (A) between the currently obtained frame image and a previously obtained frame image read from image storing means, and stores the currently obtained frame image into the image storing means, the digital watermark detection apparatus comprises phase difference measurement means for:

generating a phase pattern based on the currently obtained difference image (A);

measuring a phase difference between the currently obtained phase pattern and a previously obtained phase pattern read from phase pattern storing means;

generating a difference image (B) based on the phase difference; and storing the currently obtained phase pattern in the phase pattern storing means, the digital watermark detection means performs digital watermark detection from the difference image (B) to output the digital watermark detection status.

61. The digital watermark detection apparatus as claimed in claim 60, the phase difference measurement means including:

means for, when generating the phase pattern from the difference image (A), obtaining an amplitude value with a phase value as an element value of the phase pattern;

means for measuring a phase difference between the currently obtained phase pattern and a previously obtained phase pattern to determine a sign based on the phase difference; and means for generating the difference image (B) based on amplitude values of the currently obtained phase pattern and the previously obtained phase pattern, and the sign.

62. The digital watermark detection apparatus as claimed in claim 61, wherein, when generating the phase pattern from the difference image (A), the phase difference measurement means obtains an amplitude as a value monotonically increasing with respect to amplitude values of the currently obtained phase pattern and the previously obtained phase pattern, and obtains the difference image (B) based on a value obtained by combining the amplitude and the sign.

63. The digital watermark detection apparatus as claimed claim 60, wherein, when obtaining the phase pattern from the difference image (A), the phase difference measurement means uses a phase and an amplitude in a coordinate system obtained from a plurality of components in the difference image (A).

64. The digital watermark detection apparatus as claimed in claim 60, the digital watermark detection apparatus further comprising means for adding the difference image (B) into a difference image storing buffer, wherein the digital watermark detection means performs digital watermark detection from the difference image storing buffer to detect watermark information and output the detection status.

65. The digital watermark detection apparatus as claimed in claim 43 or 44, the digital watermark detection apparatus comprising detection subject region extraction means for extracting a detection subject region in a current frame image of sequentially obtained frame images, correcting distortion and normalizing the size to generate a detection subject region image, wherein the difference image generation means generates a difference image between a currently obtained detection subject region image and a previously obtained detection subject region image.

66. The digital watermark detection apparatus as claimed in claim 43 or 44, the digital watermark detection apparatus comprising detection subject region means for extracting a detection subject region from the sequentially obtained difference image to generate a detection subject region image, wherein the digital watermark detection means performs digital watermark detection from the detection subject region image.

67. The digital watermark detection apparatus as claimed in claim 66, wherein, when extracting the detection subject region from the difference image, the detection subject region extraction means changes pixel values of the difference image into absolute values and searches for the detection subject region.

68. The digital watermark detection apparatus as claimed in claim 66, wherein, when extracting the detection subject region from the difference image, the detection subject region extraction means searches for the detection subject region using a positioning pattern added to the basic watermark pattern used when performing embedding.

69. The digital watermark detection apparatus as claimed in claim 68, wherein the detection subject region extraction means determines the phase of the watermark pattern in the difference image using the positioning pattern.

70. The digital watermark detection apparatus as claimed in claim 66, wherein the detection subject region extraction means searches a neighborhood region of a detection subject region where the detection status is good in past digital watermark detection trial to perform current detection subject region extraction process.

71. The digital watermark detection apparatus as claimed in claim 66, wherein the detection subject region extraction means adds and stores the difference image into storing means, and searches for and extracts the detection subject region from the stored difference image.

72. The digital watermark detection apparatus as claimed in claim 71, wherein, when adding and storing the difference image into the storing means, the detection subject region extraction means aligns the phase of the watermark pattern in the difference image to perform the adding and storing.

73. The digital watermark detection apparatus as claimed in claim 43 or 44, wherein the digital watermark detection apparatus comprising feature region extraction means for, after sequentially obtaining the frame image, extracting a feature region from the frame image, and performing distortion correction and size normalization to generate a feature region image;
the difference image generation means generates a difference image between a currently obtained feature region image and a previously obtained feature region image;
the detection subject region extraction means extracts a detection subject region from the difference image to generate a detection subject region image; and
the digital watermark detection means performs digital watermark detection from the detection subject region.

74. A digital watermark detection apparatus for detecting a digital watermark from moving images, comprising:
moving image input means for sequentially obtaining a frame image;
feature region extraction means for extracting a feature region in the frame image to obtain a feature region image;
difference image generation means for generating a difference image between a currently obtained feature region image and a previously obtained feature region image read from a feature region image buffer to obtain a difference image (A), and storing the currently obtained feature region image into the feature region image buffer;
phase difference measurement means for generating a phase pattern based on the currently obtained difference image (A), measuring a phase difference between the currently obtained phase pattern and a previously obtained phase pattern read from a phase pattern buffer, generating a difference image (B) based on the phase difference and amplitude, and storing the currently obtained difference image (A) into the phase pattern buffer;
detection subject region extraction means for performing adding and storing for pixel values of the difference image (B) for each pixel, extracting a detection subject region from a difference image (B) storing buffer obtained by the adding and storing to obtain a detection subject region image;
digital watermark detection means for performing digital watermark detection from the detection subject region image to output digital watermark detection status; and
means for obtaining, with the moving image input means, a new frame image again so as to repeat processes of each of the above means in a case where digital watermark detection process is continued including a case where digital watermark detection is impossible,
wherein the moving image input means sequentially obtains the frame image and frame display time that is a display time of the frame image,
the digital watermark detection apparatus further comprises:
detection necessity determination means for determining detection necessity based on a time interval between the current frame display time and frame display time of the previously obtained frame image using watermark pattern switching information used when embedding a digital watermark,
wherein, when it is determined that detection is unnecessary by the detection necessity determination means, the moving image input means obtains a new frame image again, and when it is determined that detection is necessary, processes after processing performed by the difference image generation means are continued.

75. The digital watermark detection apparatus as claimed in claim 74, wherein, when extracting the detection subject region from the difference image (B) obtained by adding and storing, the detection subject region extraction means:
extracts the detection subject region from pixel values that are converted to absolute values in the difference image (B) storing buffer; and
obtains an image of the detection subject region in the difference image (B) storing buffer before being converted to the absolute values as the detection subject region image.

76. The digital watermark detection apparatus as claimed in claim 74 or 75, wherein the detection subject region extraction means extracts a plurality of detection subject regions, and
the digital watermark detection means performs digital watermark detection trial for each of the plurality of detection subject regions to output the detection result.

77. The digital watermark detection apparatus as claimed in claim 74 or 75, wherein the digital watermark detection means detects watermark information using decoding processes for existing two-dimensional code when detecting the watermark information.

78. The digital watermark detection apparatus as claimed in claim 74 or 75, wherein the digital watermark detection apparatus performs filtering process on the difference image generated by subtraction process to output a difference image to which the filtering process is performed.

79. The digital watermark detection apparatus as claimed in claim 78, wherein a non-linear filter is used as the filtering process.

80. The digital watermark detection apparatus as claimed in claim 74 or 75, wherein the moving images to be input are video signals that are taken by a camera and captured.

81. The digital watermark detection apparatus as claimed in claim 74 or 75, comprising output means for outputting, as a screen or sound, feedback information according to any one or more of detection subject region extraction status, digital watermark detection status and data block detection status.

82. The digital watermark detection apparatus as claimed in claim 74 or 75, wherein the detection subject region extraction means further generates detection subject region information indicating a size and a position of the detection subject region, and the digital watermark detection apparatus sets a zooming parameter for changing the detection subject region to a given pixel size based on the detection subject region information, and performs zooming process by supplying the zooming parameter to the moving image input means.

83. The digital watermark detection apparatus as claimed in claim 82, wherein, when the detection status in the digital watermark detection means is good, the zooming process means sets the zooming parameter for changing the detection subject region to a given pixel size based on the detection subject region information, and performs the zooming process by supplying the zooming parameter to the moving image input means.

84. The digital watermark detection apparatus as claimed in claim 74 or 75, wherein the moving images to be input are captured by taking a state displayed on a display by a camera in real time, and the digital watermark detection apparatus comprises means for obtaining information related to the displayed moving images based on watermark information obtained by digital watermark detection.

85. A non-transitory computer readable recording medium storing a digital watermark detection program for causing a computer to function as a digital watermark detection apparatus for detecting digital watermark from moving images, the digital watermark detection program causing the computer to function as:

moving image input means for sequentially obtaining a frame image;

difference image generation means for generating a difference image between the currently obtained frame image and a previously obtained frame image; and digital watermark detection means for performing digital watermark detection from the difference image to output a digital watermark detection status, and means for, in a case where digital watermark detection process is continued including a case where previous digital watermark detection is impossible, repeating processes of the moving image input means, processes of the difference image generation means and processes of the digital watermark detection means, wherein the moving image input means sequentially obtains the frame image and frame display time that is a display time of the frame image, the digital watermark detection apparatus further comprises:

detection necessity determination means for determining detection necessity based on a time interval between the current frame display time and frame display time of the previously obtained frame image using watermark pattern switching information used when embedding a digital watermark, wherein, when it is determined that detection is unnecessary by the detection necessity determination means, the moving image input means obtains a new frame image again, and when it is determined that detection is necessary, processes after processing performed by the difference image generation means are continued.

86. A non-transitory computer readable recording medium storing a digital watermark detection program for causing a computer to function as a digital watermark detection apparatus for detecting digital watermark from moving images, the digital watermark detection program causing the computer to function as:

moving image input means for sequentially obtaining a frame image;

feature region extraction means for extracting a feature region in the frame image to obtain a feature region image;

difference image generation means for generating a difference image between a currently obtained feature region image and a previously obtained feature region image read from a feature region image buffer to obtain a difference image (A), and storing the currently obtained feature region image into the feature region image buffer;

phase difference measurement means for generating a phase pattern based on the currently obtained difference image (A), measuring a phase difference between the currently obtained phase pattern and a previously obtained phase pattern read from a phase pattern buffer, generating a difference image (B) based on the phase difference and amplitude, and storing the currently obtained difference image (A) into the phase pattern buffer;

detection subject region extraction means for performing adding and storing for pixel values of the difference image (B) for each pixel, extracting a detection subject region from a difference image (B) storing buffer obtained by the adding and storing to obtain a detection subject region image;

digital watermark detection means for performing digital watermark detection from the detection subject region image to output digital watermark detection status; and means for obtaining, with the moving image input means, a new frame image again so as to repeat processes of each of the above means in a case where digital watermark detection process is continued including a case where digital watermark detection is impossible, wherein the moving image input means sequentially obtains the frame image and frame display time that is a display time of the frame image, the digital watermark detection apparatus further comprises:

detection necessity determination means for determining detection necessity based on a time interval between the current frame display time and frame display time of the previously obtained frame image using watermark pattern switching information used when embedding a digital watermark, wherein, when it is determined that detection is unnecessary by the detection necessity determination means, the moving image input means obtains a new frame image again, and when it is determined that detection is necessary, processes after processing performed by the difference image generation means are continued.

* * * * *

UNITED STATES PATENT AND TRADEMARK OFFICE
CERTIFICATE OF CORRECTION

PATENT NO. : 7,970,164 B2  
APPLICATION NO. : 11/666311  
DATED : June 28, 2011  
INVENTOR(S) : Takao Nakamura et al.

Page 1 of 1

It is certified that error appears in the above-identified patent and that said Letters Patent is hereby corrected as shown below:

On the title page, Item (86), the PCT information is incorrect. Item (86) should read:

-- (86) PCT No.:     PCT/JP2006/315126

§ 371 (c)(1),  
(2), (4) Date:     Apr. 26, 2007 --

Signed and Sealed this  
Tenth Day of July, 2012

David J. Kappos  
*Director of the United States Patent and Trademark Office*